United States Patent [19]

Sumner et al.

[11] 4,209,784

[45] Jun. 24, 1980

[54] PROCESSOR CONTROLLED EDITOR TERMINAL SYSTEM AND METHOD

[75] Inventors: Murray Sumner, Mamaroneck, N.Y.; Sigitas J. Liaukau, Huntington, Conn.

[73] Assignee: Bunker Ramo Corporation, Oak Brook, Ill.

[21] Appl. No.: 757,101

[22] Filed: Dec. 16, 1976

Related U.S. Application Data

[63] Continuation of Ser. No. 538,201, Jan. 2, 1975, abandoned.

[51] Int. Cl.² ............................................. G06F 3/14
[52] U.S. Cl. .................................. 340/711; 178/17.5; 340/748; 340/724; 340/798
[58] Field of Search ........... 340/324 A, 324 AD, 711, 340/724, 748, 791, 798; 178/15, 30, 17.5, 152, 154

[56] References Cited

U.S. PATENT DOCUMENTS

| | | | |
|---|---|---|---|
| 3,248,705 | 4/1966 | Dammann et al. | 340/324 AD |
| 3,559,208 | 1/1971 | DiGiugno | 178/15 |
| 3,603,966 | 9/1971 | Gregg, Jr. | 340/324 AD |
| 3,618,032 | 11/1971 | Goldsberry | 340/324 AD |
| 3,648,245 | 3/1972 | Dodds, Jr. | 340/324 AD |
| 3,688,275 | 8/1972 | Fredrickson et al. | 340/324 AD |
| 3,728,710 | 4/1973 | Berg | 340/152 |
| 3,816,823 | 6/1974 | Manber | 340/324 AD |
| 3,974,493 | 8/1976 | deCavaignac et al. | 340/324 AD |

OTHER PUBLICATIONS

Display-Hyphenate Scan, McConnell et al., IBM Tech. Discl. Bull., vol. 12, #4, 9/69, pp. 520–521.
Display Device Incorporating Input Format Selection, Bluethman, I.B.M. Tech. Discl. Bull., vol. 12, #7, 12/69, pp. 927–928.

*Primary Examiner*—Marshall M. Curtis
*Attorney, Agent, or Firm*—Hill, Van Santen, Steadman, Chiara & Simpson

[57] ABSTRACT

A character display system including a storage device having a number of lines of storage locations greatly exceeding the number of lines to be displayed, and a processing system preferably implementing key functions for the maximum effectiveness and convenience of an operator with very high order discretion in producing text, such as a news editor for an on-line news dissemination system. The processing system is thus highly user oriented so as to provide minimum distraction from creative mental effort, and to this end the aim is to accommodate continuous typing with minimum visual reference to the display. To this end, with automatic carriage return, there is provided a space delete operation with reference to the first character location of a new line, and automaic elimination of null codes by left justification in response to typing with respect to any new line. As a reflection of the great discretion of the operator, an insert mode of the processing system will immediately provide a substantial number of empty spaces such as a full line whenever a character to be inserted is generated with respect to a location of existing text. Entry marker control is by means of keys having only the normal typing modes, so as to avoid any distraction or need for special attention by the operator in adjusting entry marker location. Another expression of deference to the operator is the provision of tab points which once set in a given line are automatically established at the same lateral positions in all succeeding lines of the buffer assigned to the terminal. Similarly, tab points are moved with data, and a reset tab function also serves to delete all tab points following the current line. Fields of data are moved under keyboard control with automatic deletion of the data from its previous location. At the completion of an insert or move function, the resulting data is automatically left-justified as appropriate, and the various automatic features of the processing system are operative in the insert mode as well as in the normal text generation mode.

5 Claims, 27 Drawing Figures

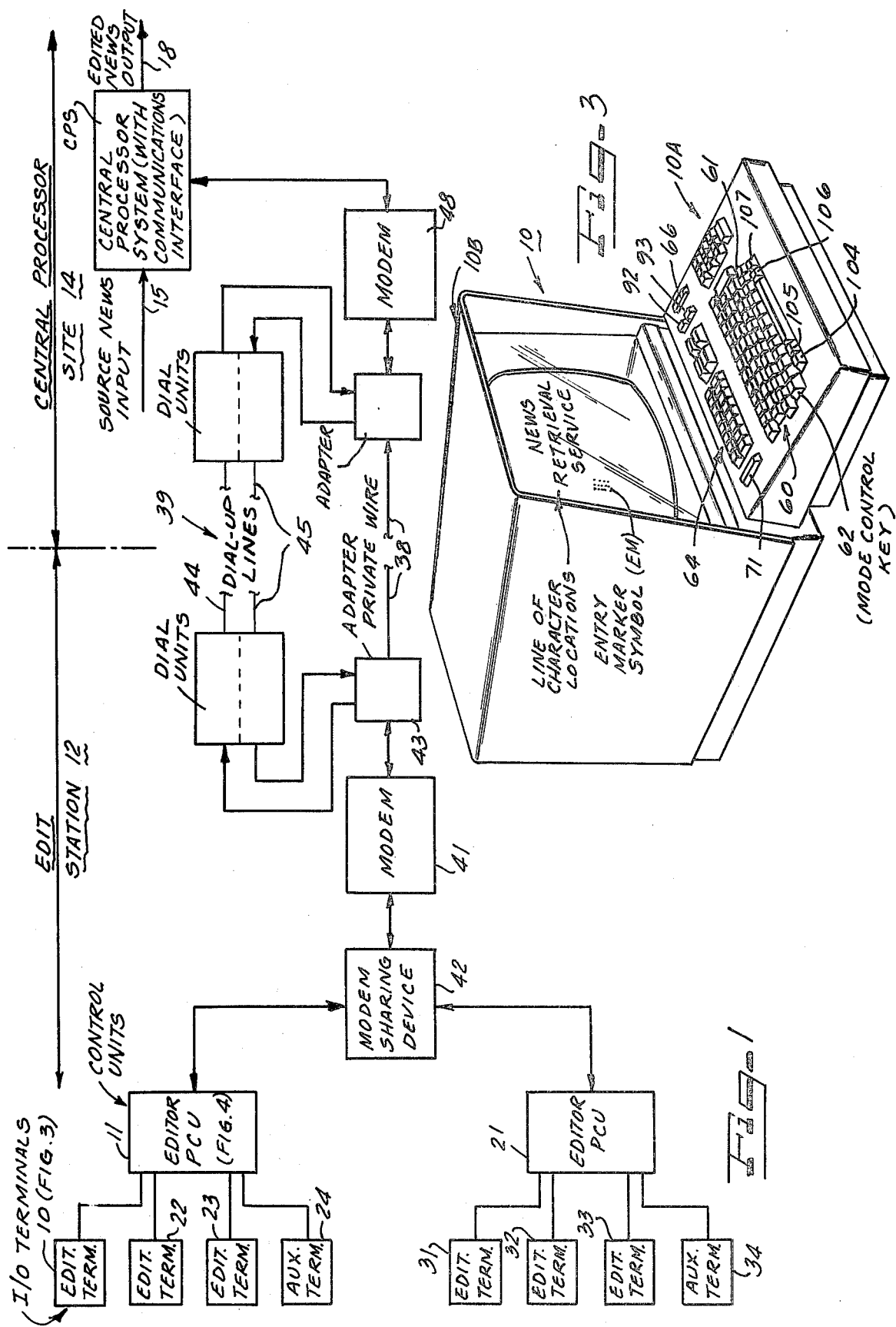

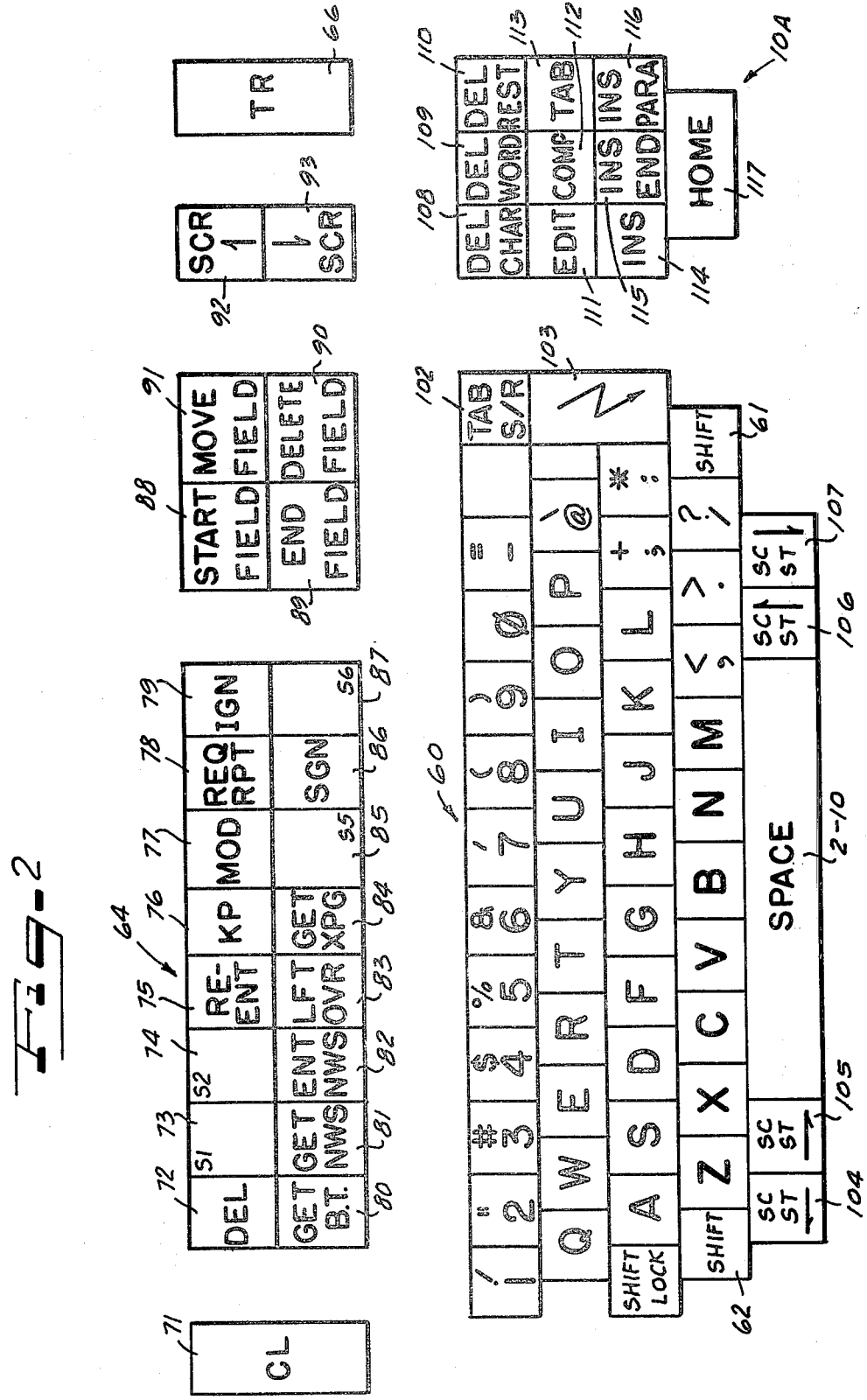

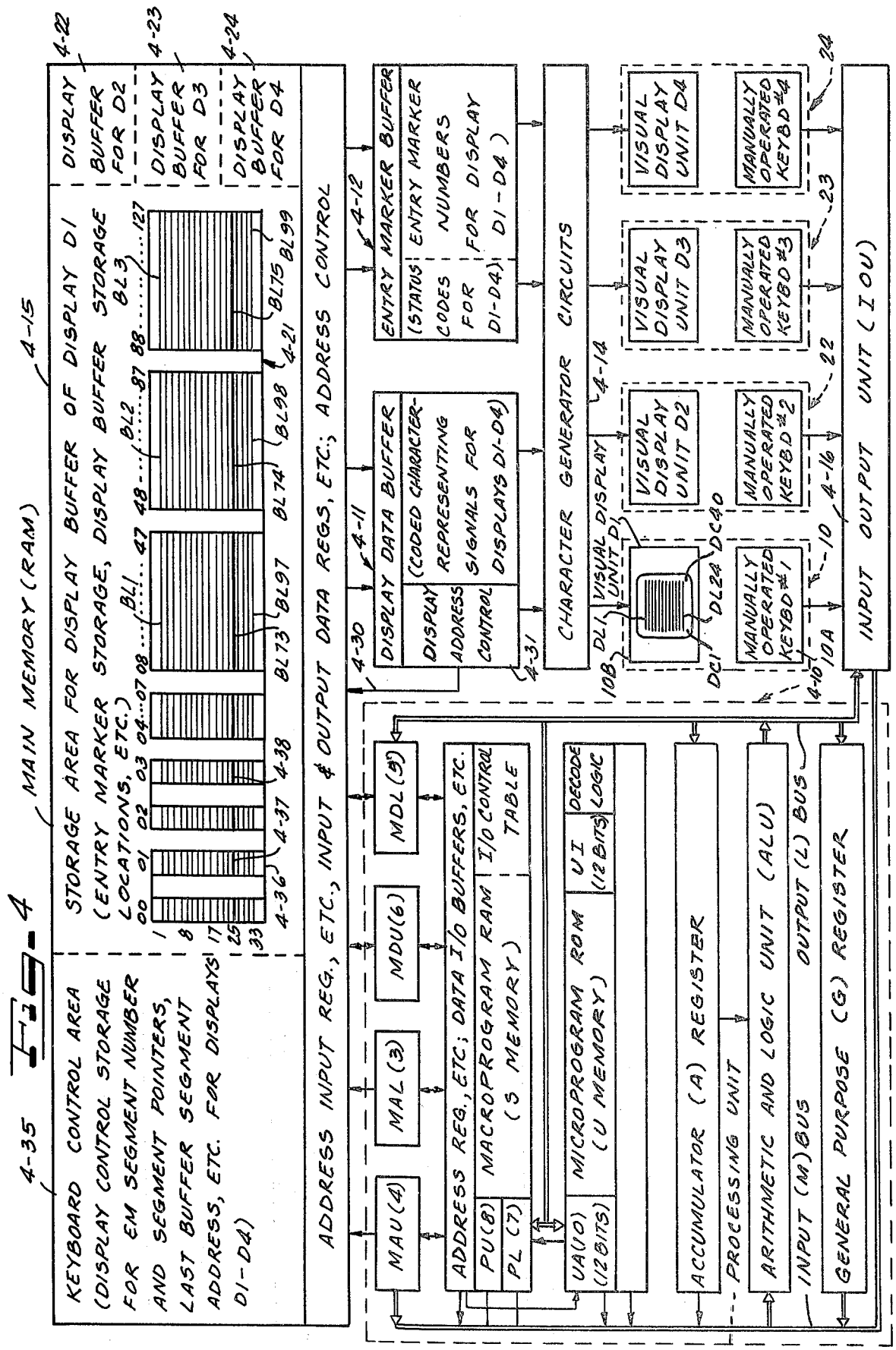

START OF KEYBOARD APPLICATION PROGRAM

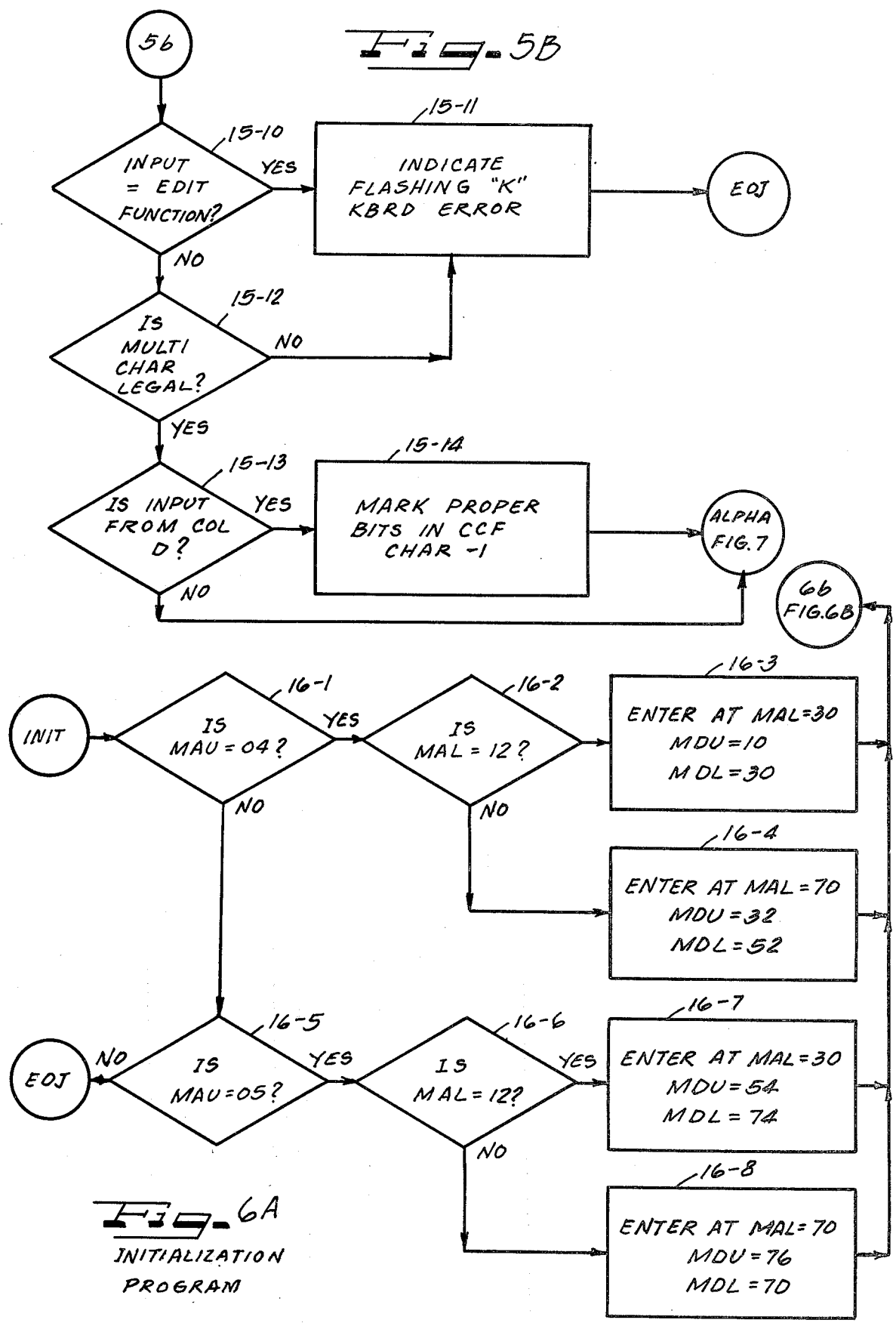

Fig. 7A — ALPHA INPUT PROGRAM

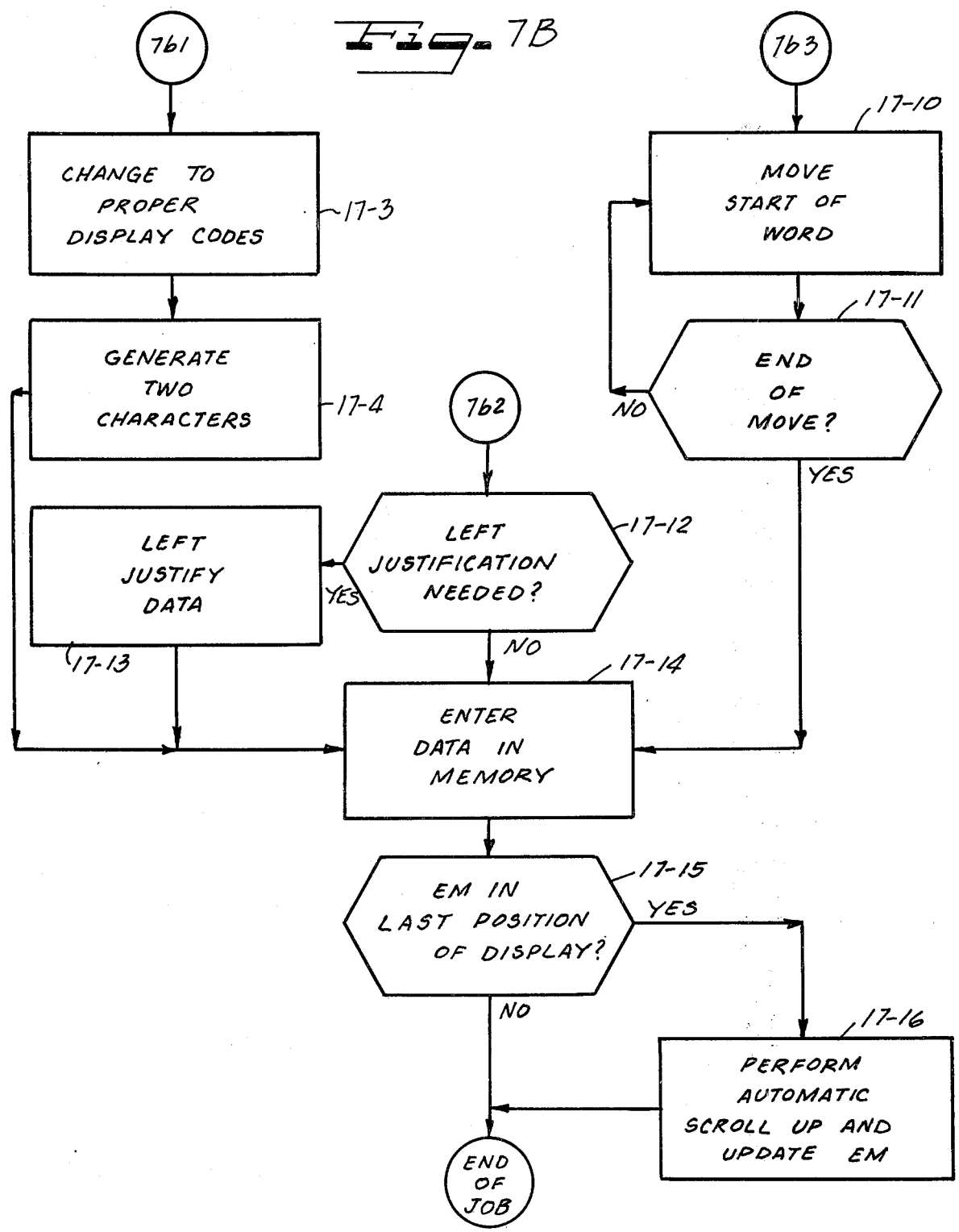

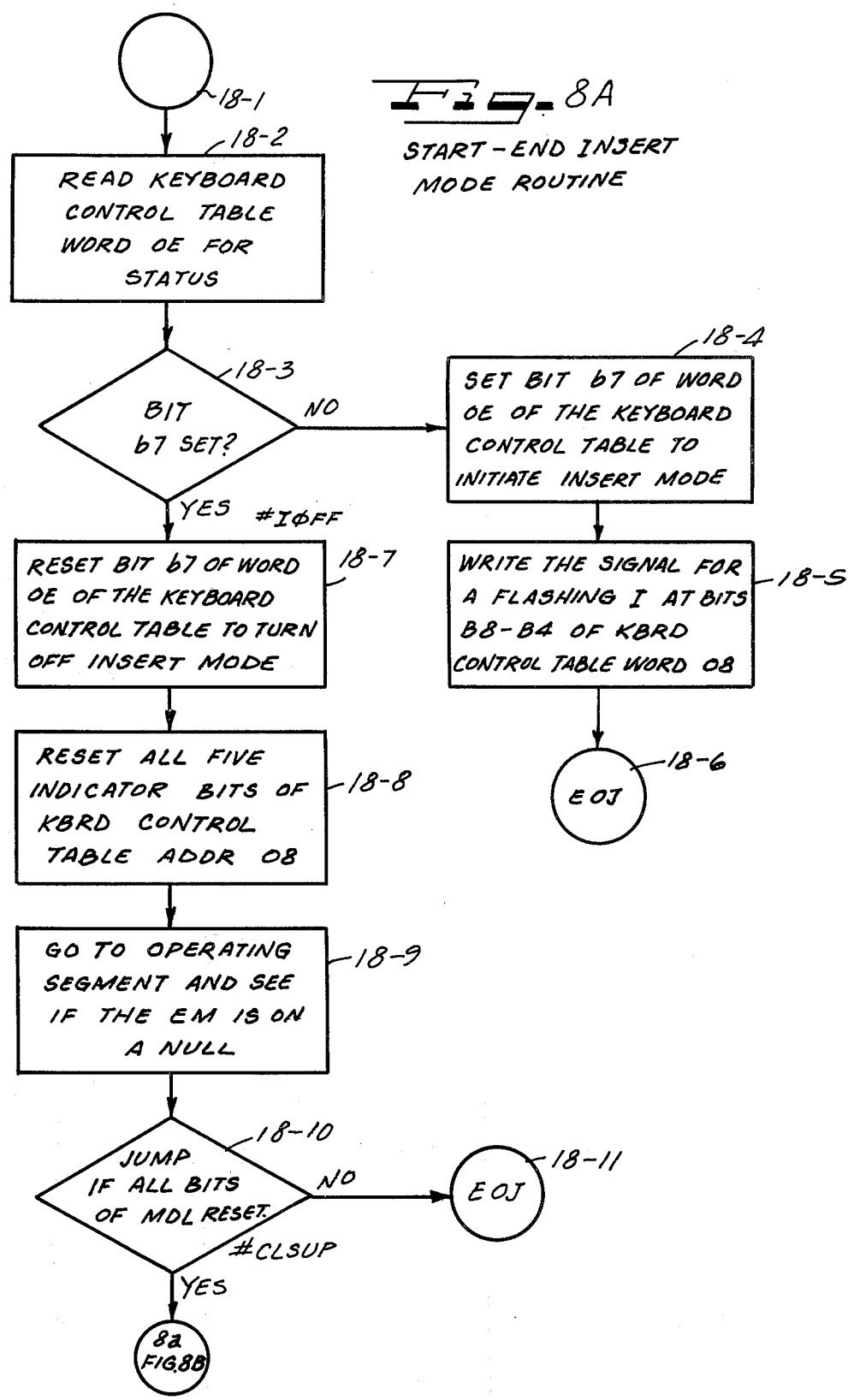

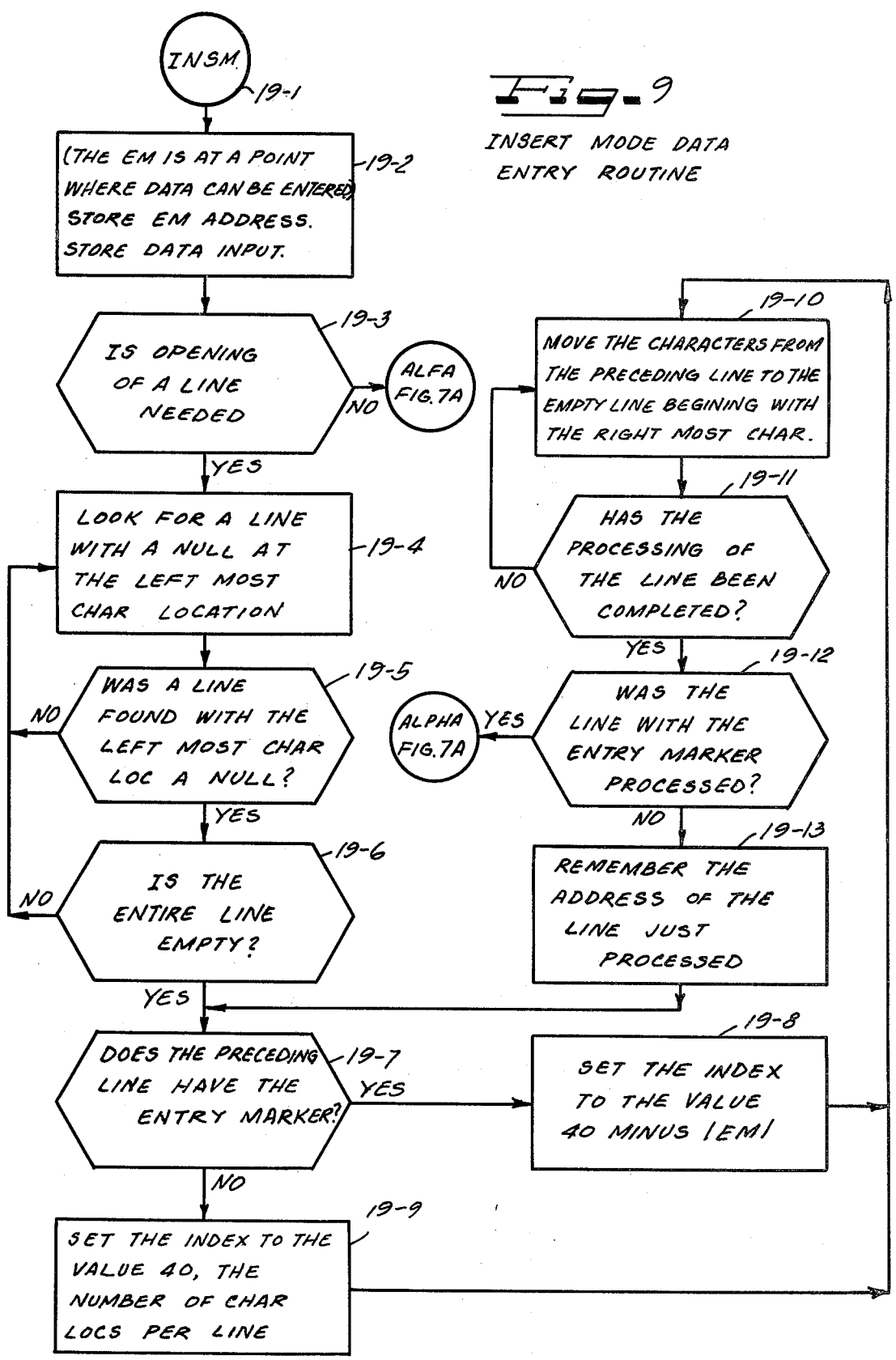

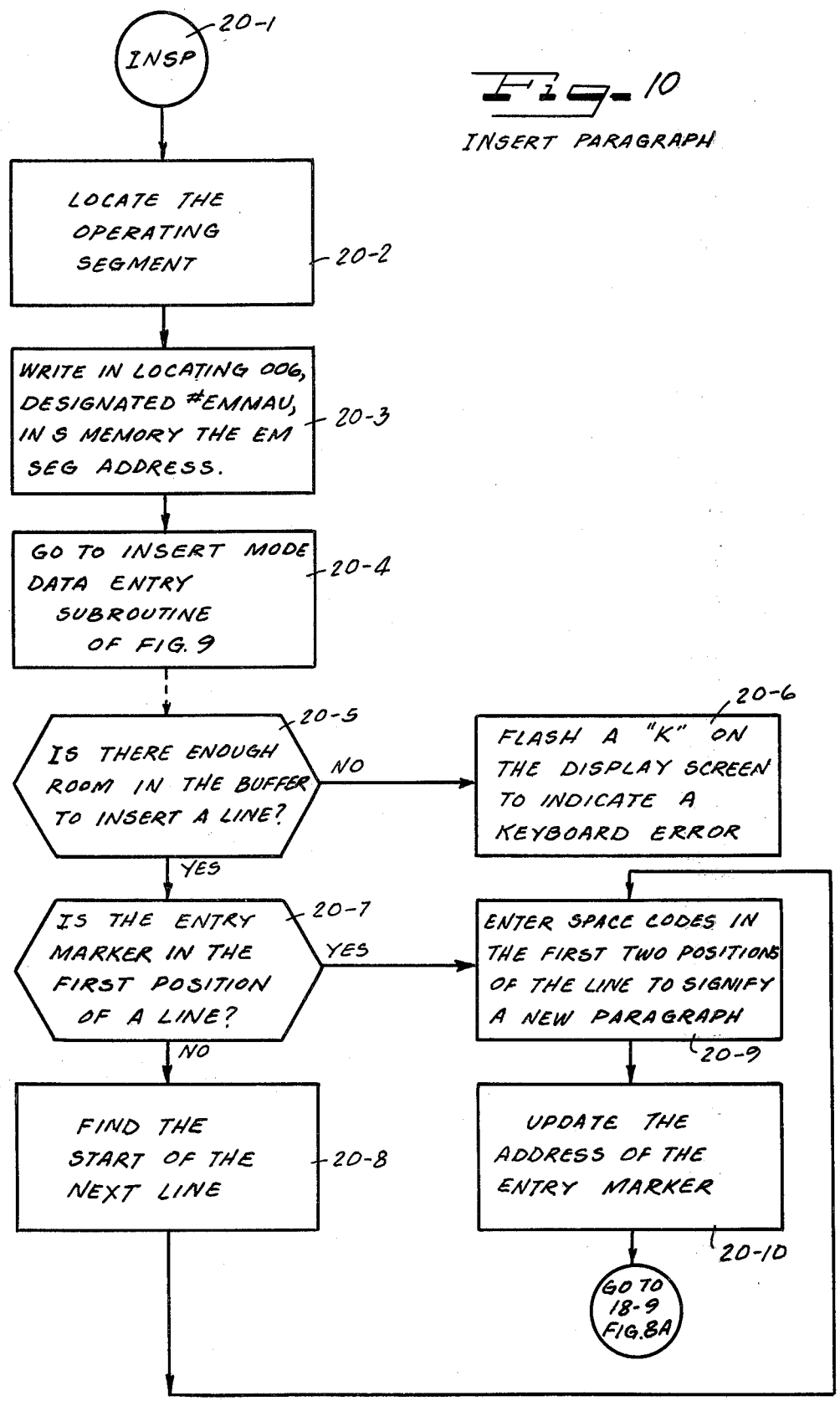

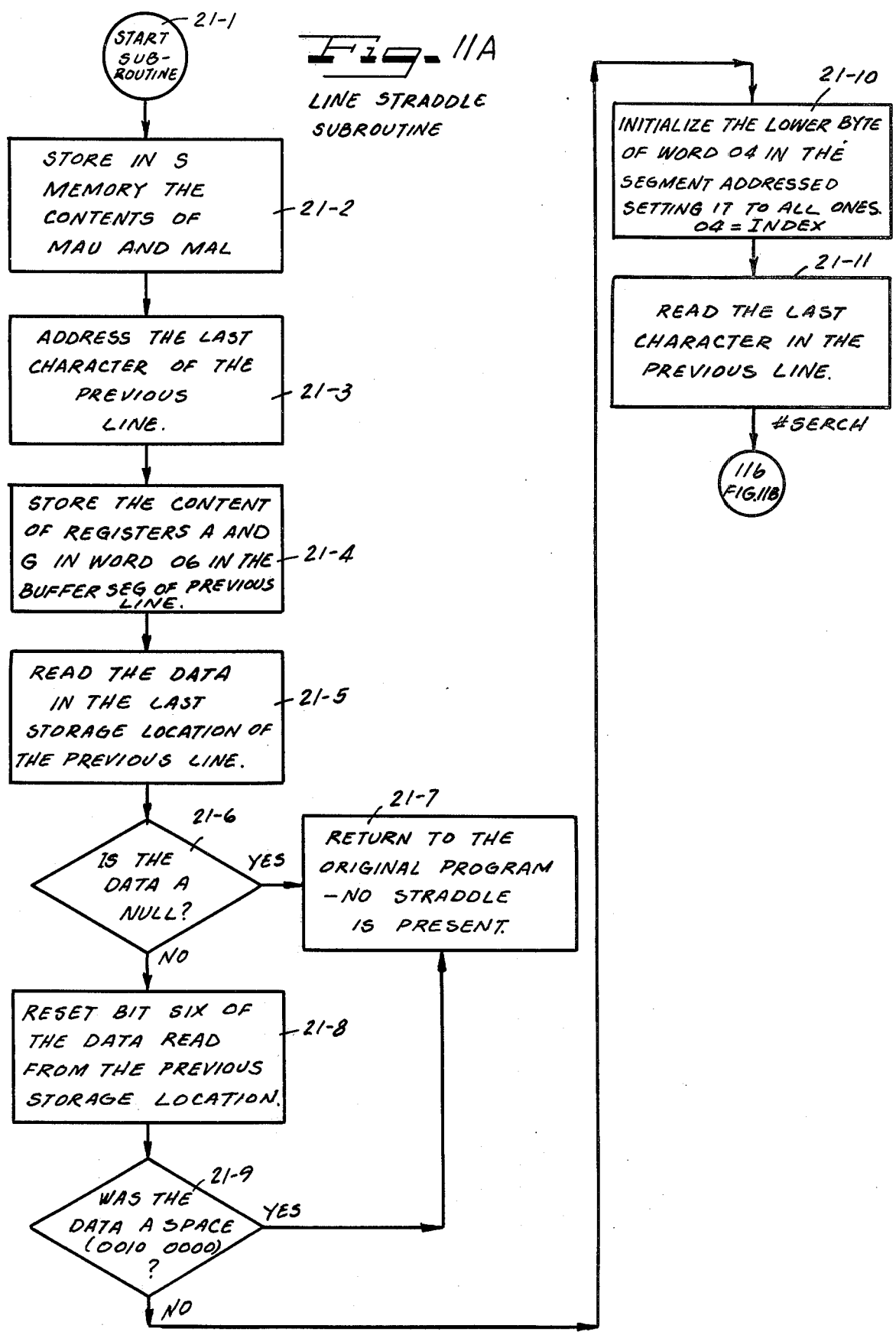

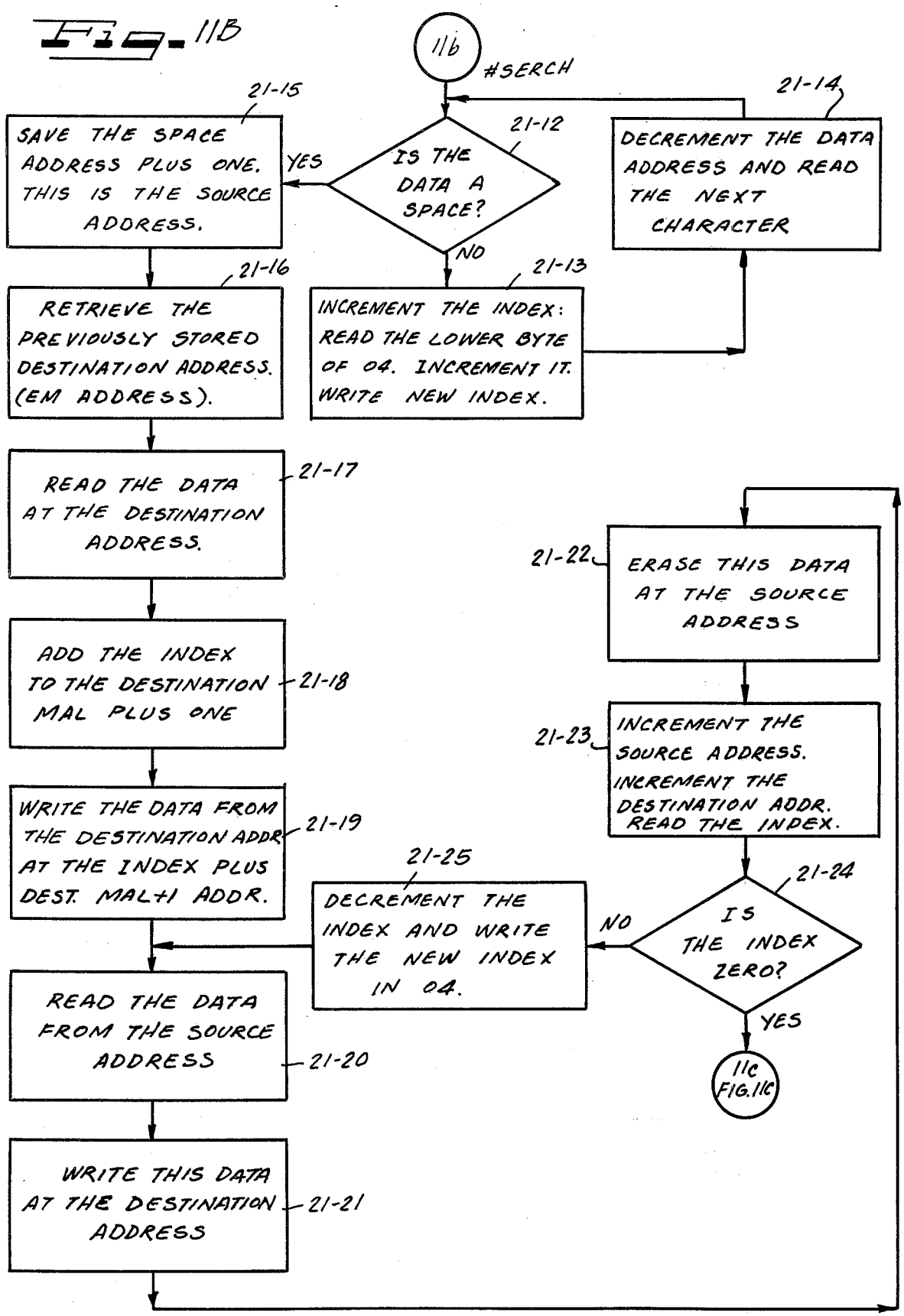

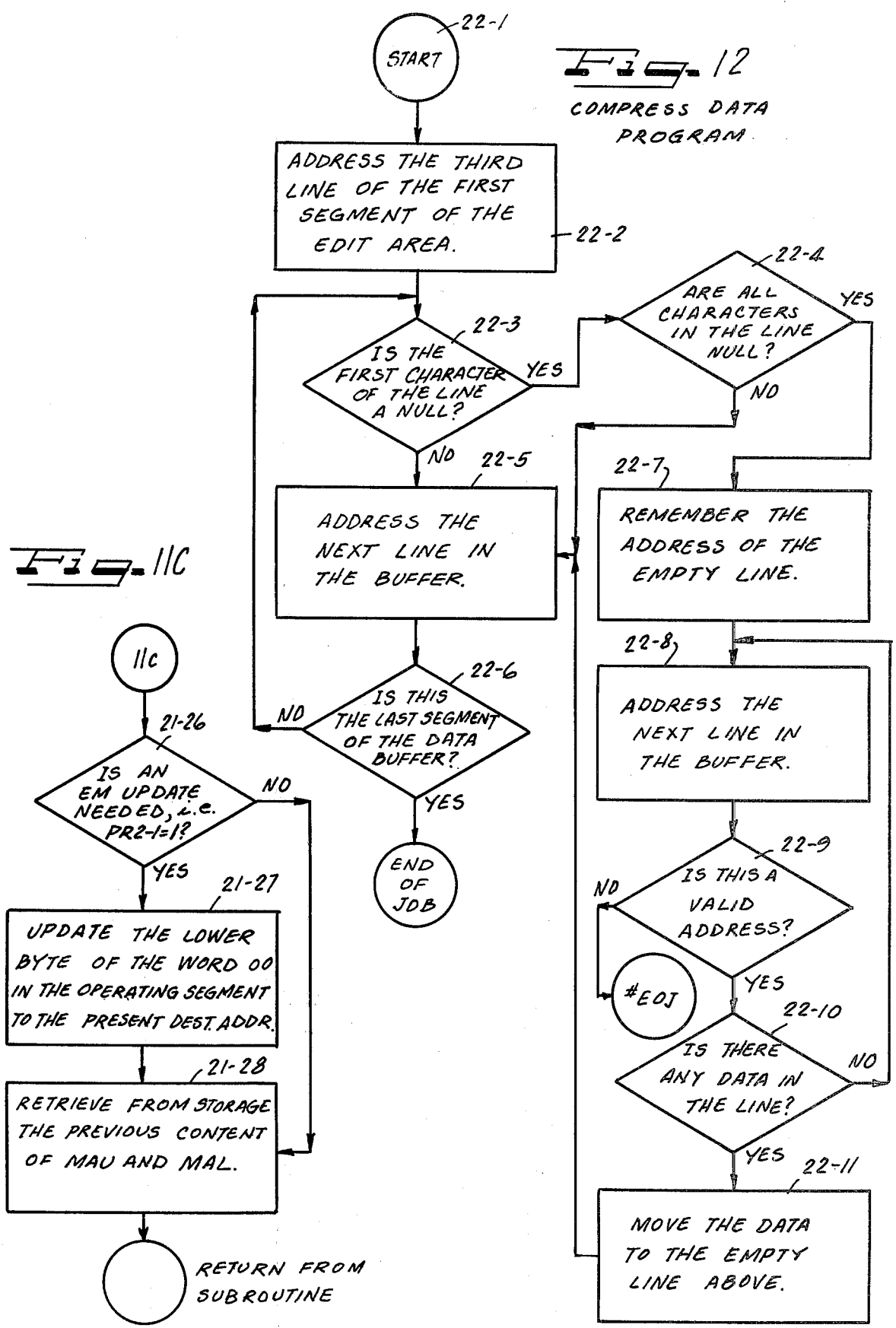

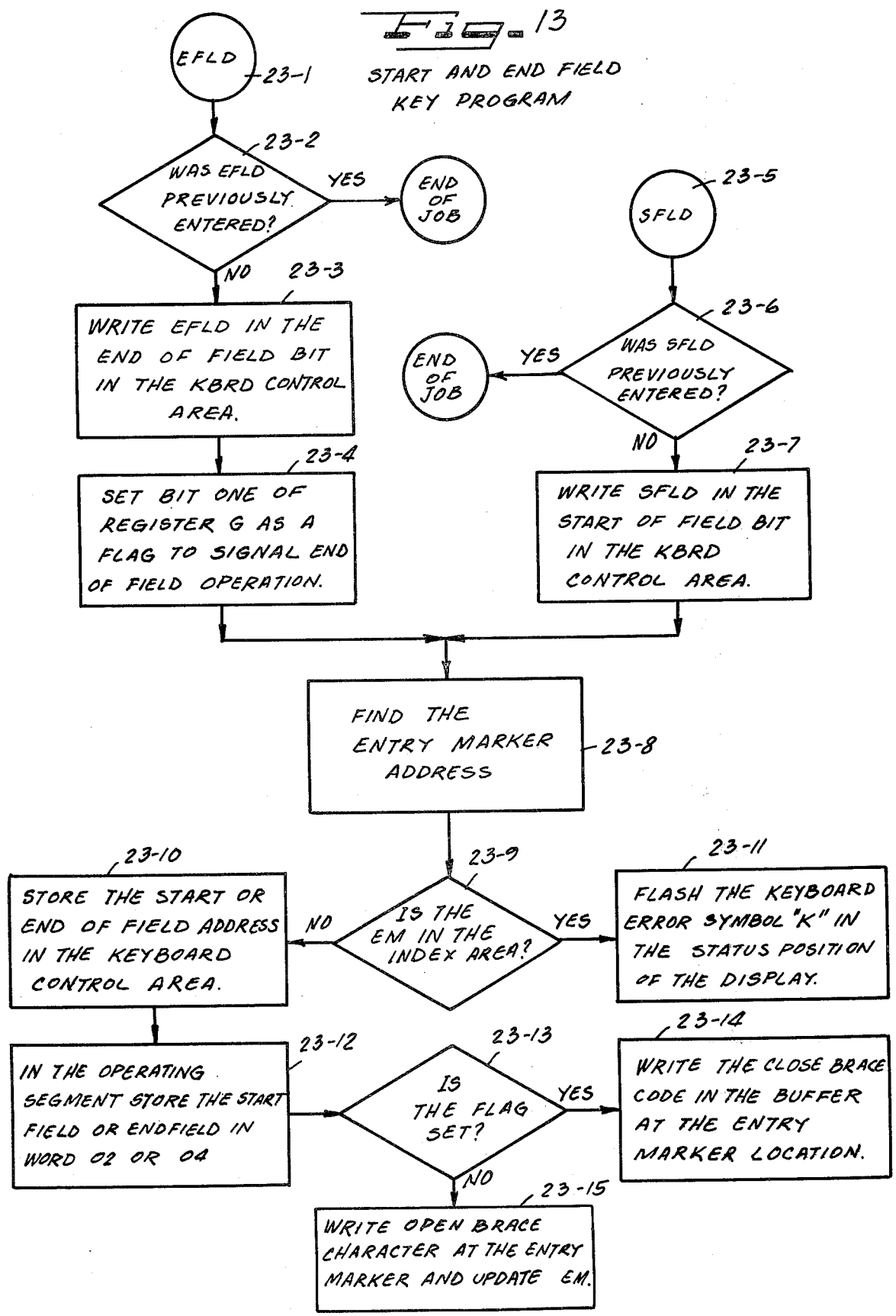

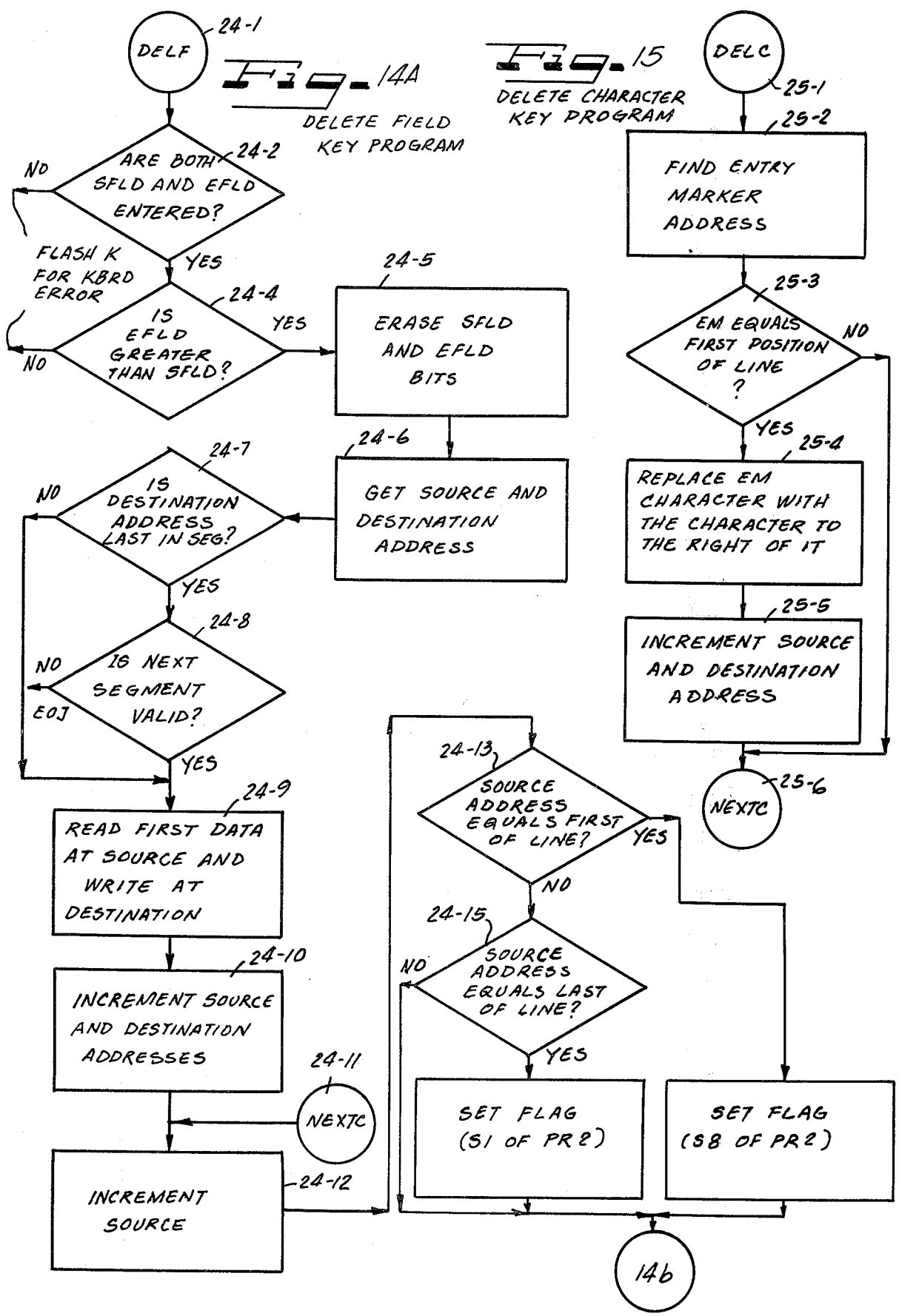

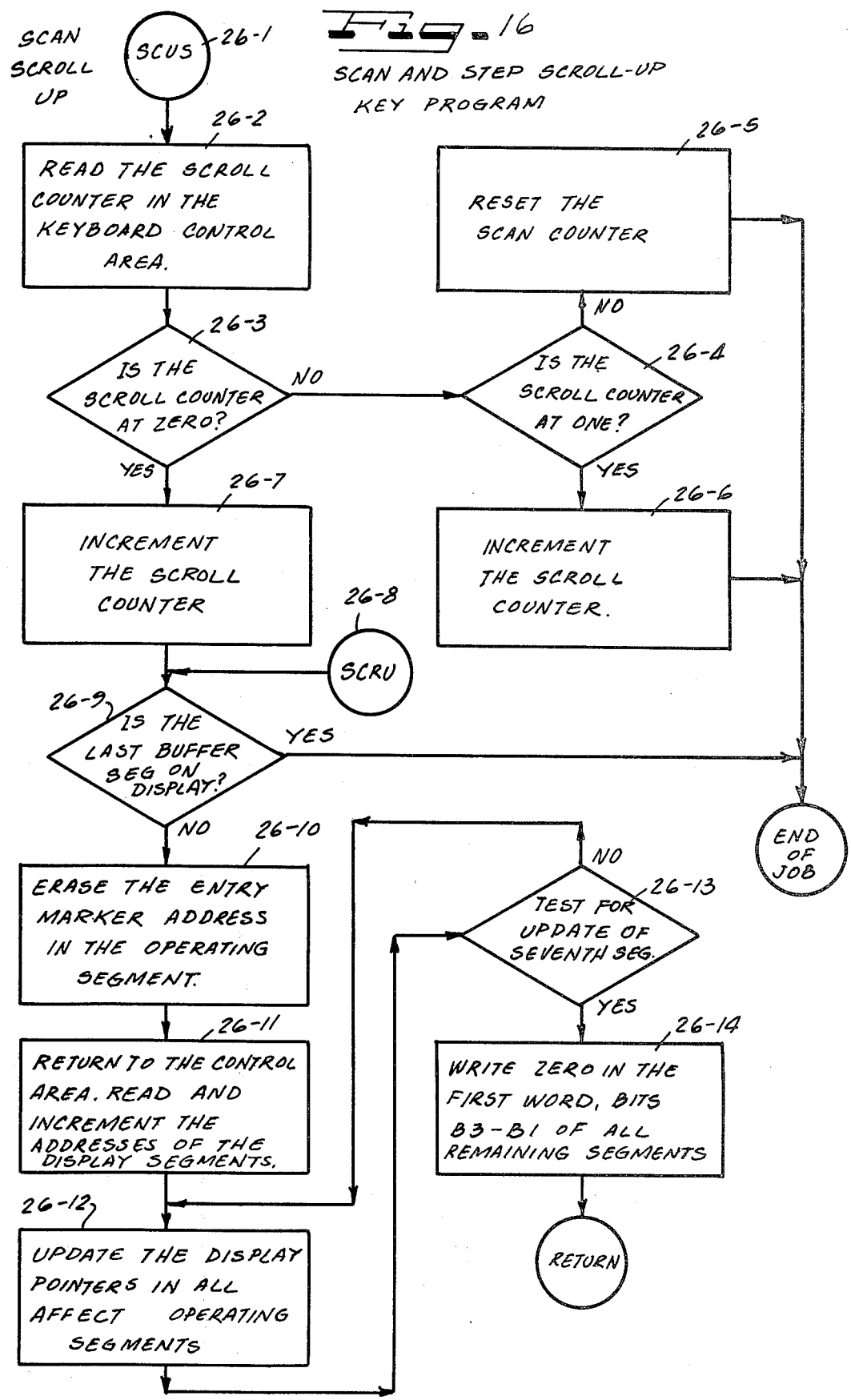

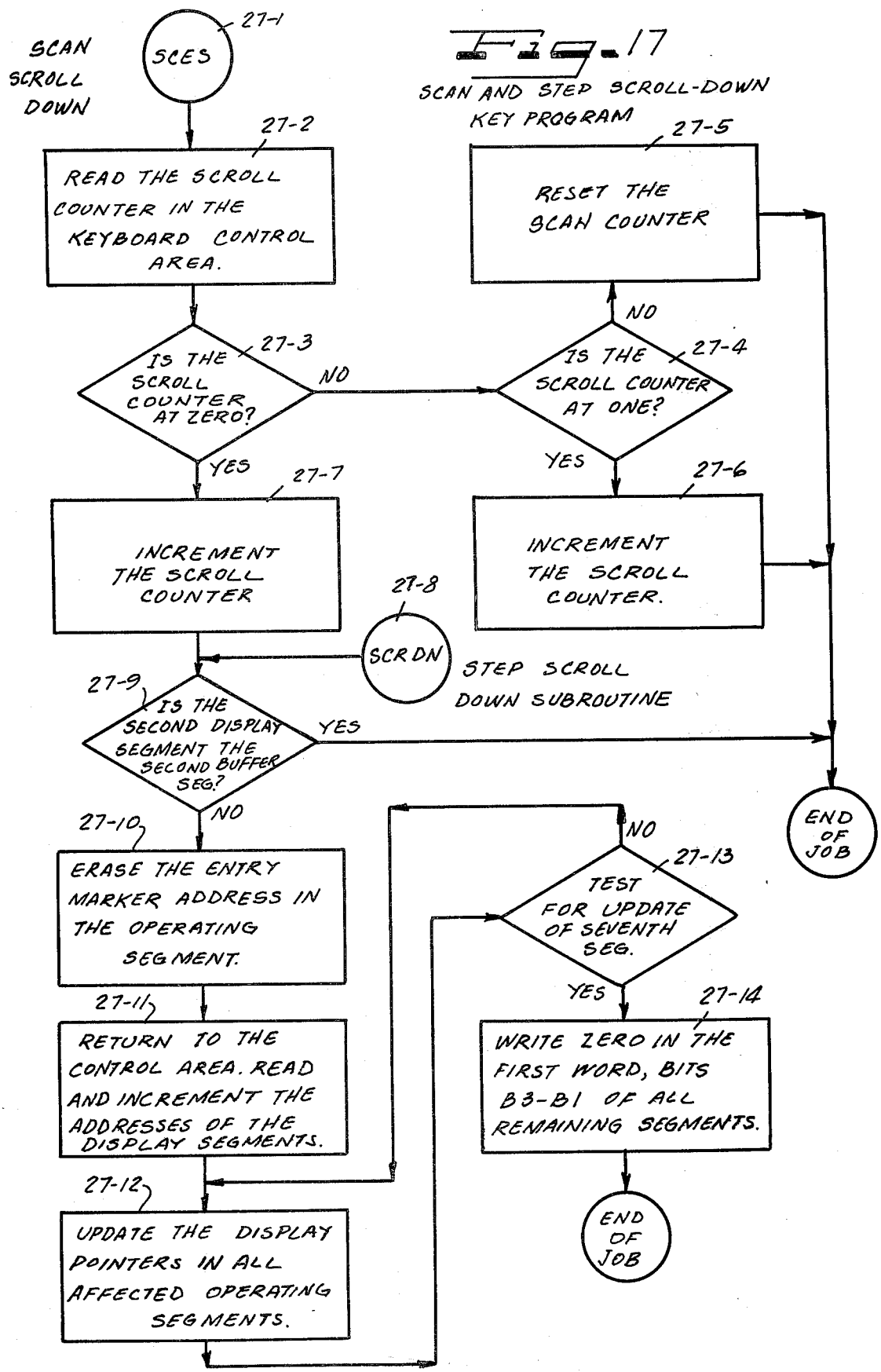

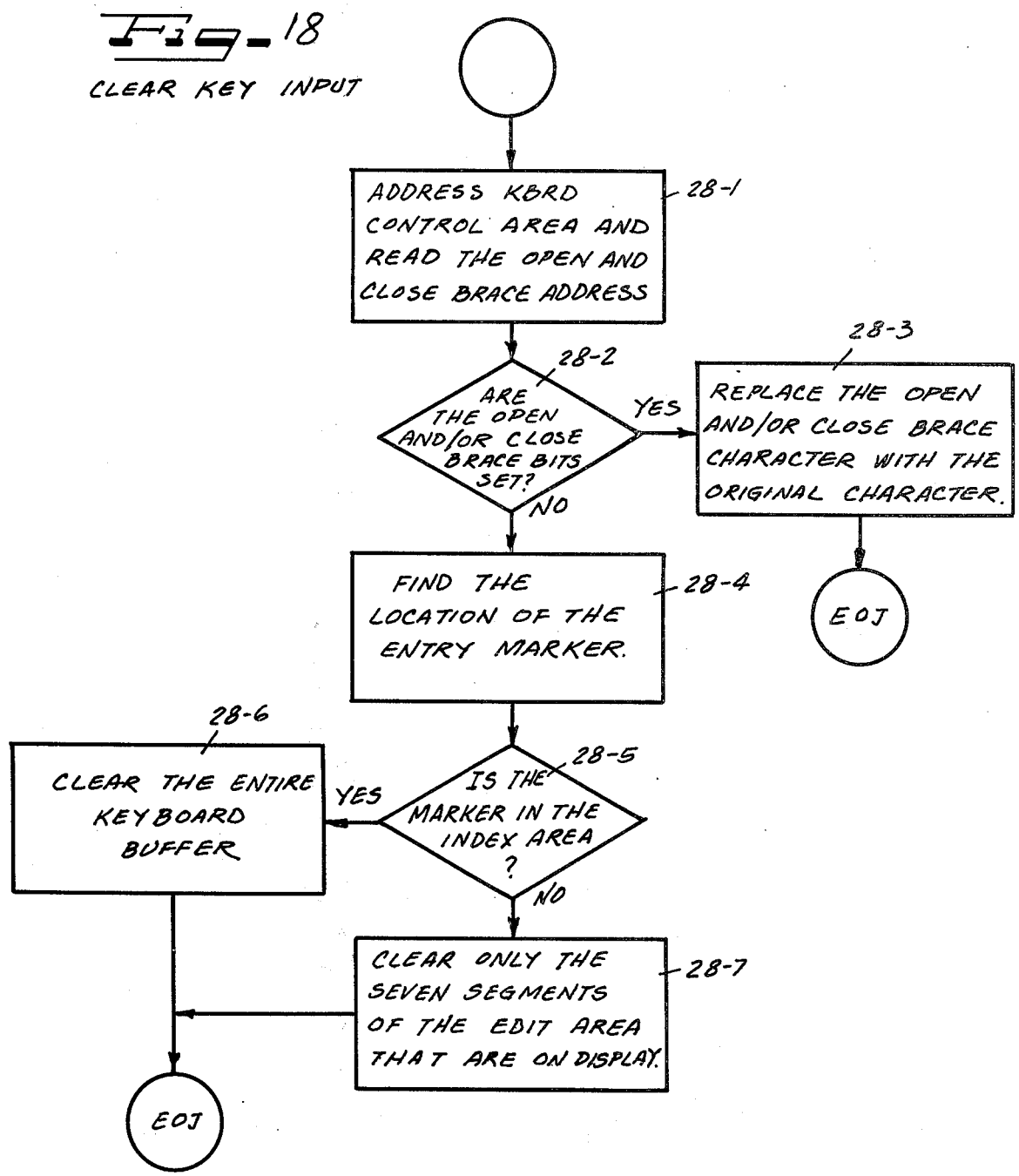

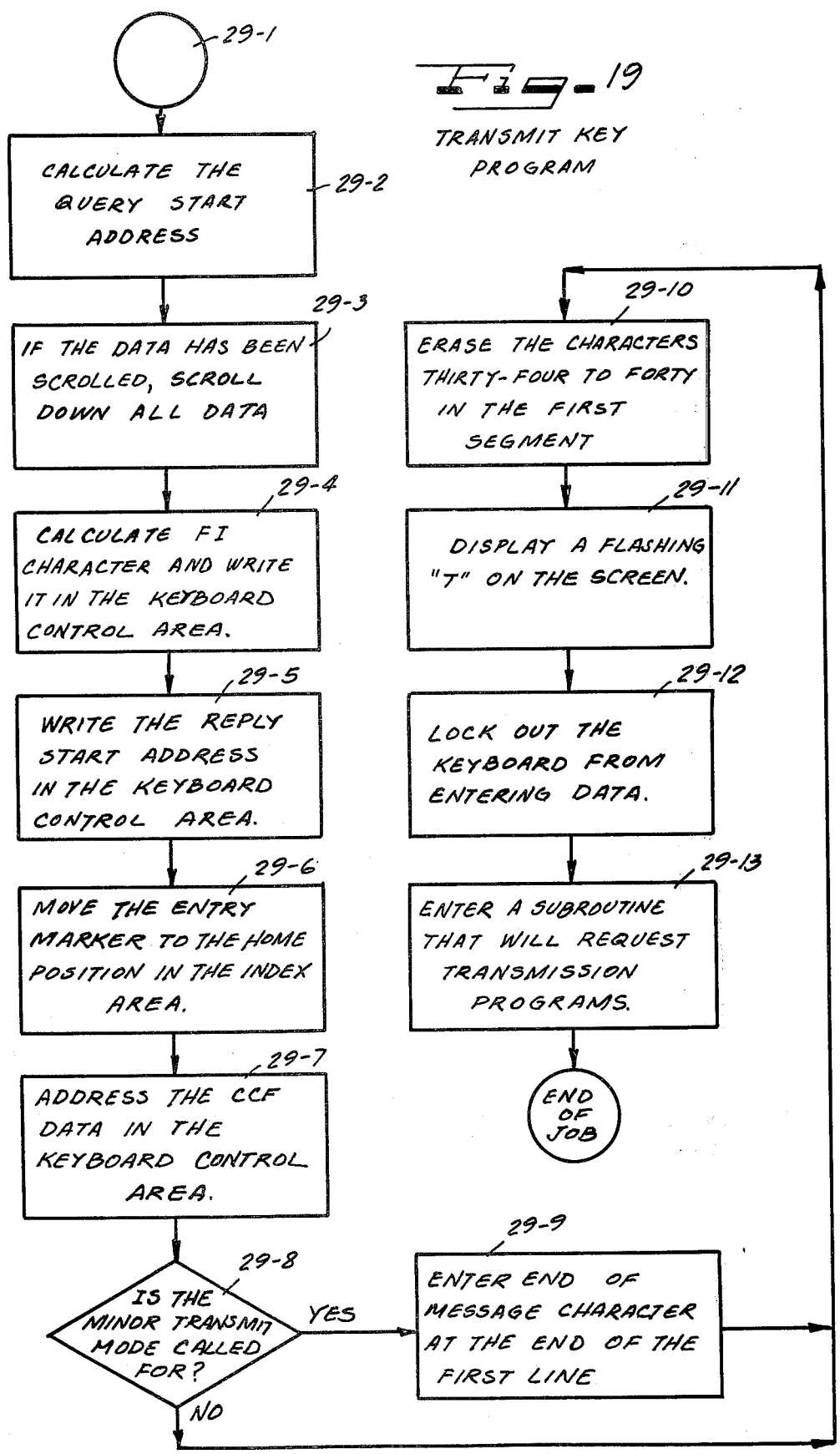

PROCESSOR CONTROLLED EDITOR TERMINAL SYSTEM AND METHOD

CROSS-REFERENCE TO RELATED APPLICATION

The present application is a continuation of application U.S. Ser. No. 538,201 filed Jan. 2, 1975, now abandoned.

SUMMARY OF THE INVENTION

This invention relates to a display system and method, and particularly to an on-line text editing system and method for use in disseminating news or other information where timeliness is a critical factor.

In keyboard operated display systems, the tendency has been to add further key functions in an effort to increase the speed and ease of text generation and modification. It is found, however, that even with skilled and experienced operators a point is reached where the large number of keys required is itself a burden to the operator, diminishing the net value of the available functions.

It is a basic objective of the present invention to provide an improved keyboard operated display system capable of anticipating desirable functions without the necessity for additional keys to be actuated by the operator.

In particular in a text editing system, provision is made whereby an entry marker may be operator controlled to move vertically relative to a textual display. Under such circumstances, the present invention contemplates a display system which will automatically adjust the entry marker laterally to a correct position for entry of further text in response to an inference that the operator desires to make further entry with respect to a given attained line position. As a concrete example, after the entry marker has attained a new line position, the operator may strike a character key, and the system will infer from this sequence of operation that the operator desires to enter such character at the leftmost suitable position on the attained line. In this way, a need for a lateral positioning control of the entry marker on the part of the operator is avoided. Further, with this feature, the operator is presented with a more accurate display of the textual material as it might be transmitted to a remote location for storage, and buffer space is conserved during the entry of keyboard data. Also, should the line contain extraneous space codes, this is apparent from the display, so that such extraneous matter can be deleted from the buffer. The beneficial result of this embodiment is that the operator can more efficiently compose a news item or the like exactly as he desires it to be transmitted.

A related objective of the present invention is to provide a display system which will minimize the need for the operator to take corrective actions even though key functions are available for the purpose, to the end that the operator can concentrate his efforts in a highly demanding and creative task such as news editing with minimum distraction or frustration and with all possible speed and efficiency.

By way of example, the system will respond to a keyboard-selected space code after the right margin of a line of displayed characters is reached to automatically enter the space code with respect to the first character location after the left margin in the next line. A following keyboard entry will be examined however, to determine if the space was an intentional entry for the first character location of the new line. Accordingly, if the further keyboard entry is a character other than a further space code, the system will automatically enter the further keyboard entry with respect to the first character location and delete the unintentional space code at this location. On the other hand if a further space code is generated with respect to the second character location then the system will infer that a new paragraph is being generated and that the storage of a space code with respect to the first character location was intentional.

A feature of the invention resides in the provision of a cluster of control keys on a manual keyboard which may be actuated individually but are disposed for joint simultaneous actuation to effect the continuous movement of the entry marker. For example, the right hand of the operator can selectively effect movement of the entry marker in a step fashion up or down by individual selection of one of two selector keys, and can effect continuous up or down movement by the joint actuation of one of such selector keys and a further mode control key of the cluster located within a finger span (i.e. within three inches) of the two selector keys.

It is desirable to utilize standard keyboard actuations in effecting entry marker movement, and to avoid either an excessive number of individual keys or special multi-purpose keys which require especial care on the part of the operator. This is achieved by the provision of both horizontal and vertical entry marker control adjacent the space bar and the shift keys, and with provision of scanning movement of the entry marker in any of four directions when both the step key for the desired direction of movement and the shift key are actuated.

The present system is particularly oriented to an operator with a high degree of discretion and who may be expected to produce extensive modifications and insertions in a displayed text. The specific example given is a news editor who may receive news copy on a terminal display via an on-line computer from a wire service or the like so that such news can be edited in light of information from several other sources; in such situations the operator will be extensively revising a displayed version of text so as to produce an edited version of increased accuracy and conciseness and of maximum usefulness to a particular class of recipients. The preferred processing system herein is tailored to such creative editing and to the consequent expectation of extensive insertions, deletions and rearrangements of displayed text.

In addition to the previously described features, a further consequence of the type of editing activity contemplated in the disclosed embodiment is the provision of a processor system which during insert mode will shift whole blocks of existing text to make room for inserted text. This minimizes the burden on the processor of extensive insertions. Once an insertion is completed preferably as signalled by the second action of an insert mode key, the processing system will automatically move the shifted block of text to its proper location following the inserted text.

Many other features are included in the illustrated system for the purpose of ease and efficiency of text production and editing. For example, if a character-representing code other than a space code (or carriage return) is generated after the right margin of a line has been reached, then the system will automatically position the entire string of characters at the left margin of the next line.

If the typist reaches the end of the bottom line of the display, and continues to type, the display will automatically scroll a selected plurality of lines (such as three lines) and enter the further typing at the left margin of the top one of the newly presented lines.

In order to expedite the generation of tabular data, for example, tab points once set in a given line are automatically established at the same lateral positions in all succeeding lines of the buffer assigned to the terminal. Multiple tab points on the same line may be established and their locations will be suitably indicated on the display. When resetting tab points, a reset tab function also serves to delete all tab points following the current line.

Other functions of the illustrated system relate specifically to the editing function and are directed toward making the editing operation as fast and effortless and error-free as possible. The functions provided include insertion of data with automatic scrolling while protecting against inadvertent loss of data from the buffer. The deletion of data is effected with automatic left justification of the remaining part of the affected paragraph. Fields of data are moved under keyboard control with automatic deletion of the data from its previous location in the buffer so as to conserve buffer space. At completion of an insert or move function, the resulting data is automatically left-justified as appropriate, and the various automatic features are operative in the insert mode such as automatic carriage return and elimination of inadvertent space codes and word line-straddle conditions.

A feature of the invention resides in the use of a table of randomly accessible storage locations for registering display control data, the table being organized so that various functions such as scrolling and entry marker movement are readily effected either automatically or in response to keyboard command. The preferred structural arrangement of the system facilitates the implementation of editing functions such as the deletion, insertion or movement of data, and enables such functions to be performed together with the related automatic scrolling or left justification of text and the like, with the minimum burden on software-controlled processor time.

Still another objective is to provide a system of great flexibility so as to be readily adapted to new applications. Of particular concern is the provision of a system which can be adapted to relatively limited and specialized fields of use where a completely new design would not be economically justified. The display control is preferably capable of extremely high operating speeds so as to be adaptable to uses involving stringent demands on processing time, and to this end implementation preferably involves fixed or hard wired micrologic circuitry for controlling frequently required operations. On the other hand system organization is such that further micrologic can be readily added with minimum modification of other components of the overall design.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 1 is a block diagram illustrating an overall news retrieval and editing system in accordance with the present invention;

FIG. 2 is a diagrammatic illustration of the keyboard layout in accordance with the teachings of the present invention;

FIG. 3 on sheet 1 of the drawings is a diagrammatic perspective view showing the relationship of the editor keyboard to the display and showing the physical keys diagrammatically indicated in FIG. 2 for an exemplary input-output terminal as diagrammatically indicated at the left in FIG. 1;

FIG. 4 is a diagrammatic illustration of an overall editor terminal system in accordance with the present invention;

FIG. 7 consisting of FIGS. 7A and 7B shows exemplary processing steps of an Alpha Input Program for the system of FIG. 4;

FIG. 9 is a flow diagram of a Insert Mode Data Entry Subroutine for the system of FIG. 4;

FIG. 10 is a flow diagram of certain processing operations in an Insert Paragraph Routine for the system of FIG. 4;

FIG. 11 consisting of FIGS. 11A, 11B and 11C is a flow diagram illustrating certain processing steps of a Line Straddle Subroutine for the system of FIG. 4;

FIG. 12 is a flow diagram illustrating certain processing steps of a Compress Data Program for the system of FIG. 4;

FIG. 13 is a flow diagram showing certain processing operations of a Start and End Field Key Program for the system of FIG. 4;

FIG. 15 on sheet seventeen of the drawings is a flow diagram illustrating certain processing operations of a Delete Character Key Program for the system of FIG. 4;

FIG. 16 is a flow diagram showing certain processing operations of a Scan and Step Scroll-Up Key Program for the system of FIG. 4;

FIG. 17 is a flow diagram showing certain processing operations of a Scan and Step Scroll-Down Key Program for the system of FIG. 4;

FIG. 18 is a flow diagram showing certain processing operations for a Clear Key Input Routine for the system of FIG. 4; and FIG. 19 is a flow diagram showing certain processing operations of a Transmit Key Program for the system of FIG. 4.

DETAILED DESCRIPTION OF THE PREFERRED EMBODIMENT

Figure 5A:
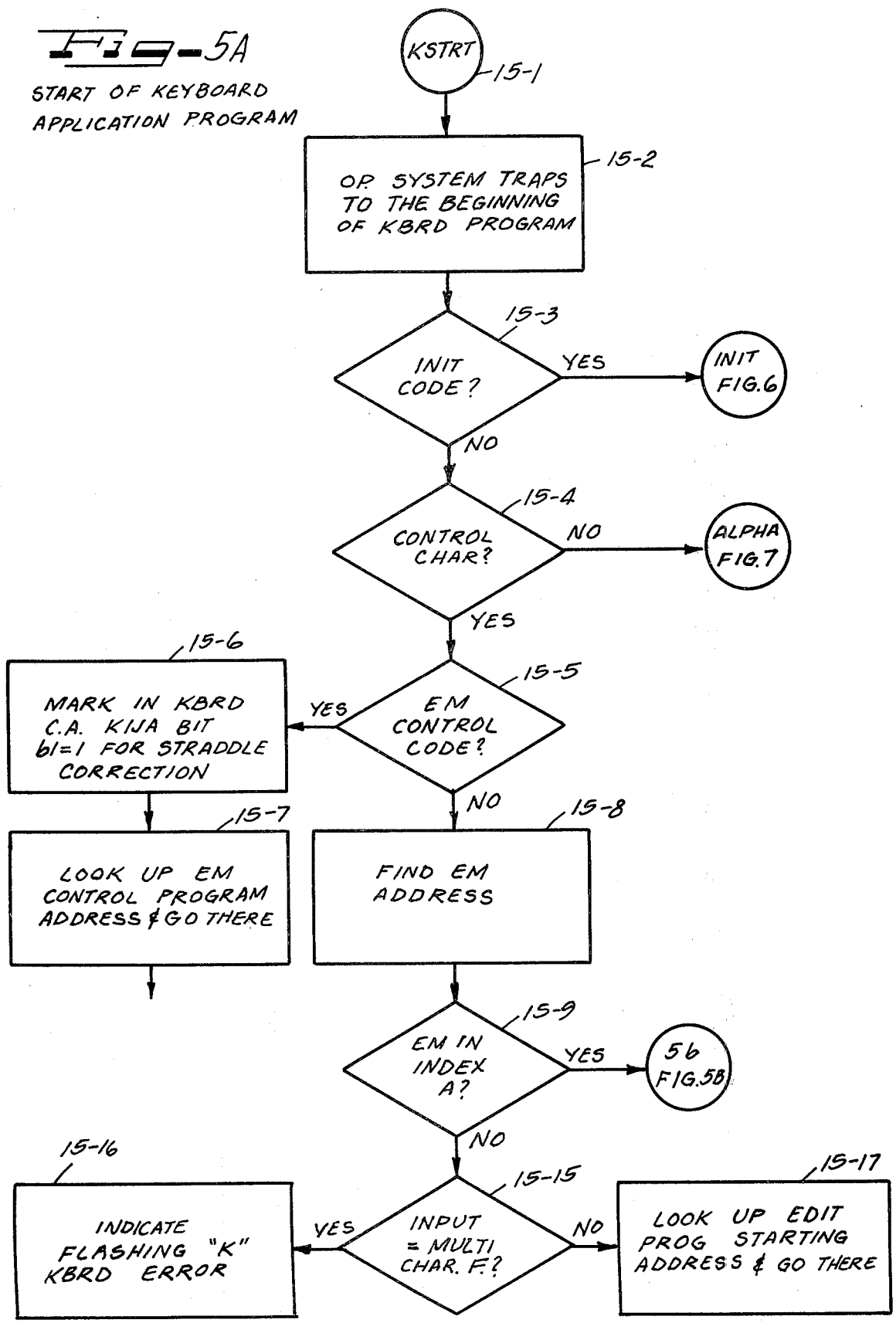
FIG. 5 consisting of FIGS. 5A and 5B is a flow diagram showing exemplary processing steps in a Start of Keyboard Application Program for the system of FIG. 4.
Figure 6B:
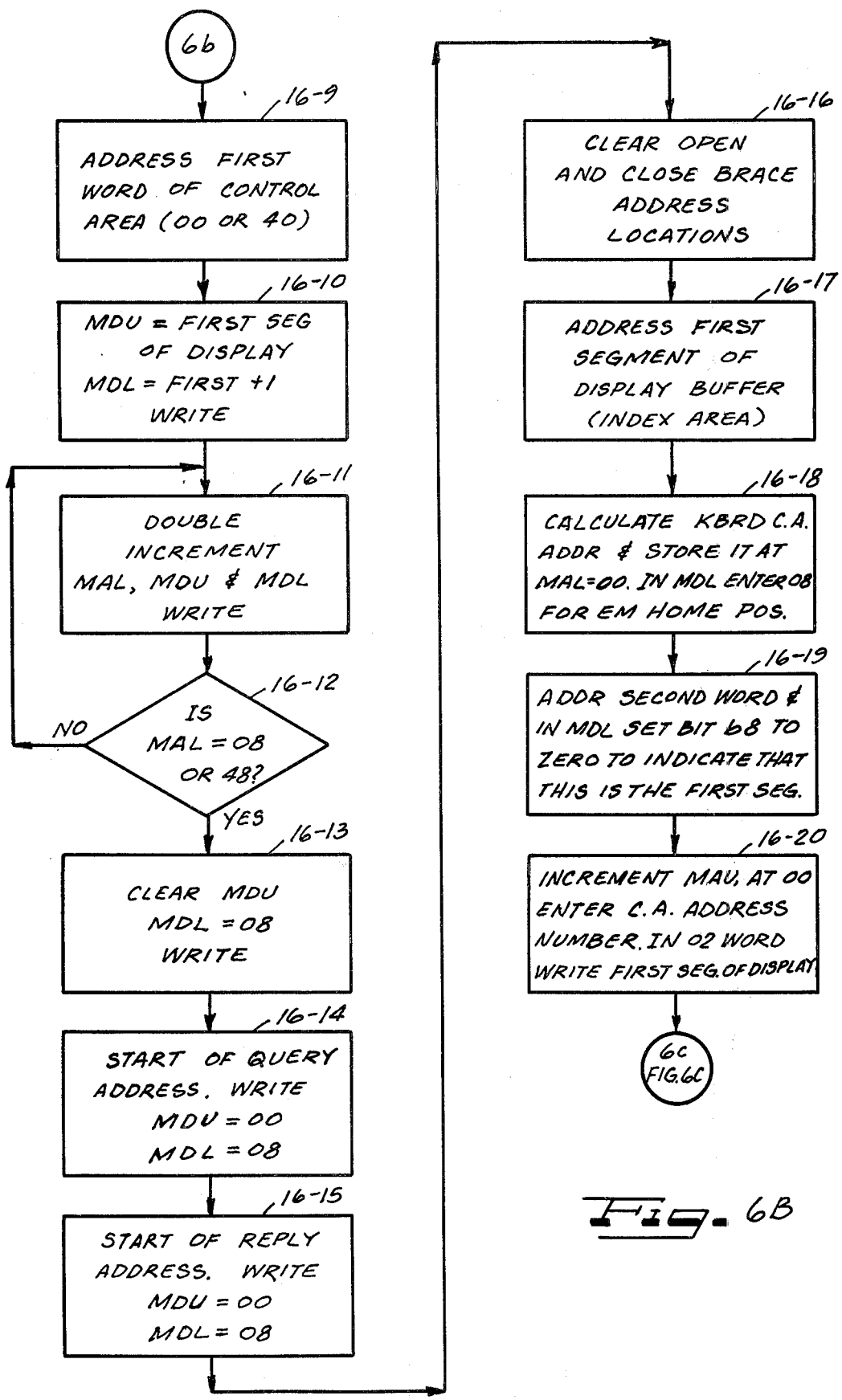
FIG. 6 consisting of FIGS. 6A, 6B and 6C is a flow diagram illustrating exemplary processing steps in an Initialization Program for the system of FIG. 4.
Figure 6C:
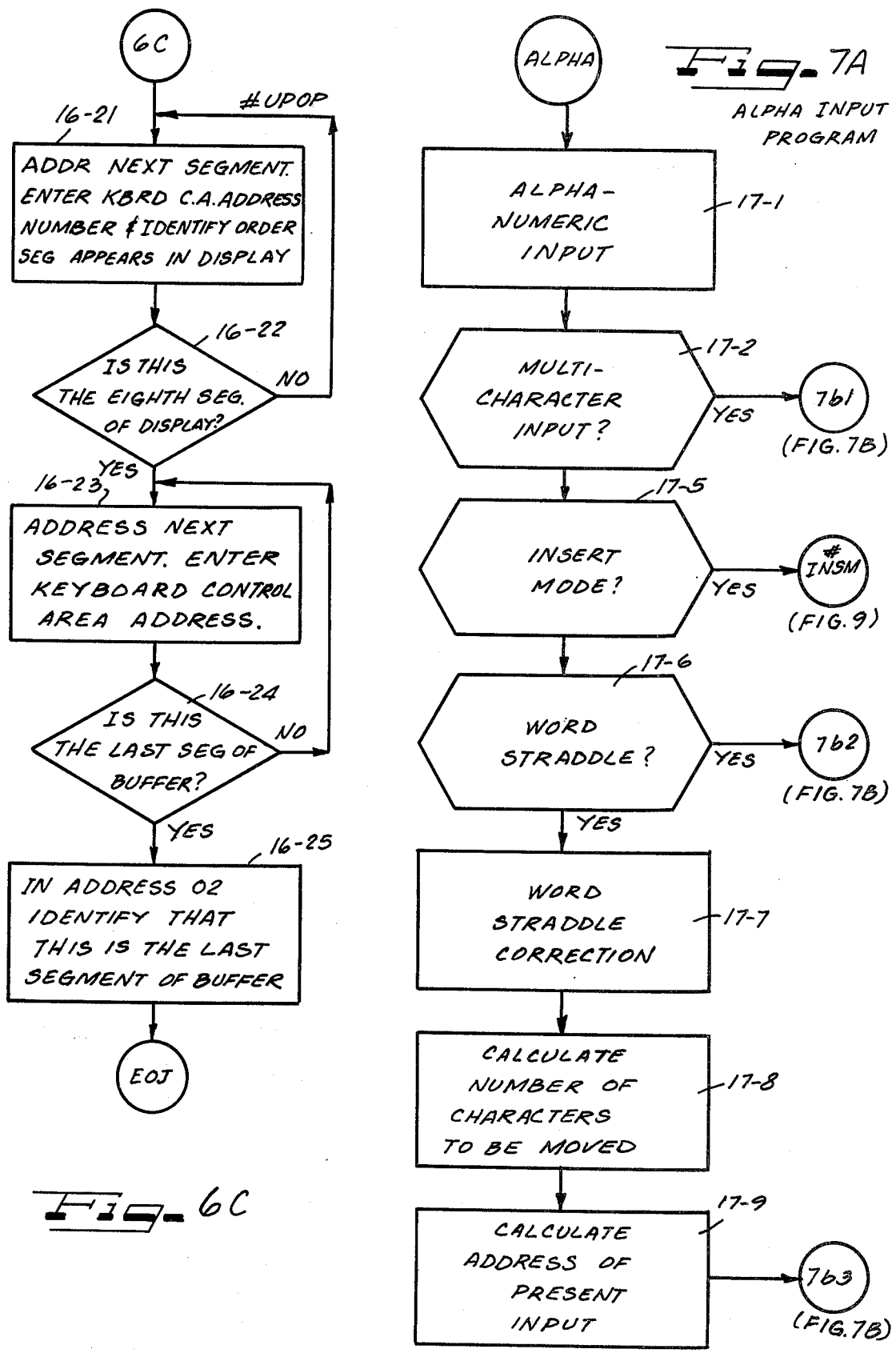

The present disclosure is particularly concerned with the interrelationships of an editor terminal such as indicated at 10 with a control unit such as indicated at 11. As exemplary background, however, an overall news retrieval system is illustrated in FIG. 1 and will be generally described in the following section.

FIG. 1

FIG. 1 is a block diagram which shows the relationship of an edit station 12 and its equipment to a central processor site 14. At the central processor complex 14, a new ticker may be received via a communication line 15, and its information is stored for later retrieval by an editor at the edit station 12. The editor can access a news item which has been stored in the central processor complex 14 by initiating a request at his input/output terminal such as editor terminal 10. With the news item presented on the terminal's display, the editor can review, and if necessary, modify the story and return it to the central processor complex 14 for storage; or he may delete it from the storage entirely.

With the use of the equipment provided at the edit station such as 10, there is a wide ranging facility to enter stories into the data base and to update it by additions, deletions, and modifications to resident news items.

Edited stories are broadcast from the central processor site 14 to distributors' systems via communications lines such as indicated at 18. From such distributors' systems, the edited stories are then made available to subscribers to the system.

The scope of this disclosure deals with the edit station 12 including the keyboard and display device of the editor terminal 10, and the control unit 11, with its special requirements relating to the keyboard operation, display and communications.

The illustrated edit station 12 consists of two control units 11 and 21 and eight I-O terminals 10, 22-24, and 31-34. Communication between the edit station 12 and the central processor site 14 may be via a single dedicated private line data circuit such as indicated at 38. A dial-up facility for fall-back is indicated at 39.

The control units 11 and 21 provide the storage required for a number of editor terminals, along with the required logic and program controls for operating the terminals as well as conducting communications to and from the central processor site 14.

An editor terminal such as terminal 10 includes a cathode ray tube display unit in conjunction with an alpha-numeric keyboard. By the use of the keyboard and its display, an editor can call up a story (or associated headlines) from the data bank, perform the various editorial functions, and enter it back into the data bank. Alternatively, he may, under control from the central processor site 14, enter news items (which are originated from hard copy) into the data bank.

The communications equipment may include a medium speed data set 41 which can be used by both control units 11 and 21 via a sharing device 42. An adaptor is indicated at 43 for permitting alternative communication via the dial-up circuits 44 and 45 of facility 39.

By way of example, the display unit of each of the editor terminals such as 10 may be implemented by a Bunker Ramo model 2217 monitor. The display format may be 24 lines of forty characters per line. (Terminal 10 is shown in FIG. 3.)

For each terminal such as terminal 10, there is a dedicated buffer within the control unit 11 such that the control unit may accommodate three editor terminals and one auxiliary terminal.

The buffer allocated to an editor terminal such as 10 will have the capacity for the equivalent of one-hundred lines of display of forty characters per line. The display limit for each terminal is ninety-nine lines with the remaining line in the buffer reserved for non-display data. The buffer allocated for the auxiliary terminal such as 24 may accommodate 24 lines of display of forty characters per line.

Line numbers one, two and three of an editor terminal display are used to enter and display index-associated information. This is referred to as the Index area. Line numbers four through twenty-four inclusive are used to display and enter text information including headlines, and are referred to as the Edit area. In each of the two areas, there is a Home position which is defined as the first character of the first line of the area. The Edit area extends from line number four of the buffer to the limit of the buffer.

On line number one, the character position which immediately precedes the Home position is referred to as the Status Character. Entry into this location is by the control unit such as 11 only; i.e., not from a keyboard. Status Characters are blinked in order to gain attention, and their interpretation is as follows:

a. T - Transmit. The transmission of a message originating at the terminal has been made. Entries from that keyboard are inhibited until a response has been received. The T status continues to be displayed until a response is received, or, for the duration of a time delay of ten seconds if a response is not received.

b. E - Error. This status indicates the detection of a message parity error in a message which is addressed to the terminal. It continues to be displayed until the first keyboard entry is made following its posting.

c. Z - Timeout. This status indicates that the ten second time delay has expired without having received a response to the transmission of a message from the terminal. It continues to be displayed until the first keyboard entry is made following its posting.

d. I - Insert. This status indicates that the terminal is in the Insert mode.

e. O - Overflow. This status indicates that the terminal's buffer limit has been reached either by keyboard entry or by receiving an excessively long message.

f. K - Keyboard Entry Error. This status indicates that a faulty operation has been attempted with respect to certain keyboard operations.

g. C - Communications Control Field Error. This status indicates that the received message contained a parity error in one of the characters of the Communications Control Field. The C status indicator takes precedence over an E status indicator.

On line number one, the seven character positions numbers thirty-four through forty inclusive are referred to as the Processor Control Field (PCF). Entry into these locations is inhibited from the keyboard and is limited to data received from the control unit such as 11. The PCF is used to display operational information received from the control unit. These include ACK, or REJ with an accompanying code to indicate the cause of the Reject. The prevention of a keyboard entry into this field is due to the establishment of a protected area by the message as received from the control unit.

The control units 11 and 21 are general-purpose control units which, in the illustrated arrangement, perform the unique internal edit functions associated with the keyboard operation as well as the communications to and from the central processor site 14. The control unit 11 has substantial similarity to the Bunker Ramo MDS-7 control unit, but with its own unique program, input-/output configuration, and communications as required for the illustrated system. By way of background, pertinent excerpts pertaining to the prior art MDS-7 control unit are found in Appendix A of the present specification. Appendix A is taken from the Technical Manual, TM-352, volume 1, disclosing the Programmable Control Unit (PCU) of the Market Decision System 7, Communications and Quotation System, of the Bunker Ramo Corporation.

The edit station 12 communicates with the Central Processor Site 14 via communications channel 38 which may be operated synchronous in a full-duplex mode. The communications circuit 38 may be a dedicated private line voice grade telephone circuit with data sets 41 and 48 being of a type available from Bunker Ramo Corporation. For back-up purposes, a dial-up facility 39 may be provided utilizing adaptors such as indicated at 43 and 49.

The character structure for all communications to and from the control units 11 and 21 may be according to the standard as published in USAS X3.16-1966. Codes may conform to an ASCII character set.

Since the details of the communication between the central processor site 14 and the edit station 12 form no part of the present invention, further details are given by way of background in Appendix B to the present specification.

In the discussion which follows specific reference will be made to terminal 10 and control unit 11 only, for brevity; however, it will be understood that the remarks will apply to the other edit terminals and to the control unit 21.

AVAILABILITY OF PRIOR ART BACKGROUND MATERIAL

As noted above, pertinent excerpts pertaining to the prior art MDS-7 control unit are found in Appendix A of the present specification. The titles in Appendix A are followed by page numbers in square brackets, these page numbers referring to the pages of the patent application Ser. No. 538,201 filed Jan. 2, 1975 where a more complete version of the Technical Manual, TM-352, volume 1, disclosing the Programmable Control Unit (PCU) of the Market Decision System 7 of the Bunker Ramo Corporation is to be found. References are included herein to pages of the more complete Appendix A as filed with the parent application, where such pages contain block diagrams or the like which are not properly includable in Appendix A of the present case.

FIG. 2

FIG. 2 is a diagrammatic showing of the keyboard layout for the keyboards associated with editor terminals such as terminal 10 of FIG. 1. The full complement of alpha-numeric characters including standard punctuation marks are provided in the typewriter section indicated at 60. The shift control keys or mode control keys 61 and 62 operate as they do on a typewriter; i.e., lower case in the non-shift mode, upper case (alpha caps) in the shifted mode.

Located above the alpha-numeric section of the keyboard is a cluster of 16 keys 64 used for entry of various function control characters during the preparation of messages to the control unit 11.

The transmit key 66 is used to initiate the transmit function of the control unit following the entry of data such as a query request or the entry of a news story.

The remaining keys are used to assist the editor in preparing messages prior to their transmission to the control unit 11. In essence, the operation of these keys initiate programmatic functions within the control unit 11 relating to the manipulation of data within the buffer of the editor terminal.

The keyboard generated codes are based on the ASCII character code set. The alpha-numerics in the typewriter section 60 generate codes as given in columns two through seven of Table 1A shown on the following page.

TABLE 1A

CHART ILLUSTRATING THE CODING OF ALPHANUMERIC CHARACTERS FOR THE KEYBOARD SHOWN IN FIG. 2

| B8 → | | 0 0 | 0 | 0 | 0 | 0 | 0 | 0 |
|---|---|---|---|---|---|---|---|---|
| B7 → | | o o | o | o | 1 | 1 | 1 | 1 |
| B6 → | | o o | 1 | 1 | o | o | 1 | 1 |
| B5 → | | o 1 | o | 1 | o | 1 | o | 1 |
| BBBB | COL | | | | | | | |
| | → 0 1 | 2 | 3 | 4 | 5 | 6 | 7 |
| 4321 ROW ↓ | | | | | | | | |
| oooo | 0 | space + | 0 | @ | P + | \ + | p |
| ooo1 | 1 | ! + | 1 | A + | Q + | a | q |
| oo1o | 2 | " + | 2 | B + | R + | b | r |
| oo11 | 3 | # + | 3 | C + | S + | c | s |
| o1oo | 4 | $ + | 4 | D + | T + | d | t |
| o1o1 | 5 | % + | 5 | E + | U + | e | u |
| o11o | 6 | & + | 6 | F + | V + | f | v |
| o111 | 7 | ' + | 7 | G + | W + | g | w |
| 1ooo | 8 | ( + | 8 | H + | X + | h | x |
| 1oo1 | 9 | ) + | 9 | I + | Y + | i | y |
| 1o1o | 10 | * + | : | J + | Z + | j | z |
| 1o11 | 11 | + + | ; | K + | [ * | k | { * |
| 11oo | 12 | , | < + | L + | \ * | l | ! * |
| 11o1 | 13 | – | = + | M + | ] * | m | } * |
| 111o | 14 | . | > + | N + | * | n | ~ * |
| 1111 | 15 | / | ? + | O + | – * | o | DL * |

+ These codes may be generated only in the shift mode. The associated key when operated in the non-shift mode generates the code for a character found in another column of the same row. See FIG. 2 for an identification of the characters so related. Lower case alpha characters are generated by the respective keys in FIG. 2 showing the corresponding alpha cap.

* These symbols are not textual characters but are displayed in response to the indicated codes which may be generated as control codes by keyboard operation.

Referring to Table 1A, binary digits are given at the top of each column which represent the binary digits B8, B7, B6, and B5 in that order from the upper left to the lower right. The binary digits associated with the successive rows at the left of Table 1A represent binary digits B1, B2, B3 and B4, so that each character of Table 1A can be represented by an eight bit binary code with the digit order (from the highest digit position to the lowest digit position) of B8, B7, B6, B5, B4, B2, B1.

The various control keys other than the alpha-numerics of Table 1A have been given reference numerals 66, 71 through 93, and 102 through 117 in FIG. 2, and their binary code representations are tabulated in the Table 1B on the following page.

TABLE 1B

CHART ILLUSTRATING THE CODING OF CONTROL KEYS FOR THE KEYBOARD SHOWN IN FIG. 2

```
B8 →    8 0 0 1        1          1     1      1
B7 →    7 0  0         0          0     1      1
B6 →    6 0  0         0          1     0      0
B5 →    5 0  0         1          0     0      1
BBBB    COL
        → 0    10       11         12    14     15
4321 ROW ↓
```

| BBBB 4321 | COL | 0 | 10 | 11 | 12 | 14 | 15 |
|---|---|---|---|---|---|---|---|
| 0000 | 0 | | CR-LF | | | | |
| 0001 | 1 | | HOME | | DEL CHAR | S1 | |
| 0010 | 2 | | CL | | DEL WORD | RE-ENT | GET BT |
| 0011 | 3 | | EDIT | | DEL REST START | S2 | SGN |
| 0100 | 4 | | TAB | TAB | FIELD END | DEL | |
| 0101 | 5 | | TAB RESET | TAB SET+ | FIELD DEL | | ENT NWS |
| 0110 | 6 | | | | FIELD | KP REQ | |
| 0111 | 7 | | TR | | COMP | RPT | |
| 1000 | 8 | | ST← EM | SC←+ EM | | | GET XPG |
| 1001 | 9 | | ST→ | SC→+ | INS INS | IGN | |
| 1010 | 10 | | | | INS END | | S5 |
| 1011 | 11 | | SCR ↑ (Step) | SCR ↑ (Scan)+ | INS PARA | | S6 |
| 1100 | 12 | | SCR ↓ (Step) EM | SCR ↓ (Scan)+ EM | | | LFT OVR |
| 1101 | 13 | | ST ↑ EM | SC ↑ + EM | MOVE | MOD | |
| 1110 | 14 | | ST ↓ | SC ↓ + | FIELD | | GET NWS |
| 1111 | 15 | | | | | | |

+ This code is generated in the shift mode only. The non-shift code is shown in column 10, the same row.

The various control keys must be described as follows, in the order from left to right and top to bottom as viewed in FIG. 2:

Clear key 71: The pressing of this key causes a clear function of the display area in which the cursor or entry marker symbol resides and positions the cursor in the Home position of that area. If the cursor is in the Index area, then both areas of the visual display as well as the complete buffer is cleared. If the cursor is in the Edit area, only the buffer area being displayed in the Edit area is cleared. The clear function involves setting the affected buffer area to all null except for the following: (i) CCF-1-1 Set to mark, and (ii) CCF-1-7-maintain its previous state. (Note: The operation on CCF-1 is performed only when the total buffer is to be cleared.) If the clear key 71 is depressed within the sequence required to move or delete a field, it will only act to reset the buffer to its original status prior to the start of the sequence and will act to clear the display.

Function control keys 64: These keys are used for entry of function control codes which are appropriate to the type of communications between control units such as 11 and the central processor system CPS of the central processor site 14. These keys are identified as delete key 72, unused keys S1 and S2 designated by reference characters 73 and 74, re-eneter key 75, keep key 76, modify key 77, request repeat key 78, ignore key 79, get Broad Tape key 80, get news key 81, enter news key 82, left over key 83, get extra page key 84, unused keys 85 and 87 designated S5 and S6, and sign key 86.

Field start key 88: This key is used to designate the start of a field of information which is subsequently to be either moved or deleted. The cursor is positioned at the first character of the field. The field start key 88 is depressed and the start-of-field is designated by the cursor position. The cursor is moved to the right by one character position. The start-of-field position is indicated by an open brace symbol.

Field end key 89: This key is used to designate the end of the field of information which is subsequently to be either moved or deleted. The cursor is positioned in the location of the last character of the field. The field end key 89 is depressed and the end-of-field is designated by the cursor position. The cursor is moved to the right by one character position. The end-of-field position is indicated by a close-brace symbol.

Delete field key 90: Following the designation of the field limits, the depression of this key causes the deletion of the field. All data which follows the deleted field is left justified with the provision that a word does not straddle two lines. Left justification of the text is performed to the end of a paragraph. If the delete field key 90 is pressed before designating either the start or end of field, an error condition is recognized and the operation is not performed. The display is maintained and a K status character is displayed to indicate an error. The operator may then reset any existing field limit designators, or enter the missing one (s), thus removing the K status and allowing the operation to be re-initiated.

Move field key 91: Following the designation of the field to be moved, the cursor is positioned at the starting location of the destination of the field. With the depression of this key, the field is inserted starting at the cursor location, and is deleted from its original position. Where the field being moved includes data or more than one line, a space code (as shown at column two, row zero of Table 1A, i.e. 0010 0000) is inserted between consecutive words on successive lines. As in the delete field function, left justification of data is accomplished in the text in place of the deleted field to the limits of the paragraph of which it was a part. If the move field key 91 is depressed prior to designating the limits of the field, or the destination is within the limits of the field, an error condition is recognized and is treated as in the case of delete field key 90.

Scroll up and scroll down keys 92 and 93: These keys control the display that is presented to the Edit area of the visual display on the cathode ray tube. When the scroll up key 92 is depressed, all information which is displayed in the Edit area is moved up by three lines. The information which is displayed on lines four, five and six is removed from the display. New information is displayed on lines twenty-two, twenty-three and twenty-four. A reverse function is performed upon depression of the scroll down key 93. These keys are single acting in the non-shift mode and repetitive acting in the shift mode (with key 61 or 62 actuated) to the limits of the buffer area which is associated with the terminal. This means that the respective functions are not effective whenever the buffer limits are being displayed; i.e., when the last line of the buffer is on display line four, on line four in the buffer is being displayed on the twenty-fourth line of the visual display. Whenever the scroll function is used, the top three lines of the display area remain static since this is the Index area of the buffer and is not subject to scrolling. During the scroll functions, the location of the cursor remain static, i.e., the cursor position does not change in the display.

Tab set/reset function key 102: The function of the tab set/reset key is limited to the Edit section of the buffer of control unit 11 and only if the cursor is on line six or beyond. Thus, any tab points which are established by the central processor system in the Index section or the Headline area may not be disturbed by a keyboard action. The set tab function is accomplished by moving the cursor to the character position at which the tab point is to be established. The cursor must be in line six or beyond in the buffer. With the typewriter section in the shift mode, the tab set/reset key 102 is operated. Tab points are set in the cursor position and in the same character location on all succeeding lines to the limit of the buffer. The cursor is not moved as the result of this key stroke. In the reset tab function, the cursor is located on any line (line six or beyond in the buffer), from which it is desired to remove tab points. With the typewriter section in the non-shift mode, the tab set/reset key 102 is operated. All tab points existing in that line, and all succeeding lines to the limit of the buffer, are removed. The cursor is not moved as a result of this key stroke. If the tab set/reset key 102 is operated with the cursor in line numbers one through five of the buffer, a keyboard error (status K) will be posted. With tab points set, all entries are left-justified to the closest tab point. Tab points are subject to movement in conjunction with other data during such keyboard functions as "move field" and "insert". Tab points which are within a delete field boundary will be removed. All tab points are reset as the result of a "clear buffer" operation.

New line key 103: Actuation of this key will shift the cursor to the next line. When tab points have been established, the new line key will move the cursor to the first tab point on the succeeding line. Otherwise the cursor will move to the first character position of the succeeding line.

Step left/scan left key 104: In the non-shift mode depression of this key will relocate the cursor one character position to the left of its initial position. If the cursor is on a tab point, depression of the key will have no effect. When shift key 62 and key 104 are simultaneously pressed, for example by the first two fingers of the left hand of the operator, the cursor is moved to the left at a speed of approximately fifteen characters per second. The cursor may be moved within the Index area and within the Edit area of the display, but the cursor will stop at the home position when within the Edit area, and will not be moved from the Edit area to the Index area as a result of continued operation of this key.

Step right/scan right key 105: This key controls the lateral movement to the right as well as movement from the end of one line to the beginning of the next line of the cursor within the limits of the display. With the use of this key, the cursor may be moved from the Index area to the Edit area. The key is single acting in the non-shift mode and repetitive acting in the shift mode, that is with simultaneous operation of the keyboard shift key 62 and the key 105, for example by the first two fingers of the left hand of the operator. When the cursor is "scanned", it is moved at an approximate rate of fifteen characters per second.

Step-up/scan-up key 106: This key controls the movement of the cursor in the upward direction from line to line within the limits of the display. When the cursor is to be moved, only its line position is changed and its character position within the line is maintained. The key is single acting in the non-shift mode, and repetitive acting in the shift mode wherein both shift key 61 and key 106 are simultaneously depressed for example by the first two fingers of the right hand of the operator. The cursor will stop at the upper line of the Edit area and will not move from the Edit area to the Index area.

Step-down/scan-down key 107: This key controls the movement of the cursor in the downward direction from line to line within the limits of the display. When the cursor is to be moved, only its line position is changed and its character position within the line is maintained. The key is single acting in the non-shift mode and repetitive acting in the shift mode. Keys 61 and 107 may be simultaneously depressed by the first two fingers of the right hand to establish the shift mode. The cursor may be moved from the Index area to the Edit area by means of key 107.

Delete character key 108: The cursor is positioned so as to overlay the character to be deleted. Depressing this key causes the character so designated to be deleted and left justification of the remaining text to the limits of the paragraph.

Delete word key 109: The cursor is positioned over the first character of a word to be deleted. Depressing this key causes all characters within the word and the space following to be deleted and left justification of the remaining text to the limits of the paragraph.

Delete rest key 110: The cursor is positioned over the first character of a word, beyond which the remainder of the test is to be deleted. Depressing this key causes the deletion of text (including the designated word) to the limit of the buffer.

Edit key 111: This key controls the status of the input station as to whether input will be to the Index area or to the Edit area. When depressed, it moves the cursor to the home position of the alternate display area.

Compress key 112: This key is used to eliminate empty lines which occur in the buffer as the result of previous Edit actions which included left justification of text material. Depressing this key causes all such "empty" lines in the buffer to be eliminated. This function is limited to all empty lines in the buffer beyond line five.

Tab key 113: Depressing this key moves the cursor to the next tap point in the buffer. If there are no further tab points within the buffer area being displayed, the cursor is moved to the last display character position (line twenty-four, character location forty).

Insert key 114: This key is used to insert new text between existing portions of text. The cursor is positioned at the location in which the new text is to be inserted; i.e., over the first character of a word. Depressing this key puts the terminal in the insert mode. This is indicated to the editor by the appearance of the character "I" (blinking) in the status character position of the display. New test is entered via the keyboard causing displacement of all text to the right and below the cursor position. The insert mode is terminated normally by depressing the insert key 114 a second time and the "I" status character is removed. During the insert mode, the displacement of existing text includes the maintenance of existing paragraph (s) organization.

Insert end (story end) key 115: This key is used to indicate the limit of the story text. The cursor is positioned in the location immediately following the last story text character. When the key is depressed, the code for overline (01111110) is inserted. An associated symbol is displayed, and the remainder of text in the buffer is also deleted.

Insert paragraph key 16: This key is used to adjust the text with respect to its paragraph organization. The cursor is positioned over the character with which a new paragraph is to be formed. When the key is depressed, an insert function is performed which includes the insertion of null codes (0000 0000) to the end of the line, followed by the insertion of two space codes (0010 0000) which occupy character locations one and two of the succeeding line.

Home key 117: Depressing this key moves the cursor to the home position of the display area in which it then resides. If it is in the Index area, the home position is at line one, character location one of the buffer and the display. If it is in the Edit area, the home position is at line four, character location one of the display, corresponding to character location one of the top line of the buffer which is currently being displayed (since the display may have been scrolled in the upward direction such that line four of the buffer is not currently being displayed).

An important feature of the disclosure resides in the fact that the display storage is adjusted to eliminate any straddle of a word between lines. This can be visualized with the aid of the following Table 2.

TABLE 2

CHART ILLUSTRATING A DISPLAY WITH AUTOMATIC CARRIAGE RETURN-LINE FEED AND OPERATION TO ELIMINATE EXTRANEOUS SPACE CODES AND LINE STRADDLES

| | |
|---|---|
| DL1 | |
| DL2 | |
| DL3 | |
| DL4 | |
| DL5 | NEWS RETRIEVAL SERVICE |
| DL6 | |
| DL10 | With the use of the equipment provided |
| DL11 | an editor may enter a story item direct |
| DL12 | Alternatively, |
| DL13 | |
| DL14 | |
| DL15 | |
| DL16 | |
| DL20 | At the central processor site these (ed) |
| DL21 | edited |
| DL24 | |

DC =  1 5 6  10 11  15 16  20 21  25 26  30 31  35 36  40

Referring to the preceding Table 2, the first three lines of the display, designated DL1, DL2 and DL3, represent the Index area of the display. These three lines are collectively designated segment one. Lines four, five and six which form segment two are designated DL4, DL5 and DL6 and are shown as being used to provide a headline area of the display within the Edit area which extends from line four (DL4) to line twenty-four (DL24). The successive character locations in each line may be designated DC1 through DC40.

A new paragraph is indicated as beginning at line twelve (DL12), character position three (DC3). The carriage return is automatic after the right hand margin of line DL11 is reached, so that the new paragraph will be provided if the operator actuates the space bar 2-10, FIG. 2, the correct number of times, i.e. twice for the illustrative embodiment, after the previous line (DL11) has been completed.

On the other hand, as indicated for line DL10, if the operator only strikes the space bar once after the end of line DL10, the space at first inserted at line DL11, character position DC1, will be deleted and the letter "a" of the word "an" substituted, since the system infers from the lack of a second space code that the left margin is to be maintained and that no space is intended by the operator.

FIG. 3 (ON SHEET 1 OF THE DRAWINGS)

FIG. 3 shows terminal 10 including keyboard unit 10A and display unit 10B. These units may be adapted for the present invention from existing commercial units such as the Bunker Ramo Corporation Model 2206 keyboard and Model 2217 display. These units are components of the Bunker Ramo Data Terminal Systems Series 2200 and thus are fully compatible with other units of this system. Such units include a communications interface or communications controller Model 2228 and a communications control processor or "front end" processor CCP for connecting the data communications network with a conventional central processor.

A preferred pushbutton switch assembly for the keyboard unit 10A is illustrated in U.S. Pat. No. 3,809,838 issued May 7, 1974. A character coder and circuit paths for connecting the pushbutton switches therewith suitable for implementing the coding of the present disclosure as given in Tables 1A and 1B herein will be understood from U.S. Pat. No.3,623,588 issued Nov. 30, 1971 and Patent 3,809,838 both being assigned to the assignee of the present application.

FIG. 3 will serve to show the physical arrangement of keys 62, 104 and 105, and 61, 106 and 107 in respective clusters such that a desired movement of the cursor in scan mode can be readily selected with the first two fingers of the left or right hand of the operator.

A character generator for controlling the generation of characters using a 5×7 matrix of dot or bit positions per character is shown in U.S. Pat. No. 3,587,085 issued June 22, 1971 and assigned to the assignee of the present application. Such a character generator may be operated from a refresh memory system generally similar to that shown in U.S. Pat. No. 3,792,462 issued Feb. 12, 1974 (and assigned to the present assignee. U.S. Pat. No.)3,792,462 refers to U.S. Pat. No. 3,500,327 issued Mar. 10, 1970, also commonly assigned, as showing circuitry for generating characters for a 5×7 matrix of 35 index points, and refers to a commonly assigned Gallagher et al application, U.S. Ser. No. 27, 877 filed Apr. 13, 1970, now U.S. Pat. No. 3,665,406 issued May 23, 1972 as showing with reference to the input-output interface and control unit of said U.S. Pat. No.3,792,462, circuitry generally suitable for generating polled messages and for receiving the poll responses. These prior patents thus are of interest as background along with the prior system shown in detail in Appendix A hereof.

FIG. 4

With respect to the editor input-output terminal 10 as utilized in the news retrieval service system shown in FIG. 1, keyboard 10A, FIG. 3, is of a special design and is wired to provide codes in response to actuation of the respective keys so as to select functions which are the subject of the features to be summarized hereinafter. In the illustrated embodiment, the functions are to be implemented by means of processing unit 4-10 and display components 4-11, 4-12 and 4-14, operating in conjunction with the control areas and buffer areas of main memory 4-15, FIG. 4. While the sequencing of the units of FIG. 4 may be by means of clock pulse counting circuits and gates, or by means of a combination of such circuitry with stored programming, FIGS. 5-19 have been specifically implemented by means of a stored program, and such stored program operation of FIG. 4 is given by way of exemplary embodiment herein. In implementing the features of the present disclosure, main memory 4-15 is provided with display buffer sections 4-21, 4-22, 4-23 and 4-24 for storing the coded character-representing display data for the respective visual displays such as 10B and which are designated D1, D2, D3 and D4. In a particular system in accordance with the present invention, the memory 4-15 is provided with three one-hundred line display buffers 4-21, 4-22 and 4-23 so as to provide effective editing functions at three editor terminals such as those designated 10, 22 and 23 in FIGS. 1 and 4. Thus the control unit 11 of FIG. 1 is represented by components 4-10, 4-11, 4-12, 4-14 and 4-15 of FIG. 4, along with an input-output unit 4-16. The input-output unit may be of conventional construction, and to provide background in this respect, reference is made to the attached Appendix A, (pages 589 and 591), and to the Appendix A as filed in the parent application Ser. No. 538,201 (pages 589-595).

The display device of FIG. 4 may be taken as comprising display data buffer 4-11 and entry marker buffer 4-12. The display data buffer is explained at page 578. As will be understood by those skilled in the art, the memory data to be entered into the display data buffer 4-11 is addressed via data address signals supplied via line 4-30 from an address control 4-31 associated with buffer 4-11. Referring to Appendix A, the signals supplied at line 4-30 are designated MADU1-MADU8. The components included within address control 4-31 are indicated at page 571 of Appendix A of the parent application as filed. The transfer of segment pointers from section 4-35 of memory 4-15 to the data display buffer and then to the address control buffer of address control 4-31 is analogous to that described in Appendix A, for example at page 577. A Keyboard Control Area Map is given in Part X, Section A of the program listing given by way of example herein. This map illustrates the location of the addresses of the indicated segments, and indicates that one device might have the addresses of the segments for display thereon located at relative addresses (hexadecimal) of 00, 02, 04 and 06. Another device, or more particularly the even numbered devices such as D2 and D4 would have the addresses of the successive segments located at relative addresses (hexadecimal) of 40, 42, 44 and 46. This if display device D1 has the address of its segments one and two at location 0400 (hexadecimal), then device D2 would have the address of its segment one and two at 0440 (hexadecimal). Similarly, display device D3 would have the address of its segments one and two 0500 (hexadecimal), and device D4 would have the address of its segment one and two at 0540 (hexadecimal). With the arrangement indicated by the Keyboard Control Area Map, the address of segments three and four of device D1 would then be found at 0402, and the address of the corresponding segments of device D2 would be found at 0442 (hexadecimal). The Keyboard Control Area Map of Part X, Section A, refers to memory locations in Keyboard Section 4-35 of main memory 4-15, the addresses in this Keyboard Control Section extending, for example, from 0400 (hexadecimal) to 1000 (hexadecimal).

The following Tables 3 and 4 will illustrate the addresses in Section 4-35 for the segment pointers which are loaded into display data buffer 4-11, and the status character codes and entry marker numbers which are loaded into the entry marker buffer 4-12.

TABLE 3

KEYBOARD CONTROL AREA MAP

| DISPLAY DEVICE | HEXADECIMAL ADDRESS OF CONTROL WORD IN KEYBOARD CONTROL AREA 4-35 | BYTE | SEGMENT ADDRESSES FOR DATA IN DISPLAY BUFFER 4-22 TO BE DISPLAYED |
|---|---|---|---|
| D1 | 0400 | Upper | PTRD1S1(8bits)* |
|    |      | Lower | PTRD1S2(8 bits) |
| D1 | 0402 | Upper | PTRD1S3(8 bits) |
|    |      | Lower | PTRD1S4(8 bits) |
| D1 | 0404 | Upper | PTRD1S5(8 bits) |
|    |      | Lower | PTRD1S6(8 bits) |
| D1 | 0406 | Upper | PTRD1S7(8 bits) |
|    |      | Lower | PTRD1S8(8 bits) |
| D2 | 0440 | Upper | PTRD2S1(8 bits) |
|    |      | Lower | PTRD2S2(8 bits) |
| D2 | 0442 | Upper | PTRD2S3(8 bits) |
|    |      | Lower | PTRD2S4(8 bits) |

*eight bit address of segment (one of thirty-three) in Display Buffer 4-21 to be displayed in first display segment of display D1 (one of four). For example for D1, if the fourth display line is at the twenty-third segment then PTR D1 S2 would read 26 (hexadecimal) assuming segment one of the buffer has an address PTRD1S1 of 10 (hexadecimal).

Table 4

KEYBOARD CONTROL AREA MAP
(Status Character Code and Entry Marker Address)

| DISPLAY DEVICE | HEXA-DECIMAL ADDRESS IN KEYBOARD CONTROL AREA 4-35 | BYTE | CODE BIT NOS. | INFORMATION |
|---|---|---|---|---|
| D1 | 0408 | Upper | B8-B4 | Status Character * |
|    |      | Upper | B3-B1 | Segment Number (one of eight being displayed) |
|    |      | Lower | b7-b1 | Entry Marker character location (one of 128) in segment number B3-B1 being displayed. |
| D2 | 0448 | Upper | B8-B4 | Status character |

* Status Characters are T(Transmit), E(error), K(keyboard), etc.

The character generator circuits components 4-14 may comprise two character generator modules such as described in Appendix A at page 580.

The remaining components shown in FIG. 4 may be designated by letter characters as indicated, the code assignments for the registers and memory units in the exemplary program being summarized in the following table.

TABLE 5

CODE ASSIGNMENTS FOR REGISTERS (REG) AND MEMORY UNITS OF FIG. 4

| Input | | Code Assignment Binary | Hex |
|---|---|---|---|
| A | REG | 0001 | 1 |
| G | REG | 0010 | 2 |
| MAL | REG | 0011 | 3 |
| MAU | REG | 0100 | 4 |
| MDL | REG | 0101 | 5 |
| MDU | REG | 0110 | 6 |
| PL | REG | 0111 | 7 |
| PU | REG | 1000 | 8 |
| S Memory | | 1001 | 9 |
| UA | REG | 1010 | A |
| U Memory | | 1011 | B |
| PR1 | | 1110 | E |
| PR2 | | 1111 | F |

In the embodiment of FIG. 4 processing unit 4–10 has nine registers as given in Table 5 which are connected to the input (M) bus. Six of the registers (A, G, MAL, MAU, MDL, MDU) are general purpose registers which may be used to contain data or addresses during processing. The remaining four registers (PU, PL, UA, UI) are special purpose registers, and are used to store either addresses or instructions necessary to the execution of the program such as that given in Parts I through XIII hereof. The phantom registers, PR1 and PR2, are not used to transfer data but are used as status indicators, and are not specifically shown in FIG. 4.

The buses control the movement and manipulation of data within the processing unit 4–10. The input (M) bus can accept data from one of sixteen different sources and transfer that data to the arithmetic and logic unit (ALU) or the L bus. The output (L)bus can accept data from one of eight different sources and transfer the data to one of ten different registers. The auxiliary bus (not shown in FIG. 4) provides a path for the extra four bits of a 12 bit word being transferred.

The registers of FIG. 4 may conform with those described beginning at page 498 of Appendix A.

In the execution of a program such as found at Parts I through XIII hereof, instructions are fetched from the system program memory (S-memory), as addressed by the program counter (PU and PL). As each instruction is encountered, it is fetched from S-memory and loaded into the micro-program counter, UA. If the instruction is a single step, it will consist of a single micro-order code. In this case it will be loaded from the UA register into the micro-order register UI, and be fed to the inputs of the micro-order decoder. The outputs of the decoder are used to establish the states of the control logic throughout the processing unit 4–10 during execution of the micro-order. When a macro instruction is to be executed, the memory location in S-memory will contain a U-memory address instead of a micro-order code. The U-memory address is the address of the first micro-order in a sequence, and it is fetched from the location in S-memory, pointed to by PU and PL, and loaded into the UA register.

The contents of UA are used to address the U-memory location, and the first micro-order is loaded from U-memory into the UI register for execution. At this point, the micro-program counter UA is incremented, in order to address the next sequential memory location; and the next micro-order is fetched from U-memory and loaded into the UI register. The fetch and execute sequencing proceeds in this manner as each micro-order is accessed. The last micro-order of the sequence fetched from U-memory will have the 12-bit marked. This micro-order is loaded into the UI register, the next instruction from S-memory is loaded into the UA register, the system program counter (PU and PL) is incremented to address the next S-memory instruction, and a S-memory recycle is started thereby providing another instruction waiting at the input to the UA register. The details of the micro-order code structure used in the exemplary program is found beginning at page 459.

The macro instructions utilized in the illustrative program are found beginning at page 469.

Further details concerning the processing unit and its components is found in Appendix A beginning at page 506.

Referring to the exemplary program listing given herein, Parts I through XII are to be stored in S-memory of FIG. 4 while Part XIII is the micro-program for U-memory of FIG. 4. The various parts of the program listing are tabulated in the following Table 6. A first division of Table 6 itemizes parts of the program listing for storage in S-memory and is designated Table 6A. A second division gives the location of U-memory programs and is designated Table 6B. Table 6C is a tabulation of symbolic instruction words in alphabetical order for the micro-program in U-memory. The micro-program is explained in detail in Appendix A under the heading "Microprogramming".

TABLE 6

IDENTIFICATION OF THE PARTS OF THE EXEMPLARY PROGRAM LISTING FORMING PART OF THIS SPECIFICATION

Table 6A:

| Part | Starting Address in S-Memory (Hexadecimal) | | Program Identification (With Reference to Related Drawing Figures where Appropriate) |
|---|---|---|---|
| | PU | PL | |
| I | 000 | 000 | List of Indirect Jump Address and Miscellaneous Routines for the Operating System of Processing Unit 4-10, FIG. 4. |
| II | 000 | 032 | Input Output Service Programs for the Operating System of Processing Unit 4-10, FIG. 4. |
| III | 000 | 0D9 | Job Control Program for the Operating System of Processing Unit 4-10, FIG. 4. |
| IV | 002 | 080 | Exemplary Input Output Control Table (IOCT, FIG. 4) |
| V | 003 | 000 | Communication Loader for Control Unit 11, FIGS. 1 and 4. |
| VI | 004 | 000 | Real Time Clock Programs for the Real Time Clock of Input Output Unit 4-16, FIG. 4. (See Appendix A, page .) |
| VII | 004 | 08F | Initialization program for Control Unit 11, FIGS. 1 and 4. |
| VIII | 006 | 02A | Keyboard Programs for Editor Terminals such as 10, FIGS. 1-4. |
| VIIIA | 006 | 02A | Insert Data Mode (FIG. 9) |
| VIIIB | 007 | 075 | Insert Paragraph (FIG. 10) |

TABLE 6-continued
IDENTIFICATION OF THE PARTS OF THE EXEMPLARY PROGRAM LISTING FORMING PART OF THIS SPECIFICATION

| | | | |
|---|---|---|---|
| VIIIC | 008 | 011 | Delete Word |
| VIIID | 008 | 069 | Delete Character (FIG. 15) |
| VIIIE | 008 | 080 | Delete Field (FIG. 14) |
| VIIIF | 00A | 000 | Set Reset Tabs |
| VIIIG | 00A | 083 | Set Reset Insert Mode |
| VIIIH | 00B | 000 | Clear (FIG. 18) |
| IX | 010 | 000 | Receive Program for Control Unit 11, FIGS. 1 and 4. |
| X | 017 | 000 | Keyboard Input-Alpha-Initialization Program (FIG. 5) |
| XA | | | Keyboard Control Area Map for keyboard control section 4-35, FIG. 4. |
| XB | 017 | 000 | Start of Keyboard Program for Editor Terminals Such as 10, FIGS. 1-4. |
| XC | 018 | 00C | Alpha Numeric Input (FIG. 7) |
| XD | 019 | 029 | Initialize Keyboard Storage (FIG. 6) |
| XI | 01A | 000 | Keyboard Edit Programs for Editor Terminals such as 10, FIGS. 1-4. |
| XIA | 01A | 000 | Step Entry Marker Right |
| XIB | 01A | 014 | Step Entry Marker Left |
| XIC | 01A | 030 | Scroll Data Up In Scan Mode (FIG. 16) |
| XID | 01A | 042 | Scroll Data Up In Step Mode (FIG. 16) |
| XIE | 01A | 091 | Scroll Data Down In Scan Mode (FIG. 17) |
| XIF | 01A | 0A3 | Scroll Data Down In Step Mode (FIG. 17) |
| XIG | 01A | 0FF | Scan Entry Marker Up |
| XIH | 01B | 012 | Step Entry Marker Up |
| XII | 01B | 064 | Scan Entry Marker Down |
| XIJ | 01B | 076 | Step Entry Marker Down |
| XIK | 01B | 0A4 | Home Entry Marker |
| XIL | 01B | 0F1 | Edit Entry Marker Program |
| XIM | 01C | 020 | Start-End Field (FIG. 13) |
| XIN | 01C | 082 | Transmit key (FIG. 19) |
| XIO | 01D | 000 | Tab Program |
| XIP | 01D | 05A | Delete Rest |
| XIQ | 01D | 060 | Story End |
| XIR | 010 | 06E | Carriage Return-Line Feed |
| XIS | 01E | 000 | Compress Data (FIG. 12) |
| XIT | 01F | 000 | Line Straddle Subroutine (FIG. 11). |
| XII | 020 | 010 | Transmit Program |

Table 6B:

| | |
|---|---|
| Starting Address of Microprogram in U Memory (hexadecimal) | Program XIII Identification (See Appendix A for Flow Diagrams and Instruction Lists) |
| UA | |
| 000 | Control Panel Program |
| 090 | Bootstrap Loader Program |
| 11C | Macro Routines |
| 325 | General Purpose Instructions |

Table 6C:
Alphabetical Listing of Micro-Order Mneumonic Symbols and Macro Instruction Symbols together with their Hexadecimal Codes and which codes are found in Numerical Order in Table 6B. (See Appendix A of the parent application as filed for further Information.)

Particularly to facilitate an understanding of the flow diagrams of FIGS. 5-19, the following Tables 7 through 10 are provided. Tables 7A and 7B (together constituting Table 7) show details of the Keyboard Control Area located in section 4-35 of main memory 4-15 of FIG. 4. Table 8 gives further detail on location 10 of Tables 7A and 7B. Table 9 gives a map of the operating segment control area. The operating segment control area for the buffer 4-21 of Display D 1 is generally indicated at 4-36 in FIG. 4 and has word addresses 00, 02, 04 and 06 in segments $10_H$ through $30_H$, the successive bytes being designated 00, 01, 02, 03, 04-07 (and the successive segments being designated 1-33, decimal, on the drawing of FIG. 4).

In the following Table 7, the word addresses given at the left are in hexadecimal notation. (Hexadecimal notation is designated by a subscript H within the body of the Tables.). The example of segment addresses entered at 0400 through 0406 in Table 7 corresponds to the initial condition as established by the Program of FIG. 6.

The following Table 10 gives the meaning of abbreviations used in the Tables and/or flow diagrams, and generally indicates at least the Table or Figure where an abbreviation is first used.

TABLE 7A
ARRANGEMENT OF THE KEYBOARD CONTROL TABLE FOR KEYBOARD #1
(SEGMENT ADDRESS: MAU = 04)

| WORD ADDR (MAL =) | UPPER BYTE (B8throughB1) | LOWER BYTE (b8 through b1) |
|---|---|---|
| 0 0 | SEG 1(e.g.$10_H$) | SEG 2(e.g. $11_H$) |
| 0 2 | SEG 3(e.g. $12_H$) | SEG 4(e.g. $13_H$) |
| 0 4 | SEG 5(e.g. $14_H$) | SEG 6(e.g. $15_H$) |
| 0 6 | SEG 7(e.g. $16_H$) | SEG 8(e.g. $17_H$) |
| 0 8 | INDICATOR EM CHARACTER SEG (B8-B4) (B3-B1) | ENTRY MARKER ADDRESS(e.g. $08_H$) (b8-b1) |
| 0 A | 1 KBRD INDIRECT JUMP ADDRESS (B8 = OPEN BRACE B7 = CLOSE BRACE) | (b1 = EM OP LAST) |
| 0 C | SPARE | FI CHARACTER |
| 0 E | XMIT PORT ADDRESS | INDICATOR BITS |
| 1 0 | IOS STATUS WORD(U) | IOS STATUS WORD(L) |
| 1 2 | IOS TWO BYTE | BUFFER |
| 1 6 | START OF QUERY ADDRESS | |
| 1 8 | START OF REPLY ADDRESS | |
| 3 0 | ADDR OF FIRST SEGMENT OF DISPLAY BUFFER (i.e. $10_H$) | ADDR OF LAST DATA SEGMENT OF BUFFER (i.e. $30_H$) |
| 2 8 | OPEN BRACE ADDRESS | |
| 2 A | CLOSE BRACE ADDRESS | |

TABLE 7B

ARRANGEMENT OF THE KEYBOARD CONTROL TABLE FOR KEYBOARD #2 (SEGMENT ADDRESS: MAU = o4)

| | | |
|---|---|---|
| 4 0 | SEG 1(e.g.32$_H$) | SEG 2 (e.g. 33$_H$) |
| 4 2 | SEG 3(e.g.34$_H$) | SEG 4(e.g.35$_H$) |
| 4 4 | SEG 5(e.g.36$_H$) | SEG 6(e.g.37$_H$) |
| 4 6 | SEG 7(e.g.38$_H$) | SEG 8(e.g.39$_H$) |
| 4 8 | INDICATOR EM CHARACTER SEG (B8-B4) (B3-B1) | ENTRY MARKER ADDRESS(e.g.08$_H$) (b8-b1) |
| 4 A | 1 KBRD INDIRECT JUMP ADDRESS (B8 = OPEN BRACE B7 = CLOSE BRACE) | (b1 = EM OP LAST) |
| 4 C | SPARE | FI CHARACTER INDICATOR BITS |
| 4 E | XMIT PORT ADDRESS | |
| 5 0 | IOS STATUS WORD | |
| 5 2 | IOS TWO BYTE BUFFER | |
| 5 6 | START OF QUERY ADDRESS | |
| 5 8 | START OF REPLY ADDRESS | |
| : | | |
| 6 8 | OPEN BRACE ADDRESS | |
| 6 A | CLOSE BRACE ADDRESS | |
| 7 0 | ADDR OF FIRST SEGMENT OF DISPLAY BUFFER (i.e. 32$_H$) | ADDR OF LAST DATA SEGMENT OF DISPLAY BUFFER (i.e. 52$_H$) |

TABLE 8

ARRANGEMENT OF IOS STATUS WORD BUFFER FOR KEYBOARD NO. 1 (WORD ADDRESS 0410)

| UPPER BYTE | | | | LOWER BYTE | | |
|---|---|---|---|---|---|---|
| END OF MES- SAGE | OVER FLOW | USER POINTER | AC- TIVE | IN OUT | FORE- GRD. | IOS POINT- ER |
| BIT (B8) | BIT (B7) | BITS (B6–B1) | BIT (b8) | BIT (b7) | BIT (b6) | BITS (b5–b1) |

TABLE 9

MAP OF OPERATING SEGMENT CONTROL AREA AND CHARACTER STORAGE LOCATIONS FOR DISPLAY D 1 (SEGMENT ADDRESSES MAU = 10$_H$ THROUGH MAU = 30$_H$)

| WORD ADDR (MAL) | UPPER BYTE (B8 through B1) | LOWER BYTE (b8 through b1) |
|---|---|---|
| 00 | CONTROL AREA SEG ADDR NUMBER PTR (B8-B4) (B3-B1) | ENTRY MARKER MAL |
| 02 | TEMPORARY STORAGE OF START FIELD ADDR | First Seg. (b8) Last Seg. (b7) Index Seg. (b6) |
| 04 | TEMP STORAGE OF END FIELD ADDR | INDEX COUNTER FOR LINE STRADDLE CORRECTION |
| 06 | TEMPORARY STORAGE FOR DESTINATION ADDRESS FOR STRADDLE CORRECTION | |
| 08 | DISPLAY CHAR 1 | DISPLAY CHAR 2 |
| 0A | DISPLAY CHAR 3 | DISPLAY CHAR 4 |
| : | | |
| 7E | DISPLAY CHAR 119 | DISPLAY CHAR 120 |

TABLE 10A

LIST OF ABBREVIATIONS AND THEIR MEANING AS USED IN TABLE 1B and FIG. 2

| Abbreviation | Meaning and Reference Character (where applicable) |
|---|---|
| CR-LR | Carriage Return-Line Feed |
| CL | Clear (71) |
| TR | Transmit (66) |
| EMST | Entry Marker Step |
| SCR | Scroll |
| EMSC | Entry Marker Scan |
| DEL CHAR | Delete Character (108) |
| DEL WORD | Delete Word (109) |
| DEL REST | Delete Rest (110) |
| DEL FIELD | Delete Field (90) |
| COMP | Compress (112) |
| INS | Insert (114) |
| INS PARA | Insert Paragraph (116) |
| RE-ENT | Re-enter (75) |
| DEL | Delete (72) |
| KP | Keep (76) |
| REQ RPT | Request Repeat (78) |
| IGN | Ignore (79) |
| MOD | Modify (77) |
| GET BT | Get Broad Tape (80) |
| SGN | Sign (86) |
| ENT NWS | Enter News (82) |
| GET XPG | Get Extra Page (84) |
| LFT OVR | Left Over (83) |
| GET NWS | Get News (81) |

TABLE 10B

LIST OF ABBREVIATIONS AND THEIR MEANING AS USED IN TABLES 2-9

| Abbreviation | Meaning |
|---|---|
| DL | Display Line |
| DC | Display Character Position |
| REG | Register |
| Hex or H | Hexadecimal |
| ADDR | Address |
| SEG | Segment |
| EM SEG | Entry Marker Segment Number |
| EM OP LAST | Entry Marker Operation Last |
| XMIT | Transmit |
| IOS | Input Output System |
| FI | Function Identifier |
| CHAR | Character |

TABLE 10C

LIST OF ABBREVIATIONS AND THEIR MEANING AS USED IN FIGS. 1–19

| Abbreviation | Meaning and Reference Character (where applicable). |
|---|---|
| I/O | Input Output |
| Edit. | Editor |
| Aux. | Auxiliary |
| PCU | Programmable Control Unit |
| EM | Entry Marker |
| REG. | Register |
| I/O | Input Output |
| RAM | Random Access Memory |
| ROM | Read Only Memory |
| KSTRT | Keyboard Start, Start of Keyboard Program (15-1) |
| OP | Operating (15-2) |
| INIT | Initialization (15-3) |
| CHAR | Character |
| EM | Entry Marker |
| C.A. | Control Area (15-6) |
| KIJA | Keyboard Indirect Jump Address (15-6) |
| A | Area (15-9) |
| F | Function (15-15) |
| PROG | Program (15-17) |
| FUNCT. | Function (15-10) |
| COL. | Column (15-13) |

TABLE 10C-continued
LIST OF ABBREVIATIONS AND THEIR MEANING AS USED IN FIGS. 1-19

| Abbreviation | Meaning and Reference Character (where applicable). |
| --- | --- |
| EOJ | End of Job |

FLOW DIAGRAMS (FIGS. 5-19)

In the following parts of this section the flow diagrams of FIGS. 5-19 are described in detail. By way of example, a programming implementation of these flow diagrams is given in Parts I-XIII of a PROGRAM LISTING section following the present section of this specification. It will be understood by those skilled in the art, however, that each of the functions shown by the flow diagrams and explained in the descriptive program listing herein could alternatively be carried out using other forms of logic implementation such as gating circuitry and timing clocks exclusively; still further a hybrid implementation could be employed with stored instructions stored in a memory unit and read out as explained herein providing an overall operating system, and digital circuitry comprising gates, bistable elements, shift registers and the like could be used to implement any or all of the individual routines or subordinate parts thereof as shown in the respective flow diagrams of FIGS. 5-19 and as explained in detail in the exemplary program listing.

In the following parts of this section, the respective flow diagrams are described by referring to the individual steps thereof in separate paragraphs. The paragraphs dealing with each of the respective blocks or steps are identified by hyphenated numerals corresponding to those used in designating such block on the drawings. This is intended to facilitate quick reference to the description of an individual step as the occasion may arise during review of other portions of this disclosure.

FIG. 5 START OF KEYBOARD PROGRAM 15-1 The location KSTRT (start of keyboard program) corresponds to the S memory address PU=017 PL=000 (all such three digit address segments being expressed in hexadecimal code). For the exemplary program listing, this address is instruction number zero of the Input-Alpha-Init routine found in Part XB of the program listing section at the end of this specification.

15-2 The operating system traps (i.e. branches) to the beginning of the keyboard program. The operating system program is designated as Parts I, II and III of the exemplary program listing given herein.

15-3 When the system power is turned on or when a reset mode is initiated, the operating system enters two characters in the IOS Status Word Buffer in the Keyboard Control Area 4-35. One is the initialize code and the second is the Home Code. In response to this initialize character, transfer is made to the Initialization Program of FIG. 6 and found in the exemplary program listing at PU=019, PL=029, i.e. Part X D.

15-4 If not the initialize code, a keyboard control character may be present. (See PU=017, PL=003). If neither an initialization code or a control character, a branch is made to the Alpha Input Program of FIG. 7.

15-5 Next, a check is made to see if the code is an entry marker control code. See Table 1B, columns ten and eleven. If an entry marker control code is involved, branch is made to step 15-6.

15-6 The location KIJA (keyboard interrupt jump address) in main memory is in the keyboard C.A., i.e. control area 4-35, FIG. 4. In particular a bit number one position is marked in the KIJA location for purposes of the straddle correction routine of FIG. 11. That is to say, if two consecutive alpha characters are entered then a straddle correction may be necessary, and thus it is useful to indicate an intervening entry marker control code by placing a binary one value in the bit number one position of the lower byte of the KIJA location (see Table 7A).

15-7 Having noted the fact of an entry marker control code at bit one of location KIJA, processing of the keyboard command code continues with the step of looking up the address of the proper subroutine for processing the command and branch to such subroutine, exemplary ones of such subroutines being shown in FIGS. 16 and 17.

15-8 If decision step 15-5 is answered in the negative, the address of the entry marker is located by reading main memory 4-15 at an address derived from the identification of the keyboard whose input is being processed. For example, if the keyboard is associated with device D1, its entry marker segment number is found in location MAU=04, MAL=08 (hexadecimal). Main memory 4-15 is interrogated at this address and the resultant number may be utilized to address an entry marker storage section such as that indicated at 4-36 for display unit D1. By way of example, the successive segments one through thirty-three (decimal) of the display buffer 4-21 for display D1 may have hexadecimal addresses of MAU=10, 11, 12, 13, 14, 15, 16, 17, 18, 19, 1A, 1B, 1C, 1D, 1E, 1F, 20, 21, 22, 23, 24, 25, 26, 27, 28, 29, 2A, 2B, 2C, 2D, 2E, 2F, and 30. If for example, the bits B3-B1 at location 0408 of Table 4 show the entry marker to be at the third of eight segments on display at D1, i.e. $B_3=0$, $B_2=1$, $B_1=0$, (the first segment being at $B_3=0$, $B_2=0$, $B_1=0$) then the segment address for the third segment being displayed can be obtained from the upper byte at location 0402 of Table 3. If, for example, the twenty-fifth segment of display buffer 4-21 is being displayed at the third segment of display unit D1, i.e. at display lines seven, eight and nine, then the contents of location MAU=04 (hexadecimal) MAL=0000 0010 (binary), might read 28 (hexadecimal) since the first buffer segment is addressed at MAU=10 (hexadecimal). Now referring to the address MAU=28 (hexadecimal), MAL=0000 0001 (binary), the byte indicated at 4-37 of entry marker storage section 4-36, FIG. 4, would be read out, giving the entry marker number. For example if character location number forty-seven (decimal) of buffer 4-21 represents the current entry marker location for display D1, this character location would have the address MAU=28 (hexadecimal) MAL=0010 1111 (binary).

15-9 To determine if MAU=28 (hexadecimal) is the first segment being display (display lines one, two and three), it is convenient to interrogate the fourth byte (indicated at 4-38 in FIG. 4) of the twenty-fifth buffer segment MAU=28, MAL=0000 0011 (binary). The program would have marked a zero in bit b8 at this address if the segment were the first segment to be displayed. (A zero would be introduced at b7 if it were the last buffer segment). The identity of the first segment to be displayed is found at 0400 of Table 3, and is further identified by marking bit b6 of the fourth byte of the display segment. There are two segments which are identified as being the "first" segment by the presence of a zero at bit b8. For the D1 buffer shown at 4-21 in FIG. 4, the segments $10_H$ and $11_H$ might both have a zero at bit b8 of byte 03, but the true first segment would be identified by the presence of a one at bit b6 of byte 03 of the segment $10_H$.

15-10 If the entry marker is in the Index Area (display lines one, two and three) the keyboard input should not be an edit control code (except that entry marker control is permitted as indicated by the presence of step 15-5).

15-11 If a forbidden edit function code has been presented this will be indicated by status character K (for keyboard error) flashing on the screen of display D1.

15-12 Certain multicharacter codes are also forbidden and if present would result in a branch to step 15-11.

15-13 The so called column D multicharacter codes permitted with respect to the Index Area are given in Appendix B.

15-14 The CCF character one is explained in Appendix B.

15-15 If the entry marker is not in the Index Area, a multicharacter code is not appropriate.

15-16 Accordingly the presence of a multicharacter code gives rise to a keyboard error status indicator.

15-17 If the input keyboard code is one of the edit functions given in column twelve of Table 1B, the corresponding edit program starting address is located and branch is made to such edit program.

FIG. 6

INITIALIZATION 16-1 As a result of the operating system, the MAU and MAL registers will be pointing to a particular keyboard control table address when this program is entered. Initialization program checks if this is an entry from Keyboard #1 & #2 (MAU=04).

16-2 If the MAL=12 then the input is from Keyboard #1.

16-3 For KBRD #1 enter in KBRD Control Area location $30_H$ (see Table 7A, at address 0430), the addresses of the first segment and the last segment of the buffer assigned to this KBRD (i.e. $10_H$ and $30_H$, respectively).

16-4 Since this is identified as a KBRD #2, enter in KBRD Control Area location $70_H$ (see Table 7B at address 0470) the addresses of the first segment and the last segment of the second KBRD buffer. They are $32_H$ and $52_H$ respectively.

16-5 to 16-8 The above listed identification steps are done for KBRD #3 and 4. If a MAU address is detected other than the ones for KBRD #1-4, then no action is taken and the program returns to the operating system as indicated by the notation #EOJ (end of job).

16-9 to 16-12 Starting with the first MAU address of display (e.g. MAU=04 for display D2), The Keyboard Control Area's first eight bytes (e.g. MAL=40 to MAL=46, Table 7B) are filled with the first eight segment addresses to be displayed. For example, for KBRD #2, the first eight display segment addresses would be $32_H$, $33_H$, $34_H$, $35_H$, $36_H$, $37_H$, $38_H$, $39_H$.

16-13 In the eighth word of the KBRD Control Area (e.g. 0408, Table 7A) enter the address of the entry marker as being in the first segment, first display position (corresponding for example to the 08 character position of buffer 4-21) and clear any indicator (or status) characters that may have been indicated there, prior to start of initialization program. Thus in Table 7A, bits B8 through B4 of the upper byte are zero, bits B3-B1 are 000 (binary) and bits b8-b1 of the lower byte are 08 (hexadecimal).

16-14 For transmit program in the word of the KBRD Control Area such as shown at $16_H$ in Table 7A and at $56_H$ in Table 7B, write the address where data should start to be transmitted, i.e. MDU=00, MDL=08.

16-15 In the next KBRD Control Area, enter the address where the reply should be written. When a reply is being received, receive program will check this location.

16-16 Clear the two words of the KBRD Control Area such as 0428 and 042A, Table 7A. These two words are used to store the addresses of the entry marker location when either the Open Brace or Close Brace keys are depressed on the keyboard, i.e. key 88 or key 89.

16-17 Address the first (index) segment of the display buffer such as indicated at 4-21, FIG. 4.

16-18 In the 00 byte of this segment, enter address of the Keyboard Control Area that is associated with this display segment i.e. $04_H$. In 01 byte enter lower (MAL) address of the entry marker as $08_H$.

16-19 In the 03 byte of this segment, enter zero in bit 8 to signify that this is the first segment of the buffer and mark bit 6 to signify that this is the index segment.

16-20 to 16-22 In the next seven segments, in byte 00, enter the KBRD control address in bits 8-4, and in bits 3-1 enter respective consecutive numbers that identify which out of eight possible, is this segment on display.

16-23 and 16-24 In all segments except the last assigned to this keyboard, enter the keyboard Control Table address.

16-25 In the last segment of the buffer, e.g. at $30_H$ for buffer 4-21, enter the Keyboard Control Table address and in byte 03, reset bit 7 to zero to signify that this is the last segment of the buffer.

FIG. 7

ALPHA-NUMERIC INPUT 17-1 An exemplary listing for implementing the Alpha Numeric Input Program is found at Part XC of the program listing section hereof.

17-2 through 17-4 If it is multicharacter input, generate two proper characters.

17-5 If it is not multicharacter data, check if it is insert mode. Check if work OE in KBRD control table has bit b7 set (e.g. in the lower byte of 040E, Table 7A). If this bit is set, then the keyboard is in Insert Mode. Go to that program.

17-6 through 17-11 Check if word straddle can occur if present data is entered into the buffer. If present entry marker is on the first character of a line and the previous character is not a null or a space, and previous key operation was an alphanumeric entry, then straddle correction has to be done. Go to straddle correction subroutine, FIG. 11.

17-12 and 17-13 If no straddle correction is needed, check if left justification of data is required. Read the buffer address corresponding to the EM address minus one. If it is a null, continue decrementing the EM address until the first character of a line or a data character is found and enter data there. No left justification is performed if the EM is found in the index area.

17-14 Enter data into the data buffer, e.g. 4-21, FIG. 4.

17-15 and 17-16 If after data is written into the data buffer, the entry marker goes to the next segment, and the next segment is not on display, perform an automatic scroll. Then Update EM in the operating segment of the data buffer such as 4-21 and in the KBRD Control Area 4-35.

Figure 8B:
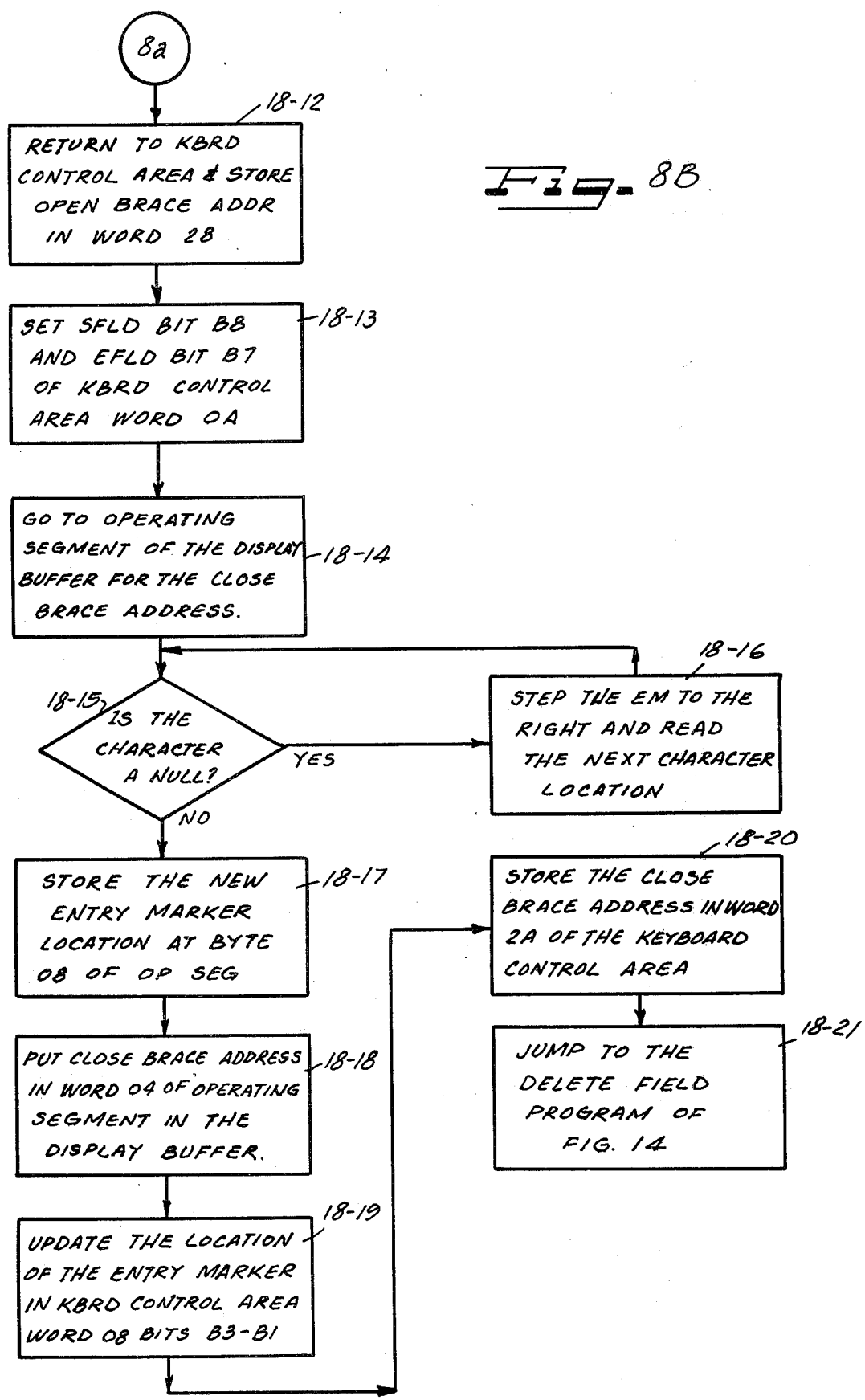
FIG. 8 consisting of FIGS. 8A and 8B is a flow diagram illustrating exemplary steps in a Start-End Insert Mode Routine for the system of FIG. 4.

FIG. 8
START-END INSERT MODE 18-1 KBRD input program jumps to this program if Start-End Insert Code is detected from the keyboard.

18-2 and 18-3 Read address OE in KBRD Control Area 4-35. If bit b7 is set then the program was in Insert Mode and an exit from this mode is desired.

18-4 to 18-6 If bit b7 of OE is not set, set it and write it in the KBRD Control Area. Also enter a character in 08 word of KBRD Control Area 4-35 so that a flashing I, indicating an insert mode state, will be visible on the screen. Once that is done, exit program back to operating system.

18-7 and 18-8 Since the program is already in the insert mode, the end of the insert mode is desired. Erase flashing I and the indicator bit for insert mode.

18-9 to 18-11 Go to the operating segment. If the entry marker is on a data character, no close-up of data area is required, exit the program.

18-12 and 18-13 If EM is on a null address, there may be a number of nulls in the middle of data which were generated when data entry was "pried-up" in insert mode. These null characters have to be deleted. Where EM is located, enter open brace character and mark its address in the KBRD Control area e.g. at 0428, Table 7A.

18-14 to 18-18 In the operating segment step right until a non-null character is found. Mark at that address, close brace code, and mark the address of the close brace in the KBRD Control Area e.g. at 042A, Table 7A.

18-19 Update EM in the KBRD Control Area 4-35.

18-20 and 18-21 Program is ready to do Delete Field routine. Go to Delete Field Program, FIG. 14.

FIG. 9
INSERT MODE DATA ENTRY 19-1 This program is entered from the Alpha-Numeric Input program, FIG. 7, where an Insert mode was detected.

19-2 Store the entry marker location and the data being entered in a temporary location.

19-3 If EM is on a null code, then return to Alpha-Numeric Input program, FIG. 7.

19-4 If EM address has data, then opening of data is necessary to allow inserting of new data. Start looking for a line with a null as its first character.

19-5 If a line with first null character is found, check if the entire line is full of nulls. If it is not, go back to looking for first character null.

19-6 If an empty line is found, move data in line above it to the empty line.

19-7 and 19-8 If the line above it has the EM address, move only data to the right of EM to the line below it.

19-9 to 19-11 If the line above the empty line does not contain the EM, move all 40 characters to the empty line.

19-12 Check if the line with the EM has been moved. If it has, then this program has provided room for insertion of 40 characters without loss of any data. Retrieve data from temporary storage and return to the Alpha-Numeric Program, FIG. 7, for entry of the data into the buffer.

19-13 Continue moving lines of data until line with EM is moved. This program is a subroutine which can be called by any program and at the end of it will return to the program from which it came automatically.

FIG. 10
INSERT PARAGRAPH 20-2 and 20-3 Store temporarily, EM address.

20-4 Go to Insert Mode Data Entry Subroutine (FIG. 9).

20-5 and 20-6 When the program returns, the opening of one line should be completed. However, if there was not enough room in the buffer to insert a line, exit address of the subroutine will indicate that. If there is no room in the buffer, flash a "K" on the screen.

20-7 to 20-9 Generate address of next line where entry marker is. Calculate first character of the line. Enter two spaces to signify new paragraph.

20-10 Jump to subroutine to close up the line with new paragraph.

FIG. 11
CORRECT LINE STRADDLE SUBROUTINE 21-1 This program is a subroutine and it is entered from any other program that may call it.

21-2 to 21-4 Save the contents of A and G which are pointing to the first character of a line address. Program also saves the contents of MA registers so that they are not lost and can be used by the program that called up the subroutine.

21-5 to 21-7 Read last character of previous line. If it is a null, no straddle correction is needed and program jumps back to the program that called it.

21-8 to 21-14 If the last character of the previous line is not a null, keep decrementing until a space is found. Store number of characters from the end of the line to the space as index. Index represents the number of characters that have to be moved to the line below to correct the straddle.

21-15 Keep the space address plus 1 as the source address.

21-16 Retrieve previously stored destination address (EM address).

21-17 to 21-19 Read data at destination address. Add index to it and write the data just read at the new address. This moves the character just entered to its proper spot in the line.

21-20 to 21-22 Read data at source address and write it at the destination address (EM address). Erase data at source address.

21-23 and 21-24 Increment source and destination addresses. Check if index is equal to 0.

21-25 If index is not zero, decrement it and write it back in the lower byte of word 04 of the operating segment. See Table 9. Go back to processing operation 21-20.

21-26 to 21-28 If index is equal to zero and if an entry marker update is required, update EM and return to the program that called this subroutine up.

FIG. 12

COMPRESS DATA

22-1 and 22-2 Go to 3rd line of the first Edit segment. (Compress can only be done for line 6 and down.)

22-3 Check if the addressed line has a null in the first character position.

22-4 If yes, check if entire line is empty.

22-5 and 22-6 If line is not empty, go to next line. Before checking for empty line, check if the present segment is last segment of the data buffer. If it is last segment, terminate the program.

22-7 to 22-9 Store the address of the empty line. Address next line; if the line is in another segment, check if the present segment is not the last. It it is the last segment, terminate the program and return to operating system.

22-10 and 22-11 Search for line with data. If data is found, move data to the first empty line that was found. Continue doing this until there are no more lines of data below an empty line.

FIG. 13

START AND END FIELD PROGRAMS

23-1, 2, 5, 6 Check if there is an end of field key entered with the last key depression. If there is, end the program.

23-3, 7 If there is no end of field key entered, write the address of the EM in end of field word in KBRD Control Area.

23-8 Find EM address.

23-9, 11 If EM address is in index area, flash K on the screen.

23-10 and 23-12 to 23-15 In operating segment, store the data under the EM in segment control area. At the EM location, write open brace code if open brace key was depressed, or close brace code if close brace key was depressed.

23-15 Update EM location both in operating segment and in KBRD Control Area.

FIG. 14

DELETE FIELD PROGRAM

24-1 to 24-3 Check if both end field and start field are entered. If not, flash "K" for keyboard error.

24-4 Check if end of field address is greater than start of field address. If not, flash "K" to indicate keyboard operator error.

24-5 Erase indicator which identified that there was a legitimate start and end field entry.

24-6 to 24-8 Check if end of field is in the last segment, last character. If it is, end the program. Operator should have done delete rest operation.

24-9 Do the first character transfer from end of field plus one address to start of field address.

24-10 Increment source and destination addresses.

24-13, 14 Check if source address is 1st of a line. If it is, remember this, because a space character may be generated before entering this data at the destination.

24-15, 16 Check if source address is last in line. If it is, remember this because there may be a space character needed before data can be transferred.

24-17 and 24-18 Read source data. Check if destination is the first character of the line. If it is, check if source address was first character of the line.

24-19, 20 If it is not (source address≠1st character of line) so to straddle correction subroutine, FIG. 11.

24-21 and 24-22 If source is the first character of a line, check if it is a space. If it is space, no more data movement is required. Data will not be reformatted. The same is true if a null character is being moved from the first position of the line.

24-27 Check if the data at the destination is a space.

24-28 If data at destination is not a space, enter space at destination address. Increment destination address.

24-23 Check if source address is 1st character of a line. If it is, jump to 24-21.

24-24 Check if source address is last of the line.

24-25 If source address is last in line, check if destination address is last in line.

24-26 Write source data at destination.

24-29, 30 If destination is not last character of line, check if source data is a null. If it is a null, discard it. If it is not a null, write data at destination address.

24-31 and 24-32 Update source and destination addresses for moving next character and start the above operation (NEXTC at 24-11).

FIG. 15

DELETE CHARACTER PROGRAM

25-1 and 25-2 Locate EM address.

25-3 Check if EM address is in 1st position of the line. If it is not, go to 25-6.

25-4 and 25-5 If EM is in the first position of the line, move the character to the right of the EM to the EM address. Update source and destination addresses for next move.

Figure 14B:
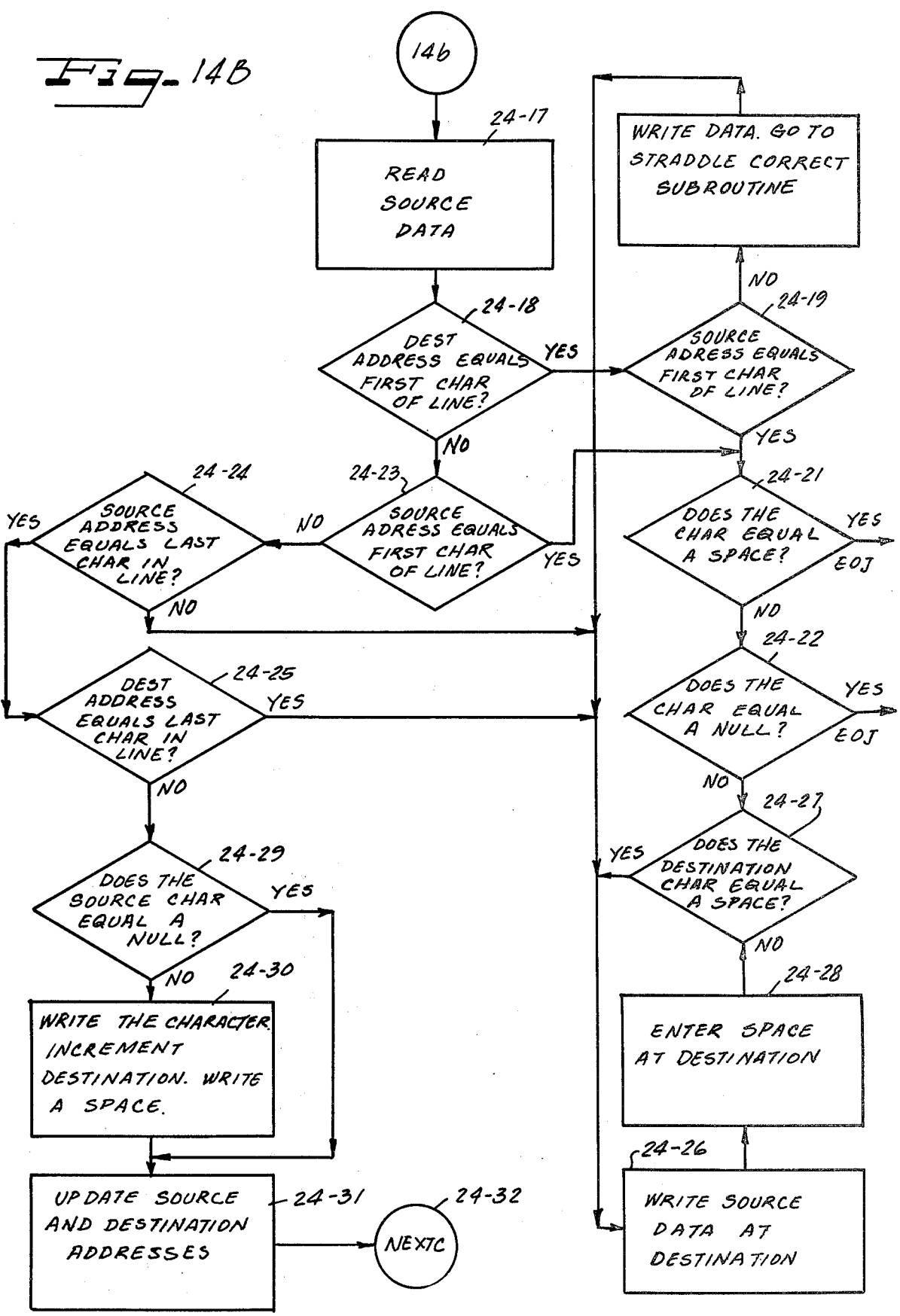
FIG. 14 consisting of FIGS. 14A and 14B is a flow diagram showing certain processing operations of a Delete Field Key Program for the system of FIG. 4.

25-6 Enter the main loop for delete operation at 24-11, FIG. 14.

FIG. 16

SCAN AND STEP SCROLL-UP

26-1 to 26-3 Scan Scroll-Up code received from the keyboard. Check if scroll counter in KBRD control area is zero.

26-4 to 26-6 If counter is not zero, check if it is at one. If it is at one, increment it, otherwise reset it. Do not perform scroll-up of display data.

26-7 Increment scroll counter.

26-8 and 26-9 Check if scroll-up operation is possible. If the last segment on display is also the last segment of the buffer, then no scroll-up operation is possible. End the program.

26-10 and 26-11 If the last segment on display is not the last segment of buffer, then increment the last seven segment addresses and display segments in the KBRD Control Area 4-35, FIG. 4.

26-12 and 26-13 Go to the new display segments and update their pointers which identify their order of display.

26-14 Write zero in the first word, three last significant bits of all the remaining segments. This signifies that their order of display is 000.

FIG. 17

SCAN & STEP SCROOL DOWN

Same operation as for FIG. 16, except that display segment addresses are decremented.

At 27-9, check is made if 2nd display segment is at the top of Edit area. If it is, scroll down cannot be done.

FIG. 18
CLEAR 28-1 and 28-2 Go to KBRD control area and check if open brace and/or close brace codes are set.

28-3 If they are, reset them and end the clear operation.

28-4 If open-close braces were not set, locate entry marker.

28-5 and 28-6 If EM is in Index area of display, clear the entire keyboard buffer—all 33 segments.

28-7 If EM is in Edit area, clear only the seven Edit area segments that are on display.

FIG. 19
TRANSMIT KEY 29-1 and 29-2 Enter in KBRD control area the Query Start Address.

29-3 If data has been scrolled, up or down, scroll down all data.

29-4 Calculate FI character and write it in KBRD Control Area.

29-5 Write reply start address in KBRD control area.

29-6 Move EM to home position in Index area.

29-7 to 29-9 First character of CCF data has an indication if transmission is only of the first line (minor) or the entire buffer (major). If transmission is minor, at the end of the first line, enter end of message code.

29-10 Erase characters 34-40 in the first segment.

29-11 and 29-12 Display a flashing "T" on the screen and lock out the keyboard from entering data.

29-13 Enter a subroutine that will generate a request for transmission programs.

SUMMARY OF FEATURES

The present disclosure is particularly concerned with the features of FIGS. 4–19. The features were particularly developed for a news retrieval system such as indicated in FIG. 1, but it will be apparent that the structural relationships providing the various manually selected functions may be applied to many other purposes. Thus, each feature is disclosed as a separate functional entity not dependent upon the overall system or other features except to the extent that this is inherently specified. For example certain aspects of the scrolling features are intimately related to the fact of a display buffer such as indicated at 4-21 in FIG. 4 for storing a relatively large number of lines such as indicated at BL1 through BL99 in comparison to the number of lines accommodated by the display units such as display lines DL1 through DL24 indicated for display unit D1 in FIG. 4. Reference is made to the specific description of the individual key functions and to the specific description of the flow diagrams of FIGS. 5–19 and to the exemplary program listing for a further understanding of the present summary.

The primary objective of this invention is to enable an operator, using ordinary typewriting skill, to more efficiently perform the functions of an editor of textual material which is presented on a CRT display. In pursuit of this objective, the design includes unique properties which are applicable to other implementations of automated typewriter-oriented terminals.

The editor input-output terminal such as 10 and the associated control unit 11 are used in the news retrieval system of FIG. 1 for the purpose of establishing and maintaining textual story items, along with the necessary indexing of these items, in the data base of this system. In the performance of the functions required, story items will either be presented to the editor by a central processor system CPS, FIG. 1, which controls the system data base, or alternatively, the editor may "enter" the story item, either from a hard copy, or by origination without the benefit of a hard copy. The display unit on which the story is presented in the exemplary embodiment accommodates a line of forty characters with an initial character location such as indicated at DC1, FIG. 4, and a final character location such as indicated at DC40, FIG. 4. Simply for the sake of illustration, the display may accommodate twenty-four lines including a first line as indicated at DL1, FIG. 4, and a final line such as indicated at DL24, FIG. 4. The buffer storage such as indicated at 4-21, FIG. 4, which is assigned to a particular terminal is larger than in the system described in Appendix A. In particular, the buffer 4-21 will accommodate a total of ninety-nine lines of data including a first line designated BL1, FIG. 4, a second line BL2, a third line BL3, a ninety-seventh line BL97, and further lines BL98 and BL99 as indicated in FIG. 4. Of the ninetynine lines, therefore, only twenty-four lines may be viewed at any instant.

In the performance of the editorial functions, it is from time to time required that the operator typically may enter new data, delete existing data, or move data within the limits of the story, as editorial judgment dictates. Within the context of operating a CRT display typewriter terminal, the point of entry of data, or other operating controls, is indicated by a unique symbol, referred to as a Cursor or entry marker which is diagrammatically indicated at EM in FIG. 3. The entry marker may, of course, take many forms, and may visually be represented by an open rectangle surrounding a given character of the display, or may comprise a flashing symbol alternating with a displayed character at the Cursor location, or the like.

In order to enhance the operation of the terminal in connection with the editorial requirements, this invention provides the operator with a versatile set of controls which relate to the Cursor movement, and the addition, deletion and movement of data. The novel features of this invention are related to the general class of functions which are the keyboard edit routines of control unit 11 as herein disclosed. Specifically, the novel features of this invention include the following:

1. A first feature of this invention which is considered to be novel is related to the vertical positioning control of the Cursor. In addition to the well known position controls, such as the lateral movement, Home, and Carriage Return-Line Feed, the present terminal provides for movement of the Cursor in a vertical mode. There are two keyboard keys for this control:

a. ST-SC ↑ - A single action of this key 106 causes the Crusor to be moved "up" by one line while retaining the lateral position. For example, the Cursor might move from display line DL24 at character location DC40 to display line twenty-three at the same character location in response to a single actuation of key 106.

b. ST-SC ↓ - A single action of this key 107 causes the Cursor to be moved "down" by one line while retaining the lateral position.

c. If either of these two keys is depressed in conjunction with the SHIFT key 61, then a continued action of the vertical motion of the Cursor is caused. The range in which the Cursor may be moved in either the single or continuous mode is limited by the upper or lower lines currently on display, that is display lines down to the bottom display line DL24, even though such bottom display line may correspond to a buffer line in buffer 4-21 such as indicated at BL75, this line being the last line of a buffer segment twenty-five.

In previous keyboard terminals, manual control of the Cursor location is primarily one which is associated with its lateral movement, (i.e.) rightward or leftward, and the Carriage Return-Line Feed movement produced by key 103, for example. Movement of the Cursor between lines required the use of the lateral movement control to whatever degree was required in order to traverse all character locations between the initial position of the Cursor and its desired position; or to use a combination of the Home key 117, Carriage Return-Line Feed key 103, and such lateral movement controls.

In the present case, the location of the Cursor is simplified by providing for a straight-forward movement of the Cursor between lines while retaining its lateral position with respect to the beginning of a line. The movement of the Cursor is achieved by altering the contents of a memory buffer register which defines the display position of the Cursor. Such a buffer register could be a special purpose flip-flop register similar to the accumulator (A) register of FIG. 4, but in the illustrated embodiment is represented by an entry marker storage unit in keyboard control area 4-35 of FIG. 4 and as represented in Table 4 herein. In a typical instance, if the Cursor is to be re-positioned vertically by one line position, the register contents is either incremented or decremented according to the intended direction of movement by a constant value such as forty which reflects the character address difference between adjacent lines. Referring to display buffer 4-21 at the top right of FIG. 4, character addresses for the beginning and end of line BL1 are indicated as 08 (decimal) and forty-seven (decimal), respectively. The beginning and end character locations for buffer line BL2 are indicated as forty-eight and eighty-seven, while the first and last character locations of buffer line BL3 are indicated as eight-eight and 127 (decimal). Thus, to move the Cursor from the last position of a display line corresponding to BL1 to the last position of a display line corresponding to BL2, the constant value forty is added to forty-seven to obtain a character location eighty-seven.

2. A second novel feature of this invention relates to the automatic justification of data within a line. In other typewriter oriented terminals, the position of the Cursor determines the entry point of the next subsequent character as presented by the keyboard. Thus, a data character can be stored, (and displayed), in a buffer location which is discontinuous with either the preceeding or subsequent data locations, (i.e.) NULL codes are maintained until replaced by a keyboard data character. Where necessary, the control unit 11 may suppress these NULLS during the transmission of data from the terminal as a means of conserving line time.

In the present editor terminal system, a keyboard data character will also be stored in the buffer location of a buffer such as 4-21 as indicated by the Cursor. However, the Cursor location will be adjusted to reflect the first available character location within a line when a keyboard data character is presented for entry. In this way, the need for additional Cursor positioning control on the part of the operator is avoided. With this feature, the operator is presented with a more accurate display of the data as it will be transmitted to the data base, including all space codes. Therefore, it is obvious that with this feature, buffer space is conserved during the entry of keyboard data, and where extraneous space codes are indicated on the display, these may be deleted from the buffer 4-21 or the like if they are not required from an editorial consideration. The beneficial result of this design is that the operator can more efficiently compose the story item exactly as he desires it to be transmitted.

This feature, by which the Cursor is automatically re-positioned in order to achieve a left-justification of keyboard data entry is performed by an examination of the contents of the buffer location of buffer 4-21, for example, which immediately preceeds that of the Cursor. For example, if following a Cursor movement vertically to an empty line or section thereof, the lateral position of the Cursor on the line is notated as n, $(1 \leq n \leq 40)$. Where a keyboard data character is entered, it will be entered at a location n provided that the contents of $n-1 \neq 0$. If BC $(n-1)=0$, then each preceeding character location, $n-2$, $n-3$, etc., is examined to the beginning of the line. If a location, $N=x$, is found where the contents is not a NULL code, (i.e.) at least one bit is marked, then the entered data is stored in a location $n=x+1$, and the Cursor is positioned at location $n=x+2$, where the next entered character is to be stored.

It is to be understood that the left justification process for entering keyboard data is also conditioned by the restrictions with respect to the prior establishment of Tab points. In essence, a Tab point which is encountered during the examination of successive locations is analagous to the beginning of a line.

3. A third novelty which is part of this invention relates to the establishment of horizontal Tab points.

In the operation of mechanical or electrical typewriters, the operator is enabled to select lateral character positions which are to be horizontal Tab points, and these are applicable to all lines which are to be typed.

In the operation of electronic data terminals, horizontal Tab point locations are usually established by particular codes as received in a communications message which is addressed to the terminal. By this means, a unique character location in the buffer memory such as 4-21 for the terminal is established as a Tab point. This technique is usually employed as an aid to the operator in filling out a form.

The terminal is provided with a means of setting and re-setting horizontal Tab points which is considered unique for electronic data terminals. The method by which this is achieved is as follows:

a. The operator chooses the lateral character position at which the horizontal Tab point is to be established by operating the lateral Cursor movement control key such as key 105 or key 106, FIG. 2, and then operates the SET-RESET Tab key 102 to produce the Set Tab function at the designated character location by marking a particular bit in the buffer such as 4-21 associated with that location. The Tab code is given in Table 1A at column 7, row 11, namely 0111 1100. Thus, while the Tab mark does not per se appear on the typewriter keyboard, the control unit 11 operates to produce a visual display as represented at column 7, row 12 of Table 1A in response to the corresponding code at a given character location of buffer 4-21. In addition to establishing the Tab point at the designated location, the control unit automatically iterates the process at the same lateral character position in all succeeding lines of the buffer such as 4-21 which is assigned to the terminal. In this way, Tab points are established automatically on all lines which are "below" the one containing the Cursor. Multiple Tab points on the same line may be established with the restriction that they are not in adjacent lateral positions. In this illustrated embodiment, the location of a Tab point is indicated by a meaningful display as indicated at column 7, row 11 of Table 1A.

b. Tab points may be reset by the operator by the use of key 102 in the non-shift mode as indicated at column 10 of Table 1B. In order to do this, the Cursor is positioned on a line from which the Tab points are to be removed as well as from all lines "below" that line. The key 102 is then operated and the control unit 11 thereupon scans the buffer such as 4-21 for all Tab points and erases the bits by which they are indivudally designated.

4. The fourth novel feature of this invention relates to the automatic "Carriage Return-Line Feed" operation and left margin maintenance.

In the operation of a typewriter, the typist is required to be made aware of the approaching end-of-line in order that a continuous entry should not over-run the line, resulting in the piling-up of characters in some cases. Also, where the typist determines that the word being typed will not fit on the same line, a CR-LF action is taken and the word is typed on the succeeding line. Obviously, in some cases, these considerations result in the need for corrections of one sort or another.

One of the objects of this invention is to simplify the typist's function when operating the illustrated terminal. The feature to be described is especially useful when the operator is entering textual data as from a hard copy. It is felt that this feature can be employed on other electromechanical typewriter terminals to great advantage. When typing on the terminal, the operator is not required to keep track of the end-of-line condition, or to engage the CR-LF function of the keyboard. The control unit 11 will create the CR-LF function automatically as required, making use of the avilable line space most efficiently without the need for any manual intervention on the part of the operator.

During the entry of text, the display storage is adjusted to eliminate any straddle of a word between lines. Thus, where a series of characters are entered which exceed the line limit within the buffer such as 4-21, the control unit 11 will cause the word to be re-located to the beginning of the next line and deleted from the positions in which it was initially entered on the previous line.

a. A ¢straddle" condition is created if the character in location forty on one line and the character in location one on the succeeding line have been entered consecutively; i.e., without a separating keystroke of either a Space by actuation of Space bar 2-10 or Carriage Return-Line Feed by actuation of key 103, FIG. 2.

b. Where the last character of a word (including any following punctuation mark) is entered in location forty of a line, the next keystroke should be either a Space or CR-LF. If it is Space, it will be stored in location one of the next line; or if CR-LF, the following character will be stored in location one of the next line.

c. As entries are made in each line, a new character (NC) which is to be stored in location two (BLxCL2 of buffer 4-21) is examined for Space code equality.

If NC=Space, store NC in BLxCL2.

If NC≠Space, examine the character c (BLxCL1) (same line).

If c(BLxCL1)=Space, store NC in BLxCL1.

If c(BLxCL1)≠Space, store NC in BLxCL2.

The result of this is the maintenance of the left margin of the display and the effective suppression of Spaces which are entered inter-line.

5. The next novel feature enables the operator of the terminal to "scroll" his display through the limits of his terminal's buffer such as 4-21, FIG. 4. By way of example, the display unit may be limited to twenty-four lines while the terminal buffer such as 4-21 may accommodate ninety-nine lines' worth of storage.

If the buffer contents exceeds twenty-four lines, the system may be operated such that any set of twenty-four (adjacent) buffer lines may be chosen for display. (In the illustrated embodiment, the first three lines of the buffer BL1, BL2, and BL3, FIG. 4, are fixed on the display D1, and scrolling on the display is confined to a set of twenty-one adjacent lines of the remaining ninety-six lines of buffer 4-21. Whenever the scroll action is taken, for example selectively by means of keys ninety-two and ninety-three shown at the upper right in FIG. 4, the Cursor location is maintained on the display so that it is always visible.

The scrolling action is, in the first instance, under manual control. However, this function is automatic as the part of another operation which will be described subsequently.

The action by which the manual scroll is achieved is by operating key ninety-two or ninety-three in a shift or non-shift mode as indicated at columns 10 and 11, rows 11 and 12 of Table 1B. Operating either the key ninety-two or ninety-three alters the display by a set of three lines at a time. For example, a single operation of key ninety-two causes the buffer to be "moved up" through the display by three lines. It is as though the contents of buffer 4-21 were arranged line-by-line in a column and were on a continuous scroll of ninety-nine lines which is being passed behind a display window of twenty-four lines. When either of the scroll keys ninety-two or ninety-three is operated in conjunction with the SHIFT key sixty-two, there is a repetitive scroll operation so long as both such keys are depressed. The scroll function is limited to the upper and lower limits of the buffer such as 4-21, so that a buffer line BL99 will not scroll up beyond the fourth display line, and the fourth buffer line will not scroll down beyond display line DL24.

The control unit 11 is enabled to perform this function by the assignment of a display segment notation to each set of three consecutive lines in the buffer. For a complete display of twenty-four lines, there are eight such segments on display whose notations are maintained in a table of keyboard control area 4-35 as respresented by bits B3, B2, and B1 shown in Table 4 herein. As indicated in Table 4, the control data for each display device may be located at a separate storage unit of the table, the addresses for the respective devices being identified by lower order digits 08 (hexadecimal) for odd numbered display units and being identified by lower order digits 48 (hexadecimal) for even numbered display units. Thus, for example, display device D3 might have its segment number at an address of 0508 in upper bits B3-B1, while display D4 might have its segment number at hexadecimal address of 0548 in upper bits B3-B1. (The sequential supply of such entry marker numbers and status character codes to the entry marker buffer 4-12 in FIG. 4 in refreshing the respective displays is not a part of this disclosure and is explained in detail in Appendix A hereto.)

In the prior system shown in Appendix A hereof, the table(s) are established by virtue of mode assignements and associated control messages between the control unit and the concentrator. This prior feature is particularly covered by U.S. Pat. No. 3,792,462 issued Feb. 12, 1974 and assigned to the assignee of the present application. Once the tables are established for the various modes in this prior system, they are maintained until altered by another set of assignments.

In the present system, each input-output terminal may be programatically assigned a set of display segment notations (such as the hexadecimal addresses 1000, 1100, 1200, 1300, . . . 2C00, 2D00, 2E00, 2F00 and 3000) from which the visual display is selected. The display segment table in key board control area 4-35, FIG. 4, for example, may be modified by a direct key board action as opposed to the mode assignment table which is used in the prior system of Appendix A.

In addition to the manual initiation of a scroll function, this action is performed automatically when necessary, as part of a key board entry operation. When the terminal operator is typing text and the entry is being made on the display line 24, an automatic scroll will be performed when the entered data exceeds the capacity of the corresponding line of the display buffer 4-21. As a result of this, three new lines are brought up on the display and the text being entered is displayed on such new lines.

There is a similar automatic scroll feature performed during the operation of the Insert function, to be described hereinafter.

6. Another novel feature of this invention relates to certain Delete functions which are performed. All are under control of the key board operator.
   a. Delete character: By placing the Cursor over the character to be deleted, and hitting the delete character key 108, FIG. 2, the designated character is deleted. All subsequent characters on that same line are left-justified, and if this allows data on succeeding lines to also be left-justified, (i.e.) upwards into the line on which the Delete occurred, then the left-justification process is continued as much as possible to the limits of the paragraph.
   b. Delete word: By placing the Cursor over the first character of a word, that word may be deleted by actuating the delete word key 109, FIG. 2. The full word and the following inter-word Space is deleted. As with the Delete Character Function, left-justification of succeeding data is performed to the limit of the paragraph.
   c. Delete Rest: By placing the Cursor over any character location and hitting the delete rest key 110, all data in the display buffer 4-21 from the Cursor location to the end of the buffer is deleted.
   d. Delete Field: A field of data encompassing a variable amount of data may be deleted. There are two keys 88 and 89, FIG. 2, which are used to designate the limits of the field of data to be deleted. By setting the Cursor over the two limits (i.e.) Start Field, and End Field, the field limits are established by actuating the respective keys 88 and 89 in turn. Also, the field limits are caused to be indicated by the set of Open and Closed Brace symbols shown at column 7, rows 11 and 13, respectively, of Table 1A. When the delete field key 90, FIG. 2, is actuated, the designated field is deleted. Left-justification of succeeding data is performed to the limit of the paragraph.

7. The next novel feature of this invention relates to the various Insert functions which are performed. In the MIS mode of operation of a system such as the prior system of Appendix A, there is an Insert function by means of which the key board operator is enabled to shift the data to the right by one character position for each Insert action. The shifting process effectively "opens" up buffer space to allow insertion of new data without over-writing existing data. In such a prior system as currently used, the function is limited in action to the line and position of the Cursor, and will cause the loss of data at the end of the line if the Insert action causes a line over-flow condition.

In the subject feature seven, there are a set of Insert functions as described below:
   a. Insert Paragraph: When an Editor, (i.e.) keyboard operator, wishes to create a new paragraph in the midst of a set of textual characters, the operation is to set the Cursor at the point where the new paragraph is to start and then strike the insert paragraph key 116, FIG. 2, on the keyboard. The result is that all data to the right and below the original Cursor position is shifted reflecting the construction of the new paragraph. Effectively, two space characters are inserted in front of the affected text and these are positioned at the start of the next line, (i.e.) the line below the original Cursor location. The data following these two Space characters is whatever existed subsequent to the location of the Cursor location. The Editor is not required to re-type any of the previously existing text.
   b. Insert: In order to insert a character, word, sentence, or paragraph, (i.e.) any variable amount of data, into the existing text, the keyboard operator will actuate the insert key 114, FIG. 2, on the keyboard. This will establish the Insert Mode and is reflected by the flashing status character I on the CRT display.

Once in the Insert Mode, the operator then types in whatever new text data is to be added and finishes by striking the insert key 114 a second time. This second actuation of the insert key ends the Insert Mode and removes the flashing status character.

When the keyboard is in the Insert Mode and new data is being entered, the existing text is caused to "pry apart" as new text is keyed in. For example, if an entry is to be inserted in Line 20 of the display buffer 4-21, the control unit, 11, upon entering the Insert Mode, will cause all data to the right and below the Cursor to be shifted down by one line in the buffer, maintaining the existing positions of characters within the line. As the new text is entered, the shifting down process is repeated whenever the text entry is to be made in the location of the "old" text.

If the new data being entered exceeds the limits of Line 20, it is continued on Line 21, etc., with all of the keyboard entry features being applicable, such as the avoidance of the entry straddle conditions, and the automatic scroll of the display as required. When the Insert Mode is terminated, all of the "old" text is "closed-up" (i.e.) left-justified against the newly entered data. During the Insert Mode where the limit of the display buffer is reached and any subsequent shifting-down process would cause a loss of data (by virtue of having filled all 99 lines of the display buffer 4-21, for example), the control unit 11 will inhibit any further keyboard entry. The Insert Mode will be terminated, the buffer over-flow indicator will be posted in the status character position, and the Cursor will not be advanced. Any continuing keyboard entry over-writes at the Cursor location. The over-flow condition is terminated by relocating the Cursor.

8. Another novel feature of this invention relates to the Move function.

If the Editor decides to move data from one location to another within the display buffer such as 4-21, FIG. 4, this can be done without the need for retyping or manually initiating the Delete functions. This is performed automatically by the Move Field Operation.

The Editor designates the field to be moved by operating the Start and End Field keys 88 and 89, FIG. 2, as described previously in connection with the Delete Field Operation. He then moves the Cursor to the start of the destination where the indicated field is to be moved, and strikes the Move Field key 91. The result is that the indicated move is accomplished, the field is deleted from its original location, and the resulting data is left-justified as appropriate.

The Move Field function is accomplished by combining other sub-functions which are available, such as Insert, and Delete. Effectively, the Move function is performed by an Insert function starting at the indicated destination, with the data being inserted obtained from the display buffer such as 4-21 rather than from a series of keyboard entries. The Delete function is performed as a sub-function in order that buffer space may be conserved during the Move operation itself; (i.e.) deletion of that set of data which has already been moved.

DISCUSSION OF CLAIM TERMINOLOGY

As emphasized in this disclosure, each feature may be implemented in part or entirely with special purpose digital circuit components such as gates, counting circuits, accumulator registers, shift registers and the like.

The terminology in the claims is intended to be generic to a special purpose logic implementation for the respective features as well as to time shared circuits such as specifically illustrated.

The term "storage device" is used to refer to the buffer 4-21 of FIG. 4 by way of emphasis that delay line storage or other storage not of the specific type shown in FIG. 4 may be employed.

The "storage entry control" for controlling the supply of keyboard character codes to the storage device may be a distinct special purpose circuit, rather than part of a timed-shared bus-oriented circuit as shown by way of example in FIG. 4.

The "entry marker storage unit" may be a special purpose accumulator register having a construction similar to the accumulator (A) register of FIG. 4 with special circuits for incrementing or decrementing the storage unit by a character location increment (such as the number one) or by a line increment (such as forty). The entry marker segment address storage may be at one location and the character location within the segment may be stored at a different and changing location. For example the entry marker segment address may be derived from the keyboard input-output address and from the keyboard control area words (or corresponding special purpose registers) associated with the specific display, while the entry marker character location within the segment might be stored with the corresponding one of the thirty-three segments in display buffer 4-21 (e.g. within section 4-36). The programmer for purposes of one part of a subroutine might enter the entry marker character location in storage unit 4-36 and maintain the information current and refer to it in storing keyboard characters in main memory, while later in the subroutine, it might be convenient to read the entry marker address in its entirety from keyboard control area 4-35. Thus, the term "storage unit" is generic to a special purpose register or registers and to a changing set of storage locations. Further the "storage unit" may include one special purpose circuit keyed to the video display bit rate of the video code character signals for controlling the entry marker location on a display screen and a second special purpose register controlled separately and in terms of address codes for maintaining entry marker location information for purposes of entering new keyboard codes in a buffer memory.

The entry marker may be produced by a separate beam of a plural beam CRT, for example, providing a distinctive color for the entry marker if desired.

The display need not be of the periodically refreshed type, but may comprise a continuous optical readout forming an integral part of the storage device 4-21, for example.

It will be apparent that many modifications and variations may be effected with respect to the implementation of the disclosed features while yet appropriating the novel concepts and teachings of the present invention.

OPERATION TO AUTOMATICALLY DELETE NULLS WHEN STORAGE ENTRY CONTROL IS CHANGED MANUALLY TO ADDRESS A NEW STORAGE LOCATION OF STORAGE DEVICE 4-21, FIG. 4

In order to provide further understanding of the exemplary processing system which includes the stored control signals of the macroprogram memory (S Memory, FIG. 4) and of the microprogram memory (U Memory) and the various cooperating registers and control tables, a detailed description of certain processing steps will be given. References will be made to the flow diagrams in the drawings and to the Tables given in the specification to assist in visualizing the steps.

The processing steps will be identified by the coded addresses to be stored in registers PU and PL shown at the center left in FIG. 4. The control signals called forth by each indicated state of PU and PL are identified in the PROGRAM LISTING section hereof, particularly the listing of Part XC beginning at PU=018, PL=00C, and the macro routines referred to in Tables 6B and 6C.

ALPHA NUMERIC INPUT PROCESSING BEGINNING AT ALPHA, PU=018, PL=00C (SEE FIG. 7A)

Initial Conditions (Keyboard #1, FIG. 4):

MAU=04, MAL=02
Input data is in register A.
PL 00E Set bit b3 of register MAL of the left center of FIG. 4.
00F Set bit b4; therefore, MAL=OE (hexadecimal).

010 Read the lower byte of the control area 4-35, the upper left in FIG. 4, at MAU=04, MAL=OE, into the MDL register, shown at the center left in FIG. 4. See Table 7A at MAL=OE.

012 Was bit b7 of the lower byte of Word OE of the Keyboard control area 4-35 reset? If reset, jump to the address given at 013, namely PU=018, PL=107. If bit b7 is set, this indicates that the insert key 114, FIG. 2, has been actuated to initiate insert mode in the past. See steps 18-3, 18-4 and 18-5, FIG. 8A.

015 If the insert mode has been requested by keyboard #1, then the processing sytem jumps to #FEMI.

ENTRY TO THE INSERT MODE FROM ALPHA BEGINNING AT PU=018, PI=022, #FEMI

PL/025 See the PCU Microprogram Listing.

Locate the operating segment MAU from Keyboard Control word 08, bits B3-B1. See Table 7A.

029 Test bit b6 of the lower byte 03 of the operating segment such as indicated at 4-38, FIG. 4, and as shown at MAL=02, the lower byte in Table 9.

If bit b6 is reset, this indicates that the operating segment is not in the index area, and the processing system jumps to #EDA at PU=018, PL=054.

054 If bit 8 of register PR 2 was set (for example at PU=018, PL=014) then the processing system jumps to #INSMO at PU=018, PL=07E, and from there proceeds to #INSM at PU=006, PL=02A, which is represented at 19-1 in FIG. 9.

CONTINUING WITH THE ALPHA-NUMERIC INPUT PROCESSING AT PU=108, PL=017

Initial Conditions (Keyboard #1, FIG. 4)
MAU=04, MAL=OE. Not in Insert Mode (i.e. bit eight of register PR2 is reset). Input data is in register G. Bit b1 of Word 0A of Control Area 4-35 is set.
PU=018
PL
017 Read the lower byte.
018 Erase any indicator which may be registered at bits B8-B4 of the upper byte of word 08 of the Control Area 4-35 for Keyboard #1. See Table 7A at MAL=08, the upper byte.

01C Bit b1 of word 0A of the control area 4-35 is tested. See Table 7A at MAL=0A, the lower byte. If this bit b1 is set, it indicates that the previous input had been an entry marker control code, so that no straddle correction is necessary. See step 17-6 of FIG. 7A. For the assumed initial condition of b1 set, the processing does not jump to 01F but continues at 01E.

01E Set bit one of register PR2 to indicate that no straddle correction need be considered.

01F Reset bit b1 of word 0A of control area 4-35 (since the information is now available from bit one of register PR2).

022 The processing now continues to determine if the segment currently being addressed on the display unit D1, FIG. 4, is the Index segment. If not, bit b6 of byte 03 of area 4-36 at the operating segment address (i.e. MAU=11$_H$, 12$_H$, ..., or 30$_H$, MAL=02$_H$) will be found to be reset, and processing will jump to #EDA at PL=054. The content of bits b8, b7, and b6 of the lower byte of word 02 is explained in reference in Table 9.
PU=108
PL
058 #EDA Since the insert mode is not operative; the entry marker lower byte of word 00 (MAU=operating segment in Edit Area, MAL=00) at 4-36 is read into MAL, and the content of buffer 4-21 at the currently addressed storage location is read. If the code so read includes a tab, bit 8 will be set.

05A If reading the content of the buffer at the current storage entry address of the storage entry control means (here including word 00, the lower byte, of the operating segment as shown in Table 9) shows that the current storage location of the current line or set of storage locations is designated with the tab code for example, then bit eight of register G is set to correspondingly mark the input data.

05B The end of line (EOL) address for the current entry marker location is read into registers A and MDL.

05C Next it is determined whether the entry marker address in MAL coincides with the EOL address in register A.

05D Jump is made to #CSPO at PU=018, PL=0F4, if the addresses are equal, that is if the storage entry control addresses the end of a line or set of storage locations of buffer 4-21, such as storage location 87 (decimal) of the set designated BL74 in FIG. 4.

060 If the storage entry control addresses the first storage location of a line or set, such as location 48 (decimal) of set BL 74, then the possibility of a word straddle is considered, by a branch to #CFPS at PU=018, PL=0B5.

062 Next a check is made to see if the storage entry control addresses the second character location of the line, such as location 49 (decimal) of BL74.

If so, the possibility of the new paragraph is checked by branching to #CFNP at PU=018, PL=0A6.

If the entry storage control is not addressing the last storage location of a line, or the first or second location of a line, processing continues at PL=065.

065 Register A addresses the first storage location of a buffer line.

066 Test is made to see if a tab code (bit eight set) is associated with the currently addressed storage location. If it is, the data is to be written in such current location. If not, processing continues at the RJCH location, PU=018, PL=069. See steps 17-12 and 17-13 of FIG. 7B.

LEFT JUSTIFY INPUT CHARACTER-REPRESENTING CODED SIGNAL (STEP 17-13, FIG. 7B) BEGINNING AT PU=108, PL=069.

PU=108
PL/069 The storage entry control changes the storage entry address to that corresponding to the preceding storage location of the currently addressed line or set of storage locations, such as that designated as BL74 in FIG. 4.

06A The condition of the preceding storage location is read.

06B The eighth bit position is tested and if no tab code is found, processing continues at PL=072.

072 Next a test is made for a null-representing condition. If found, processing continues at PL=074.
PU=108
PL/074 The content of register A, the address of the second storage location is now compared with the current entry marker or storage entry address found in register MAL.

076 If the second storage location has not been reached, the processor loops back to PU=018, PL=069, and repeats the procedure for the next processing storage location of the current buffer line. The processing loop is repeated until the current MAL address corresponds to the second storage location, for example, such as storage location 49 (decimal) of buffer line BL 74, FIG. 4. See PU=018, PL=074. If a tab code is encountered, processing continues at PU=018, PL=06D.

CHECKING FOR THE COMPOSITE TAB CODE BEGINNING AT PU=018, PL=06D

Initial Conditions MAL has been decremented to look for a null in the next preceding storage location, and MDL contains the data from such storage location.

PL/06D An OAE in register UA is transferred to register A. (A=1010 1110).

06F The content of MDL is subtracted from 174 (decimal). If a period is represented by column two, row fourteen as shown in Table 1A, its code would be 0010 1110. A period and a tab superimposed would thus have the code 1010 1110 or AE (hexadecimal) or 174 (decimal). Accordingly the content (remainder) in register A will be zero, if the newly inspected storage location contains the code 1010 1110, which is the composite tab code. The composite tab code includes a period code so that the tab location can be displayed as a dot by the associated display device. Processing continues at #FTB, PU=018, PL=084.

OPERATION TO CHECK FOR NEW PARAGRAPH; AND IF NOT, TO DELETE ANY SPACE AT THE FIRST CHARACTER POSITION

PU=018, PL=0A6, #CFNP
Initial Conditions

1. The storage entry control (register MAL) is currently addressing the second storage location of a buffer line such as BL74, FIG. 4.
2. Register G contains the input data.
PU=018

PL/0A6 Transfer the input data to register A, shown at the lower left of FIG. 4.

0A7 Compare the content of register A with the content at the next PL address, i.e. with 020.

Jump if the content of A is equal to 20 (hexademical). Referring to Table 1A, it will be seen that the space code has the value 0010 0000 (binary) or 20 (hexadecimal) so that a jump will occur if a space code is present, to PL=08B, that is if a space code is present at the second storage location, signifying a new paragraph. This corresponds to the situation for line DL12 of Table 2.

0AA If the input data is not a space code, the address in MAL is decremented to that of the first storage location, and the content of this location is read.
PU=018

PL/0AC Reset bit six of the data from the first storage location. Thus if a space code were read- 0010 0000, the content of MDL would now be 0000 0000.

0AD Reset bit eight of the content of MDL. If a tab code (bit eight set) had been present at the first storage location, the content of MDL would now be zero.

0AE Thus a jump would result for a space code or a space code and tab code to #UPEM-2, that is to PU=018, PL=08B. Thus, the input data is stored at the first storage location overwriting the space code formerly at this location. This was explained graphically with reference to DL 11 of Table 2.

COMMENT OF TERMINOLOGY

For the exemplary embodiment the term storage device refers to storage locations such as represented at 4-21, FIG. 4. The storage locations of a given set such as those corresponding to buffer line BL74, FIG. 4, have a sequence in the sense of representing successive display locations such as DC1, DC2, DC3, ...., DC40, FIG. 4 and Table 2, of a given display line whether or not the storage locations are physically sequential and whether or not they are found at successive addresses of a sequence.

The first storage location of a buffer line may be the one corresponding to the first normally available character location such as DC1, FIG. 4, or may be the storage location at a left margin tab or the like.

The term null-representing condition may be defined as a condition excluding character-representing codes intended for display, and may include certain tab codes, which furthermore need not be physically part of a unitary storage location.

The term manually operable entry control may refer to a key or the like and associated circuitry for signalling for a desired manually selected change in the storage entry address. An example would be the entry marker scan up and scan down manual controls.

The storage entry control may refer to the various storage and addressing facilities as used in the preceding processing steps including locations 0400 through 0408 and bit b1 of 040A of the keyboard #1 control table of control area 4-35 (see Table 7A), the operating segment control area 4-36 (see Table 9), and addressing registers such as MAU and MAL, and other registers such as registers A and G referred to in the preceding section.

PROGRAM LISTING

The Programs given in Table 6 are set forth on the following pages. The program listings are correlated with the flow diagrams of FIGS. 5–19 as follows:

TABLE 11

| FIG. NO. | Program Identification | Program Listing-Part |
|---|---|---|
| 5 | Start of Keyboard Program | XB |
| 6 | Initialization | XD |
| 7 | Alpha-Numeric Input | XC |
| 8 | Start-End Insert Mode | VIIIG |
| 9 | Insert Mode Data Entry | VIIIA |
| 10 | Insert Paragraph | VIIIB |
| 11 | Correct Line Straddle | XIT |
| 12 | Compress Data Program | XIS |
| 13 | Start and End Field Key | XIM |
| 14 | Delete Field Key | VIIIE |
| 15 | Delete Character Key | VIIID |
| 16 | Scan and Step Scroll-Up Keys | XIC,D |
| 17 | Scan and Step Scroll-Down Keys | XIE,F |
| 18 | Clear Key Input | VIIIH |
| 19 | Transmit Key | XIN |

PROGRAM LISTING

I.–III. OPERATING SYSTEM

I. 000 000 to 000 031
II. 000 032 to 000 0D8
III. 000 0D9 to 002 030
IV. 002 080 to 002 0FF
V. 003 000 to 003 0F6
VI. 004 000 to 004 083

VII. 004 08F to 005 0FF
VIII. Keyboard Programs 006 02A to 00B 0C7
IX. Receive Program 010 000 to 014 0A7
X. Keyboard Input-Alpha-Initialization Program 017 000 to 019 0C9
XI. KEYBOARD EDIT PROGRAMS 01A 000 to 01F 0A1
XII. TRANSMIT PROGRAM 020 010 to 023 02D
XIII. PCU MICRO PROGRAM UA=000 to UA=3FF Alphabetical Listing of Micro-Order Mneumonic Symbols and Macro Instruction Symbols

```
NO.  PU   PL    LABEL  MNEMONIC       CODE     COMMENTS

*THIS OPERATING SYSTEM PROGRAMS OF THE PCU CONSISTS OF THREE PARTS
*PART I IS A LIST OF INDIRECT JUMP ADDRESS AND SOME MISC. ROUTINES
*PART II IS THE IO SERVICE PROGRAMS
*PART III IS THE JOB CONTROL PROGRAMS
*
*
*<<<<<<<<<<<<<<<<<<<<<<<<<<<PART I>>>>>>>>>>>>>>>>>>>>>>>>>>>>>>>>*
* FOLLOWING ARE INDIRECT JUMP ADDRESS FOR PROGRAM LINK PURPOSES
*
*
* INITIALIZATION ROUTINE 0  000  000   .     JMP0            386
     1  000  001   .     @004            004
     2  000  002   .     @08F            08F

* ROUTINE FOR INITIALIZE A SINGLE PORT 3  000  003   .     JMP0            386
     4  000  004   .     @004            004
     5  000  005   .     @0E8            0E8

* IO SERVICE ROUTINE (#SERV) INDIRECT JUMP ADDRESS 6  000  006   .     JMP             9D1
     7  000  007   .     #SERV           032

* END-OF-JOB (#EOJ) INDIRECT JUMP ADDRESS 8  000  008   .     DISIN           BDF
     9  000  009   .     JMP             9D1
    10  000  00A   .     #EOJ            0D9

* ROUTINE FOR EXTRACTING A CHARACTER FROM PORT BUFFER (#GET)

11  000  00B   .     JMP             9D1
    12  000  00C   .     #GET            0C0

* ROUTINE FOR ENTERING A CHARACTER INTO PORT BUFFER (#PUT)

13  000  00D   .     JMP             9D1
    14  000  00E   .     #PUT            0CC

* ENTERING A CHAR. AFTER FOREGROUND PROCESSING 15  000  00F   FGPUT STAS            34F
    16  000  010   .     @000            000
    17  000  011   .     #CHAR           0B8
    18  000  012   .     X(MAL)(UA)      83A
    19  000  013   PORT  NOP             800
    20  000  014   .     SHFTL(MAL)      AB3
    21  000  015   .     SB(MAL)         BF3
    22  000  016   .     X(MAU)(UA)      84A
    23  000  017   .     @002            002
```

| NO. | PU | PL | LABEL | MNEMONIC | CODE | COMMENTS |
|---|---|---|---|---|---|---|
| 24 | 000 | 018 | • | READS | 3BB | |
| 25 | 000 | 019 | • | PORT1 | 3E5 | |
| 26 | 000 | 01A | • | READ | E03 | |
| 27 | 000 | 01B | • | JMP | 9D1 | |
| 28 | 000 | 01C | • | #OUPUT-4 | 04B | |

**

* FOLLOWING TURNS OFF AN UNLISTED INTERRUPTING DEVICE

| 29 | 000 | 01D | NLIST | RL(A) | A51 | |
|---|---|---|---|---|---|---|
| 30 | 000 | 01E | • | OUTC | 39C | |
| 31 | 000 | 01F | • | JMP | 9D1 | |
| 32 | 000 | 020 | • | #SERV | 032 | |

*

| 33 | 000 | 021 | • | ENTRS | 3A8 |
|---|---|---|---|---|---|
| 34 | 000 | 022 | • | @005 | 005 |
| 35 | 000 | 023 | • | @0A0 | 0A0 |
| 36 | 000 | 024 | • | @001 | 001 |
| 37 | 000 | 025 | • | @000 | 000 |

* FOLLOWING INITIALIZES ALL OPERATING SYSTEM CONSTANTS

| 38 | 000 | 026 | START | ENTRS | 3A8 | INITIALIZE IOCA |
|---|---|---|---|---|---|---|
| 39 | 000 | 027 | • | @002 | 002 | |
| 40 | 000 | 028 | • | @060 | 060 | |
| 41 | 000 | 029 | • | @00F | 00F | |
| 42 | 000 | 02A | • | @0FE | 0FE | |
| 43 | 000 | 02B | • | RL(MDL) | A55 | INITIALIZE ACTIVITY WORD |
| 44 | 000 | 02C | • | WRTS' | 3C2 | |
| 45 | 000 | 02D | • | @063 | 063 | |
| 46 | 000 | 02E | • | X(MDL)(UA) | 85A | INITIALIZES SUSPENSION LIST |
| 47 | 000 | 02F | • | @06F | 06F | |
| 48 | 000 | 030 | • | WRTS' | 3C2 | |
| 49 | 000 | 031 | • | @06F | 06F | |

**

*<<<<<<<<<<<<<<<<<<PART II IO SERVICE PROGRAMS>>>>>>>>>>>>>>>>>>>>>>*
* THE IO SERVICE ROUTINE DETERMINES THE TYPE OF INTERRUPT AND JUMPS TO
*       A. REAL TIME CLOCK PROGRAM IF DEVICE IS RTC
*       B. RESET AND DISABLE THE DEVICE IF IO NOT LISTED IN IOC TABLE
*       C. GOES TO USER DEFINED PROGRAM IF IO IS IN FOREGROUND
*       D. INPUT ROUTINE AND UPDATES IO BUFFER POINTER AND
*       E. OUTPUT ROUTINE AND UPDATES IO BUFFER POINTER AND
*       F. IT GOES TO SET UP HOST TIMER AND THEN JUMPS TO
*          THE JOB CONTROL PROGRAM AT THE END OF ALL IO SERVICES
*
* INPUT IO ADDRESS AND DATA AND STORE

| 50 | 000 | 032 | SERV | TRINT | C8E | PROCEED ONLY IF IO REQUESTING |
|---|---|---|---|---|---|---|
| 51 | 000 | 033 | • | #JOB-1 | 0FF | ELSE GO TO JOB PROGRAM |
| 52 | 000 | 034 | • | INPAD | 38A | INPUT IO PORT IDENT |
| 53 | 000 | 035 | • | 'STGS | 363 | STORE IO IDENT AT #PORT |
| 54 | 000 | 036 | • | @000 | 000 | |
| 55 | 000 | 037 | • | #PORT | 013 | |
| 56 | 000 | 038 | • | INPD | 38E | INPUT IO DATA TO A |
| 57 | 000 | 039 | • | STAS' | 350 | STORE DATA AT #CHAR |
| 58 | 000 | 03A | • | #CHAR | 0B8 | |

NO. PU PL LABEL MNEMONIC            CODE   COMMENTS

* GET IOC AND TEST

```
 59 000 03B   .      X(MAL)(G)       832
 60 000 03C   .      SHFTL(MAL)      AB3    CALCULATE IOCA LOWER
 61 000 03D   .      S8(MAL)         BF3
 62 000 03E   .      X(MAU)(UA)      84A    SET UP IOCA UPPER
 63 000 03F   .      @002            002
 64 000 040   .      READS           3BB    OBTAIN IOCW1 OF DEVICE
 65 000 041   .      TSL(MDL)        D45    JUMP IF DEVICE IS RTC
 66 000 042   .      #RTC            0D6
 67 000 043   .      TRL(MDL)        C35    JUMP IF DEVICE NOT LISTED
 68 000 044   .      #NLIST          01D
```

* GET IO STW AND TEST IT

```
 69 000 045   .      PORT1           3E5    READ STW OF DEVICE
 70 000 046   .      READ            E03
 71 000 047   .      TR8(MDL)        CF5    IGNORE IO IF NOT ACTIVE
 72 000 048   .      #SERV           032
 73 000 049   .      TS6(MDL)        DD5    JUMP IF MARKED FOR FROEGROUND
 74 000 04A   .      #FOREG          0F1
 75 000 04B   .      X(G)(UA)        82A    SET UP G. BIT 2 = 1 IS FOR IO
 76 000 04C   .      @002            002
```

* DETERMINE IO IS INPUTTING OR OUTPUTTING

```
 77 000 04D   .      TR7(MDL)        CE5
 78 000 04E   .      #INPUT          056    JUMP TO INPUT IF BIT UNMARKED
 79 000 04F   OUPUT  S1(G)           B82    MARK BIT 1 OF G FOR XMIT
 80 000 050   .      TR7(MDU)        CE6    JUMP IF NO UNDERFLOW
 81 000 051   .      #POINT          058    ELSE SEND SYNC CODE
 82 000 052   .      X(A)(UA)        81A
 83 000 053   .      @016            016    USASCII SYNC CODE
 84 000 054   .      JMP             9D1    GO TO OUTPUT CHARACTER
 85 000 055   .      #OUTCH          0B1
 86 000 056   INPUT  TS7(MDU)        DE6    JUMP IF BUFFER OVERFLOWED
 87 000 057   .      #SERV           032    ELSE CONTINUE TO POINT ROUTINE
```

*END OF GENERAL SERVICE
**

*THE FOLLOWING CALCULATES IO OR USER PORT BUFFER POINTER ADDRESS
*AND UPDATES THE BUFFER POINTER
*FOLLOWING PROGRAMS MAY UTILIZE THIS ROUTINE
*      A. IO INPUT TO ITS PORT BUFFER (INPUT)
*      B. IO OUTPUT FROM ITS PORT BUFFER (OUPUT)
*      C. USER POPS A CHAR. FROM PORT BUFFER (GET)
*      D. USER PUSHES A CHAR. INTO HIS PORT BUFFER (PUT)
*      E. "GET" AND "PUT" BY THE JOB CONTROL PROGRAM
*FOR IO SERVICE ROUTINE THE STW BYTES OF PORT HAS BEEN SWITCHED
*
*FOLLOWING OBTAINS THE BUFFER POINTER. STWA IS IN MA AND STWC IO IN MD
*CONTENT OF G REGISTER HAS FOLLOWING MEANING
*

|   | BIT =0 | BIT =1 |
|---|--------|--------|
| G1 | WRITE INTO BUFFER | READ FROM BUFFER |
| G2 | JOB & APPLICATION PROG'S | IO SERVICE PROGRAM |
| G3 | JOB PROGRAM | #GET & #PUT ROUTINES |
| G4 | - | - |
| G5 | - | - |
| G6 | - | NO CHARACTER FOUND (#GET) |
| G7 | - | - |
| G8 | - | BUFFER FULL (#PUT) |

```
NO.  PU  PL  LABEL  MNEMONIC        CODE     COMMENTS
*
*
*I/O STATUS WORD BIT ASSIGNMENTS
*
*   BIT         STATUS WORD UPPER            STATUS WORD LOWER
*-------------------------------------------------------------------
*   BITS 1-5    USER BUFFER POINTER          I/O BUFFER POINTER
*   BIT 6       JOB NEEDED FOR USER (1)      I/O IN FOREGROUND (1)
*   BIT 7       BUFFER TO OVER/UNDERFLOW     XMIT (1);  REC (0)
*   BIT 8       BUFFER CONTAINS EOM (1)      I/O ACTIVE (1); INACTIVE (0)
**
    88 000  058   POINT  X(A)(UA)       81A   OBTAIN POINTER RELATIVE
    89 000  059     .    @01F           01F   FROM MDL
    90 000  05A     .    AND(MDL)       9F5
    91 000  05B     .    INCR(A)        A21   ADD TWO TO POINTER RELATIVE
    92 000  05C     .    INCR(A)        A21
    93 000  05D     .    X(MDU)(A)      861
    94 000  05E     .    X(A)(MAL)      813   GET 3 MSB OF POINTER
    95 000  05F     .    R1(A)          B01
    96 000  060     .    ADD(MDU)       956   OBTAIN ABSOLUTE POINTER
    97 000  061     .    X(MDU)(A)      861   AND STORE IN MDU TEMPO

*FOLLOWING INCREMENTS POINTER IN STW BY DETECTING END OF BUFFER
*THE FOUR POSSIBLE BUFFER SIZES ARE FIRST TESTED 98 000  062   BFSIZ  TS8(MAL)       DF3
    99 000  063     .    #BFR34         06C
   100 000  064   BFR12  X(A)(UA)       81A
   101 000  065     .    @00F           00F   BUFFER 1 HAS 16 CHARAC.
   102 000  066   BFR1   TR1(MAL)       C83
   103 000  067     .    #CMPR          072
   104 000  068   BFR2   X(A)(UA)       81A   BUFFER 2 HAS 2 CHARAC.
   105 000  069     .    @001           001
   106 000  06A     .    JMP            9D1
   107 000  06B     .    #CMPR          072
   108 000  06C   BFR34  X(A)(UA)       81A
   109 000  06D     .    @003           003   BUFFER 3 HAS 4 CHARAC
   110 000  06E   BFR3   TR1(MAL)       C83
   111 000  06F     .    #CMPR          072
   112 000  070   BFR4   X(A)(UA)       81A   BUFFER 4 HAS 32 CHARAC.
   113 000  071     .    @01F           01F

*FOLLOWING COMPARES FOR END OF BUFFER 114 000  072   CMPR   SUB(MDL)       925   SUBTRACT SIZE FROM POINTER
   115 000  073     .    AND(UA)        9FA
   116 000  074     .    @01F           01F   ELIMINATE MISC BITS
   117 000  075     .    TSY(A)         D31   JUMP IF NOT THE END OF BUFFER
   118 000  076     .    #INCR          07C
   119 000  077     .    X(A)(MDL)      815   END OF BUFFER; INITIALIZE POIN
   120 000  078     .    AND(UA)        9FA
   121 000  079     .    @0E0           0E0
   122 000  07A     .    X(MDL)(A)      851
   123 000  07B     .    DECR(MDL)      AF5

* INCREMENT BUFFER POINTER 124 000  07C   INCR   INCR(MDL)      A25   INCREMENT POINTER
   125 000  07D     .    X(A)(MDU)      816   STORE POINTER IN A TEMPO
   126 000  07E     .    R1(MAL)        B03
   127 000  07F     .    TR2(G)         C92   DETERMINE STW BYTE TO STORE
   128 000  080     .    #+3            082   LOWER BYTE FOR IO. G3=1
   129 000  081     .    S1(MAL)        B83   UPPER BYTE FOR USER. G3=1
   130 000  082     .    WRTC           3CB   WRITE STW BYTE
```

| NO. | PU | PL | LABEL | MNEMONIC | CODE | COMMENTS |
|---|---|---|---|---|---|---|
| | | | | *FOLLOWING DETERMINES THE DIFFERENCE OF BUFFER POINTERS | | |
| 131 | 000 | 083 | . | X(MDU)(A) | 861 | POINTER VALUE TO MDU |
| 132 | 000 | 084 | . | X(A)(MDL) | 815 | SLW BYTE TO A |
| 133 | 000 | 085 | . | S1(MAL) | B83 | |
| 134 | 000 | 086 | . | TR2(G) | C92 | DETERMINE IO OR USER |
| 135 | 000 | 087 | . | #+3 | 089 | |
| 136 | 000 | 088 | . | R1(MAL) | B03 | |
| 137 | 000 | 089 | . | READC | E00 | OBTAIN OTHER SLWC |
| 138 | 000 | 08A | . | SUB(MDL) | 925 | |
| 139 | 000 | 08B | . | X(MDL)(MDU) | 856 | |
| 140 | 000 | 08C | . | AND(UA) | 9FA | |
| 141 | 000 | 08D | . | @01F | 01F | |
| 142 | 000 | 08E | . | READU | E02 | STATUS WORD UPPER |
| 143 | 000 | 08F | . | TS2(G) | D92 | JUMP IF IO SERVICE |
| 144 | 000 | 090 | . | #IO | 09E | |

*FOR #JOB; #GET;AND #PUT DECIDE IF MORE JOB REMAIN
*AND IF THE OVERFLOW INDICATOR SHOULD BE SET

| 145 | 000 | 091 | . | R7(MDU) | B66 | RESET OVERFLOW BIT |
|---|---|---|---|---|---|---|
| 146 | 000 | 092 | . | TSY(A) | D31 | |
| 147 | 000 | 093 | . | #+8 | 09A | |
| 148 | 000 | 094 | . | TS1(G) | D82 | |
| 149 | 000 | 095 | . | #+3 | 097 | |
| 150 | 000 | 096 | . | S8(G) | BF2 | SET OVERFLOW INDICATOR |
| 151 | 000 | 097 | . | R6(MDU) | B56 | RESET JOB INDICATOR |
| 152 | 000 | 098 | . | JMP | 9D1 | |
| 153 | 000 | 099 | . | #WRTU | 0AA | |
| 154 | 000 | 09A | . | TR1(G) | C82 | NO MORE JOB IF XMIT |
| 155 | 000 | 09B | . | #-3 | 097 | |
| 156 | 000 | 09C | . | JMP | 9D1 | |
| 157 | 000 | 09D | . | #WRTU | 0AA | |

*FOR IO SERVICE; DETERMINE IF OVERFLOW HAS OCCURRED AND ALSO
*IF A NEW JOB IS CREATED DUE TO INTERRUPT

| 158 | 000 | 09E | IO | TRL(A) | C31 | |
|---|---|---|---|---|---|---|
| 159 | 000 | 09F | . | #OVFL | 0A8 | |
| 160 | 000 | 0A0 | . | TR1(G) | C82 | JUMP IF INPUTTING |
| 161 | 000 | 0A1 | . | #JOBQ | 0A9 | |
| 162 | 000 | 0A2 | . | TS8(MDU) | DF6 | OUTPUTTING; JUMP IF EOM |
| 163 | 000 | 0A3 | . | #BFRAD | 0AB | |
| 164 | 000 | 0A4 | . | TR4(A) | CB1 | JUMP IF DIFFERENCE >8 |
| 165 | 000 | 0A5 | . | #BFRAD | 0AB | |
| 166 | 000 | 0A6 | . | JMP | 9D1 | ELSE PORT HAS NEW JOB |
| 167 | 000 | 0A7 | . | #+3 | 0A9 | |
| 168 | 000 | 0A8 | OVFL | S7(MDU) | BE6 | MARK OVERFLOW BIT |
| 169 | 000 | 0A9 | JOBQ | S6(MDU) | BD6 | MARK JOB BIT |
| 170 | 000 | 0AA | WRTU | WRTU | E06 | WRITE STATUS WORD UPPER |
| 171 | 000 | 0AB | BFRAD | X(MAL)(MDL) | 835 | |
| 172 | 000 | 0AC | . | TR1(G) | C82 | JUMP IF CHARAC. INTO BFR |
| 173 | 000 | 0AD | . | #WRITE | 0B7 | |

*FOLLOWING READS CHARACTER FROM BUFFER AND EITHER OUTPUTS THE
*CHARACTER OR GOES TO USER PROGRAM

| 174 | 000 | 0AE | READ | LDA" | 327 | READ CHARAC FROM BUFFER |
|---|---|---|---|---|---|---|
| 175 | 000 | 0AF | . | TR2(G) | C92 | JUMP IF USER PROGRAM |
| 176 | 000 | 0B0 | . | #RETRN | 0BB | ELSE OUTPUT THE CHARAC. |
| 177 | 000 | 0B1 | OUTCH | LDGS | 359 | OBTAIN PORT IDENT |
| 178 | 000 | 0B2 | . | @000 | 000 | |
| 179 | 000 | 0B3 | . | #PORT | 013 | |
| 180 | 000 | 0B4 | . | OUTD | 398 | OUTPUT A TO IO |

| NO. | PO | PL | LABEL | MNEMONIC | CODE | COMMENTS |
|---|---|---|---|---|---|---|
| 181 | 000 | 0B5 | . | JMP | 9D1 | GO BACK TO SERV |
| 182 | 000 | 0B6 | . | #SERV | 032 | |

* FOLLOWING WRITES NEW CHARACTER INTO BUFFER

| NO. | PO | PL | LABEL | MNEMONIC | CODE | COMMENTS |
|---|---|---|---|---|---|---|
| 183 | 000 | 0B7 | WRITE | ENTRM" | 3A5 | GET CHAR. AND WRITE IT |
| 184 | 000 | 0B8 | CHAR | NOP | 800 | LOCATION HAS CHARACTER |
| 185 | 000 | 0B9 | . | TS2(G) | D92 | JUMP TO SERV IF IO |
| 186 | 000 | 0BA | . | #SERV | 032 | |
| 187 | 000 | 0BB | RETRN | TS3(G) | DA2 | RETURN TO #GET & #PUT |
| 188 | 000 | 0BC | . | #SUBR | 0CB | |
| 189 | 000 | 0BD | . | JMPO | 386 | RETURN TO #JOB |
| 190 | 000 | 0BE | . | @002 | 002 | |
| 191 | 000 | 0BF | . | #GOUSR | 008 | |

*END OF BUFFER CONTROL ROUTINES
**
*FOLLOWING GETS A CHARACTER FROM IO BUFFER FOR USER

| NO. | PO | PL | LABEL | MNEMONIC | CODE | COMMENTS |
|---|---|---|---|---|---|---|
| 192 | 000 | 0C0 | GET | X(G)(UA) | 82A | SET UP G FOR #GET |
| 193 | 000 | 0C1 | . | @005 | 005 | |
| 194 | 000 | 0C2 | . | PORTAD | 3DD | GET IOCA THEN STWA |
| 195 | 000 | 0C3 | . | READ | E03 | |
| 196 | 000 | 0C4 | . | X(A)(MDL) | 815 | COMPARE BUFFER POINTERS |
| 197 | 000 | 0C5 | . | SUB(MDU) | 926 | |
| 198 | 000 | 0C6 | . | AND(UA) | 9FA | RID MISC. BITS |
| 199 | 000 | 0C7 | . | @01F | 01F | |
| 200 | 000 | 0C8 | . | TSY(A) | D31 | |
| 201 | 000 | 0C9 | . | #PUT+6 | 0D2 | |
| 202 | 000 | 0CA | . | S6(G) | BD2 | NO CHAR. IN BUFFER |
| 203 | 000 | 0CB | SUBR | SUBR | 198 | RETURN |

* FOLLOWING LOADS A CHARACTER INTO PORT BUFFER FOR USER PROGRAM

| NO. | PO | PL | LABEL | MNEMONIC | CODE | COMMENTS |
|---|---|---|---|---|---|---|
| 204 | 000 | 0CC | PUT | X(G)(UA) | 82A | SET UP G FOR #PUT |
| 205 | 000 | 0CD | . | @004 | 004 | |
| 206 | 000 | 0CE | . | STAS | 34F | PRESERVE CHARACTER |
| 207 | 000 | 0CF | . | @000 | 000 | |
| 208 | 000 | 0D0 | . | #CHAR | 0B8 | |
| 209 | 000 | 0D1 | . | PORTAD | 3DD | |
| 210 | 000 | 0D2 | . | READ | E03 | |
| 211 | 000 | 0D3 | . | X(MDL)(MDU) | 856 | |
| 212 | 000 | 0D4 | . | JMP | 9D1 | |
| 213 | 000 | 0D5 | . | #POINT | 058 | |

**
*FOLLOWING IS ROUTINE FOR THE REAL TIME CLOCK

| NO. | PO | PL | LABEL | MNEMONIC | CODE | COMMENTS |
|---|---|---|---|---|---|---|
| 214 | 000 | 0D6 | RTC | JMPO | 386 | |
| 215 | 000 | 0D7 | . | @004 | 004 | |
| 216 | 000 | 0D8 | . | @020 | 020 | |

**

*>>>>>>>>>>>>>>>>>>>>>>PART III JOB CONTROL PROGRAMS<<<<<<<<<<<<<<<<<<*
*THIS PROGRAM IS ENTERED UPON COMPLETION OF THE SERVICE ROUTINE
*PROGRAM CONTAINS FOLLOWING ROUTINES
*     1. GENERAL SEARCH
*     2. PRIORITY LEVEL COMPARE
*     3. PORT TIMER TIME OUT SEARCH
*     4. PORT BUFFER SEARCH
*     5. ACTIVITY UPDATE
*     6. END OF JOB ROUTINE

```
NO.  PU  PL   LABEL  MNEMONIC           CODE    COMMENTS

*      7. RESTORE CPU FROM STACK ROUTINE
*      8. RESTORE CPU FROM MEMORY ROUTINE
*      9. SAVE STACK INTO MEMORY ROUTINE
*FOLLOWING LOCATIONS IN S IS USED
*      0260         IOCA
*      0262         JOB SCANNER
*      0263         ACTIVITY WORD
*      026F         SUSPENSION TABLE LIST POINTER
*      0270 TO 027F     SUSPENSION TABLE LIST
*      0280 TO 02FF     IOC TABLE
*      0300 TO 03FF     SUSPENSION TABLE
**
*THE END-OF-JOB ROUTINE IS USED AT THE COMPLETION OF AN USER PROGRAM
*IT RESETS THE ACTIVITY WORD IN LOCATION (0263)
*CHANGES IOCA BY DE-LIST THE LAST SUSPENDED PROGRAM IF ANY
*OR BY ENTERING FXX INTO LOCATION 0260
*AT THE END OF THIS ROUTINE IT GOES TO JOB SEARCH ROUTINE
*
 217 000   0D9   EOJ   DISIN              BDF
 218 000   0DA    •    READS"             3B9    GET LIST POINTER
 219 000   0DB    •    @002               002
 220 000   0DC    •    @06F               06F
 221 000   0DD    •    DECR(MDL)          AF5    TEST IF ONLY ENTRY OF LIST
 222 000   0DE    •    TS5(MDL)           DC5
 223 000   0DF    •    #DEQUE             0E6
 224 000   0E0    •    X(MDL)(UA)         85A    NO MORE; INITIALIZE POINTER
 225 000   0E1    •    @06F               06F
 226 000   0E2    •    WRTS               3C3
 227 000   0E3    •    SL(MDU)            AC6    ENTER LOWEST PRIORITY INTO IOC
 228 000   0E4    •    JMP                9D1
 229 000   0E5    •    #DEQUE+3           0E9

*FOLLOWING DECREMENTS LIST POINTER AND LOADS IOCA WITH SUSP.D PROG.

230 000   0E6   DEQUE WRTS               3C3
 231 000   0E7    •    X(MAL)(MDL)        835
 232 000   0E8    •    READS              3BB    READ SUSPENDED IOC FROM LIST
 233 000   0E9    •    WRTS"              3C2
 234 000   0EA    •    @060               060
 235 000   0EB    •    RL(MDL)            A55    RESET ACTIVITY WORD
 236 000   0EC    •    WRTS"              3C2
 237 000   0ED    •    @063               063
 238 000   0EE    •    JMP0               386    TEST INTERRUPT
 239 000   0EF    •    @001               001
 240 000   0F0    •    #NOJOB             058

* ROUTINE TO CALL A FORE GROUND PROGRAM WITH VALIDITY CHECK.

241 000   0F1   FOREG R1(MAL)            B03
 242 000   0F2    •    DECR(MAL)          AF3
 243 000   0F3    •    RPT5               3F6
 244 000   0F4    •    READ               E03
 245 000   0F5    •    X(MDL)(A)          851
 246 000   0F6    •    X(A)(UA)           81A
 247 000   0F7    •    @006               006
 248 000   0F8    •    SUB(MDU)           926
 249 000   0F9    •    TR8(A)             CF1
 250 000   0FA    •    @000               000
 251 000   0FB    •    X(A)(MDL)          815
 252 000   0FC    •    JMPI"              37F
 253 000   0FD    •    NOP                800
 254 000   0FE    •    NOP                800
 255 000   0FF    •    NOP                800

**
```

| NO. | PU | PL | LABEL | MNEMONIC | CODE | COMMENTS |
|---|---|---|---|---|---|---|

*FOLLOWING IS THE JOB SCANNER CONTROL

| 256 | 001 | 000 | JOB | ENTRS | 3A8 | INITIALIZE SCNR TO |
| 257 | 001 | 001 | . | @002 | 002 | BEGINING OF IOC TABLE (0290) |
| 258 | 001 | 002 | . | @062 | 062 | |
| 259 | 001 | 003 | . | @002 | 002 | |
| 260 | 001 | 004 | . | @090 | 090 | |
| 261 | 001 | 005 | RDIOC | X(G)(MDL) | 825 | GET IOCA POINTED BY SCNR |
| 262 | 001 | 006 | . | RDSI" | 3B2 | |
| 263 | 001 | 007 | . | TSY(MDL) | D35 | TO LEVEL COMPARE IF |
| 264 | 001 | 008 | . | #LEVEL | 01B | IO IS IN USE |
| 265 | 001 | 009 | UPSCN | INCR(MAL) | A23 | IO NOT USED |
| 266 | 001 | 00A | . | READS | 3BB | GET IOCW2 |
| 267 | 001 | 00B | . | TRL(MDL) | C35 | TEST IOCW2 |
| 268 | 001 | 00C | . | #IDLE | 013 | NO MORE IO; GO TO IDLE |
| 269 | 001 | 00D | . | X(MAU)(UA) | 84A | |
| 270 | 001 | 00E | . | @002 | 002 | |
| 271 | 001 | 00F | . | WRTS' | 3C2 | WRITE NEW SCNR |
| 272 | 001 | 010 | . | @062 | 062 | |
| 273 | 001 | 011 | . | JMP | 9D1 | GO TO READ IOC |
| 274 | 001 | 012 | . | #RDIOC | 005 | |
| 275 | 001 | 013 | IDLE | WPNLL | E30 | |
| 276 | 001 | 014 | . | ENTRS | 3A8 | |
| 277 | 001 | 015 | . | @002 | 002 | |
| 278 | 001 | 016 | . | @06F | 06F | |
| 279 | 001 | 017 | . | @002 | 002 | |
| 280 | 001 | 018 | . | @06F | 06F | |
| 281 | 001 | 019 | . | JMP | 9D1 | |
| 282 | 001 | 01A | . | #JOB | 000 | |

*END OF GENERAL SEARCH
**

*FOLLOWING COMPARES PRIORITY LEVELS OF SCNR AGAINST IOCA
*HIGHEST LEVEL IS 0000; LOWEST LEVEL IS 1111. LEVEL IS IN IOCW2O
*AT THIS TIME SCNR IS IN MA POINTING TO IOCW1
*

| 283 | 001 | 01B | LEVEL | INCR(MAL) | A23 | READ IOCW2 |
| 284 | 001 | 01C | . | READS | 3BB | |
| 285 | 001 | 01D | . | X(A)(MDU) | 816 | LEVEL OF SCNR TO A |
| 286 | 001 | 01E | . | READS' | 3BA | GET LEVEL OF IOCA |
| 287 | 001 | 01F | . | @060 | 060 | |
| 288 | 001 | 020 | . | SUB(MDU) | 926 | (L. SCNR)-(L. IOCA) TO A |
| 289 | 001 | 021 | . | TR8(A) | CF1 | JUMP TO RESTORE IF SCNR LESS |
| 290 | 001 | 022 | . | #RSUME | 065 | SCNR HIGHER PRIORITY |

*END OF PRIORITY LEVEL COMPARE
*FOLLOWING SEARCHES FOR TIME OUT AND A JOB IN BUFFER

| 291 | 001 | 023 | . | RDSI' | 3B0 | |
| 292 | 001 | 024 | . | @062 | 062 | |
| 293 | 001 | 025 | . | PORT1 | 3E5 | |
| 294 | 001 | 026 | . | READ | E03 | |
| 295 | 001 | 027 | . | TR8(MDL) | CF5 | NO JOB IF NOT ACTIVE |
| 296 | 001 | 028 | . | #NOJOB | 058 | |
| 297 | 001 | 029 | . | TS7(G) | DE2 | JUMP IF A KEYBOARD |
| 298 | 001 | 02A | . | #KBD | 050 | |
| 299 | 001 | 02B | . | AG-MD | 3EB | |
| 300 | 001 | 02C | . | DDMAL | 3FB | GET RTC TRAP ADDRESS |
| 301 | 001 | 02D | . | DDMAL | 3FB | |
| 302 | 001 | 02E | . | READ | E03 | |
| 303 | 001 | 02F | . | TR8(MDU) | CF6 | JMP IF NO TIME OUT |
| 304 | 001 | 030 | . | #BACKP-2 | 035 | |

| NO. | PU | PL | LABEL | MNEMONIC | CODE | COMMENTS |
|---|---|---|---|---|---|---|
| 305 | 001 | 031 | TMOP | R8(MDU) | B76 | RESET TIME OUT BIT |
| 306 | 001 | 032 | . | WRTU | E06 | |
| 307 | 001 | 033 | . | JMP | 9D1 | |
| 308 | 001 | 034 | . | #USERP | 047 | |
| 309 | 001 | 035 | . | TR6(G) | CD2 | TEST IF BUFFER HAS JOB |
| 310 | 001 | 036 | . | #NOJOB | 058 | |
| 311 | 001 | 037 | BACKP | TR7(A) | CE1 | |
| 312 | 001 | 038 | . | #BACKA | 040 | |
| 313 | 001 | 039 | . | DIMAL | 3FD | |
| 314 | 001 | 03A | . | DIMAL | 3FD | |
| 315 | 001 | 03B | . | X(MDU)(G) | 862 | |
| 316 | 001 | 03C | . | R6(MDU) | B56 | |
| 317 | 001 | 03D | . | WRTU | E06 | RESET JOB BIT FOR XMIT |
| 318 | 001 | 03E | . | DDMAL | 3FB | |
| 319 | 001 | 03F | . | DDMAL | 3FB | |
| 320 | 001 | 040 | BACKA | DDMAL | 3FB | GET BACKGROUND PROGRAM |
| 321 | 001 | 041 | . | DDMAL | 3FB | |
| 322 | 001 | 042 | . | READ | E03 | |
| 323 | 001 | 043 | . | S8(MDU) | BF6 | |
| 324 | 001 | 044 | . | TR7(A) | CE1 | JUMP IF IN RECEIVE |
| 325 | 001 | 045 | . | #USERP | 047 | |
| 326 | 001 | 046 | . | R8(MDU) | B76 | |

*FOLLOWING STORES USER PROGRAM COUNT TO USRPU AND USRPL

| NO. | PU | PL | LABEL | MNEMONIC | CODE | COMMENTS |
|---|---|---|---|---|---|---|
| 327 | 001 | 047 | USERP | X(A)(MDU) | 816 | |
| 328 | 001 | 048 | . | WRTS" | 3C1 | |
| 329 | 001 | 049 | . | @002 | 002 | |
| 330 | 001 | 04A | . | #USRPL | 00B | |
| 331 | 001 | 04B | . | STAS' | 350 | |
| 332 | 001 | 04C | . | #USRPU | 009 | |
| 333 | 001 | 04D | . | RL(G) | A52 | |
| 334 | 001 | 04E | . | JMP | 9D1 | GO TO DECIDE IF THE |
| 335 | 001 | 04F | . | #SOJ | 066 | STACK SHOULD BE SAVED |

*END OF USER PROGRAM COUNT ROUTINE
*FOLLOWING CALLS KEYBOARD PROGRAM

| NO. | PU | PL | LABEL | MNEMONIC | CODE | COMMENTS |
|---|---|---|---|---|---|---|
| 336 | 001 | 050 | KBD | TR6(MDU) | CD6 | TEST JOB BIT |
| 337 | 001 | 051 | . | #NOJOB | 058 | |
| 338 | 001 | 052 | . | X(A)(UA) | 81A | |
| 339 | 001 | 053 | . | @086 | 086 | KBD PROGRAM COUNT UPPER |
| 340 | 001 | 054 | . | X(MDL)(UA) | 85A | KBD PROGRAM COUNT LOWER |
| 341 | 001 | 055 | . | @000 | 000 | |
| 342 | 001 | 056 | . | JMP | 9D1 | |
| 343 | 001 | 057 | . | #USERP+1 | 048 | |

*FOLLOWING HANDLES THE CASE THERE THERE IS NO JOB FOUND

| NO. | PU | PL | LABEL | MNEMONIC | CODE | COMMENTS |
|---|---|---|---|---|---|---|
| 344 | 001 | 058 | NOJOB | TRINT | C8E | |
| 345 | 001 | 059 | . | #+5 | 05D | |
| 346 | 001 | 05A | . | JMPO | 386 | |
| 347 | 001 | 05B | . | @000 | 000 | |
| 348 | 001 | 05C | . | #SERV | 032 | |
| 349 | 001 | 05D | . | READS" | 3B9 | |
| 350 | 001 | 05E | . | @002 | 002 | |
| 351 | 001 | 05F | . | @062 | 062 | GET SCNR VALUE |
| 352 | 001 | 060 | . | INCR(MDL) | A25 | |
| 353 | 001 | 061 | . | INCR(MDL) | A25 | |
| 354 | 001 | 062 | . | WRTS | 3C3 | WRITE NEW SCNR INTO S |
| 355 | 001 | 063 | . | JMP | 9D1 | |
| 356 | 001 | 064 | . | #UPSCN+2 | 00B | TO READ NEW IOC |

**

```
NO.  PU  PL  LABEL  MNEMONIC      CODE   COMMENTS

*THE ACTIVITY UPDATE ROUTINE IS USED AFTER AJOB IS FOUND IN PORT
*ROUTIN DOES FOLLOWING:
* DETERMINES IF CURRENT IOCA SHOULD BE SUSPENDED
* SUSPEND IOCA WHEN NECESSARY
* UPDATES SUSPENSION LIST AND ITS POINTER
* LOADS IN NEW IOCA
* CALLS USER PROGRAM WITH DATA AND PORT IDENTIFICATION
*
*FOR RESTORATION; DETERMINE TO RESTORE FROM STACK OR MEMORY
*FOR NEW JOB; DETERMINE IF SAVE IS NEEDED. BOTH BASED ON ACTIVITY WD
*
*DETERMINE CPU WAS ACTIVE OR NOT 357  001  065  RSUME  SL(G)         AC2    INDICATOR FOR #RSTOR
358  001  066  SOJ    READS"        3B9    GET ACTIVITY WORD
359  001  067    •    @002          002
360  001  068    •    @063          063
361  001  069    •    TRI(MDL)      C85    JUMP IF INACTIVE; TO
362  001  06A    •    #MKCPU        06F    MARK CPU TO ACTIVE
363  001  06B    •    TRI(G)        C82    ACTIVE; JUMP IF NEW JOB
364  001  06C    •    #STKAD        078    GO TO GET MEMORY ADDRESS
365  001  06D    •    JMP           9D1    ACTIVE; GO TO LOAD CPU
366  001  06E    •    #LDCPU        0AE    FROM STACK

*MARK CPU ACTIVE FOR BOTH #RSTOR AND NEW JOB 367  001  06F  MKCPU  SL(MDL)       AC5    MARK CPU ACTIVE
368  001  070    •    X(MAU)(UA)    84A
369  001  071    •    @002          002
370  001  072    •    WRTS          3C3

*GO TO UPDATE SUSPENSION LIST FOR NEW JOB 371  001  073    •    TSI(G)        D82    FOR RESUME GO TO
372  001  074    •    #STKAD        078    RESTORE FROM MEMORY
373  001  075    •    JMP0          386    FOR #SOJ GO TO
374  001  076    •    @001          001    SUSPEND OLD JOB
375  001  077    •    #SIOCA        0DE

*FOR OLD JOB; GET MEMORY ADDRESS FOR MEMORY SAVE OR RESTORE (03X0)

376  001  078  STKAD  READS"        3B9    READ SUSPENSION LIST PTR
377  001  079    •    @002          002
378  001  07A    •    @06F          06F
379  001  07B    •    SHFTL(MDL)    AB5    MULTIPLY BY 16
380  001  07C    •    RPT3          3F8
381  001  07D    •    X(MAL)(MDL)   835    MEMORY ADDRESS LOWER
382  001  07E    •    X(MAU)(UA)    84A    MEMORY ADDRESS UPPER
383  001  07F    •    @003          003
384  001  080    •    TRI(G)        C82    JUMP TO SAVE FOR #SOJ
385  001  081    •    #SAVE         0B2

**

*FOLLOWING READS MEMORY AND STORES IT INTO STACK THEN THE CPU 386  001  082  TOSTK  READS         3BB
387  001  083    •    WSTK(0)       E50    0
388  001  084    •    INCR(MAL)     A23
389  001  085    •    READS         3BB
390  001  086    •    WSTK(1)       E51    1
391  001  087    •    INCR(MAL)     A23
392  001  088    •    READS         3BB
```

| NO. | PO | PL | LABEL | MNEMONIC | CODE | COMMENTS |
|---|---|---|---|---|---|---|
| 393 | 001 | 089 | . | WSTK(2) | E52 | 2 |
| 394 | 001 | 08A | . | INCH(MAL) | A23 | |
| 395 | 001 | 08B | . | READS | 3BB | |
| 396 | 001 | 08C | . | WSTK(3) | E53 | 3 |
| 397 | 001 | 08D | . | INCH(MAL) | A23 | |
| 398 | 001 | 08E | . | READS | 3BB | |
| 399 | 001 | 08F | . | WSTK(4) | E54 | 4 |
| 400 | 001 | 090 | . | INCH(MAL) | A23 | |
| 401 | 001 | 091 | . | READS | 3BB | |
| 402 | 001 | 092 | . | WSTK(5) | E55 | 5 |
| 403 | 001 | 093 | . | INCH(MAL) | A23 | |
| 404 | 001 | 094 | . | READS | 3BB | |
| 405 | 001 | 095 | . | WSTK(6) | E56 | 6 |
| 406 | 001 | 096 | . | INCH(MAL) | A23 | |
| 407 | 001 | 097 | . | READS | 3BB | |
| 408 | 001 | 098 | . | WSTK(7) | E57 | 7 |
| 409 | 001 | 099 | . | INCH(MAL) | A23 | |
| 410 | 001 | 09A | . | READS | 3BB | |
| 411 | 001 | 09B | . | WSTK(8) | E58 | 8 |
| 412 | 001 | 09C | . | INCH(MAL) | A23 | |
| 413 | 001 | 09D | . | READS | 3BB | |
| 414 | 001 | 09E | . | WSTK(9) | E59 | 9 |
| 415 | 001 | 09F | . | INCH(MAL) | A23 | |
| 416 | 001 | 0A0 | . | READS | 3BB | |
| 417 | 001 | 0A1 | . | WSTK(10) | E5A | 10 |
| 418 | 001 | 0A2 | . | INCH(MAL) | A23 | |
| 419 | 001 | 0A3 | . | READS | 3BB | |
| 420 | 001 | 0A4 | . | WSTK(11) | E5B | 11 |
| 421 | 001 | 0A5 | . | INCH(MAL) | A23 | |
| 422 | 001 | 0A6 | . | READS | 3BB | |
| 423 | 001 | 0A7 | . | WSTK(12) | E5C | 12 |
| 424 | 001 | 0A8 | . | INCH(MAL) | A23 | |
| 425 | 001 | 0A9 | . | READS | 3BB | |
| 426 | 001 | 0AA | . | WSTK(13) | E5D | 13 |
| 427 | 001 | 0AB | . | DIMAL | 3FD | |
| 428 | 001 | 0AC | . | READS | 3BB | |
| 429 | 001 | 0AD | . | WSTK(15) | E5F | 15 |
| 430 | 001 | 0AE | LDCPU | RSTK(15) | E4F | |
| 431 | 001 | 0AF | . | R6(MDL) | B55 | RESET INTERRUPT DISABLE |
| 432 | 001 | 0B0 | . | WSTK(15) | E5F | |
| 433 | 001 | 0B1 | . | LDCPU | 058 | LOAD CPU FROM STACK |

*FOLLOWING READS STACK AND SAVES IT INTO MEMORY

| 434 | 001 | 0B2 | SAVE | RSTK(0) | E40 | 0 |
|---|---|---|---|---|---|---|
| 435 | 001 | 0B3 | . | WRTS | 3C3 | |
| 436 | 001 | 0B4 | . | INCH(MAL) | A23 | |
| 437 | 001 | 0B5 | . | RSTK(1) | E41 | 1 |
| 438 | 001 | 0B6 | . | WRTS | 3C3 | |
| 439 | 001 | 0B7 | . | INCH(MAL) | A23 | |
| 440 | 001 | 0B8 | . | RSTK(2) | E42 | 2 |
| 441 | 001 | 0B9 | . | WRTS | 3C3 | |
| 442 | 001 | 0BA | . | INCH(MAL) | A23 | |
| 443 | 001 | 0BB | . | RSTK(3) | E43 | 3 |
| 444 | 001 | 0BC | . | WRTS | 3C3 | |
| 445 | 001 | 0BD | . | INCH(MAL) | A23 | |
| 446 | 001 | 0BE | . | RSTK(4) | E44 | 4 |
| 447 | 001 | 0BF | . | WRTS | 3C3 | |
| 448 | 001 | 0C0 | . | INCH(MAL) | A23 | |
| 449 | 001 | 0C1 | . | RSTK(5) | E45 | 5 |
| 450 | 001 | 0C2 | . | WRTS | 3C3 | |
| 451 | 001 | 0C3 | . | INCH(MAL) | A23 | |
| 452 | 001 | 0C4 | . | RSTK(6) | E46 | 6 |
| 453 | 001 | 0C5 | . | WRTS | 3C3 | |
| 454 | 001 | 0C6 | . | INCH(MAL) | A23 | |

| NO. | PO | PL | LABEL | MNEMONIC | CODE | COMMENTS |
|---|---|---|---|---|---|---|
| 455 | 001 | 0C7 | . | RSTK(7) | E47 | 7 |
| 456 | 001 | 0C8 | . | WRTS | 3C3 | |
| 457 | 001 | 0C9 | . | INCR(MAL) | A23 | |
| 458 | 001 | 0CA | . | RSTK(8) | E48 | 8 |
| 459 | 001 | 0CB | . | WRTS | 3C3 | |
| 460 | 001 | 0CC | . | INCR(MAL) | A23 | |
| 461 | 001 | 0CD | . | RSTK(9) | E49 | 9 |
| 462 | 001 | 0CE | . | WRTS | 3C3 | |
| 463 | 001 | 0CF | . | INCR(MAL) | A23 | |
| 464 | 001 | 0D0 | . | RSTK(10) | E4A | 10 |
| 465 | 001 | 0D1 | . | WRTS | 3C3 | |
| 466 | 001 | 0D2 | . | INCR(MAL) | A23 | |
| 467 | 001 | 0D3 | . | RSTK(11) | E4B | 11 |
| 468 | 001 | 0D4 | . | WRTS | 3C3 | |
| 469 | 001 | 0D5 | . | INCR(MAL) | A23 | |
| 470 | 001 | 0D6 | . | RSTK(12) | E4C | 12 |
| 471 | 001 | 0D7 | . | WRTS | 3C3 | |
| 472 | 001 | 0D8 | . | INCR(MAL) | A23 | |
| 473 | 001 | 0D9 | . | RSTK(13) | E4D | 13 |
| 474 | 001 | 0DA | . | WRTS | 3C3 | |
| 475 | 001 | 0DB | . | DIMAL | 3FD | DO NOT SAVE PHI |
| 476 | 001 | 0DC | . | RSTK(15) | E4F | 15 |
| 477 | 001 | 0DD | . | WRTS | 3C3 | |

**

*OBTAIN IOCA TO BE SUSPENDED

| 478 | 001 | 0DE | SIOCA | LDAS | 336 | |
|---|---|---|---|---|---|---|
| 479 | 001 | 0DF | . | @002 | 002 | |
| 480 | 001 | 0E0 | . | @060 | 060 | |
| 481 | 001 | 0E1 | . | X(G)(MDU) | 826 | |

*INCREMENT THE SUSPENDED LIST POINTER

| 482 | 001 | 0E2 | ULIST | READS" | 3B9 | |
|---|---|---|---|---|---|---|
| 483 | 001 | 0E3 | . | @002 | 002 | |
| 484 | 001 | 0E4 | . | @06F | 06F | |
| 485 | 001 | 0E5 | . | INCR(MDL) | A25 | |
| 486 | 001 | 0E6 | . | WRTS | 3C3 | |

*TEST IF LIST IS EMPTY; IF NOT THEN SUSPEND OLD IOCA INTO LIST

| 487 | 001 | 0E7 | . | DECR(MDL) | AF5 | |
|---|---|---|---|---|---|---|
| 488 | 001 | 0E8 | . | TR5(MDL) | CC5 | |
| 489 | 001 | 0E9 | . | #NIOCA | 0ED | |
| 490 | 001 | 0EA | . | X(MAL)(MDL) | 835 | |
| 491 | 001 | 0EB | . | MD+AG | 3ED | |
| 492 | 001 | 0EC | . | WRTS | 3C3 | |

*OBTAIN AND WRITE NEW IOCA

| 493 | 001 | 0ED | NIOCA | RDSI' | 3B0 | |
|---|---|---|---|---|---|---|
| 494 | 001 | 0EE | . | @062 | 062 | |
| 495 | 001 | 0EF | . | INCR(MAL) | A23 | |
| 496 | 001 | 0F0 | . | READS | 3BB | GET NEW JOB LEVEL |
| 497 | 001 | 0F1 | . | X(MDL)(MAL) | 853 | |
| 498 | 001 | 0F2 | . | R1(MDL) | B05 | |
| 499 | 001 | 0F3 | . | X(MAU)(UA) | 84A | |
| 500 | 001 | 0F4 | . | @002 | 002 | |
| 501 | 001 | 0F5 | . | WRTS' | 3C2 | |
| 502 | 001 | 0F6 | . | @060 | 060 | |
| 503 | 001 | 0F7 | . | WPNLL | E30 | |
| 504 | 001 | 0F8 | . | JMPO | 386 | |

| NO. | PU | PL | LABEL | MNEMONIC | CODE | COMMENTS |
|---|---|---|---|---|---|---|
| 505 | 001 | 0F9 | . | @002 | 002 | |
| 506 | 001 | 0FA | . | @000 | 000 | |
| 507 | 001 | 0FB | . | NOP | 800 | |
| 508 | 001 | 0FC | . | NOP | 800 | |
| 509 | 001 | 0FD | . | NOP | 800 | |
| 510 | 001 | 0FE | . | NOP | 800 | |
| 511 | 001 | 0FF | . | NOP | 800 | |

*DETERMINE IF A CHARACTER IS TO BE EXTRACTED FROM PORT BUFFER

| NO. | PU | PL | LABEL | MNEMONIC | CODE | COMMENTS |
|---|---|---|---|---|---|---|
| 512 | 002 | 000 | . | READS" | 3B9 | |
| 513 | 002 | 001 | . | @002 | 002 | |
| 514 | 002 | 002 | . | #USRPU | 009 | |
| 515 | 002 | 003 | . | TR8(MDL) | CF5 | TEST IF REC. AND JUMP |
| 516 | 002 | 004 | . | #+4 | 007 | TO SET UP POINT ROUTINE |
| 517 | 002 | 005 | . | JMP | 9D1 | |
| 518 | 002 | 006 | . | #SETUP | 018 | |
| 519 | 002 | 007 | . | PORTAD | 3DD | |
| 520 | 002 | 008 | GOUSR | X(G)(UA) | 82A | |
| 521 | 002 | 009 | USRPU | NOP | 800 | USER P UPPER |
| 522 | 002 | 00A | . | X(A)(UA) | 81A | |
| 523 | 002 | 00B | USRPL | NOP | 800 | USER P LOWER |
| 524 | 002 | 00C | . | R8(G) | B72 | |
| 525 | 002 | 00D | . | X(MDU)(A) | 861 | |
| 526 | 002 | 00E | . | X(A)(UA) | 81A | TEST IF BACKGROUND PROGRAM |
| 527 | 002 | 00F | . | @005 | 005 | COUNT IS OUT-OF-BOUND |
| 528 | 002 | 010 | . | SUB(G) | 922 | |
| 529 | 002 | 011 | . | TR8(A) | CF1 | |
| 530 | 002 | 012 | . | #+4 | 015 | |
| 531 | 002 | 013 | . | X(A)(MDU) | 816 | |
| 532 | 002 | 014 | . | GUSER | 19C | |
| 533 | 002 | 015 | . | JMPO | 386 | |
| 534 | 002 | 016 | . | @000 | 000 | |
| 535 | 002 | 017 | . | @000 | 000 | |

*END OF ACTIVITY UPDAT ROUTINE
*FOLLOWING ROUTINE SETS UP POINT ROUTINE

| NO. | PU | PL | LABEL | MNEMONIC | CODE | COMMENTS |
|---|---|---|---|---|---|---|
| 536 | 002 | 018 | SETUP | X(G)(UA) | 82A | |
| 537 | 002 | 019 | . | @001 | 001 | |
| 538 | 002 | 01A | . | JMPO | 386 | GO TO GET CHARAC. |
| 539 | 002 | 01B | . | @000 | 000 | FOR USER |
| 540 | 002 | 01C | . | #PUT+5 | 0D1 | |
| 541 | 002 | 01D | . | NOP | 800 | |
| 542 | 002 | 01E | . | NOP | 800 | |
| 543 | 002 | 01F | . | NOP | 800 | |
| 544 | 002 | 020 | . | NOP | 800 | |
| 545 | 002 | 021 | . | NOP | 800 | |
| 546 | 002 | 022 | . | NOP | 800 | |
| 547 | 002 | 023 | . | NOP | 800 | |
| 548 | 002 | 024 | . | NOP | 800 | |
| 549 | 002 | 025 | . | NOP | 800 | |
| 550 | 002 | 026 | . | NOP | 800 | |
| 551 | 002 | 027 | . | NOP | 800 | |
| 552 | 002 | 028 | . | NOP | 800 | |
| 553 | 002 | 029 | . | NOP | 800 | |
| 554 | 002 | 02A | . | NOP | 800 | |
| 555 | 002 | 02B | . | NOP | 800 | |
| 556 | 002 | 02C | . | NOP | 800 | |
| 557 | 002 | 02D | . | NOP | 800 | |
| 558 | 002 | 02E | . | NOP | 800 | |
| 559 | 002 | 02F | . | NOP | 800 | |
| 560 | 002 | 030 | . | NOP | 800 | |

| NO. | PU | PL | LABEL | MNEMONIC | CODE | COMMENTS |
|---|---|---|---|---|---|---|

*FOLLOWING IS THE IO CONTROL TABLE (IOC)
*THERE ARE 64 ENTRIES IN THIS TABLE. EACH IO USES TWO WORDS
*THE FIRST WROD GIVES THE PORT CONTROL LOCATION STWA AND THE
*BUFFER SIZE IN THE PORT CONTROL
*THE SECOND WORD INCLUDES THE IO LEVEL AND ITS BASE SEGMENT
*THIS CONTROL TABLE IS ASSIGNED ACCORDING TO THE PCU PORT ASSINGMENT
*TABLE STARTS AT LOCATION 280 IN S MEMORY (002 080)
*
*
*=================== IMPORTANT ===================================
*           THIS CONFIGURATION MAY NOT BE THE SAME
*           AS THAT ACTUALLY REQUIRED BY YOUR PCU
**

*THE FIRST CHANNEL CONTAINS ONLY THE REAL TIME CLOCK PORT

```
    0 002  080  CHAN0  @FFF           FFF  000000  RTC CHANNEL
    1 002  081    .    @000           000
    2 002  082    .    @000           000  000001
    3 002  083    .    @000           000
    4 002  084    .    @000           000  000010
    5 002  085    .    @000           000
    6 002  086    .    @000           000  000011
    7 002  087    .    @000           000
    8 002  088    .    @000           000  000100
    9 002  089    .    @000           000
   10 002  08A    .    @000           000  000101
   11 002  08B    .    @000           000
   12 002  08C    .    @000           000  000110
   13 002  08D    .    @018           018
   14 002  08E    .    @000           000  000111
   15 002  08F    .    @000           000
```

*FIRST CHANNEL EXPANDER CONTAINS THE SERIAL COMMUNICATION PORTS

```
   16 002  090  CHAN1  @048           048  001000  COMM. REC. PORT
   17 002  091    .    @138           138
   18 002  092    .    @008           008  001001  COMM. XMIT PORT
   19 002  093    .    @2F0           2F0
   20 002  094    .    @000           000  001010  2ND COMM. REC. PORT
   21 002  095    .    @2C0           2C0
   22 002  096    .    @000           000  001011  2ND COMM. XMIT PORT
   23 002  097    .    @000           000
   24 002  098    .    @000           000  001100  CENTRONICS PRINTER
   25 002  099    .    @000           000
   26 002  09A    .    @388           388  001101  NEWS LINE INPUT PORT
   27 002  09B    .    @93A           93A
   28 002  09C    .    @3C8           3C8  001110  NYSE TKR INPUT
   29 002  09D    .    @A3C           A3C
   30 002  09E    .    @3E8           3E8  001111  ASE TKR INPUT
   31 002  09F    .    @A3D           A3D
```

**

*SECOND EXPANDED SERIAL CHANNEL. (NOT USED IN INITIAL MDS-7 SYSTEM)

```
   32 002  0A0  CHAN2  @000           000  010000  UNUSED CHANNEL
   33 002  0A1    .    @2C0           2C0
   34 002  0A2    .    @000           000  010001
   35 002  0A3    .    @000           000
   36 002  0A4    .    @000           000  010010
   37 002  0A5    .    @000           000
   38 002  0A6    .    @000           000  010011
   39 002  0A7    .    @000           000
```

| NO. | PU | PL | LABEL | MNEMONIC | CODE | COMMENTS |
|---|---|---|---|---|---|---|
| 40 | 002 | 0A8 | . | @000 | 000 | 010100 |
| 41 | 002 | 0A9 | . | @000 | 000 | |
| 42 | 002 | 0AA | . | @000 | 000 | 010101 |
| 43 | 002 | 0AB | . | @000 | 000 | |
| 44 | 002 | 0AC | . | @000 | 000 | 010110 |
| 45 | 002 | 0AD | . | @000 | 000 | |
| 46 | 002 | 0AE | . | @000 | 000 | 010111 |
| 47 | 002 | 0AF | . | @000 | 000 | |

*THIS CHANNEL IS NOT USED IN THE MDS-7 SYSTEM.

| NO. | PU | PL | LABEL | MNEMONIC | CODE | COMMENTS |
|---|---|---|---|---|---|---|
| 48 | 002 | 0B0 | CHAN3 | @000 | 000 | 011000 CHANNEL NOT USED |
| 49 | 002 | 0B1 | . | @000 | 000 | |
| 50 | 002 | 0B2 | . | @000 | 000 | 011001 |
| 51 | 002 | 0B3 | . | @000 | 000 | |
| 52 | 002 | 0B4 | . | @000 | 000 | 011010 |
| 53 | 002 | 0B5 | . | @000 | 000 | |
| 54 | 002 | 0B6 | . | @000 | 000 | 011011 |
| 55 | 002 | 0B7 | . | @000 | 000 | |
| 56 | 002 | 0B8 | . | @000 | 000 | 011100 |
| 57 | 002 | 0B9 | . | @000 | 000 | |
| 58 | 002 | 0BA | . | @000 | 000 | 011101 |
| 59 | 002 | 0BB | . | @000 | 000 | |
| 60 | 002 | 0BC | . | @000 | 000 | 011110 |
| 61 | 002 | 0BD | . | @000 | 000 | |
| 62 | 002 | 0BE | . | @000 | 000 | 011111 |
| 63 | 002 | 0BF | . | @000 | 000 | |

**

*THE FOLLOWING FOUR CHANNELS ARE KEYBOARD CHANNELS.
*PRIORITY "C" IS USED FOR 9" CRT'S. "D" IS FOR 3" CRT'S
*MARKED LEAST SIGNIFICANT BIT OF THE BASE ADDRESS IS FOR 6-LINE CRT'S.
*

| NO. | PU | PL | LABEL | MNEMONIC | CODE | COMMENTS |
|---|---|---|---|---|---|---|
| 64 | 002 | 0C0 | CHAN4 | @411 | 411 | 100000 KBD NO. 1 |
| 65 | 002 | 0C1 | . | @C20 | C20 | |
| 66 | 002 | 0C2 | . | @451 | 451 | 100001 KBD NO. 2 |
| 67 | 002 | 0C3 | . | @C26 | C26 | |
| 68 | 002 | 0C4 | . | @000 | 000 | 100010 KBD NO. 3 |
| 69 | 002 | 0C5 | . | @000 | 000 | |
| 70 | 002 | 0C6 | . | @551 | 551 | 100011 KBD NO. 4 |
| 71 | 002 | 0C7 | . | @000 | 000 | |
| 72 | 002 | 0C8 | . | @611 | 611 | 100100 KBD NO. 5 |
| 73 | 002 | 0C9 | . | @000 | 000 | |
| 74 | 002 | 0CA | . | @651 | 651 | 100101 KBD NO. 6 |
| 75 | 002 | 0CB | . | @000 | 000 | |
| 76 | 002 | 0CC | . | @711 | 711 | 100110 KBD NO. 7 |
| 77 | 002 | 0CD | . | @000 | 000 | |
| 78 | 002 | 0CE | . | @751 | 751 | 100111 KBD NO. 8 |
| 79 | 002 | 0CF | . | @000 | 000 | |
| 80 | 002 | 0D0 | CHAN5 | @811 | 811 | 101000 KBD NO. 9 |
| 81 | 002 | 0D1 | . | @000 | 000 | |
| 82 | 002 | 0D2 | . | @851 | 851 | 101001 KBD NO. 10 |
| 83 | 002 | 0D3 | . | @000 | 000 | |
| 84 | 002 | 0D4 | . | @911 | 911 | 101010 KBD NO. 11 |
| 85 | 002 | 0D5 | . | @000 | 000 | |
| 86 | 002 | 0D6 | . | @951 | 951 | 101011 KBD NO. 12 |
| 87 | 002 | 0D7 | . | @000 | 000 | |
| 88 | 002 | 0D8 | . | @A11 | A11 | 101100 KBD NO. 13 |
| 89 | 002 | 0D9 | . | @000 | 000 | |
| 90 | 002 | 0DA | . | @A51 | A51 | 101101 KBD NO. 14 |
| 91 | 002 | 0DB | . | @000 | 000 | |
| 92 | 002 | 0DC | . | @B11 | B11 | 101110 KBD NO. 15 |
| 93 | 002 | 0DD | . | @000 | 000 | |
| 94 | 002 | 0DE | . | @B51 | B51 | 101111 KBD NO. 16 |
| 95 | 002 | 0DF | . | @000 | 000 | |

**

| NO. | PU | PL | LABEL | MNEMONIC | CODE | | COMMENTS |
|---|---|---|---|---|---|---|---|
| 96 | 002 | 0E0 | CHAN6 | @C11 | C11 | 110000 | KBD NO. 17 |
| 97 | 002 | 0E1 | . | @000 | 000 | | |
| 98 | 002 | 0E2 | . | @C51 | C51 | 110001 | KBD NO. 18 |
| 99 | 002 | 0E3 | . | @000 | 000 | | |
| 100 | 002 | 0E4 | . | @D11 | D11 | 110010 | KBD NO. 19 |
| 101 | 002 | 0E5 | . | @000 | 000 | | |
| 102 | 002 | 0E6 | . | @D51 | D51 | 110011 | KBD NO. 20 |
| 103 | 002 | 0E7 | . | @000 | 000 | | |
| 104 | 002 | 0E8 | . | @E11 | E11 | 110100 | KBD NO. 21 |
| 105 | 002 | 0E9 | . | @000 | 000 | | |
| 106 | 002 | 0EA | . | @E51 | E51 | 110101 | KBD NO. 22 |
| 107 | 002 | 0EB | . | @000 | 000 | | |
| 108 | 002 | 0EC | . | @F11 | F11 | 110110 | KBD NO. 23 |
| 109 | 002 | 0ED | . | @000 | 000 | | |
| 110 | 002 | 0EE | . | @F51 | F51 | 110111 | KBD NO. 24 |
| 111 | 002 | 0EF | . | @000 | 000 | | |
| 112 | 002 | 0F0 | CHAN7 | @013 | 013 | 111000 | KBD NO. 25 |
| 113 | 002 | 0F1 | . | @000 | 000 | | |
| 114 | 002 | 0F2 | . | @053 | 053 | 111001 | KBD NO. 26 |
| 115 | 002 | 0F3 | . | @000 | 000 | | |
| 116 | 002 | 0F4 | . | @113 | 113 | 111010 | KBD NO. 27 |
| 117 | 002 | 0F5 | . | @000 | 000 | | |
| 118 | 002 | 0F6 | . | @153 | 153 | 111011 | KBD NO. 28 |
| 119 | 002 | 0F7 | . | @000 | 000 | | |
| 120 | 002 | 0F8 | . | @213 | 213 | 111100 | KBD NO. 29 |
| 121 | 002 | 0F9 | . | @000 | 000 | | |
| 122 | 002 | 0FA | . | @253 | 253 | 111101 | KBD NO. 30 |
| 123 | 002 | 0FB | . | @000 | 000 | | |
| 124 | 002 | 0FC | . | @313 | 313 | 111110 | KBD NO. 31 |
| 125 | 002 | 0FD | . | @000 | 000 | | |
| 126 | 002 | 0FE | . | @353 | 353 | 111111 | KBD NO. 32 |
| 127 | 002 | 0FF | . | @000 | 000 | | |
| 128 | 003 | 000 | . | @000 | 000 | | |
| 129 | 003 | 001 | . | @000 | 000 | | |

*END OF THE IO CONTROL TABLE

* Following IS THE LOADER PROGRAM FOR LOADING PROGRAMS INTO THE
* PCU BY THE CONCENTRATOR.

| 0 | 003 | 000 | START | X(MDL)(UA) | 85A | |
|---|---|---|---|---|---|---|
| 1 | 003 | 001 | . | @021 | 021 | STARTING SEGMENT NO. |
| 2 | 003 | 002 | . | WSTK(4) | E54 | |
| 3 | 003 | 003 | . | X(MDL)(UA) | 85A | |
| 4 | 003 | 004 | . | @0CC | 0CC | |
| 5 | 003 | 005 | . | WSTK(3) | E53 | |
| 6 | 003 | 006 | LFS | STRAP(11) | E2B | |
| 7 | 003 | 007 | . | X(MDU)(MDL) | 865 | |
| 8 | 003 | 008 | . | RL(MDL) | 455 | |
| 9 | 003 | 009 | . | OUTCON | 39E | ZERO OUT PORT |
| 10 | 003 | 00A | . | STRAP(12) | E2C | |
| 11 | 003 | 00B | . | OUTCON | 39E | LOOK-FOR-SYNC CMMND |
| 12 | 003 | 00C | . | RL(G) | 452 | |
| 13 | 003 | 00D | . | RI(PP2) | P0F | |
| 14 | 003 | 00E | . | RR(PP2) | 57F | |
| 15 | 003 | 00F | . | X(MDL)(UA) | 85A | |
| 16 | 003 | 010 | . | @INTR | 012 | |
| 17 | 003 | 011 | . | WSTK(PL) | E57 | |
| 18 | 003 | 012 | INTR | TRINT | C85 | TEST INTERRUPT |
| 19 | 003 | 013 | . | @INTR | 012 | |
| 20 | 003 | 014 | . | STRAP(11) | E2B | |
| 21 | 003 | 015 | . | X(A)(MDL) | 815 | |
| 22 | 003 | 016 | . | INPADD | F40 | |

| NO. | PU | PL | LABEL | MNEMONIC | CODE | COMMENTS |
|---|---|---|---|---|---|---|
| 23 | 003 | 017 | . | INPDAT | 38C | |
| 24 | 003 | 018 | . | CMPR(MDU) | 9D6 | |
| 25 | 003 | 019 | . | #RFC | 020 | |
| 26 | 003 | 01A | . | INCR(A) | A21 | |
| 27 | 003 | 01B | . | CMPR(MDU) | 9D6 | |
| 28 | 003 | 01C | . | #XMIT | 0B2 | |
| 29 | 003 | 01D | . | RL(MDL) | A55 | |
| 30 | 003 | 01E | . | OUTCON | 39E | |
| 31 | 003 | 01F | . | RSTOR(PL) | E87 | |
| 32 | 003 | 020 | RFC | X(A)(MDL) | 815 | |
| 33 | 003 | 021 | . | TS8(PR2) | DEF | |
| 34 | 003 | 022 | . | #REC2 | 064 | |
| 35 | 003 | 023 | . | TS1(PR2) | D8F | |
| 36 | 003 | 024 | . | #REC1 | 049 | |
| 37 | 003 | 025 | . | TS8(A) | DF1 | |
| 38 | 003 | 026 | . | #LFS | 006 | |
| 39 | 003 | 027 | . | TS5(G) | DC2 | |
| 40 | 003 | 028 | . | #ENQA0 | 034 | |
| 41 | 003 | 029 | . | COMPR | 3D2 | |
| 42 | 003 | 02A | . | @001 | 001 | |
| 43 | 003 | 02B | . | #SCH | 061 | |
| 44 | 003 | 02C | . | @016 | 016 | |
| 45 | 003 | 02D | . | #INTR-3 | 00F | |
| 46 | 003 | 02E | . | @003 | 003 | |
| 47 | 003 | 02F | . | #LFS | 006 | |
| 48 | 003 | 030 | . | @005 | 005 | |
| 49 | 003 | 031 | . | #ENQ | 039 | |
| 50 | 003 | 032 | . | @OFF | 0FF | |
| 51 | 003 | 033 | . | #INTR-3 | 00F | |
| 52 | 003 | 034 | ENQA0 | R5(G) | B42 | |
| 53 | 003 | 035 | . | STRAP(6) | E26 | |
| 54 | 003 | 036 | . | CMPR(MDL) | 9D5 | |
| 55 | 003 | 037 | . | #POLL | 03B | |
| 56 | 003 | 038 | . | RSTOR(PL) | E87 | |
| 57 | 003 | 039 | ENQ | S5(G) | BC2 | |
| 58 | 003 | 03A | . | RSTOR(PL) | E87 | |
| 59 | 003 | 03B | POLL | STRAP(11) | E2B | |
| 60 | 003 | 03C | . | X(MDU)(MDL) | 865 | |
| 61 | 003 | 03D | . | INCR(MDU) | A26 | |
| 62 | 003 | 03E | . | X(MDL)(UA) | 85A | |
| 63 | 003 | 03F | . | @013 | 013 | |
| 64 | 003 | 040 | . | OUTCON | 39E | TURN ON XMIT PORT |
| 65 | 003 | 041 | . | RSTX(3) | E43 | |
| 66 | 003 | 042 | . | WSTX(12) | E5C | |
| 67 | 003 | 043 | . | TS7(MDL) | DE5 | |
| 68 | 003 | 044 | . | #+3 | 046 | |
| 69 | 003 | 045 | . | R8(MDL) | B75 | |
| 70 | 003 | 046 | . | R7(MDM) | B65 | |
| 71 | 003 | 047 | . | WSTX(3) | E53 | |
| 72 | 003 | 048 | . | RSTOR(PL) | E87 | |
| 73 | 003 | 049 | REC1 | X(MDL)(UA) | 85A | |
| 74 | 003 | 04A | . | @07C | 07C | |
| 75 | 003 | 04B | . | TRL(G) | C32 | |
| 76 | 003 | 04C | . | #COMPR | 057 | |
| 77 | 003 | 04D | . | STRAP(6) | E26 | |
| 78 | 003 | 04E | . | TR2(G) | C22 | |
| 79 | 003 | 04F | . | #COMPR | 057 | |
| 80 | 003 | 050 | . | X(MDL)(UA) | 85A | |
| 81 | 003 | 051 | . | @002 | 002 | |
| 82 | 003 | 052 | . | TR1(G) | C82 | |
| 83 | 003 | 053 | . | #COMPR | 057 | |
| 84 | 003 | 054 | . | X(MDL)(UA) | 85A | |
| 85 | 003 | 055 | . | @01F | 01F | |
| 86 | 003 | 056 | . | WSTX(1) | E51 | |
| 87 | 003 | 057 | COMPR | CMPR(MDL) | 9D5 | |

| NO. | PU | PL | LABEL | MNEMONIC | CODE | COMMENTS |
|---|---|---|---|---|---|---|
| 88 | 003 | 058 | . | #INCRG | 05D | |
| 89 | 003 | 059 | . | TS2(G) | D22 | |
| 90 | 003 | 05A | . | #ERROR | 0AF | |
| 91 | 003 | 05B | . | RI(PR2) | B0F | |
| 92 | 003 | 05C | . | RSTOR(PL) | E87 | |
| 93 | 003 | 05D | ICRG | INCR(G) | A22 | |
| 94 | 003 | 05E | . | TR3(G) | CA2 | |
| 95 | 003 | 05F | . | #INTR-3 | 00F | |
| 96 | 003 | 060 | . | S8(PR2) | BFF | |
| 97 | 003 | 061 | SCH | SI(PR2) | B8F | |
| 98 | 003 | 062 | US | RL(G) | A52 | |
| 99 | 003 | 063 | . | RSTOR(PL) | E87 | |
| 100 | 003 | 064 | REC2 | RSTOR(A) | E81 | |
| 101 | 003 | 065 | . | XOR(MDL) | 3A5 | |
| 102 | 003 | 066 | . | R7(A) | B61 | |
| 103 | 003 | 067 | . | SAVE(A) | E91 | |
| 104 | 003 | 068 | . | X(A)(MDL) | 815 | |
| 105 | 003 | 069 | . | COMPR | 3D2 | |
| 106 | 003 | 06A | . | @01F | 01F | |
| 107 | 003 | 06B | . | #US | 062 | |
| 108 | 003 | 06C | . | @000 | 000 | |
| 109 | 003 | 06D | . | #HPC1 | 07D | |
| 110 | 003 | 06E | . | @020 | 020 | |
| 111 | 003 | 06F | . | #HPC2 | 09C | |
| 112 | 003 | 070 | . | @003 | 003 | |
| 113 | 003 | 071 | . | #ETX | 09F | |
| 114 | 003 | 072 | . | @0FF | 0FF | |
| 115 | 003 | 073 | . | #MISC | 074 | |
| 116 | 003 | 074 | MISC | TS8(A) | DF1 | |
| 117 | 003 | 075 | . | #ERROR | 0AF | |
| 118 | 003 | 076 | . | TS7(G) | DE2 | |
| 119 | 003 | 077 | . | #HPC | 07E | |
| 120 | 003 | 078 | . | TS1(G) | D82 | |
| 121 | 003 | 079 | . | #LOWER | 082 | |
| 122 | 003 | 07A | UPPER | S1(G) | B82 | |
| 123 | 003 | 07B | . | X(MDU)(A) | 861 | |
| 124 | 003 | 07C | . | SAVE(MDU) | E96 | |
| 125 | 003 | 07D | . | RSTOR(PL) | E87 | |
| 126 | 003 | 07E | HPC | RSTOR(A) | E81 | |
| 127 | 003 | 07F | . | TSY(A) | D31 | |
| 128 | 003 | 080 | . | #ERROR | 0AF | |
| 129 | 003 | 081 | . | RSTOR(PL) | E87 | |
| 130 | 003 | 082 | LOWER | RI(G) | B02 | |
| 131 | 003 | 083 | . | RSTOR(MDU) | E86 | |
| 132 | 003 | 084 | . | R7(MDL) | B65 | |
| 133 | 003 | 085 | . | TR1(MDU) | C86 | |
| 134 | 003 | 086 | . | #+3 | 089 | |
| 135 | 003 | 087 | . | S7(MDL) | BE5 | |
| 136 | 003 | 088 | . | TR2(MDU) | C96 | |
| 137 | 003 | 089 | . | #+3 | 08B | |
| 138 | 003 | 08A | . | S8(MDM) | BF5 | |
| 139 | 003 | 08B | . | SHFTR(MDU) | A76 | |
| 140 | 003 | 08C | . | SHFTR(MDU) | A76 | |
| 141 | 003 | 08D | . | TS3(G) | DA2 | |
| 142 | 003 | 08E | . | #DATA | 096 | |
| 143 | 003 | 08F | . | X(MAU)(MAL) | 843 | |
| 144 | 003 | 090 | . | X(MAL)(MDL) | 835 | |
| 145 | 003 | 091 | . | TR4(G) | CB2 | |
| 146 | 003 | 092 | . | #+3 | 094 | |
| 147 | 003 | 093 | . | S3(G) | BA2 | |
| 148 | 003 | 094 | . | S4(G) | BB2 | |
| 149 | 003 | 095 | . | RSTOR(PL) | E87 | |
| 150 | 003 | 096 | DATA | WRTS | 3C3 | WRITE PROG. WORD |
| 151 | 003 | 097 | . | INCR(MAL) | A23 | |
| 152 | 003 | 098 | . | TSY(MAL) | D33 | |

| NO. | PU | PL | LABEL | MNEMONIC | CODE | COMMENTS |
|---|---|---|---|---|---|---|
| 153 | 003 | 099 | . | #INTR-3 | 00F | |
| 154 | 003 | 09A | . | INCR(MAU) | A24 | |
| 155 | 003 | 09B | . | RSTOR(PL) | E87 | |
| 156 | 003 | 09C | HPC2 | S6(G) | BD2 | |
| 157 | 003 | 09D | HPC1 | S7(G) | BE2 | |
| 158 | 003 | 09E | . | RSTOR(PL) | E87 | |
| 159 | 003 | 09F | ETX | TR6(G) | CD2 | |
| 160 | 003 | 0A0 | . | #NEXT | 0A4 | |
| 161 | 003 | 0A1 | . | JMPC | 396 | |
| 162 | 003 | 0A2 | . | #000 | 000 | |
| 163 | 003 | 0A3 | . | #000 | 000 | |
| 164 | 003 | 0A4 | NEXT | R1(PR2) | B0F | |
| 165 | 003 | 0A5 | . | R8(PR2) | B7F | |
| 166 | 003 | 0A6 | . | RSTK(4) | E44 | |
| 167 | 003 | 0A7 | . | INCR(MDL) | A25 | |
| 168 | 003 | 0A8 | . | WSTK(4) | E54 | |
| 169 | 003 | 0A9 | MSGQ | RSTK(3) | E43 | |
| 170 | 003 | 0AA | . | S7(MDL) | BE5 | |
| 171 | 003 | 0AB | . | S8(MDL) | BF5 | |
| 172 | 003 | 0AC | . | WSTK(3) | E53 | |
| 173 | 003 | 0AD | . | JMP | 9D1 | |
| 174 | 003 | 0AE | . | #LFS | 006 | |
| 175 | 003 | 0AF | ERROR | RSTK(3) | E43 | |
| 176 | 003 | 0B0 | . | JMP | 9D1 | |
| 177 | 003 | 0B1 | . | #MSGQ+2 | 0AB | |
| 178 | 003 | 0B2 | XMIT | SAVE(G) | E92 | |
| 179 | 003 | 0B3 | . | X(G)(UA) | 82A | |
| 180 | 003 | 0B4 | . | #OUTC | 0EB | |
| 181 | 003 | 0B5 | . | RSTK(12) | E4C | |
| 182 | 003 | 0B6 | . | X(A)(MDL) | 815 | |
| 183 | 003 | 0B7 | . | TR5(A) | CC1 | |
| 184 | 003 | 0B8 | . | #FF | 0EA | |
| 185 | 003 | 0B9 | . | X(MDL)(UA) | 85A | |
| 186 | 003 | 0BA | . | #016 | 016 | |
| 187 | 003 | 0BB | . | TS4(A) | DB1 | |
| 188 | 003 | 0BC | . | #8TOF | 0D3 | |
| 189 | 003 | 0BD | 0TO7 | TR3(A) | CA1 | |
| 190 | 003 | 0BE | . | #OUTC | 0EB | |
| 191 | 003 | 0BF | . | X(MDL)(UA) | 85A | |
| 192 | 003 | 0C0 | . | #07C | 07C | F1 CODE |
| 193 | 003 | 0C1 | . | TS2(A) | D91 | |
| 194 | 003 | 0C2 | . | #6TO7 | 0CE | |
| 195 | 003 | 0C3 | 4TO5 | TS1(A) | D81 | |
| 196 | 003 | 0C4 | . | #OUTC | 0EB | |
| 197 | 003 | 0C5 | . | X(MDL)(UA) | 85A | |
| 198 | 003 | 0C6 | . | #001 | 001 | SOH CODE |
| 199 | 003 | 0C7 | . | TS9(A) | DF1 | |
| 200 | 003 | 0C8 | . | #OUTC | 0EB | |
| 201 | 003 | 0C9 | . | X(A)(UA) | 81A | |
| 202 | 003 | 0CA | . | #01C | 01C | |
| 203 | 003 | 0CB | . | X(MDL)(UA) | 85A | |
| 204 | 003 | 0CC | . | #004 | 004 | EOT CODE |
| 205 | 003 | 0CD | . | X(PL)(G) | 872 | |
| 206 | 003 | 0CE | 6TO7 | STRAP(4) | E24 | I1 CODE |
| 207 | 003 | 0CF | . | TR1(A) | C81 | |
| 208 | 003 | 0D0 | . | #OUTC | 0EB | |
| 209 | 003 | 0D1 | . | STRAP(5) | E25 | I2 CODE |
| 210 | 003 | 0D2 | . | X(PL)(G) | 872 | |
| 211 | 003 | 0D3 | 8TOF | STRAP(6) | E26 | A0 CODE |
| 212 | 003 | 0D4 | . | TS3(A) | DA1 | |
| 213 | 003 | 0D5 | . | #CTOF | 0E4 | |
| 214 | 003 | 0D6 | . | TS2(A) | D91 | |
| 215 | 003 | 0D7 | . | #ATOB | 0DC | |
| 216 | 003 | 0D8 | . | TR1(A) | C81 | |
| 217 | 003 | 0D9 | . | #OUTC | 0EB | |
| 218 | 003 | 0DA | . | RSTK(4) | E44 | SEGMENT NUMBER |

| NO. | PU | PL | LABEL | MNEMONIC | CODE | COMMENTS |
|---|---|---|---|---|---|---|
| 219 | 003 | ODB | . | X(PL)(G) | 872 | |
| 220 | 003 | ODC | ATOB | X(MDL)(UA) | 85A | |
| 221 | 003 | ODD | . | @002 | 002 | STX CODE |
| 222 | 003 | ODE | . | TR1(A) | C81 | |
| 223 | 003 | ODF | . | /OUTC | 0EB | |
| 224 | 003 | OE0 | S | S3(MDL) | BA5 | |
| 225 | 003 | OE1 | . | TS7(A) | DE1 | ACK CODE |
| 226 | 003 | OE2 | . | /OUTC | 0EB | |
| 227 | 003 | OE3 | . | INCR(A) | A21 | |
| 228 | 003 | OE4 | CTOF | X(MDL)(UA) | 85A | |
| 229 | 003 | OE5 | . | @003 | 003 | ETX CODE |
| 230 | 003 | OE6 | . | TS2(A) | D91 | |
| 231 | 003 | OE7 | . | /ETOF | 0F1 | |
| 232 | 003 | OE8 | . | TR1(A) | C81 | |
| 233 | 003 | OE9 | . | /OUTC | 0EB | |
| 234 | 003 | OEA | FF | SL(MDL) | AC5 | MARKING LINE |
| 235 | 003 | OEB | OUTC | OUTDAT | 39A | OUTPUT CHARACTER |
| 236 | 003 | OEC | . | INCR(A) | A21 | |
| 237 | 003 | OED | . | X(MDL)(A) | 851 | XMIT CTL INCREMENTED |
| 238 | 003 | OEE | . | WSTX(12) | E5C | |
| 239 | 003 | OEF | . | RSTOR(G) | E82 | |
| 240 | 003 | OF0 | . | RSTOR(PL) | E87 | |
| 241 | 003 | OF1 | ETOF | TR1(A) | C81 | |
| 242 | 003 | OF2 | . | /FF | 0EA | |
| 243 | 003 | OF3 | . | RL(MDL) | A55 | |
| 244 | 003 | OF4 | . | OUTCOV | 39E | SHUT DOWN LINE |
| 245 | 003 | OF5 | . | RSTOR(G) | E82 | |
| 246 | 003 | OF6 | . | RSTOR(PL) | E87 | |

```
* THE REAL TIME CLOCK PROGRAM CONSISTS OF A LIMIT SET UP SECTION
* AND A RTC INTERRUPT PROCESSING SECTION.
*
*THE REAL TIME CLOCK SET UP SUBROUTINE IS USED TO SET UP A
*TIMER LIMIT FOR USER PROGRAMS.
*THE USER MUST SUPPLY FOLLOWING INFORMATION IN REG. A WHEN
*THIS SUBROUTINE IS CALLED
*      A8 = 0 ...LIMIT IS FOR THE FIRST LIMIT CHARACTER
*      A8 = 1 ...LIMIT IS FOR THE SECOND LIMIT CHARACTER
*      A7 = 0 ...TIME SCALE IS 4 MILLISECONDS
*      A7 = 1 ...TIME SCALE IS 1 SECOND
*      A6 TO A1 ...NUMBER OF TIME UNITS REQUIRED FOR TIME OUT
*      LOCATION 0264 IS USED AS THE SCALE 1 COUNTER
*      LOCATION 0265 IS USED AS THE SCALE 2 COUNTER
*
```

| | | | | | | |
|---|---|---|---|---|---|---|
| 0 | 004 | 000 | LIMIT | READS" | 3B9 | OBTAIN COUNTER ADDRESS |
| 1 | 004 | 001 | . | @002 | 002 | |
| 2 | 004 | 002 | . | @064 | 064 | |
| 3 | 004 | 003 | . | TR7(A) | CE1 | SKIP IF SCALE 1 |
| 4 | 004 | 004 | . | /+4 | 007 | |
| 5 | 004 | 005 | . | READS' | 3BA | |
| 6 | 004 | 006 | . | @065 | 065 | READ COUNTER |
| 7 | 004 | 007 | . | X(G)(A) | 821 | PREPARE LIMIT CHARACTER |
| 8 | 004 | 008 | . | ADD(MDL) | 955 | ADD COUNTER TO LIMIT |
| 9 | 004 | 009 | . | S8(A) | BF1 | SET LIMIT ACTIVE BIT |
| 10 | 004 | 00A | . | S7(A) | BE1 | MARK AS IF SCALE 2 |
| 11 | 004 | 00B | . | TS7(G) | DE2 | SKIP IF SCALE 2 |
| 12 | 004 | 00C | . | /+3 | 00E | ELSE UNMARK FOR SCALE 1 |
| 13 | 004 | 00D | . | R7(A) | B61 | |
| 14 | 004 | 00E | . | PORTAD | 3DD | GET STW THEN LIMIT ADDR. |
| 15 | 004 | 00F | . | R1(MAL) | B03 | |
| 16 | 004 | 010 | . | DECR(MAL) | AF3 | |
| 17 | 004 | 011 | . | DECR(MAL) | AF3 | GET LIMIT ADDRESS OF |
| 18 | 004 | 012 | . | TR8(G) | CF2 | CHARACTER TO WRITE |

```
OO.  PU   PL    LABEL  MNEMONIC       CODE   COMMENTS
19   004  013    .      #+3            015
20   004  014    .      S1(MAL)        B83
21   004  015    .      X(MDL)(A)      851
22   004  016    .      WRTC           3CB    WRITE LIMIT CHARACTER
23   004  017    .      X(MAL)(G)      832
24   004  018    .      RL(G)          A52    RTC PORT IDENT
25   004  019    .      INPC           394    INPUT RTC STATUS CHARAC.
26   004  01A    .      TS7(MAL)       DE3
27   004  01B    .      #+3            01D
28   004  01C    .      S1(A)          B81
29   004  01D    .      S2(A)          B91    SET SCALE 2 ON
30   004  01E    .      OUTC           39C
31   004  01F    .      RETURN         18B
```

\*END OF SUBROUTINE. USER PROGRAM NOW RESUMES.
\*\*

\*FOLLOWING IS THE REAL TIME CLOCK PROCESSING PROGRAM
\*IT IS ASSUMED THAT THE SCALE 2 (1 SEC.) COUNTER HAS PRIORITY
\*OVER THE SCALE 1 (4 MILLISEC.) COUNTER
\*FOLLOWING DATA IS PRESENT IN A REG. AT THE START OF THE PROGRAM
\*IF SET    A1= SCALE 1 ON
\*          A2= SCALE 2 ON
\*          A3= COUNTER 1 INTERRUPTING
\*          A4= COUNTER 2 INTERRUPTING
\*
\*FOLLOWING DETERMINES THE TIMER SCALE TO BE PROCESSED

```
32   004  020   SCALE  RL(G)          A52
33   004  021    .      TR4(A)         CB1    JUMP IF COUNTER 2 NOT PRESENT
34   004  022    .      #UPCT1         043    TO UPDATE COUNTER 1
35   004  023    .      TR2(A)         C91    JUMP IF COUNTER 2 NOT ON
36   004  024    .      #UPCT1         043    TO UPDATE COUNTER 1
37   004  025    .      S1(G)          B82    MARK G1 TO INDICATE SCALE 2
```

\*FOLMOWING INCREMENTS SCALE 2 TIME COUNTER

```
38   004  026   UPCT2  LDAS           336    GET COUNTER 2
39   004  027    .      @002           002
40   004  028    .      @065           065
41   004  029    .      INCR(MDL)      A25    INCREMENT COUNTER
42   004  02A    .      WRTS           3C3    WRITE COUNTER BACK
43   004  02B    .      S8(A)          BF1    SET UP VALUE TO BE COMPARED
44   004  02C    .      S7(A)          BE1
45   004  02D    .      TS1(G)         D82    DETERMINE SCALE
46   004  02E    .      #+3            030
47   004  02F    .      R7(A)          B61
```

\*FOLLOWING INITIALIZES THE SCANNER THEN OBTAINS STW FOR LIMIT COMPARE

```
48   004  030    .      ENTRS          3A8    INTIALIZE SCANNER
49   004  031    .      @002           002
50   004  032    .      @062           062
51   004  033    .      @002           002
52   004  034    .      @090           090
```

\*FOLLOWING TESTS THE IOC POINTED BY THE SCANNER

```
53   004  035   TIOC   X(MAL)(MDL)    835    GET THE IOC
54   004  036    .      READS          3BB
55   004  037    .      TS7(MAL)       DE3    JUMP IF PORT IS KEYBOARD
56   004  038    .      #END           077
57   004  039    .      TSY(MDL)       D35    IF PORT USED GO TO TIMER CMPR
58   004  03A    .      #TMCMP         048
```

\*FOLLOWING OBTAINS NEXT IOC

```
59   004  03B   NXTIO  INCR(MAL)      A23
```

| NO. | PU | PL | LABEL | MNEMONIC | CODE | COMMENTS |
|---|---|---|---|---|---|---|
| 60 | 004 | 03C | . | READS | 3BB | |
| 61 | 004 | 03D | . | TRL(MDL) | C35 | JUMP IF NO MORE IO |
| 62 | 004 | 03E | . | #END | 077 | |
| 63 | 004 | 03F | . | WRTS' | 3C2 | UPDATE SCANNER |
| 64 | 004 | 040 | . | @062 | 062 | |
| 65 | 004 | 041 | . | JMP | 9D1 | |
| 66 | 004 | 042 | . | #TIOC | 035 | |

*FOLLOWING INCREMENTS SCALE 1 TIME COUNTER

| 67 | 004 | 043 | UPCT1 | LDAS | 336 | |
|---|---|---|---|---|---|---|
| 68 | 004 | 044 | . | @002 | 002 | |
| 69 | 004 | 045 | . | @064 | 064 | |
| 70 | 004 | 046 | . | JMP | 9D1 | |
| 71 | 004 | 047 | . | #UPCT2+3 | 029 | |

*FOLLOWING GETS PORT TIMER LIMITS AND COMPARE THEM AGAINST A REG.

| 72 | 004 | 048 | TMCMP | X(MAU)(MDU) | 846 | |
|---|---|---|---|---|---|---|
| 73 | 004 | 049 | . | X(MAL)(MDL) | 835 | |
| 74 | 004 | 04A | . | R1(MAL) | B03 | |
| 75 | 004 | 04B | . | DECR(MAL) | AF3 | GET LIMIT ADDRESS |
| 76 | 004 | 04C | . | DECR(MAL) | AF3 | |
| 77 | 004 | 04D | . | READ | E03 | |
| 78 | 004 | 04E | . | CMPR(MDU) | 9D6 | COMPARE LIMIT IN BYTE 1 |
| 79 | 004 | 04F | . | #TOUTU | 06A | AND JUMP TO TIMEOUT ROUTINE |
| 80 | 004 | 050 | . | CMPR(MDL) | 9D5 | COMPARE LIMIT IN BYTE 2 |
| 81 | 004 | 051 | . | #TOUTL | 069 | AND JUMP TO TIMEOUT ROUTINE |

*FOLLOWING TESTS IF ANY SCALE 1 LIMIT EXIST AND SET G8

| 82 | 004 | 052 | . | TS1(G) | D82 | SKIP ROUTINE IF SCALE 2 |
|---|---|---|---|---|---|---|
| 83 | 004 | 053 | . | #INCRS | 061 | TO INCREMENT SCANNER |
| 84 | 004 | 054 | . | TS8(G) | DF2 | SKIP ROUTINE IF PREVIOUSLY 1 |
| 85 | 004 | 055 | . | #INCRS | 061 | TO INCREMENT SCANNER |
| 86 | 004 | 056 | . | TR8(MDU) | CF6 | SKIP MDU TEST IF NO LIMIT |
| 87 | 004 | 057 | . | #+7 | 05D | ELSE TEST IF SCALE 1 |
| 88 | 004 | 058 | . | TS7(MDU) | DE6 | JUMP IF SCALE 2 |
| 89 | 004 | 059 | . | #+5 | 05D | ELSE MARK G8 |
| 90 | 004 | 05A | . | S8(G) | BF2 | |
| 91 | 004 | 05B | . | JMP | 9D1 | |
| 92 | 004 | 05C | . | #INCRS | 061 | |
| 93 | 004 | 05D | . | TR8(MDL) | CF5 | |
| 94 | 004 | 05E | . | #INCRS | 061 | |
| 95 | 004 | 05F | . | TR7(MDL) | CE5 | |
| 96 | 004 | 060 | . | #-5 | 05A | |

*FOLLOWING INCREMENTS THE SCANNER

| 97 | 004 | 061 | INCRS | READS" | 3B9 | GET SCANNER |
|---|---|---|---|---|---|---|
| 98 | 004 | 062 | . | @002 | 002 | |
| 99 | 004 | 063 | . | @062 | 062 | |
| 100 | 004 | 064 | . | INCR(MDL) | A25 | |
| 101 | 004 | 065 | . | INCR(MDL) | A25 | |
| 102 | 004 | 066 | . | WRTS | 3C3 | WRITE NEW SCANNER |
| 103 | 004 | 067 | . | JMP | 9D1 | |
| 104 | 004 | 068 | . | #TIOC | 035 | |

*FOLLOWING HANDLES TIME OUT SITUATION

| 105 | 004 | 069 | TOUTL | S1(MAL) | B83 | |
|---|---|---|---|---|---|---|
| 106 | 004 | 06A | TOUTU | RL(MDL) | A55 | |
| 107 | 004 | 06B | . | WRTC | 3CB | ZERO OUT THE LIMIT EXPIRED |
| 108 | 004 | 06C | . | DECR(MAL) | AF3 | GET RTC TRAP WORD |
| 109 | 004 | 06D | . | DECR(MAL) | AF3 | |

| NO. | PU | PL | LABEL | MNEMONIC | CODE | COMMENTS |
|---|---|---|---|---|---|---|
| 110 | 004 | 06E | . | READ | E03 | |
| 111 | 004 | 06F | . | S8(MDU) | BF6 | |
| 112 | 004 | 070 | . | R7(MDU) | B66 | MARK WHICH LIMIT EXPIRED |
| 113 | 004 | 071 | . | TR1(MAL) | C83 | |
| 114 | 004 | 072 | . | #+3 | 074 | |
| 115 | 004 | 073 | . | S7(MDU) | BE6 | |
| 116 | 004 | 074 | . | WRT | E07 | |
| 117 | 004 | 075 | . | JMP | 9D1 | |
| 118 | 004 | 076 | . | #INCRS | 061 | |

*FOLLOWING IS THE END OF THE RTC PROCESSING
*ROUTINE DECIDES IF SCALE 1 TIMER SHOULD BE DISABLED

| 119 | 004 | 077 | END | TR8(G) | CF2 | TEST IF SCALE 1 USED |
|---|---|---|---|---|---|---|
| 120 | 004 | 078 | . | #+5 | 07C | |
| 121 | 004 | 079 | . | JMP0 | 386 | RETURN TO SERV ROUTINE |
| 122 | 004 | 07A | . | @000 | 000 | |
| 123 | 004 | 07B | . | @006 | 006 | #SERV |
| 124 | 004 | 07C | . | TS1(G) | D82 | JMP OUT IF RTC NOT SCALE 1 |
| 125 | 004 | 07D | . | #-3 | 079 | |
| 126 | 004 | 07E | . | RL(G) | A52 | RTC PORT IDENT |
| 127 | 004 | 07F | . | X(A)(UA) | 81A | LOAD A WITH RTC CTL CHAR. |
| 128 | 004 | 080 | . | @002 | 002 | |
| 129 | 004 | 081 | . | OUTC | 39C | |
| 130 | 004 | 082 | . | JMP | 9D1 | |
| 131 | 004 | 083 | . | #END+2 | 079 | |

*END OF THE RTC PROCESSING PROGRAM
*DESIGNED BY D. JEN IN SEPT. 1971

* FOLLOWING IS THE PCU INITIALIZATION PROGRAM.
*
*ZERO OUT ALL MAIN MEMORY LOCATIONS UP TO 12K (MAU < 1100 0000)

| | 004 | 08F | MAINM | DISIN | BDF | |
|---|---|---|---|---|---|---|
| 0 | 004 | 090 | . | RL(MDL) | A55 | |
| 1 | 004 | 091 | . | R1(PP2) | B0F | |
| 2 | 004 | 092 | . | RL(MDU) | A56 | |
| 3 | 004 | 093 | . | RL(MAU) | A54 | |
| 4 | 004 | 094 | . | RL(MAL) | A53 | |
| 5 | 004 | 095 | . | S8(MAL) | BF3 | |
| 6 | 004 | 096 | . | WRT | E07 | |
| 7 | 004 | 097 | . | DIMAL | 3FD | |
| 8 | 004 | 098 | . | TROVF | CEF | |
| 9 | 004 | 099 | . | #-2 | 096 | |
| 10 | 004 | 09A | . | INCR(MAU) | A24 | |
| 11 | 004 | 09B | . | X(A)(UA) | 81A | |
| 12 | 004 | 09C | . | @0C0 | 0C0 | |
| 13 | 004 | 09D | . | CMPR(MAU) | 9D4 | |
| 14 | 004 | 09E | . | #+4 | 0A1 | |
| 15 | 004 | 09F | . | JMP | 9D1 | |
| 16 | 004 | 0A0 | . | #MAINM+5 | 094 | |

*LINK ALL OPERATING SEGMENTS EVEN TO ODD BEYOND 2K.

| 17 | 004 | 0A1 | LINK | DECR(MAU) | AF4 | |
|---|---|---|---|---|---|---|
| 18 | 004 | 0A2 | . | X(MAL)(UA) | 83A | |
| 19 | 004 | 0A3 | . | @003 | 003 | |
| 20 | 004 | 0A4 | . | X(MDL)(UA) | 85A | |
| 21 | 004 | 0A5 | . | @040 | 040 | FIRST SEGMENT |
| 22 | 004 | 0A6 | . | TR1(MAU) | C84 | TEST IF FIRST SEGMENT |
| 23 | 004 | 0A7 | . | #+4 | 0AA | |
| 24 | 004 | 0A8 | . | X(MDL)(UA) | 85A | |
| 25 | 004 | 0A9 | . | @080 | 080 | SECOND & LAST SEGMENT |
| 26 | 004 | 0AA | . | WRTC | 3CB | |
| 27 | 004 | 0AB | . | X(A)(UA) | 81A | |
| 28 | 004 | 0AC | . | @007 | 007 | |

| NO. | PU | PL | LABEL | MNEMONIC | CODE | COMMENTS |
|---|---|---|---|---|---|---|
| 29 | 004 | 0AD | . | SUB(MAU) | 924 | |
| 30 | 004 | 0AE | . | TSY(A) | D31 | TEST IF 2K ADDRESS |
| 31 | 004 | 0AF | . | #LINK | 0A1 | |

*
*ZERO OUT ALL PORTS

| 32 | 004 | 0B0 | . | DISIN | BDF | |
|---|---|---|---|---|---|---|
| 33 | 004 | 0B1 | . | RL(MDU) | A56 | |
| 34 | 004 | 0B2 | . | RL(MDL) | A55 | |
| 35 | 004 | 0B3 | . | OUTCON | 39E | |
| 36 | 004 | 0B4 | . | INCR(MDU) | A26 | |
| 37 | 004 | 0B5 | . | TR7(MDU) | CF6 | |
| 38 | 004 | 0B6 | . | #-3 | 0B2 | |

*
*INITIALIZATION OF SCANNER TO TOP OF IOC TABLE

| 39 | 004 | 0B7 | . | ENTRS | 3A8 | |
|---|---|---|---|---|---|---|
| 40 | 004 | 0B8 | . | @002 | 002 | |
| 41 | 004 | 0B9 | . | @060 | 060 | |
| 42 | 004 | 0BA | . | @002 | 002 | |
| 43 | 004 | 0BB | . | @090 | 090 | |
| 44 | 004 | 0BC | . | JMP | 9D1 | |
| 45 | 004 | 0BD | . | #UPSCN+7 | 0C5 | |

*FOLLOWING UPDATES SCANNER TO NEXT PORT

| 46 | 004 | 0BE | UPSCN | READS" | 3B9 | |
|---|---|---|---|---|---|---|
| 47 | 004 | 0BF | . | @002 | 002 | |
| 48 | 004 | 0C0 | . | @060 | 060 | |
| 49 | 004 | 0C1 | . | INCR(MDL) | A25 | |
| 50 | 004 | 0C2 | . | INCR(MDL) | A25 | |
| 51 | 004 | 0C3 | . | TR8(MDL) | CF5 | |
| 52 | 004 | 0C4 | . | #LAST | 0D5 | |
| 53 | 004 | 0C5 | . | X(MAL)(MDL) | 835 | |
| 54 | 004 | 0C6 | . | READS | 3BB | |
| 55 | 004 | 0C7 | . | TRL(MDL) | C35 | TEST IF PORT IS IN USE |
| 56 | 004 | 0C8 | . | #NPORT | 0CF | |
| 57 | 004 | 0C9 | . | X(MDL)(MAL) | 853 | |
| 58 | 004 | 0CA | NEWSC | WRTS" | 3C1 | WRITE NEW SCANNER VALUE |
| 59 | 004 | 0CB | . | @002 | 002 | |
| 60 | 004 | 0CC | . | @060 | 060 | |
| 61 | 004 | 0CD | . | JMP | 9D1 | |
| 62 | 004 | 0CE | . | #PORTA | 0EA | |
| 63 | 004 | 0CF | NPORT | INCR(MAL) | A23 | PORT NOT USED |
| 64 | 004 | 0D0 | . | READS | 3BB | |
| 65 | 004 | 0D1 | . | TRL(MDL) | C35 | TEST IF NO MORE PORTS |
| 66 | 004 | 0D2 | . | #LAST | 0D5 | |
| 67 | 004 | 0D3 | . | JMP | 9D1 | |
| 68 | 004 | 0D4 | . | #NEWSC | 0CA | IF MORE WRITE NEW SCNR |
| 69 | 004 | 0D5 | LAST | JMPO | 386 | |
| 70 | 004 | 0D6 | . | @000 | 000 | GO TO INITIALIZE OS |
| 71 | 004 | 0D7 | . | @021 | 021 | TABLE POINTERS ETC |

* FOLLOWING ROUTINE ISSUES PORT COMMAND TO INITIALIZE THE PORT

| 72 | 004 | 0D8 | CMMND | X(A)(MDL) | 815 | |
|---|---|---|---|---|---|---|
| 73 | 004 | 0D9 | . | READS" | 3B9 | |
| 74 | 004 | 0DA | . | @002 | 002 | |
| 75 | 004 | 0DB | . | @060 | 060 | |
| 76 | 004 | 0DC | . | X(MDU)(MDL) | 865 | |
| 77 | 004 | 0DD | . | R8(MDU) | B76 | |
| 78 | 004 | 0DE | . | SHFTR(MDU) | A76 | |
| 79 | 004 | 0DF | . | RL(MDL) | A55 | |
| 80 | 004 | 0E0 | . | OUTCON | 39E | |

| NO. | PU | PL | LABEL | MNEMONIC | CODE | COMMENTS |
|---|---|---|---|---|---|---|
| 81 | 004 | 0E1 | . | X(MDL)(A) | 851 | |
| 82 | 004 | 0E2 | . | OUTCON | 39E | |
| 83 | 004 | 0E3 | TEST | TR1(PR2) | C8F | |
| 84 | 004 | 0E4 | . | #UPSCN | 0BE | |
| 85 | 004 | 0E5 | . | JMP0 | 386 | |
| 86 | 004 | 0E6 | . | @000 | 000 | |
| 87 | 004 | 0E7 | . | @008 | 008 | |

```
*
* FOLLOWING STARTS TO INITIALIZE A PORT USED BY AN USER
* USER ENTERS HERE AND WILL BE RETURNED TO #EOJ AFTER INTZ.
```

| 88 | 004 | 0E8 | USERZ | DISIN | BDF | |
| 89 | 004 | 0E9 | . | S1(PR2) | B8F | |

*OBTAIN PORT CONTROL ADDRESS

| 90 | 004 | 0EA | PORTA | PORTAD | 3DD | |
| 91 | 004 | 0EB | . | R1(MAL) | B03 | |
| 92 | 004 | 0EC | . | X(A)(UA) | 81A | GET BACKGROUND P LOCATION |
| 93 | 004 | 0ED | . | @0F8 | 0F8 | |
| 94 | 004 | 0EE | . | ADD(MAL) | 953 | |
| 95 | 004 | 0EF | . | X(MAL)(A) | 831 | |
| 96 | 004 | 0F0 | . | SAVE(MAL) | E93 | FIRST WRITE ADDRESS |
| 97 | 004 | 0F1 | . | SAVE(MAU) | E94 | |

*OBTAIN IO INITIALIZATION TABLE POINTER

| 98 | 004 | 0F2 | . | READSI | 3AF | |
| 99 | 004 | 0F3 | . | @002 | 002 | |
| 100 | 004 | 0F4 | . | @060 | 060 | |
| 101 | 004 | 0F5 | . | INCR(MAL) | A23 | GET DEVICE TYPE |
| 102 | 004 | 0F6 | . | READS | 3BB | |
| 103 | 004 | 0F7 | . | R1(MDL) | B05 | |
| 104 | 004 | 0F8 | . | WSTK(0) | E50 | SAVE BASE SEG. ADDR. |
| 105 | 004 | 0F9 | . | X(A)(UA) | 81A | |
| 106 | 004 | 0FA | . | #POINT | 078 | |
| 107 | 004 | 0FB | . | ADD(MDU) | 956 | |

*OBTAIN TABLE READ ADDRESS

| 108 | 004 | 0FC | . | X(MAL)(A) | 831 | SET UP ADDRESS |
| 109 | 004 | 0FD | . | X(MAU)(UA) | 84A | |
| 110 | 004 | 0FE | . | @005 | 005 | |
| 111 | 004 | 0FF | . | READS | 3BB | |
| 112 | 005 | 000 | . | X(A)(MDL) | 815 | |
| 113 | 005 | 001 | RADDR | X(MAL)(A) | 831 | |
| 114 | 005 | 002 | . | INCR(A) | A21 | SAVE READ ADDRESS LOWER |
| 115 | 005 | 003 | . | SAVE(A) | E91 | |
| 116 | 005 | 004 | . | X(MAU)(UA) | 84A | |
| 117 | 005 | 005 | . | @005 | 005 | |
| 118 | 005 | 006 | . | READS | 3BB | GET DATA FROM TABLE |
| 119 | 005 | 007 | . | RSTOR(MAU) | E84 | GET WRITE ADDRESS |
| 120 | 005 | 008 | . | RSTOR(MAL) | E83 | |
| 121 | 005 | 009 | . | X(A)(MDU) | 816 | TEST UPPER BITS OF DATA |
| 122 | 005 | 00A | . | COMPR | 3D2 | |
| 123 | 005 | 00B | . | @00D | 00D | |
| 124 | 005 | 00C | . | #SKIP | 020 | ADDRESS CHANGE |
| 125 | 005 | 00D | . | @00E | 00E | |
| 126 | 005 | 00E | . | #OPSEG | 029 | OP SEG ADDRESS |
| 127 | 005 | 00F | . | @00F | 00F | |
| 128 | 005 | 010 | . | #MISC | 030 | MISC ROUTINES |
| 129 | 005 | 011 | . | @0FF | 0FF | |
| 130 | 005 | 012 | . | #+2 | 013 | |
| 131 | 005 | 013 | WADDR | SB(MAL) | BF3 | |

| NO. | PU | PL | LABEL | MNEMONIC | CODE | COMMENTS |
|---|---|---|---|---|---|---|
| 132 | 005 | 014 | . | ADD(MAL) | 953 | ADD OFFSET TO ADDRESS |
| 133 | 005 | 015 | . | X(MAL)(A) | 831 | |
| 134 | 005 | 016 | . | TROVF | CEF | |
| 135 | 005 | 017 | . | #+3 | 019 | |
| 136 | 005 | 018 | . | INCR(MAU) | A24 | |
| 137 | 005 | 019 | . | WRTC | 3CB | |
| 138 | 005 | 01A | . | INCR(MAL) | A23 | |
| 139 | 005 | 01B | NEWWA | SAVE(MAU) | E94 | |
| 140 | 005 | 01C | . | SAVE(MAL) | E93 | SAVE WRITE ADDR |
| 141 | 005 | 01D | . | RSTOR(A) | E81 | GET NEXT READ ADDR |
| 142 | 005 | 01E | . | JMP | 9D1 | |
| 143 | 005 | 01F | . | #RADDR | 001 | |
| 144 | 005 | 020 | SKIP | X(A)(MDL) | 815 | |
| 145 | 005 | 021 | . | S8(MAL) | BF3 | |
| 146 | 005 | 022 | . | ADD(MAL) | 953 | |
| 147 | 005 | 023 | . | TROVF | CEF | |
| 148 | 005 | 024 | . | #+3 | 026 | |
| 149 | 005 | 025 | . | INCR(MAU) | A24 | |
| 150 | 005 | 026 | . | X(MAL)(A) | 831 | |
| 151 | 005 | 027 | . | JMP | 9D1 | |
| 152 | 005 | 028 | . | #NEWWA | 01B | |
| 153 | 005 | 029 | OPSEG | X(MAL)(MDL) | 835 | |
| 154 | 005 | 02A | . | RSTK(0) | E40 | BASE SEG ADDRESS |
| 155 | 005 | 02B | . | X(MAU)(MDL) | 845 | |
| 156 | 005 | 02C | . | SAVE(MAU) | E94 | |
| 157 | 005 | 02D | . | SAVE(MAL) | E93 | |
| 158 | 005 | 02E | . | JMP | 9D1 | |
| 159 | 005 | 02F | . | #NEWWA | 01B | |
| 160 | 005 | 030 | MISC | TS7(MDL) | DE5 | GO TO IOC IF |
| 161 | 005 | 031 | . | #SPECL | 062 | BIT 8 IS RESET |
| 162 | 005 | 032 | . | TS8(MDL) | DF5 | TEST IF SPECIAL ROUTINE |
| 163 | 005 | 033 | . | #+4 | 037 | |
| 164 | 005 | 034 | . | JMPO | 386 | |
| 165 | 005 | 035 | . | @004 | 004 | |
| 166 | 005 | 036 | . | #CMMND | 0D8 | |

*FOLLOWING WRITES IN KEYBOARD'S FUNCTION AND MODE WORDS

| NO. | PU | PL | LABEL | MNEMONIC | CODE | COMMENTS |
|---|---|---|---|---|---|---|
| 167 | 005 | 037 | FUNC | RSTOR(MAU) | E84 | |
| 168 | 005 | 038 | . | RSTOR(MAL) | E83 | |
| 169 | 005 | 039 | . | S4(MAL) | BB3 | |
| 170 | 005 | 03A | . | X(A)(UA) | 81A | |
| 171 | 005 | 03B | . | @009 | 009 | |
| 172 | 005 | 03C | . | SUB(MAU) | 924 | |
| 173 | 005 | 03D | . | X(MDL)(UA) | 85A | |
| 174 | 005 | 03E | . | @080 | 080 | |
| 175 | 005 | 03F | . | TSOVF | DFF | TEST BASE SEG TO BE |
| 176 | 005 | 040 | . | #FUNCW | 047 | ON TOP; MID OR BOT. OF CRT |
| 177 | 005 | 041 | . | X(MDL)(UA) | 85A | |
| 178 | 005 | 042 | . | @020 | 020 | |
| 179 | 005 | 043 | . | TR7(MAL) | CE3 | |
| 180 | 005 | 044 | . | #FUNCW | 047 | |
| 181 | 005 | 045 | . | X(MDL)(UA) | 85A | |
| 182 | 005 | 046 | . | @008 | 008 | |
| 183 | 005 | 047 | FUNCW | X(MDU)(MDL) | 865 | |
| 184 | 005 | 048 | . | WRT | F07 | |
| 185 | 005 | 049 | . | DIMAL | 3FD | |
| 186 | 005 | 04A | . | WRT | F07 | |
| 187 | 005 | 04B | MODE | RL(G) | A52 | |
| 188 | 005 | 04C | . | DIMAL | 3FD | |
| 189 | 005 | 04D | . | TRB(A) | CF1 | |
| 190 | 005 | 04E | . | #MODEW | 055 | |
| 191 | 005 | 04F | . | INCR(MAL) | A23 | |
| 192 | 005 | 050 | . | RPT2 | 3F9 | |
| 193 | 005 | 051 | . | TR7(MAL) | CF3 | |
| 194 | 005 | 052 | . | #MODEW | 055 | |
| 195 | 005 | 053 | . | INCR(MAL) | A23 | |

| NO. | PU | PL | LABEL | MNEMONIC | CODE | COMMENTS |
|---|---|---|---|---|---|---|
| 196 | 005 | 054 | . | RPT2 | 3F9 | |
| 197 | 005 | 055 | MODEW | RSTK(0) | E40 | |
| 198 | 005 | 056 | . | WRTC | 3CB | |
| 199 | 005 | 057 | . | INCR(MAL) | A23 | |
| 200 | 005 | 058 | . | INCR(MDL) | A25 | |
| 201 | 005 | 059 | . | WRTC | 3CB | |
| 202 | 005 | 05A | . | INCR(G) | A22 | |
| 203 | 005 | 05B | . | INCR(MAL) | A23 | |
| 204 | 005 | 05C | . | RPT6 | 3F5 | |
| 205 | 005 | 05D | . | TR3(G) | CA2 | |
| 206 | 005 | 05E | . | #MODEW | 055 | |
| 207 | 005 | 05F | . | JMP0 | 386 | |
| 208 | 005 | 060 | . | @004 | 004 | |
| 209 | 005 | 061 | . | #TEST | 0E3 | |

* FOLLOWING WRITES SPECIAL INTZ REQUIREMENTS OF THE RFC. PORT

| NO. | PU | PL | LABEL | MNEMONIC | CODE | COMMENTS |
|---|---|---|---|---|---|---|
| 210 | 005 | 062 | SPECL | STRAP(11) | F2B | |
| 211 | 005 | 063 | . | X(MDU)(MDL) | 865 | |
| 212 | 005 | 064 | . | STRAP(6) | E26 | |
| 213 | 005 | 065 | . | WRT" | 3BE | |
| 214 | 005 | 066 | . | @000 | 000 | |
| 215 | 005 | 067 | . | @05C | 05C | |
| 216 | 005 | 068 | . | READS" | 3B9 | |
| 217 | 005 | 069 | . | @002 | 002 | |
| 218 | 005 | 06A | . | @08D | 08D | |
| 219 | 005 | 06B | . | X(G)(MDL) | 825 | |
| 220 | 005 | 06C | . | READS' | 3BA | |
| 221 | 005 | 06D | . | @091 | 091 | |
| 222 | 005 | 06E | . | X(A)(MDL) | 815 | |
| 223 | 005 | 06F | . | ADD(UA) | 95A | |
| 224 | 005 | 070 | . | @008 | 008 | |
| 225 | 005 | 071 | . | MD-AG | 3ED | |
| 226 | 005 | 072 | . | WRT" | 3BE | |
| 227 | 005 | 073 | . | @000 | 000 | |
| 228 | 005 | 074 | . | @066 | 066 | |
| 229 | 005 | 075 | . | RSTOR(A) | E81 | |
| 230 | 005 | 076 | . | JMP | 9D1 | |
| 231 | 005 | 077 | . | #RADDR | 001 | |

**

*DEFINITION OF INITIALIZATION CONSTANTS
*
*BITS 12 TO 9                                      BITS 8 TO 1
*------------                                      -----------
*0000 TO 1100   INCR ADDR BY LEFT          DATA CHARACTER
*1101           INCR ADDR BY RIGHT         NEW OFFSET VALUE
*1110           GO TO OP SEG ADDR          ADDR LOWER VALUE
*1111           MISC CTL CODE              SEE BELOW
*
*WHEN 1111 CODE IS IN UPPER BYTE BITS 8 &7 HAVE FOLLOWING MEANING;
*BIT 8 ZERO MEANS IO COMMAND AND LAST ENTRY OF TABLE
*BIT 8 ONE AND BIT 7 ZERO INDICATE A KEYBOARD
*BIT 8 AND BIT 7 ONES IS FOR SPECIAL INITIALIZATION
*
*INDIRECT POINTER FOR EACH DEVICE TYPE

| NO. | PU | PL | LABEL | MNEMONIC | CODE | COMMENTS |
|---|---|---|---|---|---|---|
| 232 | 005 | 078 | POINT | #TYPE0 | 088 | NOT USED |
| 233 | 005 | 079 | . | #TYPE1 | 089 | COMM.-RECEIVE |
| 234 | 005 | 07A | . | #TYPE2 | 099 | COMM.-XMIT |
| 235 | 005 | 07B | . | #TYPE3 | 0D1 | NOT USED |
| 236 | 005 | 07C | . | #TYPE4 | 0D2 | NOT USED |
| 237 | 005 | 07D | . | #TYPE5 | 0D3 | NOT USED |
| 238 | 005 | 07E | . | #TYPE6 | 0D4 | NOT USED |
| 239 | 005 | 07F | . | #TYPE7 | 0D5 | NOT USED |

| NO. | PU | PL | LABEL | MNEMONIC | CODE | COMMENTS |
|---|---|---|---|---|---|---|
| 240 | 005 | 080 | . | #TYPE8 | 0D6 | NOT USED |
| 241 | 005 | 081 | . | #TYPE9 | 0A7 | DOW JONES NEWS |
| 242 | 005 | 082 | . | #TYPEA | 0B3 | TICKER-900 |
| 243 | 005 | 083 | . | #TYPEB | 0BE | TICKER-OTHERS |
| 244 | 005 | 084 | . | #TYPEC | 0C9 | 9" CRT-KEYBOARD |
| 245 | 005 | 085 | . | #TYPED | 0CA | 3" CRT-KEYBOARD |
| 246 | 005 | 086 | . | #TYPEE | 0D7 | NOT USED |
| 247 | 005 | 087 | . | #TYPEF | 0D8 | NOT USED |
| 248 | 005 | 088 | TYPE0 | @F00 | F00 | |
| 249 | 005 | 089 | TYPE1 | @011 | 011 | |
| 250 | 005 | 08A | . | @024 | 024 | |
| 251 | 005 | 08B | . | @010 | 010 | |
| 252 | 005 | 08C | . | @000 | 000 | |
| 253 | 005 | 08D | . | @000 | 000 | |
| 254 | 005 | 08E | . | @008 | 008 | |
| 255 | 005 | 08F | . | @3A0 | 3A0 | |
| 256 | 005 | 090 | . | @D13 | D13 | |
| 257 | 005 | 091 | . | @312 | 312 | |
| 258 | 005 | 092 | . | @024 | 024 | |
| 259 | 005 | 093 | . | @000 | 000 | |
| 260 | 005 | 094 | . | @03F | 03F | |
| 261 | 005 | 095 | . | @000 | 000 | |
| 262 | 005 | 096 | . | @000 | 000 | |
| 263 | 005 | 097 | . | @FC0 | FC0 | |
| 264 | 005 | 098 | . | @F0A | F0A | |
| 265 | 005 | 099 | TYPE2 | @009 | 009 | |
| 266 | 005 | 09A | . | @025 | 025 | |
| 267 | 005 | 09B | . | @209 | 209 | |
| 268 | 005 | 09C | . | @4C0 | 4C0 | |
| 269 | 005 | 09D | . | @D12 | D12 | |
| 270 | 005 | 09E | . | @07D | 07D | |
| 271 | 005 | 09F | . | @B20 | B20 | |
| 272 | 005 | 0A0 | . | @120 | 120 | |
| 273 | 005 | 0A1 | . | @020 | 020 | |
| 274 | 005 | 0A2 | . | @082 | 082 | |
| 275 | 005 | 0A3 | . | @0CF | 0CF | |
| 276 | 005 | 0A4 | . | @047 | 047 | |
| 277 | 005 | 0A5 | . | @F00 | F00 | |
| 278 | 005 | 0A6 | . | @000 | 000 | |
| 279 | 005 | 0A7 | TYPE9 | @018 | 018 | |
| 280 | 005 | 0A8 | . | @117 | 117 | |
| 281 | 005 | 0A9 | . | @0AD | 0AD | |
| 282 | 005 | 0AA | . | @018 | 018 | |
| 283 | 005 | 0AB | . | @036 | 036 | |
| 284 | 005 | 0AC | . | @3A0 | 3A0 | |
| 285 | 005 | 0AD | . | @D12 | D12 | |
| 286 | 005 | 0AE | . | @098 | 098 | |
| 287 | 005 | 0AF | . | @260 | 260 | |
| 288 | 005 | 0B0 | . | @000 | 000 | |
| 289 | 005 | 0B1 | . | @000 | 000 | |
| 290 | 005 | 0B2 | . | @F03 | F03 | |
| 291 | 005 | 0B3 | TYPEA | @017 | 017 | |
| 292 | 005 | 0B4 | . | @0DA | 0DA | |
| 293 | 005 | 0B5 | . | @017 | 017 | |
| 294 | 005 | 0B6 | . | @0AE | 0AE | |
| 295 | 005 | 0B7 | . | @5A0 | 5A0 | |
| 296 | 005 | 0B8 | . | @D12 | D12 | |
| 297 | 005 | 0B9 | . | @080 | 080 | |
| 298 | 005 | 0BA | . | @220 | 220 | |
| 299 | 005 | 0BB | . | @F03 | F03 | |
| 300 | 005 | 0BC | . | @000 | 000 | |
| 301 | 005 | 0BD | . | @000 | 000 | |
| 302 | 005 | 0BE | TYPEB | @017 | 017 | |
| 303 | 005 | 0BF | . | @0DA | 0DA | |
| 304 | 005 | 0C0 | . | @017 | 017 | |
| 305 | 005 | 0C1 | . | @0AE | 0AE | |

| NO. | PU | PL | LABEL | MNEMONIC | CODE | COMMENTS |
|---|---|---|---|---|---|---|
| 306 | 005 | 0C2 | . | @5A0 | 5A0 | |
| 307 | 005 | 0C3 | . | @D12 | D12 | |
| 308 | 005 | 0C4 | . | @080 | 080 | |
| 309 | 005 | 0C5 | . | @220 | 220 | |
| 310 | 005 | 0C6 | . | @000 | 000 | |
| 311 | 005 | 0C7 | . | @000 | 000 | |
| 312 | 005 | 0C8 | . | @F03 | F03 | |
| 313 | 005 | 0C9 | TYPEC | @D00 | D00 | |
| 314 | 005 | 0CA | TYPED | @D08 | D08 | |
| 315 | 005 | 0CB | . | @060 | 060 | |
| 316 | 005 | 0CC | . | @080 | 080 | |
| 317 | 005 | 0CD | . | @072 | 072 | |
| 318 | 005 | 0CE | . | @077 | 077 | |
| 319 | 005 | 0CF | . | @F80 | F80 | |
| 320 | 005 | 0D0 | . | @F00 | F00 | |
| 321 | 005 | 0D1 | TYPE3 | @F00 | F00 | |
| 322 | 005 | 0D2 | TYPE4 | @F00 | F00 | |
| 323 | 005 | 0D3 | TYPE5 | @F00 | F00 | |
| 324 | 005 | 0D4 | TYPE6 | @F00 | F00 | |
| 325 | 005 | 0D5 | TYPE7 | @F00 | F00 | |
| 326 | 005 | 0D6 | TYPE8 | @F00 | F00 | |
| 327 | 005 | 0D7 | TYPEE | @F00 | F00 | |
| 328 | 005 | 0D8 | TYPEF | @F00 | F00 | |
| 329 | 005 | 0D9 | . | @000 | 000 | |
| 330 | 005 | 0DA | . | @000 | 000 | |
| 331 | 005 | 0DB | . | @000 | 000 | |
| 332 | 005 | 0DC | . | @000 | 000 | |
| 333 | 005 | 0DD | . | @000 | 000 | |
| 334 | 005 | 0DE | . | @000 | 000 | |
| 335 | 005 | 0DF | . | @000 | 000 | |
| 336 | 005 | 0E0 | . | @000 | 000 | |
| 337 | 005 | 0E1 | . | @000 | 000 | |
| 338 | 005 | 0E2 | . | @000 | 000 | |
| 339 | 005 | 0E3 | . | @000 | 000 | |
| 340 | 005 | 0E4 | . | @000 | 000 | |
| 341 | 005 | 0E5 | . | @000 | 000 | |
| 342 | 005 | 0E6 | . | @000 | 000 | |
| 343 | 005 | 0E7 | . | @000 | 000 | |
| 344 | 005 | 0E8 | . | @000 | 000 | |
| 345 | 005 | 0E9 | . | @000 | 000 | |
| | 005 | 0FF | . | @000 | 000 | |

---------------------INSERT DATA MODE---------------------

*
*
*INSERT DATA IS IN G- MAU=0F SEG- MAL=02
*STORE DATA TEMPORARILY AT 04 OF SEG

| | | | | | | |
|---|---|---|---|---|---|---|
| 0 | 006 | 02A | INSM | STG' | 35F | |
| 1 | 006 | 02B | . | @005 | 005 | |
| 2 | 006 | 02C | . | X(MDL)(MAU) | 854 | |
| 3 | 006 | 02D | . | TRIS" | 3C1 | STORE EM MAU |
| 4 | 006 | 02E | . | @006 | 006 | |
| 5 | 006 | 02F | . | #EMMAU | 09E | |
| 6 | 006 | 030 | . | X(MAU)(MDL) | 845 | MDL=EM MAU |
| 7 | 006 | 031 | . | NOP | 800 | |
| 8 | 006 | 032 | . | LOCEM | 200 | |
| 9 | 006 | 033 | . | NOP | 800 | |

*CHECK IF THERE IS ROOM IN LINE WITH EM

| | | | | | | |
|---|---|---|---|---|---|---|
| 10 | 006 | 034 | . | READC | E00 | |
| 11 | 006 | 035 | . | X(A)(UA) | 81A | |
| 12 | 006 | 036 | . | @0AE | 0AE | AE=TAB POINT CODE |
| 13 | 006 | 037 | . | CMPR(MDL) | 9D5 | DATA=TAB+PERIOD? |
| 14 | 006 | 038 | . | #+4 | 03B | YES=NULL |
| 15 | 006 | 039 | . | TSY(MDL) | D35 | |
| 16 | 006 | 03A | . | #INSS | 071 | |

| NO. | PU | PL | LABEL | MNEMONIC | CODE | COMMENTS |
|---|---|---|---|---|---|---|

*EM IS A1 1B OR NULL
*CHECK IF EM IS 1ST POSITION OF A LINE
*IF EM=1ST CH OF LINE CHECK IF STRADDLE CORR CAN FIT IN LINE

```
17 006 03B   .      LEOL           20F
18 006 03C   .      DECR(MDU)      AF6   MDU=40-1
19 006 03D   .      SUB(MDU)       926   MDU=A-39=START OF LINE
20 006 03E   .      CMPR(MAL)      9D3   MAL=START OF LINE?
21 006 03F   .      #+7            045   YES
22 006 040   1A     LDG'           356
23 006 041   .      @005,          005
24 006 042   .      JMP0           386
25 006 043   .      @018           018
26 006 044   .      #DATA-5        056   056 --------------
27 006 045   .      STRAP(15)      E2F   MDL=08
28 006 046   .      SUB(MDL)       925   A-B=0?
29 006 047   .      TSY(A)         D31
30 006 048   .      #2A            056   NO
31 006 049   .      AG-MA          3F3   SAVE LAST DATA ENTRY ADD
32 006 04A   .      RL(MAL)        A53
33 006 04B   .      S2(MAL)        B93       ADD 02 IN"OF SEG
34 006 04C   .      NOP            800
35 006 04D   .      S8(A)          BF1
36 006 04E   .      DECR(MAU)      AF4   ADD PREW SEG
37 006 04F   .      READL          E01
38 006 050   .      156(MDL)       DD5   PREV SEG=INDEX?
39 006 051   .      #1A            040
40 006 052   .      MA-AG          3F1   GET LAST DATANENTRY ADD
41 006 053   .      RL(MAL)        A53
42 006 054   .      DECR(MAU)      AF4
43 006 055   .      NOP            800
44 006 056   2A     DECR(MAL)      AF3   MAL=LAST P.OF PREV. LINE
45 006 057   .      READC          E00
46 006 058   .      TRL(MDL)       C35
47 006 059   .      #1A            040   DATA=NULL
48 006 05A   .      R6(MDL)        B55
49 006 05B   .      TRL(MDL)       C35   DATA=SP?
50 006 05C   .      #1A            040
51 006 05D   .      RL(MDU)        A56
52 006 05E   .      INCR(MDU)      A26   MDU=INDEX DUR LINE STR MOVE
53 006 05F   3A     DECR(MAL)      AF3
54 006 060   .      READC          E00
55 006 061   .      R6(MDL)        B55   LOOK FOR SPACE
56 006 062   .      NOP            800
57 006 063   .      NOP            800
58 006 064   .      NOP            800
59 006 065   .      TSY(MDL)       D35
60 006 066   .      #3A-1          05E
61 006 067   .      TR8(A)         CF1
62 006 068   .      #4A            06A
63 006 069   .      INCR(MAU)      A24
64 006 06A   4A     LODEM          200
65 006 06B   .      X(A)(MAL)      813
66 006 06C   .      ADD(MDU)       956
67 006 06D   .      X(MAL)(A)      831
68 006 06E   .      READC          E00
69 006 06F   .      TRL(MDL)       C35
70 006 070   .      #1A            040
71 006 071   INSS   SUBRTN         17F
72 006 072   .      @006           006
73 006 073   .      #INSL          07A
```

*TEST IF INSERT OF 40 CH BY SUBRTN WAS SUCCESSFUL
*MAL2=1=NO ROOM IN THE BUF TO DO AN INSERT

| NO. | PU | PL | LABEL | MNEMONIC | CODE | COMMENTS |
|---|---|---|---|---|---|---|
| 74 | 006 | 074 | . | TS2(MAL) | D93 | |
| 75 | 006 | 075 | . | #MRK0 | 0B8 | |
| 76 | 006 | 076 | . | JMP0 | 386 | |
| 77 | 006 | 077 | . | @018 | 018 | |
| 78 | 006 | 078 | . | #DATA-5 | 056 | 056 ---------------- |
| 79 | 006 | 079 | . | NOP | 800 | |

**

*INSERT 40 CHAR OF NULLS SUBROUTINE

| 80 | 006 | 07A | INSL | LEOL | 20F | |
|---|---|---|---|---|---|---|
| 81 | 006 | 07B | . | R1(PR2) | B0F | |
| 82 | 006 | 07C | . | X(MAL)(A) | 831 | |

*NO ROOM IN LINE WITH EM FOR INSERT
*IF MAL=127 CHECK IF PRESENT SEG IS LAST OF BUFFER
*MAL=EOL

| 83 | 006 | 07D | . | X(G)(MAU) | 824 | STORE EM MAU IN G |
|---|---|---|---|---|---|---|
| 84 | 006 | 07E | . | X(A)(UA) | 81A | |
| 85 | 006 | 07F | . | @027 | 027 | 027H=39D |
| 86 | 006 | 080 | ADNL | TR17I(MAL) | C23 | CHECK MAL=127? |
| 87 | 006 | 081 | . | #LFEL | 08F | NO LOOK FOR AN EMPTY LINE IN B |
| 88 | 006 | 082 | . | S2(MAL) | B93 | YES ADRESS02 IN OF SEG |
| 89 | 006 | 083 | . | READL | E01 | |
| 90 | 006 | 084 | . | TR7(MDL) | CE5 | |
| 91 | 006 | 085 | . | #MRK0 | 0B8 | |
| 92 | 006 | 086 | . | NOP | 800 | |
| 93 | 006 | 087 | . | NOP | 800 | |
| 94 | 006 | 088 | . | NOP | 800 | |
| 95 | 006 | 089 | . | NOP | 800 | |
| 96 | 006 | 08A | . | INCR(MAU) | A24 | |

*LOOK FOR LINE WITH A NULL AS 1ST CHAR.

| 97 | 006 | 08B | . | RL(MAL) | A53 | |
|---|---|---|---|---|---|---|
| 98 | 006 | 08C | . | S4(MAL) | BB3 | |
| 99 | 006 | 08D | . | NOP | 800 | |
| 100 | 006 | 08E | . | NOP | 800 | |
| 101 | 006 | 08F | LFEL | READC | E00 | |
| 102 | 006 | 090 | . | TRL(MDL) | C35 | TEST IF 1ST CHAR =NULL |
| 103 | 006 | 091 | . | #FCNL-1 | 0A1 | YES CHECK ALL LINES FOR NULLS |
| 104 | 006 | 092 | . | NOP | 800 | |
| 105 | 006 | 093 | . | NOP | 800 | |
| 106 | 006 | 094 | . | X(MDU)(A) | 861 | SAVE CONST.39 IN MDU |
| 107 | 006 | 095 | . | X(A)(UA) | 81A | |
| 108 | 006 | 096 | . | @0AE | 0AE | AE=. CODE +TAB POINT |
| 109 | 006 | 097 | . | CMPR(MDL) | 9D5 | TEST IF 1ST CH.=TAB POINT |
| 110 | 006 | 098 | . | #FCNL-1 | 0A1 | YES |
| 111 | 006 | 099 | . | X(A)(MDU) | 816 | |
| 112 | 006 | 09A | . | ADD(MAL) | 953 | ADD 39 TO MAL |
| 113 | 006 | 09B | . | X(MAL)(A) | 831 | |
| 114 | 006 | 09C | . | JMP | 9D1 | |
| 115 | 006 | 09D | . | #ADNL-2 | 07E | EMPTY 1ST CH POS. |
| 116 | 006 | 09E | EMMAU | NOP | 800 | |
| 117 | 006 | 09F | . | NOP | 800 | |
| 118 | 006 | 0A0 | . | NOP | 800 | |

*G=MAU OF EM

| NO. | PU | PL | LABEL | MNEMONIC | CODE | COMMENTS |
|-----|-----|-----|-------|----------|------|----------|
| *FOUND LINE WITH EMPTY 1ST CHAR. |
| *CHECK IF ENTIRE LINE IS EMPTY |
| 119 | 006 | 0A1 | . | ADD(MAL) | 953 | A+MAL=EOL IN A |
| 120 | 006 | 0A2 | FCNL | R8(PR2) | B7F | |
| 121 | 006 | 0A3 | . | INCR(MAL) | A23 | |
| 122 | 006 | 0A4 | . | READC | E00 | |
| 123 | 006 | 0A5 | . | CMPR(MAL) | 9D3 | END OF LINE |
| 124 | 006 | 0A6 | . | #+3 | 0A8 | |
| 125 | 006 | 0A7 | . | S8(PR2) | BFF | PR28=1=NOT EOL |
| 126 | 006 | 0A8 | . | X(MDU)(A) | 861 | |
| 127 | 006 | 0A9 | . | R8(MDL) | CF5 | TAB BIT? |
| 128 | 006 | 0AA | . | #+7 | 0B0 | |
| 129 | 006 | 0AB | . | X(A)(UA) | 81A | |
| 130 | 006 | 0AC | . | @0AE | 0AE | TAB DISPLAY CODE |
| 131 | 006 | 0AD | . | CMPR(MDL) | 9D5 | |
| 132 | 006 | 0AE | . | #+5 | 0B2 | YES |
| 133 | 006 | 0AF | . | R8(MDL) | B75 | |
| 134 | 006 | 0B0 | . | ISY(MLL) | D35 | NULL? |
| 135 | 006 | 0B1 | . | #RADNL | 0BC | NOT NL-RETURN TO SEARCH 1ST C. |
| 136 | 006 | 0B2 | . | X(A)(MDU) | 816 | MDU END OF LINE |
| 137 | 006 | 0B3 | . | IS8(PR2) | DFF | EOL=MAL? |
| 138 | 006 | 0B4 | . | #FCNL | 0A2 | NO-LOOK FOR NULL |
| 139 | 006 | 0B5 | . | JMP | 9D1 | FOUND EMPY LINE AFTER DATA FROM |
| 140 | 006 | 0B6 | . | #FEL | 0E9 | |
| 141 | 006 | 0B7 | . | RETURN | 18B | |
| 142 | 006 | 0B8 | MRKO | JMPO | 386 | |
| 143 | 006 | 0B9 | . | @019 | 019 | |
| 144 | 006 | 0BA | . | #MARKO | 01C | 01C ---------------- |
| 145 | 006 | 0BB | . | NOP | 800 | |
| 146 | 006 | 0BC | RADNL | X(MAL)(MDU) | 836 | |
| 147 | 006 | 0BD | . | JMP | 9D1 | |
| 148 | 006 | 0BE | . | #ADNL-2 | 07E | |
| 149 | 006 | 0BF | . | NOP | 800 | |
| 150 | 006 | 0C0 | . | NOP | 800 | |
| 151 | 006 | 0C1 | . | NOP | 800 | |
| *G=EM MAU ADDR. |
| *MAL AND MAU=EOL ADD.OF EMPTY LINE |
| *MOVE LINE WITH DATA ONE LINE LOWER |
| 152 | 006 | 0C2 | . | NOP | 800 | |
| 153 | 006 | 0C3 | FEL2 | X(A)(MAU) | 814 | SAVE EMPTY L.MAU |
| 154 | 006 | 0C4 | . | IR8(G) | CF2 | EMPTY L. 1ST L.OF SEG? |
| 155 | 006 | 0C5 | . | #+5 | 0C9 | |
| 156 | 006 | 0C6 | . | SL(G) | AC2 | |
| 157 | 006 | 0C7 | . | R8(G) | B72 | |
| 158 | 006 | 0C8 | . | DECR(A) | AF1 | |
| 159 | 006 | 0C9 | . | READS" | 3B9 | |
| 160 | 006 | 0CA | . | @006 | 006 | |
| 161 | 006 | 0CB | . | #EMMAU | 09E | |
| 162 | 006 | 0CC | . | X(MAU)(MDL) | 845 | |
| 163 | 006 | 0CD | . | IS7(G) | DE2 | |
| 164 | 006 | 0CE | . | #+4 | 0D1 | |
| 165 | 006 | 0CF | . | S8(G) | BF2 | |
| 166 | 006 | 0D0 | . | DECR(A) | AF1 | |
| 167 | 006 | 0D1 | . | CMPR(MAU) | 9D4 | |
| 168 | 006 | 0D2 | . | #GCF1 | 0DF | |
| 169 | 006 | 0D3 | . | X(MAU)(A) | 841 | |
| 170 | 006 | 0D4 | . | X(A)(G) | 812 | G=NEW DEST ADD |
| 171 | 006 | 0D5 | . | X(MDU)(UA) | 86A | |
| 172 | 006 | 0D6 | . | @028 | 028 | |
| 173 | 006 | 0D7 | . | IR8(G) | CF2 | |
| 174 | 006 | 0D8 | . | #+5 | 0DC | |
| 175 | 006 | 0D9 | . | SL(A) | AC1 | |

| NO. | PO | PL | LABEL | MNEMONIC | CODE | COMMENTS |
|---|---|---|---|---|---|---|
| 176 | 006 | 0DA | . | INCR(MAU) | A24 | |
| 177 | 006 | 0DB | . | RL(MDU) | A56 | |
| 178 | 006 | 0DC | . | SUB(MDU) | 926 | |
| 179 | 006 | 0DD | . | JMP | 9D1 | |
| 180 | 006 | 0DE | . | #FELI | 0FF | |
| 181 | 006 | 0DF | GCFI | JMPO | 386 | |
| 182 | 006 | 0E0 | . | @007 | 007 | |
| 183 | 006 | 0E1 | . | #GCEM | 04B | |
| 184 | 006 | 0E2 | GCFEO | JMPO | 386 | |
| 185 | 006 | 0E3 | . | @007 | 007 | |
| 186 | 006 | 0E4 | . | #GCFEM | 044 | |
| 187 | 006 | 0E5 | GCFE | JMPO | 386 | |
| 188 | 006 | 0E6 | . | @007 | 007 | |
| 189 | 006 | 0E7 | . | #GCFEM-2 | 042 | |
| 190 | 006 | 0E8 | . | NOP | 800 | |
| 191 | 006 | 0E9 | FEL | X(MDU)(UA) | 86A | |
| 192 | 006 | 0EA | . | @028 | 028 | 028=40 |
| 193 | 006 | 0EB | . | X(A)(MAL) | 813 | |
| 194 | 006 | 0EC | . | IST(MAL) | DE3 | EOL=2ND OR 3RD LINE? |
| 195 | 006 | 0ED | . | #+4 | 0F0 | |
| 196 | 006 | 0EE | . | RL(MDU) | A56 | NO |
| 197 | 006 | 0EF | . | SL(A) | AC1 | A=SOURCE A.=127 IF E.L. IS 1ST |
| 198 | 006 | 0F0 | . | SUB(MDU) | 926 | IF MDU=X A=SRC.A.=47 OR 87 |
| 199 | 006 | 0F1 | . | SWAP | 3A0 | |
| 200 | 006 | 0F2 | . | CMPR(MAU) | 9D4 | EM MAU=DEST MAU |
| 201 | 006 | 0F3 | . | #GCFEO | 0E2 | |
| 202 | 006 | 0F4 | . | TRY(G) | C42 | SOURCE MAL NOT LAST L. OF SEC? |
| 203 | 006 | 0F5 | . | #+4 | 0F8 | |
| 204 | 006 | 0F6 | . | SB(MAL) | BF3 | |
| 205 | 006 | 0F7 | . | INCR(A) | A21 | |
| 206 | 006 | 0F8 | . | CMPR(MAU) | 9D4 | |
| 207 | 006 | 0F9 | . | #GCFE | 0E5 | JUMP TO GCFEM-2 |
| 208 | 006 | 0FA | . | X(A)(G) | 812 | |
| 209 | 006 | 0FB | . | X(G)(MAL) | 823 | |
| 210 | 006 | 0FC | . | NOP | 800 | |
| 211 | 006 | 0FD | . | NOP | 800 | |
| 212 | 006 | 0FE | . | NOP | 800 | |

*G=SOURCE MAL    A=EM MAU
*SET UP INDEX AND SOURCE MAL ADDR.

| NO. | PO | PL | LABEL | MNEMONIC | CODE | COMMENTS |
|---|---|---|---|---|---|---|
| 213 | 006 | 0FF | FELI | X(MDL)(A) | 851 | SRC. MAL IN A TO MDL |
| 214 | 007 | 000 | . | X(MAL)(UA) | 83A | ADDRESS 06 IN DEST SEG |
| 215 | 007 | 001 | . | @006 | 006 | |
| 216 | 007 | 002 | . | TRB(G) | CF2 | |
| 217 | 007 | 003 | . | #+3 | 005 | |
| 218 | 007 | 004 | . | SB(MDL) | BF5 | SOURCE MAU NOT=DEST. MAU |
| 219 | 007 | 005 | . | X(MDU)(UA) | 86A | MDU=INDEX=40 |
| 220 | 007 | 006 | . | @027 | 027 | |
| 221 | 007 | 007 | . | WRT | E07 | |
| 222 | 007 | 008 | . | NOP | 800 | |
| 223 | 007 | 009 | . | NOP | 800 | |
| 224 | 007 | 00A | . | NOP | 800 | |
| 225 | 007 | 00B | . | NOP | 800 | |
| 226 | 007 | 00C | . | NOP | 800 | |

*DESTINATION 06 HAS MAL OF SOURCE
*UPPER 06 HAS INDEX OF CHAR TO BE MOVED

| NO. | PO | PL | LABEL | MNEMONIC | CODE | COMMENTS |
|---|---|---|---|---|---|---|
| 227 | 007 | 00D | MOVEI | X(MAL)(UA) | 83A | |
| 228 | 007 | 00E | . | @006 | 006 | |
| 229 | 007 | 00F | . | READ | E03 | |
| 230 | 007 | 010 | . | ISL(MDU) | D46 | INDEX=0? |
| 231 | 007 | 011 | . | #ENDMV-1 | 031 | END OF MOVE |
| 232 | 007 | 012 | . | DECR(MDU) | AF6 | |

| NO. | PU | PL | LABEL | MNEMONIC | CODE | COMMENTS |
|---|---|---|---|---|---|---|
| 233 | 007 | 013 | . | DECK(MDL) | AF5 | |
| 234 | 007 | 014 | . | WRI | E07 | UPDATE INDEX AND S POINTR |
| 235 | 007 | 015 | . | INCK(MDL) | A25 | |
| 236 | 007 | 016 | . | X(MAL)(MDL) | 835 | ADDRESS S. MAL |
| 237 | 007 | 017 | . | IR8(MAL) | CF3 | |
| 238 | 007 | 018 | . | #+3 | 01A | |
| 239 | 007 | 019 | . | DECK(MAU) | AF4 | |
| 240 | 007 | 01A | . | READC | E00 | READ CH FROM SR FOR DEST |
| 241 | 007 | 01B | . | X(MDU)(MAL) | 863 | STORE SRCE MAL IN MDU |
| 242 | 007 | 01C | . | X(MAL)(G) | 832 | G=DEST MAL |
| 243 | 007 | 01D | . | X(G)(MDU) | 826 | G=SRCE MAL |
| 244 | 007 | 01E | . | IR8(G) | CF2 | |
| 245 | 007 | 01F | . | #+3 | 021 | |
| 246 | 007 | 020 | . | INCK(MAU) | A24 | |
| 247 | 007 | 021 | . | WRIC | 3CB | MOVE CH TO EMPTY L.=DEST. |
| 248 | 007 | 022 | . | X(MDU)(MAL) | 863 | STORE DEST. MAL |
| 249 | 007 | 023 | . | X(MAL)(G) | 832 | G=MAL=SOURCE MAL |
| 250 | 007 | 024 | . | X(G)(MDU) | 826 | G=MDU=DEST MAL |
| 251 | 007 | 025 | . | RL(MDL) | A55 | |
| 252 | 007 | 026 | . | IR8(MAL) | CF3 | |
| 253 | 007 | 027 | . | #+3 | 029 | |
| 254 | 007 | 028 | . | DECK(MAU) | AF4 | |
| 255 | 007 | 029 | . | WRIC | 3CB | ERASE CH. IN SOURCE ADD. |
| 256 | 007 | 02A | . | DECK(G) | AF2 | UPDATE DEST ADD |
| 257 | 007 | 02B | . | IR8(MAL) | CF3 | |
| 258 | 007 | 02C | . | #+3 | 02E | |
| 259 | 007 | 02D | . | INCK(MAU) | A24 | |
| 260 | 007 | 02E | . | JMP | 9D1 | |
| 261 | 007 | 02F | . | #MOVEI | 00D | |
| 262 | 007 | 030 | . | NOP | 800 | |
| 263 | 007 | 031 | . | X(MAL)(G) | 832 | G=DES ADD-1=LAST CH OF NEW E.L. |
| 264 | 007 | 032 | ENDMV | IR8(FR2) | CFF | |
| 265 | 007 | 033 | . | #FELX | 03C | |
| 266 | 007 | 034 | . | X(A)(MDL) | 815 | MDL=LAST CH MOVED ADD-SOURCE |
| 267 | 007 | 035 | . | IR8(MDL) | CF5 | |
| 268 | 007 | 036 | . | #+3 | 038 | |
| 269 | 007 | 037 | . | DECK(MAU) | AF4 | |
| 270 | 007 | 038 | . | INCK(A) | A21 | |

*FOUND ROOM IN LINE WITH EM TO INSERT DATA
*MAL=CHAR. ADDR. WHICH IS EMPTY
*INSERT DATA STORED IN EM SEG MAL=04

| 271 | 007 | 039 | GRRID | LDG* | 356 | RETR.INSERT DATA CH |
|---|---|---|---|---|---|---|
| 272 | 007 | 03A | . | @005 | 005 | |
| 273 | 007 | 03B | . | RETURN | 18B | |
| 274 | 007 | 03C | FELX | JMPU | 386 | |
| 275 | 007 | 03D | . | @006 | 006 | |
| 276 | 007 | 03E | . | #FEL2 | 0C3 | |
| 277 | 007 | 03F | . | NOP | 800 | |
| 278 | 007 | 040 | . | NOP | 800 | |
| 279 | 007 | 041 | . | NOP | 800 | |

*CHECK IF LINE TO BE MOVED HAS EM IN IT
*IF SO SET UP INDEX FOR CHAR. TO BE MOVED

| 280 | 007 | 042 | . | NOP | 800 | |
|---|---|---|---|---|---|---|
| 281 | 007 | 043 | . | DECK(A) | AF1 | |
| 282 | 007 | 044 | GCFEM | CMPR(MAU) | 9D4 | |
| 283 | 007 | 045 | . | #+3 | 047 | |
| 284 | 007 | 046 | . | SB(MAL) | BF3 | |
| 285 | 007 | 047 | . | MD-MA | 3EF | |
| 286 | 007 | 048 | . | X(MAU)(A) | 841 | |
| 287 | 007 | 049 | . | NOP | 800 | |
| 288 | 007 | 04A | . | X(G)(MDL) | 825 | SAVE DEST MAL IN G |

| NO. | PU | PL | LABEL | MNEMONIC | CODE | COMMENTS |
|---|---|---|---|---|---|---|
| 289 | 007 | 04B | LOEM | LOCEM | 200 | |
| 290 | 007 | 04C | . | LEOL | 20F | |
| 291 | 007 | 04D | . | TR8(C) | CF2 | C8=1 IF S MAU NR=D MAU |
| 292 | 007 | 04E | . | #+8 | 055 | |
| 293 | 007 | 04F | . | S8(MDL) | BF5 | |
| 294 | 007 | 050 | . | IPA1 | 3D9 | |
| 295 | 007 | 051 | . | @07F | 07F | |
| 296 | 007 | 052 | . | @07F | 07F | |
| 297 | 007 | 053 | . | #MEML+1 | 064 | NEXT LINE HAS EM |
| 298 | 007 | 054 | . | R8(MDL) | B75 | |
| 299 | 007 | 055 | . | ADD(MDU) | 956 | MDU=40 FROM LEOL M. |
| 300 | 007 | 056 | . | CMPL(G) | 9D2 | G=EOL OF DEST |
| 301 | 007 | 057 | . | #MEML | 063 | NEXT LINE HAS EM |
| 302 | 007 | 058 | . | TR8(C) | CF2 | |
| 303 | 007 | 059 | . | #+4 | 05C | |
| 304 | 007 | 05A | . | INCR(MAU) | A24 | |
| 305 | 007 | 05B | . | SL(A) | AC1 | |
| 306 | 007 | 05C | . | JMPO | 386 | |
| 307 | 007 | 05D | . | @006 | 006 | |
| 308 | 007 | 05E | . | #FELI | 0FF | |
| 309 | 007 | 05F | . | NOP | 800 | |
| 310 | 007 | 060 | . | NOP | 800 | |
| 311 | 007 | 061 | . | NOP | 800 | |
| 312 | 007 | 062 | . | NOP | 800 | |

*CALCULATE INDEX FOR LINE WITH EM

| 313 | 007 | 063 | MEML | SUB(MDU) | 926 | A-40=EOL OF EM LINE |
|---|---|---|---|---|---|---|
| 314 | 007 | 064 | . | SUB(MAL) | 923 | A-MAL=MOVE INDEX FOR EM L. |
| 315 | 007 | 065 | . | NOP | 800 | |
| 316 | 007 | 066 | . | NOP | 800 | |
| 317 | 007 | 067 | . | TR8(MDL) | CF5 | IS EM IN MAU-1? |
| 318 | 007 | 068 | . | #+3 | 06A | |
| 319 | 007 | 069 | . | INCR(MAU) | A24 | |
| 320 | 007 | 06A | . | X(MDU)(A) | 861 | A=INDEX |
| 321 | 007 | 06B | . | X(MAL)(UA) | 83A | |
| 322 | 007 | 06C | . | @006 | 006 | |
| 323 | 007 | 06D | . | WRI | E07 | |
| 324 | 007 | 06E | . | S8(PR2) | BFF | PR28=1=LAST LINE IS EENING MOV |
| 325 | 007 | 06F | . | JMPO | 386 | |
| 326 | 007 | 070 | . | @007 | 007 | |
| 327 | 007 | 071 | . | #MOVEI | 00D | |
| 328 | 007 | 072 | . | NOP | 800 | |
| 329 | 007 | 073 | . | NOP | 800 | |
| 330 | 007 | 074 | . | NOP | 800 | |

* ----------------------INSERT A PARAGRAPH----------------------
*IF THERE IS ROOM IN BUFFER DROP DATA FROM EM ONE LINE DOWN
*

| 331 | 007 | 075 | INSP | READU | E02 | |
|---|---|---|---|---|---|---|
| 332 | 007 | 076 | . | X(A)(MDU) | 816 | |
| 333 | 007 | 077 | . | IPA1 | 3D9 | IS EM IN LAST SEG OF DISPL. |
| 334 | 007 | 078 | . | @007 | 007 | |
| 335 | 007 | 079 | . | @007 | 007 | |
| 336 | 007 | 07A | . | #CEML | 0A4 | |
| 337 | 007 | 07B | .INS | LOPSG2 | 151 | |
| 338 | 007 | 07C | . | LRIS" | 3C1 | IN S WRITE ADDR OF EM SEG |
| 339 | 007 | 07D | . | @006 | 006 | |
| 340 | 007 | 07E | . | #EMMAU | 09E | |
| 341 | 007 | 07F | . | X(MAU)(MDL) | 845 | |
| 342 | 007 | 080 | . | LOCEM | 200 | |
| 343 | 007 | 081 | . | SUBRIN | 17F | |
| 344 | 007 | 082 | . | @006 | 006 | |
| 345 | 007 | 083 | . | #INSL | 07A | |

| NO. | PO | PL | LABEL | MNEMONIC | CODE | COMMENTS |
|---|---|---|---|---|---|---|
| 346 | 007 | 084 | . | IR2(MAL) | C93 | |
| 347 | 007 | 085 | . | #+5 | 089 | EXIT DUE TO ERROR? |
| 348 | 007 | 086 | . | JMPO | 386 | YES |
| 349 | 007 | 087 | . | @019 | 019 | |
| 350 | 007 | 088 | . | #MARKI | 017 | 017 ---------------- |
| 351 | 007 | 089 | . | LOCEM | 200 | |
| 352 | 007 | 08A | . | LEOL | 20F | |
| 353 | 007 | 08B | . | DECR(MDU) | AF6 | |

*CALCULATE 1ST POSITION OF A LINE

| 354 | 007 | 08C | . | SUB(MDU) | 926 | |
|---|---|---|---|---|---|---|
| 355 | 007 | 08D | . | CMPR(MAL) | 9D3 | |
| 356 | 007 | 08E | . | #CFF | 0B3 | |
| 357 | 007 | 08F | . | X(MAL)(MDL) | 835 | |
| 358 | 007 | 090 | . | ADVNCE | 264 | |
| 359 | 007 | 091 | . | NOP | 800 | |
| 360 | 007 | 092 | . | NOP | 800 | |
| 361 | 007 | 093 | . | NOP | 800 | |

*ENTER A SPACE CH AS 1ST AND 2ND CH OF A LINE

| 362 | 007 | 094 | . | X(MDL)(UA) | 85A | |
|---|---|---|---|---|---|---|
| 363 | 007 | 095 | . | @020 | 020 | |
| 364 | 007 | 096 | . | X(MDU)(MDL) | 865 | |
| 365 | 007 | 097 | . | WRT | E07 | |
| 366 | 007 | 098 | . | INCR(MAL) | A23 | |
| 367 | 007 | 099 | . | STEPR | 258 | |
| 368 | 007 | 09A | . | UPDEM | 160 | |
| 369 | 007 | 09B | . | JMPO | 386 | GO TO PROG TO CLOSE UP NULLS |
| 370 | 007 | 09C | . | @00A | 00A | |
| 371 | 007 | 09D | . | @09D | 09D | |
| 372 | 007 | 09E | . | NOP | 800 | |
| 373 | 007 | 09F | . | NOP | 800 | |
| 374 | 007 | 0A0 | . | NOP | 800 | |
| 375 | 007 | 0A1 | . | NOP | 800 | |
| 376 | 007 | 0A2 | . | NOP | 800 | |
| 377 | 007 | 0A3 | . | NOP | 800 | |

*CHECK IF EM IS IN LAST LINE OF BUFFER

| 378 | 007 | 0A4 | CEML | X(A)(UA) | 81A | |
|---|---|---|---|---|---|---|
| 379 | 007 | 0A5 | . | @058 | 058 | |
| 380 | 007 | 0A6 | . | READL | E01 | |
| 381 | 007 | 0A7 | . | SUB(MDL) | 925 | |
| 382 | 007 | 0A8 | . | IR8(A) | CF1 | |
| 383 | 007 | 0A9 | . | #INS | 07B | |
| 384 | 007 | 0AA | . | READU | E02 | |
| 385 | 007 | 0AB | . | DECR(MDU) | AF6 | |
| 386 | 007 | 0AC | . | WRTU | E06 | UPDATE DISPLAY EM |

*GO TO ROUTINE TO SCROLL ONE SEGMENT UP

| 387 | 007 | 0AD | . | SUBRTN | 17F | |
|---|---|---|---|---|---|---|
| 388 | 007 | 0AE | . | @01A | 01A | |
| 389 | 007 | 0AF | . | #SCRU | 030 | 030 ---------------- |
| 390 | 007 | 0B0 | . | CILA | 15C | |
| 391 | 007 | 0B1 | . | JMP | 9D1 | |
| 392 | 007 | 0B2 | . | #INS | 07B | |
| 393 | 007 | 0B3 | CFF | X(MDL)(UA) | 85A | |
| 394 | 007 | 0B4 | . | @020 | 020 | |
| 395 | 007 | 0B5 | . | WRTC | 3CB | |
| 396 | 007 | 0B6 | . | JMP | 9D1 | |
| 397 | 007 | 0B7 | . | @099 | 099 | |
| 398 | 007 | 0B8 | . | NOP | 800 | |

**

| NO. | PG | FL | LABEL | MNEMONIC | CODE | COMMENTS |
|---|---|---|---|---|---|---|

* CHECK IF 1ST SOURCE CHAR IS FROM 1ST POSITION OF A LINE
* IF IT IS ENTER A SPACE CH FIRST AT THE DESTINATION
* THEN CONTINUE WITH DATA
*

| NO. | PG | FL | LABEL | MNEMONIC | CODE | COMMENTS |
|---|---|---|---|---|---|---|
| 399 | 007 | 0B9 | DFSS | X(MDL)(A) | 851 | SAVE DEST MAL |
| 400 | 007 | 0BA | . | X(A)(MAL) | 813 | |
| 401 | 007 | 0BB | . | COMPR | 3D2 | |
| 402 | 007 | 0BC | . | @030 | 030 | |
| 403 | 007 | 0BD | . | #DFS1+2 | 0C4 | |
| 404 | 007 | 0BE | . | @058 | 058 | |
| 405 | 007 | 0BF | . | #DFS1+2 | 0C4 | |
| 406 | 007 | 0C0 | . | @0FF | 0FF | |
| 407 | 007 | 0C1 | . | #DFNS | 0CA | |
| 408 | 007 | 0C2 | DFS1 | X(MAL)(UA) | 83A | |
| 409 | 007 | 0C3 | . | @008 | 008 | |
| 410 | 007 | 0C4 | . | DECR(MAL) | AF3 | |
| 411 | 007 | 0C5 | . | X(A)(MDL) | 815 | |
| 412 | 007 | 0C6 | . | RL(MDL) | A55 | |
| 413 | 007 | 0C7 | . | NOP | 800 | |
| 414 | 007 | 0C8 | . | JMP | 9D1 | |
| 415 | 007 | 0C9 | . | #DFP4 | 0E6 | |

* SOURCE IS NOT 1ST CHAR OF A LINE

| NO. | PG | FL | LABEL | MNEMONIC | CODE | COMMENTS |
|---|---|---|---|---|---|---|
| 416 | 007 | 0CA | . | NOP | 800 | |
| 417 | 007 | 0CB | DFNS | X(A)(MDL) | 815 | |
| 418 | 007 | 0CC | . | READC | E00 | |
| 419 | 007 | 0CD | . | TR6(MDL) | CD5 | |
| 420 | 007 | 0CE | . | #DFP4+1 | 0E7 | |
| 421 | 007 | 0CF | . | JMP | 9D1 | |
| 422 | 007 | 0D0 | . | #DFC | 0E1 | |
| 423 | 007 | 0D1 | . | NOP | 800 | |
| 424 | 007 | 0D2 | . | NOP | 800 | |

*DELETE FIELD PATCH
*DELETES FIRST CH AND REPLACES IT WITH 1ST SOURCE DATA WITHOUT
*   CONSIDERING EXTRA SPACES OR LINE STRADDLES

| NO. | PG | FL | LABEL | MNEMONIC | CODE | COMMENTS |
|---|---|---|---|---|---|---|
| 425 | 007 | 0D3 | . | NOP | 800 | |
| 426 | 007 | 0D4 | DFPI | TR17I(MAL) | C23 | SOURCE MAL=127? |
| 427 | 007 | 0D5 | . | #+11 | 0DF | |
| 428 | 007 | 0D6 | . | RL(MAL) | A53 | YES-CHECK IF PRESENT SEG IS LAST |
| 429 | 007 | 0D7 | . | S2(MAL) | B93 | |
| 430 | 007 | 0D8 | . | READL | E01 | |
| 431 | 007 | 0D9 | . | TR7(MDL) | CE5 | |
| 432 | 007 | 0DA | . | #DFP2 | 0FC | LAST SEG OF BUFFER-NO DEL |
| 433 | 007 | 0DB | . | INCR(MAU) | A24 | |
| 434 | 007 | 0DC | . | X(MDL)(A) | 851 | |
| 435 | 007 | 0DD | . | JMP | 9D1 | CHECK IF 1ST CHAR READ IS |
| 436 | 007 | 0DE | . | #DFS1 | 0C2 | FROM 1ST CHAR OF A LINE |
| 437 | 007 | 0DF | . | JMP | 9D1 | |
| 438 | 007 | 0E0 | . | #DFSS | 0B9 | |
| 439 | 007 | 0E1 | DFC | R6(MDL) | B55 | |
| 440 | 007 | 0E2 | . | TSY(MDL) | D35 | |
| 441 | 007 | 0E3 | . | #DFP4 | 0E6 | |
| 442 | 007 | 0E4 | . | JMP | 9D1 | |
| 443 | 007 | 0E5 | . | #DFPI | 0D4 | |
| 444 | 007 | 0E6 | DFP4 | S6(MDL) | BD5 | RESTORE CH |
| 445 | 007 | 0E7 | . | X(MDU)(MAU) | 864 | |
| 446 | 007 | 0E8 | . | X(MAU)(G) | 842 | |
| 447 | 007 | 0E9 | . | X(G)(MDU) | 826 | |
| 448 | 007 | 0EA | . | X(MDU)(MAL) | 863 | |

| NO. | PU | PL | LABEL | MNEMONIC | CODE | COMMENTS |
|---|---|---|---|---|---|---|
| 449 | 007 | 0EB | . | X(MAL)(A) | 831 | |
| 450 | 007 | 0EC | . | X(A)(MDU) | 816 | |
| 451 | 007 | 0ED | WRTC | 3CB | | WRITE COURCE DATA AT OPEN BY A |
| 452 | 007 | 0EE | . | IR17I(MAL) | C23 | |
| 453 | 007 | 0EF | . | #+4 | 0F2 | |
| 454 | 007 | 0F0 | . | INCR(MAU) | A24 | |
| 455 | 007 | 0F1 | . | S4(MAL) | BB3 | |
| 456 | 007 | 0F2 | . | IR17I(A) | C21 | |
| 457 | 007 | 0F3 | . | #+4 | 0F6 | |
| 458 | 007 | 0F4 | . | INCR(U) | A22 | |
| 459 | 007 | 0F5 | . | S4(A) | BB1 | |
| 460 | 007 | 0F6 | . | MD-AG | 3ED | |
| 461 | 007 | 0F7 | . | AG-MA | 3F3 | |
| 462 | 007 | 0F8 | . | MA-MD | 3E9 | |
| 463 | 007 | 0F9 | . | JMP0 | 386 | |
| 464 | 007 | 0FA | . | 0008 | 008 | |
| 465 | 007 | 0FB | . | #NEXTC+1 | 0D5 | |
| 466 | 007 | 0FC | DFP2 | CILA | 15C | |
| 467 | 007 | 0FD | . | JMP0 | 386 | |
| 468 | 007 | 0FE | . | 0000 | 000 | |
| 469 | 007 | 0FF | . | 0008 | 008 | |
| 470 | 008 | 000 | . | NOP | 800 | |

*

| 471 | 008 | 001 | . | NOP | 800 |
| 472 | 008 | 002 | . | NOP | 800 |
| 473 | 008 | 003 | . | NOP | 800 |
| 474 | 008 | 004 | . | NOP | 800 |
| 475 | 008 | 005 | . | NOP | 800 |
| 476 | 008 | 006 | . | NOP | 800 |
| 477 | 008 | 007 | . | NOP | 800 |
| 478 | 008 | 008 | . | NOP | 800 |
| 479 | 008 | 009 | . | NOP | 800 |
| 480 | 008 | 00A | . | NOP | 800 |
| 481 | 008 | 00B | . | NOP | 800 |
| 482 | 008 | 00C | . | NOP | 800 |
| 483 | 008 | 00D | . | NOP | 800 |
| 484 | 008 | 00E | . | NOP | 800 |
| 485 | 008 | 00F | . | NOP | 800 |
| 486 | 008 | 010 | . | NOP | 800 |

**

*------------------ DELETE WORD ------------------
*ADDRESS FOR COSTI MUST BE WRITTEN AT
*INSTRUCTION 395 WHEN REASSEMBLING

| 487 | 008 | 011 | DELW | NOP | 800 | |
| 488 | 008 | 012 | . | R1(PR2) | B0F | |
| 489 | 008 | 013 | . | LOPSG2 | 151 | |
| 490 | 008 | 014 | . | LOCEM | 200 | |
| 491 | 008 | 015 | . | LEOL | 20F | |
| 492 | 008 | 016 | . | DECR(MDU) | AF6 | |
| 493 | 008 | 017 | . | SUB(MDU) | 926 | |
| 494 | 008 | 018 | . | SUB(MAL) | 923 | |
| 495 | 008 | 019 | . | ISY(A) | D31 | EM=1ST POS. OF LINE? |
| 496 | 008 | 01A | . | #+7 | 020 | N |
| 497 | 008 | 01B | . | X(A)(MDL) | 815 | |
| 498 | 008 | 01C | . | S1(PR2) | B8F | |
| 499 | 008 | 01D | . | X(MDU)(MAU) | 864 | |
| 500 | 008 | 01E | . | JMP | 9D1 | |
| 501 | 008 | 01F | . | #STDES | 03F | |
| 502 | 008 | 020 | . | X(MDU)(MAU) | 864 | |

| NO. | PU | PL | LABEL | MNEMONIC | CODE | COMMENTS |
|---|---|---|---|---|---|---|
| 503 | 008 | 021 | . | X(A)(MDL) | 815 | |
| 504 | 008 | 022 | . | DECR(MAL) | AF3 | |
| 505 | 008 | 023 | . | READC | E00 | |
| 506 | 008 | 024 | . | INCR(MAL) | A23 | |
| 507 | 008 | 025 | . | JMP | 9D1 | |
| 508 | 008 | 026 | . | #TSP | 034 | |
| 509 | 008 | 027 | . | NOP | 800 | |
| 510 | 008 | 028 | DP1 | CMPR(MAL) | 9D3 | SOURCE=END OF LINE? |
| 511 | 008 | 029 | . | #+4 | 02C | YES |
| 512 | 008 | 02A | . | JMP | 9D1 | NO |
| 513 | 008 | 02B | . | #FSRCE | 040 | |
| 514 | 008 | 02C | . | X(MDU)(MAU) | 864 | |
| 515 | 008 | 02D | . | S8(A) | BF1 | |
| 516 | 008 | 02E | . | TRY(A) | C41 | SOURCE ADB=127? |
| 517 | 008 | 02F | . | #YY+1 | 04C | NO |
| 518 | 008 | 030 | . | X(MAL)(UA) | 83A | YES |
| 519 | 008 | 031 | . | @007 | 007 | |
| 520 | 008 | 032 | . | JMP | 9D1 | |
| 521 | 008 | 033 | . | #YY | 04B | |

*TEST FOR SPACE TO LEFT OF CURSOR

| 522 | 008 | 034 | TSP | TR6(MDL) | CD5 | |
|---|---|---|---|---|---|---|
| 523 | 008 | 035 | . | #END | 03C | MODIFY TO KBD ERROR |
| 524 | 008 | 036 | . | R6(MDL) | B55 | |
| 525 | 008 | 037 | . | R8(MDL) | B75 | |
| 526 | 008 | 038 | . | TSY(MDL) | D35 | |
| 527 | 008 | 039 | . | #END | 03C | MODIFY TO KBD ERROR |
| 528 | 008 | 03A | . | JMP | 9D1 | |
| 529 | 008 | 03B | . | #+5 | 03F | |
| 530 | 008 | 03C | END | JMPO | 386 | |
| 531 | 008 | 03D | . | @000 | 000 | |
| 532 | 008 | 03E | . | @008 | 008 | |

*CURSOR LOCATION IS DESTINATION

| 533 | 008 | 03F | SIDES | X(G)(MAL) | 823 | SAVE DEST. MAL |
|---|---|---|---|---|---|---|
| 534 | 008 | 040 | FSRCE | INCR(MAL) | A23 | FIND SOURCE |
| 535 | 008 | 041 | . | READC | E00 | |
| 536 | 008 | 042 | . | TR6(MDL) | CD5 | |
| 537 | 008 | 043 | . | #+5 | 047 | NOT A SPACE |
| 538 | 008 | 044 | . | R6(MDL) | B55 | |
| 539 | 008 | 045 | . | TRL(MDL) | C35 | |
| 540 | 008 | 046 | . | #YY+1 | 04C | |
| 541 | 008 | 047 | . | JMP | 9D1 | |
| 542 | 008 | 048 | . | #DP1 | 028 | |
| 543 | 008 | 049 | . | NOP | 800 | |
| 544 | 008 | 04A | . | NOP | 800 | |

* IS MAL = END OF LINE

| 545 | 008 | 04B | YY | INCR(MDU) | A26 | |
|---|---|---|---|---|---|---|
| 546 | 008 | 04C | . | X(A)(G) | 812 | SAVE DEST MAL IN A |
| 547 | 008 | 04D | . | X(G)(MAU) | 824 | SAVE DEST MAU IN G |
| 548 | 008 | 04E | . | X(MAU)(MDU) | 846 | GET SOURCE MAU |
| 549 | 008 | 04F | . | TR1(PR2) | C8F | SOURCE=1ST CHAR OF LINE? |
| 550 | 008 | 050 | . | #NEXTC | 0D4 | NO |
| 551 | 008 | 051 | . | INCR(MAL) | A23 | |
| 552 | 008 | 052 | . | READC | E00 | READ 1ST SOURCE CHAR. |
| 553 | 008 | 053 | . | X(MDU)(MAU) | 864 | |
| 554 | 008 | 054 | . | X(MAU)(G) | 842 | |
| 555 | 008 | 055 | . | X(G)(MDU) | 826 | |
| 556 | 008 | 056 | . | X(MDU)(MAL) | 863 | |
| 557 | 008 | 057 | . | X(MAL)(A) | 831 | |
| 558 | 008 | 058 | . | X(A)(MDU) | 816 | |

| NO. | PU | PL | LABEL | MNEMONIC | CODE | COMMENTS |
|---|---|---|---|---|---|---|
| 559 | 008 | 059 | . | WRTC | 3CB | |
| 560 | 008 | 05A | . | INCR(MAL) | A23 | |
| 561 | 008 | 05B | . | NOP | 800 | |
| 562 | 008 | 05C | . | R1(PR2) | B0F | |
| 563 | 008 | 05D | . | MD-AG | 3ED | |
| 564 | 008 | 05E | . | AG-MA | 3F3 | |
| 565 | 008 | 05F | . | MA-MD | 3E9 | |
| 566 | 008 | 060 | . | TR17I(MAL) | C23 | |
| 567 | 008 | 061 | . | #NEXTC+1 | 0D5 | |
| 568 | 008 | 062 | . | A(MAL)(GA) | 83A | |
| 569 | 008 | 063 | . | @007 | 007 | |
| 570 | 008 | 064 | . | JMP | 9D1 | |
| 571 | 008 | 065 | . | #CDEL | 0D1 | |
| 572 | 008 | 066 | . | X(G)(MAU) | 824 | |
| 573 | 008 | 067 | . | JMP | 9D1 | |
| 574 | 008 | 068 | . | #NEXTC | 0D4 | |

\*------------------- DELETE CHARACTER -------------------------------

| NO. | PU | PL | LABEL | MNEMONIC | CODE | COMMENTS |
|---|---|---|---|---|---|---|
| 575 | 008 | 069 | DELC | R8(PR2) | B7F | |
| 576 | 008 | 06A | . | LOFSG2 | 151 | |
| 577 | 008 | 06B | . | LOCEM | 200 | |
| 578 | 008 | 06C | . | LEOL | 20F | |
| 579 | 008 | 06D | . | DECR(MDU) | AF6 | |
| 580 | 008 | 06E | . | SUB(MDU) | 926 | |
| 581 | 008 | 06F | . | SUB(MAL) | 923 | |
| 582 | 008 | 070 | . | TSY(A) | D31 | |
| 583 | 008 | 071 | . | #+7 | 077 | |
| 584 | 008 | 072 | . | INCR(MAL) | A23 | |
| 585 | 008 | 073 | . | READC | E00 | |
| 586 | 008 | 074 | . | DECR(MAL) | AF3 | |
| 587 | 008 | 075 | . | WRTC | 3CB | |
| 588 | 008 | 076 | . | INCR(MAL) | A23 | |
| 589 | 008 | 077 | . | X(G)(MAU) | 824 | G=EM SEG |
| 590 | 008 | 078 | . | X(A)(MAL) | 813 | MAU=EM SEG |
| 591 | 008 | 079 | . | SB(MAL) | BF3 | MAL=EM |
| 592 | 008 | 07A | . | TSL(MAL) | D43 | |
| 593 | 008 | 07B | . | #CDEL | 0D1 | |
| 594 | 008 | 07C | . | JMP | 9D1 | |
| 595 | 008 | 07D | . | #NEXTC | 0D4 | |
| 596 | 008 | 07E | . | NOP | 800 | |
| 597 | 008 | 07F | . | NOP | 800 | |

\*\*

\*------------------DELETE FIELD ---------------------------------
\* TEST FOR SFLD/EFLD PREV. ENTERED

| NO. | PU | PL | LABEL | MNEMONIC | CODE | COMMENTS |
|---|---|---|---|---|---|---|
| 598 | 008 | 080 | DELF | DIMAL | 3FD | |
| 599 | 008 | 081 | . | READU | E02 | |
| 600 | 008 | 082 | . | NOP | 800 | |
| 601 | 008 | 083 | . | NOP | 800 | |
| 602 | 008 | 084 | . | TR8(MDU) | CF6 | |
| 603 | 008 | 085 | . | #END | 03C | ]MODIFY TO GE 1 INDIC DISPLAY |
| 604 | 008 | 086 | . | TR7(MDU) | CE6 | |
| 605 | 008 | 087 | . | #END | 03C | "     "     "     " |
| 606 | 008 | 088 | . | S6(MAL) | BD3 | |
| 607 | 008 | 089 | . | READU | E02 | CLOSE BRACE MAU IN MDU |
| 608 | 008 | 08A | . | DIMAL | 3FB | |
| 609 | 008 | 08B | . | READC | E00 | OPEN BRACE MAU IN MDL |
| 610 | 008 | 08C | . | X(A)(MDL) | 815 | |
| 611 | 008 | 08D | . | NOP | 800 | |
| 612 | 008 | 08E | . | NOP | 800 | |
| 613 | 008 | 08F | . | NOP | 800 | |

| NO. | PU | PL | LABEL | MNEMONIC | CODE | COMMENTS |
|---|---|---|---|---|---|---|

*LOOK FOR SAME SEGMENT

| NO. | PU | PL | LABEL | MNEMONIC | CODE | COMMENTS |
|---|---|---|---|---|---|---|
| 614 | 008 | 090 | . | CMPR(MDU) | 9D6 | |
| 615 | 008 | 091 | . | #TEMAL | 0A5 | |
| 616 | 008 | 092 | . | JMP | 9D1 | |
| 617 | 008 | 093 | . | #ENTRY | 096 | |
| 618 | 008 | 094 | . | SHFIL(MDL) | AB5 | |
| 619 | 008 | 095 | . | SHFIL(MDU) | AB6 | |
| 620 | 008 | 096 | ENTRY | TS6(MDU) | DD6 | |
| 621 | 008 | 097 | . | #+6 | 09C | |
| 622 | 008 | 098 | . | TR6(MDL) | CD5 | |
| 623 | 008 | 099 | . | #-4 | 094 | |
| 624 | 008 | 09A | . | JMP | 9D1 | |
| 625 | 008 | 09B | . | #END | 03C | MODIFY TO GET IND DISPLAY |
| 626 | 008 | 09C | . | TS6(MDL) | DD5 | |
| 627 | 008 | 09D | . | #-8 | 094 | |
| 628 | 008 | 09E | . | JMP | 9D1 | |
| 629 | 008 | 09F | . | #ERSEB | 0B9 | ERASE S & E BITS |

*TEST MAL FOR CORRECT ORDER OF SFLD/EFLD

| NO. | PU | PL | LABEL | MNEMONIC | CODE | COMMENTS |
|---|---|---|---|---|---|---|
| 630 | 008 | 0A0 | . | NOP | 800 | |
| 631 | 008 | 0A1 | . | NOP | 800 | |
| 632 | 008 | 0A2 | . | NOP | 800 | |
| 633 | 008 | 0A3 | . | NOP | 800 | |
| 634 | 008 | 0A4 | . | NOP | 800 | |
| 635 | 008 | 0A5 | TEMAL | READL | E01 | |
| 636 | 008 | 0A6 | . | DIMAL | 3FD | |
| 637 | 008 | 0A7 | . | X(A)(MDL) | 815 | |
| 638 | 008 | 0A8 | . | READL | E01 | |
| 639 | 008 | 0A9 | . | X(MDU)(MDL) | 865 | |

*CLOSE BRACE MAL IN MDU

| 640 | 008 | 0AA | . | X(MDL)(A) | 851 | |
|---|---|---|---|---|---|---|

*OPEN BRACE MAL IN MDL

| NO. | PU | PL | LABEL | MNEMONIC | CODE | COMMENTS |
|---|---|---|---|---|---|---|
| 641 | 008 | 0AB | . | CMPR(MDU) | 9D6 | OPEN BRACE = CLOSE BRACE |
| 642 | 008 | 0AC | . | #END | 03C | YES |
| 643 | 008 | 0AD | . | SHFIL(MDU) | AB6 | |
| 644 | 008 | 0AE | . | SHFIL(MDL) | AB5 | |
| 645 | 008 | 0AF | . | TS8(MDU) | DF6 | |
| 646 | 008 | 0B0 | . | #+6 | 0B5 | |
| 647 | 008 | 0B1 | . | TR8(MDL) | CF5 | |
| 648 | 008 | 0B2 | . | #-4 | 0AD | |
| 649 | 008 | 0B3 | . | JMP | 9D1 | |
| 650 | 008 | 0B4 | . | #END | 03C | |
| 651 | 008 | 0B5 | . | TS8(MDL) | DF5 | |
| 652 | 008 | 0B6 | . | #-8 | 0AD | |
| 653 | 008 | 0B7 | . | NOP | 800 | |
| 654 | 008 | 0B8 | . | NOP | 800 | |
| 655 | 008 | 0B9 | ERSEB | S2(MAL) | B93 | ERASE S & E BITS |

* ERASE SFLD AND EFLD BITS

| NO. | PU | PL | LABEL | MNEMONIC | CODE | COMMENTS |
|---|---|---|---|---|---|---|
| 656 | 008 | 0BA | . | R6(MAL) | B53 | |
| 657 | 008 | 0BB | . | READU | E02 | |
| 658 | 008 | 0BC | . | R7(MDU) | B66 | |
| 659 | 008 | 0BD | . | R8(MDU) | B76 | |
| 660 | 008 | 0BE | . | WRTU | E06 | |
| 661 | 008 | 0BF | . | NOP | 800 | |
| 662 | 008 | 0C0 | . | NOP | 800 | |
| 663 | 008 | 0C1 | . | R2(MAL) | B13 | |

NO.  PG  FL  LABEL  MNEMONIC         CODE    COMMENTS

*GET OPENN CLOSE BRACE ADDRESSES

```
664 008  0C2    .        S6(MAL)         BD3
665 008  0C3    .        READ            E03
666 008  0C4    .        X(G)(MDU)       826    OP BRCE INTO G-A(DEST)
667 008  0C5    .        X(A)(MDL)       815
668 008  0C6    .        DIMAL           3FD
669 008  0C7    .        READ            E03
670 008  0C8    .        MA-MD           3E9    CL BRCE TO MA-SOURCE
671 008  0C9    .        JMPO            386
672 008  0CA    .        @007            007
673 008  0CB    .        #DFF1           0D4
674 008  0CC    .        NOP             800
675 008  0CD    .        CMPL(MDL)       A05    CL BRCE ADD-LAST CHAR OF SEC
676 008  0CE    .        R8(MLL)         B75
677 008  0CF    .        ISY(MDL)        D35
678 008  0D0    .        #+5             0D4    JMP IF NOT LAST CHAR
679 008  0D1  CDEL       INCR(MAU)       A24
680 008  0D2    .        X(MAL)(UA)      83A
681 008  0D3    .        @007            007
682 008  0D4  NEXTC      INCR(MAL)       A23    SOURCE +1
```

*THIS IS COMMON PRGM FOR DELETE CHAR-WORD-FIELD PROGRAMS
*
*IS CHAR TO READ LAST CHAR. IN LINE?

```
683 008  0D5    .        NOP             800
684 008  0D6    .        X(MDU)(A)       861    SAVE A
685 008  0D7    .        X(A)(MAL)       813    SOURCE ADD INTO A
686 008  0D8    .        IPAI*           3DA
687 008  0D9    .        @02F            02F
688 008  0DA    .        #JGRTL          0F2    CHAR IS LAST IN LINE
689 008  0DB    .        IPAI*           3DA
690 008  0DC    .        @057            057
691 008  0DD    .        #JGRTL          0F2
692 008  0DE    .        IPAI*           3DA
693 008  0DF    .        @07F            07F
694 008  0E0    .        #JGRTL          0F2
695 008  0E1    .        NOP             800
696 008  0E2    .        NOP             800
```

*IS CHAR READ 1ST CHAR IN LINE?

```
697 008  0E3    .        R8(MAL)         B73
```

*DEST MAL SAVED

```
698 008  0E4    .        X(A)(MAL)       813
```

* SET PR2-1=1=1ST CHAR IN LINE

```
699 008  0E5    .        S1(PR2)         B8F
700 008  0E6    .        IPAI*           3DA
701 008  0E7    .        @008            008
702 008  0E8    .        #GRTR2-1        0FF
703 008  0E9    .        IPAI*           3DA
704 008  0EA    .        @030            030
705 008  0EB    .        #GRTR2-1        0FF
706 008  0EC    .        IPAI*           3DA
707 008  0ED    .        @058            058
708 008  0EE    .        #GRTR2-1        0FF
709 008  0EF    .        R1(PR2)         B0F
710 008  0F0    .        JMP             9D1
```

| NO. | PU | PL | LABEL | MNEMONIC | CODE | COMMENTS |
|---|---|---|---|---|---|---|
| 711 | 008 | 0F1 | . | #GRTL2-1 | 0FF | |
| 712 | 008 | 0F2 | JGRTW | X(A)(MDU) | 816 | |
| 713 | 008 | 0F3 | . | JMPO | 386 | |
| 714 | 008 | 0F4 | . | @009 | 009 | |
| 715 | 008 | 0F5 | . | #GRTW | 00B | |
| 716 | 008 | 0F6 | NXTC | SB(A) | BF1 | |
| 717 | 008 | 0F7 | . | TRY(A) | C41 | |
| 718 | 008 | 0F8 | . | #+5 | 0FC | |
| 719 | 008 | 0F9 | . | INCR(G) | A22 | |
| 720 | 008 | 0FA | . | X(A)(UA) | 81A | |
| 721 | 008 | 0FB | . | @007 | 007 | |
| 722 | 008 | 0FC | . | INCR(A) | A21 | |
| 723 | 008 | 0FD | . | JMP | 9D1 | |
| 724 | 008 | 0FE | . | #NEXTC | 0D4 | |
| 725 | 008 | 0FF | . | NOP | 800 | |
| 726 | 009 | 000 | GRTL2 | JMP | 9D1 | |
| 727 | 009 | 001 | . | #GRTL1 | 00D | |
| 728 | 009 | 002 | ATEST | X(A)(MDU) | 816 | |
| 729 | 009 | 003 | . | CMPR(MAL) | 9D3 | |
| 730 | 009 | 004 | . | #+5 | 008 | |
| 731 | 009 | 005 | . | INCR(MAL) | A23 | |
| 732 | 009 | 006 | . | JMP | 9D1 | |
| 733 | 009 | 007 | . | #BFIN | 0C7 | |
| 734 | 009 | 008 | . | JMP | 9D1 | |
| 735 | 009 | 009 | . | #END | 03C | |
| 736 | 009 | 00A | . | NOP | 800 | |
| 737 | 009 | 00B | GRTW | SB(PR2) | BFF | GET READY TO WRITE |
| 738 | 009 | 00C | . | X(MDU)(A) | 861 | |
| 739 | 009 | 00D | GRTW1 | X(A)(MDU) | 816 | |
| 740 | 009 | 00E | GBACK | READC | E00 | |
| 741 | 009 | 00F | . | X(MDU)(MAU) | 864 | |
| 742 | 009 | 010 | . | X(MAU)(G) | 842 | |
| 743 | 009 | 011 | . | X(G)(MDU) | 826 | |
| 744 | 009 | 012 | . | X(MDU)(MAL) | 863 | |
| 745 | 009 | 013 | . | X(MAL)(A) | 831 | |
| 746 | 009 | 014 | . | X(A)(MDU) | 816 | |
| 747 | 009 | 015 | . | NOP | 800 | |
| 748 | 009 | 016 | . | NOP | 800 | |

*IS DESTINATION 1ST CHAR IN LINE

| NO. | PU | PL | LABEL | MNEMONIC | CODE | COMMENTS |
|---|---|---|---|---|---|---|
| 749 | 009 | 017 | . | X(A)(MAL) | 813 | SAVE CONTENTS OF A |
| 750 | 009 | 018 | . | R8(A) | B71 | |
| 751 | 009 | 019 | . | TPAT' | 3DA | |
| 752 | 009 | 01A | . | @008 | 008 | |
| 753 | 009 | 01B | . | #FCHAR | 026 | |
| 754 | 009 | 01C | . | TPAT' | 3DA | |
| 755 | 009 | 01D | . | @030 | 030 | |
| 756 | 009 | 01E | . | #FCHAR | 026 | |
| 757 | 009 | 01F | . | TPAT' | 3DA | |
| 758 | 009 | 020 | . | @058 | 058 | |
| 759 | 009 | 021 | . | #FCHAR | 026 | |
| 760 | 009 | 022 | . | TST(PR2) | D8F | WAS SOURCE 1ST CH IN LINE |
| 761 | 009 | 023 | . | #TESFC | 0AA | YES -CHECK FOR LINE SINGLE |
| 762 | 009 | 024 | . | JMP | 9D1 | |
| 763 | 009 | 025 | . | #+10 | 02E | |
| 764 | 009 | 026 | FCHAR | TR1(PR2) | C8F | SOURCE-DESTINATIO BOTH 1ST CH OF L |
| 765 | 009 | 027 | . | #CHA | 07D | NO |
| 766 | 009 | 028 | . | TR6(MDL) | CD5 | CAN SOURCE DATA BE SPACE |
| 767 | 009 | 029 | . | #WRCH | 031 | NO |
| 768 | 009 | 02A | . | R6(MDL) | B55 | |
| 769 | 009 | 02B | . | TRL(MDL) | C35 | IS DATA=SPACE |
| 770 | 009 | 02C | . | #TESFC+10 | 0B4 | YES NEW PARA -END OF DEL |
| 771 | 009 | 02D | . | S6(MDL) | BD5 | RESTORE CHARACTER |
| 772 | 009 | 02E | . | X(A)(MDU) | 816 | |

| NO. | PO | FL | LABEL | MNEMONIC | CODE | COMMENTS |
|---|---|---|---|---|---|---|

*WAS CHAR READ(SOURCE) LAST CHAR IN LINE

| NO. | PO | FL | LABEL | MNEMONIC | CODE | COMMENTS |
|---|---|---|---|---|---|---|
| 773 | 009 | 02F | . | TS8(PR2) | DFF | |
| 774 | 009 | 030 | . | #TDEST | 054 | |
| 775 | 009 | 031 | WRCH | X(A)(MDU) | 816 | |
| 776 | 009 | 032 | WRCH1 | X(MDU)(MDL) | 865 | |
| 777 | 009 | 033 | . | TST(MDL) | D35 | SOURCE DATA=NULL |
| 778 | 009 | 034 | . | #WRCHB | 038 | |
| 779 | 009 | 035 | . | DECR(MAL) | AF3 | |
| 780 | 009 | 036 | . | JMP | 9D1 | |
| 781 | 009 | 037 | . | #WRCHA | 039 | |
| 782 | 009 | 038 | WRCHB | CWRT | E08 | |
| 783 | 009 | 039 | WRCHA | MD-AG | 3ED | |
| 784 | 009 | 03A | . | AG-MA | 3F3 | |
| 785 | 009 | 03B | . | MA-MD | 3E9 | |
| 786 | 009 | 03C | . | R1(PR2) | B0F | |
| 787 | 009 | 03D | . | NOP | 800 | |
| 788 | 009 | 03E | . | NOP | 800 | |
| 789 | 009 | 03F | . | S8(MAL) | BF3 | |

*IS CHAR IN MAL LAST OF SEGMENT

| NO. | PO | FL | LABEL | MNEMONIC | CODE | COMMENTS |
|---|---|---|---|---|---|---|
| 790 | 009 | 040 | . | TRY(MAL) | C43 | |
| 791 | 009 | 041 | . | #NEJMP | 044 | NOT LAST CHAR |
| 792 | 009 | 042 | . | JMP | 9D1 | |
| 793 | 009 | 043 | . | #+5 | 047 | |
| 794 | 009 | 044 | NEJMP | JMPO | 386 | |
| 795 | 009 | 045 | . | 0008 | 008 | |
| 796 | 009 | 046 | . | #NXTC | 0F6 | |

*IS THIS LAST SEG?

| NO. | PO | FL | LABEL | MNEMONIC | CODE | COMMENTS |
|---|---|---|---|---|---|---|
| 797 | 009 | 047 | . | NOP | 800 | |
| 798 | 009 | 048 | . | NOP | 800 | |
| 799 | 009 | 049 | . | X(MDU)(MAL) | 863 | |
| 800 | 009 | 04A | . | X(MAL)(UA) | 83A | |
| 801 | 009 | 04B | . | 0002 | 002 | |
| 802 | 009 | 04C | . | READL | E01 | |
| 803 | 009 | 04D | . | TR7(MDL) | CE5 | |
| 804 | 009 | 04E | . | #AFIN | 0BF | |
| 805 | 009 | 04F | . | INCR(MAU) | A24 | |
| 806 | 009 | 050 | . | X(MAL)(UA) | 83A | |
| 807 | 009 | 051 | . | 0007 | 007 | |
| 808 | 009 | 052 | . | JMP | 9D1 | |
| 809 | 009 | 053 | . | #NEJMP | 044 | |
| 810 | 009 | 054 | TDEST | X(MDU)(A) | 861 | |

*TEST IF DESTINATION LAST CHAR IN LINE

| NO. | PO | FL | LABEL | MNEMONIC | CODE | COMMENTS |
|---|---|---|---|---|---|---|
| 811 | 009 | 055 | . | R8(PR2) | B7F | |
| 812 | 009 | 056 | . | NOP | 800 | |
| 813 | 009 | 057 | . | S8(MAL) | BF3 | |
| 814 | 009 | 058 | . | X(A)(MAL) | 813 | |
| 815 | 009 | 059 | . | TSL(A) | D41 | |
| 816 | 009 | 05A | . | #WRCH | 031 | |
| 817 | 009 | 05B | . | X(A)(UA) | 81A | |
| 818 | 009 | 05C | . | 0028 | 028 | |
| 819 | 009 | 05D | . | ADD(MAL) | 953 | ADD 40 |
| 820 | 009 | 05E | . | TSL(A) | D41 | |
| 821 | 009 | 05F | . | #WRCH | 031 | |
| 822 | 009 | 060 | . | X(A)(UA) | 81A | |
| 823 | 009 | 061 | . | 0050 | 050 | |
| 824 | 009 | 062 | . | ADD(MAL) | 953 | ADD 40 |
| 825 | 009 | 063 | . | TSL(A) | D41 | |
| 826 | 009 | 064 | . | #WRCH | 031 | |

| NO. | PU | PL | LABEL | MNEMONIC | CODE | COMMENTS |
|---|---|---|---|---|---|---|
| 827 | 009 | 065 | . | TRL(MDL) | C35 | |
| 828 | 009 | 066 | . | #INHSP | 076 | |
| 829 | 009 | 067 | . | X(A)(MDU) | 816 | |
| 830 | 009 | 068 | . | X(MDU)(MDL) | 865 | |
| 831 | 009 | 069 | . | CKRT | E08 | |

*SINCE DESTINATION IS NOT LAST CHAR &
* SOURCE WAS - WRITE A SPACE

| 832 | 009 | 06A | . | R8(PR2) | B7F | |

*TEST WHEN SOURCE WAS LAST CHAR IN LINE & DEST NOT - IF
* PREVIOUS CHAR IS SPACE

| 833 | 009 | 06B | . | R6(MDL) | B55 | |
| 834 | 009 | 06C | . | TSY(MDL) | D35 | |
| 835 | 009 | 06D | . | #ASPC | 06F | |
| 836 | 009 | 06E | . | DECR(MAL) | AF3 | |
| 837 | 009 | 06F | ASPC | INCR(MAL) | A23 | ALLOW SPACE |
| 838 | 009 | 070 | . | RL(MDL) | A55 | |
| 839 | 009 | 071 | . | S6(MDL) | BD5 | |
| 840 | 009 | 072 | . | X(MDU)(MDL) | 865 | |
| 841 | 009 | 073 | . | CKRT | E08 | |
| 842 | 009 | 074 | . | JMP | 9D1 | |
| 843 | 009 | 075 | . | #WRCHA | 039 | |
| 844 | 009 | 076 | INHSP | X(A)(MDU) | 816 | INHIBIT SPACE |
| 845 | 009 | 077 | . | R8(PR2) | B7F | |
| 846 | 009 | 078 | . | DECR(MAL) | AF3 | |
| 847 | 009 | 079 | . | JMP | 9D1 | |
| 848 | 009 | 07A | . | #WRCHA | 039 | |
| 849 | 009 | 07B | . | NOP | 800 | |
| 850 | 009 | 07C | . | NOP | 800 | |
| 851 | 009 | 07D | CHA | X(A)(MDU) | 816 | |
| 852 | 009 | 07E | . | X(MDU)(MDL) | 865 | |
| 853 | 009 | 07F | . | CKRT | E08 | |
| 854 | 009 | 080 | . | MD-AC | 3ED | |
| 855 | 009 | 081 | . | AC-MA | 3F3 | |
| 856 | 009 | 082 | . | NOP | 800 | |
| 857 | 009 | 083 | . | MA-MD | 3E9 | |
| 858 | 009 | 084 | . | R8(A) | B71 | |
| 859 | 009 | 085 | . | NOP | 800 | |
| 860 | 009 | 086 | . | SUBRTN | 17F | |
| 861 | 009 | 087 | . | @01F | 01F | |
| 862 | 009 | 088 | . | #COSTT | 000 | |
| 863 | 009 | 089 | ACOST | XA-AG | 3F1 | AFTER CORRECT STRDL |
| 864 | 009 | 08A | . | AG-MD | 3EB | |
| 865 | 009 | 08B | . | NOP | 800 | |
| 866 | 009 | 08C | . | INCR(MAL) | A23 | |
| 867 | 009 | 08D | . | JMP | 9D1 | |
| 868 | 009 | 08E | . | #WRCHA | 039 | |
| 869 | 009 | 08F | . | NOP | 800 | |
| 870 | 009 | 090 | . | NOP | 800 | |
| 871 | 009 | 091 | . | NOP | 800 | |

*SOURCE CH IS NOT A SPACE-CHECK IF PREVIOUS DEST CHAR IS SPACE OR
*NULL.IF NEITHER ENTER A SPACE CHAR AT THE DESTINATION ADD

| 872 | 009 | 092 | SFISP | X(A)(MDU) | 816 | MDU=SOURCE MAL |
| 873 | 009 | 093 | . | NOP | 800 | |
| 874 | 009 | 094 | . | R8(MAL) | B73 | |
| 875 | 009 | 095 | . | CMPR(MAL) | 9D3 | |
| 876 | 009 | 096 | . | #WRCH1 | 032 | |
| 877 | 009 | 097 | . | X(MDU)(MDL) | 865 | SAVE SOURCE DATA |
| 878 | 009 | 098 | . | DECR(MAL) | AF3 | |
| 879 | 009 | 099 | . | READC | E00 | |

| NO. | PU | PL | LABEL | MNEMONIC | CODE | COMMENTS |
|---|---|---|---|---|---|---|
| 880 | 009 | 09A | . | INCR(MAL) | A23 | |
| 881 | 009 | 09B | . | R8(MDL) | B75 | |
| 882 | 009 | 09C | . | TRL(MDL) | C35 | |
| 883 | 009 | 09D | . | #+11 | 0A7 | |
| 884 | 009 | 09E | . | R6(MDL) | B55 | |
| 885 | 009 | 09F | . | TRL(MDL) | C35 | |
| 886 | 009 | 0A0 | . | #+5 | 0A4 | |
| 887 | 009 | 0A1 | . | X(MDU)(UA) | 86A | |
| 888 | 009 | 0A2 | . | 0020 | 020 | |
| 889 | 009 | 0A3 | . | DECR(A) | AF1 | |
| 890 | 009 | 0A4 | . | X(MDL)(MDU) | 856 | |
| 891 | 009 | 0A5 | . | JMP | 9D1 | |
| 892 | 009 | 0A6 | . | #WRCH1 | 032 | |
| 893 | 009 | 0A7 | . | DECR(MAL) | AF3 | |
| 894 | 009 | 0A8 | . | JMP | 9D1 | |
| 895 | 009 | 0A9 | . | #-7 | 0A1 | |

*TEST FOR SPACE

| NO. | PU | PL | LABEL | MNEMONIC | CODE | COMMENTS |
|---|---|---|---|---|---|---|
| 896 | 009 | 0AA | TESPC | R1(PR2) | B0F | |
| 897 | 009 | 0AB | . | TR6(MDL) | CD5 | |
| 898 | 009 | 0AC | . | #SPTSP | 092 | |
| 899 | 009 | 0AD | . | R6(MDL) | B55 | |
| 900 | 009 | 0AE | . | TRL(MDL) | C35 | |
| 901 | 009 | 0AF | . | #+5 | 0B3 | |
| 902 | 009 | 0B0 | . | S6(MDL) | BD5 | |
| 903 | 009 | 0B1 | . | JMP | 9D1 | |
| 904 | 009 | 0B2 | . | #SPTSP | 092 | |
| 905 | 009 | 0B3 | . | R8(MAU) | B74 | |
| 906 | 009 | 0B4 | . | X(A)(MDU) | 816 | |
| 907 | 009 | 0B5 | . | S8(A) | BF1 | |
| 908 | 009 | 0B6 | . | NOP | 800 | |
| 909 | 009 | 0B7 | . | JMP | 9D1 | |
| 910 | 009 | 0B8 | . | #BFIN | 0C7 | CHAR IS SPACE-FINISH |
| 911 | 009 | 0B9 | NOSPC | DECR(A) | AF1 | |
| 912 | 009 | 0BA | . | JMP | 9D1 | |
| 913 | 009 | 0BB | . | #LRCHA | 039 | |
| 914 | 009 | 0BC | . | NOP | 800 | |
| 915 | 009 | 0BD | . | NOP | 800 | |
| 916 | 009 | 0BE | . | NOP | 800 | |
| 917 | 009 | 0BF | AFIN | X(MAL)(MDU) | 836 | |
| 918 | 009 | 0C0 | . | X(MDU)(MAU) | 864 | AFINISH |
| 919 | 009 | 0C1 | . | X(MAU)(G) | 842 | |
| 920 | 009 | 0C2 | . | X(G)(MDU) | 826 | |
| 921 | 009 | 0C3 | . | X(MDU)(MAL) | 863 | |
| 922 | 009 | 0C4 | . | X(MAL)(A) | 831 | |
| 923 | 009 | 0C5 | . | JMP | 9D1 | |
| 924 | 009 | 0C6 | . | #ATEST | 002 | |
| 925 | 009 | 0C7 | BFIN | RL(MDL) | A55 | B FINISH |
| 926 | 009 | 0C8 | . | RL(MDU) | A56 | |
| 927 | 009 | 0C9 | ECHAR | R8(A) | B71 | ERASE CHARACTER |
| 928 | 009 | 0CA | . | R8(MAL) | B73 | |
| 929 | 009 | 0CB | . | CMPR(MAL) | 9D3 | |
| 930 | 009 | 0CC | . | #CMMAU | 0DA | |
| 931 | 009 | 0CD | CERAS | CLRT | E08 | |
| 932 | 009 | 0CE | . | TS17I(MAL) | D23 | |
| 933 | 009 | 0CF | . | #+4 | 0D2 | |
| 934 | 009 | 0D0 | . | JMP | 9D1 | |
| 935 | 009 | 0D1 | . | #ECHAR | 0C9 | |
| 936 | 009 | 0D2 | . | INCR(MAU) | A24 | |
| 937 | 009 | 0D3 | . | X(MAL)(UA) | 83A | |
| 938 | 009 | 0D4 | . | 0008 | 008 | |
| 939 | 009 | 0D5 | . | JMP | 9D1 | |

| NO. | PJ | FL | LABEL | MNEMONIC | CODE | COMMENTS |
|---|---|---|---|---|---|---|
| 940 | 009 | 0D6 | . | #ECHAR | 0C9 | |
| 941 | 009 | 0D7 | ENDX | JMPO | 386 | |
| 942 | 009 | 0D8 | . | 0000 | 000 | |
| 943 | 009 | 0D9 | . | 0008 | 008 | |
| 944 | 009 | 0DA | CMMAU | X(MLL)(A) | 851 | |
| 945 | 009 | 0DB | . | X(A)(C) | 812 | |
| 946 | 009 | 0DC | . | CMPR(MAU) | 9D4 | |
| 947 | 009 | 0DD | . | #+6 | 0E2 | |
| 948 | 009 | 0DE | . | X(A)(MDL) | 815 | |
| 949 | 009 | 0DF | . | RL(MDL) | A55 | |
| 950 | 009 | 0E0 | . | JMP | 9D1 | |
| 951 | 009 | 0E1 | . | #CERAS | 0CD | |
| 952 | 009 | 0E2 | . | TS17I(MAL) | D23 | TEST IF LAST MEM CHAR. |
| 953 | 009 | 0E3 | . | #+4 | 0E6 | |
| 954 | 009 | 0E4 | . | JMP | 9D1 | |
| 955 | 009 | 0E5 | . | #ENDX | 0D7 | |
| 956 | 009 | 0E6 | . | DECR(MAL) | AF3 | |
| 957 | 009 | 0E7 | . | RL(MDL) | A55 | |
| 958 | 009 | 0E8 | . | CVRT | E08 | |
| 959 | 009 | 0E9 | . | JMP | 9D1 | |
| 960 | 009 | 0EA | . | #ENDX | 0D7 | |
| 961 | 009 | 0EB | . | NOP | 800 | |

*

| 962 | 009 | 0EC | . | NOP | 800 | |
|---|---|---|---|---|---|---|
| 963 | 009 | 0ED | . | NOP | 800 | |
| 964 | 009 | 0EE | . | NOP | 800 | |
| 965 | 009 | 0EF | . | NOP | 800 | |
| 966 | 009 | 0F0 | . | NOP | 800 | |
| 967 | 009 | 0F1 | . | NOP | 800 | |
| 968 | 009 | 0F2 | . | NOP | 800 | |
| 969 | 009 | 0F3 | . | NOP | 800 | |
| 970 | 009 | 0F4 | . | NOP | 800 | |
| 971 | 009 | 0F5 | . | NOP | 800 | |
| 972 | 009 | 0F6 | . | NOP | 800 | |
| 973 | 009 | 0F7 | . | NOP | 800 | |
| 974 | 009 | 0F8 | . | NOP | 800 | |
| 975 | 009 | 0F9 | . | NOP | 800 | |
| 976 | 009 | 0FA | . | NOP | 800 | |
| 977 | 009 | 0FB | . | NOP | 800 | |

*

| 978 | 009 | 0FC | . | NOP | 800 | |
|---|---|---|---|---|---|---|
| 979 | 009 | 0FD | . | NOP | 800 | |
| 980 | 009 | 0FE | . | NOP | 800 | |
| 981 | 009 | 0FF | . | NOP | 800 | |

**

*0--------------SET-RESET TABS PROGRAM ----------------------------------
*GO TO OP SEG & CHECK IF EM IN LEGAL AREA

| 982 | 00A | 000 | TABR | S1(PR2) | B8F | ENTER HERE TO RESET TABS |
|---|---|---|---|---|---|---|
| 983 | 00A | 001 | TABS | RL(A) | A51 | ENTER HERE TO SET TABS |
| 984 | 00A | 002 | . | S1(A) | B81 | |
| 985 | 00A | 003 | . | S5(A) | BC1 | |
| 986 | 00A | 004 | . | NOP | 800 | |
| 987 | 00A | 005 | . | LOPSG2 | 151 | CONTROL WORD 01 OR 41 |
| 988 | 00A | 006 | . | LOCEM | 200 | PUT HEADLINE SEG IN A |
| 989 | 00A | 007 | . | X(G)(MAL) | 823 | |
| 990 | 00A | 008 | . | RL(MAL) | A53 | |
| 991 | 00A | 009 | . | S2(MAL) | B93 | |
| 992 | 00A | 00A | . | READL | E01 | |

| NO. | PU | PL | LABEL | MNEMONIC | CODE | COMMENTS |
|---|---|---|---|---|---|---|
| 993 | 00A | 00B | . | TS6(MDL) | DD5 | |
| 994 | 00A | 00C | . | #DISPK | 07D | DISPLAY K |
| 995 | 00A | 00D | . | CMPR(MAU) | 9D4 | |
| 996 | 00A | 00E | . | #+4 | 011 | |
| 997 | 00A | 00F | . | JMP | 9D1 | |
| 998 | 00A | 010 | . | #EMLOC | 01B | |
| 999 | 00A | 011 | . | X(MAL)(G) | 832 | |
| 1000 | 00A | 012 | . | LEOL | 20F | EOL-127? |
| 1001 | 00A | 013 | . | TS17I(A) | D21 | |
| 1002 | 00A | 014 | . | #EMLOC | 01B | |
| 1003 | 00A | 015 | . | JMP | 9D1 | DISPLAY K |
| 1004 | 00A | 016 | . | #DISPK | 07D | |
| 1005 | 00A | 017 | . | NOP | 800 | |
| 1006 | 00A | 018 | . | NOP | 800 | |
| 1007 | 00A | 019 | . | NOP | 800 | |
| 1008 | 00A | 01A | . | NOP | 800 | |

* GET EM & CHECK IF INSERT OR CLEAR TABS

| NO. | PU | PL | LABEL | MNEMONIC | CODE | COMMENTS |
|---|---|---|---|---|---|---|
| 1009 | 00A | 01B | EMLOC | LOCEM | 200 | |
| 1010 | 00A | 01C | . | TS1(PR2) | D8F | |
| 1011 | 00A | 01D | . | #TBOUT | 041 | TABS OUT |
| 1012 | 00A | 01E | GOTAB | READC | E00 | |
| 1013 | 00A | 01F | . | TSY(MDL) | D35 | |
| 1014 | 00A | 020 | . | #+4 | 023 | CHAR NOT A NULL |
| 1015 | 00A | 021 | . | X(MDL)(UA) | 85A | CHAR IS NULL |
| 1016 | 00A | 022 | . | @02E | 02E | ASCII PERIOD |
| 1017 | 00A | 023 | . | S8(MDL) | BF5 | TAB CREATED |
| 1018 | 00A | 024 | . | WRIC | 3CB | TAB WRITTEN |
| 1019 | 00A | 025 | . | NOP | 800 | |

*CHECK IF NEXT TAB IN LAST SEG.

| NO. | PU | PL | LABEL | MNEMONIC | CODE | COMMENTS |
|---|---|---|---|---|---|---|
| 1020 | 00A | 026 | . | LEOL | 20F | |
| 1021 | 00A | 027 | . | INCR(A) | A21 | |
| 1022 | 00A | 028 | . | TS8(A) | DF1 | LAS EOL=127? |
| 1023 | 00A | 029 | . | #+8 | 030 | |
| 1024 | 00A | 02A | . | X(A)(UA) | 81A | |
| 1025 | 00A | 02B | . | @028 | 028 | |
| 1026 | 00A | 02C | . | ADD(MAL) | 953 | PUTS TAB DIRECTLY BELOW PREV.; |
| 1027 | 00A | 02D | . | X(MAL)(A) | 831 | |
| 1028 | 00A | 02E | . | JMP | 9D1 | |
| 1029 | 00A | 02F | . | #GOTAB) | 01E | START TEST FOR LAST SEG. |
| 1030 | 00A | 030 | . | X(MDU)(MAL) | 863 | |
| 1031 | 00A | 031 | . | RL(MAL) | A53 | |
| 1032 | 00A | 032 | . | NOP | 800 | |
| 1033 | 00A | 033 | . | NOP | 800 | |
| 1034 | 00A | 034 | . | S2(MAL) | B93 | |
| 1035 | 00A | 035 | . | READL | E01 | |
| 1036 | 00A | 036 | . | TR7(MDL) | CE5 | LAST SEG? |
| 1037 | 00A | 037 | . | #TBDON | 076 | YES TAB DONE |
| 1038 | 00A | 038 | . | INCR(MAU) | A24 | |
| 1039 | 00A | 039 | . | X(MAL)(MDU) | 836 | |
| 1040 | 00A | 03A | . | X(A)(UA) | 81A | ADD 48 TO LAST LINE TAB. |
| 1041 | 00A | 03B | . | @030 | 030 | PUTS TAB IN NEXT SEG. |
| 1042 | 00A | 03C | . | ADD(MAL) | 953 | ERASE CARRY |
| 1043 | 00A | 03D | . | X(MAL)(A) | 831 | |
| 1044 | 00A | 03E | . | R8(MAL) | B73 | |
| 1045 | 00A | 03F | . | JMP | 9D1 | |
| 1046 | 00A | 040 | . | #GOTAB | 01E | |

*TAKE TABS OUT & MARK RETURN SEG.

| NO. | PU | PL | LABEL | MNEMONIC | CODE | COMMENTS |
|---|---|---|---|---|---|---|
| 1047 | 00A | 041 | TBOUT | R1(PR2) | B0F | |
| 1048 | 00A | 042 | . | X(MDU)(MAL) | 863 | STORE EM IN MLU |

| NO. | PO | PL | LABEL | MNEMONIC | CODE | COMMENTS |
|---|---|---|---|---|---|---|
| 1049 | 00A | 043 | . | RL(MAL) | A53 | |
| 1050 | 00A | 044 | . | S2(MAL) | B93 | |
| 1051 | 00A | 045 | . | S3(MAL) | BA3 | EM SEC - MARK BIT 8 WORD 01 |
| 1052 | 00A | 046 | . | S8(MDU) | BF6 | |
| 1053 | 00A | 047 | . | WRTU | E06 | PUT EM MAL IN WORD 06 |
| 1054 | 00A | 048 | . | R8(MDU) | B76 | |

* GO TO NEXT TAB POINT & REMOVE

| NO. | PO | PL | LABEL | MNEMONIC | CODE | COMMENTS |
|---|---|---|---|---|---|---|
| 1055 | 00A | 049 | ONTAB | X(MAL)(MDU) | 836 | |
| 1056 | 00A | 04A | . | TAB | 2AC | |
| 1057 | 00A | 04B | . | READC | E00 | |
| 1058 | 00A | 04C | . | X(A)(UA) | 81A | |
| 1059 | 00A | 04D | . | 80AE | 0AE | |
| 1060 | 00A | 04E | . | CMPR(MDL) | 9D5 | IS CHAR. A PERIOD? |
| 1061 | 00A | 04F | . | #NOTAB | 056 | |
| 1062 | 00A | 050 | . | R8(MDL) | B75 | RESET 8 BIT ONLY IF NOT PERIO |
| 1063 | 00A | 051 | . | JMP | 9D1 | |
| 1064 | 00A | 052 | . | #NOTAB+1 | 057 | |
| 1065 | 00A | 053 | . | NOP | 800 | |
| 1066 | 00A | 054 | . | NOP | 800 | |
| 1067 | 00A | 055 | . | NOP | 800 | |
| 1068 | 00A | 056 | NOTAB | RL(MDL) | A55 | RESET ALL BITS IF PERIOD. |
| 1069 | 00A | 057 | . | WRTC | 3CB | |

*TEST FOR LAST SEG.

| NO. | PO | PL | LABEL | MNEMONIC | CODE | COMMENTS |
|---|---|---|---|---|---|---|
| 1070 | 00A | 058 | TLSEG | X(MDU)(MAL) | 863 | |
| 1071 | 00A | 059 | . | RL(MAL) | A53 | |
| 1072 | 00A | 05A | . | S2(MAL) | B93 | |
| 1073 | 00A | 05B | . | READL | E01 | |
| 1074 | 00A | 05C | . | TR7(MLL) | CE5 | |
| 1075 | 00A | 05D | . | #+4 | 060 | |
| 1076 | 00A | 05E | . | JMP | 9D1 | |
| 1077 | 00A | 05F | . | #ONTAB | 049 | |
| 1078 | 00A | 060 | . | X(MAL)(MDU) | 836 | |
| 1079 | 00A | 061 | . | TS17I(MAL) | D23 | RETURN EM |
| 1080 | 00A | 062 | . | #RETEM | 069 | |
| 1081 | 00A | 063 | . | DECR(MAL) | AF3 | |
| 1082 | 00A | 064 | . | JMP | 9D1 | |
| 1083 | 00A | 065 | . | #ONTAB+1 | 04A | |
| 1084 | 00A | 066 | . | NOP | 800 | |
| 1085 | 00A | 067 | . | NOP | 800 | |
| 1086 | 00A | 068 | . | NOP | 800 | |

*RETURN EM AND UPDATE

| NO. | PO | PL | LABEL | MNEMONIC | CODE | COMMENTS |
|---|---|---|---|---|---|---|
| 1087 | 00A | 069 | RETEM | RL(MAL) | A53 | |
| 1088 | 00A | 06A | . | S2(MAL) | B93 | |
| 1089 | 00A | 06B | . | S3(MAL) | BA3 | |
| 1090 | 00A | 06C | . | READU | E02 | |
| 1091 | 00A | 06D | . | TS8(MDU) | DF6 | |
| 1092 | 00A | 06E | . | #+5 | 072 | |
| 1093 | 00A | 06F | . | DECR(MAU) | AF4 | |
| 1094 | 00A | 070 | . | JMP | 9D1 | |
| 1095 | 00A | 071 | . | #RETEM+3 | 06C | |
| 1096 | 00A | 072 | . | R8(MDU) | B76 | STORE EM IN EM POS |
| 1097 | 00A | 073 | . | X(MAL)(MDU) | 836 | |
| 1098 | 00A | 074 | . | SEM2 | 2C5 | |
| 1099 | 00A | 075 | . | UPDEM | 160 | |
| 1100 | 00A | 076 | TBDON | RL(A) | A51 | ERASE INDICATORS |
| 1101 | 00A | 077 | . | JMP | 9D1 | |
| 1102 | 00A | 078 | . | #DISPR+3 | 080 | |

*END JOB

| NO. | PU | PL | LABEL | MNEMONIC | CODE | COMMENTS |
|---|---|---|---|---|---|---|
| 1103 | 00A | 079 | . | NOP | 800 | |
| 1104 | 00A | 07A | . | NOP | 800 | |
| 1105 | 00A | 07B | . | NOP | 800 | |
| 1106 | 00A | 07C | . | NOP | 800 | |

*DISPLAY "K" ERROR

| 1107 | 00A | 07D | DISPK | X(A)(UA) | 81A | |
|---|---|---|---|---|---|---|
| 1108 | 00A | 07E | . | @058 | 058 | FLASH K |
| 1109 | 00A | 07F | . | C1LA | 15C | |
| 1110 | 00A | 080 | . | SNS1 | 144 | |
| 1111 | 00A | 081 | . | JMP | 9D1 | |
| 1112 | 00A | 082 | . | #INEN | 0A2 | |

**
*------------------SET RESET INSERT MODE-----------------------------------
*
*
*CHECK IF I CURRENTLY ON

| 1113 | 00A | 083 | INS | S3(MAL) | BA3 | |
|---|---|---|---|---|---|---|
| 1114 | 00A | 084 | . | S2(MAL) | B93 | |
| 1115 | 00A | 085 | . | READL | E01 | READ CONTROL WORD OE FOR STATU |
| 1116 | 00A | 086 | . | TS7(MDL) | DE5 | WAS I ALREADY ON? |
| 1117 | 00A | 087 | . | #IOFF | 090 | |
| 1118 | 00A | 088 | . | S7(MDL) | BE5 | |
| 1119 | 00A | 089 | . | WRTL | E05 | |
| 1120 | 00A | 08A | . | X(A)(UA) | 81A | |
| 1121 | 00A | 08B | . | @048 | 048 | |
| 1122 | 00A | 08C | . | SNS1 | 144 | |
| 1123 | 00A | 08D | . | JMPO | 386 | |
| 1124 | 00A | 08E | . | @000 | 000 | |
| 1125 | 00A | 08F | . | @008 | 008 | |

*TURN I OFF

| 1126 | 00A | 090 | IOFF | R7(MDL) | B65 | |
|---|---|---|---|---|---|---|
| 1127 | 00A | 091 | . | S8(MDL) | BF5 | |
| 1128 | 00A | 092 | . | WRTL | E05 | SET ERASE INDICATOR |
| 1129 | 00A | 093 | . | R2(MAL) | B13 | |
| 1130 | 00A | 094 | . | R3(MAL) | B23 | |
| 1131 | 00A | 095 | . | READU | E02 | |
| 1132 | 00A | 096 | . | X(A)(UA) | 81A | |
| 1133 | 00A | 097 | . | @007 | 007 | |
| 1134 | 00A | 098 | . | AND(MDU) | 9F6 | |
| 1135 | 00A | 099 | . | X(MDU)(A) | 861 | CLEAR IND CHAR BITS IN WORD 08 |
| 1136 | 00A | 09A | . | WRTU | E06 | |
| 1137 | 00A | 09B | . | NOP | 800 | |
| 1138 | 00A | 09C | . | NOP | 800 | |

*GO TO OP SEG AND CLOSE UP IF NEEDED.

| 1139 | 00A | 09D | ICLU | LOPSG2 | 151 | INSERT CLOSE UP |
|---|---|---|---|---|---|---|
| 1140 | 00A | 09E | . | LOCEM | 200 | |
| 1141 | 00A | 09F | . | READC | E00 | |
| 1142 | 00A | 0A0 | . | TRL(MDL) | C35 | IS EM ON A NULL? |
| 1143 | 00A | 0A1 | . | #CLSUP | 0E6 | |
| 1144 | 00A | 0A2 | INEN | JMPO | 386 | |
| 1145 | 00A | 0A3 | . | @000 | 000 | |
| 1146 | 00A | 0A4 | . | @008 | 008 | |

*CLOSE UP REQUIRED

| 1147 | 00A | 0A5 | CLSP1 | S6(MDL) | BD5 | |
|---|---|---|---|---|---|---|
| 1148 | 00A | 0A6 | . | WRTC | 3CB | |

| NO. | PU | PL | LABEL | MNEMONIC | CODE | COMMENTS |
|---|---|---|---|---|---|---|

*RETURN TO CON. AREA WITH ( AND STORE

| NO. | PU | PL | LABEL | MNEMONIC | CODE | COMMENTS |
|---|---|---|---|---|---|---|
| 1149 | 00A | 0A7 | . | X(G)(MAU) | 824 | |
| 1150 | 00A | 0A8 | . | UPDEM | 160 | |
| 1151 | 00A | 0A9 | . | READL | E01 | |
| 1152 | 00A | 0AA | . | S6(MAL) | BD3 | |
| 1153 | 00A | 0AB | . | X(MDU)(G) | 862 | |
| 1154 | 00A | 0AC | . | WRT | E07 | EM MAU AND MAL IN ( ADD. |
| 1155 | 00A | 0AD | . | R6(MAL) | B53 | |
| 1156 | 00A | 0AE | . | JMP | 9D1 | |
| 1157 | 00A | 0AF | . | #SRS1 | 0B5 | |
| 1158 | 00A | 0B0 | DELFD | JMPO | 386 | |
| 1159 | 00A | 0B1 | . | @008 | 008 | |
| 1160 | 00A | 0B2 | . | #DELF | 080 | GO TO DEL FIELD PRGM |
| 1161 | 00A | 0B3 | . | NOP | 800 | |
| 1162 | 00A | 0B4 | . | NOP | 800 | |

*GO TO OPSEG-STORE(CHAR&START SEARCH FOR ) CHAR.

| NO. | PU | PL | LABEL | MNEMONIC | CODE | COMMENTS |
|---|---|---|---|---|---|---|
| 1163 | 00A | 0B5 | SRS1 | LOPSG2 | 151 | |
| 1164 | 00A | 0B6 | . | LOCEM | 200 | |
| 1165 | 00A | 0B7 | . | X(G)(MAL) | 823 | |
| 1166 | 00A | 0B8 | . | READC | E00 | |
| 1167 | 00A | 0B9 | . | RL(MAL) | A53 | |
| 1168 | 00A | 0BA | . | S2(MAL) | B93 | |
| 1169 | 00A | 0BB | . | X(MDU)(MDL) | 865 | |
| 1170 | 00A | 0BC | . | WRTO | E06 | SFLD STORED. |
| 1171 | 00A | 0BD | . | X(MAL)(G) | 832 | START SEARCH FOR ) CHAR. |
| 1172 | 00A | 0BE | . | STEPR | 258 | |
| 1173 | 00A | 0BF | . | NOP | 800 | |
| 1174 | 00A | 0C0 | . | NOP | 800 | |
| 1175 | 00A | 0C1 | . | TSL(A) | D41 | OVERFLOW? |
| 1176 | 00A | 0C2 | . | #UPDAC | 0DD | |
| 1177 | 00A | 0C3 | . | READC | E00 | |
| 1178 | 00A | 0C4 | . | TRL(MDL) | C35 | |
| 1179 | 00A | 0C5 | . | #-6 | 0BE | |
| 1180 | 00A | 0C6 | . | STEPL | 226 | |
| 1181 | 00A | 0C7 | . | WRTC | 3CB | CREATED ) CHAR |
| 1182 | 00A | 0C8 | . | RL(MAL) | A53 | |
| 1183 | 00A | 0C9 | . | S3(MAL) | BA3 | |
| 1184 | 00A | 0CA | . | X(MDU)(G) | 862 | |
| 1185 | 00A | 0CB | . | WRTO | E06 | EFLD STORED |

*RETURN TO CILA TO STORE )

| NO. | PU | PL | LABEL | MNEMONIC | CODE | COMMENTS |
|---|---|---|---|---|---|---|
| 1186 | 00A | 0CC | . | X(G)(MAU) | 824 | |
| 1187 | 00A | 0CD | . | UPDEM | 160 | |
| 1188 | 00A | 0CE | . | READL | E01 | |
| 1189 | 00A | 0CF | . | X(A)(MDL) | 815 | |
| 1190 | 00A | 0D0 | . | DIMAL | 3FD | |
| 1191 | 00A | 0D1 | . | READU | E02 | |
| 1192 | 00A | 0D2 | . | S8(MDU) | BF6 | |
| 1193 | 00A | 0D3 | . | S7(MDU) | BE6 | |
| 1194 | 00A | 0D4 | . | WRTO | E06 | |
| 1195 | 00A | 0D5 | . | S6(MAL) | BD3 | |
| 1196 | 00A | 0D6 | . | MD-AG | 3ED | |
| 1197 | 00A | 0D7 | . | WRT | E07 | ) ADD. STORED IN WORD 2A |
| 1198 | 00A | 0D8 | . | R2(MAL) | B13 | |
| 1199 | 00A | 0D9 | . | R6(MAL) | B53 | |
| 1200 | 00A | 0DA | . | R8(PR2) | B7F | |
| 1201 | 00A | 0DB | . | JMP | 9D1 | |
| 1202 | 00A | 0DC | . | #DELFD | 0B0 | |
| 1203 | 00A | 0DD | UPDAC | CILA | 15C | |
| 1204 | 00A | 0DE | . | READL | E01 | |
| 1205 | 00A | 0DF | . | X(G)(MDL) | 825 | |

| NO. | PO | PL | LABEL | MNEMONIC | CODE | COMMENTS |
|---|---|---|---|---|---|---|
| 1206 | 00A | 0E0 | . | LOPSG2 | 151 | |
| 1207 | 00A | 0E1 | . | RL(MAL) | A53 | |
| 1208 | 00A | 0E2 | . | A(MDL)(G) | 852 | |
| 1209 | 00A | 0E3 | . | KRTL | E05 | |
| 1210 | 00A | 0E4 | . | JMP | 9D1 | |
| 1211 | 00A | 0E5 | . | #INEN | 0A2 | |

* BEFORE ATEMPTING CLOSE UP OF INSERT MODE CHECK IF THERE ARE MORE
*MORE THAN ONE NULL CHAR. IF ONLY ONE NULL EXIST DO CHAR DELETE OPRIN.

| 1212 | 00A | 0E6 | CLSUP | STEPR | 258 | |
|---|---|---|---|---|---|---|
| 1213 | 00A | 0E7 | . | READC | E00 | |
| 1214 | 00A | 0E8 | . | TSY(MDL) | D35 | |
| 1215 | 00A | 0E9 | . | #CLSP2 | 0EE | |
| 1216 | 00A | 0EA | . | STEPL | 226 | |
| 1217 | 00A | 0EB | . | RL(MDL) | A55 | |
| 1218 | 00A | 0EC | . | JMP | 9D1 | |
| 1219 | 00A | 0ED | . | #CLSP1 | 0A5 | |
| 1220 | 00A | 0EE | CLSP2 | STEPL | 226 | |
| 1221 | 00A | 0EF | . | SL(MDL) | AC5 | |
| 1222 | 00A | 0F0 | . | LRIC | 3CB | |
| 1223 | 00A | 0F1 | . | UPDEM | 160 | |
| 1224 | 00A | 0F2 | . | JMPO | 386 | |
| 1225 | 00A | 0F3 | . | @008 | 008 | |
| 1226 | 00A | 0F4 | . | #DELC | 069 | |

*

| 1227 | 00A | 0F5 | . | NOP | 800 | |
|---|---|---|---|---|---|---|
| 1228 | 00A | 0F6 | . | NOP | 800 | |
| 1229 | 00A | 0F7 | . | NOP | 800 | |
| 1230 | 00A | 0F8 | . | NOP | 800 | |
| 1231 | 00A | 0F9 | . | NOP | 800 | |
| 1232 | 00A | 0FA | . | NOP | 800 | |
| 1233 | 00A | 0FB | . | NOP | 800 | |
| 1234 | 00A | 0FC | . | NOP | 800 | |
| 1235 | 00A | 0FD | . | NOP | 800 | |
| 1236 | 00A | 0FE | . | NOP | 800 | |
| 1237 | 00A | 0FF | . | NOP | 800 | |

**
*------------------------CLEAR------------------------
*
*
*DJ CLEAR
*DETERMINE IF CLEAR OR RESTORE BRACES

| 1238 | 00B | 000 | GCLR | R1(PR2) | B0F | |
|---|---|---|---|---|---|---|
| 1239 | 00B | 001 | . | R8(PR2) | B7F | |
| 1240 | 00B | 002 | . | DIMAL | 3FD | @0A OF CONTROL AREA |
| 1241 | 00B | 003 | . | READJ | E02 | |
| 1242 | 00B | 004 | . | IR8(MDU) | CF6 | SFLD MARKED? |
| 1243 | 00B | 005 | . | #+5 | 009 | NO |
| 1244 | 00B | 006 | . | R8(MDU) | B76 | |
| 1245 | 00B | 007 | . | KRTU | E06 | EFLD MARKED? |
| 1246 | 00B | 008 | . | S8(PR2) | BFF | YES- RESTORE ONLY |
| 1247 | 00B | 009 | . | TS7(MDU) | DE6 | NO-WAS SFLD MARKED? |
| 1248 | 00B | 00A | . | #RESTR | 00F | YES- GO TO RESTR |
| 1249 | 00B | 00B | . | TS8(PR2) | DFF | |
| 1250 | 00B | 00C | . | #RESTR+1 | 010 | NEITHER MARKED-START CLEAR OPR |
| 1251 | 00B | 00D | . | JMP | 9D1 | |
| 1252 | 00B | 00E | . | #GOCLR | 037 | |
| 1253 | 00B | 00F | RESTR | R7(MDU) | B66 | |
| 1254 | 00B | 010 | . | KRTU | E06 | |

| NO. | PU | FL | LABEL | MNEMONIC | CODE | COMMENTS |
|---|---|---|---|---|---|---|

* RESTORE CHARS. INTO BRACES

| NO. | PU | FL | LABEL | MNEMONIC | CODE | COMMENTS |
|---|---|---|---|---|---|---|
| 1255 | 00B | 011 | . | S1(PR2) | B8F | GOT HERE BECAUSE EFLD MASKED |
| 1256 | 00B | 012 | . | S6(MAL) | BD3 | CLOSE BRACE ADD. |
| 1257 | 00B | 013 | . | READ | E03 | |
| 1258 | 00B | 014 | . | AG-MD | 3EB | CLOSE BRACE MAU IN G |
| 1259 | 00B | 015 | . | NOP | 800 | |
| 1260 | 00B | 016 | . | DECR(MAL) | AF3 | |
| 1261 | 00B | 017 | . | READ | E03 | OPEN BRACE ADD. |
| 1262 | 00B | 018 | . | NOP | 800 | |
| 1263 | 00B | 019 | . | NOP | 800 | |
| 1264 | 00B | 01A | . | NOP | 800 | |
| 1265 | 00B | 01B | . | NOP | 800 | |
| 1266 | 00B | 01C | . | NOP | 800 | |

* GO TO OP SEG. OF OPEN BRACE

| NO. | PU | FL | LABEL | MNEMONIC | CODE | COMMENTS |
|---|---|---|---|---|---|---|
| 1267 | 00B | 01D | . | MA-MD | 3E9 | MAU-MDU |
| 1268 | 00B | 01E | . | NOP | 800 | |
| 1269 | 00B | 01F | . | TR8(PR2) | CFF | |
| 1270 | 00B | 020 | . | #RECLB | 02D | RESTORE CLOSE BRACE ONLY |
| 1271 | 00B | 021 | . | X(MDU)(MAL) | 863 | |
| 1272 | 00B | 022 | . | RL(MAL) | A53 | |
| 1273 | 00B | 023 | . | S2(MAL) | B93 | |
| 1274 | 00B | 024 | . | READC | E00 | MDL HAS OPEN BRACE CHAR. |
| 1275 | 00B | 025 | . | X(MAL)(MDU) | 836 | |
| 1276 | 00B | 026 | . | WRIC | 3CB | OPEN CHAR RESTORED |
| 1277 | 00B | 027 | . | NOP | 800 | |
| 1278 | 00B | 028 | . | NOP | 800 | |
| 1279 | 00B | 029 | . | NOP | 800 | |
| 1280 | 00B | 02A | . | NOP | 800 | |

* CHECK IF CLOSE BRACE RESTORE NEEDED

| NO. | PU | FL | LABEL | MNEMONIC | CODE | COMMENTS |
|---|---|---|---|---|---|---|
| 1281 | 00B | 02B | . | TR1(PR2) | C8F | |
| 1282 | 00B | 02C | . | #NOMOR+2 | 09F | JOB OVER IF YES. |
| 1283 | 00B | 02D | RECLB | X(MAU)(G) | 842 | CLOSE BRACE MAU FROM G |
| 1284 | 00B | 02E | . | RL(MAL) | A53 | |
| 1285 | 00B | 02F | . | S3(MAL) | BA3 | |
| 1286 | 00B | 030 | . | READC | E00 | CLOSE BRACE CHAR IN MDL |
| 1287 | 00B | 031 | . | X(MAL)(A) | 831 | MAL-CLOSE BRACE ADD |
| 1288 | 00B | 032 | . | WRIC | 3CB | CLOSE CHAR. RESTORED. |
| 1289 | 00B | 033 | . | JMP | 9D1 | |
| 1290 | 00B | 034 | . | #NOMOR+2 | 09F | |
| 1291 | 00B | 035 | . | NOP | 800 | |
| 1292 | 00B | 036 | . | NOP | 800 | |

* BITS 7 OR 8 OF CONTROL WORD OA NOT SET-CLEAR OPER.

| NO. | PU | FL | LABEL | MNEMONIC | CODE | COMMENTS |
|---|---|---|---|---|---|---|
| 1293 | 00B | 037 | GOCLR | DLMAL | 3FB | |
| 1294 | 00B | 038 | . | DLMAL | 3FB | |
| 1295 | 00B | 039 | . | READL | E01 | MDL-LAST DIS. SEG. |
| 1296 | 00B | 03A | . | X(G)(MDL) | 825 | G-LAST DIS SEG. |
| 1297 | 00B | 03B | . | X(A)(UA) | 81A | READ WORD 31 OR 71 FOR LAST M |
| 1298 | 00B | 03C | . | @02A | 02A | ADD 2A |
| 1299 | 00B | 03D | . | ADD(MAL) | 953 | |
| 1300 | 00B | 03E | . | X(MAL)(A) | 831 | |
| 1301 | 00B | 03F | . | READL | E01 | |
| 1302 | 00B | 040 | . | X(A)(G) | 812 | |
| 1303 | 00B | 041 | . | CMPR(MDL) | 9D5 | SEE IF LAST SEG-=LAST MEM SEG. |
| 1304 | 00B | 042 | . | #+3 | 044 | |
| 1305 | 00B | 043 | . | S1(PR2) | B8F | PR21 SET= FAKE LAST SEG. |
| 1306 | 00B | 044 | . | R5(MAL) | B43 | |
| 1307 | 00B | 045 | . | R6(MAL) | B53 | |

| NO. | PU | PL | LABEL | MNEMONIC | CODE | COMMENTS |
|---|---|---|---|---|---|---|
| 1308 | 00B | 046 | . | S4(MAL) | BB3 | RETURNED TO CONTROL WORD 08 |
| 1309 | 00B | 047 | . | NOP | 800 | |
| 1310 | 00B | 048 | . | NOP | 800 | |
| 1311 | 00B | 049 | . | NOP | 800 | |
| 1312 | 00B | 04A | . | NOP | 800 | |
| 1313 | 00B | 04B | . | NOP | 800 | |

* GO TO OP SEG & CHECK FOR INDEX OR EDIT AREA.

| NO. | PU | PL | LABEL | MNEMONIC | CODE | COMMENTS |
|---|---|---|---|---|---|---|
| 1314 | 00B | 04C | . | LOPSG2 | 151 | MAU-EM SEG. |
| 1315 | 00B | 04D | . | RL(MAL) | A53 | |
| 1316 | 00B | 04E | . | S2(MAL) | B93 | |
| 1317 | 00B | 04F | . | READL | E01 | |
| 1318 | 00B | 050 | . | TS6(MDL) | DD5 | |
| 1319 | 00B | 051 | . | #IXCLR | 06E | IF YES IN INDEX AREA |
| 1320 | 00B | 052 | . | TR1(PR2) | C8F | NOT INDEX SO TEST IF SHOULD FA |
| 1321 | 00B | 053 | . | #NOFAK | 05B | |
| 1322 | 00B | 054 | . | X(MDU)(MAU) | 864 | START FAKE- STORE EM MAU IN MD |
| 1323 | 00B | 055 | . | X(MAU)(G) | 842 | LAST DISPLAY SEG TO MAU |
| 1324 | 00B | 056 | . | RL(MAL) | A53 | |
| 1325 | 00B | 057 | . | S2(MAL) | B93 | |
| 1326 | 00B | 058 | . | READL | E01 | |
| 1327 | 00B | 059 | . | R7(MDL) | B65 | |
| 1328 | 00B | 05A | . | WRTL | E05 | FAKE COMPLETED |
| 1329 | 00B | 05B | NOFAK | X(A)(UA) | 81A | |
| 1330 | 00B | 05C | . | @OFA | 0FA | |
| 1331 | 00B | 05D | . | ADD(G) | 952 | |
| 1332 | 00B | 05E | . | X(MAU)(A) | 841 | |
| 1333 | 00B | 05F | . | RSTRP(15) | E2F | |

* RETURN TO EM SEG & CLEAR FROM HOME + UPDEM

| NO. | PU | PL | LABEL | MNEMONIC | CODE | COMMENTS |
|---|---|---|---|---|---|---|
| 1334 | 00B | 060 | . | X(MAL)(MDL) | 835 | EM IN HOME |
| 1335 | 00B | 061 | . | NOP | 800 | |
| 1336 | 00B | 062 | . | NOP | 800 | |
| 1337 | 00B | 063 | . | TCLEAR | 23D | |

*CHECK IF LAST FAKED IF YES THEN RESTORE

| NO. | PU | PL | LABEL | MNEMONIC | CODE | COMMENTS |
|---|---|---|---|---|---|---|
| 1338 | 00B | 064 | . | TR1(PR2) | C8F | |
| 1339 | 00B | 065 | . | #NEWEM | 07A | RETURN TO CONTROL AREA & UPDA |
| 1340 | 00B | 066 | . | RL(MAL) | A53 | |
| 1341 | 00B | 067 | . | S2(MAL) | B93 | |
| 1342 | 00B | 068 | . | READL | E01 | |
| 1343 | 00B | 069 | . | S7(MDL) | BE5 | |
| 1344 | 00B | 06A | . | WRTL | E05 | |
| 1345 | 00B | 06B | . | JMP | 9D1 | |
| 1346 | 00B | 06C | . | #NEWEM | 07A | |
| 1347 | 00B | 06D | . | NOP | 800 | |

*CLEAR FROM INDEX AREA

| NO. | PU | PL | LABEL | MNEMONIC | CODE | COMMENTS |
|---|---|---|---|---|---|---|
| 1348 | 00B | 06E | IXCLR | S8(PR2) | BFF | |
| 1349 | 00B | 06F | . | HOME | 24E | |
| 1350 | 00B | 070 | . | SEM2 | 2C5 | |
| 1351 | 00B | 071 | . | TCLEAR | 23D | |

*RETURN TO INDEX AREA & JUMP TO CONTROL AREA

| NO. | PU | PL | LABEL | MNEMONIC | CODE | COMMENTS |
|---|---|---|---|---|---|---|
| 1352 | 00B | 072 | . | RL(MAL) | A53 | |
| 1353 | 00B | 073 | . | S2(MAL) | B93 | |
| 1354 | 00B | 074 | TEST6 | READL | E01 | |
| 1355 | 00B | 075 | . | TS6(MDL) | DD5 | |
| 1356 | 00B | 076 | . | #+9 | 07E | |

| NO. | PU | FL | LABEL | MNEMONIC | CODE | COMMENTS |
|---|---|---|---|---|---|---|
| 1357 | 00B | 077 | . | DECR(MAU) | AF4 | |
| 1358 | 00B | 078 | . | JMP | 9D1 | |
| 1359 | 00B | 079 | . | #TES16 | 074 | |
| 1360 | 00B | 07A | NEWEM | X(A)(UA) | 81A | |
| 1361 | 00B | 07B | . | @0FA | 0FA | |
| 1362 | 00B | 07C | . | ADD(G) | 952 | |
| 1363 | 00B | 07D | . | X(MAU)(A) | 841 | |

*UPDATE EM & TEST FOR CCF-1 MODS

| 1364 | 00B | 07E | . | RSTRP(15) | E2F | |
| 1365 | 00B | 07F | . | X(MAL)(MDL) | 835 | |
| 1366 | 00B | 080 | . | SEM2 | 2C5 | |
| 1367 | 00B | 081 | . | UPDEM | 160 | |
| 1368 | 00B | 082 | . | TS8(PR2) | DFF | |
| 1369 | 00B | 083 | . | #+5 | 087 | |
| 1370 | 00B | 084 | . | JMP | 9D1 | |
| 1371 | 00B | 085 | . | #NOMOR+2 | 09F | |
| 1372 | 00B | 086 | . | NOP | 800 | |
| 1373 | 00B | 087 | . | NOP | 800 | |

*CCF-1 CHANGES

| 1374 | 00B | 088 | . | X(A)(UA) | 81A | |
| 1375 | 00B | 089 | . | @02B | 02B | ADD 2B TO MAL |
| 1376 | 00B | 08A | . | ADD(MAL) | 953 | |
| 1377 | 00B | 08B | . | X(MAL)(A) | 831 | MAL=33 OR 73 |
| 1378 | 00B | 08C | . | READC | E00 | |
| 1379 | 00B | 08D | . | X(A)(UA) | 81A | |
| 1380 | 00B | 08E | . | @040 | 040 | |
| 1381 | 00B | 08F | . | AND(MDL) | 9F5 | MASK OUT ALL BUT 7TH BIT OF CC |
| 1382 | 00B | 090 | . | X(MDL)(A) | 851 | |
| 1383 | 00B | 091 | . | S1(MDL) | B85 | |
| 1384 | 00B | 092 | . | S8(MDL) | BF5 | |
| 1385 | 00B | 093 | . | WRTC | 3CB | CCF1-1=1 MINOR MODE |

*CLEAR REMAINING CCFS

| 1386 | 00B | 094 | TESTL | TS17I(MAL) | D23 | CHECK FOR CCF07F |
| 1387 | 00B | 095 | . | #NOMOR | 09D | FINISH UP IF YES |
| 1388 | 00B | 096 | . | TS7(MAL) | DE3 | CHECK FOR CCF03F |
| 1389 | 00B | 097 | . | #NOMOR | 09D | FINISH UP IF YES |
| 1390 | 00B | 098 | . | RL(MDL) | A55 | WRITE NULLS INTO CCFS |
| 1391 | 00B | 099 | . | WRTC | 3CB | |
| 1392 | 00B | 09A | . | JMP | 9D1 | |
| 1393 | 00B | 09B | . | #TESTL | 094 | |
| 1394 | 00B | 09C | . | NOP | 800 | |

*FINISH UP

| 1395 | 00B | 09D | NOMOR | DECR(MAL) | AF3 | |
| 1396 | 00B | 09E | . | WRTC | 3CB | |
| 1397 | 00B | 09F | . | JMPO | 386 | |
| 1398 | 00B | 0A0 | . | @000 | 000 | |
| 1399 | 00B | 0A1 | . | @008 | 008 | |
| 1400 | 00B | 0A2 | . | NOP | 800 | |
| 1401 | 00B | 0A3 | . | NOP | 800 | |
| 1402 | 00B | 0A4 | . | NOP | 800 | |
| 1403 | 00B | 0A5 | . | NOP | 800 | |

*

| 1404 | 00B | 0A6 | . | NOP | 800 | |
| 1405 | 00B | 0A7 | . | NOP | 800 | |
| 1406 | 00B | 0A8 | . | NOP | 800 | |

| NO. | PU | PL | LABEL | MNEMONIC | CODE | COMMENTS |
|---|---|---|---|---|---|---|
| 1407 | 00B | 0A9 | . | NOP | 800 | |
| 1408 | 00B | 0AA | . | NOP | 800 | |
| 1409 | 00B | 0AB | . | NOP | 800 | |
| 1410 | 00B | 0AC | . | NOP | 800 | |
| 1411 | 00B | 0AD | . | NOP | 800 | |
| 1412 | 00B | 0AE | . | NOP | 800 | |
| 1413 | 00B | 0AF | . | NOP | 800 | |
| 1414 | 00B | 0B0 | . | NOP | 800 | |
| 1415 | 00B | 0B1 | . | NOP | 800 | |
| 1416 | 00B | 0B2 | . | NOP | 800 | |
| 1417 | 00B | 0B3 | . | NOP | 800 | |
| 1418 | 00B | 0B4 | . | NOP | 800 | |
| 1419 | 00B | 0B5 | . | NOP | 800 | |
| 1420 | 00B | 0B6 | . | NOP | 800 | |
| 1421 | 00B | 0B7 | . | NOP | 800 | |
| 1422 | 00B | 0B8 | . | NOP | 800 | |
| 1423 | 00B | 0B9 | . | NOP | 800 | |
| 1424 | 00B | 0BA | . | NOP | 800 | |
| 1425 | 00B | 0BB | . | NOP | 800 | |
| 1426 | 00B | 0BC | . | NOP | 800 | |
| 1427 | 00B | 0BD | . | NOP | 800 | |
| 1428 | 00B | 0BE | . | NOP | 800 | |
| 1429 | 00B | 0BF | . | NOP | 800 | |
| 1430 | 00B | 0C0 | . | NOP | 800 | |
| 1431 | 00B | 0C1 | . | NOP | 800 | |
| 1432 | 00B | 0C2 | . | NOP | 800 | |
| 1433 | 00B | 0C3 | . | NOP | 800 | |
| 1434 | 00B | 0C4 | . | NOP | 800 | |
| 1435 | 00B | 0C5 | . | NOP | 800 | |
| 1436 | 00B | 0C6 | . | NOP | 800 | |
| 1437 | 00B | 0C7 | . | NOP | 800 | |

```
**

*
*
*           RECEIVE PROGRAM STATUS CHARACTERS
*           -------  -------  ------  ----------
*
*
*
*
*     BIT      FOREGROUND (5E)            BACKGROUND (5F)
*     ---      ---------------            ---------------
*
*      8       CORRECT A0 RECVD           1ST PASS FOR CONTROL CHAR
*
*      7       1ST A1 UNLOADED            ESCAPE MODE
*
*      6       DC1/DC4 RCVD               CONTROL CHARACTER RECVD
*
*      5          -                       2ND CHAR TO PROCESS
*
*      4       A1 FORMAT (1 OR 3)         F1 = REPLY
*
*      3       A1 INDEX                   S0 MODE
*
*      2          "                       DC2 RECVD
*
*      1          "                       DC1/DC4 RECVED
*
*
*
*
```

```
NO.  PU  PL   LABEL MNEMONIC             CODE    COMMENTS
*    BIT       HOUSEKEEPING (69)                 CONTROL AREA UPDATE (5F)
*    ---       -----------------                 ------------------------
*
*    8         1=STX PROCESSING                  1=ADDRESS 0=DATA
*
*    7         1=ETX 0=CAN PROCESNG              -
*
*    6         QSA: 1=EM  0=HOME                 -
*
*    5         STORE QSA                         -
*
*    4         FI = BRDCST/REPLY                 -
*
*    3         SECOND PROC.                      -
*
*    2         1=REPLY  0=BRDCST                 INDEX: NO. CHAR'S RECVD
*
*    1         1=QUOTE  0=MIS                    "
*
**
*              RECEIVE PORT CONTROL AREA MAP
*              ----------------------------
*
*    WORD NO.  FUNCTION           UPPER BYTE       LOWER BYTE
*    --------  --------           ----------       ----------
*
*    40        LEVEL 3 IJA        (11)             (24)
*    42        LEVEL 1 IJA        (10)             (00)
*    44        RTC TRAP PNTR      (00)             (08)
*    46        RTC LIMITS         (00)             (00)
*    48        STATUS WORD        (00)             (A0)
*    4A        IO BUFFER          -                -
*    4C        "                  -                -
*    4E        "                  -                -
*    50        "                  -                -
*    52        "                  -                -
*    54        "                  -                -
*    56        "                  -                -
*    58        "                  -                -
*    5A        MESSAGE CONSTS     FI CHAR RECVD    -
*    5C        PORT CONSTS        IO ADDR (08)     AO CHAR (STRP 6)
*    5E        PROGRAM STATUS     FOREGND STATUS   BACKGND STATUS
*    60        LEVEL 4 IJA        (12)             (24)
*    62        LEVEL 2 IJA        -                (3D)
*    64        NOT USED           -                -
*    66        NOT USED           -                -
*    68        PROGRAM STORAGE    2ND CHAR         3RD CHAR (HK STATS)
*    6A        PROGRAM STORAGE    RECVD CHAR       2ND CHAR
*    6C        PROGRAM STORAGE    OVFL STORGE      1ST A1 RECVD
*    6E        A1 TABLE PNTRS     TABLE END ADDR   CURRENT ENTRY
*    70        A1 TABLE           -                -
*    72        REPLY HPC          HPC              -
*    74        "                  -                -
*    76        "                  -                -
*    78        " (STOCK UPDTE)    UPDATE NO.       -
*    7A        " (STOCK UPDTE)    PASS NO.         DISPLCEMENT CONST
*    7C        " (STOCK UPDTE)    INITIAL CAT POINTER
*    7E        " (STOCK UPDTE)    CURRENT CAT POINTER
**
* RECEIVE PROGRAM --- PART I (FOREGROUND)
*
* LEVEL 1 IJA -- "START"
*       THIS PROGRAM TESTS FOR CERTAIN CONTROL CHARACTERS
*       AND IF NONE ARE FOUND - JUMPS TO LEVEL 2 IJA.
```

```
NO.  PU   PL   LABEL  MNEMONIC          CODE   COMMENTS
* READ STATUS WORD 0  010  000  START  LDG               356    READ STATUS WORD
  1  010  001      .  @05E              05E    (01011110)

* TEST CHARACTER FOR PARITY ERROR 2  010  002      .  TRB(A)            CF1    JUMP IF PARITY ERROR
  3  010  003      .  #+5               007      TO SIMULATE ETX CHAR.
  4  010  004      .  RL(A)             A51
  5  010  005      .  JMP               9D1
  6  010  006      .  #ETX2             03C

* COMPARE AGAINST CONTROL CHARACTERS 7  010  007      .  COMPR             3D2    COMPARE MACRO (UNMASKED)
  8  010  008      .  @005              005      IF ENQ
  9  010  009      .  #ENQ              054        GO TO POLL HANDLING PROG
 10  010  00A      .  @002              002      IF STX
 11  010  00B      .  #STX              05A        GO TO STX PROG
 12  010  00C      .  @003              003      IF ETX
 13  010  00D      .  #ETX2             03C        INITIALIZE FORGND
 14  010  00E      .  @001              001      IF SOH
 15  010  00F      .  #SOH              069        GO TO SOH PROG
 16  010  010      .  @0FF              0FF    MACRO END -- CONTINUE
 17  010  011      .  #+2               012
 18  010  012      .  NOP               800
 19  010  013      .  NOP               800

* JUMP TO LEVEL 2 IJA -- INDIRECT THROUGH (011000011)

20  010  014      .  JMPIC             383    JUMP INDIRECT
 21  010  015      .  @063              063

**

* LEVEL 1 IJA -- "ACTIVE"
*     THIS PROGRAM TESTS FOR CERTAIN CONTROL CHARACTERS
*         AND UNLESS FOUND -- SAVES CHAR FOR BACKGROUND
*
* TEST FOR PARITY ERROR 22  010  016  ACTVE  JMP               9D1    JUMP TO HPC ACCUM.
 23  010  017      .  #P1               0DD

* COMPARE AGAINST CONTROL CHARACTERS 24  010  018  ACT    COMPR             3D2    COMPARE MACRO (UNMASKED)
 25  010  019      .  @005              005      IF ENQ
 26  010  01A      .  #ENQ              054        GO TO POLL HANDLING PROG
 27  010  01B      .  @003              003      IF ETX
 28  010  01C      .  #ETX1             038        INITIALIZE FOREGND
 29  010  01D      .  @016              016      IF SYN
 30  010  01E      .  #DSCRD            057        DISCARD CHARACTER
 31  010  01F      .  @018              018      IF CAN
 32  010  020      .  #CAN3             027        GO TO ERROR PROG
 33  010  021      .  @002              002      IF STX
 34  010  022      .  #DSCRD            057        DISCARD CHARACTER
 35  010  023      .  @0FF              0FF    MACRO END
 36  010  024      .  #SAVE             051    JUMP TO SAVE CHARACTER
 37  010  025      .  NOP               800
 38  010  026      .  NOP               800

**
```

| NO. | PU | PL | LABEL | MNEMONIC | CODE | COMMENTS |
|---|---|---|---|---|---|---|

* FOREGROUND ERROR PROGRAM
* CANCEL CHARACTER IN TEXT -- SET UP XMIT FOREGROUND POINTER

| 39 | 010 | 027 | CAN3 | X(MDU)(UA) | 86A | |
| 40 | 010 | 028 | . | @0A1 | 0A1 | |
| 41 | 010 | 029 | . | X(MDL)(UA) | 85A | |
| 42 | 010 | 02A | . | @0D8 | 0D8 | |
| 43 | 010 | 02B | . | WRT' | 3BF | |
| 44 | 010 | 02C | . | @002 | 002 | |

* SET JOB BIT IN UPPER BYTE OF XMIT STATUS WORD

| 45 | 010 | 02D | . | READ' | 3B7 | |
| 46 | 010 | 02E | . | @008 | 008 | |
| 47 | 010 | 02F | . | S6(MDU) | BD6 | |
| 48 | 010 | 030 | . | WRT | E07 | |

* TURN OFF XMIT PORT

| 49 | 010 | 031 | . | LDG' | 356 | |
| 50 | 010 | 032 | . | @05C | 05C | |
| 51 | 010 | 033 | . | RL(A) | A51 | |
| 52 | 010 | 034 | . | INCR(G) | A22 | |
| 53 | 010 | 035 | . | OUTC | 39C | |

** CONTINUE IN PARITY ERROR PROGRAM
* ERROR ROUTINE -- PARITY ERROR DETECTED IN TEXT OF MESSAGE.
* 'CAN' CHARACTER CODE INTO A

| 54 | 010 | 036 | CAN1 | X(A)(UA) | 81A | |
| 55 | 010 | 037 | . | @018 | 018 | |

* PROGRAM TO HANDLE ETX CHARACTER
*
* CHANGE LEVEL 1 IJA INTO "START"

| 56 | 010 | 038 | ETX1 | S8(A) | BF1 | SET SAVE CHAR BIT |
| 57 | 010 | 039 | . | ENTRM' | 3A4 | CHANGE LEVEL 1 IJA TO "START" |
| 58 | 010 | 03A | . | @043 | 043 | |
| 59 | 010 | 03B | . | #START | 000 | |
| 60 | 010 | 03C | ETX2 | ENTRM' | 3A4 | RESET STATUS CHARACTER |
| 61 | 010 | 03D | . | @05E | 05E | |
| 62 | 010 | 03E | . | @040 | 040 | |

* PUT "IDLE" INTO LEVEL 2 IJA -- COMMAND IO TO "LOOK FOR SYN"

| 63 | 010 | 03F | IDLE | X(G)(UA) | 82A | PL-COUNT (IDLE) |
| 64 | 010 | 040 | . | #IDLE | 03F | |
| 65 | 010 | 041 | . | RL(MDL) | A55 | IO-"LOOK FOR SYN" |
| 66 | 010 | 042 | . | NOP | 800 | |

** CONTINUE IN "IO COMMAND" ROUTINE

* LEVEL 2 IJA PROGRAMS
*
* PROGRAM TO OUTPUT IO COMMANDS (MDL) & STORE LEVEL 2 IJA

| 67 | 010 | 043 | IOCOM | X(MAL)(UA) | 83A | READ IO ADD INTO MDU |
| 68 | 010 | 044 | . | @05C | 05C | (01011100) |
| 69 | 010 | 045 | . | READU | E02 | |
| 70 | 010 | 046 | . | OUTCON | 39E | IO COMMAND -- ADD IN MDU & |
| 71 | 010 | 047 | . | S4(MDL) | BB5 | CONTROL BITS IN MDL |
| 72 | 010 | 048 | . | S2(MDL) | B95 | |
| 73 | 010 | 049 | . | OUTCON | 39E | SECOND IO COMMAND |

| NO. | PU | PL | LABEL | MNEMONIC | CODE | COMMENTS |
|---|---|---|---|---|---|---|

\* STORE NEW LEVEL 2 IJA (G)

```
74 010  04A         LDMD    STG*       35F   STORE LEVEL 2 IJA
75 010  04B    •            @063       063
```

\* SAVE OR DISCARD CHAR FOR BACKGROUND (A)

```
76 010  04C         TSAVE   TR8(A)     CF1   JUMP TO END OF FOREGND
77 010  04D    •            #DSCRD     057
78 010  04E    •            TSL(A)     D41   JUMP IF IN BACKGND ERROR PROG
79 010  04F    •            #FORER     0D6
80 010  050    •            R8(A)      B71
```

\* SAVE CHARACTER IN IO BUFFER FOR PROCESSING LATER BY BACKGND

```
81 010  051    SAVE JMPO              386   JUMP TO O.S. -- SAVE CHR
82 010  052    •          @000        000       FOR BACKGROUND
83 010  053    •          @00F        00F
```

\*\*

\* PROGRAM TO HANDLE ENQ CHARACTER
\*
\* CHANGE LEVEL 1 IJA TO "POLL"

```
84 010  054    ENQ   ENTRM*           3A4
85 010  055    •     @043             043
86 010  056    •     #POLL            0BA
```

\* DISCARD CHARACTER -- BACKGROUND PROGRAM WILL NOT SEE THIS CHAR.

```
87 010  057    DSCRD JMPO             386   JUMP TO O.S. - DISCARD CHAR.
88 010  058    •          @000        000      "END OF FOREGROUND"
89 010  059    •          @006        006
```

\*\*

\* PROGRAM TO HANDLE STX CHARACTER
\*
\* TEST IF CORRECT AO RCVD. YET

```
90 010  05A    STX   TR8(G)           CF2   JUMP IF AO NOT RCVD.
91 010  05B    •     #DISC            063      TO DISCARD REST OF MESSAGE
```

\* AO RCVD. - PUT "ACTIVE" INTO LEVEL 1 & 2 IJA'S - SAVE CHAR

```
92 010  05C    STX1  S8(A)            BF1   SAVE CHAR CONDITION
93 010  05D    •     ENTRM*           3A4   STORE LEVEL 1 IJA
94 010  05E    •     @043             043
95 010  05F    •     #ACTVE           016
96 010  060    •     X(G)(MDL)        825
97 010  061    •     JMP              9D1   STORE LEVEL 2 IJA
98 010  062    •     #STXXX           0E3
```

\* AO NOT RECEIVED - PUT LEVEL 2 IJA TO "DISCARD"
\*              AND COMMAND IO TO "LOOK FOR CONT CHAR"

```
 99 010  063   DISC  X(G)(UA)         82A   PL-COUNT (DISCARD)
100 010  064   •     #DISC            063
101 010  065   •     X(MDL)(UA)       85A   IO COMMAND -
102 010  066   •     @002             002      "LOOK FOR CONT CHAR"
103 010  067   •     JMP              9D1
104 010  068   •     #IOCOM           043
```

\*\*

```
NO.  PO   PL   LABEL  MNEMONIC        CODE   COMMENTS

* PROGRAM TO HANDLE SOH CHARACTER
*
* PUT "FI" INTO LEVEL 2 IJA & DISCARD CHAR 105 010  069   SOH    JMP0            386
 106 010  06A    •     @014            014
 107 010  06B    •     #SOHX           065
 108 010  06C    •     NOP             800

**
* PROGRAM TO PROCESS FI CHARACTER
*
* STORE FI CHARACTER FOR STX CAN & ETX HOUSEKEEPING 109 010  06D   FI1    R7(A)           B61
 110 010  06E    •     STA'            33C    FI STORAGE ADD =
 111 010  06F    •     @05A            05A       (01011010)

* UPDATE STATUS WORD -TEST FOR ADDRESS SIZE 112 010  070    •     X(MDL)(UA)      85A
 113 010  071    •     @049            049
 114 010  072    •     TPAT            3D9
 115 010  073    •     @03E            03E
 116 010  074    •     @004            004
 117 010  075    •     #FI2            07A
 118 010  076    •     R4(MDL)         B35
 119 010  077    •     R1(MDL)         B05
 120 010  078    •     NOP             800
 121 010  079    •     NOP             800
 122 010  07A   FI2    WRTC'           3CA    STORE STATUS WORD
 123 010  07B    •     @05E            05E    STATUS WORD ADD

* PUT LEVEL 2 IJA IN "TEST A0" & DISCARD CHARACTER 124 010  07C   FI3    X(G)(UA)        82A    PL-COUNT (TEST A0)
 125 010  07D    •     #TA0            080
 126 010  07E    •     JMP             9D1    STORE LEVEL 2 IJA
 127 010  07F    •     #LDMD2          0E0

**
* PROGRAM TO TEST A0 CHARACTER
*
* TEST IF CORRECT A0

128 010  080   TA0    READC'          3C7    READ A0 CHARACTER
 129 010  081    •     @05D            05D
 130 010  082    •     CMPR(MDL)       9D5    JUMP IF CORRECT A0
 131 010  083    •     #TA01           08B
 132 010  084    •     TPAT'           3DA    JUMP IF BROADCAST A0
 133 010  085    •     @040            040
 134 010  086    •     #TA01           08B

* INCORRECT A0 -- CHANGE LEVEL 2 IJA TO "DISCARD A1"

135 010  087    •     X(G)(UA)        82A    PL-COUNT (DISCARD A1)
 136 010  088    •     #DISA1          0AB
 137 010  089    •     JMP             9D1    JUMP TO UPDATE LEVEL 2 IJA
 138 010  08A    •     #LDMD2          0E0
```

NO. PU PL   LABEL  MNEMONIC        CODE    COMMENTS

* CHANGE LEVEL 2 IJA INTO "LOAD A1"

139 010 08B  TA01   S8(G)          BF2    SET CORRECT AO RCVD BIT
140 010 08C   •     STG°           35F    STORE UPDATED STATUS
141 010 08D   •     @05E           05E
142 010 08E   •     X(G)(UA)       82A    PL-COUNT (LOAD A1)
143 010 08F   •     #LDA1X         0E9
144 010 090   •     JMP            9D1    LOAD LEVEL 2 IJA
145 010 091   •     #LDMD2         0E0

**

* PROGRAM TO LOAD A1 CHARACTER INTO PORT AREA
*
* TEST IF A1 = (00)

146 010 092  LDA1   TSY(A)         D31    IF A1 = (00) - USE XMITED A1
147 010 093   •     #+7            099
148 010 094   •     LDA°           326    READ XMITED A1
149 010 095   •     @01B           01B
150 010 096   •     SHFTR(A)       A71
151 010 097   •     TRL(A)         C31    DISCARD MESSAGE IF A1 = (00)
152 010 098   •     #ETX2          03C

* TEST IF FIRST A1 TO BE STORED 153 010 099   •     TR7(G)         CE2    JUMP UNLESS FIRST A1
154 010 09A   •     #LDA11         0A1
155 010 09B   •     R7(G)          B62    UPDATE STATUS WORD

* INITIALIZE POINTER FOR A1 TABLE 156 010 09C   •     ENTRM°         3A4    CHANGE PTR TO 1-ST POS
157 010 09D   •     @06F           06F    CURRENT POS ADDRESS
158 010 09E   •     @070           070    1-ST POSITION

* STORE A1 FOR LATER REFERENCE IF ACK SHOULD BE REQUIRED 159 010 09F   •     STA°           33C
160 010 0A0   •     @06D           06D

* TEST AND SHIFT A1 CHARACTER 161 010 0A1  LDA11  TS4(G)         DB2    SHIFT A1 CHARACTER UNLESS
162 010 0A2   •     #+3            0A4       X1X2X3 FORMAT
163 010 0A3   •     SHFTL(A)       AB1

* STORE CHARACTER VIA POINTER 164 010 0A4   •     STAIC°         349    STORE A1 CHAR
165 010 0A5   •     @06F           06F    POINTER ADD = (01101111)
166 010 0A6   •     INCRM°         372    INCREMENT POINTER
167 010 0A7   •     @06F           06F
168 010 0A8   •     R8(MDL)        B75    TEST FOR OVERFLOW
169 010 0A9   •     TRL(MDL)       C35       (DISCARD)
170 010 0AA   •     #DISC          063

* TEST ADDRESS SIZE & INCREMENT INDEX 171 010 0AB  DISA1  TR4(G)         CB2    JUMP IF ADD LENGTH = 1
172 010 0AC   •     #MORE3         0B6
173 010 0AD   •     INCR(G)        A22    INCREMENT SIZE INDEX

| NO. | PU | PL | LABEL | MNEMONIC | CODE | COMMENTS |
|---|---|---|---|---|---|---|
| 174 | 010 | 0AE | . | TS3(G) | DA2 | JUMP IF 3 CHARS IN |
| 175 | 010 | 0AF | . | #MORE2 | 0B4 | |
| 176 | 010 | 0B0 | . | STG* | 35F | STORE UPDATED STATUS WORD |
| 177 | 010 | 0B1 | . | @05E | 05E | IN (01011110) |
| 178 | 010 | 0B2 | . | JMP | 9D1 | DISCARD CHARACTER |
| 179 | 010 | 0B3 | . | #DSCRD | 057 | |

* 3 CHARACTERS RECEIVED

| 180 | 010 | 0B4 | MORE2 | R3(G) | B22 | RESET INDEX IN STATUS WORD |
|---|---|---|---|---|---|---|
| 181 | 010 | 0B5 | . | S1(G) | B82 | |
| 182 | 010 | 0B6 | MORE3 | STG* | 35F | STORE UPDATED STATUS WORD |
| 183 | 010 | 0B7 | . | @05E | 05E | IN (01011110) |

* CHANGE LEVEL 2 IJA TO "TEST AO"

| 184 | 010 | 0B8 | . | JMP | 9D1 | |
|---|---|---|---|---|---|---|
| 185 | 010 | 0B9 | . | #FI3X | 0EC | |

**

* POLL PROGRAM
*
* RESET LEVEL 1 IJA TO PREVIOUS COUNT

| 186 | 010 | 0BA | POLL | ENTRM* | 3A4 | |
|---|---|---|---|---|---|---|
| 187 | 010 | 0BB | . | @043 | 043 | |
| 188 | 010 | 0BC | . | #START | 000 | |

* TEST IF CHARACTER FOLLOWING ENQ IS CORRECT AO CHARACTER

| 189 | 010 | 0BD | . | SUBM* | 36E | TEST FOR CORRECT AO CHAR |
|---|---|---|---|---|---|---|
| 190 | 010 | 0BE | . | @05D | 05D | |
| 191 | 010 | 0BF | . | TSY(A) | D31 | JUMP IF INCORRECT AO RECEIVED |
| 192 | 010 | 0C0 | . | #POLL2 | 0CB | |

* THIS ROUTINE SETS UP XMIT PROGRAM FOR POLL RESPONSE

| 193 | 010 | 0C1 | . | X(MDU)(UA) | 86A | |
|---|---|---|---|---|---|---|
| 194 | 010 | 0C2 | . | @0A0 | 0A0 | |
| 195 | 010 | 0C3 | . | X(MDL)(UA) | 85A | |
| 196 | 010 | 0C4 | . | @019 | 019 | |
| 197 | 010 | 0C5 | . | WRT* | 3BF | |
| 198 | 010 | 0C6 | . | @002 | 002 | |
| 199 | 010 | 0C7 | . | READC* | 3C7 | |
| 200 | 010 | 0C8 | . | @008 | 008 | |
| 201 | 010 | 0C9 | . | S6(MDL) | BD5 | |
| 202 | 010 | 0CA | . | WRTC | 3CB | |

* RESTORE LEVEL 1 IJA

| 203 | 010 | 0CB | POLL2 | LDA* | 326 | READ PREVIOUS LEVEL IJA |
|---|---|---|---|---|---|---|
| 204 | 010 | 0CC | . | @063 | 063 | |
| 205 | 010 | 0CD | . | COMPR | 3D2 | COMPARE MACRO (UNMASKED) |
| 206 | 010 | 0CE | . | #IDLE | 03F | IF LEVEL 2 IJA = "IDLE" |
| 207 | 010 | 0CF | . | #IDLE | 03F | GO TO EIX PROG |
| 208 | 010 | 0D0 | . | #DISC | 063 | IF LEVEL 2 IJA = "DISCARD" |
| 209 | 010 | 0D1 | . | #DISC | 063 | GO TO STX PROG |
| 210 | 010 | 0D2 | . | #ACTVE | 016 | IF LEVEL 2 IJA = "ACTIVE" |
| 211 | 010 | 0D3 | . | #NSTX1 | 0F0 | |
| 212 | 010 | 0D4 | . | @0FF | 0FF | MACRO END |
| 213 | 010 | 0D5 | . | #DSCRD | 057 | DISCARD AO CHAR |

**

| NO. | PU | PL | LABEL | MNEMONIC | CODE | COMMENTS |
|---|---|---|---|---|---|---|

* FOREGROUND INITIALIZATION ROUTINE

| NO. | PU | PL | LABEL | MNEMONIC | CODE | COMMENTS |
|---|---|---|---|---|---|---|
| 214 | 010 | 0D6 | FORER | ENIN | B5F | ENABLE INTERUPTS |
| 215 | 010 | 0D7 | . | ENTRM* | 3A4 | |
| 216 | 010 | 0D8 | . | @041 | 041 | |
| 217 | 010 | 0D9 | . | #WAIT | 024 | |
| 218 | 010 | 0DA | . | JMPO | 386 | |
| 219 | 010 | 0DB | . | @000 | 000 | |
| 220 | 010 | 0DC | . | @008 | 008 | |
| 221 | 010 | 0DD | P1 | JMPO | 386 | |
| 222 | 010 | 0DE | . | @014 | 014 | |
| 223 | 010 | 0DF | . | #ACTVX | 000 | |
| 224 | 010 | 0E0 | LDMD2 | JMPO | 386 | |
| 225 | 010 | 0E1 | . | @014 | 014 | |
| 226 | 010 | 0E2 | . | #LDMDX | 03F | |
| 227 | 010 | 0E3 | STXXX | JMPO | 386 | |
| 228 | 010 | 0E4 | . | @014 | 014 | |
| 229 | 010 | 0E5 | . | #STXX+1 | 055 | |
| 230 | 010 | 0E6 | MHPC | JMPO | 386 | |
| 231 | 010 | 0E7 | . | @014 | 014 | |
| 232 | 010 | 0E8 | . | #MHPC | 0E6 | |
| 233 | 010 | 0E9 | LDA1X | JMPO | 386 | |
| 234 | 010 | 0EA | . | @014 | 014 | |
| 235 | 010 | 0EB | . | #LDAX | 06F | |
| 236 | 010 | 0EC | FI3X | X(G)(UA) | 82A | |
| 237 | 010 | 0ED | . | #IAO | 080 | |
| 238 | 010 | 0EE | . | JMP | 9D1 | |
| 239 | 010 | 0EF | . | #LDMD | 04A | |
| 240 | 010 | 0F0 | NSTX1 | ENTRM* | 3A4 | |
| 241 | 010 | 0F1 | . | @043 | 043 | |
| 242 | 010 | 0F2 | . | #ACTVE | 016 | |
| 243 | 010 | 0F3 | . | X(G)(MDL) | 825 | |
| 244 | 010 | 0F4 | . | JMP | 9D1 | |
| 245 | 010 | 0F5 | . | #LDMD | 04A | |
| 246 | 010 | 0F6 | . | NOP | 800 | |
| 247 | 010 | 0F7 | . | NOP | 800 | |
| 248 | 010 | 0F8 | . | NOP | 800 | |
| 249 | 010 | 0F9 | . | NOP | 800 | |
| 250 | 010 | 0FA | . | NOP | 800 | |
| 251 | 010 | 0FB | . | NOP | 800 | |
| 252 | 010 | 0FC | . | NOP | 800 | |
| 253 | 010 | 0FD | . | NOP | 800 | |
| 254 | 010 | 0FE | . | NOP | 800 | |
| 255 | 010 | 0FF | . | NOP | 800 | |

**

* RECEIVE PROGRAM --- PART II  (BACKGROUND)
*     ALL PROGRAMS BRANCH OFF FROM THIS POINT
*       (REPLIES AND BROADCASTS ARE HANDLED TOGETHER)
*
* F! LOOK-UP TABLE   (1-ST 32 LOCATIONS)

| NO. | PU | PL | LABEL | MNEMONIC | CODE | COMMENTS |
|---|---|---|---|---|---|---|
| 256 | 011 | 000 | . | #MISR | 042 | MIS REPLY |
| 257 | 011 | 001 | . | #EMPTY | 020 | |
| 258 | 011 | 002 | . | #MISB | 0AA | BROADCAST TO CRTS (MIS) |
| 259 | 011 | 003 | . | #EMPTY | 020 | |
| 260 | 011 | 004 | . | #EMPTY | 020 | |
| 261 | 011 | 005 | . | #FORCE | 000 | FORCED REPLY TO CONTROL AREA |
| 262 | 011 | 006 | . | #MISB | 0AA | BROADCAST TO ALL CU'S ON A LIN |
| 263 | 011 | 007 | . | #EMPTY | 020 | PROCESSOR PRINT |
| 264 | 011 | 008 | . | #EMPTY | 020 | DISPLAY PRINT |
| 265 | 011 | 009 | . | #EMPTY | 020 | BROADCAST TO ROP'S |
| 266 | 011 | 00A | . | #EMPTY | 020 | PROCESSOR'S DELAYED REPLY |

| NO. | PU | PL | LABEL | MNEMONIC | CODE | COMMENTS |
|---|---|---|---|---|---|---|
| 267 | 011 | 00B | . | #EMPTY | 020 | ACK-REPLY |
| 268 | 011 | 00C | . | #EMPTY | 020 | NO ENTRY |
| 269 | 011 | 00D | . | #EMPTY | 020 | " |
| 270 | 011 | 00E | . | #EMPTY | 020 | " |
| 271 | 011 | 00F | . | #EMPTY | 020 | " |
| 272 | 011 | 010 | . | #EMPTY | 020 | " |
| 273 | 011 | 011 | . | #EMPTY | 020 | " |
| 274 | 011 | 012 | . | #EMPTY | 020 | " |
| 275 | 011 | 013 | . | #EMPTY | 020 | " |
| 276 | 011 | 014 | . | #EMPTY | 020 | " |
| 277 | 011 | 015 | . | #EMPTY | 020 | " |
| 278 | 011 | 016 | . | #EMPTY | 020 | " |
| 279 | 011 | 017 | . | #EMPTY | 020 | " |
| 280 | 011 | 018 | . | #EMPTY | 020 | " |
| 281 | 011 | 019 | . | #EMPTY | 020 | " |
| 282 | 011 | 01A | . | #EMPTY | 020 | " |
| 283 | 011 | 01B | . | #JUPSM | 000 | S MEMORY UPDATE |
| 284 | 011 | 01C | . | #EMPTY | 020 | NO ENTRY |
| 285 | 011 | 01D | . | #EMPTY | 020 | " |
| 286 | 011 | 01E | . | #EMPTY | 020 | RESERVED FOR BOOTSTRAP |
| 287 | 011 | 01F | . | #EMPTY | 020 | NO ENTRY |

**

* LEVEL 3 IJA  "WAIT"     MAU-PORT MDL-CHAR

| 288 | 011 | 020 | EMPTY | ENTRM* | 3A4 | INITIALIZE BACKGROUND |
|---|---|---|---|---|---|---|
| 289 | 011 | 021 | . | @041 | 041 | |
| 290 | 011 | 022 | . | #WAIT | 024 | |
| 291 | 011 | 023 | . | RL(A) | A51 | INHIBIT SIX TEST |
| 292 | 011 | 024 | WAIT | TPAT* | 3DA | STX CODE IN A |
| 293 | 011 | 025 | . | @002 | 002 | |
| 294 | 011 | 026 | . | #HKSTX | 02B | |
| 295 | 011 | 027 | . | NOP | 800 | |
| 296 | 011 | 028 | NEXT1 | JMPO | 386 | ELSE JUMP TO GET NEXT CHAR |
| 297 | 011 | 029 | . | @012 | 012 | |
| 298 | 011 | 02A | . | #GET | 097 | |

* CHARACTER = STX --- SET UP LEVEL 3 IJA ACCORDING TO FI CHARACTER

| 299 | 011 | 02B | HKSTX | READC* | 3C7 | READ FI CHAR |
|---|---|---|---|---|---|---|
| 300 | 011 | 02C | . | @05A | 05A | |
| 301 | 011 | 02D | . | X(G)(MAU) | 824 | SAVE PORT ADD |
| 302 | 011 | 02E | . | X(MAU)(PU) | 848 | SECTOR ADD IN MAU |
| 303 | 011 | 02F | . | X(MAL)(MDL) | 835 | SET UP LOWER ADD |
| 304 | 011 | 030 | . | R7(MAL) | B63 | " |
| 305 | 011 | 031 | . | R6(MAL) | B53 | " |
| 306 | 011 | 032 | . | READS | 3BB | READ LOOK-UP TABLE |
| 307 | 011 | 033 | . | X(MAU)(G) | 842 | RESTORE PORT ADD |
| 308 | 011 | 034 | . | WRTC* | 3CA | SET LEVEL 3 IJA |
| 309 | 011 | 035 | . | @041 | 041 | ACCORDING TO FI CHAR |

* UPDATE A1 TABLE POINTERS

| 310 | 011 | 036 | TBLUP | READC* | 3C7 | READ CURRENT LOCATION |
|---|---|---|---|---|---|---|
| 311 | 011 | 037 | . | @06F | 06F | |
| 312 | 011 | 038 | . | DECR(MDL) | AF5 | LAST VALID LOCATION |
| 313 | 011 | 039 | . | TR5(MDL) | CC5 | TEST FOR LEGITIMATE POINTER |
| 314 | 011 | 03A | . | #+4 | 03D | VALUE |
| 315 | 011 | 03B | . | WRTC* | 3CA | STORE END OF TABLE POSITION |
| 316 | 011 | 03C | . | @06E | 06E | |
| 317 | 011 | 03D | . | ENTRM* | 3A4 | RESET POINTER |
| 318 | 011 | 03E | . | @06F | 06F | |
| 319 | 011 | 03F | . | @070 | 070 | |
| 320 | 011 | 040 | . | JMPI* | 37E | JUMP TO LEVEL 3 IJA |
| 321 | 011 | 041 | . | @040 | 040 | A-STX MAU-PORT |

| NO. | PU | PL | LABEL | MNEMONIC | CODE | COMMENTS |
|---|---|---|---|---|---|---|

* LEVEL 3 IJA PROGRAMS -- REPLY & BROADCASTS
* MIS REPLY     MAU-PORT  A-CHAR

| NO. | PU | PL | LABEL | MNEMONIC | CODE | COMMENTS |
|---|---|---|---|---|---|---|
| 322 | 011 | 042 | MISR | X(MDL)(UA) | 85A | HK-STATUS CODE IN MDL |
| 323 | 011 | 043 | . | @0D2 | 0D2 | (11010010) |
| 324 | 011 | 044 | MISR1 | RL(G) | A52 | SET UP BACKGND STATUS |
| 325 | 011 | 045 | . | S4(G) | BB2 | |
| 326 | 011 | 046 | MISR2 | COMPR | 3D2 | TEST FOR CONTROL CHAR'S |
| 327 | 011 | 047 | . | @002 | 002 | TEST FOR STX |
| 328 | 011 | 048 | . | #MISR3 | 092 | |
| 329 | 011 | 049 | . | @003 | 003 | TEST FOR ETX |
| 330 | 011 | 04A | . | #MISR4 | 059 | |
| 331 | 011 | 04B | . | @018 | 018 | TEST FOR CAN |
| 332 | 011 | 04C | . | #MERR | 087 | |
| 333 | 011 | 04D | . | @01B | 01B | HPC ERROR |
| 334 | 011 | 04E | . | #MERR | 087 | |
| 335 | 011 | 04F | . | @01E | 01E | VP ERROR IN HEADING |
| 336 | 011 | 050 | . | #MERR | 087 | |
| 337 | 011 | 051 | . | @0FF | 0FF | |
| 338 | 011 | 052 | . | #+2 | 053 | |
| 339 | 011 | 053 | . | LDG* | 356 | LOAD CURRENT STATUS WD. |
| 340 | 011 | 054 | . | @05F | 05F | |
| 341 | 011 | 055 | . | JMPI* | 37E | JUMP TO LEVEL 4 IJA |
| 342 | 011 | 056 | . | @060 | 060 | |

**

* PORT HOUSEKEEPING --- ETX CHARACTER ROUTINE
* UPDATE HOUSE-KEEPING STATUS CHARACTER

| NO. | PU | PL | LABEL | MNEMONIC | CODE | COMMENTS |
|---|---|---|---|---|---|---|
| 343 | 011 | 057 | . | NOP | 800 | |
| 344 | 011 | 058 | . | NOP | 800 | |
| 345 | 011 | 059 | MISR4 | X(G)(MDL) | 825 | ETX PROGRAM |

* CHECK FOR ACK

| NO. | PU | PL | LABEL | MNEMONIC | CODE | COMMENTS |
|---|---|---|---|---|---|---|
| 346 | 011 | 05A | . | READC* | 3C7 | READ FI CHARACTER |
| 347 | 011 | 05B | . | @05A | 05A | |
| 348 | 011 | 05C | . | TR6(MDL) | CD5 | JUMP UNLESS ACK REQUIRED |
| 349 | 011 | 05D | . | #MISR6 | 069 | |

* STORE A1 IN ACK BUFFER

| NO. | PU | PL | LABEL | MNEMONIC | CODE | COMMENTS |
|---|---|---|---|---|---|---|
| 350 | 011 | 05E | . | READC* | 3C7 | |
| 351 | 011 | 05F | . | @06D | 06D | |
| 352 | 011 | 060 | . | X(MDU)(MDL) | 865 | |
| 353 | 011 | 061 | . | SHFTL(MDJ) | AB6 | |
| 354 | 011 | 062 | . | READC* | 3C7 | |
| 355 | 011 | 063 | . | @02B | 02B | |
| 356 | 011 | 064 | . | TRL(MDL) | C35 | |
| 357 | 011 | 065 | . | #+3 | 067 | |
| 358 | 011 | 066 | . | DECR(MAL) | AF3 | |
| 359 | 011 | 067 | . | WRTCU | 34D | |
| 360 | 011 | 068 | . | NOP | 800 | |

* RESET TIMER IF REPLY

| NO. | PU | PL | LABEL | MNEMONIC | CODE | COMMENTS |
|---|---|---|---|---|---|---|
| 361 | 011 | 069 | MISR6 | R8(G) | B72 | RESET STX BIT |
| 362 | 011 | 06A | . | TR2(G) | C92 | JUMP UNLESS REPLY |
| 363 | 011 | 06B | . | #MISR7 | 071 | |
| 364 | 011 | 06C | . | RL(MDL) | A55 | |
| 365 | 011 | 06D | . | WRTC* | 3CA | RESET TIMER (UPPER LIMIT) |
| 366 | 011 | 06E | . | @006 | 006 | |
| 367 | 011 | 06F | . | WRTC* | 3CA | RESET XMITED A1 CHAR |
| 368 | 011 | 070 | . | @01B | 01B | |

| NO. | PU | PL | LABEL | MNEMONIC | CODE | COMMENTS |
|---|---|---|---|---|---|---|

* CHANGE LEVEL 3 IJA TO "WAIT"

| NO. | PU | PL | LABEL | MNEMONIC | CODE | COMMENTS |
|---|---|---|---|---|---|---|
| 369 | 011 | 071 | MISR7 | ENTRM* | 3A4 | |
| 370 | 011 | 072 | . | @041 | 041 | |
| 371 | 011 | 073 | . | #WAIT | 024 | |

* TEST FOR SPECIAL PROGRAM VS. REPLY-BROADCAST PROGRAM

| NO. | PU | PL | LABEL | MNEMONIC | CODE | COMMENTS |
|---|---|---|---|---|---|---|
| 372 | 011 | 074 | . | NOP | 800 | |
| 373 | 011 | 075 | . | NOP | 800 | |
| 374 | 011 | 076 | . | TRL(A) | C31 | JUMP IF ETX CAME FROM |
| 375 | 011 | 077 | . | #NEXT1 | 028 | SPECIAL PROGRAM |
| 376 | 011 | 078 | . | X(MDU)(G) | 862 | SWITCH STATUS CHAR'S AROUND |
| 377 | 011 | 079 | . | LDG* | 356 | |
| 378 | 011 | 07A | . | @05F | 05F | |
| 379 | 011 | 07B | . | X(MDL)(MDU) | 856 | |

* G = BACKGROUND STATUS      MDL = HOUSEKEEPING STATUS

| NO. | PU | PL | LABEL | MNEMONIC | CODE | COMMENTS |
|---|---|---|---|---|---|---|
| 380 | 011 | 07C | . | R6(MDL) | B55 | RESET STORE QSA BIT |
| 381 | 011 | 07D | . | TR2(G) | C92 | JUMP IF DC2 NOT RCVD |
| 382 | 011 | 07E | . | #+5 | 082 | |
| 383 | 011 | 07F | . | TS1(G) | D82 | JUMP IF DC1 OR 4 RECVD |
| 384 | 011 | 080 | . | #+3 | 082 | |
| 385 | 011 | 081 | . | S6(MDL) | BD5 | |
| 386 | 011 | 082 | . | WRTC* | 3CA | STORE HK-STATUS |
| 387 | 011 | 083 | . | @069 | 069 | |
| 388 | 011 | 084 | . | JMP0 | 386 | JUMP INTO BCKGND LOOP |
| 389 | 011 | 085 | . | @012 | 012 | |
| 390 | 011 | 086 | . | #LNORM + 1 | 021 | |

* PORT HOUSEKEEPING --- CAN CHARACTER ROUTINE
* PARITY ERROR -- CANCLE MESSAGE

| NO. | PU | PL | LABEL | MNEMONIC | CODE | COMMENTS |
|---|---|---|---|---|---|---|
| 391 | 011 | 087 | MERR | X(G)(MDL) | 82 | MDL=OD2 |
| 392 | 011 | 088 | . | READC* | 3C7 | READ BKGND STATUS |
| 393 | 011 | 089 | . | @05F | 05F | |
| 394 | 011 | 08A | . | TS1(MDL) | D85 | DC1-DC4 RCVD? |
| 395 | 011 | 08B | . | #+3 | 08D | |
| 396 | 011 | 08C | . | R5(G) | B42 | |
| 397 | 011 | 08D | . | R7(G) | B62 | RESET ETX BIT |
| 398 | 011 | 08E | . | NOP | 800 | |
| 399 | 011 | 08F | . | NOP | 800 | |
| 400 | 011 | 090 | . | JMP | 9D1 | |
| 401 | 011 | 091 | . | #MISR6 | 069 | |

**

* PORT HOUSEKEEPING --- STX CHARACTER ROUTINE

| NO. | PU | PL | LABEL | MNEMONIC | CODE | COMMENTS |
|---|---|---|---|---|---|---|
| 402 | 011 | 092 | MISR3 | WRTC* | 3CA | STORE HOUSEKEEPING STATUS |
| 403 | 011 | 093 | . | @069 | 069 | |
| 404 | 011 | 094 | . | TR2(MDL) | C95 | JUMP UNLESS REPLY |
| 405 | 011 | 095 | . | #MISR8 | 0A3 | |

* COMPARE A1 CHARACTERS -- DISCARD MESSAGE IF THEY DON'T AGREE

| NO. | PU | PL | LABEL | MNEMONIC | CODE | COMMENTS |
|---|---|---|---|---|---|---|
| 406 | 011 | 096 | . | LDA* | 326 | RECVD A1 INTO A |
| 407 | 011 | 097 | . | @070 | 070 | |
| 408 | 011 | 098 | . | SUBM* | 36E | SUBTRACT XMITED A1 |
| 409 | 011 | 099 | . | @01B | 01B | |
| 410 | 011 | 09A | . | TSY(A) | D31 | |
| 411 | 011 | 09B | . | #EMPTY | 020 | |
| 412 | 011 | 09C | . | NOP | 800 | |
| 413 | 011 | 09D | . | NOP | 800 | |

```
NO.  PU  PL   LABEL MNEMONIC        CODE   COMMENTS
* A1'S AGREE -- SET A1 TABLE POINTERS FOR 1 IO ONLY 414 011  09E   •     ENTRM•         3A4
 415 011  09F   •     @06E           06E
 416 011  0A0   •     @070           070
 417 011  0A1   •     X(A)(UA)       81A   STX CODE BACK INTO A
 418 011  0A2   •     @002           002
 419 011  0A3   MISR8 JMPO           386   JUMP TO TEXT LOADING PROG.
 420 011  0A4   •     @012           012
 421 011  0A5   •     #LNORM + 1     021
```

**

* STATUS CHARACTERS FOR OTHER MESSAGES
* QUOTE REPLY

```
 422 011  0A6   QUOTR X(MDL)(UA)     85A   HK-STATUS INTO MDL
 423 011  0A7   •     @0C3           0C3
 424 011  0A8   •     JMP            9D1
 425 011  0A9   •     #MISR1         044
```

* MIS BROADCAST

```
 426 011  0AA   MISB  X(MDL)(UA)     85A   HK-STATUS
 427 011  0AB   •     @0C0           0C0
 428 011  0AC   MISB1 RL(G)          A52   RESET BCKGND STATUS
 429 011  0AD   •     JMP            9D1
 430 011  0AE   •     #MISR2         046
```

* QUOTE BROADCAST

```
 431 011  0AF   QUOTB X(MDL)(UA)     85A   HK-STATUS
 432 011  0B0   •     @0C1           0C1
 433 011  0B1   •     RL(G)          A52   RESET BACKGROUND STATUS CHAR
 434 011  0B2   •     JMP            9D1
 435 011  0B3   •     #MISR2         046
```

* ACKING REPLY -- PROCESSOR DELAYING REPLY

```
 436 011  0B4   ACKRP X(MDL)(UA)     85A
 437 011  0B5   •     @0DA           0DA
 438 011  0B6   •     JMP            9D1
 439 011  0B7   •     #MISR1         044
```

* PROCESSOR'S DELAYED REPLY

```
 440 011  0B8   PRPY  X(MDL)(UA)     85A
 441 011  0B9   •     @0C8           0C8
 442 011  0BA   •     RL(G)          A52
 443 011  0BB   •     JMP            9D1
 444 011  0BC   •     #MISR2         046
 445 011  0BD   •     NOP            800
 446 011  0BE   •     NOP            800
 447 011  0BF   •     NOP            800
 448 011  0C0   •     NOP            800
 449 011  0C1   •     NOP            800
 450 011  0C2   •     NOP            800
 451 011  0C3   •     NOP            800
 452 011  0C4   •     NOP            800
 453 011  0C5   •     NOP            800
 454 011  0C6   •     NOP            800
 455 011  0C7   •     NOP            800
 456 011  0C8   •     NOP            800
 457 011  0C9   •     NOP            800
 458 011  0CA   •     NOP            800
 459 011  0CB   •     NOP            800
```

| NO. | PU | PL | LABEL | MNEMONIC | CODE | COMMENTS |
|---|---|---|---|---|---|---|

* LEVEL 3 IJA "OVERFLOW"   MAU=PORT  A=CHAR
* EM IS AT LAST DISPLAY POS - ANY CHAR BUT DC4 OR ETX OR
*     US WILL CAUSE OVERFLOW CONDITION.

```
460 011  OCC   OVERF COMPR          3D2   TEST FOR CONT CHAR'S
461 011  OCD     •   @014           014       TEST FOR DC4
462 011  OCE     •   #OVER3         0DD
463 011  OCF     •   @003           003       TEST FOR ETX
464 011  OD0     •   #OVER3         0DD
465 011  OD1     •   @01F           01F       TEST FOR US
466 011  OD2     •   #OVER3         0DD
467 011  OD3     •   @0FF           0FF   MACRO END
468 011  OD4     •   #+2            0D5
469 011  OD5     •   NOP            800
470 011  OD6     •   NOP            800
471 011  OD7     •   NOP            800
472 011  OD8     •   NOP            800
473 011  OD9     •   NOP            800
474 011  ODA     •   NOP            800
```

* SUBSTITUTE CAN CHAR (OVERFLOW INDICATION)

```
475 011  ODB     •   X(A)(UA)       81A
476 011  ODC     •   @018           018
```

* RESTORE OLD LEVEL 3 IJA

```
477 011  ODD   OVER3 READC*         3C7
478 011  ODE     •   @06C           06C
479 011  ODF     •   WRTC*          3CA
480 011  OE0     •   @041           041
```

* RESET A1 TABLE POINTERS

```
481 011  OE1   OVER4 ENTRM*         3A4
482 011  OE2     •   @06F           06F
483 011  OE3     •   @070           070
```

* JUMP THROUGH LEVEL 3 IJA

```
484 011  OE4     •   JMPI*          37E
485 011  OE5     •   @040           040
486 011  OE6     •   NOP            800
487 011  OE7     •   NOP            800
488 011  OE8     •   NOP            800
489 011  OE9     •   NOP            800
490 011  OEA     •   NOP            800
491 011  OEB     •   NOP            800
492 011  OEC     •   NOP            800
493 011  OED     •   NOP            800
494 011  OEE     •   NOP            800
495 011  OEF     •   NOP            800
496 011  OF0     •   NOP            800
497 011  OF1     •   NOP            800
498 011  OF2     •   NOP            800
499 011  OF3     •   NOP            800
500 011  OF4     •   NOP            800
501 011  OF5     •   NOP            800
502 011  OF6     •   NOP            800
503 011  OF7     •   NOP            800
504 011  OF8     •   NOP            800
505 011  OF9     •   NOP            800
506 011  OFA     •   NOP            800
```

| NO. | PU | PL | LABEL | MNEMONIC | CODE | COMMENTS |
|---|---|---|---|---|---|---|
| 507 | 011 | 0FB | . | NOP | 800 | |
| 508 | 011 | 0FC | . | NOP | 800 | |
| 509 | 011 | 0FD | . | NOP | 800 | |
| 510 | 011 | 0FE | . | NOP | 800 | |
| 511 | 011 | 0FF | . | NOP | 800 | |

**

* RECEIVE BACKGROUND -- CONTROL CHARACTER LOOK-UP TABLE

| NO. | PU | PL | LABEL | MNEMONIC | CODE | COMMENTS |
|---|---|---|---|---|---|---|
| 512 | 012 | 000 | . | #DISPY | 0DA | NULL |
| 513 | 012 | 001 | . | #DISPY | 0DA | SOH |
| 514 | 012 | 002 | . | @100 | 100 | STX |
| 515 | 012 | 003 | . | @100 | 100 | ETX |
| 516 | 012 | 004 | . | #DISPY | 0DA | EOT |
| 517 | 012 | 005 | . | #DISPY | 0DA | ENQ |
| 518 | 012 | 006 | . | #DISPY | 0DA | ACK |
| 519 | 012 | 007 | . | #DISPY | 0DA | BELL |
| 520 | 012 | 008 | . | #DISPY | 0DA | BS |
| 521 | 012 | 009 | . | #TAB | 0B0 | HT |
| 522 | 012 | 00A | . | #DISPY | 0DA | LF |
| 523 | 012 | 00B | . | #DISPY | 0DA | VT |
| 524 | 012 | 00C | . | #DISPY | 0DA | FF |
| 525 | 012 | 00D | . | #DISPY | 0DA | CR |
| 526 | 012 | 00E | . | #SO | 0B9 | SO |
| 527 | 012 | 00F | . | #SI | 0BC | SI |
| 528 | 012 | 010 | . | #DLE | 0E2 | DLE |
| 529 | 012 | 011 | . | #DC1 | 0A6 | DC1 |
| 530 | 012 | 012 | . | #DISPY | 0DA | DC2 |
| 531 | 012 | 013 | . | @1B8 | 1B8 | DC3 |
| 532 | 012 | 014 | . | #DC4 | 0C5 | DC4 |
| 533 | 012 | 015 | . | #DISPY | 0DA | NAK |
| 534 | 012 | 016 | . | #DISPY | 0DA | SYN |
| 535 | 012 | 017 | . | #DISPY | 0DA | ETB |
| 536 | 012 | 018 | . | @100 | 100 | CAN |
| 537 | 012 | 019 | . | @1C6 | 1C6 | EM |
| 538 | 012 | 01A | . | #DISPY | 0DA | SUB |
| 539 | 012 | 01B | . | @399 | 399 | ESC  HPC OR  ...LASH E |
| 540 | 012 | 01C | . | #DISPY | 0DA | FS |
| 541 | 012 | 01D | . | #DISPY | 0DA | GS |
| 542 | 012 | 01E | . | @3A7 | 3A7 | RS   HEADING    LASH C |
| 543 | 012 | 01F | . | @164 | 164 | US |

**

* BASIC TEXT PROGRAM
* CHANGE LEVEL 4 IJA TO "NORM"

| NO. | PU | PL | LABEL | MNEMONIC | CODE | COMMENTS |
|---|---|---|---|---|---|---|
| 544 | 012 | 020 | LNORM | X(A)(MDU) | 816 | RESTORE CHAR TO A |
| 545 | 012 | 021 | . | ENTRM* | 3A4 | LOAD PL-COUNT (NORM) |
| 546 | 012 | 022 | . | @061 | 061 | |
| 547 | 012 | 023 | . | #NORM | 024 | |

* LEVEL 4 IJA --- "NORM"    A-CHAR  G-STAT  MAU-PORT

| NO. | PU | PL | LABEL | MNEMONIC | CODE | COMMENTS |
|---|---|---|---|---|---|---|
| 548 | 012 | 024 | NORM | S8(G) | BF2 | SET 1-ST RUN BIT |
| 549 | 012 | 025 | . | S6(G) | BD2 | SET CONT CHAR BI |
| 550 | 012 | 026 | . | TS7(A) | DE1 | JUMP IF CONT CHA.. |
| 551 | 012 | 027 | . | #ALPHA | 02A | |
| 552 | 012 | 028 | . | TR6(A) | CD1 | |
| 553 | 012 | 029 | . | #CSTOR | 02C | |

*

| 554 | 012 | 02A | ALPHA | R6(G) | B52 | RESET CONT CHAR BIT |

| NO. | PU | PL | LABEL | MNEMONIC | CODE | COMMENTS |
|---|---|---|---|---|---|---|

* STORE 2-ND CHARACTER

| 555 | 012 | 02B | • | NOP | 800 | |
| 556 | 012 | 02C | CSTOR | X(MDU)(A) | 661 | STORE CHARACTER |
| 557 | 012 | 02D | • | WRT* | 3BF | SECOND CHAR (  R) IN MDL |
| 558 | 012 | 02E | • | @06A | 06A | |
| 559 | 012 | 02F | • | .JMP | 9D1 | JMP TO PROCESS    LOOP |
| 560 | 012 | 030 | • | #STORE | 04F | |

**\*\***

**\* TEST SO MODE**

| 561 | 012 | 031 | BIT8 | TR3(G) | CA2 | JUMP UNLESS SO |
| 562 | 012 | 032 | • | #+3 | 034 | |
| 563 | 012 | 033 | • | S8(A) | BF1 | SET FIXED FIELD    |

**\* STORE CHARACTER**

| 564 | 012 | 034 | LOAD | LOCEM | 200 | SET UP MAL |
| 565 | 012 | 035 | • | SWAP | 3A0 | CHAR IN G - STA    A |
| 566 | 012 | 036 | • | LOAD | 204 | STORE CHAR - ON    BIT |
| 567 | 012 | 037 | • | X(G)(A) | 821 | |

**\* ADVANCE ENTRY MARKER - TEST FOR OVERFLOW**

| 568 | 012 | 038 | ADV | ADVNCE | 264 | |
| 569 | 012 | 039 | • | SEM2 | 2C5 | |
| 570 | 012 | 03A | • | TSL(A) | D41 | JUMP IF OVERFLOW |
| 571 | 012 | 03B | • | #OVER1 | 0E7 | |

**\* TEST UPDATE BIT - UPDATE DISPLAY EM**

| 572 | 012 | 03C | UPDAT | X(A)(MAU) | 814 | SAVE SEG ADD     |
| 573 | 012 | 03D | • | NOP | 800 | |
| 574 | 012 | 03E | • | NOP | 800 | |
| 575 | 012 | 03F | • | NOP | 800 | |

**\* UPDATA TABLE IN PORT CONTROL AREA**

| 576 | 012 | 040 | TABLE | PORTAD | 3DD | LOOK UP PORT     |
| 577 | 012 | 041 | • | LDG* | 356 | READ STATUS |
| 578 | 012 | 042 | • | @05F | 05F | |

**\* UPDATE CURRENT ADDRESS - JUMP IF AT TABLE END**

| 579 | 012 | 043 | STA | STAIC* | 349 | STORE UPDATE    RESS |
| 580 | 012 | 044 | • | @06F | 06F | |
| 581 | 012 | 045 | • | JMP | 9D1 | |
| 582 | 012 | 046 | • | #END | 087 | |
| 583 | 012 | 047 | • | @06E | 06E | |
| 584 | 012 | 048 | • | CMPR(MDU) | 9D6 | JUMP IF TABLE    ED |
| 585 | 012 | 049 | • | #END | 087 | |
| 586 | 012 | 04A | INCRM | INCRM* | 372 | INCREMENT PO  |
| 587 | 012 | 04B | • | @06F | 06F | IN (01101  |
| 588 | 012 | 04C | • | TS8(MDL) | DF5 | |
| 589 | 012 | 04D | • | #END | 087 | |

**\* READ STATUS WORD & RESET FIRST RUN BIT**

| 590 | 012 | 04E | RSET8 | R8(G) | B72 | RESET FIRST . |
| 591 | 012 | 04F | STORE | STG* | 35F | STORE UPDATED STATUS |
| 592 | 012 | 050 | • | @05F | 05F | IN (01011111) |

```
NO.  PU  PL   LABEL MNEMONIC          CODE   COMMENTS
* READ NEXT ADDRESS INTO MAU -- CHAR INTO A 593 012  051   ADD   LDA*            326
  594 012  052    •    @070            070
  595 012  053    •    TRL(A)          C31    JUMP IF DUMMY ENT...
  596 012  054    •    #STA + 2        045
  597 012  055    •    READC*          3C7    READ CHAR INTO ML..
  598 012  056    •    @06A            06A
  599 012  057    •    X(MAU)(A)       841    DIS ADD INTO MAU
  600 012  058    •    X(A)(MDL)       815    CHAR INTO A

* DETECT ESCAPE OR CONTROL CHARACTERS 601 012  059   TEST7  TS7(G)         DE2    JUMP IF ESCAPE ?
  602 012  05A    •     #ESCPE         000           TO ESCAPE ..
  603 012  05B   TEST6  TR6(G)         CD2    JUMP IF ALPHA
  604 012  05C    •     #BIT8          031           TO LOAD

**          CONTINUE IN CONTROL CHARACTER PROGRAM

* PROGRAM TO LOOK UP CONTROL CHARACTERS 605 012  05D    •    X(MAL)(A)       831    "
  606 012  05E    •    X(A)(MAU)       814    SAVE BASE SE..
  607 012  05F    •    X(MAU)(PU)      848
  608 012  060    •    READS           3BB    READ CONT CH..
  609 012  061    •    X(MAU)(A)       841    RESTORE DISP..
  610 012  062    •    X(A)(UA)        81A
  611 012  063    •    @012            012
  612 012  064    •    ADD(MDU)        956    MDU = SECTOR..
  613 012  065    •    X(MDU)(A)       861    MDL = ADDR ...
  614 012  066    •    X(A)(MAU)       814
  615 012  067    •    P-MD            380    JUMP TO CONT.    PROG

**

* LEVEL 4 IJA --- "FRAC"
*
* TEST IF CHARACTER = 0 - 9

616 012  068   FRAC  X(MDU)(A)       861    SAVE CHARACTER IN MDU
  617 012  069    •    TR4(A)          CB1    SET UP FOR TEST
  618 012  06A    •    #+4             06D
  619 012  06B    •    DECR(A)         AF1    SHIFT 8-9 INTO ...
  620 012  06C    •    DECR(A)         AF1
  621 012  06D    •    AND(UA)         9FA    MASK (01111000)
  622 012  06E    •    @078            078
  623 012  06F    •    XOR(UA)         9AA    TEST FOR (X0110X..)
  624 012  070    •    @030            030
  625 012  071    •    TSY(A)          D31    JUMP UNLESS 0-9
  626 012  072    •    #LNORM          020    END OF FRAC MODE

* CHARACTER IS 0-9 NUMERIC 627 012  073    •    R6(MDU)         B56    SWITCH TO SMALL NUM.
  628 012  074    •    JMP             9D1
  629 012  075    •    #CSTOR + 1      02D

**
* ROUTINE FOR INPUTTING A 2-ND OR 3-RD CHARACTER ASSOCIATED WITH
*    A CONTROL CHARACTER.
*
* LEVEL 4 IJA --- "US1"

630 012  076   US1   STA*            33C    STORE 1-ST CHAR
  631 012  077    •    @068            068
```

| NO. | PU | PL | LABEL | MNEMONIC | CODE | COMMENTS |
|---|---|---|---|---|---|---|
| 632 | 012 | 078 | . | TS7(A) | DE1 | JUMP UNLESS 2-ND CHAR |
| 633 | 012 | 079 | . | #SET6 | 081 | |
| 634 | 012 | 07A | . | ENTRM* | 3A4 | "US2" INTO LEVEL 4 IJA |
| 635 | 012 | 07B | . | @061 | 061 | |
| 636 | 012 | 07C | . | #US2 | 07F | |
| 637 | 012 | 07D | . | JMP | 9D1 | |
| 638 | 012 | 07E | . | #NEXTC + 1 | 094 | |

* LEVEL 4 IJA --- "US2"
*

| 639 | 012 | 07F | US2 | STA* | 33C | STORE 2-ND CHAR |
|---|---|---|---|---|---|---|
| 640 | 012 | 080 | . | @069 | 069 | |
| 641 | 012 | 081 | SET6 | S6(G) | BD2 | SET CONT CHAR BIT |
| 642 | 012 | 082 | . | ENTRM* | 3A4 | "NORM" INTO LEVEL 4 IJA |
| 643 | 012 | 083 | . | @061 | 061 | |
| 644 | 012 | 084 | . | #NORM | 024 | |
| 645 | 012 | 085 | . | JMP | 9D1 | |
| 646 | 012 | 086 | . | #RSET8 | 04E | |

**

* END OF ADDRESSES PROGRAM

| 647 | 012 | 087 | END | ENTRM* | 3A4 | RESET POINTER |
|---|---|---|---|---|---|---|
| 648 | 012 | 088 | . | @06F | 06F | |
| 649 | 012 | 089 | . | @070 | 070 | |
| 650 | 012 | 08A | . | TR5(G) | CC2 | JUMP UNLESS ... AR |
| 651 | 012 | 08B | . | #NEXTC + 1 | 094 | |

* SECOND CHARACTER TO PROCESS

| 652 | 012 | 08C | . | R5(G) | B42 | RESET 2-ND C |
|---|---|---|---|---|---|---|
| 653 | 012 | 08D | . | READC* | 3C7 | REPOSITION 2 |
| 654 | 012 | 08E | . | @06B | 06B | |
| 655 | 012 | 08F | . | WRTC* | 3CA | |
| 656 | 012 | 090 | . | @06A | 06A | |

* JUMP TO STORE STATUS

| 657 | 012 | 091 | . | JMP | 9D1 | |
|---|---|---|---|---|---|---|
| 658 | 012 | 092 | . | #STORE | 04F | |

**

* GO BACK FOR NEXT CHARACTER

| 659 | 012 | 093 | NEXTC | PORTAD | 3DD | LOOK UP PORT ADD |
|---|---|---|---|---|---|---|
| 660 | 012 | 094 | . | R7(G) | B62 | RESET ESCAPE BIT |
| 661 | 012 | 095 | . | STG* | 35F | STORE CURRENT STATUS |
| 662 | 012 | 096 | . | @05F | 05F | |

* READ NEXT CHARACTER

| 663 | 012 | 097 | GET | BFRSUB | 191 | BUFFER SUBROUTINE |
|---|---|---|---|---|---|---|
| 664 | 012 | 098 | . | @000 | 000 | |
| 665 | 012 | 099 | . | @00B | 00B | |
| 666 | 012 | 09A | . | TS6(G) | DD2 | JUMP IF NO MORE CHAR |
| 667 | 012 | 09B | . | #OUT | 09E | |
| 668 | 012 | 09C | . | JMPI* | 37E | ELSE JUMP THROUGH LEVEL 3 IJA |
| 669 | 012 | 09D | . | @040 | 040 | |
| 670 | 012 | 09E | OUT | JMPO | 386 | |
| 671 | 012 | 09F | . | @000 | 000 | |
| 672 | 012 | 0A0 | . | @003 | 008 | |

**

| NO. | PU | PL | LABEL | MNEMONIC | CODE | COMMENTS |
|---|---|---|---|---|---|---|

* PROGRAM TO HANDLE FRAC CHARACTER

| 673 | 012 | 0A1 | FRAC1 | ENTRM* | 3A4 | CHANGE LEVEL 4 IJR TO "FRAC" |
| 674 | 012 | 0A2 | . | @061 | 061 | |
| 675 | 012 | 0A3 | . | #FRAC | 068 | |
| 676 | 012 | 0A4 | . | JMP | 9D1 | |
| 677 | 012 | 0A5 | . | #NEXTC | 093 | |

* PROGRAM TO HANDLE DC1 CHARACTER

| 678 | 012 | 0A6 | DC1 | HOME | 24E | |
| 679 | 012 | 0A7 | . | READC* | 3C7 | |
| 680 | 012 | 0A8 | . | @003 | 003 | |
| 681 | 012 | 0A9 | . | TS6(MDL) | DD5 | |
| 682 | 012 | 0AA | . | #+3 | 0AC | |
| 683 | 012 | 0AB | . | DECR(MAU) | AF4 | |
| 684 | 012 | 0AC | . | HOME | 24E | |
| 685 | 012 | 0AD | . | TCLEAR | 23D | |
| 686 | 012 | 0AE | . | JMP | 9D1 | |
| 687 | 012 | 0AF | . | #DC4 | 0C5 | |

**

* TAB PROGRAM

| 688 | 012 | 0B0 | TAB | LOCEM | 200 | TAB EDITING FUNCTION |
| 689 | 012 | 0B1 | . | TAB | 2AC | |
| 690 | 012 | 0B2 | . | X(A)(MAU) | 814 | |
| 691 | 012 | 0B3 | . | POR1AD | 3DD | |
| 692 | 012 | 0B4 | . | LDG* | 356 | REREAD STATUS INTO G |
| 693 | 012 | 0B5 | . | @05F | 05F | |
| 694 | 012 | 0B6 | . | X(MAU)(A) | 841 | SEGMENT ADDR INTO MAU |
| 695 | 012 | 0B7 | . | JMP | 9D1 | |
| 696 | 012 | 0B8 | . | #UPDAT + 1 | 03D | |

* SO PROGRAM

| 697 | 012 | 0B9 | SO | S3(G) | BA2 | SET SO BIT IN STATUS |
| 698 | 012 | 0BA | . | JMP | 9D1 | |
| 699 | 012 | 0BB | . | #NEXTC | 093 | |

* SI PROGRAM

| 700 | 012 | 0BC | SI | LOCEM | 200 | SET 8TH BIT OF DISPLAY CHAR |
| 701 | 012 | 0BD | . | READC | E00 | |
| 702 | 012 | 0BE | . | S8(MDL) | BF5 | |
| 703 | 012 | 0BF | . | WR1C | 3CB | |
| 704 | 012 | 0C0 | . | R3(G) | B22 | RESET SO BIT IN STATUS |
| 705 | 012 | 0C1 | . | X(A)(MAU) | 814 | |
| 706 | 012 | 0C2 | . | POR1AD | 3DD | |
| 707 | 012 | 0C3 | . | JMP | 9D1 | |
| 708 | 012 | 0C4 | . | #DC41 | CD2 | |

* DC1 & DC4 PROGRAM

| 709 | 012 | 0C5 | DC4 | HOME | 24E | |
| 710 | 012 | 0C6 | . | READC* | 3C7 | |
| 711 | 012 | 0C7 | . | @003 | 003 | |
| 712 | 012 | 0C8 | . | TS6(MDL) | DD5 | |
| 713 | 012 | 0C9 | . | #+3 | 0CB | |
| 714 | 012 | 0CA | . | DECR(MAU) | AF4 | |
| 715 | 012 | 0CB | . | HOME | 24E | |
| 716 | 012 | 0CC | . | SEM2 | 2C5 | |

| NO. | PU | PL | LABEL | MNEMONIC | CODE | COMMENTS |
|---|---|---|---|---|---|---|
| 717 | 012 | 0CD | . | X(A)(MAU) | 814 | |
| 718 | 012 | 0CE | . | PORTAD | 3DD | |
| 719 | 012 | 0CF | . | LDG* | 356 | |
| 720 | 012 | 0D0 | . | @05F | 05F | |
| 721 | 012 | 0D1 | . | S1(G) | B82 | |
| 722 | 012 | 0D2 | DC41 | STG* | 35F | |
| 723 | 012 | 0D3 | . | @05F | 05F | |
| 724 | 012 | 0D4 | . | X(MAU)(A) | 841 | |
| 725 | 012 | 0D5 | . | JMP | 9D1 | |
| 726 | 012 | 0D6 | . | #UPDAT + 1 | 03D | |

* DC2 PROGRAM (MULTI-MESSAGE)

| 727 | 012 | 0D7 | DC2 | S2(G) | B92 | SET MULTI-MESSAGE BIT |
|---|---|---|---|---|---|---|
| 728 | 012 | 0D8 | . | JMP | 9D1 | |
| 729 | 012 | 0D9 | . | #NEXTC | 093 | |

* PROGRAM TO HANDLE CONTROL CHARACTERS DISPLAYED

| 730 | 012 | 0DA | DISPY | R6(G) | B52 | RESET CONT CHAR BIT |
|---|---|---|---|---|---|---|
| 731 | 012 | 0DB | . | PORTAD | 3DD | |
| 732 | 012 | 0DC | . | JMP | 9D1 | |
| 733 | 012 | 0DD | . | #STORE | 04F | |

* PROGRAM TO HANDLE ESCAPE CHARACTER

| 734 | 012 | 0DE | ESC | S7(G) | BE2 | SET ESCAPE BIT |
|---|---|---|---|---|---|---|
| 735 | 012 | 0DF | . | PORTAD | 3DD | LOOK UP PORT ADD |
| 736 | 012 | 0E0 | . | JMP | 9D1 | JUMP TO END |
| 737 | 012 | 0E1 | . | #NEXTC + 2 | 095 | |

* PROGRAM TO HANDLE DLE -- LINE ERASE

| 738 | 012 | 0E2 | DLE | LOCEM | 200 | TOTAL LINE E... PROGRAM |
|---|---|---|---|---|---|---|
| 739 | 012 | 0E3 | . | LEOL | 20F | END OF LINE |
| 740 | 012 | 0E4 | . | TCLR* | 23E | LINE ERASE |
| 741 | 012 | 0E5 | . | JMP | 9D1 | |
| 742 | 012 | 0E6 | . | #ADV | 038 | |

**

* JUMP TO OVERFLOW PROGRAM

| 743 | 012 | 0E7 | OVER1 | JMPO | 386 | |
|---|---|---|---|---|---|---|
| 744 | 012 | 0E8 | . | @015 | 015 | |
| 745 | 012 | 0E9 | . | #OVER | 000 | |

**

| 746 | 012 | 0EA | . | NOP | 800 |
|---|---|---|---|---|---|
| 747 | 012 | 0EB | . | NOP | 800 |
| 748 | 012 | 0EC | . | NOP | 800 |
| 749 | 012 | 0ED | . | NOP | 800 |
| 750 | 012 | 0EE | . | NOP | 800 |
| 751 | 012 | 0EF | . | NOP | 800 |
| 752 | 012 | 0F0 | . | NOP | 800 |
| 753 | 012 | 0F1 | . | NOP | 800 |
| 754 | 012 | 0F2 | . | NOP | 800 |
| 755 | 012 | 0F3 | . | NOP | 800 |

*

| NO. | PU | PL | LABEL | MNEMONIC | CODE | COMMENTS |
|---|---|---|---|---|---|---|
| 756 | 012 | 0F4 | . | NOP | 800 | |
| 757 | 012 | 0F5 | . | NOP | 800 | |
| 758 | 012 | 0F6 | . | NOP | 800 | |
| 759 | 012 | 0F7 | . | NOP | 800 | |
| 760 | 012 | 0F8 | . | NOP | 800 | |
| 761 | 012 | 0F9 | . | NOP | 800 | |
| 762 | 012 | 0FA | . | NOP | 800 | |
| 763 | 012 | 0FB | . | NOP | 800 | |
| 764 | 012 | 0FC | . | NOP | 800 | |
| 765 | 012 | 0FD | . | NOP | 800 | |
| 766 | 012 | 0FE | . | NOP | 800 | |
| 767 | 012 | 0FF | . | NOP | 800 | |

\*\*

\* HOUSE KEEPING PROGRAM (INDIVIDUAL IO) FOR STX ETX AND C-

| | | | | | | |
|---|---|---|---|---|---|---|
| 768 | 013 | 000 | HOUSE | PORTAD | 3DD | MAU=PORT |
| 769 | 013 | 001 | . | LDG' | 356 | HK STATUS INTO C |
| 770 | 013 | 002 | . | @069 | 069 | |
| 771 | 013 | 003 | . | X(MAU)(A) | 841 | DISPLAY SEGMENT IN MAU |

\* TEST FOR VALID SEGMENT ADDRESS (>20)

| | | | | | | |
|---|---|---|---|---|---|---|
| 772 | 013 | 004 | . | AND(UA) | 9FA | |
| 773 | 013 | 005 | . | @0F0 | 0F0 | |
| 774 | 013 | 006 | . | TRL(A) | C31 | |
| 775 | 013 | 007 | . | #HK8 | 056 | |
| 776 | 013 | 008 | . | X(A)(MAU) | 814 | |

\* TEST WHICH CONTROL CHARACTER CALLED PROGRAM

| | | | | | | |
|---|---|---|---|---|---|---|
| 777 | 013 | 009 | . | TS8(G) | DF2 | JUMP IF STX CHAR |
| 778 | 013 | 00A | . | #HK1 | 02B | |
| 779 | 013 | 00B | . | TS7(G) | DE2 | JUMP IF ETX CHAR |
| 780 | 013 | 00C | . | #HK3 | 03B | |

\*\*

\* INDIVIDUAL IO HOUSEKEEPING
\* ERROR ROUTINES
\* CAN CHARACTER ROUTINE

| | | | | | | |
|---|---|---|---|---|---|---|
| 781 | 013 | 00D | . | TR2(G) | C92 | JUMP IF BROADCAST |
| 782 | 013 | 00E | . | #HK5 | 019 | |

\* SET FLASHING "E" ON SCREEN

| | | | | | | |
|---|---|---|---|---|---|---|
| 783 | 013 | 00F | . | CTLA | 15C | UPDATE INDICATOR CHARACTER |
| 784 | 013 | 010 | . | X(A)(UA) | 81A | (SET FLASHING E) |
| 785 | 013 | 011 | . | @0C0 | 0C0 | FLASHING X FOR CAN MSG. |
| 786 | 013 | 012 | . | SNS1 | 144 | |

\* SET MA'S TO REPLY STARTING ADDRESS (RSA)

| | | | | | | |
|---|---|---|---|---|---|---|
| 787 | 013 | 013 | HK9 | S5(MAL) | BC3 | READ REPLY STARTING ADDRESS |
| 788 | 013 | 014 | . | DECR(MAL) | AF3 | |
| 789 | 013 | 015 | . | READ | E03 | |
| 790 | 013 | 016 | . | MA-MD | 3E9 | MA'S SET TO R.S.A. |

\* CLEAR SCREEN ROUTINE

| | | | | | | |
|---|---|---|---|---|---|---|
| 791 | 013 | 017 | . | TR5(G) | CC2 | JUMP UNLESS MIS & DC1(4) |
| 792 | 013 | 018 | . | #+3 | 01A | |

| NO. | PU | PL | LABEL | MNEMONIC | CODE | COMMENTS |
|---|---|---|---|---|---|---|
| 793 | 013 | 019 | HK5 | HOME | 24E | BEGIN T-CLEAR AT HOME |
| 794 | 013 | 01A | . | TS8(G) | DF2 | JUMP IF 2-ND PASS |
| 795 | 013 | 01B | . | #HK8 | 060 | |
| 796 | 013 | 01C | . | NOP | 800 | |
| 797 | 013 | 01D | . | S8(G) | BF2 | SET 2-ND PASS INDICATION |
| 798 | 013 | 01E | . | CTLA | 15C | |
| 799 | 013 | 01F | . | TS2(G) | D92 | REPEAT LOOP IF REPLY |
| 800 | 013 | 020 | . | #HK9 | 013 | |

* BROADCAST

| 801 | 013 | 021 | HK4 | TR4(G) | CB2 | JUMP UNLESS "W" FLASHING |
|---|---|---|---|---|---|---|
| 802 | 013 | 022 | . | #HK8 | 056 | |
| 803 | 013 | 023 | . | RNS1 | 130 | |
| 804 | 013 | 024 | . | @013 | 013 | |
| 805 | 013 | 025 | . | #+2 | 026 | |
| 806 | 013 | 026 | . | NOP | 800 | |

* UNLOCK KEYBOARDS

| 807 | 013 | 027 | . | READ | E03 | |
|---|---|---|---|---|---|---|
| 808 | 013 | 028 | . | R8(MDL) | B75 | |
| 809 | 013 | 029 | . | JMP | 9D1 | |
| 810 | 013 | 02A | . | #HK8-1 | 055 | |

**

* INDIVIDUAL IO HOUSEKEEPING
* STX PROGRAM    --    TEST BRDCST VS REPLY

| 811 | 013 | 02B | HK1 | TS2(G) | D92 | JUMP IF REPLY |
|---|---|---|---|---|---|---|
| 812 | 013 | 02C | . | #HK2 | 037 | |
| 813 | 013 | 02D | . | TR1(G) | C82 | JUMP UNLESS MONITOR BIT INVOLV |
| 814 | 013 | 02E | . | #+6 | 033 | |

* TEST MONITOR BIT

| 815 | 013 | 02F | . | READC | 3C7 | READ SEG CONT CHAR |
|---|---|---|---|---|---|---|
| 816 | 013 | 030 | . | @003 | 003 | |
| 817 | 013 | 031 | . | TS6(MDL) | DD5 | JUMP IF NOT MONITORED |
| 818 | 013 | 032 | . | #HK8 | 056 | |

* BROADCAST MESSAGE -- HOME EM

| 819 | 013 | 033 | . | HOME | 24E | |
|---|---|---|---|---|---|---|
| 820 | 013 | 034 | . | SEM2 | 2C5 | |
| 821 | 013 | 035 | . | JMP | 9D1 | |
| 822 | 013 | 036 | . | #HK8 + 1 | 057 | |

* REPLY (STX) -- LOCATE EM FOR R.S.A.

| 823 | 013 | 037 | HK2 | CTLA | 15C | KEY BOARD CONT AREA. |
|---|---|---|---|---|---|---|
| 824 | 013 | 038 | . | LOPSG2 | 151 | LOCATE VALID EM SEG |
| 825 | 013 | 039 | . | JMP | 9D1 | |
| 826 | 013 | 03A | . | #HK8 + 1 | 057 | |

**

* INDIVIDUAL IO HOUSEKEEPING
* ETX PROGRAM

| 827 | 013 | 03B | HK3 | CTLA | 15C | |
|---|---|---|---|---|---|---|
| 828 | 013 | 03C | . | TR2(G) | C92 | JUMP IF BROADCAST |
| 829 | 013 | 03D | . | #HK04 | 0DC | |
| 830 | 013 | 03E | . | TS4(G) | DB2 | JUMP IF USER'S PROC REPLY |
| 831 | 013 | 03F | . | #HK6-1 | 043 | |

| NO. | PU | PL | LABEL | MNEMONIC | CODE | COMMENTS |
|---|---|---|---|---|---|---|

\* REPLY PROGRAM - RESET FLASHING "T"

| 832 | 013 | 040 | • | RNS1 | 130 | UPDATE INDICATOR CHARACTER |
| 833 | 013 | 041 | • | @013 | 013 | |
| 834 | 013 | 042 | • | #+2 | 043 | |
| 835 | 013 | 043 | • | LOPSG2 | 151 | |

\* STORE QUERY STARTING ADDRESS (QSA)

| 836 | 013 | 044 | HK6 | HOME | 24E | |
| 837 | 013 | 045 | • | SEM | 25C | |
| 838 | 013 | 046 | • | UPDEM | 160 | |
| 839 | 013 | 047 | • | LOPSG2 | 151 | |
| 840 | 013 | 048 | • | LOCEM | 200 | |
| 841 | 013 | 049 | • | HOME | 24E | HOME EM |
| 842 | 013 | 04A | • | AG-MA | 3F3 | STORE CURRENT EM POS |
| 843 | 013 | 04B | • | CTLA | 15C | KEYBOARD CONT AREA |
| 844 | 013 | 04C | • | S5(MAL) | BC3 | Q.S.A. ADD |
| 845 | 013 | 04D | • | R4(MAL) | B33 | |
| 846 | 013 | 04E | • | S3(MAL) | BA3 | |
| 847 | 013 | 04F | • | MD-AG | 3ED | EM POS INTO MD'S |
| 848 | 013 | 050 | • | WRT | E07 | STORE Q.S.A. |

\* UNLOCK KEYBOARDS

| 849 | 013 | 051 | HK7 | R3(MAL) | B23 | STATUS ADD |
| 850 | 013 | 052 | • | RL(MDU) | A56 | |
| 851 | 013 | 053 | • | RL(MDL) | A55 | |
| 852 | 013 | 054 | • | S8(MDL) | BF5 | |
| 853 | 013 | 055 | • | WRT | E07 | |

\* ENTER DUMMY ENTRY IN A1 TABLE

| 854 | 013 | 056 | HK8 | RL(MAU) | A54 | |
| 855 | 013 | 057 | • | X(A)(MAU) | 814 | |
| 856 | 013 | 058 | • | JMPO | 386 | |
| 857 | 013 | 059 | • | @012 | 012 | |
| 858 | 013 | 05A | • | #TABLE | 040 | |

\*\*

\* DON'T STORE Q.S.A.

| 859 | 013 | 05B | HKA | CTLA | 15C | |
| 860 | 013 | 05C | • | R4(MAL) | B33 | |
| 861 | 013 | 05D | • | S5(MAL) | BC3 | |
| 862 | 013 | 05E | • | JMP | 9D1 | |
| 863 | 013 | 05F | • | #HK7 + 1 | 052 | |

\*

| 864 | 013 | 060 | HKB | SEM2 | 2C5 | |
| 865 | 013 | 061 | • | UPDEM | 160 | |
| 866 | 013 | 062 | • | JMP | 9D1 | |
| 867 | 013 | 063 | • | #HK6 - 1 | 043 | |

\*\*

\* US PROGRAM
\* SET UP PORT AREA ADDRESS

| 868 | 013 | 064 | US | PORTAD | 3DD | PORT CONT AREA IN MAU |
| 869 | 013 | 065 | • | IR8(G) | CF2 | JUMP IF NOT FIRST RUN |
| 870 | 013 | 066 | • | #USPRC | 06D | |

| NO. | PU | PL | LABEL | MNEMONIC | CODE | COMMENTS |
|---|---|---|---|---|---|---|

* FIRST RUN PROGRAM

| 871 | 013 | 067 | | ENTRM* | 3A4 | CHANGE LEVEL 4 IGA TO "US1" |
| 872 | 013 | 068 | | @061 | 061 | |
| 873 | 013 | 069 | | #US1 | 076 | |
| 874 | 013 | 06A | | JMPO | 386 | JUMP FOR NEXT CHAR |
| 875 | 013 | 06B | | @DJ2 | 012 | |
| 876 | 013 | 06C | | #NEXTC + 1 | 094 | |

* SECOND RUN PROGRAM

| 877 | 013 | 06D | USPRC | READ* | 3B7 | READ CHARS |
| 878 | 013 | 06E | | @068 | 068 | |
| 879 | 013 | 06F | | X(MAU)(A) | 841 | |
| 880 | 013 | 070 | | X(A)(MDU) | 816 | |
| 881 | 013 | 071 | | R7(A) | B61 | |
| 882 | 013 | 072 | | TS7(MDU) | DE6 | JUMP IF ONLY ONE CHAR |
| 883 | 013 | 073 | | #1CHAR | 091 | |

* 2 CHARACTERS -- SET UP LINE & CHAR ADD

| 884 | 013 | 074 | | X(G)(MDL) | 825 | LINE NO. INTO G |
| 885 | 013 | 075 | | R7(G) | B62 | BITS 6-8 = 0 |
| 886 | 013 | 076 | | R6(A) | B51 | |
| 887 | 013 | 077 | | SWAP | 3A0 | |

* US PROGRAM TO HANDLE 1 CHARACTER

| 888 | 013 | 078 | | HOME | 24E | MAU-MAL HOME POS |
| 889 | 013 | 079 | | ADD(MAL) | 953 | CHAR NO. IN A |
| 890 | 013 | 07A | | CMPL(G) | A02 | G BECOMES INDEX |
| 891 | 013 | 07B | | NOP | 800 | |
| 892 | 013 | 07C | | DECR(MAU) | AF4 | |
| 893 | 013 | 07D | | INCR(MAU) | A24 | |
| 894 | 013 | 07E | LOOP | TS171(G) | D22 | JUMP IF G = (11111111) |
| 895 | 013 | 07F | | #SETL | 0AE | |
| 896 | 013 | 080 | | ADD(UA) | 95A | ADD 40 TO A (CHAR NO) |
| 897 | 013 | 081 | | @028 | 028 | |
| 898 | 013 | 082 | | TR8(A) | CF1 | JUMP UNLESS END OF SEG |
| 899 | 013 | 083 | | #LOOP | 07E | |

* TEST NEXT SEG VALID?

| 900 | 013 | 084 | | R8(A) | B71 | SET UP CHAR ADD |
| 901 | 013 | 085 | | ADD(UA) | 95A | SKIP OVER CONTROL AREA |
| 902 | 013 | 086 | | @008 | 008 | |
| 903 | 013 | 087 | | READC* | 3C7 | READ SEG CONT WD |
| 904 | 013 | 088 | | @003 | 003 | |
| 905 | 013 | 089 | | TS7(MDL) | DE5 | JUMP IF NEXT SEG VALID |
| 906 | 013 | 08A | | #LOOP - 1 | 07D | |
| 907 | 013 | 08B | | PORTAD | 3DD | |
| 908 | 013 | 08C | | X(A)(UA) | 81A | |
| 909 | 013 | 08D | | @018 | 018 | |
| 910 | 013 | 08E | USERR | JMPO | 386 | ELSE OVER FLOW CONDITION |
| 911 | 013 | 08F | | @011 | 011 | |
| 912 | 013 | 090 | | #OVER4 | 0E1 | |
| 913 | 013 | 091 | 1CHAR | LOCEM | 200 | LOCATE CURRENT EM |
| 914 | 013 | 092 | | ADD(MAL) | 953 | FINAL ADD. IN A |
| 915 | 013 | 093 | US3CC | TS8(A) | DF1 | JUMP IF OVER SEG. BOUNDRY |
| 916 | 013 | 094 | | #US1CC | 0A3 | |
| 917 | 013 | 095 | | TR3(G) | CA2 | JUMP IF NOT SO MODE |
| 918 | 013 | 096 | | #SETL | 0AE | |

| NO. | PU | PL | LABEL | MNEMONIC | CODE | COMMENTS |
|---|---|---|---|---|---|---|

* SO LOOP -- SET 8-TH BITS FOR SKIP

| NO. | PU | PL | LABEL | MNEMONIC | CODE | COMMENTS |
|---|---|---|---|---|---|---|
| 919 | 013 | 097 | US2CC | READC | E00 | SET 8-TH BIT OF CHAR |
| 920 | 013 | 098 | . | S8(MDL) | BF5 | |
| 921 | 013 | 099 | . | WRTC | 3CB | |
| 922 | 013 | 09A | . | CMPR(MAL) | 9D3 | TEST FOR END OF SKIP |
| 923 | 013 | 09B | . | #SETL + 1 | 0AF | |
| 924 | 013 | 09C | . | TR17I(MAL) | C23 | TEST & INCR MAL |
| 925 | 013 | 09D | . | #US2CC | 097 | |
| 926 | 013 | 09E | . | X(MAL)(UA) | 83A | 1-ST DIS POS INTO MAL |
| 927 | 013 | 09F | . | @008 | 008 | |
| 928 | 013 | 0A0 | . | INCR(MAU) | A24 | NEXT SEG |
| 929 | 013 | 0A1 | . | JMP | 9D1 | |
| 930 | 013 | 0A2 | . | #US2CC | 097 | |

* LIMIT CROSSES BOUNDRY -- TEST VALIDITY

| NO. | PU | PL | LABEL | MNEMONIC | CODE | COMMENTS |
|---|---|---|---|---|---|---|
| 931 | 013 | 0A3 | US1CC | READC | 3C7 | TEST LINKAGE |
| 932 | 013 | 0A4 | . | @003 | 003 | |
| 933 | 013 | 0A5 | . | TR7(MDL) | CE5 | JUMP IF NEXT NOT VALID |
| 934 | 013 | 0A6 | . | #USERR - 3 | 08B | (OVERFLOW ERROR) |
| 935 | 013 | 0A7 | . | R8(A) | B71 | FINAL ADD IN A |
| 936 | 013 | 0A8 | . | ADD(UA) | 95A | |
| 937 | 013 | 0A9 | . | @008 | 008 | |
| 938 | 013 | 0AA | . | LOCEM | 200 | |
| 939 | 013 | 0AB | . | TS3(G) | DA2 | JUMP IF SO MODE |
| 940 | 013 | 0AC | . | #US2CC | 097 | (BACK TO SO LOOP) |
| 941 | 013 | 0AD | . | INCR(MAU) | A24 | NEXT SEG |
| 942 | 013 | 0AE | SETL | X(MAL)(A) | 831 | FINAL ADD INTO MAL |
| 943 | 013 | 0AF | . | SEM2 | 2C5 | STORE EM IN DIS SEG |
| 944 | 013 | 0B0 | . | X(A)(MAU) | 814 | |
| 945 | 013 | 0B1 | . | PORTAD | 3DD | |
| 946 | 013 | 0B2 | . | LDG | 356 | |
| 947 | 013 | 0B3 | . | @05F | 05F | |
| 948 | 013 | 0B4 | . | X(MAU)(A) | 841 | |
| 949 | 013 | 0B5 | . | JMPO | 386 | |
| 950 | 013 | 0B6 | . | @012 | 012 | |
| 951 | 013 | 0B7 | . | #UPDAT + 1 | 03D | |

* PROGRAM TO HANDLE DC3 CHARACTER
* (SUBSET OF US PROGRAM)

| NO. | PU | PL | LABEL | MNEMONIC | CODE | COMMENTS |
|---|---|---|---|---|---|---|
| 952 | 013 | 0B8 | DC3 | LOCEM | 200 | SET UP DISPLAY ADDRESS |
| 953 | 013 | 0B9 | . | LEOL | 20F | FIND END CONDITIONS |
| 954 | 013 | 0BA | . | INCR(A) | A21 | INCREMENT (CRLF) |
| 955 | 013 | 0BB | . | JMP | 9D1 | |
| 956 | 013 | 0BC | . | #US3CC | 093 | |

**

* ACK CONTROL CHARACTER PROGRAM

| NO. | PU | PL | LABEL | MNEMONIC | CODE | COMMENTS |
|---|---|---|---|---|---|---|
| 957 | 013 | 0BD | ACK | X(A)(UA) | 81A | |
| 958 | 013 | 0BE | . | @0B8 | 0B8 | |
| 959 | 013 | 0BF | . | CTLA | 15C | GO TO KEY BD. CONT AREA |
| 960 | 013 | 0C0 | . | SNS1 | 144 | |
| 961 | 013 | 0C1 | . | READL | E01 | |
| 962 | 013 | 0C2 | . | S8(MDL) | BF5 | |
| 963 | 013 | 0C3 | . | WRTL | E05 | |
| 964 | 013 | 0C4 | . | JMP | 9D1 | JUMP BACK TO TEX. PROG. |
| 965 | 013 | 0C5 | . | #EM1 | 0D3 | |

| NO. | PU | PL | LABEL | MNEMONIC | CODE | COMMENTS |
|---|---|---|---|---|---|---|

**\* EM CONTROL CHARACTER PROGRAM**

| NO. | PU | PL | LABEL | MNEMONIC | CODE | COMMENTS |
|---|---|---|---|---|---|---|
| 966 | 013 | 0C6 | EM | PORTAD | 3DD | LOAD PORT CONT AREA |
| 967 | 013 | 0C7 | . | TR8(G) | GF2 | JUMP UNLESS 1-SHT RUN |
| 968 | 013 | 0C8 | . | #+5 | 0CC | |
| 969 | 013 | 0C9 | . | JMPO | 386 | ELSE STORE SECOND CHAR |
| 970 | 013 | 0CA | . | @012 | 012 | |
| 971 | 013 | 0CB | . | #US1 + 4 | 07A | |

**\* SECOND CHARACTER -- STORE INDICATOR**

| NO. | PU | PL | LABEL | MNEMONIC | CODE | COMMENTS |
|---|---|---|---|---|---|---|
| 972 | 013 | 0CC | . | READC* | 3C7 | |
| 973 | 013 | 0CD | . | @069 | 069 | |
| 974 | 013 | 0CE | . | X(MAU)(A) | 841 | GO TO DISP AREA |
| 975 | 013 | 0CF | . | X(A)(MDL) | 815 | CHAR INTO A |
| 976 | 013 | 0D0 | . | SUBRTN | 17F | STORE SIMULTANEOUS IND. |
| 977 | 013 | 0D1 | . | @00A | 00A | |
| 978 | 013 | 0D2 | . | @0BB | 0BB | |
| 979 | 013 | 0D3 | EM1 | PORTAD | 3DD | |
| 980 | 013 | 0D4 | . | LDG* | 356 | |
| 981 | 013 | 0D5 | . | @05F | 05F | |
| 982 | 013 | 0D6 | . | READC* | 3C7 | |
| 983 | 013 | 0D7 | . | @06F | 06F | |
| 984 | 013 | 0D8 | . | X(MAL)(MDL) | 835 | |
| 985 | 013 | 0D9 | . | JMPO | 386 | |
| 986 | 013 | 0DA | . | @012 | 012 | |
| 987 | 013 | 0DB | . | #STA + 2 | 045 | |

**\*\***

**\*UPDATE EM TO EQUAL DISPLAY EM**

| NO. | PU | PL | LABEL | MNEMONIC | CODE | COMMENTS |
|---|---|---|---|---|---|---|
| 988 | 013 | 0DC | HK04 | LOPSG2 | 151 | |
| 989 | 013 | 0DD | . | HOME | 24E | |
| 990 | 013 | 0DE | . | READC* | 3C7 | |
| 991 | 013 | 0DF | . | @003 | 003 | |
| 992 | 013 | 0E0 | . | TS6(MDL) | DD5 | |
| 993 | 013 | 0E1 | . | #+3 | 0E3 | |
| 994 | 013 | 0E2 | . | DECR(MAU) | AF4 | |
| 995 | 013 | 0E3 | . | HOME | 24E | |
| 996 | 013 | 0E4 | . | SEM | 25C | |
| 997 | 013 | 0E5 | . | UPDEM | 160 | |
| 998 | 013 | 0E6 | . | JMP | 9D1 | |
| 999 | 013 | 0E7 | . | #HK4 | 021 | |
| 1000 | 013 | 0E8 | . | NOP | 800 | |
| 1001 | 013 | 0E9 | . | NOP | 800 | |
| 1002 | 013 | 0EA | . | NOP | 800 | |
| 1003 | 013 | 0EB | . | NOP | 800 | |
| 1004 | 013 | 0EC | . | NOP | 800 | |
| 1005 | 013 | 0ED | . | NOP | 800 | |
| 1006 | 013 | 0EE | . | NOP | 800 | |
| 1007 | 013 | 0EF | . | NOP | 800 | |
| 1008 | 013 | 0F0 | . | NOP | 800 | |
| 1009 | 013 | 0F1 | . | NOP | 800 | |
| 1010 | 013 | 0F2 | . | NOP | 800 | |
| 1011 | 013 | 0F3 | . | NOP | 800 | |
| 1012 | 013 | 0F4 | . | NOP | 800 | |
| 1013 | 013 | 0F5 | . | NOP | 800 | |
| 1014 | 013 | 0F6 | . | NOP | 800 | |
| 1015 | 013 | 0F7 | . | NOP | 800 | |
| 1016 | 013 | 0F8 | . | NOP | 800 | |
| 1017 | 013 | 0F9 | . | NOP | 800 | |
| 1018 | 013 | 0FA | . | NOP | 800 | |

| NO. | PU | PL | LABEL | MNEMONIC | CODE | COMMENTS |
|---|---|---|---|---|---|---|
| 1019 | 013 | 0FB | . | NOP | 800 | |
| 1020 | 013 | 0FC | . | NOP | 800 | |
| 1021 | 013 | 0FD | . | NOP | 800 | |
| 1022 | 013 | 0FE | . | NOP | 800 | |
| 1023 | 013 | 0FF | . | NOP | 800 | |

**

*ACCUMULATE HPC FOR ACTIVE LEVEL
*REPLY HPC IS ACCUMULATED IN 72 OF REC CONT AREA
*POLL HPC IS ACCUMULATED IN 73 OF REC CONT AREA

| NO. | PU | PL | LABEL | MNEMONIC | CODE | COMMENTS |
|---|---|---|---|---|---|---|
| 1024 | 014 | 000 | ACTVX | COMPR | 3D2 | |
| 1025 | 014 | 001 | . | @016 | 016 | SYNC? |
| 1026 | 014 | 002 | . | #ENQX+3 | 04F | |
| 1027 | 014 | 003 | . | @005 | 005 | ENQ ? |
| 1028 | 014 | 004 | . | #ENQX | 04C | START OF NESTED POLL |
| 1029 | 014 | 005 | . | @0FF | 0FF | |
| 1030 | 014 | 006 | . | #+2 | 007 | |
| 1031 | 014 | 007 | . | NOP | 800 | |
| 1032 | 014 | 008 | . | READC | 3C7 | |
| 1033 | 014 | 009 | . | @072 | 072 | |
| 1034 | 014 | 00A | . | X(MDU)(A) | 861 | SAVE INPUT DATA IN MDU |
| 1035 | 014 | 00B | . | XOR(MDL) | 9A5 | MDL=HPC |
| 1036 | 014 | 00C | . | X(MDL)(A) | 851 | A=NEW HPC |
| 1037 | 014 | 00D | . | X(A)(MDU) | 816 | RETRIEVE INPUT CH |
| 1038 | 014 | 00E | . | WRTC | 3CB | |

*CHECK IF DC1-DC4 WAS RECEIVED
*AFTER STX AND BEFORE DC1-DC4 ERROR CH ARE REPLACED WITH 07F
*AFTER DC1-DC4 ERROR CH IS REPLACED WITH 05F

| NO. | PU | PL | LABEL | MNEMONIC | CODE | COMMENTS |
|---|---|---|---|---|---|---|
| 1039 | 014 | 00F | . | LDG | 356 | |
| 1040 | 014 | 010 | . | @05E | 05E | |
| 1041 | 014 | 011 | . | TR6(G) | CD2 | DC1-DC4 RCV? |
| 1042 | 014 | 012 | . | #ACTV | 01E | NO |

*TEST FOR PARITY ERROR

| NO. | PU | PL | LABEL | MNEMONIC | CODE | COMMENTS |
|---|---|---|---|---|---|---|
| 1043 | 014 | 013 | . | TR8(A) | CF1 | |
| 1044 | 014 | 014 | . | #+4 | 017 | |
| 1045 | 014 | 015 | . | X(A)(UA) | 81A | |
| 1046 | 014 | 016 | . | @05F | 05F | |
| 1047 | 014 | 017 | . | X(MDU)(UA) | 86A | |
| 1048 | 014 | 018 | . | @003 | 003 | |
| 1049 | 014 | 019 | . | CMPR(MDU) | 9D6 | |
| 1050 | 014 | 01A | . | #ETXR | 08A | |
| 1051 | 014 | 01B | . | JMP0 | 386 | |
| 1052 | 014 | 01C | . | @010 | 010 | RETURN TO ORIGINAL PRGM |
| 1053 | 014 | 01D | . | #ACT | 018 | |

**

*RECEIVING CCF CHARACTERS
*LOAD CCF DIRECTLY INTO KBRD CONT AREA
*IF CCF HAS PARITY ERROR REPLACE IT WITH 7F

| NO. | PU | PL | LABEL | MNEMONIC | CODE | COMMENTS |
|---|---|---|---|---|---|---|
| 1054 | 014 | 01E | ACTV | TR8(A) | CF1 | |
| 1055 | 014 | 01F | . | #+4 | 022 | NO PAR ERROR |
| 1056 | 014 | 020 | . | X(A)(UA) | 81A | |
| 1057 | 014 | 021 | . | @07F | 07F | |

| NO. | PU | PL | LABEL | MNEMONIC | CODE | COMMENTS |
|---|---|---|---|---|---|---|

*FIND CCF LOAD ADDIN 074 OF REC CONT AREA
*CHECK IF INPUT DATA IS DC1 OR DC4

| 1058 | 014 | 022 | | TPAT' | 3DA | |
| 1059 | 014 | 023 | | @011 | 011 | DC1? |
| 1060 | 014 | 024 | | #SAVEX | 083 | |
| 1061 | 014 | 025 | | TPAT' | 3DA | |
| 1062 | 014 | 026 | | @014 | 014 | DC4? |
| 1063 | 014 | 027 | | #SAVEX | 083 | |
| 1064 | 014 | 028 | | NOP | 800 | |
| 1065 | 014 | 029 | | NOP | 800 | |
| 1066 | 014 | 02A | | NOP | 800 | |

*SAVE CCF IN KBRD C A

| 1067 | 014 | 02B | | STAI' | 341 | |
| 1068 | 014 | 02C | | @074 | 074 | 074 HAS CCF LOAD ADD |
| 1069 | 014 | 02D | | NOP | 800 | |
| 1070 | 014 | 02E | | X(A)(MAL) | 813 | |
| 1071 | 014 | 02F | | TPAT | 3D9 | CHECL IF END OF CCF STORAGE |
| 1072 | 014 | 030 | | @03F | 03F | |
| 1073 | 014 | 031 | | @03F | 03F | |
| 1074 | 014 | 032 | | !#+3 | 034 | |
| 1075 | 014 | 033 | | INCR(MAL) | A23 | |
| 1076 | 014 | 034 | | MD-MA | 3EF | |
| 1077 | 014 | 035 | | WRT" | 3BE | REWRITE CCF ADD |
| 1078 | 014 | 036 | | @000 | 000 | |
| 1079 | 014 | 037 | | @074 | 074 | |
| 1080 | 014 | 038 | | JMPO | 386 | |
| 1081 | 014 | 039 | | @000 | 000 | |
| 1082 | 014 | 03A | | @006 | 006 | DISCARD CCF CH. |
| 1083 | 014 | 03B | | NOP | 800 | |
| 1084 | 014 | 03C | | NOP | 800 | |
| 1085 | 014 | 03D | | NOP | 800 | |
| 1086 | 014 | 03E | | NOP | 800 | |

**

*CALCULATE Horizontal PARITY FOR MESSAGE HEADING

| 1087 | 014 | 03F | LDMDX | READC' | 3C7 | |
| 1088 | 014 | 040 | | @072 | 072 | |
| 1089 | 014 | 041 | | X(MDU)(A) | 861 | |
| 1090 | 014 | 042 | | XOR(MDL) | 9A5 | |
| 1091 | 014 | 043 | | X(MDL)(A) | 851 | |
| 1092 | 014 | 044 | | X(A)(MDU) | 816 | |
| 1093 | 014 | 045 | | WRTC | 3CB | |
| 1094 | 014 | 046 | | JMPO | 386 | |
| 1095 | 014 | 047 | | @010 | 010 | |
| 1096 | 014 | 048 | | #LDMD | 04A | |
| 1097 | 014 | 049 | | NOP | 800 | |
| 1098 | 014 | 04A | | NOP | 800 | |
| 1099 | 014 | 04B | | NOP | 800 | |

**

*PROGRAM TO HANDLE ENQ

| 1100 | 014 | 04C | ENQX | ENTRM' | 3A4 | |
| 1101 | 014 | 04D | | @043 | 043 | |
| 1102 | 014 | 04E | | #POLL | 0BA | |
| 1103 | 014 | 04F | | JMPO | 386 | |
| 1104 | 014 | 050 | | @000 | 000 | |

| NO. | PU | PL | LABEL | MNEMONIC | CODE | COMMENTS |
|---|---|---|---|---|---|---|
| 1105 | 014 | 051 | . | @006 | 006 | DISCARD |
| 1106 | 014 | 052 | . | NOP | 800 | |
| 1107 | 014 | 053 | . | NOP | 800 | |

**

*AO RECEIVED-SAVE CHAR
*CALCULATE START OF CCF CHAR ADDRESS
*STORE CCF STORAGE ADD IN 074

| NO. | PU | PL | LABEL | MNEMONIC | CODE | COMMENTS |
|---|---|---|---|---|---|---|
| 1108 | 014 | 054 | STXX | X(G)(MDL) | 825 | G=ACTIVE |
| 1109 | 014 | 055 | . | READC' | 3C7 | |
| 1110 | 014 | 056 | . | @01B | 01B | 01B HAS KBRD SEG |
| 1111 | 014 | 057 | . | X(MAU)(MDL) | 845 | |
| 1112 | 014 | 058 | . | CTLA | 15C | OBTAI KBRD CONT A ADD |
| 1113 | 014 | 059 | . | S5(MAL) | BC3 | |
| 1114 | 014 | 05A | . | R4(MAL) | B33 | |
| 1115 | 014 | 05B | . | S2(MAL) | B93 | |
| 1116 | 014 | 05C | . | S1(MAL) | B83 | |
| 1117 | 014 | 05D | . | MD-MA | 3EF | |
| 1118 | 014 | 05E | . | WRT" | 3BE | |
| 1119 | 014 | 05F | . | @000 | 000 | |
| 1120 | 014 | 060 | . | @074 | 074 | |
| 1121 | 014 | 061 | . | JMP | 9D1 | |
| 1122 | 014 | 062 | . | #LDMD2 | 0E0 | |
| 1123 | 014 | 063 | . | NOP | 800 | |
| 1124 | 014 | 064 | . | NOP | 800 | |

**

*INITIALIZE HPC ACCUMULATION FOR REPLY REC

| NO. | PU | PL | LABEL | MNEMONIC | CODE | COMMENTS |
|---|---|---|---|---|---|---|
| 1125 | 014 | 065 | SOHX | S7(A) | BE1 | |
| 1126 | 014 | 066 | . | STA' | 33C | |
| 1127 | 014 | 067 | . | @072 | 072 | |
| 1128 | 014 | 068 | . | X(G)(UA) | 82A | |
| 1129 | 014 | 069 | . | #FI1 | 06D | |
| 1130 | 014 | 06A | . | JMPO | 386 | |
| 1131 | 014 | 06B | . | @010 | 010 | |
| 1132 | 014 | 06C | . | #LDMD | 04A | |
| 1133 | 014 | 06D | . | NOP | 800 | |
| 1134 | 014 | 06E | . | NOP | 800 | |

*ACCUMULATE A1 CH INTO MESSAGE HPC

| NO. | PU | PL | LABEL | MNEMONIC | CODE | COMMENTS |
|---|---|---|---|---|---|---|
| 1135 | 014 | 06F | LDAX | READC' | 3C7 | |
| 1136 | 014 | 070 | . | @072 | 072 | |
| 1137 | 014 | 071 | . | X(MDU)(A) | 861 | SAVE A1 |
| 1138 | 014 | 072 | . | XOR(MDL) | 9A5 | |
| 1139 | 014 | 073 | . | X(MDL)(A) | 851 | |
| 1140 | 014 | 074 | . | X(A)(MDU) | 816 | |
| 1141 | 014 | 075 | . | WRTC | 3CB | |
| 1142 | 014 | 076 | . | JMPO | 386 | |
| 1143 | 014 | 077 | . | @010 | 010 | |
| 1144 | 014 | 078 | . | #LDA1 | 092 | |
| 1145 | 014 | 079 | . | NOP | 800 | |
| 1146 | 014 | 07A | . | NOP | 800 | |
| 1147 | 014 | 07B | . | NOP | 800 | |
| 1148 | 014 | 07C | . | NOP | 800 | |
| 1149 | 014 | 07D | . | NOP | 800 | |
| 1150 | 014 | 07E | . | NOP | 800 | |
| 1151 | 014 | 07F | . | NOP | 800 | |
| 1152 | 014 | 080 | . | NOP | 800 | |

| NO. | PU | PL | LABEL | MNEMONIC | CODE | COMMENTS |
|---|---|---|---|---|---|---|
| 1153 | 014 | 081 | | NOP | 800 | |
| 1154 | 014 | 082 | | NOP | 800 | |

\*\*

*UPDATA FOREGROUND STATUS CH THAT DC1 OR DC4 RECEIVED

| 1155 | 014 | 083 | SAVEX | S6(G) | BD2 |
|---|---|---|---|---|---|
| 1156 | 014 | 084 | | STG* | 35F |
| 1157 | 014 | 085 | | @05E | 05E |
| 1158 | 014 | 086 | | JMPO | 386 |
| 1159 | 014 | 087 | | @000 | 000 |
| 1160 | 014 | 088 | | @00F | 00F |
| 1161 | 014 | 089 | | NOP | 800 |

\*\*

*ETX RECEIVED-DISCARD ETX -TEST NEXT CH FOR CORRECT HPC

| 1162 | 014 | 08A | ETXR | ENTRM* | 3A4 |
|---|---|---|---|---|---|
| 1163 | 014 | 08B | | @043 | 043 |
| 1164 | 014 | 08C | | #MHPC | 0E6 |
| 1165 | 014 | 08D | | JMP | 9D1 |
| 1166 | 014 | 08E | | #ENQX+3 | 04F |
| 1167 | 014 | 08F | | NOP | 800 |
| 1168 | 014 | 090 | | NOP | 800 |
| 1169 | 014 | 091 | | NOP | 800 |
| 1170 | 014 | 092 | | NOP | 800 |

*COMPARE HPC RECEIVED
*GO TO ROUTINE AS IF ETX RECEIVED
*IF ERROR IN HPC GO TO CAN ROUTINE

| 1171 | 014 | 093 | MHPC | READC* | 3C7 |
|---|---|---|---|---|---|
| 1172 | 014 | 094 | | @072 | 072 |
| 1173 | 014 | 095 | | R8(MDL) | B75 |
| 1174 | 014 | 096 | | SUB(MDL) | 925 |
| 1175 | 014 | 097 | | TSY(A) | D31 |
| 1176 | C14 | 098 | | #HPCE | 09F |
| 1177 | 014 | 099 | | NOP | 800 |
| 1178 | 014 | 09A | | X(A)(UA) | 81A |
| 1179 | 014 | 09B | | @003 | 003 |
| 1180 | 014 | 09C | | JMPO | 386 |
| 1181 | 014 | 09D | | @010 | 010 |
| 1182 | 014 | 09E | | #ACT | 018 |
| 1183 | 014 | 09F | HPCE | X(A)(UA) | 81A |
| 1184 | 014 | 0A0 | | @01B | 01B |
| 1185 | 014 | 0A1 | | JMPO | 386 |
| 1186 | 014 | 0A2 | | @010 | 010 |
| 1187 | 014 | 0A3 | | #CAN1+2 | 038 |
| 1188 | 014 | 0A4 | | NOP | 800 |
| 1189 | 014 | 0A5 | | NOP | 800 |
| 1190 | 014 | 0A6 | | NOP | 800 |
| 1191 | 014 | 0A7 | | NOP | 800 |

\*\*
*
*
*
*           KEYBOARD CONTROL AREA MAP
*
* WORD ADD          WORD CONTENT
*           UPPER BYTE          LOWER BYTE         COMMENTS
* 00/40     SEG1                SEGMENT 2
* 02/42     SEGMENT 3           SEGMENT 4          ADDRESS OF
* 04/44     SEGMENT 5           SEGMENT 6          SEGMENTS ON
                                                   CRT DISPLAY

| NO. | PU | PL | LABEL | MNEMONIC | CODE | COMMENTS |
|---|---|---|---|---|---|---|
| * | 06/46 | | SEGMENT 7 | | SEGMENT 8 | |
| * | 08/48 | | 8-4 IND CODE | 3-1 EM SEG | | |
| * | 0A/4A | | 8-7 OPEN-CLOSE BRACE | | 1-EM OP LAST | |
| * | 0C/4C | | | | FI CHAR | |
| * | 0E/4E | | XMIT PORT ADD | | INDICATOR BITS | |
| * | 10/50 | | IOS STATUS WD U | | IOS STATUS WORD L | |
| * | 12/52 | | IOS TWO BYTE STORAGE | | | |
| * | 14/54 | | SPARE | | | |
| * | 16/56 | | QUERY START ADD | | | |
| * | 18/58 | | REPLY START ADD | | | |
| * | 1A/5A | | SPARE | | | |
| * | 1C/5C | | SPARE | | | |
| * | 1E/5E | | SPARE | | | |
| * | 20/60 | | SPARE | | | |
| * | 22/62 | | SPARE | | | |
| * | 24/64 | | SPARE | | | |
| * | 26/66 | | SPARE | | | |
| * | 28/68 | | OPEN BRACE ADD | | | |
| * | 2A/6A | | CLOSE BRACE ADD | | | |
| * | 2C/6C | | SPARE | | | |
| * | 2E/6E | | SPARE | | | |
| * | 30/70 | | INDEX SEG ADD | | LAST BUF SEG ADD | |
| * | 32/72 | | | | CCF-1 | |
| * | 34/74 | | CCF-2 | | CCF-3 | |
| * | 36/76 | | CCF-4 | | CCF-5 | |
| * | 38/78 | | CCF 6 | | CCF-7 | |
| * | 3A/7A | | CCF-8 | | CCF-9 | |
| * | 3C/7C | | CCF-10 | | CCF-11 | |
| * | 3E/7E | | CCF-12 | | CCF-13 | |
| * | | | | | | |
| * | | | | | | |
| * | | | | | | |
| ** | | | | | | |

*----------------START OF DJ KBRD PROGRAM------------------------
*
*OPERATING SYSTEM TRAPS HERE FOR KBRD INPUT
*DJ KBRD PRGM-CHECK INPUT DATA
*START OF KBRD PROGRAM

| 0 | 017 | 000 | KSTRT | TPAT' | 3DA | |
|---|---|---|---|---|---|---|
| 1 | 017 | 001 | . | @0A0 | 0A0 | INITIALIZE KBRD CODE |
| 2 | 017 | 002 | . | #INITO | 067 | INITIALIZE KBRDS |
| 3 | 017 | 003 | . | TS8(MDL) | DF5 | CONT. CHAR? |
| 4 | 017 | 004 | . | #CLEM | 00B | CHECK LOCATION OF EM |
| 5 | 017 | 005 | ALP | R5(MAL) | B43 | ADDRESS 08 IN KBRD C. A. |
| 6 | 017 | 006 | . | S2(MAL) | B93 | |
| 7 | 017 | 007 | . | R8(PR2) | B7F | |
| 8 | 017 | 008 | . | JMP0 | 386 | |
| 9 | 017 | 009 | . | @018 | 018 | |
| 10 | 017 | 00A | . | #ALPHA | 00C | |

*KBRD CONTROL CHAR.
*CHECK EM LOCATION

| 11 | 017 | 00B | CLEM | TPAT | 3D9 | |
|---|---|---|---|---|---|---|
| 12 | 017 | 00C | . | @0E0 | 0E0 | |
| 13 | 017 | 00D | . | @080 | 080 | COLUMN 8 OR 9? |
| 14 | 017 | 00E | . | #ECONX | 01E | EM CONTROL KEY |
| 15 | 017 | 00F | . | R2(MAL) | B13 | |
| 16 | 017 | 010 | . | R5(MAL) | B43 | |
| 17 | 017 | 011 | . | S4(MAL) | BB3 | |
| 18 | 017 | 012 | . | X(G)(MDL) | 825 | SAVE KBRD INPUT CH |
| 19 | 017 | 013 | . | READ | E03 | |
| 20 | 017 | 014 | . | X(A)(UA) | 81A | |
| 21 | 017 | 015 | . | @007 | 007 | |
| 22 | 017 | 016 | . | AND(MDU) | 9F6 | |
| 23 | 017 | 017 | . | R8(MDL) | B75 | |

| NO. | PU | PL | LABEL | MNEMONIC | CODE | COMMENTS |
|---|---|---|---|---|---|---|
| 24 | 017 | 018 | . | TRL(A) | C31 | EM IN INDEX SEG? |
| 25 | 017 | 019 | . | #DEF | 0B7 | YES |
| 26 | 017 | 01A | . | TS7(G) | DE2 | IN DATA=MULTI CH? |
| 27 | 017 | 01B | . | #EMRK | 0F6 | Y=KBRD ERROR |
| 28 | 017 | 01C | . | JMP | 9D1 | GO FIND PROG ADDR |
| 29 | 017 | 01D | . | #CEFT+1 | 090 | |

*REMEMBER THAT EM CONTROL KEY FUNCTION IS BEING DONE
*THIS IS NEEDED FOR NEXT STRADDLE CORRECTION

| 30 | 017 | 01E | ECONX | X(G)(MDL) | 825 | SAVE IN DATA IN G |
|---|---|---|---|---|---|---|
| 31 | 017 | 01F | . | R5(MAL) | B43 | |
| 32 | 017 | 020 | . | R3(MAL) | B23 | |
| 33 | 017 | 021 | . | S4(MAL) | BB3 | ADDR.KIJA |
| 34 | 017 | 022 | . | READL | E01 | |
| 35 | 017 | 023 | . | S1(MDL) | B85 | |
| 36 | 017 | 024 | . | WRTL | E05 | MDL1=EM CONT FUNCTION |
| 37 | 017 | 025 | . | DIMAL | 3FD | |
| 38 | 017 | 026 | . | X(MDL)(G) | 852 | |

*EM CONTROL FUNCTION
*LOCATE ADDRESS OF PROGRAMS

| 39 | 017 | 027 | ECON | X(G)(MDL) | 825 | MDL & G=DATA |
|---|---|---|---|---|---|---|
| 40 | 017 | 028 | . | R8(G) | B72 | KEEP ONLY 4 LSB IN G |
| 41 | 017 | 029 | . | TS5(G) | DC2 | |
| 42 | 017 | 02A | . | #ECON2 | 06A | COL 9 |
| 43 | 017 | 02B | . | X(A)(UA) | 81A | |
| 44 | 017 | 02C | . | #EMFTI | 047 | EM FUNC. TABLE 1 |
| 45 | 017 | 02D | FAIT | SHFTL(G) | AB2 | |
| 46 | 017 | 02E | . | ADD(G) | 952 | A=POINTER FOR APL PROG |
| 47 | 017 | 02F | . | X(G)(MAU) | 824 | SAVE CONT AREA SEG ADD. |
| 48 | 017 | 030 | . | TR7(MAL) | CE3 | 1ST HALF? |
| 49 | 017 | 031 | . | #+3 | 033 | |
| 50 | 017 | 032 | . | S8(G) | BF2 | G8=1=SECOND HALF |
| 51 | 017 | 033 | . | X(MAL)(A) | 831 | |
| 52 | 017 | 034 | . | X(MAU)(PU) | 848 | MAU &MAL HAS TABLE ADD. |
| 53 | 017 | 035 | . | READS | 3BB | GET SECTOR OF APL PROG. |
| 54 | 017 | 036 | . | X(A)(MDL) | 815 | SAVE IT IN A |
| 55 | 017 | 037 | . | INCR(MAL) | A23 | |
| 56 | 017 | 038 | . | READS | 3BB | GET ADD.IN SECTOR OF APL.PROG. |
| 57 | 017 | 039 | . | X(MAU)(G) | 842 | MAU&G=KBRD CONT A. SEG. |
| 58 | 017 | 03A | . | S2(MAL) | B93 | |
| 59 | 017 | 03B | . | RL(MAL) | A53 | |
| 60 | 017 | 03C | . | S4(MAL) | BB3 | MAL=EM LOC. ADD. |
| 61 | 017 | 03D | . | NOP | 800 | |
| 62 | 017 | 03E | . | TR8(G) | CF2 | |
| 63 | 017 | 03F | . | #+3 | 041 | |
| 64 | 017 | 040 | . | S7(MAL) | BE3 | |
| 65 | 017 | 041 | . | R8(MAU) | B74 | |
| 66 | 017 | 042 | . | X(PU)(A) | 881 | |
| 67 | 017 | 043 | . | X(PL)(MDL) | 875 | PROG JUMPS TO APL PROG |
| 68 | 017 | 044 | . | NOP | 800 | |
| 69 | 017 | 045 | . | NOP | 800 | |
| 70 | 017 | 046 | . | NOP | 800 | |

*EM CONTROL PROG ADDRESS TABLE

| 71 | 017 | 047 | EMFTI | #01D | 01D | |
|---|---|---|---|---|---|---|
| 72 | 017 | 048 | . | #CRLF | 06E | CAR/LINE FEED |
| 73 | 017 | 049 | . | #01B | 01B | |
| 74 | 017 | 04A | . | #DHOME | 0A4 | HOME |
| 75 | 017 | 04B | . | #00B | 00B | |
| 76 | 017 | 04C | . | #DCLR | 000 | CLEAR |
| 77 | 017 | 04D | . | #01B | 01B | |
| 78 | 017 | 04E | . | #EDIT | 0F1 | EDIT |
| 79 | 017 | 04F | . | #01D | 01D | |

| NO. | PU | PL | LABEL | MNEMONIC | CODE | COMMENTS |
|---|---|---|---|---|---|---|
| 80 | 017 | 050 | . | #GTAB | 000 | TAB |
| 81 | 017 | 051 | . | @00A | 00A | |
| 82 | 017 | 052 | . | #S8 | 001 | SET TABS |
| 83 | 017 | 053 | . | @00A | 00A | |
| 84 | 017 | 054 | . | #S7 | 000 | RESET TABS |
| 85 | 017 | 055 | . | @01C | 01C | |
| 86 | 017 | 056 | . | #XMT | 082 | TRANSMIT KEY |
| 87 | 017 | 057 | . | @01A | 01A | |
| 88 | 017 | 058 | . | #STPLT | 014 | STEP LEFT |
| 89 | 017 | 059 | . | @01A | 01A | |
| 90 | 017 | 05A | . | #STPRT | 000 | STEP RIGHT |
| 91 | 017 | 05B | . | @000 | 000 | |
| 92 | 017 | 05C | . | @008 | 008 | |
| 93 | 017 | 05D | . | @01A | 01A | |
| 94 | 017 | 05E | . | #SCUP | 042 | SCROLL UP (STEP) |
| 95 | 017 | 05F | . | @01A | 01A | |
| 96 | 017 | 060 | . | #SCDN | 0A3 | SCROLL DOWN (STEP) |
| 97 | 017 | 061 | . | @01B | 01B | |
| 98 | 017 | 062 | . | #STUP | 012 | STEP UP EM |
| 99 | 017 | 063 | . | @01B | 01B | |
| 100 | 017 | 064 | . | #STDN | 076 | STEP DOWN EM |
| 101 | 017 | 065 | . | @000 | 000 | |
| 102 | 017 | 066 | . | @008 | 008 | |
| 103 | 017 | 067 | INITO | JMP0 | 386 | |
| 104 | 017 | 068 | . | @019 | 019 | |
| 105 | 017 | 069 | . | #INIT | 029 | |

*EM CONT PROG. ADDRESS TABLE
*DATA GENERATED WITH SHIFT KEY

| NO. | PU | PL | LABEL | MNEMONIC | CODE | COMMENTS |
|---|---|---|---|---|---|---|
| 106 | 017 | 06A | ECON2 | X(A)(UA) | 81A | |
| 107 | 017 | 06B | . | #EMFT2 | 06F | |
| 108 | 017 | 06C | . | R5(G) | B42 | |
| 109 | 017 | 06D | . | JMP | 9D1 | |
| 110 | 017 | 06E | . | #FAIT | 02D | |
| 111 | 017 | 06F | EMFT2 | @000 | 000 | |
| 112 | 017 | 070 | . | @008 | 008 | |
| 113 | 017 | 071 | . | @000 | 000 | |
| 114 | 017 | 072 | . | @008 | 008 | |
| 115 | 017 | 073 | . | @000 | 000 | |
| 116 | 017 | 074 | . | @008 | 008 | |
| 117 | 017 | 075 | . | @000 | 000 | |
| 118 | 017 | 076 | . | @008 | 008 | |
| 119 | 017 | 077 | . | @000 | 000 | |
| 120 | 017 | 078 | . | @008 | 008 | |
| 121 | 017 | 079 | . | @00A | 00A | |
| 122 | 017 | 07A | . | #S8 | 001 | SET TABS |
| 123 | 017 | 07B | . | @00A | 00A | |
| 124 | 017 | 07C | . | #S7 | 000 | RESET TABS |
| 125 | 017 | 07D | . | @000 | 000 | |
| 126 | 017 | 07E | . | @008 | 008 | |
| 127 | 017 | 07F | . | @01A | 01A | |
| 128 | 017 | 080 | . | #SCLF | 014 | SCAN LEFT |
| 129 | 017 | 081 | . | @01A | 01A | |
| 130 | 017 | 082 | . | #SCRT | 000 | SCAN RIGHT |
| 131 | 017 | 083 | . | @000 | 000 | |
| 132 | 017 | 084 | . | @008 | 008 | |
| 133 | 017 | 085 | . | @01A | 01A | |
| 134 | 017 | 086 | . | #SCUS | 030 | SCROLL UP (SCAN) |
| 135 | 017 | 087 | . | @01A | 01A | |
| 136 | 017 | 088 | . | #SCDS | 091 | SCROLL DOWN (SCAN) |
| 137 | 017 | 089 | . | @01A | 01A | |
| 138 | 017 | 08A | . | #SCNU | 0FF | SCAN UP EM |
| 139 | 017 | 08B | . | @01B | 01B | |
| 140 | 017 | 08C | . | #SCND | 064 | SCAN DOWN EM |
| 141 | 017 | 08D | . | NOP | 800 | |
| 142 | 017 | 08E | . | NOP | 800 | |

NO. PU PL LABEL MNEMONIC CODE COMMENTS

*DATA IS EDIT F.
*LIST LOCATION OF EDIT F PROGRAMS

```
143 017 08F   CEFT  X(G)(MDL)      825
144 017 090   .     X(A)(UA)       81A
145 017 091   .     #EFT           097   EDIT F TABLE
146 017 092   .     R6(G)          B52
147 017 093   .     JMP            9D1
148 017 094   .     #FAIT          02D   FIND ADD.IN TABLE
149 017 095   .     NOP            800
150 017 096   .     NOP            800
```

*EDIT FUNCTION TABLE

```
151 017 097   EFT   0000           000
152 017 098   .     0008           008   CODE USED FOR INIT
153 017 099   .     0008           008
154 017 09A   .     #DELC          069   DELETE CHAR
155 017 09B   .     0008           008
156 017 09C   .     #DELW          011   DELETE WORD
157 017 09D   .     001D           01D
158 017 09E   .     #DELR          05A   DELETE REST
159 017 09F   .     001C           01C
160 017 0A0   .     #SFLD          02A   START FIELD
161 017 0A1   .     001C           01C
162 017 0A2   .     #EFLD          020   END FIELD2
163 017 0A3   .     0008           008
164 017 0A4   .     #DELF          080   DELETE FIELD
165 017 0A5   .     001E           01E
166 017 0A6   .     #COM           000   COMPRESS
167 017 0A7   .     0000           000
168 017 0A8   .     0008           008
169 017 0A9   .     000A           00A
170 017 0AA   .     #INS           083   INSERT KEY
171 017 0AB   .     001D           01D
172 017 0AC   .     #INSE          060   INSERT END-STORY END
173 017 0AD   .     0007           007
174 017 0AE   .     #INSP          075   INSERT PARAG.
175 017 0AF   .     0000           000
176 017 0B0   .     0008           008
177 017 0B1   .     0000           000
178 017 0B2   .     0008           008
179 017 0B3   .     0024           024
180 017 0B4   .     #MFLD          000   MOVE FIELD
181 017 0B5   .     NOP            800
182 017 0B6   .     NOP            800
```

*CHECK IF DATA IS MULTI CHAR.
*CHECK IF MULTI CH DATA IS ENTERED AT LEGAL POINT

```
183 017 0B7   DEF   TS6(G)         DD2   IS DATA EDIT F.?
184 017 0B8   .     #EMRK          0F6   YES-KBRD ERROR
185 017 0B9   .     X(A)(UA)       81A
186 017 0BA   .     0008           008
187 017 0BB   .     CMPR(MDL)      9D5   EM IN INDEX HOME?
188 017 0BC   .     #COLD          0F4   CHECK DATA=COL D
189 017 0BD   .     X(A)(UA)       81A
190 017 0BE   .     002F           02F
191 017 0BF   .     SUB(MDL)       925   MDL=EM A=48=END 1ST LINE
192 017 0C0   .     TS8(A)         DF1   EM>48
193 017 0C1   .     #EMRK          0F6   YES-KBRD ERROR
194 017 0C2   .     TS5(G)         DC2   COL D?
195 017 0C3   .     #EMRK          0F6   YES-KBRD ERROR
196 017 0C4   .     X(A)(G)        812
197 017 0C5   .     X(MDL)(G)      852
```

*DATA IS FROM COL C-SECONDARY HOME POSITION
*MARK PROPER BIT IN CCF-1 CHARACTER

| NO. | PU | PL | LABEL | MNEMONIC | CODE | COMMENTS |
|---|---|---|---|---|---|---|
| 198 | 017 | 0C6 | . | X(MDL)(UA) | 85A | |
| 199 | 017 | 0C7 | . | @020 | 020 | |
| 200 | 017 | 0C8 | . | NOP | 800 | |
| 201 | 017 | 0C9 | . | NOP | 800 | |
| 202 | 017 | 0CA | . | X(A)(G) | 812 | G=A=INPUT DATA |
| 203 | 017 | 0CB | . | COMPR | 3C2 | |
| 204 | 017 | 0CC | . | @0CD | 0CD | MODIFY? |
| 205 | 017 | 0CD | . | #SBT | 0DB | |
| 206 | 017 | 0CE | . | @0C2 | 0C2 | REENTER? |
| 207 | 017 | 0CF | . | #SBT+1 | 0DC | |
| 208 | 017 | 0D0 | . | @0C9 | 0C9 | IGNORE |
| 209 | 017 | 0D1 | . | #SBT+2 | 0DD | |
| 210 | 017 | 0D2 | . | @0C4 | 0C4 | DELETE? |
| 211 | 017 | 0D3 | . | #SBT+3 | 0DE | |
| 212 | 017 | 0D4 | . | @0C6 | 0C6 | KEEP? |
| 213 | 017 | 0D5 | . | #SBT+4 | 0DF | |
| 214 | 017 | 0D6 | . | @0C7 | 0C7 | REQ. REPEAT? |
| 215 | 017 | 0D7 | . | #SBT-1 | 0DA | |
| 216 | 017 | 0D8 | . | @0FF | 0FF | |
| 217 | 017 | 0D9 | . | #+2 | 0DA | |

*GENERATE CCF-1 CODE

| NO. | PU | PL | LABEL | MNEMONIC | CODE | COMMENTS |
|---|---|---|---|---|---|---|
| 218 | 017 | 0DA | . | SHFTR(MDL) | A75 | |
| 219 | 017 | 0DB | SBT | SHFTR(MDL) | A75 | |
| 220 | 017 | 0DC | . | SHFTR(MDL) | A75 | |
| 221 | 017 | 0DD | . | SHFTR(MDL) | A75 | |
| 222 | 017 | 0DE | . | SHFTR(MDL) | A75 | |
| 223 | 017 | 0DF | . | R1(MAL) | B03 | |
| 224 | 017 | 0E0 | . | TS2(MDL) | D95 | |
| 225 | 017 | 0E1 | . | #+5 | 0E5 | |
| 226 | 017 | 0E2 | . | TS3(MDL) | DA5 | |
| 227 | 017 | 0E3 | . | #+3 | 0E5 | |
| 228 | 017 | 0E4 | . | S1(MDL) | B85 | MINOR XMIT MODE |
| 229 | 017 | 0E5 | . | S5(MAL) | BC3 | |
| 230 | 017 | 0E6 | . | S6(MAL) | BD3 | |
| 231 | 017 | 0E7 | . | R4(MAL) | B33 | ADDR CCF-1 CHAR |
| 232 | 017 | 0E8 | . | S1(MAL) | B83 | |
| 233 | 017 | 0E9 | . | S2(MAL) | B93 | |
| 234 | 017 | 0EA | . | X(MDU)(MDL) | 863 | SAVE NEW CCF-1 |
| 235 | 017 | 0EB | . | READC | E00 | |
| 236 | 017 | 0EC | . | TR7(MDL) | CE5 | WAS ERROR BIT SET |
| 237 | 017 | 0ED | . | #+3 | 0EF | NO |
| 238 | 017 | 0EE | . | S7(MDU) | BE6 | |
| 239 | 017 | 0EF | . | X(MDL)(MDU) | 856 | |
| 240 | 017 | 0F0 | . | WRTC | 3CB | |
| 241 | 017 | 0F1 | . | JMP0 | 386 | |
| 242 | 017 | 0F2 | . | @018 | 018 | |
| 243 | 017 | 0F3 | . | #PCCF | 004 | |
| 244 | 017 | 0F4 | COLD | TS5(G) | DC2 | |
| 245 | 017 | 0F5 | . | #ALP2 | 0F9 | |
| 246 | 017 | 0F6 | EMRK | JMP0 | 386 | |
| 247 | 017 | 0F7 | . | @019 | 019 | |
| 248 | 017 | 0F8 | . | #MARKI+1 | 018 | |
| 249 | 017 | 0F9 | ALP2 | X(A)(G) | 812 | |
| 250 | 017 | 0FA | . | X(MDL)(G) | 852 | |
| 251 | 017 | 0FB | . | JMP | 9D1 | |
| 252 | 017 | 0FC | . | #ALP | 005 | |
| 253 | 017 | 0FD | . | NOP | 800 | |
| 254 | 017 | 0FE | . | NOP | 800 | |
| 255 | 017 | 0FF | . | NOP | 800 | |
| 256 | 018 | 000 | . | NOP | 800 | |
| 257 | 018 | 001 | . | NOP | 800 | |
| 258 | 018 | 002 | . | NOP | 800 | |
| 259 | 018 | 003 | . | NOP | 800 | |

| NO. | PU | PL | LABEL | MNEMONIC | CODE | COMMENTS |
|---|---|---|---|---|---|---|
| * | | | | | | |
| 260 | 018 | 004 | PCCF | R1(MAL) | B03 | |
| 261 | 018 | 005 | . | R6(MAL) | B53 | |
| 262 | 018 | 006 | . | S4(MAL) | BB3 | |
| 263 | 018 | 007 | . | X(MDL)(G) | 852 | |
| 264 | 018 | 008 | . | JMP0 | 386 | |
| 265 | 018 | 009 | . | #017 | 017 | |
| 266 | 018 | 00A | . | #ALP | 005 | |
| 267 | 018 | 00B | . | NOP | 800 | |

**

*----------------DJ KBRD PROGRAM-ALPHA NUMERIC INPUT----------------
*CHECK FOR INSERT MODE

| 268 | 018 | 00C | ALPHA | R8(PR2) | B7F | |
|---|---|---|---|---|---|---|
| 269 | 018 | 00D | . | R1(PR2) | B0F | |
| 270 | 018 | 00E | . | S3(MAL) | BA3 | |
| 271 | 018 | 00F | . | S4(MAL) | BB3 | |
| 272 | 018 | 010 | . | READL | E01 | |
| 273 | 018 | 011 | . | X(G)(A) | 821 | SAVE DATAIN G |
| 274 | 018 | 012 | . | TR7(MDL) | CE5 | INSERT MODE? |
| 275 | 018 | 013 | . | #+5 | 017 | NO |
| 276 | 018 | 014 | . | S8(PR2) | BFF | |
| 277 | 018 | 015 | . | JMP | 9D1 | |
| 278 | 018 | 016 | . | #FEM1 | 022 | |
| 279 | 018 | 017 | . | RL(MDL) | A55 | |
| 280 | 018 | 018 | . | WRTI | 139 | ERASE INDICATOR |

*PREPARE FOR STRADDLE CORREECTION
*CHECK IF LAST KBRD ENTRY WAS AN EM CONTROL KEY
*IF IT WAS KIJA BIT1=1=NO STRADDLE CORRECTION NEEDED

| 281 | 018 | 019 | . | S2(MAL) | B93 | |
|---|---|---|---|---|---|---|
| 282 | 018 | 01A | . | R3(MAL) | B23 | |
| 283 | 018 | 01B | . | READL | E01 | |
| 284 | 018 | 01C | . | TR1(MDL) | C85 | |
| 285 | 018 | 01D | . | #+3 | 01F | |
| 286 | 018 | 01E | . | S1(PR2) | B8F | NO STRADDLE |
| 287 | 018 | 01F | . | R1(MDL) | B05 | |
| 288 | 018 | 020 | . | WRTL | E05 | |
| 289 | 018 | 021 | . | NOP | 800 | |

*FIND EM IN OPERATING SEGMENT

| 290 | 018 | 022 | FEM1 | R2(MAL) | B13 | MAL WAS POINTING AT IN B |
|---|---|---|---|---|---|---|
| 291 | 018 | 023 | . | R3(MAL) | B23 | |
| 292 | 018 | 024 | . | NOP | 800 | |
| 293 | 018 | 025 | FEM | LOPSG2 | 151 | |
| 294 | 018 | 026 | . | X(MAL)(UA) | 83A | ADDRESS WORD 02 IN OP SEG |
| 295 | 018 | 027 | . | #002 | 002 | |
| 296 | 018 | 028 | . | READL | E01 | |
| 297 | 018 | 029 | . | TR6(MDL) | CD5 | IS OP SEG INDEX? |
| 298 | 018 | 02A | . | #EDA | 054 | |
| 299 | 018 | 02B | . | NOP | 800 | |
| 300 | 018 | 02C | . | NOP | 800 | |

*TEST IF INPUT DATA IS MULTI CHAR.

| 301 | 018 | 02D | FOPS | TR8(G) | CF2 | DATA=MULTI CHAR |
|---|---|---|---|---|---|---|
| 302 | 018 | 02E | . | #EDA+2 | 056 | |
| 303 | 018 | 02F | . | R8(G) | B72 | |
| 304 | 018 | 030 | . | TS5(G) | DC2 | |
| 305 | 018 | 031 | . | #COLDX | 042 | |
| 306 | 018 | 032 | . | TR2(G) | C92 | |
| 307 | 018 | 033 | . | #EDAS | 04C | |
| 308 | 018 | 034 | . | TS3(G) | DA2 | |

| NO. | PU | PL | LABEL | MNEMONIC | CODE | COMMENTS |
|---|---|---|---|---|---|---|
| 309 | 018 | 035 | . | #+5 | 039 | |
| 310 | 018 | 036 | . | S5(G) | BC2 | |
| 311 | 018 | 037 | . | JMP | 9D1 | |
| 312 | 018 | 038 | . | #EDAS | 04C | |
| 313 | 018 | 039 | . | X(A)(UA) | 81A | |
| 314 | 018 | 03A | . | @04B | 04B | |
| 315 | 018 | 03B | . | TR1(G) | C82 | |
| 316 | 018 | 03C | . | #+4 | 03F | |
| 317 | 018 | 03D | . | X(A)(UA) | 81A | |
| 318 | 018 | 03E | . | @02A | 02A | |
| 319 | 018 | 03F | . | X(G)(A) | 821 | |
| 320 | 018 | 040 | . | JMP | 9D1 | |
| 321 | 018 | 041 | . | #EDAS | 04C | |
| 322 | 018 | 042 | COLDX | X(A)(UA) | 81A | |
| 323 | 018 | 043 | . | @053 | 053 | |
| 324 | 018 | 044 | . | CMPR(G) | 9D2 | |
| 325 | 018 | 045 | . | #EDAS | 04C | |
| 326 | 018 | 046 | . | X(A)(UA) | 81A | CORRECT H TO X DISPLAY |
| 327 | 018 | 047 | . | @058 | 058 | |
| 328 | 018 | 048 | . | CMPR(G) | 9D2 | |
| 329 | 018 | 049 | . | #EDAS | 04C | |
| 330 | 018 | 04A | . | R5(G) | B42 | |
| 331 | 018 | 04B | . | NOP | 800 | |

*ENTER DATA AND SPACE CHARACTER

| NO. | PU | PL | LABEL | MNEMONIC | CODE | COMMENTS |
|---|---|---|---|---|---|---|
| 332 | 018 | 04C | EDAS | LOCEM | 200 | |
| 333 | 018 | 04D | . | LOAD | 204 | |
| 334 | 018 | 04E | . | INCR(MAL) | A23 | |
| 335 | 018 | 04F | . | X(MDL)(UA) | 85A | GENERATE SPACE CHAR |
| 336 | 018 | 050 | . | @020 | 020 | |
| 337 | 018 | 051 | . | RL(G) | A52 | |
| 338 | 018 | 052 | . | JMP | 9D1 | |
| 339 | 018 | 053 | . | #UPEM | 08D | |

*SINGLE CHARACTER ENTRY

| NO. | PU | PL | LABEL | MNEMONIC | CODE | COMMENTS |
|---|---|---|---|---|---|---|
| 340 | 018 | 054 | EDA | TS8(PR2) | DFF | INSERT MODE? |
| 341 | 018 | 055 | . | #INSMO | 07E | |
| 342 | 018 | 056 | . | LOCEM | 200 | |
| 343 | 018 | 057 | . | READC | E00 | |
| 344 | 018 | 058 | . | TR8(MDL) | CF5 | EM AT TAB? |
| 345 | 018 | 059 | . | #+3 | 05B | |
| 346 | 018 | 05A | . | S8(G) | BF2 | |
| 347 | 018 | 05B | DATA | LEOL | 20F | LOCATE END OF LINE |
| 348 | 018 | 05C | . | CMPR(MAL) | 9D3 | IS EM IN LAST POS OF LINE? |
| 349 | 018 | 05D | . | #CSPO | 0F4 | YES-CHECK FOR SPACE CHAR. |
| 350 | 018 | 05E | . | DECR(MDU) | AF6 | MDU WAS 40 NOW=39 |
| 351 | 018 | 05F | . | SUB(MDU) | 926 | A POINTS TO 1ST POS OF LINE |
| 352 | 018 | 060 | . | CMPR(MAL) | 9D3 | EM IN 1ST POS OF LINE? |
| 353 | 018 | 061 | . | #CFPS | 0B5 | YES-CHECK FOR WORD STRADDLE |
| 354 | 018 | 062 | . | INCR(A) | A21 | A POINTS TO 1ST+1 LINE POS |
| 355 | 018 | 063 | . | CMPR(MAL) | 9D3 | IS EM IN 1ST+1 LINE POS? |
| 356 | 018 | 064 | . | #CFNP | 0A6 | CHECK FOR NEW PARA. |
| 357 | 018 | 065 | . | DECR(A) | AF1 | A=1ST DATA POS OF EM LINE |
| 358 | 018 | 066 | . | READC | E00 | |
| 359 | 018 | 067 | . | TS8(MDL) | DF5 | TAB? |
| 360 | 018 | 068 | . | #FTB+2 | 086 | |
| 361 | 018 | 069 | RJCH | DECR(MAL) | AF3 | |
| 362 | 018 | 06A | . | READC | E00 | RIGHT JUSTIFY DATA |
| 363 | 018 | 06B | . | TR8(MDL) | CF5 | |
| 364 | 018 | 06C | . | #+7 | 072 | |
| 365 | 018 | 06D | . | X(A)(UA) | 81A | |
| 366 | 018 | 06E | . | @0AE | 0AE | TAB+PERIOD? |
| 367 | 018 | 06F | . | SUB(MDL) | 925 | |
| 368 | 018 | 070 | . | JMP | 9D1 | |
| 369 | 018 | 071 | . | #FTB | 084 | |

| NO. | PU | PL | LABEL | MNEMONIC | CODE | COMMENTS |
|---|---|---|---|---|---|---|
| 370 | 018 | 072 | . | TSY(MDL) | D35 | |
| 371 | 018 | 073 | . | #EOSN | 08A | |
| 372 | 018 | 074 | . | CMPR(MAL) | 9D3 | |
| 373 | 018 | 075 | . | #EOSN+1 | 08B | START OF LINE |
| 374 | 018 | 076 | . | JMP | 9D1 | |
| 375 | 018 | 077 | . | #RJCH | 069 | |
| 376 | 018 | 078 | . | NOP | 800 | |
| 377 | 018 | 079 | . | NOP | 800 | |
| 378 | 018 | 07A | . | NOP | 800 | |
| 379 | 018 | 07B | . | NOP | 800 | |
| 380 | 018 | 07C | . | NOP | 800 | |
| 381 | 018 | 07D | . | NOP | 800 | |
| 382 | 018 | 07E | INSMO | JMPO | 386 | |
| 383 | 018 | 07F | . | #006 | 006 | |
| 384 | 018 | 080 | . | #INSM | 02A | 02A ---------------------- |
| 385 | 018 | 081 | . | NOP | 800 | |
| 386 | 018 | 082 | . | NOP | 800 | |
| 387 | 018 | 083 | . | NOP | 800 | |
| 388 | 018 | 084 | FTB | TSY(A) | D31 | |
| 389 | 018 | 085 | . | #+4 | 088 | |
| 390 | 018 | 086 | . | S8(G) | BF2 | |
| 391 | 018 | 087 | . | DECR(MAL) | AF3 | |
| 392 | 018 | 088 | . | NOP | 800 | |
| 393 | 018 | 089 | . | NOP | 800 | |

*WRITE DATA & UPDATE EM

| NO. | PU | PL | LABEL | MNEMONIC | CODE | COMMENTS |
|---|---|---|---|---|---|---|
| 394 | 018 | 08A | EOSN | INCR(MAL) | A23 | |
| 395 | 018 | 08B | . | X(MDL)(G) | 852 | G HAD INPUT DATA CHAR |
| 396 | 018 | 08C | . | RL(G) | A52 | |
| 397 | 018 | 08D | UPEM | WRTC | 3CB | |
| 398 | 018 | 08E | . | X(A)(MAL) | 813 | IF EM=127 INDEX DO EDIT F. |
| 399 | 018 | 08F | . | S8(MAL) | BF3 | |
| 400 | 018 | 090 | . | TRY(MAL) | C43 | MAL=127? |
| 401 | 018 | 091 | . | #KGO | 09C | NO |
| 402 | 018 | 092 | . | RL(MAL) | A53 | |
| 403 | 018 | 093 | . | S2(MAL) | B93 | |
| 404 | 018 | 094 | . | READL | E01 | |
| 405 | 018 | 095 | . | X(MAL)(A) | 831 | |
| 406 | 018 | 096 | . | TR6(MDL) | CD5 | NOT INDEX? |
| 407 | 018 | 097 | . | #KGO | 09C | |
| 408 | 018 | 098 | . | CTLA | 15C | |
| 409 | 018 | 099 | . | JMPO | 386 | |
| 410 | 018 | 09A | . | #01B | 01B | |
| 411 | 018 | 09B | . | #EDIT | OF1 | OF1 ---------------------- |
| 412 | 018 | 09C | KGO | R8(MAL) | B73 | |
| 413 | 018 | 09D | . | TS6(G) | DD2 | G6=1=WORD STRD A LINE |
| 414 | 018 | 09E | . | #COST | OFE | CORRECT STRADDLE |
| 415 | 018 | 09F | . | STEPR | 258 | |
| 416 | 018 | 0A0 | ENDJ | UPDEM | 160 | |
| 417 | 018 | 0A1 | . | JMPO | 386 | |
| 418 | 018 | 0A2 | . | #000 | 000 | |
| 419 | 018 | 0A3 | . | #008 | 008 | EOJ |
| 420 | 018 | 0A4 | . | NOP | 800 | |
| 421 | 018 | 0A5 | . | NOP | 800 | |

*CHECK FOR A NEW PARAG.

| NO. | PU | PL | LABEL | MNEMONIC | CODE | COMMENTS |
|---|---|---|---|---|---|---|
| 422 | 018 | 0A6 | CFNP | X(A)(G) | 812 | G=DATA |
| 423 | 018 | 0A7 | . | TPAT' | 3DA | IS DATA=SPACE |
| 424 | 018 | 0A8 | . | #020 | 020 | |
| 425 | 018 | 0A9 | . | #UPEM-2 | 08B | YES WRITE DATA |
| 426 | 018 | 0AA | . | DECR(MAL) | AF3 | CHECK IF PREVIOUS CHAR=SP |
| 427 | 018 | 0AB | . | READC | E00 | |
| 428 | 018 | 0AC | . | R6(MDL) | B55 | |
| 429 | 018 | 0AD | . | R8(MDL) | B75 | |
| 430 | 018 | 0AE | . | TRL(MDL) | C35 | |

| NO. | PU | PL | LABEL | MNEMONIC | CODE | COMMENTS |
|---|---|---|---|---|---|---|
| 431 | 018 | OAF | . | #UPEM-2 | 08B | YES OVERWRT WITH PRESENT C. |
| 432 | 018 | OB0 | . | JMPO | 386 | |
| 433 | 018 | OB1 | . | @018 | 018 | |
| 434 | 018 | OB2 | . | #EOSN | 08A | |
| 435 | 018 | OB3 | . | NOP | 800 | |
| 436 | 018 | OB4 | . | NOP | 800 | |

*CHECK FOR LINE STRADDLE

| 437 | 018 | OB5 | CFPS | X(A)(G) | 812 | |
|---|---|---|---|---|---|---|
| 438 | 018 | OB6 | . | TPAT' | 3DA | DATA=SPACE? |
| 439 | 018 | OB7 | . | @020 | 020 | |
| 440 | 018 | OB8 | . | #UPEM-2 | 08B | |
| 441 | 018 | OB9 | . | RL(MAL) | A53 | ADDRESS 02 IN OP SEG |
| 442 | 018 | OBA | . | S2(MAL) | B93 | |
| 443 | 018 | OBB | . | READL | E01 | |
| 444 | 018 | OBC | . | TS6(MDL) | DD5 | INDEX? |
| 445 | 018 | OBD | . | #+5 | 0C1 | |
| 446 | 018 | OBE | . | TR1(PR2) | C8F | LAST INPUT=EM CONTROL? |
| 447 | 018 | OBF | . | #P3 | 0C5 | NO |
| 448 | 018 | OC0 | . | R1(PR2) | B0F | |
| 449 | 018 | OC1 | . | WRTL | E05 | |
| 450 | 018 | OC2 | . | LOCEM | 200 | |
| 451 | 018 | OC3 | . | JMP | 9D1 | |
| 452 | 018 | OC4 | . | #UPEM-2 | 08B | |

*ENABLE WORD STRADDLE CORRECTION

| 453 | 018 | OC5 | P3 | RL(G) | A52 | |
|---|---|---|---|---|---|---|
| 454 | 018 | OC6 | . | S6(G) | BD2 | G6=1=NEED TO CORRECT STRADDLE |
| 455 | 018 | OC7 | . | LOCEM | 200 | |
| 456 | 018 | OC8 | . | X(MDL)(A) | 851 | |
| 457 | 018 | OC9 | . | JMP | 9D1 | |
| 458 | 018 | OCA | . | #UPEM | 08D | |
| 459 | 018 | OCB | . | NOP | 800 | |
| 460 | 018 | OCC | . | NOP | 800 | |
| 461 | 018 | OCD | . | NOP | 800 | |
| 462 | 018 | OCE | . | NOP | 800 | |
| 463 | 018 | OCF | . | NOP | 800 | |

*IS SCROLL UP NEEDED?
*HAS OVERFLOW OCCURED?

| 464 | 018 | OD0 | CSP | LOAD | 204 | WRITE DATA AT EM |
|---|---|---|---|---|---|---|
| 465 | 018 | OD1 | . | RL(G) | A52 | |
| 466 | 018 | OD2 | . | X(A)(UA) | 81A | |
| 467 | 018 | OD3 | . | @07F | 07F | =LAST EM POSITION IN OP SEG? |
| 468 | 018 | OD4 | . | SUB(MAL) | 923 | |
| 469 | 018 | OD5 | . | TSY(A) | D31 | |
| 470 | 018 | OD6 | . | #UPEM+1 | 08E | NO |
| 471 | 018 | OD7 | . | RL(MAL) | A53 | |
| 472 | 018 | OD8 | . | DIMAL | 3FD | 02 WORD OF OP SEG |
| 473 | 018 | OD9 | . | READL | E01 | |
| 474 | 018 | ODA | . | TR7(MDL) | CE5 | ISOP SEG LAST IN KBRD BUF. |
| 475 | 018 | ODB | . | #MRKO | 0EE | YES-INDICATE FLASHING 0 |
| 476 | 018 | ODC | . | RL(MAL) | A53 | |
| 477 | 018 | ODD | . | READU | E02 | |
| 478 | 018 | ODE | . | X(A)(MDU) | 816 | |
| 479 | 018 | ODF | . | TPAT | 3D9 | |
| 480 | 018 | OE0 | . | @007 | 007 | |
| 481 | 018 | OE1 | . | @007 | 007 | TEST IF OP SEG LAST ON DISPLAY |
| 482 | 018 | OE2 | . | #SRUP | 0E7 | YES DO SCROLL UP |
| 483 | 018 | OE3 | . | X(MAL)(UA) | 83A | |
| 484 | 018 | OE4 | . | @07F | 07F | |
| 485 | 018 | OE5 | . | JMP | 9D1 | |

| NO. | PU | PL | LABEL | MNEMONIC | CODE | COMMENTS |
|---|---|---|---|---|---|---|
| 486 | 018 | 0E6 | . | #UPEM+1 | 08E | |
| 487 | 018 | 0E7 | SRUP | RL(MDL) | A55 | |
| 488 | 018 | 0E8 | . | S4(MDL) | BB5 | PUT EM AT 8 |
| 489 | 018 | 0E9 | . | WRTL | E05 | |
| 490 | 018 | 0EA | . | UPDEM | 160 | |
| 491 | 018 | 0EB | . | JMPO | 386 | |
| 492 | 018 | 0EC | . | @01A | 01A | DO AUTO SCROLL UP |
| 493 | 018 | 0ED | . | #SCUP | 042 | 042 ------------------------ |
| 494 | 018 | 0EE | MRKO | JMPO | 386 | |
| 495 | 018 | 0EF | . | @019 | 019 | |
| 496 | 018 | 0F0 | . | #MARKO | 01C | |
| 497 | 018 | 0F1 | . | NOP | 800 | |
| 498 | 018 | 0F2 | . | NOP | 800 | |

*

| 499 | 018 | 0F3 | . | NOP | 800 | |
|---|---|---|---|---|---|---|
| 500 | 018 | 0F4 | CSPO | DECR(MDU) | AF6 | |
| 501 | 018 | 0F5 | . | SUB(MDU) | 926 | |
| 502 | 018 | 0F6 | . | DECR(MAL) | AF3 | |
| 503 | 018 | 0F7 | . | READC | E00 | |
| 504 | 018 | 0F8 | . | TRL(MDL) | C35 | |
| 505 | 018 | 0F9 | . | #RJCH+1 | 06A | |
| 506 | 018 | 0FA | . | INCR(MAL) | A23 | |
| 507 | 018 | 0FB | . | JMP | 9D1 | |
| 508 | 018 | 0FC | . | #CSP | 0D0 | |
| 509 | 018 | 0FD | . | NOP | 800 | |

*CORRECT WORD STRADDLE
*CHECK IF MAL=8=1ST LINE 1ST CHAR

| 510 | 018 | 0FE | COST | NOP | 800 | |
|---|---|---|---|---|---|---|
| 511 | 018 | 0FF | . | MD→MA | 3EF | MA POINT TO LAST CH ENTRY |
| 512 | 019 | 000 | . | X(A)(UA) | 81A | |
| 513 | 019 | 001 | . | @008 | 008 | |
| 514 | 019 | 002 | . | SUB(MAL) | 923 | IF A=0 MAL=8 |
| 515 | 019 | 003 | . | TSY(A) | D31 | |
| 516 | 019 | 004 | . | #SEDA | 00D | SET UP DESTINATION ADD FOR MOV |
| 517 | 019 | 005 | . | AG→MA | 3F3 | SAVE MA |

*CHECK IF SEGMENT=1ST IN BUFFER

| 518 | 019 | 006 | . | RL(MAL) | A53 | |
|---|---|---|---|---|---|---|
| 519 | 019 | 007 | . | S2(MAL) | B93 | |
| 520 | 019 | 008 | . | READL | E01 | |
| 521 | 019 | 009 | . | TR8(MDL) | CF5 | 1ST SEGM. IN BUF? |
| 522 | 019 | 00A | . | #SEDA+5 | 012 | |
| 523 | 019 | 00B | . | JMP | 9D1 | |
| 524 | 019 | 00C | . | #SEDA+1 | 00E | |
| 525 | 019 | 00D | SEDA | AG→MA | 3F3 | |
| 526 | 019 | 00E | . | SUBRTN | 17F | LINE STRADDLE SUBR |
| 527 | 019 | 00F | . | @01F | 01F | |
| 528 | 019 | 010 | . | #COST1 | 000 | CORRECT STRADDLE |
| 529 | 019 | 011 | . | INCR(A) | A21 | |
| 530 | 019 | 012 | . | MA→AG | 3F1 | |
| 531 | 019 | 013 | . | RL(G) | A52 | |
| 532 | 019 | 014 | . | JMPO | 386 | |
| 533 | 019 | 015 | . | @018 | 018 | |
| 534 | 019 | 016 | . | #UPEM+1 | 08E | |
| 535 | 019 | 017 | MARKI | CTLA | 15C | |
| 536 | 019 | 018 | . | X(A)(UA) | 81A | |
| 537 | 019 | 019 | . | @058 | 058 | |
| 538 | 019 | 01A | . | JMP | 9D1 | |
| 539 | 019 | 01B | . | #INDCR | 01F | |
| 540 | 019 | 01C | MARKO | CTLA | 15C | |
| 541 | 019 | 01D | . | X(A)(UA) | 81A | |
| 542 | 019 | 01E | . | @078 | 078 | |

| NO. | PU | PL | LABEL | MNEMONIC | CODE | COMMENTS |
|---|---|---|---|---|---|---|
| 543 | 019 | 01F | INDCR | SNS1 | 144 | |
| 544 | 019 | 020 | . | S2(MAL) | B93 | |
| 545 | 019 | 021 | . | S3(MAL) | BA3 | |
| 546 | 019 | 022 | . | READL | E01 | |
| 547 | 019 | 023 | . | R7(MDL) | B65 | ERASE INSERT MODE BIT |
| 548 | 019 | 024 | . | WRTL | E05 | |
| 549 | 019 | 025 | . | JMP0 | 386 | |
| 550 | 019 | 026 | . | @000 | 000 | |
| 551 | 019 | 027 | . | @008 | 008 | |
| 552 | 019 | 028 | . | NOP | 800 | |

**

*------------------------INITIALIZE KBRD STORAGE------------------------
* DJ KBRD PRGM-INITIALIZE
*IDENTIFY KBRD

| NO. | PU | PL | LABEL | MNEMONIC | CODE | COMMENTS |
|---|---|---|---|---|---|---|
| 553 | 019 | 029 | INIT | X(A)(MAU) | 814 | |
| 554 | 019 | 02A | . | S5(MAL) | BC3 | |
| 555 | 019 | 02B | . | S6(MAL) | BD3 | |
| 556 | 019 | 02C | . | R2(MAL) | B13 | ADDR. 30 OR 70 IN KBRD C.A. |
| 557 | 019 | 02D | . | TPAT' | 3DA | |
| 558 | 019 | 02E | . | @004 | 004 | KBRD 1 OR 2? |
| 559 | 019 | 02F | . | #KB12 | 03B | |
| 560 | 019 | 030 | . | TPAT' | 3DA | |
| 561 | 019 | 031 | . | @005 | 005 | KBRD 3 OR 4 |
| 562 | 019 | 032 | . | #KB34 | 04E | |
| 563 | 019 | 033 | . | NOP | 800 | |
| 564 | 019 | 034 | . | NOP | 800 | |
| 565 | 019 | 035 | . | NOP | 800 | |
| 566 | 019 | 036 | . | JMP0 | 386 | |
| 567 | 019 | 037 | . | @000 | 000 | |
| 568 | 019 | 038 | . | @008 | 008 | EOJ |
| 569 | 019 | 039 | . | NOP | 800 | |
| 570 | 019 | 03A | . | NOP | 800 | |

*ENTER START & END ADD. FOR KBRD DATA

| NO. | PU | PL | LABEL | MNEMONIC | CODE | COMMENTS |
|---|---|---|---|---|---|---|
| 571 | 019 | 03B | KB12 | TS7(MAL) | DE3 | MAL>40 ? |
| 572 | 019 | 03C | . | #KBD2 | 044 | |
| 573 | 019 | 03D | . | X(MDU)(UA) | 86A | |
| 574 | 019 | 03E | . | @010 | 010 | START OF KBRD 1 DATA STORE |
| 575 | 019 | 03F | . | X(MDL)(UA) | 85A | |
| 576 | 019 | 040 | . | @030 | 030 | END OF KBRD 1 DATA STORE |
| 577 | 019 | 041 | . | JMP | 9D1 | |
| 578 | 019 | 042 | . | #WBS | 05B | WRITE BUFFER SIZE |
| 579 | 019 | 043 | . | NOP | 800 | |
| 580 | 019 | 044 | KBD2 | X(MDU)(UA) | 86A | |
| 581 | 019 | 045 | . | @032 | 032 | START KBRD 2 DATA STORE |
| 582 | 019 | 046 | . | X(MDL)(UA) | 85A | |
| 583 | 019 | 047 | . | @052 | 052 | END KBRD 2 DATA STORE |
| 584 | 019 | 048 | . | JMP | 9D1 | |
| 585 | 019 | 049 | . | #WBS | 05B | |
| 586 | 019 | 04A | . | NOP | 800 | |
| 587 | 019 | 04B | . | NOP | 800 | |
| 588 | 019 | 04C | . | NOP | 800 | |
| 589 | 019 | 04D | . | NOP | 800 | |
| 590 | 019 | 04E | KB34 | TS7(MAL) | DE3 | |
| 591 | 019 | 04F | . | #KBR4 | 057 | |
| 592 | 019 | 050 | . | X(MDU)(UA) | 86A | |
| 593 | 019 | 051 | . | @054 | 054 | START KBRD 3 DATA STORE |
| 594 | 019 | 052 | . | X(MDL)(UA) | 85A | |
| 595 | 019 | 053 | . | @074 | 074 | END KBRD 3 DATA STORE |
| 596 | 019 | 054 | . | JMP | 9D1 | |
| 597 | 019 | 055 | . | #WBS | 05B | |
| 598 | 019 | 056 | . | NOP | 800 | |
| 599 | 019 | 057 | KBR4 | X(MDU)(UA) | 86A | |
| 600 | 019 | 058 | . | @076 | 076 | START KBRD 4 DATA STORE |

| NO. | PU | PL | LABEL | MNEMONIC | CODE | COMMENTS |
|---|---|---|---|---|---|---|
| 601 | 019 | 059 | . | X(MDL)(UA) | 85A | |
| 602 | 019 | 05A | . | #07D | 07D | END KBRD 4 |
| 603 | 019 | 05B | WBS | WRT | E07 | |
| 604 | 019 | 05C | . | NOP | 800 | |
| 605 | 019 | 05D | . | R5(MAL) | B43 | |

*ENTER SEGMENTS FOR DISPLAY

| 606 | 019 | 05E | . | R6(MAL) | B53 | |
|---|---|---|---|---|---|---|
| 607 | 019 | 05F | . | X(MDL)(MDU) | 856 | MDU=1ST SEG. OF KBRD MEM. |
| 608 | 019 | 060 | . | INCR(MDL) | A25 | |
| 609 | 019 | 061 | . | X(G)(MDU) | 826 | |
| 610 | 019 | 062 | DDS | WRT | E07 | |
| 611 | 019 | 063 | . | DIMAL | 3FD | |
| 612 | 019 | 064 | . | INCR(MDU) | A26 | |
| 613 | 019 | 065 | . | INCR(MDU) | A26 | |
| 614 | 019 | 066 | . | INCR(MDL) | A25 | |
| 615 | 019 | 067 | . | INCR(MDL) | A25 | |
| 616 | 019 | 068 | . | TR4(MAL) | CB3 | |
| 617 | 019 | 069 | . | #DDS | 062 | DESIGNATE DISP. SECTO |
| 618 | 019 | 06A | . | RL(MDU) | A56 | |
| 619 | 019 | 06B | . | RSTRP(15) | E2F | |
| 620 | 019 | 06C | . | WRT | E07 | |
| 621 | 019 | 06D | . | R4(MAL) | B33 | START QUERY ADD. |
| 622 | 019 | 06E | . | S2(MAL) | B93 | INDICATE INDEX SEGMENT |
| 623 | 019 | 06F | . | S3(MAL) | BA3 | |
| 624 | 019 | 070 | . | S5(MAL) | BC3 | |
| 625 | 019 | 071 | . | X(MDU)(G) | 862 | G =FIRST SEG. OF MEM.-INDEX |
| 626 | 019 | 072 | . | WRT | E07 | |
| 627 | 019 | 073 | . | DIMAL | 3FD | START REPL. ADD. |
| 628 | 019 | 074 | . | WRT | E07 | 1ST SEG-INDEX 08 |
| 629 | 019 | 075 | . | DIMAL | 3FD | CONT. A. 18 |
| 630 | 019 | 076 | . | RL(MDU) | A56 | |
| 631 | 019 | 077 | . | RL(MDL) | A55 | |
| 632 | 019 | 078 | . | WRT | E07 | |
| 633 | 019 | 079 | . | DIMAL | 3FD | CONT. A. 1A |
| 634 | 019 | 07A | . | WRT | E07 | |
| 635 | 019 | 07B | . | DIMAL | 3FD | CONT. A. 1C |
| 636 | 019 | 07C | . | WRT | E07 | |
| 637 | 019 | 07D | . | DIMAL | 3FD | CONT. A. 1E |
| 638 | 019 | 07E | . | WRT | E07 | |
| 639 | 019 | 07F | . | NOP | 800 | |
| 640 | 019 | 080 | . | NOP | 800 | |
| 641 | 019 | 081 | . | NOP | 800 | |
| 642 | 019 | 082 | . | NOP | 800 | |
| 643 | 019 | 083 | . | NOP | 800 | |

*CALCULATE CONT. AREA ADD.

| 644 | 019 | 084 | . | X(A)(MAU) | 814 | |
|---|---|---|---|---|---|---|
| 645 | 019 | 085 | . | X(MDL)(UA) | 85A | |
| 646 | 019 | 086 | . | #004 | 004 | |
| 647 | 019 | 087 | . | SUB(MDL) | 925 | A=CONT ADD |
| 648 | 019 | 088 | . | SHFTL(A) | AB1 | |
| 649 | 019 | 089 | . | SHFTL(A) | AB1 | |
| 650 | 019 | 08A | . | SHFTL(A) | AB1 | |
| 651 | 019 | 08B | . | TR7(MAL) | CE3 | |
| 652 | 019 | 08C | . | #+3 | 08E | |
| 653 | 019 | 08D | . | S8(A) | BF1 | IF CONT.A. IS SECOND IN SEG. |
| 654 | 019 | 08E | . | S5(MAL) | BC3 | ADDRESS 30 OR 70 |
| 655 | 019 | 08F | . | READL | E01 | READ ADD OF LAST SEG IN BFFR. |

*ADDRESS OP. SEGS FOR KBRD MEM.
*ENTER CONTROL A. ADDRESS

| 656 | 019 | 090 | . | X(MDU)(A) | 861 | |
|---|---|---|---|---|---|---|
| 657 | 019 | 091 | . | X(MAU)(G) | 842 | FOR KB1=10 KB2=31 KB3=52 K4=73 |

| NO. | PU | PL | LABEL | MNEMONIC | CODE | COMMENTS |
|---|---|---|---|---|---|---|
| 658 | 019 | 092 | . | RL(MAL) | A53 | |
| 659 | 019 | 093 | . | X(G)(MDL) | 825 | G=TEMP ADD OF LAST SEG. |
| 660 | 019 | 094 | . | X(MDL)(UA) | 85A | |
| 661 | 019 | 095 | . | @008 | 008 | |
| 662 | 019 | 096 | . | WRT | E07 | |
| 663 | 019 | 097 | . | DIMAL | 3FD | |
| 664 | 019 | 098 | . | RL(MDL) | A55 | 8BIT=0 7BIT=0=INDEX SEG |
| 665 | 019 | 099 | . | S6(MDL) | BD5 | |
| 666 | 019 | 09A | . | S5(MDL) | BC5 | 5=1 IN INDEX=NO |
| 667 | 019 | 09B | . | S7(MDL) | BE5 | |
| 668 | 019 | 09C | . | WRT | E07 | |
| 669 | 019 | 09D | . | INCR(MAU) | A24 | |
| 670 | 019 | 09E | . | R6(MDL) | B55 | |
| 671 | 019 | 09F | . | INCR(MDU) | A26 | |
| 672 | 019 | 0A0 | . | RL(MAL) | A53 | |
| 673 | 019 | 0A1 | . | WRT | E07 | |
| 674 | 019 | 0A2 | . | DIMAL | 3FD | 2ND WORD OF OP SEG.INDICATE IS |
| 675 | 019 | 0A3 | . | S7(MDL) | BE5 | BUT NOT LAST |
| 676 | 019 | 0A4 | . | WRTL | E05 | |
| 677 | 019 | 0A5 | . | RL(MAL) | A53 | |
| 678 | 019 | 0A6 | . | X(A)(UA) | 81A | |
| 679 | 019 | 0A7 | . | @006 | 006 | |
| 680 | 019 | 0A8 | UPOP | INCR(MDU) | A26 | IN EACH OF 8 DISP SEGS.ENTER |
| 681 | 019 | 0A9 | . | INCR(MAU) | A24 | THEIR ORDER OF DISPLAY |
| 682 | 019 | 0AA | . | DECR(A) | AF1 | |
| 683 | 019 | 0AB | . | RL(MAL) | A53 | |
| 684 | 019 | 0AC | . | RL(MDL) | A55 | |
| 685 | 019 | 0AD | . | WRT | E07 | |
| 686 | 019 | 0AE | . | DIMAL | 3FD | |
| 687 | 019 | 0AF | . | S7(MDL) | BE5 | |
| 688 | 019 | 0B0 | . | S8(MDL) | BF5 | |
| 689 | 019 | 0B1 | . | WRTL | E05 | |
| 690 | 019 | 0B2 | . | TSY(A) | D31 | A COUNTS DISP SEGS. |
| 691 | 019 | 0B3 | . | #UPOP | 0A8 | |
| 692 | 019 | 0B4 | . | R1(MDU) | B06 | |
| 693 | 019 | 0B5 | . | R2(MDU) | B16 | |
| 694 | 019 | 0B6 | . | R3(MDU) | B26 | |
| 695 | 019 | 0B7 | . | X(A)(G) | 812 | INTO EVERY SEG. ENTER ITS CONT |
| 696 | 019 | 0B8 | RP2 | CMPR(MAU) | 9D4 | |
| 697 | 019 | 0B9 | . | #LSOB | 0C4 | |
| 698 | 019 | 0BA | . | INCR(MAU) | A24 | |
| 699 | 019 | 0BB | . | RL(MAL) | A53 | |
| 700 | 019 | 0BC | . | RL(MDL) | A55 | |
| 701 | 019 | 0BD | . | WRT | E07 | |
| 702 | 019 | 0BE | . | DIMAL | 3FD | |
| 703 | 019 | 0BF | . | S7(MDL) | BE5 | |
| 704 | 019 | 0C0 | . | S8(MDL) | BF5 | |
| 705 | 019 | 0C1 | . | WRTL | E05 | |
| 706 | 019 | 0C2 | . | JMP | 9D1 | |
| 707 | 019 | 0C3 | . | #RP2 | 0B8 | |
| 708 | 019 | 0C4 | LSOB | R7(MDL) | B65 | |
| 709 | 019 | 0C5 | . | S8(MDL) | BF5 | |
| 710 | 019 | 0C6 | . | WRTL | E05 | |
| 711 | 019 | 0C7 | . | JMP0 | 386 | |
| 712 | 019 | 0C8 | . | @000 | 000 | |
| 713 | 019 | 0C9 | . | @008 | 008 | |

\*\*

```
PROGRAM NAME, ISSUE NUMBER? /DJ SEGM 01A-01F/,3
MAXIMUM NUMBER OF STATEMENTS? 60000
STARTING LOCATION IN REGISTER PU (3 HEX DIGITS)? 01A
STARTING LOCATION IN REGISTER PL (3 HEX DIGITS)? 000
ASSEMBLER  (YES, YES-U, NO, OR NO-U)? NO
OUTPUT (LIST, PARTIAL LIST, TAPE, COMPRESSED FILE, LABEL, OR NONE)
? LIST
PAGE FORMAT (YES OR NO) ? YES
```

```
*************** /DJ SEGM 01A-01F/ ***************ISSUE NO. 3

NO.  PU   PL    LABEL MNEMONIC       CODE      COMMENTS           PAGE  1

*                                    PU        PL
*       PROGRAM NAME                 STARTING ADDRESS             PAGE
*    STEP RIGHT EM                   01A       000                 2
*    STEP LEFT EM                    01A       014                 2
*    SCROLL DATA UP(SCAN)            01A       030                 4
*    SCROLL DATA UP(STEP)            01A       042                 4
*    SCROLL DATA DOWN(SCAN)          01A       091                 6
*    SCROLL DATA DOWN(STEP)          01A       0A3                 7
*    SCAN UP EM                      01A       0FF                10
*    STEP UP EM                      01B       012                10
*    SCAN DOWN EM                    01B       064                13
*    STEP DOWN EM                    01B       076                14
*    HOME EM                         01B       0A4                16
*    EDIT EM                         01B       0F1                18
*    END FIELD                       01C       020                19
*    START FIELD                     01C       02A                19
*    TRANSMIT KEY                    01C       082                22
*    TAB EM                          01D       000                26
*    DELETE REST                     01D       05A                29
*    STORY END                       01D       060                30
*    CAR. RET.-LINE FEED             01D       06E                31
*    COMPRESS DATA                   01E       000                35
*    LINE STRADDLE SUBR.             01F       000                44
*
*
*
*
*
*
**

* ------------------STEP RIGHT EM PROGRAM------------------------
*
*LOOK FOR LAST SEG
*IF NOT LAST CHAR - STEP RIGHT 0  01A   000    STPRT  READ          E03
    1  01A   001     .     RL(A)         A51
    2  01A   002     .     SI(A)         B81
    3  01A   003     .     R4(MDU)       B36
    4  01A   004     .     ADD(MDU)      956
    5  01A   005     .     TR4(A)        CB1    TEST INDEX
    6  01A   006     .     #TIND         0DF
    7  01A   007     .     SL(A)         AC1    SEG IS LAST
    8  01A   008     .     R8(A)         B71
    9  01A   009     .     NOP           800
   10  01A   00A     .     CMPR(MDL)     9D5
   11  01A   00B     .     #END          029

*STEP RIGHT 12  01A   00C    STPR   R3(MAL)       B23
   13  01A   00D     .     LOPSG2        151
   14  01A   00E     .     LOCEM         200
   15  01A   00F     .     STEPR         258
   16  01A   010     .     UPDEM         160
   17  01A   011     .     JMP           9D1
   18  01A   012     .     #END          029
   19  01A   013     .     NOP           800
```

```
NO.  PU   PL   LABEL  MNEMONIC        CODE    COMMENTS
```

*IF NOT 1ST CHAR OF 2ND SEG STEP LEFT

```
20  01A  014   STPLT  READ            E03
21  01A  015     .    X(A)(UA)        81A
22  01A  016     .    @007            007
23  01A  017     .    AND(MDU)        9F6
24  01A  018     .    R1(A)           B01
25  01A  019     .    TRL(A)          C31
26  01A  01A    .     #+8             021
27  01A  01B    .     NOP             800
28  01A  01C    .     NOP             800
29  01A  01D    .     NOP             800
30  01A  01E    .     NOP             800
31  01A  01F    .     JMP             9D1
32  01A  020    .     #STPL           024
33  01A  021    .     S4(A)           BB1
34  01A  022    .     CMPR(MDL)       9D5
35  01A  023    .     #END            029
```

*   STEP LEFT

```
36  01A  024   STPL   R3(MAL)         B23
37  01A  025    .     LOPSG2          151
38  01A  026    .     LOCEM           200
39  01A  027    .     STEPL           226
40  01A  028    .     UPDEM           160
41  01A  029   END    JMPO            386
42  01A  02A    .     @000            000
43  01A  02B    .     @003            008
44  01A  02C    .     NOP             800
45  01A  02D    .     NOP             800
46  01A  02E    .     NOP             800
47  01A  02F    .     NOP             800
```

**

*------------------------SCROLL DATA PROGRAMS------------------------
*
*   SCAN SCROLL UP

```
48  01A  030   SCUS   S3(MAL)         BA3
49  01A  031    .     READU           E02
50  01A  032    .     TRL(MDU)        C36
51  01A  033    .     #INC1C          03A
52  01A  034    .     TR1(MDU)        C86
53  01A  035    .     #INC2C          03E
54  01A  036    .     INCR(MDU)       A26
55  01A  037    .     WRTU            E06
56  01A  038    .     TS2(MDU)        D96
57  01A  039    .     #STOP           045
58  01A  03A   INC1C  S1(MDU)         B86
59  01A  03B    .     WRTU            E06
60  01A  03C    .     TS1(MDU)        D86
61  01A  03D    .     #SCRUP          042
62  01A  03E   INC2C  R2(MDU)         B16
63  01A  03F    .     WRTU            E06
64  01A  040    .     TR2(MDU)        C96
65  01A  041    .     #STOP           045
```

*   SCROLL UP

```
66  01A  042   SCRUP  SUBRTN          17F
67  01A  043    .     @01A            01A
68  01A  044    .     #SCRU           048
69  01A  045   STOP   JMPO            386
70  01A  046    .     @000            000
```

| NO. | PU | PL | LABEL | MNEMONIC | CODE | COMMENTS |
|---|---|---|---|---|---|---|
| 71 | 01A | 047 | . | @008 | 008 | |
| 72 | 01A | 048 | SCRU | X(A)(UA) | 81A | |
| 73 | 01A | 049 | . | @030 | 030 | |
| 74 | 01A | 04A | . | TR7(MAL) | CE3 | |
| 75 | 01A | 04B | . | #+3 | 04D | |
| 76 | 01A | 04C | . | S7(A) | BE1 | |
| 77 | 01A | 04D | . | X(MAL)(A) | 831 | |
| 78 | 01A | 04E | . | READL | E01 | |
| 79 | 01A | 04F | . | X(A)(MDL) | 815 | |
| 80 | 01A | 050 | . | R5(MAL) | B43 | |
| 81 | 01A | 051 | . | R6(MAL) | B53 | |
| 82 | 01A | 052 | . | S2(MAL) | B93 | |
| 83 | 01A | 053 | . | S3(MAL) | BA3 | |
| 84 | 01A | 054 | . | READL | E01 | |

*COMPARE SEG 8 FOR LAST ADDRESS

| NO. | PU | PL | LABEL | MNEMONIC | CODE | COMMENTS |
|---|---|---|---|---|---|---|
| 85 | 01A | 055 | . | CMPR(MDL) | 9D5 | |
| 86 | 01A | 056 | . | #RTRN | 08D | |
| 87 | 01A | 057 | . | DIMAL | 3FD | |
| 88 | 01A | 058 | . | LOPSG2 | 151 | |
| 89 | 01A | 059 | . | RL(MAL) | A53 | |

*CLEAR EM OPER. SEG.

| NO. | PU | PL | LABEL | MNEMONIC | CODE | COMMENTS |
|---|---|---|---|---|---|---|
| 90 | 01A | 05A | . | RL(MDL) | A55 | |
| 91 | 01A | 05B | . | WRTL | E05 | |
| 92 | 01A | 05C | . | CTLA | 15C | |
| 93 | 01A | 05D | . | DIMAL | 3FB | |
| 94 | 01A | 05E | . | READ | E03 | |
| 95 | 01A | 05F | . | INCR(MDU) | A26 | |
| 96 | 01A | 060 | . | INCR(MDL) | A25 | |
| 97 | 01A | 061 | . | NOP | 800 | |
| 98 | 01A | 062 | . | NOP | 800 | |
| 99 | 01A | 063 | . | WRT | E07 | |
| 100 | 01A | 064 | . | TS3(MAL) | DA3 | 2ND SEG. NEXT |
| 101 | 01A | 065 | . | #-7 | 05D | |
| 102 | 01A | 066 | . | DIMAL | 3FB | |
| 103 | 01A | 067 | . | READL | E01 | |
| 104 | 01A | 068 | . | INCR(MDL) | A25 | |
| 105 | 01A | 069 | . | WRTL | E05 | 2ND DISP SEG |
| 106 | 01A | 06A | . | X(A)(MDL) | 815 | SAVE ADD IN A |
| 107 | 01A | 06B | . | S4(MAL) | BB3 | |
| 108 | 01A | 06C | . | READ | E03 | |
| 109 | 01A | 06D | . | X(G)(MDL) | 825 | SAVE EM ADD |
| 110 | 01A | 06E | . | LOPSG3 | 152 | |
| 111 | 01A | 06F | . | RL(MAL) | A53 | |
| 112 | 01A | 070 | . | X(MDL)(G) | 852 | UPDATE EM IN OPSEG |
| 113 | 01A | 071 | . | WRTL | E05 | |
| 114 | 01A | 072 | . | X(MAU)(A) | 841 | |
| 115 | 01A | 073 | . | DECR(MAU) | AF4 | |
| 116 | 01A | 074 | . | READU | E02 | |
| 117 | 01A | 075 | . | R1(MDU) | B06 | |
| 118 | 01A | 076 | CPTR1 | WRTU | E06 | CHANGE DISPLAY PTR |
| 119 | 01A | 077 | . | TR1(MDU) | C86 | |
| 120 | 01A | 078 | . | #+6 | 07D | |
| 121 | 01A | 079 | . | TR2(MDU) | C96 | |
| 122 | 01A | 07A | . | #+4 | 07D | |
| 123 | 01A | 07B | . | TS3(MDU) | DA6 | |
| 124 | 01A | 07C | . | #RTRN | 08D | |
| 125 | 01A | 07D | . | INCR(MAU) | A24 | |
| 126 | 01A | 07E | . | READU | E02 | |
| 127 | 01A | 07F | . | X(A)(UA) | 81A | |
| 128 | 01A | 080 | . | @007 | 007 | |
| 129 | 01A | 081 | . | AND(MDU) | 9F6 | |
| 130 | 01A | 082 | . | TRL(A) | C31 | |
| 131 | 01A | 083 | . | #WSEV | 087 | |

| NO. | PU | PL | LABEL | MNEMONIC | CODE | COMMENTS |
|---|---|---|---|---|---|---|
| 132 | 01A | 084 | . | DECR(MDU) | AF6 | |
| 133 | 01A | 085 | . | JMP | 9D1 | |
| 134 | 01A | 086 | . | #CPTR1 | 076 | |
| 135 | 01A | 087 | WSEV | X(A)(UA) | 81A | |
| 136 | 01A | 088 | . | @007 | 007 | |
| 137 | 01A | 089 | . | OR(MDU) | 9E6 | |
| 138 | 01A | 08A | . | X(MDU)(A) | 861 | |
| 139 | 01A | 08B | . | JMP | 9D1 | |
| 140 | 01A | 08C | . | #CPTR1 | 076 | |
| 141 | 01A | 08D | RTRN | RETURN | 18B | |
| 142 | 01A | 08E | . | NOP | 800 | |
| 143 | 01A | 08F | . | NOP | 800 | |
| 144 | 01A | 090 | . | NOP | 800 | |

* SCAN SCROLL DOWN

| NO. | PU | PL | LABEL | MNEMONIC | CODE | COMMENTS |
|---|---|---|---|---|---|---|
| 145 | 01A | 091 | SCES | S3(MAL) | BA3 | |
| 146 | 01A | 092 | . | READU | E02 | |
| 147 | 01A | 093 | . | TRL(MDU) | C36 | |
| 148 | 01A | 094 | . | #INC1D | 09B | |
| 149 | 01A | 095 | . | TR1(MDU) | C86 | |
| 150 | 01A | 096 | . | #INC2D | 09F | |
| 151 | 01A | 097 | . | INCR(MDU) | A26 | |
| 152 | 01A | 098 | . | WRTU | E06 | |
| 153 | 01A | 099 | . | TS2(MDU) | D96 | |
| 154 | 01A | 09A | . | #STOP | 045 | |
| 155 | 01A | 09B | INC1D | S1(MDU) | B86 | |
| 156 | 01A | 09C | . | WRTU | E06 | |
| 157 | 01A | 09D | . | TS1(MDU) | D86 | |
| 158 | 01A | 09E | . | #SCRDN | 0A3 | |
| 159 | 01A | 09F | INC2D | R2(MDU) | B16 | |
| 160 | 01A | 0A0 | . | WRTU | E06 | |
| 161 | 01A | 0A1 | . | TR2(MDU) | C96 | |
| 162 | 01A | 0A2 | . | #STOP | 045 | |

*
**   SCROLL DOWN

| NO. | PU | PL | LABEL | MNEMONIC | CODE | COMMENTS |
|---|---|---|---|---|---|---|
| 163 | 01A | 0A3 | SCRDN | R3(MAL) | B23 | |
| 164 | 01A | 0A4 | . | R4(MAL) | B33 | |
| 165 | 01A | 0A5 | . | READU | E02 | |
| 166 | 01A | 0A6 | . | X(A)(MDU) | 816 | |
| 167 | 01A | 0A7 | . | INCR(A) | A21 | |
| 168 | 01A | 0A8 | . | READL | E01 | |

*COMPARE SEG 2 FOR 1ST ADDRESS

| NO. | PU | PL | LABEL | MNEMONIC | CODE | COMMENTS |
|---|---|---|---|---|---|---|
| 169 | 01A | 0A9 | . | CMPR(MDL) | 9D5 | |
| 170 | 01A | 0AA | . | #STOP | 045 | |
| 171 | 01A | 0AB | . | S4(MAL) | BB3 | |
| 172 | 01A | 0AC | . | LOPSG2 | 151 | |
| 173 | 01A | 0AD | . | RL(MDL) | A55 | |

*CLEAR EM OPSEG.

| NO. | PU | PL | LABEL | MNEMONIC | CODE | COMMENTS |
|---|---|---|---|---|---|---|
| 174 | 01A | 0AE | . | RL(MAL) | A53 | |
| 175 | 01A | 0AF | . | WRTL | E05 | |
| 176 | 01A | 0B0 | . | NOP | 800 | |
| 177 | 01A | 0B1 | . | CTLA | 15C | |
| 178 | 01A | 0B2 | . | DDMAL | 3FB | |
| 179 | 01A | 0B3 | . | READ | E03 | |
| 180 | 01A | 0B4 | . | DECR(MDU) | AF6 | |
| 181 | 01A | 0B5 | . | DECR(MDL) | AF5 | |
| 182 | 01A | 0B6 | . | WRT | E07 | |
| 183 | 01A | 0B7 | . | TS3(MAL) | DA3 | 2ND SEG NEXT |
| 184 | 01A | 0B8 | . | #-5 | 0B2 | |
| 185 | 01A | 0B9 | . | DDMAL | 3FB | |

| NO. | PU | PL | LABEL | MNEMONIC | CODE | COMMENTS |
|---|---|---|---|---|---|---|
| 186 | 01A | 0BA | . | READL | E01 | |
| 187 | 01A | 0BB | . | DECR(MDL) | AF5 | |
| 188 | 01A | 0BC | . | WRTL | E05 | |
| 189 | 01A | 0BD | . | X(A)(MDL) | 815 | SAVE ADD SEG 2 |
| 190 | 01A | 0BE | . | S4(MAL) | BB3 | |
| 191 | 01A | 0BF | . | READ | E03 | |
| 192 | 01A | 0C0 | . | X(G)(MDL) | 825 | SAVE EM ADD |
| 193 | 01A | 0C1 | . | LOPSG3 | 152 | |
| 194 | 01A | 0C2 | . | RL(MAL) | A53 | |
| 195 | 01A | 0C3 | . | X(MDL)(G) | 852 | |
| 196 | 01A | 0C4 | . | WRTL | E05 | |
| 197 | 01A | 0C5 | . | X(MAU)(A) | 841 | |
| 198 | 01A | 0C6 | . | READU | E02 | |
| 199 | 01A | 0C7 | . | S1(MDU) | B86 | |
| 200 | 01A | 0C8 | CPTR2 | WRTU | E06 | |
| 201 | 01A | 0C9 | . | INCR(MAU) | A24 | |
| 202 | 01A | 0CA | . | READU | E02 | |
| 203 | 01A | 0CB | . | TR1(MDU) | C86 | |
| 204 | 01A | 0CC | . | #+6 | 0D1 | |
| 205 | 01A | 0CD | . | TR2(MDU) | C96 | |
| 206 | 01A | 0CE | . | #+4 | 0D1 | |
| 207 | 01A | 0CF | . | TS3(MDU) | DA6 | |
| 208 | 01A | 0D0 | . | #+5 | 0D4 | |
| 209 | 01A | 0D1 | . | INCR(MDU) | A26 | |
| 210 | 01A | 0D2 | . | JMP | 9D1 | |
| 211 | 01A | 0D3 | . | #CPTR2 | 0C8 | |
| 212 | 01A | 0D4 | . | R1(MDU) | B06 | |
| 213 | 01A | 0D5 | . | R2(MDU) | B16 | |
| 214 | 01A | 0D6 | . | R3(MDU) | B26 | |
| 215 | 01A | 0D7 | . | RL(MDL) | A55 | |
| 216 | 01A | 0D8 | . | WRT | E07 | |
| 217 | 01A | 0D9 | . | NOP | 800 | |
| 218 | 01A | 0DA | . | NOP | 800 | |
| 219 | 01A | 0DB | . | NOP | 800 | |
| 220 | 01A | 0DC | . | JMPO | 386 | |
| 221 | 01A | 0DD | . | #000 | 000 | |
| 222 | 01A | 0DE | . | #008 | 008 | |
| 223 | 01A | 0DF | TIND | TR1(A) | C81 | |
| 224 | 01A | 0E0 | . | #STPR | 00C | |

*TO CHECK FOR STEP FROM INDEX TO EDIT AREA

| 225 | 01A | 0E1 | . | R1(A) | B01 | |
|---|---|---|---|---|---|---|
| 226 | 01A | 0E2 | . | TSY(A) | D31 | |
| 227 | 01A | 0E3 | . | #STPR | 00C | |
| 228 | 01A | 0E4 | . | SL(A) | AC1 | |
| 229 | 01A | 0E5 | . | R8(A) | B71 | |
| 230 | 01A | 0E6 | . | CMPR(MDL) | 9D5 | |
| 231 | 01A | 0E7 | . | #+4 | 0EA | CHAR IS LAST |
| 232 | 01A | 0E8 | . | JMP | 9D1 | |
| 233 | 01A | 0E9 | . | #STPR | 00C | |
| 234 | 01A | 0EA | . | JMPO | 386 | |
| 235 | 01A | 0EB | . | #01B | 01B | |
| 236 | 01A | 0EC | . | #EDIT | 0F1 | |
| 237 | 01A | 0ED | . | NOP | 800 | |
| 238 | 01A | 0EE | . | NOP | 800 | |
| 239 | 01A | 0EF | . | NOP | 800 | |
| 240 | 01A | 0F0 | . | NOP | 800 | |
| 241 | 01A | 0F1 | . | NOP | 800 | |
| 242 | 01A | 0F2 | . | NOP | 800 | |
| 243 | 01A | 0F3 | . | NOP | 800 | |
| 244 | 01A | 0F4 | . | NOP | 800 | |
| 245 | 01A | 0F5 | . | NOP | 800 | |
| 246 | 01A | 0F6 | . | NOP | 800 | |
| 247 | 01A | 0F7 | . | NOP | 800 | |
| 248 | 01A | 0F8 | . | NOP | 800 | |
| 249 | 01A | 0F9 | . | NOP | 800 | |

| NO. | PU | PL | LABEL | MNEMONIC | CODE | COMMENTS |
|---|---|---|---|---|---|---|
| 250 | 01A | 0FA | . | NOP | 800 | |
| 251 | 01A | 0FB | . | NOP | 800 | |
| 252 | 01A | 0FC | . | NOP | 800 | |
| 253 | 01A | 0FD | . | NOP | 800 | |
| 254 | 01A | 0FE | . | NOP | 800 | |

\*\*

\*----------------------SCAN UP EM PROGRAM--------------------------------

| NO. | PU | PL | LABEL | MNEMONIC | CODE | COMMENTS |
|---|---|---|---|---|---|---|
| 255 | 01A | 0FF | SCNU | S3(MAL) | BA3 | |
| 256 | 01B | 000 | . | READU | E02 | TEST FOR SCAN |
| 257 | 01B | 001 | . | TRL(MDU) | C36 | IF RESET DO IT |
| 258 | 01B | 002 | . | #INC1B | 009 | |
| 259 | 01B | 003 | . | TRI(MDU) | C86 | BIT 1 OF CTR SET |
| 260 | 01B | 004 | . | #INC2B | 00E | |
| 261 | 01B | 005 | . | INCR(MDU) | A26 | YES |
| 262 | 01B | 006 | . | WRTU | E06 | SET 2 |
| 263 | 01B | 007 | . | TS2(MDU) | D96 | |
| 264 | 01B | 008 | . | #END1 | 038 | |
| 265 | 01B | 009 | INC1B | S1(MDU) | B86 | SET BIT 1 OF CTR |
| 266 | 01B | 00A | . | WRTU | E06 | |
| 267 | 01B | 00B | . | R3(MAL) | B23 | |
| 268 | 01B | 00C | . | JMP | 9D1 | |
| 269 | 01B | 00D | . | #STUP | 012 | |
| 270 | 01B | 00E | INC2B | R2(MDU) | B16 | RESET 2ND BIT OF CTR |
| 271 | 01B | 00F | . | WRTU | E06 | |
| 272 | 01B | 010 | . | JMP | 9D1 | |
| 273 | 01B | 011 | . | #END1 | 038 | |

\*IS EM IN 2ND DISPLAY SIG

| NO. | PU | PL | LABEL | MNEMONIC | CODE | COMMENTS |
|---|---|---|---|---|---|---|
| 274 | 01B | 012 | STUP | READ | E03 | |
| 275 | 01B | 013 | . | X(A)(UA) | 81A | |
| 276 | 01B | 014 | . | @007 | 007 | |
| 277 | 01B | 015 | . | AND(MDU) | 9F6 | |
| 278 | 01B | 016 | . | R1(A) | B01 | |
| 279 | 01B | 017 | . | TRL(A) | C31 | |
| 280 | 01B | 018 | . | #+4 | 01B | |
| 281 | 01B | 019 | . | JMP | 9D1 | EM IN SOME OTHER SEG |
| 282 | 01B | 01A | . | #STU | 021 | |
| 283 | 01B | 01B | . | TS7(MDL) | DE5 | |
| 284 | 01B | 01C | . | #STU | 021 | |
| 285 | 01B | 01D | . | TR6(MDL) | CD5 | |
| 286 | 01B | 01E | . | #END1 | 038 | |
| 287 | 01B | 01F | . | TR5(MDL) | CC5 | |
| 288 | 01B | 020 | . | #END1 | 038 | |
| 289 | 01B | 021 | STU | LOPSG2 | 151 | |
| 290 | 01B | 022 | . | RL(MAL) | A53 | |
| 291 | 01B | 023 | . | READL | E01 | |
| 292 | 01B | 024 | . | TS7(MDL) | DE5 | |
| 293 | 01B | 025 | . | #+6 | 02A | GO TO SUB 40. NOT LINE 1 |
| 294 | 01B | 026 | . | TR6(MDL) | CD5 | |
| 295 | 01B | 027 | . | #ADD80 | 055 | GO TO ADD 80 |
| 296 | 01B | 028 | . | TR5(MDL) | CC5 | |
| 297 | 01B | 029 | . | #ADD80 | 055 | GO TO ADD 80 |
| 298 | 01B | 02A | . | X(A)(MDL) | 815 | |
| 299 | 01B | 02B | . | X(MDL)(UA) | 85A | |
| 300 | 01B | 02C | . | @028 | 028 | |
| 301 | 01B | 02D | . | SUB(MDL) | 925 | |
| 302 | 01B | 02E | LKTAB | X(MDL)(A) | 851 | |
| 303 | 01B | 02F | . | WRTL | E05 | PUT EM LOCATION-40 OR +80 IN |
| 304 | 01B | 030 | . | LOCEM | 200 | |
| 305 | 01B | 031 | . | READC | E00 | |
| 306 | 01B | 032 | . | TS8(MDL) | DF5 | LOOKFOR TAB |
| 307 | 01B | 033 | . | #+12 | 03E | |
| 308 | 01B | 034 | NOTAB | X(MDL)(MAL) | 853 | |

| NO. | PU | PL | LABEL | MNEMONIC | CODE | COMMENTS |
|---|---|---|---|---|---|---|
| 309 | 01B | 035 | . | RL(MAL) | A53 | |
| 310 | 01B | 036 | . | WRTL | E05 | |
| 311 | 01B | 037 | . | UPDEM | 160 | |
| 312 | 01B | 038 | END1 | JMP0 | 386 | |
| 313 | 01B | 039 | . | #000 | 000 | |
| 314 | 01B | 03A | . | #008 | 008 | |
| 315 | 01B | 03B | SPSTD | R3(MAL) | B23 | IS CHAR 2ND BYTE? |
| 316 | 01B | 03C | . | JMP | 9D1 | |
| 317 | 01B | 03D | . | #STDN | 076 | |
| 318 | 01B | 03E | . | TS1(MAL) | D83 | |
| 319 | 01B | 03F | . | #SUTAB | 043 | |
| 320 | 01B | 040 | . | READL | E01 | |
| 321 | 01B | 041 | . | TR8(MDL) | CF5 | |
| 322 | 01B | 042 | . | #NOTAB | 034 | |
| 323 | 01B | 043 | SUTAB | DIMAL | 3FD | SUCCESSIVE TABS |
| 324 | 01B | 044 | . | READ | E03 | |
| 325 | 01B | 045 | . | TS8(MDU) | DF6 | |
| 326 | 01B | 046 | . | #+10 | 04F | |
| 327 | 01B | 047 | . | TS8(MAL) | DF3 | |
| 328 | 01B | 048 | . | #+5 | 04C | NO SUCC. TABS |
| 329 | 01B | 049 | . | DECR(MAL) | AF3 | |
| 330 | 01B | 04A | . | JMP | 9D1 | |
| 331 | 01B | 04B | . | #NOTAB | 034 | |
| 332 | 01B | 04C | . | DCMAL | 3FB | |
| 333 | 01B | 04D | . | JMP | 9D1 | |
| 334 | 01B | 04E | . | #NOTAB | 034 | |
| 335 | 01B | 04F | . | TS8(MDL) | DF5 | |
| 336 | 01B | 050 | . | #SUTAB | 043 | |
| 337 | 01B | 051 | . | JMP | 9D1 | |
| 338 | 01B | 052 | . | #NOTAB | 034 | |
| 339 | 01B | 053 | . | NOP | 800 | |
| 340 | 01B | 054 | . | NOP | 800 | |
| 341 | 01B | 055 | ADD80 | S1(MAL) | B83 | |
| 342 | 01B | 056 | . | S2(MAL) | B93 | |
| 343 | 01B | 057 | . | X(A)(MDL) | 815 | SAVE ADD |
| 344 | 01B | 058 | . | READL | E01 | LOOK FOR 1ST SEG |
| 345 | 01B | 059 | . | TR8(MDL) | CF5 | |
| 346 | 01B | 05A | . | #END1 | 038 | |
| 347 | 01B | 05B | . | X(MDL)(UA) | 85A | |
| 348 | 01B | 05C | . | #050 | 050 | ADD 80 |
| 349 | 01B | 05D | . | ADD(MDL) | 955 | NEW EM ADD IN A |
| 350 | 01B | 05E | . | RL(MAL) | A53 | |
| 351 | 01B | 05F | . | RL(MDL) | A55 | |
| 352 | 01B | 060 | . | WRTL | E05 | ERASE OLD EM |
| 353 | 01B | 061 | . | DECR(MAU) | AF4 | |
| 354 | 01B | 062 | . | JMP | 9D1 | |
| 355 | 01B | 063 | . | #LKTAB | 02E | |

**

*------------------------SCAN DOWN EM PROGRAM------------------------
*
*TEST FOR SCAN (DOWN)

| NO. | PU | PL | LABEL | MNEMONIC | CODE | COMMENTS |
|---|---|---|---|---|---|---|
| 356 | 01B | 064 | SCND | S3(MAL) | BA3 | |
| 357 | 01B | 065 | . | READU | E02 | |
| 358 | 01B | 066 | . | TRL(MDU) | C36 | IF RESET DO IT |
| 359 | 01B | 067 | . | #INC1A | 06E | |
| 360 | 01B | 068 | . | TR1(MDU) | C86 | BIT 1 OF CTR SET? |
| 361 | 01B | 069 | . | #INC2A | 072 | |
| 362 | 01B | 06A | . | INCR(MDU) | A26 | YES |
| 363 | 01B | 06B | . | WRTU | E06 | SET 2 |
| 364 | 01B | 06C | . | TS2(MDU) | D96 | |
| 365 | 01B | 06D | . | #END1 | 038 | |

*SET BIT#1 OF CTR

| NO. | PU | PL | LABEL | MNEMONIC | CODE | COMMENTS |
|---|---|---|---|---|---|---|
| 366 | 01B | 06E | INC1A | S1(MDU) | B86 | |
| 367 | 01B | 06F | . | WRTU | E06 | |

| NO. | PU | PL | LABEL | MNEMONIC | CODE | COMMENTS |
|---|---|---|---|---|---|---|
| 368 | 01B | 070 | ∘ | TS1(MDU) | D86 | |
| 369 | 01B | 071 | ∘ | ∅SPSTD | 03B | |

*RESET BIT 2 OF CTR

| NO. | PU | PL | LABEL | MNEMONIC | CODE | COMMENTS |
|---|---|---|---|---|---|---|
| 370 | 01B | 072 | INC2A | R2(MDU) | B16 | |
| 371 | 01B | 073 | ∘ | WRTU | E06 | |
| 372 | 01B | 074 | ∘ | TR2(MDU) | C96 | |
| 373 | 01B | 075 | ∘ | ∅END1 | 038 | |

**

*---------------------STEP DOWN EM PROGRAM---------------------
*
*LOOK FOR LAST LINE LAST SEG
*   STEP DOWN

| NO. | PU | PL | LABEL | MNEMONIC | CODE | COMMENTS |
|---|---|---|---|---|---|---|
| 374 | 01B | 076 | STDN | READ | E03 | |
| 375 | 01B | 077 | ∘ | TR7(MDL) | CE5 | |
| 376 | 01B | 078 | ∘ | ∅STD | 087 | |
| 377 | 01B | 079 | ∘ | TS6(MDL) | DD5 | |
| 378 | 01B | 07A | ∘ | ∅LASTL | 07F | |
| 379 | 01B | 07B | ∘ | TR5(MDL) | CC5 | |
| 380 | 01B | 07C | ∘ | ∅STD | 087 | |
| 381 | 01B | 07D | ∘ | TR4(MDL) | CB5 | |
| 382 | 01B | 07E | ∘ | ∅STD | 087 | |
| 383 | 01B | 07F | LASTL | X(A)(MDU) | 816 | |
| 384 | 01B | 080 | ∘ | TPAT | 3D9 | |
| 385 | 01B | 081 | ∘ | ∅007 | 007 | |
| 386 | 01B | 082 | ∘ | ∅007 | 007 | |
| 387 | 01B | 083 | ∘ | ∅END1 | 038 | |
| 388 | 01B | 084 | ∘ | NOP | 800 | |
| 389 | 01B | 085 | ∘ | TRL(MDU) | C36 | |
| 390 | 01B | 086 | ∘ | ∅EDIT | 0F1 | |
| 391 | 01B | 087 | STD | LOPSG2 | 151 | |
| 392 | 01B | 088 | ∘ | RL(MAL) | A53 | |
| 393 | 01B | 089 | ∘ | READL | E01 | |
| 394 | 01B | 08A | ∘ | TR7(MDL) | CE5 | |
| 395 | 01B | 08B | ∘ | ∅+8 | 092 | NOT LAST LINE OF SEG |
| 396 | 01B | 08C | ∘ | TR5(MDL) | CC5 | |
| 397 | 01B | 08D | ∘ | ∅+4 | 090 | |
| 398 | 01B | 08E | ∘ | TS4(MDL) | DB5 | |
| 399 | 01B | 08F | ∘ | ∅LLOS | 09A | |
| 400 | 01B | 090 | ∘ | TS6(MDL) | DD5 | |
| 401 | 01B | 091 | ∘ | ∅LLOS | 09A | LASTLINE OF SEG |
| 402 | 01B | 092 | ∘ | X(A)(UA) | 81A | |
| 403 | 01B | 093 | ∘ | ∅028 | 028 | PUT 040 IN A |
| 404 | 01B | 094 | ∘ | ADD(MDL) | 955 | |
| 405 | 01B | 095 | ∘ | X(MDL)(A) | 851 | |
| 406 | 01B | 096 | ∘ | RL(MAL) | A53 | |
| 407 | 01B | 097 | UPD | WRTL | E05 | |
| 408 | 01B | 098 | ∘ | JMP | 9D1 | |
| 409 | 01B | 099 | ∘ | ∅LKTAB | 02E | |
| 410 | 01B | 09A | LLOS | X(A)(MDL) | 815 | |
| 411 | 01B | 09B | ∘ | X(MDL)(UA) | 85A | |
| 412 | 01B | 09C | ∘ | ∅050 | 050 | |
| 413 | 01B | 09D | ∘ | SUB(MDL) | 925 | SUB 80 FROM EM LOCATION |
| 414 | 01B | 09E | ∘ | RL(MDL) | A55 | |
| 415 | 01B | 09F | ∘ | WRTL | E05 | |
| 416 | 01B | 0A0 | ∘ | X(MDL)(A) | 851 | |
| 417 | 01B | 0A1 | ∘ | INCR(MAU) | A24 | |
| 418 | 01B | 0A2 | ∘ | JMP | 9D1 | |
| 419 | 01B | 0A3 | ∘ | ∅UPD | 097 | |

**

| NO. | PU | PL | LABEL | MNEMONIC | CODE | COMMENTS |
|---|---|---|---|---|---|---|

*---------------------HOME EM PROGRAM---------------------

| NO. | PU | PL | LABEL | MNEMONIC | CODE | COMMENTS |
|---|---|---|---|---|---|---|
| 420 | 01B | 0A4 | DHOME | X(A)(UA) | 81A | |
| 421 | 01B | 0A5 | . | #007 | 007 | |
| 422 | 01B | 0A6 | . | READ | E03 | READ PTR |
| 423 | 01B | 0A7 | . | AND(MDU) | 9F6 | |
| 424 | 01B | 0A8 | . | TRL(A) | C31 | TEST IF PTR TO SEG 1 |
| 425 | 01B | 0A9 | . | #IOPS1 | 0D1 | |
| 426 | 01B | 0AA | . | TS3(A) | DA1 | |
| 427 | 01B | 0AB | . | #+4 | 0AE | |
| 428 | 01B | 0AC | . | TR2(A) | C91 | TEST IF PTR TO SEG 2 |
| 429 | 01B | 0AD | . | #IOPS2 | 0E6 | |
| 430 | 01B | 0AE | ALHM | TR7(MAL) | CE3 | |
| 431 | 01B | 0AF | . | #+3 | 0B1 | |
| 432 | 01B | 0B0 | . | S7(A) | BE1 | |
| 433 | 01B | 0B1 | . | X(MAL)(A) | 831 | GET SEG ADD OF EM |
| 434 | 01B | 0B2 | . | READC | E00 | SEG ADD INTO MDL |
| 435 | 01B | 0B3 | . | X(MAU)(MDL) | 845 | ADD OP SEG WITH OLD EM |
| 436 | 01B | 0B4 | . | RL(MAL) | A53 | |
| 437 | 01B | 0B5 | . | RL(MDL) | A55 | |
| 438 | 01B | 0B6 | . | WRTL | E05 | WRITE 0 IN OLD EM LOCATION |
| 439 | 01B | 0B7 | CONTA | X(G)(A) | 821 | CONT AREA ADD IN MDU |
| 440 | 01B | 0B8 | . | READU | E02 | |
| 441 | 01B | 0B9 | . | SHFTR(MDU) | A76 | |
| 442 | 01B | 0BA | . | SHFTR(MDU) | A76 | |
| 443 | 01B | 0BB | . | SHFTR(MDU) | A76 | |
| 444 | 01B | 0BC | . | TR5(MDU) | CC6 | |
| 445 | 01B | 0BD | . | #+3 | 0BF | |
| 446 | 01B | 0BE | . | S7(MAL) | BE3 | |
| 447 | 01B | 0BF | . | R5(MDU) | B46 | |
| 448 | 01B | 0C0 | . | X(A)(UA) | 81A | |
| 449 | 01B | 0C1 | . | #004 | 004 | |
| 450 | 01B | 0C2 | . | ADD(MDU) | 956 | ADD 4 TO SEG ADDRESS |
| 451 | 01B | 0C3 | . | X(MAU)(A) | 841 | CONT AREA ADD IN MAU |
| 452 | 01B | 0C4 | . | X(A)(G) | 812 | |
| 453 | 01B | 0C5 | . | TS8(A) | DF1 | |
| 454 | 01B | 0C6 | . | #CONTB | 0EB | |
| 455 | 01B | 0C7 | . | READ | E03 | SEG 2 ADD IN MDL |
| 456 | 01B | 0C8 | . | X(G)(MDL) | 825 | |
| 457 | 01B | 0C9 | . | S4(MAL) | BB3 | |
| 458 | 01B | 0CA | . | RL(MDU) | A56 | |
| 459 | 01B | 0CB | . | S1(MDU) | B86 | CHANGES PTR TO SEG 2 |
| 460 | 01B | 0CC | . | WRTU | E06 | |
| 461 | 01B | 0CD | . | RL(MAL) | A53 | |
| 462 | 01B | 0CE | . | X(MAU)(G) | 842 | |
| 463 | 01B | 0CF | . | TRL(MAL) | C33 | |
| 464 | 01B | 0D0 | . | #+5 | 0D4 | |
| 465 | 01B | 0D1 | IOPS1 | R4(MAL) | B33 | |
| 466 | 01B | 0D2 | . | READU | E02 | |
| 467 | 01B | 0D3 | . | X(MAU)(MDU) | 846 | |
| 468 | 01B | 0D4 | FIOPS | JMPO | 386 | |
| 469 | 01B | 0D5 | . | #01C | 01C | |

*LOOK FOR TABS

| NO. | PU | PL | LABEL | MNEMONIC | CODE | COMMENTS |
|---|---|---|---|---|---|---|
| 470 | 01B | 0D6 | . | #UPR | 010 | IF NO TAB GO TO UPDATE EM |
| 471 | 01B | 0D7 | . | NOP | 800 | |
| 472 | 01B | 0D8 | LTABS | TR3(MDL) | CF5 | |
| 473 | 01B | 0D9 | . | #UPEMR | 0DF | |
| 474 | 01B | 0DA | . | DIMAL | 3FD | |
| 475 | 01B | 0DB | . | READ | E03 | |
| 476 | 01B | 0DC | . | TS8(MDU) | DF6 | |
| 477 | 01B | 0DD | . | #-4 | 0D8 | |
| 478 | 01B | 0DE | . | DECR(MAL) | AF3 | |
| 479 | 01B | 0DF | UPEMR | X(A)(MAL) | 813 | SAVE EM LOC. |
| 480 | 01B | 0E0 | . | RL(MAL) | A53 | |

| NO. | PU | PL | LABEL | MNEMONIC | CODE | COMMENTS |
|---|---|---|---|---|---|---|
| 481 | 01B | 0E1 | . | X(MDL)(A) | 851 | |
| 482 | 01B | 0E2 | . | S8(A) | BF1 | REMEMBER UPEM SEQUENCE |
| 483 | 01B | 0E3 | . | WRTL | E05 | |
| 484 | 01B | 0E4 | . | JMP | 9D1 | |
| 485 | 01B | 0E5 | . | #CONTA | 0B7 | |
| 486 | 01B | 0E6 | IOPS2 | R4(MAL) | B33 | |
| 487 | 01B | 0E7 | . | READL | E01 | READ SEG 2 ADD |
| 488 | 01B | 0E8 | . | X(MAU)(MDL) | 845 | |
| 489 | 01B | 0E9 | . | JMP | 9D1 | |
| 490 | 01B | 0EA | . | #FIOPS | 0D4 | |
| 491 | 01B | 0EB | CONTB | S4(MAL) | BB3 | |
| 492 | 01B | 0EC | . | X(MDL)(A) | 851 | |
| 493 | 01B | 0ED | . | WRTL | E05 | |
| 494 | 01B | 0EE | . | JMP0 | 386 | |
| 495 | 01B | 0EF | . | #000 | 000 | |
| 496 | 01B | 0F0 | . | #008 | 008 | |

\*\*

\*------------------------EDIT EM PROGRAM------------------------

| NO. | PU | PL | LABEL | MNEMONIC | CODE | COMMENTS |
|---|---|---|---|---|---|---|
| 497 | 01B | 0F1 | EDIT | X(A)(UA) | 81A | |
| 498 | 01B | 0F2 | . | #007 | 007 | |
| 499 | 01B | 0F3 | . | READ | E03 | |
| 500 | 01B | 0F4 | . | AND(MDU) | 9F6 | |
| 501 | 01B | 0F5 | . | TRL(A) | C31 | TEST EM IN SEG 1 |
| 502 | 01B | 0F6 | . | #ALHM | 0AE | HOME IN SEG 2 |
| 503 | 01B | 0F7 | . | RL(MDU) | A56 | |
| 504 | 01B | 0F8 | . | WRTU | E06 | |
| 505 | 01B | 0F9 | . | TR7(MAL) | CE3 | |
| 506 | 01B | 0FA | . | #+3 | 0FC | |
| 507 | 01B | 0FB | . | S7(A) | BE1 | |
| 508 | 01B | 0FC | . | R4(MAL) | B33 | |
| 509 | 01B | 0FD | . | READC | E00 | |
| 510 | 01B | 0FE | . | X(G)(MDL) | 825 | |
| 511 | 01B | 0FF | . | X(MAL)(A) | 831 | |
| 512 | 01C | 000 | . | READC | E00 | |
| 513 | 01C | 001 | . | X(MAU)(MDL) | 845 | |
| 514 | 01C | 002 | . | RL(MAL) | A53 | |
| 515 | 01C | 003 | . | RL(MDL) | A55 | |
| 516 | 01C | 004 | . | WRTL | E05 | |
| 517 | 01C | 005 | . | X(MAU)(G) | 842 | |
| 518 | 01C | 006 | . | JMP0 | 386 | |
| 519 | 01C | 007 | . | #01B | 01B | |
| 520 | 01C | 008 | . | #FIOPS | 0D4 | |
| 521 | 01C | 009 | . | NOP | 800 | |
| 522 | 01C | 00A | . | NOP | 800 | |
| 523 | 01C | 00B | . | NOP | 800 | |
| 524 | 01C | 00C | . | NOP | 800 | |
| 525 | 01C | 00D | . | NOP | 800 | |
| 526 | 01C | 00E | . | NOP | 800 | |
| 527 | 01C | 00F | . | NOP | 800 | |
| 528 | 01C | 010 | UPR | S4(MAL) | BB3 | |
| 529 | 01C | 011 | . | R7(MAL) | B63 | |
| 530 | 01C | 012 | . | READ | E03 | |
| 531 | 01C | 013 | . | TR8(MDU) | CF6 | |
| 532 | 01C | 014 | . | #UPEM1 | 018 | |
| 533 | 01C | 015 | . | JMP0 | 386 | |
| 534 | 01C | 016 | . | #01B | 01B | |
| 535 | 01C | 017 | . | #0D8 | 0D8 | |
| 536 | 01C | 018 | UPEM1 | JMP0 | 386 | |
| 537 | 01C | 019 | . | #01B | 01B | |
| 538 | 01C | 01A | . | #UPEMR | 0DF | |
| 539 | 01C | 01B | . | NOP | 800 | |
| 540 | 01C | 01C | . | NOP | 800 | |
| 541 | 01C | 01D | . | NOP | 800 | |
| 542 | 01C | 01E | . | NOP | 800 | |
| 543 | 01C | 01F | . | NOP | 800 | |

\*\*

| NO. | PU | PL | LABEL | MNEMONIC | CODE | COMMENTS |
|---|---|---|---|---|---|---|
*
*----------------------START-END FIELD----------------------

| 544 | 01C | 020 | EFLD | DIMAL | 3FD | |
| 545 | 01C | 021 | . | R1(PR2) | B0F | |
| 546 | 01C | 022 | . | READU | E02 | |
| 547 | 01C | 023 | . | TS7(MDU) | DE6 | LOOK FOR PREV. END FIELD |
| 548 | 01C | 024 | . | #END2 | 07A | |
| 549 | 01C | 025 | . | S7(MDU) | BE6 | WRITE EFLD BIT |
| 550 | 01C | 026 | . | WRTU | E06 | |
| 551 | 01C | 027 | . | S1(PR2) | B8F | |
| 552 | 01C | 028 | . | JMP | 9D1 | |
| 553 | 01C | 029 | . | #+9 | 031 | |
| 554 | 01C | 02A | SFLD | DIMAL | 3FD | |
| 555 | 01C | 02B | . | R1(PR2) | B0F | |
| 556 | 01C | 02C | . | READU | E02 | |
| 557 | 01C | 02D | . | TS8(MDU) | DF6 | LOOK FOR PREV SFLD |
| 558 | 01C | 02E | . | #END2 | 07A | |
| 559 | 01C | 02F | . | S8(MDU) | BF6 | WRITE SFLD BIT |
| 560 | 01C | 030 | . | WRTU | E06 | |
| 561 | 01C | 031 | . | DIMAL | 3FB | |
| 562 | 01C | 032 | . | READ | E03 | |
| 563 | 01C | 033 | . | X(A)(UA) | 81A | |
| 564 | 01C | 034 | . | #007 | 007 | |
| 565 | 01C | 035 | . | AND(MDU) | 9F6 | |
| 566 | 01C | 036 | . | TRL(A) | C31 | TEST FOR 1ST SEG |
| 567 | 01C | 037 | . | #END2 | 07A | SHOULD ERASE SF OR EF BIT |
| 568 | 01C | 038 | . | X(G)(A) | 821 | |
| 569 | 01C | 039 | . | RL(A) | A51 | |
| 570 | 01C | 03A | . | SNS1 | 144 | |
| 571 | 01C | 03B | . | TR7(MAL) | CE3 | |
| 572 | 01C | 03C | . | #+3 | 03E | |
| 573 | 01C | 03D | . | S7(G) | BE2 | |
| 574 | 01C | 03E | . | NOP | 800 | |
| 575 | 01C | 03F | . | NOP | 800 | |
| 576 | 01C | 040 | . | NOP | 800 | |
| 577 | 01C | 041 | . | X(MAL)(G) | 832 | SEG. ADD CONTAINING EM |
| 578 | 01C | 042 | . | READC | E00 | SEG ADD IN MDL |
| 579 | 01C | 043 | . | X(MDU)(MDL) | 865 | SEG ADD IN MDU |
| 580 | 01C | 044 | . | RL(MDL) | A55 | |
| 581 | 01C | 045 | . | S4(MDL) | BB5 | |
| 582 | 01C | 046 | . | TR7(MAL) | CE3 | |
| 583 | 01C | 047 | . | #+3 | 049 | |
| 584 | 01C | 048 | . | S7(MDL) | BE5 | |
| 585 | 01C | 049 | . | X(MAL)(MDL) | 835 | |
| 586 | 01C | 04A | . | READL | E01 | EM ADD IN MDL |
| 587 | 01C | 04B | . | S6(MAL) | BD3 | |
| 588 | 01C | 04C | . | TR1(PR2) | C8F | TEST IF ST OR END FLD |
| 589 | 01C | 04D | . | #+3 | 04F | |
| 590 | 01C | 04E | . | DIMAL | 3FD | |
| 591 | 01C | 04F | . | WRT | E07 | |
| 592 | 01C | 050 | . | R2(MAL) | B13 | |
| 593 | 01C | 051 | . | R6(MAL) | B53 | |
| 594 | 01C | 052 | . | LOPSG2 | 151 | |
| 595 | 01C | 053 | . | LOCEM | 200 | |
| 596 | 01C | 054 | . | READC | E00 | |
| 597 | 01C | 055 | . | X(A)(MDL) | 815 | |
| 598 | 01C | 056 | . | SL(MDU) | AC6 | |
| 599 | 01C | 057 | . | SL(MDL) | AC5 | |
| 600 | 01C | 058 | . | TS1(PR2) | D8F | |
| 601 | 01C | 059 | . | #+5 | 05D | |
| 602 | 01C | 05A | . | R3(MDU) | B26 | WRITE OPEN BRACE |
| 603 | 01C | 05B | . | R3(MDL) | B25 | |
| 604 | 01C | 05C | . | CWRT | E08 | |
| 605 | 01C | 05D | . | TR1(PR2) | C8F | |
| 606 | 01C | 05E | . | #+5 | 062 | |
| 607 | 01C | 05F | . | R2(MDU) | B16 | |

| NO. | PU | PL | LABEL | MNEMONIC | CODE | COMMENTS |
|---|---|---|---|---|---|---|
| 608 | 01C | 060 | . | R2(MDL) | B15 | |
| 609 | 01C | 061 | . | CWRT | E08 | |

* WRITE CLOSE BRACE

| NO. | PU | PL | LABEL | MNEMONIC | CODE | COMMENTS |
|---|---|---|---|---|---|---|
| 610 | 01C | 062 | . | RL(MAL) | A53 | |
| 611 | 01C | 063 | . | TS1(PR2) | D8F | |
| 612 | 01C | 064 | . | #+5 | 068 | |
| 613 | 01C | 065 | . | S2(MAL) | B93 | ADDRESS STORED SFLD CHAR |
| 614 | 01C | 066 | . | JMP | 9D1 | |
| 615 | 01C | 067 | . | #+3 | 069 | |
| 616 | 01C | 068 | . | S3(MAL) | BA3 | |

* ADDRESS STORED EFLD CHAR
*WRITE STORED CHAR.

| NO. | PU | PL | LABEL | MNEMONIC | CODE | COMMENTS |
|---|---|---|---|---|---|---|
| 617 | 01C | 069 | . | X(MDU)(A) | 861 | |
| 618 | 01C | 06A | . | WRTU | E06 | |
| 619 | 01C | 06B | . | RL(MAL) | A53 | |
| 620 | 01C | 06C | . | READL | E01 | |
| 621 | 01C | 06D | . | S8(MDL) | BF5 | |
| 622 | 01C | 06E | . | TSL(MDL) | D45 | LOOK FOR LAST CHAR OF SEG |
| 623 | 01C | 06F | . | #+6 | 074 | |
| 624 | 01C | 070 | . | R8(MDL) | B75 | |
| 625 | 01C | 071 | . | INCR(MDL) | A25 | |
| 626 | 01C | 072 | . | JMP | 9D1 | |
| 627 | 01C | 073 | . | #+5 | 077 | |
| 628 | 01C | 074 | . | INCR(MAU) | A24 | |
| 629 | 01C | 075 | . | RL(MDL) | A55 | |
| 630 | 01C | 076 | . | S4(MDL) | BB5 | |
| 631 | 01C | 077 | . | R1(PR2) | B0F | |
| 632 | 01C | 078 | . | WRTL | E05 | |
| 633 | 01C | 079 | . | UPDEM | 160 | |
| 634 | 01C | 07A | END2 | JMPO | 386 | |
| 635 | 01C | 07B | . | @000 | 000 | |
| 636 | 01C | 07C | . | @008 | 008 | |
| 637 | 01C | 07D | . | NOP | 800 | |
| 638 | 01C | 07E | . | NOP | 800 | |
| 639 | 01C | 07F | . | NOP | 800 | |
| 640 | 01C | 080 | . | NOP | 800 | |
| 641 | 01C | 081 | . | NOP | 800 | |

**

*------------------TRANSMIT KEY PROGRAM------------------
*

| NO. | PU | PL | LABEL | MNEMONIC | CODE | COMMENTS |
|---|---|---|---|---|---|---|
| 642 | 01C | 082 | XMIT | X(G)(MAL) | 823 | SAVE CTLA ADD |
| 643 | 01C | 083 | . | R4(MAL) | B33 | |
| 644 | 01C | 084 | . | READU | E02 | READ 1ST SEG MAU |
| 645 | 01C | 085 | . | X(MDL)(UA) | 85A | |
| 646 | 01C | 086 | . | @008 | 008 | |

*WRITE START OF REPLY ADDRESS

| NO. | PU | PL | LABEL | MNEMONIC | CODE | COMMENTS |
|---|---|---|---|---|---|---|
| 647 | 01C | 087 | . | X(MAL)(G) | 832 | |
| 648 | 01C | 088 | . | S5(MAL) | BC3 | |
| 649 | 01C | 089 | . | WRT | E07 | |

*WRITE START OF QUERY ADDRESS

| NO. | PU | PL | LABEL | MNEMONIC | CODE | COMMENTS |
|---|---|---|---|---|---|---|
| 650 | 01C | 08A | . | DDMAL | 3FB | |
| 651 | 01C | 08B | . | WRT | E07 | |

*TEST CCF-1 FOR MINOR OR MAJOR XMIT MODE

| NO. | PU | PL | LABEL | MNEMONIC | CODE | COMMENTS |
|---|---|---|---|---|---|---|
| 652 | 01C | 08C | . | R1(PR2) | B0F | |
| 653 | 01C | 08D | . | S6(MAL) | BD3 | ADDR. CCF-1 LOC. |

| NO. | PU | PL | LABEL | MNEMONIC | CODE | COMMENTS |
|---|---|---|---|---|---|---|
| 654 | 01C | 08E | . | READU | E02 | |
| 655 | 01C | 08F | . | TR1(MDU) | C86 | MINOR M? |
| 656 | 01C | 090 | . | #+3 | 092 | |
| 657 | 01C | 091 | . | S1(PR2) | B8F | YES |

*UPDATE EM IN INDEX HOME POSITION

| NO. | PU | PL | LABEL | MNEMONIC | CODE | COMMENTS |
|---|---|---|---|---|---|---|
| 658 | 01C | 092 | . | R6(MAL) | B53 | |
| 659 | 01C | 093 | . | RL(MDU) | A56 | CLEAR INDICATORS |
| 660 | 01C | 094 | . | X(MAL)(G) | 832 | ADD EM LOCATION |
| 661 | 01C | 095 | . | WRT | E07 | |
| 662 | 01C | 096 | . | NOP | 800 | |
| 663 | 01C | 097 | . | LOPSG2 | 151 | |
| 664 | 01C | 098 | . | X(MAL)(UA) | 83A | |
| 665 | 01C | 099 | . | #008 | 008 | |
| 666 | 01C | 09A | . | SEM2 | 2C5 | |
| 667 | 01C | 09B | . | NOP | 800 | |
| 668 | 01C | 09C | . | X(MAL)(UA) | 83A | ADDR. CHAR 34 |
| 669 | 01C | 09D | . | #029 | 029 | |

*ERASE PCF (CHAR 34-40)

| NO. | PU | PL | LABEL | MNEMONIC | CODE | COMMENTS |
|---|---|---|---|---|---|---|
| 670 | 01C | 09E | . | X(A)(UA) | 81A | |
| 671 | 01C | 09F | . | #02F | 02F | |
| 672 | 01C | 0A0 | . | RL(MDU) | A56 | |
| 673 | 01C | 0A1 | . | RL(MDL) | A55 | |
| 674 | 01C | 0A2 | . | CWRT | E08 | |
| 675 | 01C | 0A3 | . | CMPR(MAL) | 9D3 | |
| 676 | 01C | 0A4 | . | #+5 | 0A8 | |
| 677 | 01C | 0A5 | . | INCR(MAL) | A23 | |
| 678 | 01C | 0A6 | . | JMP | 9D1 | |
| 679 | 01C | 0A7 | . | #-4 | 0A2 | |

*IF MINOR XMIT MODE ENTER IN 1ST LINE LAST CH END OF MSG CH

| NO. | PU | PL | LABEL | MNEMONIC | CODE | COMMENTS |
|---|---|---|---|---|---|---|
| 680 | 01C | 0A8 | . | TR1(PR2) | C8F | |
| 681 | 01C | 0A9 | . | #+8 | 0B0 | |
| 682 | 01C | 0AA | . | X(MDL)(UA) | 85A | |
| 683 | 01C | 0AB | . | #07E | 07E | END OF MSG CH |
| 684 | 01C | 0AC | . | WRTC | 3CB | |
| 685 | 01C | 0AD | . | RL(MDL) | A55 | |
| 686 | 01C | 0AE | . | R1(PR2) | B0F | |
| 687 | 01C | 0AF | . | CTLA | 15C | |
| 688 | 01C | 0B0 | . | NOP | 800 | |
| 689 | 01C | 0B1 | . | NOP | 800 | |
| 690 | 01C | 0B2 | . | NOP | 800 | |

*PUT 'T' IN A

| NO. | PU | PL | LABEL | MNEMONIC | CODE | COMMENTS |
|---|---|---|---|---|---|---|
| 691 | 01C | 0B3 | . | X(A)(UA) | 81A | |
| 692 | 01C | 0B4 | . | #0A0 | 0A0 | SHIFTED LEFT 3 BITS |
| 693 | 01C | 0B5 | . | R4(MAL) | B33 | |
| 694 | 01C | 0B6 | . | S5(MAL) | BC3 | |
| 695 | 01C | 0B7 | . | READ | E03 | |
| 696 | 01C | 0B8 | . | R8(MDL) | B75 | |

*LOCK OUT KYBD (IOS MDL-8=0)

| NO. | PU | PL | LABEL | MNEMONIC | CODE | COMMENTS |
|---|---|---|---|---|---|---|
| 697 | 01C | 0B9 | . | WRT | E07 | |
| 698 | 01C | 0BA | . | DDMAL | 3FB | |
| 699 | 01C | 0BB | . | RL(MDL) | A55 | |
| 700 | 01C | 0BC | . | WRTL | E05 | CLEAR OTHER INDICATORS |
| 701 | 01C | 0BD | . | X(MAL)(G) | 832 | |
| 702 | 01C | 0BE | . | SNS1 | 144 | IND CHAR ROUTINE |
| 703 | 01C | 0BF | . | S2(MAL) | B93 | |
| 704 | 01C | 0C0 | . | S3(MAL) | BA3 | LEAVE MAL= 0E OR 4E |
| 705 | 01C | 0C1 | . | NOP | 800 | |

| NO. | PU | PL | LABEL | MNEMONIC | CODE | COMMENTS |
|---|---|---|---|---|---|---|
| 706 | 01C | 0C2 | . | X(A)(UA) | 81A | |
| 707 | 01C | 0C3 | . | @020 | 020 | |
| 708 | 01C | 0C4 | . | SUBRTN | 17F | |
| 709 | 01C | 0C5 | . | @022 | 022 | |
| 710 | 01C | 0C6 | . | @MBI@ | 000 | |
| 711 | 01C | 0C7 | . | JMP0 | 386 | |
| 712 | 01C | 0C8 | . | @000 | 000 | |
| 713 | 01C | 0C9 | . | @008 | 008 | |

**

| 714 | 01C | 0CA | . | NOP | 800 | |
| 715 | 01C | 0CB | . | NOP | 800 | |
| 716 | 01C | 0CC | . | NOP | 800 | |
| 717 | 01C | 0CD | . | NOP | 800 | |
| 718 | 01C | 0CE | . | NOP | 800 | |
| 719 | 01C | 0CF | . | NOP | 800 | |
| 720 | 01C | 0D0 | . | NOP | 800 | |
| 721 | 01C | 0D1 | . | NOP | 800 | |
| 722 | 01C | 0D2 | . | NOP | 800 | |
| 723 | 01C | 0D3 | . | NOP | 800 | |
| 724 | 01C | 0D4 | . | NOP | 800 | |
| 725 | 01C | 0D5 | . | NOP | 800 | |
| 726 | 01C | 0D6 | . | NOP | 800 | |
| 727 | 01C | 0D7 | . | NOP | 800 | |
| 728 | 01C | 0D8 | . | NOP | 800 | |
| 729 | 01C | 0D9 | . | NOP | 800 | |
| 730 | 01C | 0DA | . | NOP | 800 | |
| 731 | 01C | 0DB | . | NOP | 800 | |
| 732 | 01C | 0DC | . | NOP | 800 | |
| 733 | 01C | 0DD | . | NOP | 800 | |

*

| 734 | 01C | 0DE | . | NOP | 800 | |
| 735 | 01C | 0DF | . | NOP | 800 | |
| 736 | 01C | 0E0 | . | NOP | 800 | |
| 737 | 01C | 0E1 | . | NOP | 800 | |
| 738 | 01C | 0E2 | . | NOP | 800 | |
| 739 | 01C | 0E3 | . | NOP | 800 | |
| 740 | 01C | 0E4 | . | NOP | 800 | |
| 741 | 01C | 0E5 | . | NOP | 800 | |
| 742 | 01C | 0E6 | . | NOP | 800 | |
| 743 | 01C | 0E7 | . | NOP | 800 | |
| 744 | 01C | 0E8 | . | NOP | 800 | |
| 745 | 01C | 0E9 | . | NOP | 800 | |
| 746 | 01C | 0EA | . | NOP | 800 | |
| 747 | 01C | 0EB | . | NOP | 800 | |
| 748 | 01C | 0EC | . | NOP | 800 | |
| 749 | 01C | 0ED | . | NOP | 800 | |
| 750 | 01C | 0EE | . | NOP | 800 | |
| 751 | 01C | 0EF | . | NOP | 800 | |
| 752 | 01C | 0F0 | . | NOP | 800 | |
| 753 | 01C | 0F1 | . | NOP | 800 | |
| 754 | 01C | 0F2 | . | NOP | 800 | |
| 755 | 01C | 0F3 | . | NOP | 800 | |

*

| 756 | 01C | 0F4 | . | NOP | 800 | |
| 757 | 01C | 0F5 | . | NOP | 800 | |
| 758 | 01C | 0F6 | . | NOP | 800 | |
| 759 | 01C | 0F7 | . | NOP | 800 | |
| 760 | 01C | 0F8 | . | NOP | 800 | |
| 761 | 01C | 0F9 | . | NOP | 800 | |
| 762 | 01C | 0FA | . | NOP | 800 | |
| 763 | 01C | 0FB | . | NOP | 800 | |
| 764 | 01C | 0FC | . | NOP | 800 | |

| NO. | PU | PL | LABEL | MNEMONIC | CODE | COMMENTS |
|---|---|---|---|---|---|---|
| 765 | 01C | 0FD | . | NOP | 800 | |
| 766 | 01C | 0FE | . | NOP | 800 | |
| 767 | 01C | 0FF | . | NOP | 800 | |

\*
\*\*

\*---------------TAB PROGRAM----------------------------
\*CHECK IF LAST DISPLAY SEG=LAST SEG OF MEMORU & FAKE IF NOT

| NO. | PU | PL | LABEL | MNEMONIC | CODE | COMMENTS |
|---|---|---|---|---|---|---|
| 768 | 01D | 000 | GTAB | R1(PR2) | B0F | |
| 769 | 01D | 001 | . | DDMAL | 3FB | |
| 770 | 01D | 002 | . | READL | E01 | MDL←LAST SEG ON DISPLAY |
| 771 | 01D | 003 | . | X(G)(MDL) | 825 | G←LAST SEG OF DISLPAY |
| 772 | 01D | 004 | . | R2(MAL) | B13 | ROTATE LEFT |
| 773 | 01D | 005 | . | R3(MAL) | B23 | |
| 774 | 01D | 006 | . | S5(MAL) | BC3 | READ WORD 31 FOR LAST MEM SEG |
| 775 | 01D | 007 | . | S6(MAL) | BD3 | |
| 776 | 01D | 008 | . | READL | E01 | CHECK IF LAST SEG= LAST MEM SE |
| 777 | 01D | 009 | . | X(A)(G) | 812 | |
| 778 | 01D | 00A | . | CMPR(MDL) | 9D5 | |
| 779 | 01D | 00B | . | #+3 | 00D | |
| 780 | 01D | 00C | . | S1(PR2) | B8F | RETURN TO CONTROL AREA WORD 08 |
| 781 | 01D | 00D | . | R5(MAL) | B43 | |
| 782 | 01D | 00E | . | R6(MAL) | B53 | |
| 783 | 01D | 00F | . | S4(MAL) | BB3 | |
| 784 | 01D | 010 | . | LOPSG2 | 151 | MAU OF EM SEG |
| 785 | 01D | 011 | . | TS1(PR2) | E8F | FAKE LAST SEG IF PR21 SET. |
| 786 | 01D | 012 | . | #FAKLS | 018 | |
| 787 | 01D | 013 | . | JMP | 9D1 | |
| 788 | 01D | 014 | . | #GETEM | 020 | |
| 789 | 01D | 015 | . | NOP | 800 | |
| 790 | 01D | 016 | . | NOP | 800 | |
| 791 | 01D | 017 | . | NOP | 800 | |

\* SET UP LAST DISLPAY SEG TO LOOK LIKE LAST MEM GSEG

| NO. | PU | PL | LABEL | MNEMONIC | CODE | COMMENTS |
|---|---|---|---|---|---|---|
| 792 | 01D | 018 | FAKLS | X(MDU)(MAU) | 864 | STORE EM SEG IN MDU |
| 793 | 01D | 019 | . | X(MAU)(G) | 842 | LAST DISPLAY SEG GOES TO MAU |
| 794 | 01D | 01A | . | RL(MAL) | A53 | |
| 795 | 01D | 01B | . | S2(MAL) | B93 | |
| 796 | 01D | 01C | . | READL | E01 | |
| 797 | 01D | 01D | . | R7(MDL) | B65 | BIT 7 OF WORD 03 RESET FOR TA |
| 798 | 01D | 01E | . | WRTL | E05 | |
| 799 | 01D | 01F | . | X(MAU)(MDU) | 846 | EM SEG BACK IN MAU |
| 800 | 01D | 020 | GETEM | RL(MAL) | A53 | |
| 801 | 01D | 021 | . | S2(MAL) | B93 | |
| 802 | 01D | 022 | . | READL | E01 | |
| 803 | 01D | 023 | . | TS6(MDL) | DD5 | |
| 804 | 01D | 024 | . | #IXSRC | 03F | |
| 805 | 01D | 025 | ENTED | NOP | 800 | |
| 806 | 01D | 026 | . | LOCEM | 200 | |

\* GET ENTRY MARKER

| NO. | PU | PL | LABEL | MNEMONIC | CODE | COMMENTS |
|---|---|---|---|---|---|---|
| 807 | 01D | 027 | . | TAB | 2AC | MAL←E/M/ BYTE IN OP SEG. |
| 808 | 01D | 028 | . | X(G)(MAU) | 824 | |
| 809 | 01D | 029 | . | TS1(PR2) | D8F | TEST FLAG & SET BIT 7 OF 03 IF |
| 810 | 01D | 02A | . | #SLASI | 02D | SET LAST SEG INDICATOR |
| 811 | 01D | 02B | . | JMP | 9D1 | |
| 812 | 01D | 02C | . | #ENTAB-1 | 038 | |

\*RESTORE LAST SEG INDICATOR IF FAKED

| NO. | PU | PL | LABEL | MNEMONIC | CODE | COMMENTS |
|---|---|---|---|---|---|---|
| 813 | 01D | 02D | SLASI | RL(MAL) | A53 | |
| 814 | 01D | 02E | . | S2(MAL) | B93 | |
| 815 | 01D | 02F | CKTR7 | READL | E01 | |
| 816 | 01D | 030 | . | TR7(MDL) | CE5 | START SEARCH OF FALSE LAST S |

| NO. | PU | PL | LABEL | MNEMONIC | CODE | COMMENTS |
|---|---|---|---|---|---|---|
| 817 | 01D | 031 | . | #+5 | 035 | |
| 818 | 01D | 032 | . | INCR(MAU) | A24 | |
| 819 | 01D | 033 | . | JMP | 9D1 | |
| 820 | 01D | 034 | . | #CKTR7 | 02F | |
| 821 | 01D | 035 | . | S7(MDL) | BE5 | |
| 822 | 01D | 036 | . | WRTL | E05 | LAST SEG FLAG RESTORED |
| 823 | 01D | 037 | . | NOP | 800 | |
| 824 | 01D | 038 | . | R1(PR2) | B0F | |
| 825 | 01D | 039 | ENTAB | X(MAU)(G) | 842 | |
| 826 | 01D | 03A | . | LOCEM | 200 | |
| 827 | 01D | 03B | . | UPDEM | 160 | |
| 828 | 01D | 03C | . | JMPO | 386 | |
| 829 | 01D | 03D | . | @000 | 000 | |
| 830 | 01D | 03E | . | @008 | 008 | |

\*
\*

| 831 | 01D | 03F | IXSRC | LOCEM | 200 | |
|---|---|---|---|---|---|---|
| 832 | 01D | 040 | . | STEPR | 258 | |
| 833 | 01D | 041 | . | READC | E00 | |
| 834 | 01D | 042 | . | TS8(MDL) | DF5 | |
| 835 | 01D | 043 | . | #+6 | 048 | |
| 836 | 01D | 044 | . | TS17I(MAL) | D23 | |
| 837 | 01D | 045 | . | #EDTAB | 051 | |
| 838 | 01D | 046 | . | JMP | 9D1 | |
| 839 | 01D | 047 | . | #IXSRC+2 | 041 | |
| 840 | 01D | 048 | . | STEPR | 258 | |
| 841 | 01D | 049 | . | READC | E00 | |
| 842 | 01D | 04A | . | TS8(MDL) | DF5 | |
| 843 | 01D | 04B | . | #-2 | 048 | |
| 844 | 01D | 04C | . | STEPL | 226 | |
| 845 | 01D | 04D | . | R1(PR2) | B0F | |
| 846 | 01D | 04E | . | SEM2 | 2C5 | |
| 847 | 01D | 04F | . | JMP | 9D1 | |
| 848 | 01D | 050 | . | #ENTAB+2 | 03B | |
| 849 | 01D | 051 | EDTAB | X(A)(UA) | 81A | |
| 850 | 01D | 052 | . | @0FA | 0FA | |
| 851 | 01D | 053 | . | ADD(G) | 952 | |
| 852 | 01D | 054 | . | X(MAU)(A) | 841 | |
| 853 | 01D | 055 | . | STRAP(15) | E2F | |
| 854 | 01D | 056 | . | DECR(MDL) | AF5 | |
| 855 | 01D | 057 | . | X(MAL)(MDL) | 835 | |
| 856 | 01D | 058 | . | JMP | 9D1 | |
| 857 | 01D | 059 | . | #ENTED+2 | 027 | |

\*\*

\*------------------DELETE REST PROGRAM------------------
\*

| 858 | 01D | 05A | DELR | LOPSG2 | 151 | |
|---|---|---|---|---|---|---|
| 859 | 01D | 05B | . | LOCEM | 200 | |
| 860 | 01D | 05C | . | TCLEAR | 23D | |
| 861 | 01D | 05D | . | JMPO | 386 | |
| 862 | 01D | 05E | . | @000 | 000 | |
| 863 | 01D | 05F | . | @008 | 008 | |

\*\*

\*------------------STORY END PROGRAM------------------
\*LOCATE ENTRY MARKER

| 864 | 01D | 060 | INSE | NOP | 800 | |
|---|---|---|---|---|---|---|
| 865 | 01D | 061 | . | LOPSG2 | 151 | MAU←MAU OF EM |
| 866 | 01D | 062 | . | LOCEM | 200 | MAL←MAL OF EM |

| NO. | PU | PL | LABEL | MNEMONIC | CODE | COMMENTS |
|---|---|---|---|---|---|---|

*INSERT "OVERLINE" CHAR @ EM LOCATION

| 867 | 01D | 063 | . | X(MDL)(UA) | 85A | |
| 868 | 01D | 064 | . | @07E | 07E | |
| 869 | 01D | 065 | . | WRTC | 3CB | OVERLINE CHAR AT EM |

*MOVE EM ONE STEP RIGHT OR MAU+1 & MAL=008

| 870 | 01D | 066 | . | LOCEM | 200 | |
| 871 | 01D | 067 | . | STEPR | 258 | |
| 872 | 01D | 068 | . | UPDEM | 160 | EM STEPPED AND UPDATED |

*GO TO TOTAL CLEAR PROGRAM

| 873 | 01D | 069 | . | JMP | 9D1 | |
| 874 | 01D | 06A | . | #DELR | 05A | |
| 875 | 01D | 06B | . | NOP | 800 | |
| 876 | 01D | 06C | . | NOP | 800 | |
| 877 | 01D | 06D | . | NOP | 800 | |

**

*-----------------CRLF PROGRAM-----------------------------
*LOCATE EM AND REMEMBER LAST SEG OF DISPLAY

| 878 | 01D | 06E | CRLF | DDMAL | 3FB | ADDRESS 06 OR 46 |
| 879 | 01D | 06F | . | READL | E01 | MDL= LAST SEG OF DISPLAY |
| 880 | 01D | 070 | . | X(G)(MDL) | 825 | |
| 881 | 01D | 071 | . | DIMAL | 3FD | |
| 882 | 01D | 072 | . | LOPSG2 | 151 | LOCATE OP SEG |
| 883 | 01D | 073 | . | RL(MAL) | A53 | |
| 884 | 01D | 074 | . | READL | E01 | MDL= EM LOCATION |
| 885 | 01D | 075 | . | R8(MDL) | B75 | |
| 886 | 01D | 076 | . | X(MAL)(MDL) | 835 | |
| 887 | 01D | 077 | . | LEOL | 20F | |
| 888 | 01D | 078 | . | X(MAL)(MDL) | 835 | |
| 889 | 01D | 079 | . | S8(MDL) | BF5 | |
| 890 | 01D | 07A | . | R1(PR2) | B0F | |
| 891 | 01D | 07B | . | R8(PR2) | B7F | |
| 892 | 01D | 07C | . | TSL(MDL) | D45 | |
| 893 | 01D | 07D | . | #LALOS | 096 | |
| 894 | 01D | 07E | . | NOP | 800 | |
| 895 | 01D | 07F | . | NOP | 800 | |
| 896 | 01D | 080 | . | NOP | 800 | |

* CHECK FOR PROTECTED FIELD IN NEXT LINE

| 897 | 01D | 081 | B8SET | INCR(MAL) | A23 | |
| 898 | 01D | 082 | . | READC | E00 | |
| 899 | 01D | 083 | . | TS8(MDL) | DF5 | |
| 900 | 01D | 084 | . | #SPR21 | 0AB | |
| 901 | 01D | 085 | . | TR1(PR2) | C8F | LAST CHAR HAD NO TAB BIT? |
| 902 | 01D | 086 | . | #LCNTB+1 | 08C | |
| 903 | 01D | 087 | . | TR8(PR2) | CFF | WAS SEG INCR BECAUSE OF PRO |
| 904 | 01D | 088 | . | #LCNTB | 08B | |
| 905 | 01D | 089 | . | DECR(MAU) | AF4 | |
| 906 | 01D | 08A | . | RL(MAL) | A53 | |
| 907 | 01D | 08B | LCNTB | DECR(MAL) | AF3 | 8TH BIT OF MAL=1 |
| 908 | 01D | 08C | . | SEM2 | 2C5 | |
| 909 | 01D | 08D | . | NOP | 800 | |
| 910 | 01D | 08E | . | RL(MAL) | A53 | |
| 911 | 01D | 08F | . | S2(MAL) | B93 | |
| 912 | 01D | 090 | . | READL | E01 | |
| 913 | 01D | 091 | . | S5(MDL) | BC5 | |
| 914 | 01D | 092 | . | NOP | 800 | |
| 915 | 01D | 093 | . | WRTL | E05 | |
| 916 | 01D | 094 | . | JMP | 9D1 | |
| 917 | 01D | 095 | . | #ENDCR | 0BC | |

| NO. | PU | PL | LABEL | MNEMONIC | CODE | COMMENTS |
|---|---|---|---|---|---|---|
| 918 | 01D | 096 | LALOS | X(MDU)(MAL) | 863 | |
| 919 | 01D | 097 | . | RL(MAL) | A53 | |
| 920 | 01D | 098 | . | S2(MAL) | B93 | |

*LAST LINE OF SEGMENT

| | | | | | | |
|---|---|---|---|---|---|---|
| 921 | 01D | 099 | . | READL | E01 | |
| 922 | 01D | 09A | . | X(MAL)(MDU) | 836 | |
| 923 | 01D | 09B | . | TS6(MDL) | DD5 | |
| 924 | 01D | 09C | . | #XEDIT | 0A5 | |
| 925 | 01D | 09D | . | X(A)(G) | 812 | |
| 926 | 01D | 09E | . | CMPR(MAU) | 9D4 | |
| 927 | 01D | 09F | . | #LCNTB+1 | 08C | PRESENT MAU=LAST SEG ON DI |
| 928 | 01D | 0A0 | . | INCR(MAU) | A24 | |
| 929 | 01D | 0A1 | . | RL(MAL) | A53 | |
| 930 | 01D | 0A2 | . | S4(MAL) | BB3 | |
| 931 | 01D | 0A3 | . | JMP | 9D1 | |
| 932 | 01D | 0A4 | . | #B8SET+1 | 082 | |
| 933 | 01D | 0A5 | XEDIT | UPDEM | 160 | |
| 934 | 01D | 0A6 | . | JMP0 | 386 | |
| 935 | 01D | 0A7 | . | @01B | 01B | |
| 936 | 01D | 0A8 | . | @0F1 | 0F1 | |
| 937 | 01D | 0A9 | . | NOP | 800 | |
| 938 | 01D | 0AA | . | NOP | 800 | |

* CHECK FOR PROTECTED FIELD IN PRESENT LINE

| | | | | | | |
|---|---|---|---|---|---|---|
| 939 | 01D | 0AB | SPR21 | S1(PR2) | B8F | |
| 940 | 01D | 0AC | . | TR17I(MAL) | C23 | |
| 941 | 01D | 0AD | . | #REPR2 | 0B5 | |
| 942 | 01D | 0AE | . | S8(PR2) | BFF | |
| 943 | 01D | 0AF | . | JMP | 9D1 | |
| 944 | 01D | 0B0 | . | #LALOS | 096 | |
| 945 | 01D | 0B1 | . | NOP | 800 | |
| 946 | 01D | 0B2 | . | NOP | 800 | |
| 947 | 01D | 0B3 | . | NOP | 800 | |
| 948 | 01D | 0B4 | . | NOP | 800 | |
| 949 | 01D | 0B5 | REPR2 | R8(PR2) | B7F | |
| 950 | 01D | 0B6 | . | JMP | 9D1 | |
| 951 | 01D | 0B7 | . | #B8SET+1 | 082 | |
| 952 | 01D | 0B8 | . | NOP | 800 | |
| 953 | 01D | 0B9 | . | NOP | 800 | |
| 954 | 01D | 0BA | . | NOP | 800 | |
| 955 | 01D | 0BB | . | NOP | 800 | |
| 956 | 01D | 0BC | ENDCR | R8(MAL) | B73 | |
| 957 | 01D | 0BD | . | R1(PR2) | B0F | |
| 958 | 01D | 0BE | . | UPDEM | 160 | |
| 959 | 01D | 0BF | . | JMP0 | 386 | |
| 960 | 01D | 0C0 | . | @000 | 000 | |
| 961 | 01D | 0C1 | . | @008 | 008 | |

**

| | | | | | | |
|---|---|---|---|---|---|---|
| 962 | 01D | 0C2 | . | NOP | 800 | |
| 963 | 01D | 0C3 | . | NOP | 800 | |
| 964 | 01D | 0C4 | . | NOP | 800 | |
| 965 | 01D | 0C5 | . | NOP | 800 | |
| 966 | 01D | 0C6 | . | NOP | 800 | |
| 967 | 01D | 0C7 | . | NOP | 800 | |
| 968 | 01D | 0C8 | . | NOP | 800 | |
| 969 | 01D | 0C9 | . | NOP | 800 | |

*
*

| | | | | | | |
|---|---|---|---|---|---|---|
| 970 | 01D | 0CA | . | NOP | 800 | |
| 971 | 01D | 0CB | . | NOP | 800 | |

| NO. | PU | PL | LABEL | MNEMONIC | CODE | COMMENTS |
|---|---|---|---|---|---|---|
| 972 | 01D | 0CC | . | NOP | 800 | |
| 973 | 01D | 0CD | . | NOP | 800 | |
| 974 | 01D | 0CE | . | NOP | 800 | |
| 975 | 01D | 0CF | . | NOP | 800 | |
| 976 | 01D | 0D0 | . | NOP | 800 | |
| 977 | 01D | 0D1 | . | NOP | 800 | |
| 978 | 01D | 0D2 | . | NOP | 800 | |
| 979 | 01D | 0D3 | . | NOP | 800 | |
| 980 | 01D | 0D4 | . | NOP | 800 | |
| 981 | 01D | 0D5 | . | NOP | 800 | |
| 982 | 01D | 0D6 | . | NOP | 800 | |
| 983 | 01D | 0D7 | . | NOP | 800 | |

*
*

| 984 | 01D | 0D8 | . | NOP | 800 | |
|---|---|---|---|---|---|---|
| 985 | 01D | 0D9 | . | NOP | 800 | |
| 986 | 01D | 0DA | . | NOP | 800 | |
| 987 | 01D | 0DB | . | NOP | 800 | |
| 988 | 01D | 0DC | . | NOP | 800 | |
| 989 | 01D | 0DD | . | NOP | 800 | |
| 990 | 01D | 0DE | . | NOP | 800 | |
| 991 | 01D | 0DF | . | NOP | 800 | |
| 992 | 01D | 0E0 | . | NOP | 800 | |
| 993 | 01D | 0E1 | . | NOP | 800 | |
| 994 | 01D | 0E2 | . | NOP | 800 | |
| 995 | 01D | 0E3 | . | NOP | 800 | |
| 996 | 01D | 0E4 | . | NOP | 800 | |
| 997 | 01D | 0E5 | . | NOP | 800 | |
| 998 | 01D | 0E6 | . | NOP | 800 | |
| 999 | 01D | 0E7 | . | NOP | 800 | |
| 1000 | 01D | 0E8 | . | NOP | 800 | |
| 1001 | 01D | 0E9 | . | NOP | 800 | |
| 1002 | 01D | 0EA | . | NOP | 800 | |
| 1003 | 01D | 0EB | . | NOP | 800 | |
| 1004 | 01D | 0EC | . | NOP | 800 | |
| 1005 | 01D | 0ED | . | NOP | 800 | |
| 1006 | 01D | 0EE | . | NOP | 800 | |
| 1007 | 01D | 0EF | . | NOP | 800 | |
| 1008 | 01D | 0F0 | . | NOP | 800 | |
| 1009 | 01D | 0F1 | . | NOP | 800 | |

*
*

| 1010 | 01D | 0F2 | . | NOP | 800 | |
|---|---|---|---|---|---|---|
| 1011 | 01D | 0F3 | . | NOP | 800 | |
| 1012 | 01D | 0F4 | . | NOP | 800 | |
| 1013 | 01D | 0F5 | . | NOP | 800 | |
| 1014 | 01D | 0F6 | . | NOP | 800 | |
| 1015 | 01D | 0F7 | . | NOP | 800 | |
| 1016 | 01D | 0F8 | . | NOP | 800 | |
| 1017 | 01D | 0F9 | . | NOP | 800 | |
| 1018 | 01D | 0FA | . | NOP | 800 | |
| 1019 | 01D | 0FB | . | NOP | 800 | |
| 1020 | 01D | 0FC | . | NOP | 800 | |
| 1021 | 01D | 0FD | . | NOP | 800 | |
| 1022 | 01D | 0FE | . | NOP | 800 | |
| 1023 | 01D | 0FF | . | NOP | 800 | |

**

```
NO.  PU  PL    LABEL MNEMONIC      CODE    COMMENTS

*---------------------COMPRESS PROGRAM-----------------------
*START SEARCH FOR NULL OR TAB WITH PERIOD 1024 01E 000   COM   R1(PR2)        B0F
1025 01E 001    .    R8(PR2)        B7F
1026 01E 002    .    NOP            800
1027 01E 003    .    NOP            800
1028 01E 004    .    NOP            800
1029 01E 005    .    R4(MAL)        B33
1030 01E 006    .    READU          E02    READ FIRST SEG.
1031 01E 007    .    INCR(MDU)      A26    FIRST SEARCH SEG.
1032 01E 008    .    X(MAU)(MDU)    846
1033 01E 009    .    X(MAL)(UA)     83A
1034 01E 00A    .    @058           058
1035 01E 00B    .    NOP            800
1036 01E 00C    .    NOP            800
1037 01E 00D    .    NOP            800
1038 01E 00E    .    NOP            800
1039 01E 00F    .    NOP            800

*READ CHARS AND LOOK FOR NULL 1040 01E 010   REAGN READC          E00
1041 01E 011    .    TSY(MDL)       D35    JUMP TO NLNOT IF CHAR=NULL
1042 01E 012    .    #NLNOT         051
1043 01E 013   NLYES TS8(PR2)       DFF
1044 01E 014    .    #XER           038
1045 01E 015    .    TS1(PR2)       D8F
1046 01E 016    .    #PR21S         01C
1047 01E 017    .    NOP            800

*FIND EOL IF NULL 1048 01E 018    .    LEOL           20F    EOL ADD. IN A & MDL
1049 01E 019    .    S1(PR2)        B8F    INDICATES NULL DETECTED
1050 01E 01A    .    JMP            9D1
1051 01E 01B    .    #REAGN         010

*CONTINUE SEARCH OF LINE FOR ALL NULLS 1052 01E 01C   PR21S CMPR(MAL)      9D3    JUMP TO MALE0 IF MAL=EOL
1053 01E 01D    .    #MALE0         021
1054 01E 01E    .    INCR(MAL)      A23
1055 01E 01F    .    JMP            9D1
1056 01E 020    .    #REAGN         010

*SET PR2 BIT 8 IF EMPTY LINE FOUND 1057 01E 021   MALE0 TS8(PR2)       DFF
1058 01E 022    .    #MLOTS         039    GO TO MLOTS IF PR2 BIT 8 ALRE
1059 01E 023    .    S8(PR2)        BFF    EMPTY LINE FOUND
1060 01E 024    .    X(MDU)(MAL)    863    STORE MAL IN MDU
1061 01E 025    .    RL(MAL)        A53
1062 01E 026    .    READL          E01
1063 01E 027    .    S8(MDL)        BF5
1064 01E 028    .    WRTL           E05
1065 01E 029    .    NOP            800
1066 01E 02A    .    NOP            800
1067 01E 02B    .    NOP            800

* STORE BOL IN WORD 07 OF NULL SEG.

1068 01E 02C    .    X(MDL)(UA)     85A
1069 01E 02D    .    @027           027
1070 01E 02E    .    SUB(MDL)       925
1071 01E 02F    .    X(MAL)(UA)     83A
1072 01E 030    .    @006           006
```

| NO. | PU | PL | LABEL | MNEMONIC | CODE | COMMENTS |
|---|---|---|---|---|---|---|
| 1073 | 01E | 031 | . | X(MDL)(A) | 851 | |
| 1074 | 01E | 032 | . | WRTL | E05 | BOL=EOL-39 IN WORD 07 |
| 1075 | 01E | 033 | . | JMP | 9D1 | |
| 1076 | 01E | 034 | . | #MLOTS | 039 | |
| 1077 | 01E | 035 | . | NOP | 800 | |
| 1078 | 01E | 036 | . | NOP | 800 | |
| 1079 | 01E | 037 | . | NOP | 800 | |
| 1080 | 01E | 038 | XER | X(MDU)(MAL) | 863 | |

* CHECK IF EMPTY LINE WAS LAST LINE OF SEG

| NO. | PU | PL | LABEL | MNEMONIC | CODE | COMMENTS |
|---|---|---|---|---|---|---|
| 1081 | 01E | 039 | MLOTS | TS17I(MDU) | D26 | MAL WAS IN MDU |
| 1082 | 01E | 03A | . | #YLOTS | 03E | GO TO YLOTS IF MAL WAS 127 |
| 1083 | 01E | 03B | . | X(MAL)(MDU) | 836 | |
| 1084 | 01E | 03C | . | JMP | 9D1 | |
| 1085 | 01E | 03D | . | #REAGN | 010 | |

*CHECK FOR LAST SEG& INCR MAU IF NOT

| NO. | PU | PL | LABEL | MNEMONIC | CODE | COMMENTS |
|---|---|---|---|---|---|---|
| 1086 | 01E | 03E | YLOTS | RL(MAL) | A53 | |
| 1087 | 01E | 03F | . | S2(MAL) | B93 | |
| 1088 | 01E | 040 | . | READL | E01 | |
| 1089 | 01E | 041 | . | TR7(MDL) | CE5 | |
| 1090 | 01E | 042 | . | #KWIT | 0C8 | |
| 1091 | 01E | 043 | . | INCR(MAU) | A24 | |
| 1092 | 01E | 044 | . | NOP | 800 | |
| 1093 | 01E | 045 | . | NOP | 800 | |
| 1094 | 01E | 046 | . | NOP | 800 | |
| 1095 | 01E | 047 | . | RSTRP(15) | E2F | |
| 1096 | 01E | 048 | . | X(MAL)(MDL) | 835 | SET MAL = 08 |
| 1097 | 01E | 049 | . | NOP | 800 | |
| 1098 | 01E | 04A | . | JMP | 9D1 | |
| 1099 | 01E | 04B | . | #REAGN | 010 | |
| 1100 | 01E | 04C | . | NOP | 800 | |
| 1101 | 01E | 04D | . | NOP | 800 | |
| 1102 | 01E | 04E | . | NOP | 800 | |
| 1103 | 01E | 04F | . | NOP | 800 | |
| 1104 | 01E | 050 | . | NOP | 800 | |

* CHECK IF CHAR IS TAB WITH PERIOD IF NOT = NULL

| NO. | PU | PL | LABEL | MNEMONIC | CODE | COMMENTS |
|---|---|---|---|---|---|---|
| 1105 | 01E | 051 | NLNOT | TR8(MDL) | CF5 | |
| 1106 | 01E | 052 | . | #NLNO | 05D | GO TO NLNO IF BIT 8 OF CHAR |
| 1107 | 01E | 053 | . | X(G)(A) | 821 | |
| 1108 | 01E | 054 | . | X(A)(UA) | 81A | |
| 1109 | 01E | 055 | . | @0AE | 0AE | |
| 1110 | 01E | 056 | . | CMPR(MDL) | 9D5 | |
| 1111 | 01E | 057 | . | #AXFER | 06A | |
| 1112 | 01E | 058 | . | X(A)(G) | 812 | |
| 1113 | 01E | 059 | . | NOP | 800 | |
| 1114 | 01E | 05A | . | NOP | 800 | |
| 1115 | 01E | 05B | . | NOP | 800 | |
| 1116 | 01E | 05C | . | NOP | 800 | |

* NO NULLS IN SEARCH SO DETERMINE IF NULLS EVER FOUND.

| NO. | PU | PL | LABEL | MNEMONIC | CODE | COMMENTS |
|---|---|---|---|---|---|---|
| 1117 | 01E | 05D | NLNO | TS1(PR2) | D8F | |
| 1118 | 01E | 05E | . | #PR28T | 06F | IF PR2 BIT 1 SET GO TO PR28T |
| 1119 | 01E | 05F | . | X(A)(UA) | 81A | |
| 1120 | 01E | 060 | . | @058 | 058 | |
| 1121 | 01E | 061 | . | CMPR(MAL) | 9D3 | |
| 1122 | 01E | 062 | . | #YLOTS | 03E | IF MAL=88 GO CHECK FOR LAST |
| 1123 | 01E | 063 | . | X(A)(MAL) | 813 | |
| 1124 | 01E | 064 | . | X(MDU)(UA) | 86A | |
| 1125 | 01E | 065 | . | @028 | 028 | |
| 1126 | 01E | 066 | . | ADD(MDU) | 956 | ADD 40 TO MAL IF MAL NOT=88 |
| 1127 | 01E | 067 | . | X(MAL)(A) | 831 | |

| NO. | PU | PL | LABEL | MNEMONIC | CODE | COMMENTS |
|---|---|---|---|---|---|---|
| 1128 | 01E | 068 | . | JMP | 9D1 | |
| 1129 | 01E | 069 | . | #REAGN | 010 | |
| 1130 | 01E | 06A | AXFER | X(A)(G) | 812 | |
| 1131 | 01E | 06B | . | JMP | 9D1 | |
| 1132 | 01E | 06C | . | #NLYES | 013 | |
| 1133 | 01E | 06D | . | NOP | 800 | |
| 1134 | 01E | 06E | . | NOP | 800 | |

*CHECK PR2 BIT 8 TO TELL IF LINE IS DATA SOURCE

| 1135 | 01E | 06F | PR28T | TS8(PR2) | DFF | |
| 1136 | 01E | 070 | . | #DAFND | 07C | GO TO DAFND IF BIT 8 SET (SOU |
| 1137 | 01E | 071 | . | R1(PR2) | B0F | |
| 1138 | 01E | 072 | . | LEOL | 20F | |
| 1139 | 01E | 073 | . | TS17I(MDL) | D25 | |
| 1140 | 01E | 074 | . | #YLOTS | 03E | |
| 1141 | 01E | 075 | . | X(MAL)(MDL) | 835 | |
| 1142 | 01E | 076 | . | JMP | 9D1 | |
| 1143 | 01E | 077 | . | #REAGN | 010 | |
| 1144 | 01E | 078 | . | NOP | 800 | |
| 1145 | 01E | 079 | . | NOP | 800 | |
| 1146 | 01E | 07A | . | NOP | 800 | |
| 1147 | 01E | 07B | . | NOP | 800 | |

* DATA SOURCE FOUND- STORE BOL & SAVE MAU

| 1148 | 01E | 07C | DAFND | LEOL | 20F | |
| 1149 | 01E | 07D | . | X(MDL)(UA) | 85A | |
| 1150 | 01E | 07E | . | @027 | 027 | |
| 1151 | 01E | 07F | . | SUB(MDL) | 925 | BOL IN A |
| 1152 | 01E | 080 | . | X(MAL)(A) | 831 | |
| 1153 | 01E | 081 | . | X(A)(MAU) | 814 | SOURCE MAU IN A |
| 1154 | 01E | 082 | . | NOP | 800 | |
| 1155 | 01E | 083 | . | NOP | 800 | |
| 1156 | 01E | 084 | . | NOP | 800 | |
| 1157 | 01E | 085 | . | NOP | 800 | |

*LOCATE DEST SEG

| 1158 | 01E | 086 | LODES | X(G)(MAL) | 823 | KEEP SOURCE MAL IN G |
| 1159 | 01E | 087 | . | RL(MAL) | A53 | |
| 1160 | 01E | 088 | . | READL | E01 | |
| 1161 | 01E | 089 | . | TS8(MDL) | DF5 | |
| 1162 | 01E | 08A | . | #SETUP | 08E | |
| 1163 | 01E | 08B | . | DECR(MAU) | AF4 | |
| 1164 | 01E | 08C | . | JMP | 9D1 | |
| 1165 | 01E | 08D | . | #LODES+1 | 087 | |

* SET UP INITIAL CONDITIONS FOR TRANSFER

| 1166 | 01E | 08E | SETUP | R8(MDL) | B75 | RESET BIT 8 OF WORD 01 |
| 1167 | 01E | 08F | . | WRTL | E05 | WRITE 0 IN " " " " |
| 1168 | 01E | 090 | . | X(MDL)(UA) | 85A | |
| 1169 | 01E | 091 | . | @028 | 028 | |
| 1170 | 01E | 092 | . | X(MAL)(UA) | 83A | |
| 1171 | 01E | 093 | . | @004 | 004 | |
| 1172 | 01E | 094 | . | WRTL | E05 | 40 IN WORD 05 OF DEST |
| 1173 | 01E | 095 | . | X(MDU)(MAU) | 864 | DEST MAU IN MAU |
| 1174 | 01E | 096 | . | X(MAU)(A) | 841 | SOURCE MAU IN MAU |
| 1175 | 01E | 097 | . | X(MAL)(G) | 832 | SOURCE BOL IN MAL |
| 1176 | 01E | 098 | . | NOP | 800 | |
| 1177 | 01E | 099 | . | NOP | 800 | |
| 1178 | 01E | 09A | . | NOP | 800 | |
| 1179 | 01E | 09B | . | NOP | 800 | |

| NO. | PU | PL | LABEL | MNEMONIC | CODE | COMMENTS |
|---|---|---|---|---|---|---|

* OBTAIN DATA CHAR

| 1180 | 01E | 09C | SXFER | READC | E00 | |
| 1181 | 01E | 09D | . | X(G)(MAL) | 823 | SOUCE MAL IN G |
| 1182 | 01E | 09E | . | X(A)(MAU) | 814 | SOURCE MAU IN A |
| 1183 | 01E | 09F | . | NOP | 800 | |
| 1184 | 01E | 0A0 | . | NOP | 800 | |
| 1185 | 01E | 0A1 | . | NOP | 800 | |

* GO TO DEST FOR STORING LOCATION

| 1186 | 01E | 0A2 | . | X(MAU)(MDU) | 846 | DEST MAU IN MAU |
| 1187 | 01E | 0A3 | . | X(MAL)(UA) | 83A | |
| 1188 | 01E | 0A4 | . | #004 | 004 | |
| 1189 | 01E | 0A5 | . | X(MDU)(MDL) | 865 | SAVE DATA CHAR IN MDU |
| 1190 | 01E | 0A6 | . | READL | E01 | READ INDEX |
| 1191 | 01E | 0A7 | . | TRL(MDL) | C35 | JOB OVER IF ZERO |
| 1192 | 01E | 0A8 | . | #END1 | 038 | |
| 1193 | 01E | 0A9 | . | DECR(MDL) | AF5 | DECR INDEX |
| 1194 | 01E | 0AA | . | WRTL | E05 | |
| 1195 | 01E | 0AB | . | DIMAL | 3FD | GO TO WORD 06 FOR DEST BOL |
| 1196 | 01E | 0AC | . | READL | E01 | BOL IN MDL |
| 1197 | 01E | 0AD | . | X(MAL)(MDL) | 835 | |
| 1198 | 01E | 0AE | . | X(MDL)(MDU) | 856 | DATA CHAR TO MDL |
| 1199 | 01E | 0AF | . | CWRT | E08 | "      "  IN DEST |

*UPDATE DEST ADDRESS

| 1200 | 01E | 0B0 | . | X(MDL)(MAL) | 853 | |
| 1201 | 01E | 0B1 | . | INCR(MDL) | A25 | |
| 1202 | 01E | 0B2 | . | X(MAL)(UA) | 83A | |
| 1203 | 01E | 0B3 | . | #006 | 006 | |
| 1204 | 01E | 0B4 | . | WRTL | E05 | |
| 1205 | 01E | 0B5 | . | NOP | 800 | |
| 1206 | 01E | 0B6 | . | X(MAL)(G) | 832 | |

*GO TO SOURCE TO WRITE NULL & GET NEW DATA

| 1207 | 01E | 0B7 | . | X(MDU)(MAU) | 864 | |
| 1208 | 01E | 0B8 | . | X(MAU)(A) | 841 | "    MAU IN MAU |
| 1209 | 01E | 0B9 | . | RL(MDL) | A55 | ERASE LAST CHAR. MOVED |
| 1210 | 01E | 0BA | . | X(G)(MDU) | 826 | |
| 1211 | 01E | 0BB | . | WRTC | 3CB | |
| 1212 | 01E | 0BC | . | X(MDU)(G) | 862 | |
| 1213 | 01E | 0BD | . | INCR(MAL) | A23 | |
| 1214 | 01E | 0BE | . | JMP | 9D1 | |
| 1215 | 01E | 0BF | . | #SXFER | 09C | |
| 1216 | 01E | 0C0 | END1 | DIMAL | 3FD | |
| 1217 | 01E | 0C1 | . | READL | E01 | |
| 1218 | 01E | 0C2 | . | X(MDU)(MDL) | 865 | |

* RETURN TO SEARCH OF NULLS

| 1219 | 01E | 0C3 | . | DECR(MDU) | AF6 | |
| 1220 | 01E | 0C4 | . | R8(PR2) | B7F | |
| 1221 | 01E | 0C5 | . | R1(PR2) | B0F | |
| 1222 | 01E | 0C6 | . | JMP | 9D1 | |

* END COMPRESS

| 1223 | 01E | 0C7 | . | #MLOTS | 039 | |
| 1224 | 01E | 0C8 | KWIT | R1(PR2) | B0F | |
| 1225 | 01E | 0C9 | . | R8(PR2) | B7F | |
| 1226 | 01E | 0CA | . | JMP0 | 386 | |
| 1227 | 01E | 0CB | . | #000 | 000 | |
| 1228 | 01E | 0CC | . | #008 | 008 | |

**

| NO. | PU | PL | LABEL | MNEMONIC | CODE | COMMENTS |
|---|---|---|---|---|---|---|
| * | | | | | | |
| * | | | | | | |
| 1229 | 01E | 0CD | . | NOP | 800 | |
| 1230 | 01E | 0CE | . | NOP | 800 | |
| 1231 | 01E | 0CF | . | NOP | 800 | |
| 1232 | 01E | 0D0 | . | NOP | 800 | |
| 1233 | 01E | 0D1 | . | NOP | 800 | |
| 1234 | 01E | 0D2 | . | NOP | 800 | |
| 1235 | 01E | 0D3 | . | NOP | 800 | |
| 1236 | 01E | 0D4 | . | NOP | 800 | |
| 1237 | 01E | 0D5 | . | NOP | 800 | |
| 1238 | 01E | 0D6 | . | NOP | 800 | |
| 1239 | 01E | 0D7 | . | NOP | 800 | |
| 1240 | 01E | 0D8 | . | NOP | 800 | |
| 1241 | 01E | 0D9 | . | NOP | 800 | |
| 1242 | 01E | 0DA | . | NOP | 800 | |
| 1243 | 01E | 0DB | . | NOP | 800 | |
| 1244 | 01E | 0DC | . | NOP | 800 | |
| 1245 | 01E | 0DD | . | NOP | 800 | |
| 1246 | 01E | 0DE | . | NOP | 800 | |
| 1247 | 01E | 0DF | . | NOP | 800 | |
| 1248 | 01F | 0E0 | . | NOP | 800 | |
| * | | | | | | |
| 1249 | 01E | 0E1 | . | NOP | 800 | |
| 1250 | 01E | 0E2 | . | NOP | 800 | |
| 1251 | 01E | 0E3 | . | NOP | 800 | |
| 1252 | 01E | 0E4 | . | NOP | 800 | |
| 1253 | 01E | 0E5 | . | NOP | 800 | |
| 1254 | 01E | 0E6 | . | NOP | 800 | |
| 1255 | 01E | 0E7 | . | NOP | 800 | |
| 1256 | 01E | 0E8 | . | NOP | 800 | |
| 1257 | 01E | 0E9 | . | NOP | 800 | |
| 1258 | 01E | 0EA | . | NOP | 800 | |
| 1259 | 01E | 0EB | . | NOP | 800 | |
| 1260 | 01E | 0EC | . | NOP | 800 | |
| 1261 | 01E | 0ED | . | NOP | 800 | |
| 1262 | 01E | 0EE | . | NOP | 800 | |
| 1263 | 01E | 0EF | . | NOP | 800 | |
| 1264 | 01E | 0F0 | . | NOP | 800 | |
| * | | | | | | |
| 1265 | 01E | 0F1 | . | NOP | 800 | |
| 1266 | 01E | 0F2 | . | NOP | 800 | |
| 1267 | 01E | 0F3 | . | NOP | 800 | |
| 1268 | 01E | 0F4 | . | NOP | 800 | |
| 1269 | 01E | 0F5 | . | NOP | 800 | |
| 1270 | 01E | 0F6 | . | NOP | 800 | |
| 1271 | 01E | 0F7 | . | NOP | 800 | |
| 1272 | 01E | 0F8 | . | NOP | 800 | |
| 1273 | 01E | 0F9 | . | NOP | 800 | |
| 1274 | 01E | 0FA | . | NOP | 800 | |
| 1275 | 01E | 0FB | . | NOP | 800 | |
| 1276 | 01E | 0FC | . | NOP | 800 | |
| 1277 | 01E | 0FD | . | NOP | 800 | |
| 1278 | 01E | 0FE | . | NOP | 800 | |
| 1279 | 01E | 0FF | . | NOP | 800 | |
| ** | | | | | | |

```
NO.  PU   PL   LABEL MNEMONIC      CODE   COMMENTS

*----------------------LINE STRADDLE SUBROUTINE--------------
*
*INITIAL CONDITIONS - A & G ARE POINTING
*TO LAST DEST ADDRESS. MD'S ARE EMPTY
*SET UP RETURN CONDITIONS TO ORIGINAL
*CONTENT OF MA'S 1280 01F  000  COST1 MD-MA         3EF
1281 01F  001   .    WRTS"         3C1
1282 01F  002   .    @01F          01F
1283 01F  003   .    #COMA         0A0    STORE MD'S IN S MEMORY
1284 01F  004   .    X(MDL)(MDU)   856
1285 01F  005   .    WRTS"         3C1
1286 01F  006   .    @01F          01F
1287 01F  007   .    #COMA+1       0A1
1288 01F  008   .    R8(A)         B71

*ADDRESS LAST CHAR OF PREVIOUS LINE
*SAVE DESTINATION ADDRESS FROM A & G 1289 01F  009   .    MD-AG         3ED    SAVE DESTINATION ADD
1290 01F  00A   .    X(MAU)(MDU)   846    DEST SEG INTO MAU
1291 01F  00B   .    X(MAL)(UA)    83A
1292 01F  00C   .    @006          006    ADDRESS 06 IN OPSEG
1293 01F  00D   .    X(A)(UA)      81A
1294 01F  00E   .    @008          008
1295 01F  00F   .    SUB(MDL)      925
1296 01F  010   .    TSY(A)        D31    CHECK IF DEST. MAL = 08
1297 01F  011   .    #+4           014    NO
1298 01F  012   .    DECR(MAU)     AF4    YES SOURCE MAU = DEST MAU - 1
1299 01F  013   .    S8(MDL)       BF5    MDL8 - SOURCE MAU NOT = DEST M
1300 01F  014   .    WRT           E07    WRITE DEST. ADDR. IN 06 OF SOU
1301 01F  015   .    TR8(MDL)      CF5
1302 01F  016   .    #+3           018
1303 01F  017   .    RL(MDL)       A55    RESET MDL IF DEST MAL WAS = 8
1304 01F  018   .    X(MAL)(MDL)   835
1305 01F  019   .    DECR(MAL)     AF3    CALCULATE LAST CH OF DEST LINE
1306 01F  01A   .    R8(MAL)       B73
1307 01F  01B   .    NOP           800
1308 01F  01C   .    NOP           800

*SET UP INDEX FOR DATA MOVE
*MAU & MAL ARE POINTING TO EOL OF UPPER LINE 1309 01F  01D   .    READC         E00
1310 01F  01E   .    TRL(MDL)      C35    DATA = NULL?
1311 01F  01F   .    #NST          08A
1312 01F  020   .    R6(MDL)       B55
1313 01F  021   .    TRL(MDL)      C35    DATA = SPACE?
1314 01F  022   .    #NST          08A    YES-NO STRADDLE
1315 01F  023   .    NOP           800
1316 01F  024   .    NOP           800

*INITIALIZE INDEX STORE LOCATION 04 & STORE 1317 01F  025   .    X(A)(UA)      81A
1318 01F  026   .    @004          004
1319 01F  027   .    X(G)(MAL)     823    SAVE FIRST SOURCE ADDRESS
1320 01F  028   .    X(MAL)(A)     831
1321 01F  029   .    SL(MDL)       AC5
1322 01F  02A   .    WRTL          E05
1323 01F  02B   .    X(MAL)(G)     832
1324 01F  02C   .    NOP           800
1325 01F  02D   .    NOP           800
1326 01F  02E   .    NOP           800
```

| NO. | PU | PL | LABEL | MNEMONIC | CODE | COMMENTS |
|---|---|---|---|---|---|---|

*SEARCH FOR SPACE CHARACTER AND UPDATE INDEX

| 1327 | 01F | 02F | SERCH | X(MDU)(MAL) | 863 | STORE READ POINTER IN MDU |
| 1328 | 01F | 030 | . | X(MAL)(A) | 831 | A = INDEX STORE ADDR. = 04 |
| 1329 | 01F | 031 | . | READL | E01 | READ INDEX |
| 1330 | 01F | 032 | . | INCR(MDL) | A25 | |
| 1331 | 01F | 033 | . | WRTL | E05 | |

*CHECK IF THE WORD SRADDLING THE LINE IS NO GREATER THAN
*39 CHARACTERS LONG

| 1332 | 01F | 034 | . | TR6(MDL) | CD5 | |
| 1333 | 01F | 035 | . | #+4 | 038 | |
| 1334 | 01F | 036 | . | TS4(MDL) | DB5 | |
| 1335 | 01F | 037 | . | #SC40 | 07F | |
| 1336 | 01F | 038 | . | X(MAL)(MDU) | 836 | |
| 1337 | 01F | 039 | . | READC | E00 | READ DATA CHAR. IN SEARCH FOR |
| 1338 | 01F | 03A | . | DECR(MAL) | AF3 | |
| 1339 | 01F | 03B | . | R6(MDL) | B55 | |
| 1340 | 01F | 03C | . | TSY(MDL) | D35 | DATA = SPACE |
| 1341 | 01F | 03D | . | #SERCH | 02F | |
| 1342 | 01F | 03E | . | NOP | 800 | |
| 1343 | 01F | 03F | . | NOP | 800 | |
| 1344 | 01F | 040 | . | NOP | 800 | |
| 1345 | 01F | 041 | . | NOP | 800 | |

*SPACE WAS FOUND-INDEX=NO. OF CHAR. TO BE MOVED
*MOVE LAST DATA CHARACTER TO PROPER SPOT =
* = INDEX + DEST MAL = PROPER CHAR LOC.

| 1346 | 01F | 042 | . | DIMAL | 3FD | |
| 1347 | 01F | 043 | . | X(MDU)(MAL) | 863 | |
| 1348 | 01F | 044 | . | X(MAL)(A) | 831 | A - =04 |
| 1349 | 01F | 045 | . | WRTU | E06 | 04 HAS INDEX AND SOURCE MAL |
| 1350 | 01F | 046 | . | X(G)(MAU) | 824 | SAVE SOURCE MAU |
| 1351 | 01F | 047 | . | READ | E03 | READ INDEX |
| 1352 | 01F | 048 | . | X(A)(MDL) | 815 | SAVE INDEX IN A |
| 1353 | 01F | 049 | . | DECR(MDL) | AF5 | |
| 1354 | 01F | 04A | . | WRTL | E05 | |
| 1355 | 01F | 04B | . | DIMAL | 3FD | ADDRESS DESTINATION STORAGE |
| 1356 | 01F | 04C | . | READ | E03 | |
| 1357 | 01F | 04D | . | TR8(MDL) | CF5 | SOURCE MAU NOT=DEST MAU? |
| 1358 | 01F | 04E | . | #+3 | 050 | NO= |
| 1359 | 01F | 04F | . | INCR(MAU) | A24 | |
| 1360 | 01F | 050 | . | ADD(MDL) | 955 | A = INDEX + DEST MAL |
| 1361 | 01F | 051 | . | X(MAL)(MDL) | 835 | |
| 1362 | 01F | 052 | . | READC | E00 | |
| 1363 | 01F | 053 | . | X(MAL)(A) | 831 | |
| 1364 | 01F | 054 | . | NOP | 800 | |
| 1365 | 01F | 055 | . | WRTC | 3CB | REWRITE LAST DATA ENTRY AT IND |

*SET UP MOVE DATA SOURCE AND DEST. ADDR.

| 1366 | 01F | 056 | . | X(MAU)(G) | 842 | G = SOURCE MAU |
| 1367 | 01F | 057 | . | X(MAL)(UA) | 83A | |
| 1368 | 01F | 058 | . | @006 | 006 | |
| 1369 | 01F | 059 | . | READ | E03 | |
| 1370 | 01F | 05A | . | AG-MD | 3EB | |
| 1371 | 01F | 05B | . | DDMAL | 3FB | ADDRESS 04 TO OBTAIN MAL OF SO |
| 1372 | 01F | 05C | . | READU | E02 | |
| 1373 | 01F | 05D | . | X(MAL)(MDU) | 836 | LOAD SOURCE MAL FROM MDU |
| 1374 | 01F | 05E | . | NOP | 800 | |
| 1375 | 01F | 05F | . | NOP | 800 | |
| 1376 | 01F | 060 | . | NOP | 800 | |
| 1377 | 01F | 061 | . | NOP | 800 | |
| 1378 | 01F | 062 | . | NOP | 800 | |

| NO. | PU | PL | LABEL | MNEMONIC | CODE | COMMENTS |
|---|---|---|---|---|---|---|

*PERFORM STRADDLE CONNECTION

| NO. | PU | PL | LABEL | MNEMONIC | CODE | COMMENTS |
|---|---|---|---|---|---|---|
| 1379 | 01F | 063 | XFR | READC | E00 | READ FROM SOURCE ADDRESS |
| 1380 | 01F | 064 | . | X(MDU)(MAU) | 864 | SAVE TEMP. SOURCE MAU |
| 1381 | 01F | 065 | . | X(MAU)(G) | 842 | PUT DEST MAU FROM G |
| 1382 | 01F | 066 | . | X(G)(MDU) | 826 | STORE SOURCE MAU IN G |
| 1383 | 01F | 067 | . | X(MDU)(MAL) | 863 | |
| 1384 | 01F | 068 | . | X(MAL)(A) | 831 | LOAD DEST MAL |
| 1385 | 01F | 069 | . | X(A)(MDU) | 816 | STORE SOURCE MAL IN A |
| 1386 | 01F | 06A | . | WRTC | 3CB | MOVE CHAR. TO NEW DEST. |
| 1387 | 01F | 06B | . | MD→MA | 3EF | |
| 1388 | 01F | 06C | . | MA→AG | 3F1 | SOURCE ADDR. BACK IN MA |
| 1389 | 01F | 06D | . | AG→MD | 3EB | |
| 1390 | 01F | 06E | . | RL(MDL) | A55 | |
| 1391 | 01F | 06F | . | WRTC | 3CB | ERASE SOURCE LOCATION |
| 1392 | 01F | 070 | . | X(MDU)(MAL) | 863 | SAVE SOURCE MAL |
| 1393 | 01F | 071 | . | X(MAL)(UA) | 83A | |
| 1394 | 01F | 072 | . | @004 | 004 | ADDRESS INDEX STORAGE |
| 1395 | 01F | 073 | . | READL | E01 | |
| 1396 | 01F | 074 | . | TRL(MDL) | C35 | TEST IF ALL CH WERE MOVED |
| 1397 | 01F | 075 | . | #ENDST | 090 | YES |
| 1398 | 01F | 076 | . | INCR(MDL) | A25 | UPDATE INDEX |
| 1399 | 01F | 077 | . | WRTL | E05 | |
| 1400 | 01F | 078 | . | INCR(MDU) | A26 | INCR SOURCE MAL |
| 1401 | 01F | 079 | . | X(MAL)(MDU) | 836 | |
| 1402 | 01F | 07A | . | INCR(A) | A21 | INCREMENT DEST MAL |
| 1403 | 01F | 07B | . | JMP | 9D1 | |
| 1404 | 01F | 07C | . | #XFR | 063 | |
| 1405 | 01F | 07D | . | NOP | 800 | |
| 1406 | 01F | 07E | . | NOP | 800 | |

*WORD IS GREATER THAN 39 CHAR
*RESTORE DEST ADD IN A AND G

| NO. | PU | PL | LABEL | MNEMONIC | CODE | COMMENTS |
|---|---|---|---|---|---|---|
| 1407 | 01F | 07F | SC40 | S8(G) | BF2 | |
| 1408 | 01F | 080 | . | TRY(G) | C42 | G=EOL OF SOURCE LINE |
| 1409 | 01F | 081 | . | #+5 | 085 | |
| 1410 | 01F | 082 | . | INCR(MAU) | A24 | |
| 1411 | 01F | 083 | . | X(G)(UA) | 82A | |
| 1412 | 01F | 084 | . | @007 | 007 | |
| 1413 | 01F | 085 | . | X(MAL)(G) | 832 | |
| 1414 | 01F | 086 | . | AG→MA | 3F3 | |
| 1415 | 01F | 087 | . | JMP | 9D1 | |
| 1416 | 01F | 088 | . | #ENDST | 090 | |
| 1417 | 01F | 089 | . | NOP | 800 | |

*END OF STRADDLE CORRECTION ROUTINE

| NO. | PU | PL | LABEL | MNEMONIC | CODE | COMMENTS |
|---|---|---|---|---|---|---|
| 1418 | 01F | 08A | NST | X(MDL)(MAL) | 853 | |
| 1419 | 01F | 08B | . | TS8(A) | DF1 | DEST.2ND OR 3RF LINE? |
| 1420 | 01F | 08C | . | #+4 | 08F | YES |
| 1421 | 01F | 08D | . | X(MDL)(UA) | 85A | DEST=1ST LINE 1ST CH |
| 1422 | 01F | 08E | . | @007 | 007 | |
| 1423 | 01F | 08F | . | AG→MD | 3EB | |

*END OF STRADDLE CORRECTION SUBROUTINE
*IF WORD WAS LESS THAN 40 CHARACTERD STRADDLE CORRECTION
*WAS ATTEMPTED

| NO. | PU | PL | LABEL | MNEMONIC | CODE | COMMENTS |
|---|---|---|---|---|---|---|
| 1424 | 01F | 090 | ENDST | READS" | 3B9 | RETR. CONST. FROM S |
| 1425 | 01F | 091 | . | @01F | 01F | |
| 1426 | 01F | 092 | . | #COMA | 0A0 | |
| 1427 | 01F | 093 | . | MA→AG | 3F1 | |
| 1428 | 01F | 094 | . | RL(MAL) | A53 | |
| 1429 | 01F | 095 | . | S3(MAL) | BA3 | |
| 1430 | 01F | 096 | . | WRTL | E05 | WRITE MDL TEMPIN 04 |
| 1431 | 01F | 097 | . | READS" | 3B9 | |

| NO. | PU | PL | LABEL | MNEMONIC | CODE | COMMENTS |
|---|---|---|---|---|---|---|
| 1432 | 01F | 098 | . | @01F | 01F | |
| 1433 | 01F | 099 | . | #COMA+1 | 0A1 | |
| 1434 | 01F | 09A | . | X(MDU)(MDL) | 865 | |
| 1435 | 01F | 09B | . | MA←AG | 3F1 | |
| 1436 | 01F | 09C | . | RL(MAL) | A53 | |
| 1437 | 01F | 09D | . | S3(MAL) | BA3 | |
| 1438 | 01F | 09E | . | READL | E01 | |
| 1439 | 01F | 09F | . | RETURN | 18B | |
| 1440 | 01F | 0A0 | COMA | NOP | 800 | MAL STORAGE |
| 1441 | 01F | 0A1 | . | NOP | 800 | MAU STORAGE |

**

```
PROGRAM NAME, ISSUE NUMBER? /DO XMIT PROG1/,2
MAXIMUM NUMBER OF STATEMENTS? 3000
STARTING LOCATION IN REGISTER PU  (3 HEX DIGITS)? 020
STARTING LOCATION IN REGISTER PL  (3 HEX DIGITS)? 010
ASSEMBLER  (YES, YES-U, NO, OR NO-U)? NO
OUTPUT   (LIST, PARTIAL LIST, TAPE, COMPRESSED FILE, LABEL, OR NONE)
?LIST
PAGE FORMAT (YES OR NO) ? YES
```

************* /DO XMIT PROG1/ ************* ISSUE NO. 2

| NO. | PU | PL | LABEL | MNEMONIC | CODE | COMMENTS | PAGE 1 |
|---|---|---|---|---|---|---|---|

* POLL TRAPS RTC TO THIS POINT.
* MA'S POINT TO STATUS WORD.
* WHICH RTC HAS INTERRUPTED?
* UPPER (BIT 7 OF G=0) IS TIME OUT.
* TURN ON CARRIER.

| NO. | PU | PL | LABEL | MNEMONIC | CODE | COMMENTS |
|---|---|---|---|---|---|---|
| 0 | 020 | 010 | . | NOP | 800 | |
| 1 | 020 | 011 | . | NOP | 800 | |
| 2 | 020 | 012 | XMPL1 | READ' | 3B7 | MD←FGND PTR |
| 3 | 020 | 013 | . | @002 | 002 | |
| 4 | 020 | 014 | . | TR8(MDU) | CF6 | REC WROTE INTO PTR? |
| 5 | 020 | 015 | . | #XMPL2 | 019 | NO. |
| 6 | 020 | 016 | . | R8(MDU) | B76 | YES.RESET FLAG. |
| 7 | 020 | 017 | . | WRT | E07 | |
| 8 | 020 | 018 | . | P←MD | 380 | AND JUMP THRU PTR. |
| 9 | 020 | 019 | XMPL2 | NOP | 800 | |
| 10 | 020 | 01A | . | NOP | 800 | |
| 11 | 020 | 01B | . | ENTRM' | 3A4 | |
| 12 | 020 | 01C | . | @005 | 005 | |
| 13 | 020 | 01D | . | #RDYTS | 06A | |
| 14 | 020 | 01E | . | READC' | 3C7 | |
| 15 | 020 | 01F | . | @01A | 01A | |
| 16 | 020 | 020 | . | S1(MDL) | B85 | RESET LINE DOWN BIT |
| 17 | 020 | 021 | . | WRTC | 3CB | |
| 18 | 020 | 022 | . | X(A) (UA) | 81A | |
| 19 | 020 | 023 | . | @010 | 010 | |
| 20 | 020 | 024 | . | LDG' | 356 | |
| 21 | 020 | 025 | . | @05C | 05C | |
| 22 | 020 | 026 | . | INCR(G) | A22 | |
| 23 | 020 | 027 | . | OUTC | 39C | TURN ON LINE |
| 24 | 020 | 028 | . | LDA' | 326 | |
| 25 | 020 | 029 | . | @02C | 02C | |
| 26 | 020 | 02A | . | SUBRTN | 17F | TURN RTC ON. |
| 27 | 020 | 02B | . | @004 | 004 | |
| 28 | 020 | 02C | . | @000 | 000 | |
| 29 | 020 | 02D | . | JMPO | 386 | |

| NO. | PU | PL | LABEL | MNEMONIC | CODE | COMMENTS |
|---|---|---|---|---|---|---|
| 30 | 020 | 02E | . | @022 | 022 | |
| 31 | 020 | 02F | . | #PORC1 | 013 | |

* INTERPOL TIMER EXPIRES. INDICATE LINE DOWN.
* REPLACE FLASHING "T" BY "D" IN ALL BID-
* DING DEVICES. REMOVE THEM FROM XMIT QUEUE.
* GO TO RECEIVE FOR INIZ.

| NO. | PU | PL | LABEL | MNEMONIC | CODE | COMMENTS |
|---|---|---|---|---|---|---|
| 32 | 020 | 030 | NPOL | TR7(G) | CE2 | |
| 33 | 020 | 031 | . | #TOEXP | 054 | |
| 34 | 020 | 032 | . | READ' | 3B7 | |
| 35 | 020 | 033 | . | @01A | 01A | |
| 36 | 020 | 034 | . | R1(MDU) | B06 | |
| 37 | 020 | 035 | . | WRTU | E06 | |
| 38 | 020 | 036 | QSRCH | X(MAL)(UA) | 83A | MAL←QUEUE PTR ADDRESS. |
| 39 | 020 | 037 | . | @028 | 028 | |
| 40 | 020 | 038 | . | SUBRTN | 17F | SEEKER WILL FIND BID BITS |
| 41 | 020 | 039 | . | @022 | 022 | |
| 42 | 020 | 03A | . | #SEEK | 0A1 | |
| 43 | 020 | 03B | . | TR8(MAL) | CF3 | |
| 44 | 020 | 03C | . | #+5 | 040 | |
| 45 | 020 | 03D | . | JMPO | 386 | NO MORE TRAFIC IN QUEUE |
| 46 | 020 | 03E | @000 | | 000 | GO TO RECEIVE FOR INIZ ------------ |
| 47 | 020 | 03F | . | @008 | 008 | |
| 48 | 020 | 040 | . | X(MDU)(MAL) | 863 | TRAFFIC. ENABLE ANY BIDDING |
| 49 | 020 | 041 | . | MA←AG | 3F1 | DEVICE INCLUDING KSR'S |
| 50 | 020 | 042 | . | X(A)(MDU) | 816 | SET UP STATUS WORD ADDRESS |
| 51 | 020 | 043 | . | TR2(MAL) | C93 | |
| 52 | 020 | 044 | . | #+4 | 047 | |
| 53 | 020 | 045 | . | S5(MAU) | BC4 | |
| 54 | 020 | 046 | . | R2(MAL) | B13 | |
| 55 | 020 | 047 | . | RL(MDU) | A56 | |
| 56 | 020 | 048 | . | X(MDL)(UA) | 85A | |
| 57 | 020 | 049 | . | @080 | 080 | |
| 58 | 020 | 04A | . | WRT | E07 | RE-ENABLE DEVICE |
| 59 | 020 | 04B | . | TR1(A) | C81 | KEYBOARD? |
| 60 | 020 | 04C | . | #+6 | 051 | NO. |
| 61 | 020 | 04D | . | X(A)(UA) | 81A | |
| 62 | 020 | 04E | . | @020 | 020 | |
| 63 | 020 | 04F | . | DDMAL | 3FB | |
| 64 | 020 | 050 | . | SNS2 | 146 | REPLACE "T" BY "D" |
| 65 | 020 | 051 | . | PORTAD | 3DD | |
| 66 | 020 | 052 | . | JMP | 9D1 | |
| 67 | 020 | 053 | . | #QSRCH | 036 | |

* TIME OUT EXPIRATION

* CLEAR CURRENT A1. UNLOCK KEYBOARD. FLASH E.

| NO. | PU | PL | LABEL | MNEMONIC | CODE | COMMENTS |
|---|---|---|---|---|---|---|
| 68 | 020 | 054 | TOEXP | ENTRM' | 3A4 | |
| 69 | 020 | 055 | . | @01B | 01B | |
| 70 | 020 | 056 | . | @000 | 000 | |
| 71 | 020 | 057 | . | S3(MAL) | BA3 | |
| 72 | 020 | 058 | . | READ | E03 | |
| 73 | 020 | 059 | . | MA←MD | 3E9 | |
| 74 | 020 | 05A | . | TS8(MAL) | DF3 | |
| 75 | 020 | 05B | . | #+5 | 05F | KEY BOARD |
| 76 | 020 | 05C | . | DDMAL | 3FB | |
| 77 | 020 | 05D | . | DDMAL | 3FB | |
| 78 | 020 | 05E | . | JMPI" | 37F | VIA RTC TRAP |
| 79 | 020 | 05F | . | X(MDL)(UA) | 85A | UNLOCK KEYBOARD |
| 80 | 020 | 060 | . | @080 | 080 | |
| 81 | 020 | 061 | . | RL(MDU) | A56 | |
| 82 | 020 | 062 | . | WRT | E07 | |
| 83 | 020 | 063 | . | DDMAL | 3FB | |
| 84 | 020 | 064 | . | X(A)(UA) | 81A | |
| 85 | 020 | 065 | . | @0D0 | 0D0 | |

| NO. | PU | PL | LABEL | MNEMONIC | CODE | COMMENTS |
|---|---|---|---|---|---|---|
| 86 | 020 | 066 | . | SNS2 | 146 | FLASH AN"Z" |
| 87 | 020 | 067 | . | JMPO | 386 | |
| 88 | 020 | 068 | . | @022 | 022 | |
| 89 | 020 | 069 | . | #PORC1-1 | 012 | |

**

* READY TO SEND RTC TRAPS HERE.
* MA'S AT STATUS WORD.
* PUT INTERPOL TIMER IN TRAP AND TURN ON LOWER RTC

| NO. | PU | PL | LABEL | MNEMONIC | CODE | COMMENTS |
|---|---|---|---|---|---|---|
| 90 | 020 | 06A | RDYTS | TR7(G) | CE2 | TIME OUT EXPIRED? |
| 91 | 020 | 06B | . | #TOEXP | 054 | YES |
| 92 | 020 | 06C | . | RL(MAL) | A53 | |
| 93 | 020 | 06D | . | X(MDU)(PU) | 868 | |
| 94 | 020 | 06E | . | X(MDL)(UA) | 85A | TIJAL←SYN1 |
| 95 | 020 | 06F | . | #SYNS1 | 07E | |
| 96 | 020 | 070 | . | WRT | E07 | |
| 97 | 020 | 071 | . | ENTRM' | 3A4 | |
| 98 | 020 | 072 | . | @005 | 005 | |
| 99 | 020 | 073 | . | #NPOL | 030 | RTC TRP←INTERPOL EXP |
| 100 | 020 | 074 | . | LDA' | 326 | |
| 101 | 020 | 075 | . | @02D | 02D | |
| 102 | 020 | 076 | . | SUBRTN | 17F | TURN ON INTERPOL RTC |
| 103 | 020 | 077 | . | @004 | 004 | |
| 104 | 020 | 078 | . | @000 | 000 | |

* PUT 3 SYN CHARS IN BUFFER

| NO. | PU | PL | LABEL | MNEMONIC | CODE | COMMENTS |
|---|---|---|---|---|---|---|
| 105 | 020 | 079 | . | X(A)(UA) | 81A | |
| 106 | 020 | 07A | . | @016 | 016 | A←SYN |
| 107 | 020 | 07B | . | JMPO | 386 | |
| 108 | 020 | 07C | . | @021 | 021 | ROUTINE WHICH PUTS CHAR |
| 109 | 020 | 07D | . | #OUTC4 | 0FC | IN BUFFER AND CHECKS OFLO |
| 110 | 020 | 07E | SYNS1 | X(G)(UA) | 82A | |
| 111 | 020 | 07F | . | #SYNS2 | 085 | |
| 112 | 020 | 080 | . | X(A)(UA) | 81A | |
| 113 | 020 | 081 | . | @016 | 016 | A←SYN |
| 114 | 020 | 082 | . | JMPO | 386 | |
| 115 | 020 | 083 | . | @021 | 021 | |
| 116 | 020 | 084 | . | #OUTC5 | 0F4 | |
| 117 | 020 | 085 | SYNS2 | X(G)(UA) | 82A | |
| 118 | 020 | 086 | . | #SYNS3 | 08C | |
| 119 | 020 | 087 | . | X(A)(UA) | 81A | |
| 120 | 020 | 088 | . | @016 | 016 | A←SYN |
| 121 | 020 | 089 | . | JMPO | 386 | |
| 122 | 020 | 08A | . | @021 | 021 | |
| 123 | 020 | 08B | . | #OUTC5 | 0F4 | |

* TURN ON PROPER LINE

| NO. | PU | PL | LABEL | MNEMONIC | CODE | COMMENTS |
|---|---|---|---|---|---|---|
| 124 | 020 | 08C | SYNS3 | LDG' | 356 | G←PORT # |
| 125 | 020 | 08D | . | @05C | 05C | |
| 126 | 020 | 08E | . | INCR(G) | A22 | |
| 127 | 020 | 08F | . | X(A)(UA) | 81A | |
| 128 | 020 | 090 | . | @013 | 013 | |
| 129 | 020 | 091 | . | OUTC | 39C | TURN ON LINE W 3 SYNS IN BFR |

* ACK BFR CHECK.XMIT ACK IF BFR CONTAINS AN A1

| NO. | PU | PL | LABEL | MNEMONIC | CODE | COMMENTS |
|---|---|---|---|---|---|---|
| 130 | 020 | 092 | . | READ' | 3B7 | |
| 131 | 020 | 093 | . | @02A | 02A | |
| 132 | 020 | 094 | . | X(G)(MDL) | 825 | G←A1 |
| 133 | 020 | 095 | . | TRL(MDL) | C35 | A1(1) CLEAR? |
| 134 | 020 | 096 | . | #TNT | 0A1 | TEST NO TRAFFIC |
| 135 | 020 | 097 | . | X(MDL)(MDU) | 856 | THERE IS AN ACK.MOVE QUEUE UP |
| 136 | 020 | 098 | . | RL(MDU) | A56 | |
| 137 | 020 | 099 | . | WRT | E07 | |

| NO. | PU | PL | LABEL | MNEMONIC | CODE | COMMENTS |
|---|---|---|---|---|---|---|
| 138 | 020 | 09A | ACK | S1(G) | B82 | STORE A1 FOR ACK IN |
| 139 | 020 | 09B | . | X(MDL)(G) | 852 | SAME WORD AS HOME A1 |
| 140 | 020 | 09C | . | WRTC' | 3CA | |
| 141 | 020 | 09D | . | @01A | 01A | |
| 142 | 020 | 09E | . | JMP | 9D1 | LOAD MESSAGE HEADER FOR |
| 143 | 020 | 09F | . | #HDLD | 0E7 | ACK MESSAGE |
| 144 | 020 | 0A0 | . | NOP | 800 | |

* TEST TO SEE IF AWAITING REPLY.
* (IS TIME OUT TIMER ACTIVE?)

| NO. | PU | PL | LABEL | MNEMONIC | CODE | COMMENTS |
|---|---|---|---|---|---|---|
| 145 | 020 | 0A1 | TNT | READ' | 3B7 | |
| 146 | 020 | 0A2 | . | @006 | 006 | |
| 147 | 020 | 0A3 | . | TS8(MDU) | DF6 | |
| 148 | 020 | 0A4 | . | #NOTR | 0B3 | TIMER ACTIVE. |
| 149 | 020 | 0A5 | . | READ' | 3B7 | |
| 150 | 020 | 0A6 | . | @004 | 004 | |
| 151 | 020 | 0A7 | . | TS8(MDU) | DF6 | |
| 152 | 020 | 0A8 | . | #NOTR | 0B3 | |
| 153 | 020 | 0A9 | . | X(MAL)(UA) | 83A | MAL←QUEUE PTR ADDR |
| 154 | 020 | 0AA | . | @028 | 028 | |
| 155 | 020 | 0AB | . | SUBRTN | 17F | |
| 156 | 020 | 0AC | . | @022 | 022 | |
| 157 | 020 | 0AD | . | #SEEK | 0A1 | |
| 158 | 020 | 0AE | . | TS8(MAL) | DF3 | BIT 8 OF MAL RESET IF |
| 159 | 020 | 0AF | . | #NOTR | 0B3 | SEEKER FOUND TRAFFIC |
| 160 | 020 | 0B0 | . | JMP | 9D1 | |
| 161 | 020 | 0B1 | . | #XINT | 0C1 | |
| 162 | 020 | 0B2 | . | NOP | 800 | |

* NO TRAFFIC. LOAD EOT INTO BUFFER

| NO. | PU | PL | LABEL | MNEMONIC | CODE | COMMENTS |
|---|---|---|---|---|---|---|
| 163 | 020 | 0B3 | NOTR | RL(MAL) | A53 | |
| 164 | 020 | 0B4 | . | X(MDL)(UA) | 85A | TIJAL←START OF TRAILER |
| 165 | 020 | 0B5 | . | #XWNDP | 0AB | ADDRESS |
| 166 | 020 | 0B6 | . | X(MDU)(UA) | 86A | |
| 167 | 020 | 0B7 | . | @021 | 021 | |
| 168 | 020 | 0B8 | . | WRT | E07 | |
| 169 | 020 | 0B9 | . | RL(MDL) | A55 | |
| 170 | 020 | 0BA | . | WRTC' | 3CA | CLEAR HPC FOR NEGATIVE RESP. |
| 171 | 020 | 0BB | . | @031 | 031 | |
| 172 | 020 | 0BC | . | X(A)(UA) | 81A | A←EOT |
| 173 | 020 | 0BD | . | @004 | 004 | |
| 174 | 020 | 0BE | . | JMP0 | 386 | |
| 175 | 020 | 0BF | . | @021 | 021 | |
| 176 | 020 | 0C0 | . | #OUTC4 | 0FC | OUTPUT CHAR |

**

* NORMAL TRANSMIT PROGRAM FOR TEXT.
* SEEKER GIVES DEVICES CONTROL SEG. STORE IT

| NO. | PU | PL | LABEL | MNEMONIC | CODE | COMMENTS |
|---|---|---|---|---|---|---|
| 177 | 020 | 0C1 | XINT | MD←AG | 3ED | IOC VERSION OF STWA |
| 178 | 020 | 0C2 | . | TR2(MDL) | C95 | |
| 179 | 020 | 0C3 | . | #+4 | 0C6 | |
| 180 | 020 | 0C4 | . | S5(MDU) | BC6 | |
| 181 | 020 | 0C5 | . | R2(MDL) | B15 | |
| 182 | 020 | 0C6 | . | X(G)(MAL) | 823 | G←KYBD INDICATION |
| 183 | 020 | 0C7 | . | X(MAL)(UA) | 83A | MAL←KYBD CTL AREA STG ADD |
| 184 | 020 | 0C8 | . | @01E | 01E | |
| 185 | 020 | 0C9 | . | R8(MDL) | B75 | INDICATE NOT A KYBD |
| 186 | 020 | 0CA | . | NOP | 800 | |
| 187 | 020 | 0CB | . | NOP | 800 | |
| 188 | 020 | 0CC | . | S8(MDL) | BF5 | YES. INDICATE KYBD. |
| 189 | 020 | 0CD | . | WRT | E07 | STORE STATUS WORD ADDR. |

| No. | PU | PL | LABEL | MNEMONIC | CODE | COMMENTS |
|---|---|---|---|---|---|---|

* DETERMINE HOME AND STERTING ADDR. A1 & SAVE.

| No. | PU | PL | LABEL | MNEMONIC | CODE | COMMENTS |
|---|---|---|---|---|---|---|
| 190 | 020 | 0CE | . | MA←MD | 3E9 | |
| 191 | 020 | 0CF | . | S4(MAL) | BB3 | |
| 192 | 020 | 0D0 | . | R5(MAL) | B43 | |
| 193 | 020 | 0D1 | . | L0PSG2 | 151 | |
| 194 | 020 | 0D2 | . | X(A)(MAU) | 814 | A←QUERY START A1 |
| 195 | 020 | 0D3 | . | HOME | 24E | |

* DETERMINE IF MONITOR BIT INHIBITED
* A HAS QUERY START A1. MAU HAS HOME MAU.
* NO MONITOR CHECK IF NOT GOING TO BR CONC

| No. | PU | PL | LABEL | MNEMONIC | CODE | COMMENTS |
|---|---|---|---|---|---|---|
| 196 | 020 | 0D4 | . | X(G)(MAU) | 824 | G←HOME MAU |
| 197 | 020 | 0D5 | . | CTLA | 15C | |
| 198 | 020 | 0D6 | . | S3(MAL) | BA3 | |
| 199 | 020 | 0D7 | . | READL | E01 | MDL←FI |
| 200 | 020 | 0D8 | . | S2(MAL) | B93 | |
| 201 | 020 | 0D9 | . | READU | E02 | MDU←XMIT PORT ADDR |
| 202 | 020 | 0DA | NMC | X(MAU)(MDU) | 846 | MAU←PORT ADDR |
| 203 | 020 | 0DB | . | X(MDU)(MDL) | 865 | MDU←FI |
| 204 | 020 | 0DC | . | X(MDL)(A) | 851 | MDL←EM A1 |
| 205 | 020 | 0DD | . | WRT' | 3BF | |
| 206 | 020 | 0DE | . | @01C | 01C | |
| 207 | 020 | 0DF | . | DECR(MAL) | AF3 | |
| 208 | 020 | 0E0 | . | X(MDL)(G) | 852 | MDL←HOME A1 |
| 209 | 020 | 0E1 | . | WRTL | E05 | |

* START UP UPPR REAL TIME CLOCK FOR TIME OUT.

| No. | PU | PL | LABEL | MNEMONIC | CODE | COMMENTS |
|---|---|---|---|---|---|---|
| 210 | 020 | 0E2 | . | LDA' | 326 | UPPER TIMER ← 15 SEC |
| 211 | 020 | 0E3 | . | @02E | 02E | |
| 212 | 020 | 0E4 | . | SUBRTN | 17F | |
| 213 | 020 | 0E5 | . | @004 | 004 | |
| 214 | 020 | 0E6 | . | @000 | 000 | |

* LOAD HEADER INTO BUFFER

| No. | PU | PL | LABEL | MNEMONIC | CODE | COMMENTS |
|---|---|---|---|---|---|---|
| 215 | 020 | 0E7 | HDLD | RL(MAL) | A53 | |
| 216 | 020 | 0E8 | . | X(MDU)(PU) | 868 | |
| 217 | 020 | 0E9 | . | X(MDL)(UA) | 85A | |
| 218 | 020 | 0EA | . | #XFI | 0F6 | TIJAL←XFI |
| 219 | 020 | 0EB | . | WRT | E07 | |
| 220 | 020 | 0EC | . | RL(MDL) | A55 | CLEAR HPC STORAGE |
| 221 | 020 | 0ED | . | WRTC' | 3CA | |
| 222 | 020 | 0EE | . | @031 | 031 | |
| 223 | 020 | 0EF | . | NOP | 800 | |
| 224 | 020 | 0F0 | . | NOP | 800 | |
| 225 | 020 | 0F1 | . | X(A)(UA) | 81A | |
| 226 | 020 | 0F2 | . | @001 | 001 | SOH CODE |
| 227 | 020 | 0F3 | . | JMPO | 386 | OUTPUT CHAR |
| 228 | 020 | 0F4 | . | @021 | 021 | |
| 229 | 020 | 0F5 | . | #0UTC4 | 0FC | |
| 230 | 020 | 0F6 | XFI | READ' | 3B7 | |
| 231 | 020 | 0F7 | . | @01C | 01C | |
| 232 | 020 | 0F8 | . | X(A)(MDU) | 816 | A←FI CHAR |
| 233 | 020 | 0F9 | . | S7(A) | BE1 | |
| 234 | 020 | 0FA | . | X(G)(UA) | 82A | |
| 235 | 020 | 0FB | . | #XI1 | 0FF | |
| 236 | 020 | 0FC | . | JMPO | 386 | |
| 237 | 020 | 0FD | . | @021 | 021 | |
| 238 | 020 | 0FE | . | #0UTC5 | 0F4 | |
| 239 | 020 | 0FF | XI1 | RSTRP(4) | E24 | |
| 240 | 021 | 000 | . | X(A)(MDL) | 815 | A←I1 CHAR |
| 241 | 021 | 001 | . | X(G)(UA) | 82A | |
| 242 | 021 | 002 | . | #XI2 | 006 | |
| 243 | 021 | 003 | . | RL(MAL) | A53 | |

| NO. | PU | PL | LABEL | MNEMONIC | CODE | COMMENTS |
|---|---|---|---|---|---|---|
| 244 | 021 | 004 | . | JMP | 9D1 | |
| 245 | 021 | 005 | . | #PX1 | 055 | |
| 246 | 021 | 006 | XI2 | RSTRP(5) | E25 | |
| 247 | 021 | 007 | . | X(A)(MDL) | 815 | A←I2 CHAR |
| 248 | 021 | 008 | . | X(G)(UA) | 82A | |
| 249 | 021 | 009 | . | #XA0 | 00D | |
| 250 | 021 | 00A | . | JMP0 | 386 | |
| 251 | 021 | 00B | . | @021 | 021 | |
| 252 | 021 | 00C | . | #OUTC5 | 0F4 | |
| 253 | 021 | 00D | XA0 | LDA' | 326 | |
| 254 | 021 | 00E | . | @05D | 05D | |
| 255 | 021 | 00F | . | S7(A) | BE1 | |
| 256 | 021 | 010 | . | X(G)(UA) | 82A | |
| 257 | 021 | 011 | . | #XA1 | 015 | |
| 258 | 021 | 012 | . | JMP0 | 386 | |
| 259 | 021 | 013 | . | @021 | 021 | |
| 260 | 021 | 014 | . | #OUTC5 | 0F4 | |
| 261 | 021 | 015 | XA1 | READ' | 3B7 | |
| 262 | 021 | 016 | . | @01A | 01A | |
| 263 | 021 | 017 | . | X(G)(UA) | 82A | |
| 264 | 021 | 018 | . | #XSTX | 022 | |
| 265 | 021 | 019 | . | R1(MDU) | B06 | |
| 266 | 021 | 01A | . | TRL(MDU) | C36 | LOAD ACK A1? |
| 267 | 021 | 01B | . | #+3 | 01D | NO. |
| 268 | 021 | 01C | . | X(MDL)(MDU) | 856 | |
| 269 | 021 | 01D | . | X(A)(MDL) | 815 | A←HOME A1 OR ACK A1 |
| 270 | 021 | 01E | . | SHFTR(A) | A71 | |
| 271 | 021 | 01F | . | JMP0 | 386 | |
| 272 | 021 | 020 | . | @021 | 021 | |
| 273 | 021 | 021 | . | #OUTC5 | 0F4 | |
| 274 | 021 | 022 | XSTX | X(G)(UA) | 82A | |
| 275 | 021 | 023 | . | #XCCF | 02B | XMIT CCF DATA |
| 276 | 021 | 024 | . | X(A)(UA) | 81A | |
| 277 | 021 | 025 | . | @002 | 002 | A←STX |
| 278 | 021 | 026 | . | JMP | 9D1 | |
| 279 | 021 | 027 | . | #OUTC5 | 0F4 | |
| 280 | 021 | 028 | . | NOP | 800 | |

**

*XMIT CCF FIELD
*CCF IS STORED IN THE LAST 5 WORDS OF KBRD C AREA

| NO. | PU | PL | LABEL | MNEMONIC | CODE | COMMENTS |
|---|---|---|---|---|---|---|
| 281 | 021 | 029 | . | NOP | 800 | |
| 282 | 021 | 02A | . | NOP | 800 | |
| 283 | 021 | 02B | XCCF | READ' | 3B7 | |
| 284 | 021 | 02C | . | @01E | 01E | |
| 285 | 021 | 02D | . | R1(MDL) | B05 | |
| 286 | 021 | 02E | . | S6(MDL) | BD5 | CALCULATE CCF START ADD |
| 287 | 021 | 02F | . | S2(MDL) | B95 | |
| 288 | 021 | 030 | . | S3(MDL) | BA5 | |
| 289 | 021 | 031 | . | WRT' | 3BF | STORE CCF ADD IN XMIT C AREA |
| 290 | 021 | 032 | . | @032 | 032 | |
| 291 | 021 | 033 | XCCFT | READ' | 3B7 | |
| 292 | 021 | 034 | . | @032 | 032 | |
| 293 | 021 | 035 | . | X(A)(MDL) | 815 | |
| 294 | 021 | 036 | . | TPAT | 3D9 | |
| 295 | 021 | 037 | . | @00F | 00F | TEST IF ALL CCF IS XMITED |
| 296 | 021 | 038 | . | @000 | 000 | |
| 297 | 021 | 039 | . | #XFS | 04D | XMIT FIELD SEPERATOR |
| 298 | 021 | 03A | . | NOP | 800 | |
| 299 | 021 | 03B | . | NOP | 800 | |
| 300 | 021 | 03C | . | NOP | 800 | |
| 301 | 021 | 03D | . | X(G)(UA) | 82A | |
| 302 | 021 | 03E | . | #XCCFT | 033 | |
| 303 | 021 | 03F | . | INCR(MDL) | A25 | |
| 304 | 021 | 040 | . | WRT' | 3BF | |

| NO. | PU | PL | LABEL | MNEMONIC | CODE | COMMENTS |
|---|---|---|---|---|---|---|
| 305 | 021 | 041 | . | @032 | 032 | |
| 306 | 021 | 042 | . | DECR(MDL) | AF5 | |
| 307 | 021 | 043 | . | MA←MD | 3E9 | |
| 308 | 021 | 044 | . | READC | E00 | |
| 309 | 021 | 045 | . | X(A)(MDL) | 815 | |
| 310 | 021 | 046 | . | RL(MAU) | A54 | |
| 311 | 021 | 047 | . | NOP | 800 | |
| 312 | 021 | 048 | . | NOP | 800 | |
| 313 | 021 | 049 | . | NOP | 800 | |
| 314 | 021 | 04A | . | JMP | 9D1 | |
| 315 | 021 | 04B | . | #OUTC5 | 0F4 | |
| 316 | 021 | 04C | . | NOP | 800 | |

*XMIT FS AFTER CCF

| NO. | PU | PL | LABEL | MNEMONIC | CODE | COMMENTS |
|---|---|---|---|---|---|---|
| 317 | 021 | 04D | XFS | X(A)(UA) | 81A | |
| 318 | 021 | 04E | . | @01C | 01C | FS=1C |
| 319 | 021 | 04F | . | X(G)(UA) | 82A | |
| 320 | 021 | 050 | . | #XSTRT | 05A | |
| 321 | 021 | 051 | . | JMP | 9D1 | |
| 322 | 021 | 052 | . | #OUTC5 | 0F4 | |
| 323 | 021 | 053 | . | NOP | 800 | |
| 324 | 021 | 054 | . | NOP | 800 | |
| 325 | 021 | 055 | PX1 | READ | E03 | |
| 326 | 021 | 056 | . | INCR(MDU) | A26 | UPDATE TIJAL MAU |
| 327 | 021 | 057 | . | WRT | E07 | |
| 328 | 021 | 058 | . | JMP | 9D1 | |
| 329 | 021 | 059 | . | #OUTC5 | 0F4 | |

**

* THIS SECTION EDITS THE TEXT ON THE CRT

| NO. | PU | PL | LABEL | MNEMONIC | CODE | COMMENTS |
|---|---|---|---|---|---|---|
| 330 | 021 | 05A | XSTRT | ENTRM' | 3A4 | |
| 331 | 021 | 05B | . | @000 | 000 | |
| 332 | 021 | 05C | . | @021 | 021 | |
| 333 | 021 | 05D | . | READ' | 3B7 | |
| 334 | 021 | 05E | . | @01A | 01A | |
| 335 | 021 | 05F | . | R1(MDU) | B06 | |
| 336 | 021 | 060 | . | TRL(MDU) | C36 | |
| 337 | 021 | 061 | . | #XSTT1 | 06B | |
| 338 | 021 | 062 | . | RL(MDU) | A56 | THERE IS AN ACK. |
| 339 | 021 | 063 | . | S1(MDU) | B86 | |
| 340 | 021 | 064 | . | WRTU | E06 | CLEAR ACK A1. |
| 341 | 021 | 065 | . | X(A)(UA) | 81A | PUT ACK IN BUFFER |
| 342 | 021 | 066 | . | @006 | 006 | |
| 343 | 021 | 067 | . | X(G)(UA) | 82A | |
| 344 | 021 | 068 | . | #XWNDP | 0AB | |
| 345 | 021 | 069 | . | JMP | 9D1 | |
| 346 | 021 | 06A | . | #OUTC5 | 0F4 | |
| 347 | 021 | 06B | XSTT1 | READ' | 3B7 | |
| 348 | 021 | 06C | . | @01C | 01C | |
| 349 | 021 | 06D | . | X(MAU)(MDL) | 845 | MAU CTL SEG ADD |

* EM AT QUERY START. GO THERE.

| NO. | PU | PL | LABEL | MNEMONIC | CODE | COMMENTS |
|---|---|---|---|---|---|---|
| 350 | 021 | 06E | . | NOP | 800 | |
| 351 | 021 | 06F | . | NOP | 800 | |
| 352 | 021 | 070 | . | NOP | 800 | |
| 353 | 021 | 071 | . | LOCEM | 200 | |
| 354 | 021 | 072 | XMTST | READC | E00 | |

* STOP XMSSN CHAR?

| NO. | PU | PL | LABEL | MNEMONIC | CODE | COMMENTS |
|---|---|---|---|---|---|---|
| 355 | 021 | 073 | . | X(G)(MDL) | 825 | |
| 356 | 021 | 074 | . | TPAT" | 3D8 | |
| 357 | 021 | 075 | . | @07F | 07F | |

| NO. | PU | PL | LABEL | MNEMONIC | CODE | COMMENTS |
|---|---|---|---|---|---|---|
| 358 | 021 | 076 | . | @07E | 07E | |
| 359 | 021 | 077 | . | #XSTP2 | 098 | |

* CENTRAL DOT?

| NO. | PU | PL | LABEL | MNEMONIC | CODE | COMMENTS |
|---|---|---|---|---|---|---|
| 360 | 021 | 078 | PCOL1 | X(A)(G) | 812 | |
| 361 | 021 | 079 | . | TPAT' | 3DA | |
| 362 | 021 | 07A | . | @0AE | 0AE | |
| 363 | 021 | 07B | . | #+6 | 080 | |

* NULL?

| NO. | PU | PL | LABEL | MNEMONIC | CODE | COMMENTS |
|---|---|---|---|---|---|---|
| 364 | 021 | 07C | . | X(A)(G) | 812 | |
| 365 | 021 | 07D | . | R8(A) | B71 | |
| 366 | 021 | 07E | . | TSY(A) | D31 | |
| 367 | 021 | 07F | . | #NORCH | 085 | |
| 368 | 021 | 080 | . | X(G)(UA) | 82A | |
| 369 | 021 | 081 | . | @07F | 07F | |
| 370 | 021 | 082 | . | NOP | 800 | |
| 371 | 021 | 083 | . | NOP | 800 | |
| 372 | 021 | 084 | . | NOP | 800 | |

* NORMAL CHARACTER.

| NO. | PU | PL | LABEL | MNEMONIC | CODE | COMMENTS |
|---|---|---|---|---|---|---|
| 373 | 021 | 085 | NORCH | X(A)(G) | 812 | A←CHAR |
| 374 | 021 | 086 | . | X(G)(UA) | 82A | |
| 375 | 021 | 087 | . | #XNCH3 | 08B | |
| 376 | 021 | 088 | . | JMP | 9D1 | |
| 377 | 021 | 089 | . | #OUTC1 | 0F2 | OUTPUT CHAR |

* COL 1 CHAR. SMALL NUM OR 2ND FRCTN CHAR?

| NO. | PU | PL | LABEL | MNEMONIC | CODE | COMMENTS |
|---|---|---|---|---|---|---|
| 378 | 021 | 08A | XNCH1 | PORTAD | 3DD | |
| 379 | 021 | 08B | XNCH3 | RL(MAL) | A53 | RTN PT AFTER CHAR PUT IN |
| 380 | 021 | 08C | . | X(G)(UA) | 82A | |
| 381 | 021 | 08D | . | #XNCH2 | 093 | |
| 382 | 021 | 08E | . | SUBRTN | 17F | INCREMENT MAL |
| 383 | 021 | 08F | . | @ 023 | 023 | |
| 384 | 021 | 090 | . | #OUTC2 | 005 | |
| 385 | 021 | 091 | . | JMP | 9D1 | RTN PT IF NO DC3 NEEDED |
| 386 | 021 | 092 | . | #XMTST | 072 | |
| 387 | 021 | 093 | XNCH2 | READ' | 3B7 | RTN PT IF DC3 REQD |
| 388 | 021 | 094 | . | @01C | 01C | |
| 389 | 021 | 095 | . | X(MAU)(MDL) | 845 | GET DOWN TO OP SEG |
| 390 | 021 | 096 | . | JMP | 9D1 | |
| 391 | 021 | 097 | . | #XMTST-1 | 071 | |

* WIND UP XMSSN. CLEAR STOP XMSSN CHAR OR PUT IN
* FINAL DC3. PUT ETX SYN SYN INTO BUFFER.

| NO. | PU | PL | LABEL | MNEMONIC | CODE | COMMENTS |
|---|---|---|---|---|---|---|
| 392 | 021 | 098 | XSTP2 | RL(MDL) | A55 | |
| 393 | 021 | 099 | . | WRTC | 3CB | CLEAR STP XMSSN CHAR |
| 394 | 021 | 09A | . | PORTAD | 3DD | |
| 395 | 021 | 09B | XFDC3 | READ' | 3B7 | FINAL DC3 ALREADY IN. |
| 396 | 021 | 09C | . | @01E | 01E | |
| 397 | 021 | 09D | . | TR8(MDL) | CF5 | |
| 398 | 021 | 09E | . | #XWNDP | 0AB | |
| 399 | 021 | 09F | . | MA←MD | 3E9 | |
| 400 | 021 | 0A0 | . | S3(MAL) | BA3 | |
| 401 | 021 | 0A1 | . | S2(MAL) | B93 | PUT OP SEG EM AT REPLY STRT |
| 402 | 021 | 0A2 | . | READ | E03 | |
| 403 | 021 | 0A3 | . | X(MAU)(MDU) | 846 | |
| 404 | 021 | 0A4 | . | X(A)(MAU) | 814 | |
| 405 | 021 | 0A5 | . | RL(MAL) | A53 | |
| 406 | 021 | 0A6 | . | WRTL | E05 | |

| NO. | PU | PL | LABEL | MNEMONIC | CODE | COMMENTS |
|---|---|---|---|---|---|---|
| 407 | 021 | 0A7 | . | UPDEM | 160 | PUT DISP EM AT SAME |
| 408 | 021 | 0A8 | . | PORTAD | 3DD | |
| 409 | 021 | 0A9 | . | STA' | 33C | |
| 410 | 021 | 0AA | . | @01D | 01D | |
| 411 | 021 | 0AB | XWNDP | X(A)(UA) | 81A | A←ETX |
| 412 | 021 | 0AC | . | @003 | 003 | |
| 413 | 021 | 0AD | . | X(G)(UA) | 82A | |
| 414 | 021 | 0AE | . | #XETXA | 0B1 | |
| 415 | 021 | 0AF | . | JMP | 9D1 | OUTPUT CHAR |
| 416 | 021 | 0B0 | . | #OUTC5 | 0F4 | |
| 417 | 021 | 0B1 | XETXA | X(G)(UA) | 82A | |
| 418 | 021 | 0B2 | . | #XETXO | 0BB | |
| 419 | 021 | 0B3 | . | READC' | 3C7 | XMIT HPC CHAR |
| 420 | 021 | 0B4 | . | @031 | 031 | |
| 421 | 021 | 0B5 | . | X(A)(MDL) | 815 | |
| 422 | 021 | 0B6 | . | JMP | 9D1 | |
| 423 | 021 | 0B7 | . | #OUTC5 | 0F4 | |
| 424 | 021 | 0B8 | . | NOP | 800 | |
| 425 | 021 | 0B9 | . | NOP | 800 | |
| 426 | 021 | 0BA | . | NOP | 800 | |
| 427 | 021 | 0BB | XETXO | X(G)(UA) | 82A | |
| 428 | 021 | 0BC | . | #XETX1 | 0C1 | |
| 429 | 021 | 0BD | . | X(A)(UA) | 81A | A←SYN |
| 430 | 021 | 0BE | . | @016 | 016 | |
| 431 | 021 | 0BF | . | JMP | 9D1 | OUTPUT CHAR |
| 432 | 021 | 0C0 | . | #OUTC5 | 0F4 | |
| 433 | 021 | 0C1 | XETX1 | X(G)(UA) | 82A | |
| 434 | 021 | 0C2 | . | #XETX2 | 0C7 | |
| 435 | 021 | 0C3 | . | X(A)(UA) | 81A | A←SYN |
| 436 | 021 | 0C4 | . | @016 | 016 | |
| 437 | 021 | 0C5 | . | JMP | 9D1 | OUTPUT CHAR |
| 438 | 021 | 0C6 | . | #OUTC5 | 0F4 | |
| 439 | 021 | 0C7 | XETX2 | X(G)(UA) | 82A | |
| 440 | 021 | 0C8 | . | #XETX3 | 0CD | |
| 441 | 021 | 0C9 | . | X(A)(UA) | 81A | |
| 442 | 021 | 0CA | . | @016 | 016 | |
| 443 | 021 | 0CB | . | JMP | 9D1 | |
| 444 | 021 | 0CC | . | #OUTC5 | 0F4 | |
| 445 | 021 | 0CD | XETX3 | S4(MAL) | BB3 | |
| 446 | 021 | 0CE | . | READU | E02 | |
| 447 | 021 | 0CF | . | S8(MDU) | BF6 | SET END OF MESSAGE BIT |
| 448 | 021 | 0D0 | . | WRTU | E06 | |
| 449 | 021 | 0D1 | . | R4(MAL) | B33 | |
| 450 | 021 | 0D2 | . | X(MDL)(UA) | 85A | |
| 451 | 021 | 0D3 | . | #XETX4 | 0D8 | |
| 452 | 021 | 0D4 | . | WRTL | E05 | |
| 453 | 021 | 0D5 | . | JMPO | 386 | |
| 454 | 021 | 0D6 | . | @022 | 022 | |
| 455 | 021 | 0D7 | . | #PORC1 | 013 | |
| 456 | 021 | 0D8 | XETX4 | RL(MDU) | A56 | |
| 457 | 021 | 0D9 | . | X(MDL)(UA) | 85A | |
| 458 | 021 | 0DA | . | @0C0 | 0C0 | |
| 459 | 021 | 0DB | . | WRT' | 3BF | |
| 460 | 021 | 0DC | . | @008 | 008 | |
| 461 | 021 | 0DD | . | LDG' | 356 | |
| 462 | 021 | 0DE | . | @05C | 05C | |
| 463 | 021 | 0DF | . | INCR(G) | A22 | |
| 464 | 021 | 0E0 | . | RL(A) | A51 | |
| 465 | 021 | 0E1 | . | OUTC | 39C | TURN OFF PROPER LINE |
| 466 | 021 | 0E2 | . | X(MDU)(UA) | 86A | |
| 467 | 021 | 0E3 | . | @020 | 020 | |
| 468 | 021 | 0E4 | . | X(MDL)(UA) | 85A | |
| 469 | 021 | 0E5 | . | #XMPL1 | 012 | |
| 470 | 021 | 0E6 | . | WRT' | 3BF | |
| 471 | 021 | 0E7 | . | @000 | 000 | |
| 472 | 021 | 0E8 | . | JMPO | 386 | |
| 473 | 021 | 0E9 | . | @022 | 022 | |

| NO. | PU | PL | LABEL | MNEMONIC | CODE | COMMENTS |
|---|---|---|---|---|---|---|
| 474 | 021 | 0EA | . | #PORC1 | 013 | |
| 475 | 021 | 0EB | . | NOP | 800 | |
| 476 | 021 | 0EC | . | NOP | 800 | |
| 477 | 021 | 0ED | CRTN | LOCEOL | 20F | |
| 478 | 021 | 0EE | . | X(MAL)(MDL) | 835 | |
| 479 | 021 | 0EF | . | SEM2 | 2C5 | PUT EM AT END OF LINE |
| 480 | 021 | 0F0 | . | JMP | 9D1 | |
| 481 | 021 | 0F1 | . | #XNCH1 | 08A | |

* PUT CHARACTER INTO BUFFER

| NO. | PU | PL | LABEL | MNEMONIC | CODE | COMMENTS |
|---|---|---|---|---|---|---|
| 482 | 021 | 0F2 | OUTC1 | SEM2 | 2C5 | STORE EM |
| 483 | 021 | 0F3 | . | PORTAD | 3DD | GO TO PORT AREA |
| 484 | 021 | 0F4 | OUTC5 | RL(MAL) | A53 | |
| 485 | 021 | 0F5 | . | READ | E03 | |
| 486 | 021 | 0F6 | . | X(MDL)(G) | 852 | |
| 487 | 021 | 0F7 | OUTC3 | R7(MDU) | B66 | |
| 488 | 021 | 0F8 | . | TR8(A) | CF1 | |
| 489 | 021 | 0F9 | . | #+3 | 0FB | |
| 490 | 021 | 0FA | . | S7(MDU) | BE6 | SET 7 OF TIJAU FI FF |
| 491 | 021 | 0FB | . | WRT | E07 | |
| 492 | 021 | 0FC | OUTC4 | X(G)(A) | 821 | |
| 493 | 021 | 0FD | . | LDA' | 326 | |
| 494 | 021 | 0FE | . | @031 | 031 | ACCUMULATE HPC |
| 495 | 021 | 0FF | . | XOR(G) | 9A2 | |
| 496 | 022 | 000 | . | STA" | 33D | |
| 497 | 022 | 001 | . | X(A)(G) | 812 | |
| 498 | 022 | 002 | . | BFRSUB | 191 | |
| 499 | 022 | 003 | . | @000 | 000 | |
| 500 | 022 | 004 | . | @00D | 00D | |
| 501 | 022 | 005 | . | PORTAD | 3DD | |
| 502 | 022 | 006 | . | TS8(G) | DF2 | OVERFLOW? |
| 503 | 022 | 007 | . | #+4 | 00A | YES |
| 504 | 022 | 008 | . | JMPI' | 37E | NO.RETURN TO CALLER |
| 505 | 022 | 009 | . | @000 | 000 | |
| 506 | 022 | 00A | . | READ' | 3B7 | UPDATE DISPLAY EM |
| 507 | 022 | 00B | . | @01E | 01E | |
| 508 | 022 | 00C | . | TR8(MDL) | CF5 | |
| 509 | 022 | 00D | . | #+6 | 012 | |
| 510 | 022 | 00E | . | DDMAL | 3FB | DEVICE IS KYBD |
| 511 | 022 | 00F | . | READ | E03 | |
| 512 | 022 | 010 | . | X(MAU)(MDL) | 845 | |
| 513 | 022 | 011 | . | UPDEM | 160 | |
| 514 | 022 | 012 | . | PORTAD | 3DD | |
| 515 | 022 | 013 | PORC1 | READ' | 3B7 | |
| 516 | 022 | 014 | . | @002 | 002 | |
| 517 | 022 | 015 | . | TR8(MDU) | CF6 | |
| 518 | 022 | 016 | . | #+5 | 01A | |
| 519 | 022 | 017 | . | R8(MDU) | B76 | |
| 520 | 022 | 018 | . | WRT | E07 | RESET FLAG. |
| 521 | 022 | 019 | . | P←MD | 380 | JMP VIA FGND PTR. |
| 522 | 022 | 01A | . | JMPO | 386 | |
| 523 | 022 | 01B | . | @000 | 000 | |
| 524 | 022 | 01C | . | @008 | 008 | |

**
*MIS HSKPG. TRANSMIT KEY TRIGGERS.
*
*DETERMINE MAU OF TRANSMIT LINE INDICATED.

| NO. | PU | PL | LABEL | MNEMONIC | CODE | COMMENTS |
|---|---|---|---|---|---|---|
| 525 | 022 | 01D | MXHKP | OPDEM | 160 | |
| 526 | 022 | 01E | . | DIMAL | 3FD | |
| 527 | 022 | 01F | . | READ | E03 | |
| 528 | 022 | 020 | . | S3(MAL) | BA3 | |
| 529 | 022 | 021 | . | TS8(MDU) | DF6 | C/A or D/E BITS SET? |
| 530 | 022 | 022 | . | #2NDP? | 03E | READ PORT ADDRESS |

| NO. | PU | PL | LABEL | MNEMONIC | CODE | COMMENTS |
|---|---|---|---|---|---|---|
| 531 | 022 | 023 | . | TS7(MDU) | DE6 | FROM S MEMORY. |
| 532 | 022 | 024 | . | #2NDP? | 03E | |
| 533 | 022 | 025 | . | RL(MDU) | A56 | ASSUME BR LINE OW. |
| 534 | 022 | 026 | . | WRTU | E06 | WRITE PORT ADDRESS. |

* RESET FLASHING C OR L.

| 535 | 022 | 027 | . | X(A)(UA) | 81A | A+L CODE |
|---|---|---|---|---|---|---|
| 536 | 022 | 028 | . | @060 | 060 | |
| 537 | 022 | 029 | . | READL | E01 | |
| 538 | 022 | 02A | . | TS4(MDL) | DB5 | |
| 539 | 022 | 02B | . | #+6 | 030 | L IS FLASHING |
| 540 | 022 | 02C | . | TR5(MDL) | CC5 | |
| 541 | 022 | 02D | . | #+8 | 034 | |
| 542 | 022 | 02E | . | X(A)(UA) | 81A | C IS FLASHING |
| 543 | 022 | 02F | . | @018 | 018 | |
| 544 | 022 | 030 | . | SUBRTN | 17F | STOP IT FROM FLASHING |
| 545 | 022 | 031 | . | @00A | 00A | |
| 546 | 022 | 032 | . | #RBCL2 | 000 | |
| 547 | 022 | 033 | . | S3(MAL) | BA3 | |
| 548 | 022 | 034 | . | R2(MAL) | B13 | |
| 549 | 022 | 035 | . | RL(MDL) | A55 | |
| 550 | 022 | 036 | . | JMP | 9D1 | |
| 551 | 022 | 037 | . | #RLA+1 | 04B | |
| 552 | 022 | 038 | JNPL2 | X(A)(UA) | 81A | |
| 553 | 022 | 039 | . | @020 | 020 | |
| 554 | 022 | 03A | . | SNS2 | 146 | LINE DOWN FLASH"D" |
| 555 | 022 | 03B | . | JMPO | 386 | |
| 556 | 022 | 03C | . | @000 | 000 | |
| 557 | 022 | 03D | . | @008 | 008 | |
| 558 | 022 | 03E | 2NDP? | AG←MA | 3F3 | |
| 559 | 022 | 03F | . | READS" | 3B9 | READ PORT ADDRESS |
| 560 | 022 | 040 | . | @002 | 002 | FROM S MEMORY. |
| 561 | 022 | 041 | . | @081 | 081 | |
| 562 | 022 | 042 | . | MA←AG | 3F1 | |
| 563 | 022 | 043 | . | WRTCU | 34D | STORE IT IN KYBD CTL AREA |
| 564 | 022 | 044 | . | RL(MDL) | A55 | GENERATE FI CHAR. |
| 565 | 022 | 045 | . | S6(MDL) | BD5 | |
| 566 | 022 | 046 | . | TRL(MDU) | C36 | |
| 567 | 022 | 047 | . | #RLA | 04A | BR LINE |
| 568 | 022 | 048 | . | S8(MDL) | BF5 | |
| 569 | 022 | 049 | . | R6(MDL) | B55 | |

*STORE FI CHARACTER.

| 570 | 022 | 04A | RLA | DDMAL | 3FB | |
|---|---|---|---|---|---|---|
| 571 | 022 | 04B | . | WRTL | E05 | |

*CHECK TO SEE IF RECEIVE LINE ACTIVE.

| 572 | 022 | 04C | . | DIMAL | 3FD | |
|---|---|---|---|---|---|---|
| 573 | 022 | 04D | . | READ | E03 | |
| 574 | 022 | 04E | . | AG←MA | 3F3 | |
| 575 | 022 | 04F | . | X(MAU)(MDU) | 846 | |
| 576 | 022 | 050 | . | READC' | 3C7 | |
| 577 | 022 | 051 | . | @01A | 01A | |
| 578 | 022 | 052 | . | MA←AG | 3F1 | |
| 579 | 022 | 053 | . | TR1(MDL) | C85 | |
| 580 | 022 | 054 | . | #JNPL2 | 038 | LINE DOWN. |

*DETERMINE AND STORE REPLY STARTING ADDR.
*
*GET DOWN TO OP SEG.

| 581 | 022 | 055 | . | R3(MAL) | B23 | |
|---|---|---|---|---|---|---|
| 582 | 022 | 056 | . | LOPSG1 | 14F | |

* LOCATE LDC POSITION.

```
NO.  PU   PL   LABEL  MNEMONIC       CODE      COMMENTS 583  022  057    .     DECR(MAU)     AF4
584  022  058    .     RL(MAL)       A53
585  022  059    .     S2(MAL)       B93
586  022  05A    .     INCR(MAU)     A24
587  022  05B    .     READ          E03
588  022  05C    .     TS7(MDL)      DE5
589  022  05D    .     #-2           05A

* CONTROL AREA COMING UP?

590  022  05E    .     X(A)(UA)      81A       A←1ST CHAR POS WITH BIT 8=1
591  022  05F    .     @088          088
592  022  060  DTSRH   RL(MAL)       A53
593  022  061    .     CMPR(MAL)     9D3
594  022  062    .     #CTLA         090

* DATA IN EITHER BYTE?

595  022  063    .     DDMAL         3FB
596  022  064    .     READ          E03
597  022  065    .     TSY(MDL)      D35
598  022  066    .     #+4           069
599  022  067    .     TRL(MDU)      C36
600  022  068    .     #-6           061

* IS EOL AT SEG LDC?

601  022  069  NODAT   R8(MAL)       B73
602  022  06A    .     LOCEOL        20F
603  022  06B    .     CRLF          257
604  022  06C    .     TS171(MDL)    D25
605  022  06D    .     #+4           070
606  022  06E  SSTXC   ENTRM"        3A5
607  022  06F    .     @079          079

* PUT SEGMENT EM AT REPLY STARTING ADDRESS.

608  022  070    .     X(G)(MAU)     824
609  022  071    .     SEM2          2C5
610  022  072    .     CTLA          15C

* STORE REPLY STARTING ADDRESS.

611  022  073    .     DDMAL         3FB
612  022  074    .     S5(MAL)       BC3
613  022  075    .     X(MDU)(G)     862
614  022  076    .     WRT           E07

* PUT QUERY STARTING ADD. IN DESP & OP SEG EMS.

615  022  077    .     DDMAL         3FB
616  022  078    .     READ          E03
617  022  079    .     X(MAU)(MDU)   846
618  022  07A    .     RL(MAL)       A53
619  022  07B    .     WRTL          E05
620  022  07C    .     UPDEM         160

* LOCK OUT KYBD. FLASH "T".RECAPS COME IN HERE.

621  022  07D  FHSKP   R4(MAL)       B33
622  022  07E    .     S5(MAL)       BC3
623  022  07F    .     READ          E03
624  022  080    .     R8(MDL)       B75
625  022  081    .     WRT           E07
626  022  082    .     DDMAL         3FB
627  022  083    .     X(A)(UA)      81A
628  022  084    .     @0A0          0A0
```

| NO. | PU | PL | LABEL | MNEMONIC | CODE | COMMENTS |
|-----|-----|-----|-------|----------|------|----------|
| 629 | 022 | 085 | . | SNS2 | 146 | |
| 630 | 022 | 086 | . | S3(MAL) | BA3 | MAL←UPPER ADD(PORT ADD) |
| 631 | 022 | 087 | . | S2(MAL) | B93 | |
| 632 | 022 | 088 | . | X(A)(UA) | 81A | A←A(BEGINNING OF QUEUE) |
| 633 | 022 | 089 | . | @020 | 020 | |
| 634 | 022 | 08A | . | SUBRTN | 17F | |
| 635 | 022 | 08B | . | @00C | 00C | |
| 636 | 022 | 08C | . | #MBIQ | 0EB | |
| 637 | 022 | 08D | . | JMP0 | 386 | |
| 638 | 022 | 08E | . | @000 | 000 | |
| 639 | 022 | 08F | . | @008 | 008 | |

* CONTROL AREA TEST.

| 640 | 022 | 090 | CTLA | READ' | 3B7 | |
|-----|-----|-----|------|-------|-----|---|
| 641 | 022 | 091 | . | @002 | 002 | |
| 642 | 022 | 092 | . | DECR(MAU) | AF4 | |
| 643 | 022 | 093 | . | TS8(MDL) | DF5 | |
| 644 | 022 | 094 | . | #DTSRH | 060 | YES. SKIP CTL AREA; CNTNUE SRC |
| 645 | 022 | 095 | . | INCR(MAU) | A24 | NO. TREAT AS IF 1ST LINE |
| 646 | 022 | 096 | . | JMP | 9D1 | CONTAINS DATA. |
| 647 | 022 | 097 | . | #NODAT | 069 | |
| 648 | 022 | 098 | . | NOP | 800 | |
| 649 | 022 | 099 | . | NOP | 800 | |
| 650 | 022 | 09A | . | NOP | 800 | |
| 651 | 022 | 09B | . | NOP | 800 | |
| 652 | 022 | 09C | . | NOP | 800 | |
| 653 | 022 | 09D | . | NOP | 800 | |
| 654 | 022 | 09E | . | NOP | 800 | |
| 655 | 022 | 09F | . | NOP | 800 | |
| 656 | 022 | 0A0 | . | NOP | 800 | |

**
* FOLLOWING IS THE SEEKER.IT SEARCHES THE QUEUE
* FOR A BID BIT. IF IT FINDS A BIT SET;IT RESETS
* IT & RESETS BIT 8 OF MAL. A&G WILL CONTAIN
* THE STATUS WORD ADDRESS AND MAL
* 1 WILL BE SET IF DEVICE IS A KEYBOARD.

| 657 | 022 | 0A1 | SEEK | READ | E03 | |
|-----|-----|-----|------|------|-----|---|
| 658 | 022 | 0A2 | . | X(G)(MDU) | 826 | G&MAL←UPPER PTR |
| 659 | 022 | 0A3 | . | X(MAL)(MDU) | 836 | |
| 660 | 022 | 0A4 | . | S8(G) | BF2 | G←1ST WD DNE TWCE INDIC. |
| 661 | 022 | 0A5 | . | X(MDU)(MDL) | 865 | MDU←LOWER POINTER |
| 662 | 022 | 0A6 | . | TRL(MDU) | C36 | ERROR IF SCANNING BIT |
| 663 | 022 | 0A7 | . | #XERR2 | 0E6 | BIT NOT SET. JUST SET 8. |
| 664 | 022 | 0A8 | SEEK1 | READC | E00 | MDL←CURR QUEUE WORD |
| 665 | 022 | 0A9 | . | X(A)(MDU) | 816 | A←LOWER POINTER |
| 666 | 022 | 0AA | . | TS1(A) | D81 | |
| 667 | 022 | 0AB | . | #SEEK2 | 0E0 | DONE WITH THIS WD |
| 668 | 022 | 0AC | SEEK3 | TRL(MDL) | C35 | ANY BITS SET IN THIS WD? |
| 669 | 022 | 0AD | . | #SEEK2 | 0E0 | YES.DONE WITH THIS WORD |
| 670 | 022 | 0AE | SEEK4 | ROTR(A) | A41 | MOVE PTR OVER ONE. |
| 671 | 022 | 0AF | . | X(MDU)(A) | 861 | SAVE LOWER POINTER |
| 672 | 022 | 0B0 | . | AND(MDL) | 9F5 | |
| 673 | 022 | 0B1 | . | TRL(A) | C31 | |
| 674 | 022 | 0B2 | . | #SEEK1+1 | 0A9 | BIT POINTED TO NOT SET |
| 675 | 022 | 0B3 | . | X(G)(A) | 821 | G←NEW LOWER POINTER |
| 676 | 022 | 0B4 | . | XOR(MDL) | 9A5 | RESET BID BIT |
| 677 | 022 | 0B5 | . | X(MDL)(A) | 851 | |
| 678 | 022 | 0B6 | . | WRTC | 3CB | |
| 679 | 022 | 0B7 | . | X(MDL)(G) | 852 | MDL←NEWLOWER POINTER |
| 680 | 022 | 0B8 | . | R8(MAL) | B73 | |
| 681 | 022 | 0B9 | . | X(MDU)(MAL) | 863 | MDU←NEW UPPER POINTER |
| 682 | 022 | 0BA | . | S4(MAL) | BB3 | |
| 683 | 022 | 0BB | . | R3(MAL) | B23 | |
| 684 | 022 | 0BC | . | R2(MAL) | B13 | |

| NO. | PU | PL | LABEL | MNEMONIC | CODE | COMMENTS |
|---|---|---|---|---|---|---|
| 685 | 022 | 0BD | . | R1(MAL) | B03 | |
| 686 | 022 | 0BE | . | WRT | E07 | STORE NEW POINTER |
| 687 | 022 | 0BF | . | SL(A) | AC1 | INDICATE BIT FOUND |
| 688 | 022 | 0C0 | . | SHFTL(MDU) | AB6 | MOVE UPPR 3 BITS OF |
| 689 | 022 | 0C1 | . | RPT2 | 3F9 | I/O # INTO POSITION |
| 690 | 022 | 0C2 | . | INCR(A) | A21 | |
| 691 | 022 | 0C3 | . | ROTR(MDL) | A45 | |
| 692 | 022 | 0C4 | . | TR8(MDL) | CF5 | |
| 693 | 022 | 0C5 | . | #-2 | 0C2 | |
| 694 | 022 | 0C6 | . | ADD(MDU) | 956 | A←COMPLETE I/O # |
| 695 | 022 | 0C7 | . | SHFTL(A) | AB1 | |
| 696 | 022 | 0C8 | . | S8(A) | BF1 | A HAS IOCA |
| 697 | 022 | 0C9 | . | X(MAU)(UA) | 84A | MAU←IOC SEG |
| 698 | 022 | 0CA | . | @002 | 002 | |
| 699 | 022 | 0CB | . | X(MAL)(A) | 831 | |
| 700 | 022 | 0CC | . | S1(MAL) | B83 | |
| 701 | 022 | 0CD | . | READS | 3BB | MD'S←2ND IOC WD |
| 702 | 022 | 0CE | . | S8(PU) | BF8 | |
| 703 | 022 | 0CF | . | X(A)(UA) | 81A | |
| 704 | 022 | 0D0 | . | @00C | 00C | |
| 705 | 022 | 0D1 | . | CMPR(MDU) | 9D6 | |
| 706 | 022 | 0D2 | . | #+6 | 0D7 | A KEYBOARD |
| 707 | 022 | 0D3 | . | INCR(A) | A21 | |
| 708 | 022 | 0D4 | . | CMPR(MDU) | 9D6 | |
| 709 | 022 | 0D5 | . | #+3 | 0D7 | A KEYBOARD |
| 710 | 022 | 0D6 | . | R8(PU) | B78 | |
| 711 | 022 | 0D7 | . | DECR(MAL) | AF3 | |
| 712 | 022 | 0D8 | . | READS | 3BB | |
| 713 | 022 | 0D9 | . | AG←MD | 3EB | AG←STWA |
| 714 | 022 | 0DA | . | PORTAD | 3DD | |
| 715 | 022 | 0DB | . | RL(MAL) | A53 | |
| 716 | 022 | 0DC | . | TR8(PU) | CF8 | |
| 717 | 022 | 0DD | . | #+3 | 0DF | NOT A KEYBOARD |
| 718 | 022 | 0DE | . | S1(MAL) | B83 | |
| 719 | 022 | 0DF | . | RETURN | 18B | |
| 720 | 022 | 0E0 | SEEK2 | X(A)(G) | 812 | A←MA; UPPER PTR |
| 721 | 022 | 0E1 | . | CMPR(MAL) | 9D3 | |
| 722 | 022 | 0E2 | . | #-2 | 0DF | DONE THIS WD TWICE |
| 723 | 022 | 0E3 | . | S8(MAL) | BF3 | MAL←DONE TWICE INDICATION |
| 724 | 022 | 0E4 | . | INCR(MAL) | A23 | NEXT UPPER PTR ADDRESS |
| 725 | 022 | 0E5 | . | R4(MAL) | B33 | PREVENT UPPER PTR OFLO |
| 726 | 022 | 0E6 | XERR2 | RL(A) | A51 | |
| 727 | 022 | 0E7 | . | S1(A) | B81 | |
| 728 | 022 | 0E8 | . | READC | E00 | |
| 729 | 022 | 0E9 | . | JMP | 9D1 | |
| 730 | 022 | 0EA | . | #SEEK3 | 0AC | |

\*\*
*MARK PROPER BIT IN PROPER QUEUE.
* A & G ← START OF QUEUE ADDR.

| NO. | PU | PL | LABEL | MNEMONIC | CODE | COMMENTS |
|---|---|---|---|---|---|---|
| 731 | 022 | 0EB | MBIQ | READ | E03 | |
| 732 | 022 | 0EC | . | X(G)(MDU) | 826 | G←PORT ADDR |
| 733 | 022 | 0ED | . | READS" | 3B9 | |
| 734 | 022 | 0EE | . | @002 | 002 | |
| 735 | 022 | 0EF | . | @060 | 060 | |
| 736 | 022 | 0F0 | . | R8(MDL) | B75 | |
| 737 | 022 | 0F1 | . | X(MDU)(MDL) | 865 | |
| 738 | 022 | 0F2 | . | SHFTR(MDL) | A75 | |
| 739 | 022 | 0F3 | . | RPT3 | 3F8 | |
| 740 | 022 | 0F4 | . | ADD(MDL) | 955 | A←QUEUE PTR UPPER |
| 741 | 022 | 0F5 | . | X(MAL)(A) | 831 | |
| 742 | 022 | 0F6 | . | R5(MDU) | B46 | |
| 743 | 022 | 0F7 | . | SHFTL(MDU) | AB6 | |
| 744 | 022 | 0F8 | . | RPT2 | 3F9 | |
| 745 | 022 | 0F9 | . | X(A)(UA) | 81A | A←LOWER 8 BITS OF |
| 746 | 022 | 0FA | . | @085 | 085 | SX(MDL) |

| NO. | P_U | PL | LABEL | MNEMONIC | CODE | COMMENTS |
|---|---|---|---|---|---|---|
| 747 | 022 | 0FB | . | ADD(MDU) | 956 | A←CORRECT BIT TO SET |
| 748 | 022 | 0FC | . | X(MDU)(UA) | 86A | MDU←UPPER 4 BITS |
| 749 | 022 | 0FD | . | @00B | 00B | OF SX(MDL) |
| 750 | 022 | 0FE | . | X(MDU)(G) | 842 | GO TO PORT |
| 751 | 022 | 0FF | . | READC | E00 | READ QUEUE CHAR |
| 752 | 023 | 000 | . | X(UA)(A) | 8A1 | EXECUTE MFCTD INSTR |
| 753 | 023 | 001 | . | NOP | 800 | |
| 754 | 023 | 002 | . | NOP | 800 | |
| 755 | 023 | 003 | . | WRTC | 3CB | WRITE NEW QUEUE WD |
| 756 | 023 | 004 | . | RETURN | 18B | |

```
**
* THIS IS THE XMIT INCREMENT SUBROUTINE.IT INCRE-
* MENTS TO THE NEXT CHAR;CHECKING TO SEE IF A DC3
* IS REQUIRED AND SENDING IT OUT IF NECESSARY.
```

| NO. | P_U | PL | LABEL | MNEMONIC | CODE | COMMENTS |
|---|---|---|---|---|---|---|
| 757 | 023 | 005 | OUTC2 | X(MDL)(G) | 852 | |
| 758 | 023 | 006 | . | WRTL | E05 | STORE NEW TIJAL |
| 759 | 023 | 007 | . | READ' | 3B7 | |
| 760 | 023 | 008 | . | @01C | 01C | |
| 761 | 023 | 009 | . | X(MAU)(MDL) | 845 | GO TO CURRENT MAU |
| 762 | 023 | 00A | . | LOCEM | 200 | |
| 763 | 023 | 00B | INCR | LOCEOL | 20F | |
| 764 | 023 | 00C | . | CMPR(MAL) | 9D3 | |
| 765 | 023 | 00D | . | #+5 | 011 | MAL AT LINE END |
| 766 | 023 | 00E | . | INCR(MAL) | A23 | INCR MAL |
| 767 | 023 | 00F | . | SEM2 | 2C5 | STORE EM |
| 768 | 023 | 010 | . | RETURN | 18B | DONE |
| 769 | 023 | 011 | . | X(A)(UA) | 81A | NO.A←DC3 |
| 770 | 023 | 012 | . | @013 | 013 | |
| 771 | 023 | 013 | . | TS171(MAL) | D23 | AT END OF SEG? |
| 772 | 023 | 014 | . | #XEOS | 019 | YES. |
| 773 | 023 | 015 | . | SEM2 | 2C5 | STORE EM |
| 774 | 023 | 016 | . | PORTAD | 3DD | OUTPUT DC3.RETURN WILL |
| 775 | 023 | 017 | . | JMP | 9D1 | BE TO ADDR IN TIJAL. |
| 776 | 023 | 018 | . | @026 | 026 | |
| 777 | 023 | 019 | XEOS | READ' | 3B7 | |
| 778 | 023 | 01A | . | @002 | 002 | |
| 779 | 023 | 01B | . | X(MAL)(UA) | 83A | PUT EM AT HOME POS OF SEG |
| 780 | 023 | 01C | . | @008 | 008 | |
| 781 | 023 | 01D | . | TR7(MDL) | CE5 | |
| 782 | 023 | 01E | . | #XSTP4 | 029 | NEXT SEG NOT VALID |
| 783 | 023 | 01F | . | INCR(MAU) | A24 | NEXT SEG VALID |
| 784 | 023 | 020 | . | SEM2 | 2C5 | STORE EM |
| 785 | 023 | 021 | . | PORTAD | 3DD | |
| 786 | 023 | 022 | . | READ' | 3B7 | |
| 787 | 023 | 023 | . | @01C | 01C | |
| 788 | 023 | 024 | . | INCR(MDL) | A25 | INCR CURRENT MAU POINTER |
| 789 | 023 | 025 | . | WRTL | E05 | |
| 790 | 023 | 026 | . | JMPO | 386 | |
| 791 | 023 | 027 | . | @021 | 021 | |
| 792 | 023 | 028 | . | #OUTC4 | 0FC | |
| 793 | 023 | 029 | XSTP4 | X(G)(UA) | 82A | AT END OF SEG'S |
| 794 | 023 | 02A | . | #XFDC3 | 09B | TIJAL←FINAL DC3 |
| 795 | 023 | 02B | . | JMPO | 386 | OUTPUT DC3 |
| 796 | 023 | 02C | . | @021 | 021 | |
| 797 | 023 | 02D | . | #OUTC1 | 0F2 | |

| NO. | UA | LABEL | MNEMONIC | CODE | COMMENTS |
|---|---|---|---|---|---|

```
* FOLLOWING IS THE CONTROL PANEL PROGRAM OF THE PCU
* THE FIRST TWO LOCATIONS OF THE U MEMORY ARE STORED NOP'S
```

| | | | | | |
|---|---|---|---|---|---|
| 0 | 000 | . | @800 | 800 | |
| 1 | 001 | . | @800 | 800 | |

*REGISTERS LOAD AND RETURNS

| NO. | UA | LABEL | MNEMONIC | CODE | COMMENTS |
|---|---|---|---|---|---|

* STORE A INDIRECTLY (STAI  STAI')

| NO. | UA | LABEL | MNEMONIC | CODE | COMMENTS |
|---|---|---|---|---|---|
| 833 | 340 | STAI | X(MAU)(S) | 049 | |
| 834 | 341 | . | X(MAL)(S) | 039 | |
| 835 | 342 | . | READ | 603 | |
| 835 | 343 | . | X(MAU)(MDU) | 046 | |
| 836 | 344 | . | X(MAL)(MDL) | 035 | |
| 837 | 345 | . | X(MDL)(A) | 051 | |
| 838 | 346 | . | X(MDU)(MDL) | 065 | |
| 839 | 347 | . | CWRT | E08 | * |

* STORE A INDIRECTLY WITHIN SECTOR (STAIC  STAIC')

| 840 | 348 | STAIC | X(MAU)(S) | 049 | |
|---|---|---|---|---|---|
| 841 | 349 | . | X(MAL)(S) | 039 | |
| 842 | 34A | . | READC | 600 | |
| 843 | 34B | . | X(MAL)(MDL) | 035 | |
| 844 | 34C | . | X(MDU)(A) | 061 | |
| 845 | 34D | . | X(MDL)(MDU) | 056 | |
| 846 | 34E | . | CWRT | E08 | * |

* STORE A IN S MEMORY (STAS  STAS')

| 847 | 34F | STAS | X(MAU)(S) | 049 | LOAD ADDRESSES |
|---|---|---|---|---|---|
| 848 | 350 | . | X(MAL)(S) | 039 | |
| 849 | 351 | . | X(MDL)(A) | 051 | DATA INTO MDL |
| 850 | 352 | . | SWRT | 611 | |
| 851 | 353 | . | NOP | 000 | |
| 852 | 354 | . | NOP | 800 | * |

**

* REGISTER G PROGRAMS
* LOAD G FROM M MEMORY (LDG  LDG'  LDG")

| 853 | 355 | LDG | X(MAU)(S) | 049 | LOAD ADDRESSES |
|---|---|---|---|---|---|
| 854 | 356 | . | X(MAL)(S) | 039 | |
| 855 | 357 | . | READC | 600 | READ DATA |
| 856 | 358 | . | X(G)(MDL) | 825 | * DATA INTO G |

* LOAD G FROM S MEMORY (LDGS  LDGS')

| 857 | 359 | LDGS | X(MAU)(S) | 049 | LOAD ADDRESSES |
|---|---|---|---|---|---|
| 858 | 35A | . | X(MAL)(S) | 039 | |
| 859 | 35B | . | SREAD | 610 | READ DATA |
| 860 | 35C | . | X(G)(MDL) | 025 | DATA INTO G |
| 861 | 35D | . | NOP | 800 | * |

* STORE G IN M (STG  STG'  STG")

| 862 | 35E | STG | X(MAU)(S) | 049 | LOAD ADDRESSES |
|---|---|---|---|---|---|
| 863 | 35F | . | X(MAL)(S) | 039 | |
| 864 | 360 | . | X(MDL)(G) | 052 | DATA INTO MDL |
| 865 | 361 | . | X(MDU)(MDL) | 065 | |
| 866 | 362 | . | CWRT | E08 | * |

* STORE G IN S MEMORY (STGS  STGS')

| 867 | 363 | STGS | X(MAU)(S) | 049 | LOAD ADDRESSES |
|---|---|---|---|---|---|
| 868 | 364 | . | X(MAL)(S) | 039 | |
| 869 | 365 | . | X(MDL)(G) | 052 | DATA INTO MDL |

NO.  UA  LABEL  MNEMONIC      CODE   COMMENTS

* END OF SEGMENT -- JUMP TO SEG TEST PROGRAM

```
798  31E   •    JMP             1D1
799  31F   •    #SGMNT          2CA
```

**

```
800  320  PCLR7  TS&(G)         5F2
801  321   •    #SGMN3          2E4
802  322   •    RL(MDL)         255
803  323   •    JMP             1D1
804  324   •    #SGMN3 + 3      2E7
```

**

* GENERAL PURPOSE INSTRUCTIONS
*
* REGISTER A PROGRAMS
* LOAD A FROM MAIN MEMORY (LDA  LDA'  LDA")

```
805  325  LDA   X(MAU)(S)       049   LOAD ADDRESSES
806  326   •    X(MAL)(S)       039
807  327   •    READC           600
808  328   •    X(A)(MDL)       815   * CHARACTER INTO A
```

* LOAD A INDIRECTLY WITHIN SEGMENT (LDAIC  LDAIC')

```
809  329  LDAIC X(MAU)(S)       049
810  32A   •    X(MAL)(S)       039
811  32B   •    READC           600
812  32C   •    X(MAL)(MDL)     035
813  32D   •    READC           600
814  32E   •    X(A)(MDL)       815   *
```

* LOAD A INDIRECTLY (LDAI  LDAI')

```
815  32F  LDAI  X(MAU)(S)       049
816  330   •    X(MAL)(S)       039
817  331   •    READ            603
818  332   •    X(MAU)(MDU)     046
819  333   •    X(MAL)(MDL)     035
820  334   •    READC           600
821  335   •    X(A)(MDL)       815   *
```

* LOAD A FROM S MEMORY (LDAS  LDAS')

```
822  336  LDAS  X(MAU)(S)       049   LOAD ADDRESSES
823  337   •    X(MAL)(S)       039
824  338   •    SREAD           610
825  339   •    X(A)(MDL)       015   CHAR INTO A
826  33A   •    NOP             800   *
```

* STORE A IN M MEMORY (STA  STA'  STA")

```
827  33B  STA   X(MAU)(S)       049   LOAD ADDRESSES
828  33C   •    X(MAL)(S)       039
829  33D   •    X(MDL)(A)       051   DATA INTO MD'S
830  33E  WRTC  X(MDU)(MDL)     065
831  33F   •    CWRT            E08   * STORE DATA
```

| NO. | UA | LABEL | MNEMONIC | CODE | COMMENTS |
|---|---|---|---|---|---|
| 751 | 2EF | | #PCLR5 | 316 | |
| 752 | 2F0 | | X(MDL)(MDU) | 056 | |
| 753 | 2F1 | PCLR1 | X(MDU)(MDL) | 065 | TAB CHAR INTO MDU |
| 754 | 2F2 | | RL(MDL) | 255 | STORE TAB IN U BYTE |
| 755 | 2F3 | | JMP | 1D1 | JUMP INTO MAIN LOOP |
| 756 | 2F4 | | #PCLR6 + 2 | 315 | |

* MAIN LOOP -- STORE TAB CHAR IN PREV WORD

| NO. | UA | LABEL | MNEMONIC | CODE | COMMENTS |
|---|---|---|---|---|---|
| 757 | 2F5 | PCLR2 | DECR(MAL) | 2F3 | DECR WORD ADD. |
| 758 | 2F6 | | DECR(MAL) | 2F3 | |
| 759 | 2F7 | | WRTL | 605 | STORE TAB CHAR |
| 760 | 2F8 | | INCR(MAL) | 223 | REPROCESS THIS ENTRY |
| 761 | 2F9 | PCLR3 | RL(G) | 252 | RESET TAB CONDITION |
| 762 | 2FA | | CMPR(MAL) | 1D3 | JUMP IF MAL = E.O.F. |
| 763 | 2FB | | #PCLR7 + 2 | 322 | |
| 764 | 2FC | | INCR(MAL) | 223 | TO SET BIT 1 OF MAL |
| 765 | 2FD | | READ | 603 | READ WORD FOR TESTS |

* TEST 3 CHARS FOR APPROPRIATE PROCESSING

| NO. | UA | LABEL | MNEMONIC | CODE | COMMENTS |
|---|---|---|---|---|---|
| 766 | 2FE | | TVF | 5AF | JUMP IF ALL 8-TH BITS RESET |
| 767 | 2FF | | #PCLR6 | 313 | TO CLEAR ENTRY |
| 768 | 300 | | TFF | 5CF | JUMP IF IN FIXED FIELD |
| 769 | 301 | | #PCLR5 | 316 | ENTRY UNCHANGED |
| 770 | 302 | | TTP | 4BF | JUMP IF NOT A T.P. |
| 771 | 303 | | #PCLR6 + 1 | 314 | TO JUST CLEAR U BYTE |

* TAB POINT DETECTED -- STORE TAB CHAR.

| NO. | UA | LABEL | MNEMONIC | CODE | COMMENTS |
|---|---|---|---|---|---|
| 772 | 304 | | SL(MDL) | 2C5 | TAB POINT CHAR INTO MDL |
| 773 | 305 | | R4(MDL) | 335 | |
| 774 | 306 | | INCR(MDL) | 225 | |
| 775 | 307 | | TS8(MDU) | 5F6 | JUMP IF TAB IN U BYTE |
| 776 | 308 | | #PCLR1 | 2F1 | |
| 777 | 309 | | TBY(G) | 442 | JUMP UNLESS CROSS OVER |
| 778 | 30A | | #PCLR2 | 2F5 | |

* STORE TAB CHARACTER IN LAST DISP POS OF PREV SEG

| NO. | UA | LABEL | MNEMONIC | CODE | COMMENTS |
|---|---|---|---|---|---|
| 779 | 30B | | DECR(MAU) | 2F4 | PREV SEG |
| 780 | 30C | | SL(MAL) | 2C3 | LAST DISP POS |
| 781 | 30D | | WRTL | 605 | STORE TAB CHAR |
| 782 | 30E | | INCR(MAU) | 224 | RETURN |
| 783 | 30F | | STRAP(15) | 62F | SET 1-ST DIAP POS |
| 784 | 310 | | X(MAL)(MDL) | 035 | |
| 785 | 311 | | JMP | 1D1 | JUMP TO REPROCESS THIS ENTRY |
| 786 | 312 | | #PCLR3 | 2F9 | |

* LOOP TO CHANGE ENTRY

| NO. | UA | LABEL | MNEMONIC | CODE | COMMENTS |
|---|---|---|---|---|---|
| 787 | 313 | PCLR6 | RL(MDL) | 255 | CLEAR LOWER BYTE |
| 788 | 314 | | RL(MDU) | 256 | CLEAR UPPER BYTE |
| 789 | 315 | | WRT | 607 | STORE CHANGED DATA |
| 790 | 316 | PCLR5 | TRY(MDL) | 445 | |
| 791 | 317 | | #+3 | 319 | |
| 792 | 318 | | R5(MDL) | 345 | |
| 793 | 319 | | X(G)(MDL) | 025 | SAVE LOWER BYTE FOR TESTS |
| 794 | 31A | | CMPR(MAL) | 1D3 | JUMP IF MAL = E.O.F. |
| 795 | 31B | | #PCLR7 | 320 | |
| 796 | 31C | | TB17I(MAL) | 423 | JUMP UNLESS END |
| 797 | 31D | | #PCLR3 + 1 | 2FA | |

NO. UA LABEL MNEMONIC CODE COMMENTS

* END OF SEGMENT PROGRAM -- USE A TO RETURN TO PROGRAM
* SET G IF 8-TH BIT = 1

| 714 | 2CA | SGMNT | TR8(G) | 4F2 | |
| 715 | 2CB | . | #+3 | 2CD | |
| 716 | 2CC | . | SL(G) | 2C2 | TAB POINT IN LAST CHAR. |
| 717 | 2CD | SGMN1 | RL(MAL) | 253 | TEST IF NEXT SEG VALID |
| 718 | 2CE | . | S2(MAL) | 393 | |
| 719 | 2CF | . | READL | 601 | |
| 720 | 2D0 | . | TR7(MDL) | 4E5 | JUMP IF NEXT SEG INVALID |
| 721 | 2D1 | . | #SGMN2 | 2DF | |

* NEXT VALID -- CROSS BOUNDRY & CONTINUE

| 722 | 2D2 | . | STRAP(15) | 62F | READ 1-ST DISP POS |
| 723 | 2D3 | . | X(MAL)(MDL) | 035 | |
| 724 | 2D4 | . | INCP(MAU) | 224 | NEXT SEGMENT |

* RETURN TO ORIGINAL PROGRAM

| 725 | 2D5 | . | TS1(A) | 581 | STEP RIGHT |
| 726 | 2D6 | . | #SEM | 25C | |
| 727 | 2D7 | . | TS2(A) | 591 | TOTAL CLEAR |
| 728 | 2D8 | . | #TCLR | 23D | |
| 729 | 2D9 | . | TS3(A) | 5A1 | PARTIAL CLEAR |
| 730 | 2DA | . | #PCLR3 + 3 | 2FC | |
| 731 | 2DB | . | TS4(A) | 5B1 | ADVANCE EM |
| 732 | 2DC | . | 0000 | 000 | |
| 733 | 2DD | . | JMP | 1D1 | TAB |
| 734 | 2DE | . | #TAB2 + 6 | 2E8 | |

* NEXT SEGMENT INVALID PROGRAM

| 735 | 2DF | SGMN2 | TR3(A) | 4A1 | JUMP TO END UNLS PCLR |
| 736 | 2E0 | . | #TAB3 | 2C2 | |
| 737 | 2E1 | . | TR8(G) | 4F2 | OR NO TAB POINT |
| 738 | 2E2 | . | #TAB3 | 2C2 | |

* TAB POINT IN LAST DISP POS -- STORE T.P. CHAR

| 739 | 2E3 | . | SL(MAL) | 2C3 | LAST DISP POS |
| 740 | 2E4 | SGMN3 | SL(MDL) | 2C5 | LOAD T.P. CHAR |
| 741 | 2E5 | . | R4(MDL) | 335 | |
| 742 | 2E6 | . | INCP(MDL) | 225 | |
| 743 | 2E7 | . | X(MDU)(MDL) | 065 | |
| 744 | 2E8 | . | CWRT | E08 | * STORE FINAL T.P. CHAR |

**

* PARTIAL CLEAR MACRO
* INITIAL PROGRAM -- JUMP INTO LOOP

| 745 | 2E9 | PCLR | RL(A) | 251 | SET RETURN COND IN A |
| 746 | 2EA | . | S3(A) | 3A1 | |

* LINE ERASE PROGRAM -- E.O.F. ADD IN A

| 747 | 2EB | . | READ | 603 | |
| 748 | 2EC | . | TR1(MAL) | 483 | PROCESS WORD |
| 749 | 2ED | . | #PCLR3 | 2F9 | |
| 750 | 2EE | . | TS8(MDL) | 5F5 | PROCESS ONLY CHARACTER |

| NO. | UA | LABEL | MNEMONIC | CODE | COMMENTS |
|---|---|---|---|---|---|
| 676 | 2A4 | . | TS8(PR2) | 5FF | JUMP IF PR2-8 = 1 |
| 677 | 2A5 | . | #MOVE2 | 278 | |

* DECREMENT DEST ADD

| 678 | 2A6 | . | CMPR(MDL) | 1D5 | |
|---|---|---|---|---|---|
| 679 | 2A7 | . | #MOVE1 | 275 | |
| 680 | 2A8 | . | DECR(MDL) | 2F5 | |
| 681 | 2A9 | . | JMP | 1D1 | |
| 682 | 2AA | . | #MOVE3 | 27C | |
| 683 | 2AB | . | NOP | 000 | |

**

* TAB MACRO
* INITIAL PROGRAM TO ENTER LOOP

| 684 | 2AC | TAB | RL(A) | 251 | LINKING INFO IN A |
|---|---|---|---|---|---|
| 685 | 2AD | . | READ | 603 | READ 1-ST LOCATION |
| 686 | 2AE | . | TR1(MAL) | 483 | INITIALIZATION FOR WD PROC. |
| 687 | 2AF | . | #+3 | 2B1 | |
| 688 | 2B0 | . | R8(MDL) | 375 | REJECT IF BEGUN ON T.P. |
| 689 | 2B1 | . | S1(MAL) | 383 | |

* MAIN LOOP

| 690 | 2B2 | TAB2 | TRY(MDL) | 445 | |
|---|---|---|---|---|---|
| 691 | 2B3 | . | #+3 | 2B5 | |
| 692 | 2B4 | . | R5(MDL) | 345 | |
| 693 | 2B5 | . | X(G)(MDL) | 025 | FOR SPECIAL TESTS |
| 694 | 2B6 | . | TS17I(MAL) | 523 | JUMP IF END OF SEG |
| 695 | 2B7 | . | #SGMNT | 2CA | |
| 696 | 2B8 | . | INCR(MAL) | 223 | PROC BY WORDS |
| 697 | 2B9 | . | READ | 603 | |
| 698 | 2BA | . | TTP' | 4BF | LOOP UNLESS T.P. DETECTED |
| 699 | 2BB | . | #TAB2 | 2B2 | |

* TAB POINT DETECTED -- STORE E.M.

| 700 | 2BC | . | R1(MAL) | 303 | |
|---|---|---|---|---|---|
| 701 | 2BD | . | TS8(MDU) | 5F6 | JUMP IF TAB P. IN U-BYTE |
| 702 | 2BE | . | #SEM2 | 2C5 | (STORE EM) |

* TAB POINT IN PREV WORD (OR SEG.)

| 703 | 2BF | . | TRY(G) | 442 | JUMP UNLESS T.P. IN PREV SEG. |
|---|---|---|---|---|---|
| 704 | 2C0 | . | #TAB3 + 2 | 2C4 | |
| 705 | 2C1 | . | DECR(MAU) | 2F4 | GO BACK TO PREV. SEG. |
| 706 | 2C2 | TAB3 | RL(MAL) | 253 | SET UP LAST CHAR POS |
| 707 | 2C3 | . | SL(A) | 2C1 | OVERFLOW CONDITION |
| 708 | 2C4 | . | DECR(MAL) | 2F3 | BACK TO PREV WORD |

* STORE EM IN PRESENT POSITION

| 709 | 2C5 | SEM2 | PR(MAL) | 373 | |
|---|---|---|---|---|---|
| 710 | 2C6 | . | X(MDL)(MAL) | 053 | STORE CURRENT MAL |
| 711 | 2C7 | . | RL(MAL) | 253 | IN 2-ND CONTROL CHAR. |
| 712 | 2C8 | . | WRTL | 605 | |
| 713 | 2C9 | . | X(MAL)(MDL) | 835 | * RESTORE PRESENT ADD. & END |

**

| NO. | UA | LABEL | MNEMONIC | CODE | COMMENTS |
|---|---|---|---|---|---|
| 636 | 27C | MOVE3 | WRT | 607 | |
| 637 | 27D | . | X(A)(G) | 012 | |
| 638 | 27E | . | X(G)(MAU) | 024 | |

* LOAD UPDATED DEST. ADD. INTO MA'S

| 639 | 27F | . | X(MAU)(MDU) | 046 | |
|---|---|---|---|---|---|
| 640 | 280 | . | X(MAL)(MDL) | 035 | MEMORY ADDRESS SET FOR DEST. |

* COMPARE CHAR. IN A FOR SKIP CODE (RS)

| 641 | 281 | . | RL(MDL) | 255 | SET UP (RS) CODE IN MDL |
|---|---|---|---|---|---|
| 642 | 282 | . | S5(MDL) | 3C5 | |
| 643 | 283 | . | DECR(MDL) | 2F5 | |
| 644 | 284 | . | ROTL(MDL) | 2A5 | |
| 645 | 285 | . | TR8(A) | 4F1 | SET 8-TH BIT ACCORDINGLY |
| 646 | 286 | . | #+3 | 288 | |
| 647 | 287 | . | S8(MDL) | 3F5 | |
| 648 | 288 | . | CMPR(MDL) | 1D5 | WRITE CHAR IN A UNLESS SKIP C |
| 649 | 289 | . | #MOVE5 | 28D | |
| 650 | 28A | . | X(MDU)(A) | 061 | DATA INTO MD'S |
| 651 | 28B | . | X(MDL)(A) | 051 | |
| 652 | 28C | . | CWRT | 608 | DATA WRITEN |

* GO BACK TO ORIG SEG. FOR NEXT CHAR.

| 653 | 28D | MOVE5 | X(MAU)(G) | 042 | ORIG SEG. ADD. INTO MAU |
|---|---|---|---|---|---|
| 654 | 28E | . | STRAP(15) | 62F | |
| 655 | 28F | . | X(A)(MDL) | 015 | |
| 656 | 290 | . | RL(MAL) | 253 | READ CHAR EM |
| 657 | 291 | . | READL | 601 | |

* INCR. (DECR) ENTRY MARKER & STORE

| 658 | 292 | . | DECR(MDL) | 2F5 | DECR EM |
|---|---|---|---|---|---|
| 659 | 293 | . | TR8(PR2) | 4FF | INCRMENT EM IF PR2-8 IS SET |
| 660 | 294 | . | #+4 | 297 | |
| 661 | 295 | . | INCR(MDL) | 225 | |
| 662 | 296 | . | INCR(MDL) | 225 | |
| 663 | 297 | . | WRTL | 605 | UPDATED EM STORED |

* READ NEXT CHARACTER INTO A

| 664 | 298 | . | X(MAL)(MDL) | 035 | |
|---|---|---|---|---|---|
| 665 | 299 | . | READC | 600 | |
| 666 | 29A | . | X(G)(MDL) | 025 | |

* INCREMENT & TEST INDEX FOR ALL 1'S

| 667 | 29B | . | RL(MAL) | 253 | |
|---|---|---|---|---|---|
| 668 | 29C | . | S3(MAL) | 3A3 | |
| 669 | 29D | . | READL | 601 | |
| 670 | 29E | . | TS17I(MDL) | 525 | END IF 1-7 = 1 |
| 671 | 29F | . | #AG-MA | 3F3 | (END MACRO) |
| 672 | 2A0 | . | WRTL | 605 | UPDATED INDEX NOW STORED |

* READ DESTINATION ADDRESS

| 673 | 2A1 | . | S2(MAL) | 393 | |
|---|---|---|---|---|---|
| 674 | 2A2 | . | READ | 603 | |
| 675 | 2A3 | . | R8(MDL) | 375 | |

| NO. | UA | LABEL | MNEMONIC | CODE | COMMENTS |
|---|---|---|---|---|---|

*CARRIAGE RETURN - LINE FEED MACRO

| 599 | 257 | CRLF | X(MAL)(MDL) | 035 | LOAD E O L POS. IN MAL |

*STEP RIGHT MACRO

| 600 | 258 | STPR | RL(A) | 251 | SET RETURN CONDITIONS |
| 601 | 259 | . | S1(A) | 381 | |
| 602 | 25A | . | TS17I(MAL) | 523 | JUMP IF END OF SEG. |
| 603 | 25B | . | #SGMN1 | 2CD | |
| 604 | 25C | SEM | READC | 600 | READ CHAR. -- STEP P INTO |
| 605 | 25D | . | TR8(MDL) | 4F5 | STORE EM IF V.F. |
| 606 | 25E | . | #SEM2 | 2C5 | |
| 607 | 25F | STPR2 | S1(MAL) | 383 | SET BYTE BIT |
| 608 | 260 | . | RL(G) | 252 | |
| 609 | 261 | . | RL(A) | 251 | |
| 610 | 262 | . | JMP | 1D1 | JUMP TO TAB |
| 611 | 263 | . | #TAB2 + 7 | 2B9 | |

**

* ADVANCE ENTRY MARKER

| 612 | 264 | ADVNC | TR17I(MAL) | 423 | INCREMENT ADDRESS |
| 613 | 265 | . | 0000 | 000 | |
| 614 | 266 | . | RL(A) | 251 | SET UP END OF SEG COND. |
| 615 | 267 | . | S4(A) | 3B1 | |
| 616 | 268 | . | JMP | 1D1 | JUMP TO SEGMENT END PROG |
| 617 | 269 | . | #SGMN1 | 2CD | |

**

* MOVE MACRO
* READ FIRST CHARACTER INTO A VIA EM

| 618 | 26A | MOVE | RL(MAL) | 253 | READ ENTRY MARKER |
| 619 | 26B | . | READ | 603 | |
| 620 | 26C | . | X(MAL)(MDL) | 035 | EM LOC INTO MAL |
| 621 | 26D | . | READC | 600 | |
| 622 | 26E | . | X(A)(MDL) | 015 | 1-ST CHAR IN A |

* READ DESTINATION ADD

| 623 | 26F | . | RL(MAL) | 253 | DEST. ADD. FOUND IN 06 & 07 |
| 624 | 270 | . | S2(MAL) | 393 | |
| 625 | 271 | . | S3(MAL) | 3A3 | |
| 626 | 272 | . | READ | 603 | MDL & MDU CONTAIN DEST. ADD. |

* JUMP INTO MOVE LOOP

| 627 | 273 | . | JMP | 1D1 | |
| 628 | 274 | . | #MOVE3 + 2 | 27E | |

* Processing LOOP OF MOVE MACRO

| 629 | 275 | MOVE1 | SL(MDL) | 2C5 | |
| 630 | 276 | . | R1(MDL) | 305 | |
| 631 | 277 | . | DECR(MDU) | 2F6 | |
| 632 | 278 | MOVE2 | TR17I(MDL) | 425 | |
| 633 | 279 | . | #+4 | 27C | |
| 634 | 27A | . | INCR(MDU) | 226 | |
| 635 | 27B | . | X(MDL)(A) | 051 | |

| NO. | UA | LABEL | MNEMONIC | CODE | COMMENTS |
|---|---|---|---|---|---|

*STEP LEFT MACRO
*LOAD 1-ST DIS. POS. IN A

| NO. | UA | LABEL | MNEMONIC | CODE | COMMENTS |
|---|---|---|---|---|---|
| 550 | 226 | STPL | STRAP(15) | 62F | READ 1-ST DIS POS |
| 551 | 227 | . | X(A)(MDL) | 015 | LOAD 1-ST DIS. POS. IN A |
| 552 | 228 | . | READC | 600 | READ CHAR |
| 553 | 229 | STPL3 | X(MDU)(MDL) | 065 | |
| 554 | 22A | . | CMPR(MAL) | 1D3 | JUMP IF 1ST DIS. CHAR. |
| 555 | 22B | . | #STPL1 | 232 | |
| 556 | 22C | . | DECR(MAL) | 2F3 | DECREMENT DISPLAY ADD. |
| 557 | 22D | STPL2 | READC | 600 | READ CHAR |

*TEST 8-TH BIT -- IF 0 THEN STORE ENTRY MARKER

| NO. | UA | LABEL | MNEMONIC | CODE | COMMENTS |
|---|---|---|---|---|---|
| 558 | 22E | . | TFF | 5CF | LOOP IF FIXED FIELD |
| 559 | 22F | . | #STPL3 | 229 | |
| 560 | 230 | . | JMP | 1D1 | JUMP TO STORE ENTRY MARKER |
| 561 | 231 | . | #SEM2 | 2C5 | |
| 562 | 232 | STPL1 | RL(MAL) | 253 | BEGINNING OF SEG ROUTINE |
| 563 | 233 | . | S2(MAL) | 393 | |
| 564 | 234 | . | READL | 601 | |
| 565 | 235 | . | X(MAL)(A) | 031 | |
| 566 | 236 | . | TR8(MDL) | 4F5 | JUMP IF PREV SEG NOT VALID |
| 567 | 237 | . | #SEM | 25C | |
| 568 | 238 | . | DECR(MAU) | 2F4 | |
| 569 | 239 | . | SL(MAL) | 2C3 | |
| 570 | 23A | . | R8(MAL) | 373 | |
| 571 | 23B | . | JMP | 1D1 | |
| 572 | 23C | . | #STPL2 | 22D | |

*TOTAL CLEAR MACRO

| NO. | UA | LABEL | MNEMONIC | CODE | COMMENTS |
|---|---|---|---|---|---|
| 573 | 23D | TCLR | RL(A) | 251 | |
| 574 | 23E | . | RL(MDU) | 256 | |
| 575 | 23F | . | RL(MDL) | 255 | |
| 576 | 240 | . | TR1(MAL) | 483 | JMP IF UPPER BYTE |
| 577 | 241 | . | #+5 | 245 | |
| 578 | 242 | . | WRTL | 605 | |
| 579 | 243 | . | JMP | 1D1 | |
| 580 | 244 | . | #+4 | 247 | |
| 581 | 245 | TCLR1 | INCR(MAL) | 223 | |
| 582 | 246 | . | WRT | 607 | CLEAR DISPLAY WORD |
| 583 | 247 | . | CMPR(MAL) | 1D3 | END FOR T. LINE FR. |
| 584 | 248 | . | @000 | 000 | |
| 585 | 249 | . | TR17I(MAL) | 423 | JUMP UNLESS E O S |
| 586 | 24A | . | #TCLR1 | 245 | |
| 587 | 24B | . | S2(A) | 391 | |
| 588 | 24C | . | JMP | 1D1 | JUMP TO END OF SEG. PROGRAM |
| 589 | 24D | . | #SGMN1 | 2CD | |

*HOME MACRO

| NO. | UA | LABEL | MNEMONIC | CODE | COMMENTS |
|---|---|---|---|---|---|
| 590 | 24E | HOME | RL(MAL) | 253 | GEN. CONT. WD. 2 ADD. |
| 591 | 24F | . | S2(MAL) | 393 | |
| 592 | 250 | . | INCR(MAU) | 224 | |
| 593 | 251 | . | DECR(MAU) | 2F4 | GO TO PREV. SEG. |
| 594 | 252 | . | READL | 601 | |
| 595 | 253 | . | TS8(MDL) | 5F5 | JUMP IF PREV. SEG. VALID |
| 596 | 254 | . | #-2 | 251 | |
| 597 | 255 | . | STRAP(15) | 62F | LOAD 1-ST DISPLAY POS. |
| 598 | 256 | . | X(MAL)(MDL) | 835 | * MACRO END |

**

| NO. | UA | LABEL | MNEMONIC | CODE | COMMENTS |
|---|---|---|---|---|---|
| 508 | 1FC | . | X(MDU)(MDL) | 065 | |
| 509 | 1FD | . | CWRT | 608 | |
| 510 | 1FE | . | JMP | 1D1 | |
| 511 | 1FF | . | #PCLR+2 | 2EB | |

**

*LOCATE ENTRY MARKER MACRO

| 512 | 200 | LOCEM | RL(MAL) | 253 | LOAD CONT. WD. ADD. |
|---|---|---|---|---|---|
| 513 | 201 | . | READL | 601 | |
| 514 | 202 | . | X(MAL)(MDL) | 035 | |
| 515 | 203 | . | R8(MAL) | B73 | * |

*LOAD CHARACTER

| 516 | 204 | LOAD | READC | 600 | READ CHAR. |
|---|---|---|---|---|---|
| 517 | 205 | . | TR8(MDL) | 4F5 | |
| 518 | 206 | . | #+3 | 208 | |
| 519 | 207 | . | S8(G) | 3F2 | CHAR WRITTEN INTO F.F. |
| 520 | 208 | . | X(MDL)(G) | 058 | |
| 521 | 209 | . | X(MDU)(G) | 062 | |
| 522 | 20A | . | CWRT | E08 | * WRITE CHARACTER |

**

*LOCATE END OF LINE MACRO

| 523 | 20B | LEOL1 | X(MDL)(S) | 059 | LOAD LAST CONTROL BYTE ADD |
|---|---|---|---|---|---|
| 524 | 20C | . | X(MDU)(S) | 069 | LOAD LINE LENGTH |
| 525 | 20D | . | JMP | 1D1 | JUMP INTO LOOP |
| 526 | 20E | . | #LEOL2 | 214 | |
| 527 | 20F | LEOL | RL(MDL) | 255 | LOAD 7 IN MDL |
| 528 | 210 | . | S4(MDL) | 3B5 | (00000111) |
| 529 | 211 | . | X(MDU)(MDL) | 065 | |
| 530 | 212 | . | DECR(MDL) | 2F5 | |
| 531 | 213 | . | S6(MDU) | 3D6 | (00101000) |
| 532 | 214 | LEOL2 | X(A)(MDL) | 015 | LOAD PREV LAST POS. |
| 533 | 215 | . | ADD(MDU) | 156 | ADD LENGTH FOR NEW LAST POS |
| 534 | 216 | . | X(MDL)(A) | 051 | NEW LAST POS IN MDL |
| 535 | 217 | . | SUB(MAL) | 123 | A ← A-MAL |
| 536 | 218 | . | TS8(A) | 5F1 | JUMP IF A < 0 |
| 537 | 219 | . | #LEOL2 | 214 | |
| 538 | 21A | LEOL3 | X(A)(MDL) | 815 | * EOL ADD. IN A & MDL |

* LOCATE END OF FIELD MACRO

| 539 | 21B | LEOF | X(MDU)(MAL) | 063 | SAVE PRESENT FM POS |
|---|---|---|---|---|---|
| 540 | 21C | . | CMPR(MAL) | 1D3 | TEST FOR END OF LINE |
| 541 | 21D | . | #LEOF1 | 224 | |
| 542 | 21E | . | INCR(MAL) | 2D3 | TEST NEXT CHARACTER |
| 543 | 21F | . | READC | 600 | |
| 544 | 220 | . | TR8(MDL) | 4F5 | JUMP UNLESS EOF |
| 545 | 221 | . | #LEOF + 1 | 21C | |
| 546 | 222 | . | DECR(MAL) | 2F3 | FIELD ENDS WITH LAST CHAR |
| 547 | 223 | . | X(A)(MAL) | 013 | EOF IN A & |
| 548 | 224 | LEOF1 | X(MAL)(MDU) | 036 | FM POS BACK IN MAL |
| 549 | 225 | . | X(MDL)(A) | 851 | * MACRO END |

**

| NO. | UA | LABEL | MNEMONIC | CODE | COMMENTS |
|---|---|---|---|---|---|
| 446 | 1BE | . | NOP | 000 | |
| 447 | 1BF | . | NOP | 000 | |
| 448 | 1C0 | . | NOP | 000 | |
| 449 | 1C1 | . | NOP | 000 | |
| 450 | 1C2 | . | NOP | 000 | |
| 451 | 1C3 | . | NOP | 000 | |
| 452 | 1C4 | . | NOP | 000 | |
| 453 | 1C5 | . | NOP | 000 | |
| 454 | 1C6 | . | NOP | 000 | |
| 455 | 1C7 | . | NOP | 000 | |
| 456 | 1C8 | . | NOP | 000 | |
| 457 | 1C9 | . | NOP | 000 | |
| 458 | 1CA | . | NOP | 000 | |
| 459 | 1CB | . | NOP | 000 | |
| 460 | 1CC | . | NOP | 000 | |
| 461 | 1CD | . | NOP | 000 | |
| 462 | 1CE | . | NOP | 000 | |
| 463 | 1CF | . | NOP | 000 | |
| 464 | 1D0 | . | NOP | 000 | |
| 465 | 1D1 | . | NOP | 000 | |
| 466 | 1D2 | . | NOP | 000 | |
| 467 | 1D3 | . | NOP | 000 | |
| 468 | 1D4 | . | NOP | 000 | |
| 469 | 1D5 | . | NOP | 000 | |
| 470 | 1D6 | . | NOP | 000 | |
| 471 | 1D7 | . | NOP | 000 | |
| 472 | 1D8 | . | NOP | 000 | |
| 473 | 1D9 | . | NOP | 000 | |
| 474 | 1DA | . | NOP | 000 | |
| 475 | 1DB | . | NOP | 000 | |
| 476 | 1DC | . | NOP | 000 | |
| 477 | 1DD | . | NOP | 000 | |
| 478 | 1DE | . | NOP | 000 | |
| 479 | 1DF | . | NOP | 000 | |
| 480 | 1E0 | . | NOP | 000 | |
| 481 | 1E1 | . | NOP | 000 | |
| 482 | 1E2 | . | NOP | 000 | |
| 483 | 1E3 | . | NOP | 000 | |
| 484 | 1E4 | . | NOP | 000 | |
| 485 | 1E5 | . | NOP | 000 | |
| 486 | 1E6 | . | NOP | 000 | |
| 487 | 1E7 | . | NOP | 000 | |
| 488 | 1E8 | . | NOP | 000 | |
| 489 | 1E9 | . | NOP | 000 | |
| 490 | 1EA | . | NOP | 000 | |
| 491 | 1EB | . | NOP | 000 | |
| 492 | 1EC | . | NOP | 000 | |
| 493 | 1ED | . | NOP | 000 | |
| 494 | 1EE | . | NOP | 000 | |
| 495 | 1EF | . | NOP | 000 | |
| 496 | 1F0 | . | NOP | 000 | |
| 497 | 1F1 | . | NOP | 000 | |
| 498 | 1F2 | . | NOP | 000 | |
| 499 | 1F3 | . | NOP | 000 | |
| 500 | 1F4 | . | NOP | 000 | |
| 501 | 1F5 | . | NOP | 000 | |
| 502 | 1F6 | LNER | READC | 600 | |
| 503 | 1F7 | . | TP8(MDL) | 4F5 | |
| 504 | 1F8 | . | #PCLP+2 | 2FB | |
| 505 | 1F9 | . | SL(MDL) | 2C5 | |
| 506 | 1FA | . | R4(MDL) | 335 | |
| 507 | 1FB | . | INCR(MDL) | 225 | |

| NO. | UA | LABEL | MNEMONIC | CODE | COMMENTS |
|---|---|---|---|---|---|

* BIT 8 OF G; WHEN MARKED; INDICATES NO MORE CHARACTER IS PRESENT
* IN THE BUFFER OR NO MORE CHARACTER CAN BE WRITTEN.
*

| NO. | UA | LABEL | MNEMONIC | CODE | COMMENTS |
|---|---|---|---|---|---|
| 401 | 191 | BFSUB | DISIN | 3DF | |
| 402 | 192 | . | X(MDU)(S) | 069 | |
| 403 | 193 | . | X(MDL)(S) | 059 | |
| 404 | 194 | . | SAVE(PU) | 698 | |
| 405 | 195 | . | SAVE(PL) | 697 | |
| 406 | 196 | . | X(PU)(MDU) | 086 | |
| 407 | 197 | . | X(PL)(MDL) | 875 | * |

* "SUBR" IS THE RETURN MACRO FOR THE BUFFER SUBROUTINE

| 408 | 198 | SUBR | RSTOR(PU) | 688 | |
|---|---|---|---|---|---|
| 409 | 199 | . | RSTOR(PL) | 687 | |
| 410 | 19A | . | ENIN | 35F | |
| 411 | 19B | . | NOP | 800 | * |

*LOAD USER PU AND PL AND RESET DISINTERRUPT FLOP

| 412 | 19C | GUSER | X(PU)(G) | 082 | |
|---|---|---|---|---|---|
| 413 | 19D | . | X(PL)(A) | 071 | |
| 414 | 19E | . | X(A)(MDL) | 015 | |
| 415 | 19F | . | ENIN | B5F | * |

*READ S MEMORY INDIRECTLY AND SET BIT 5 OF MDU IF MDL2 IS SET

| 416 | 1A0 | RDSI | X(MAU)(S) | 049 | |
|---|---|---|---|---|---|
| 417 | 1A1 | . | X(MAL)(S) | 039 | |
| 418 | 1A2 | . | SREAD | 610 | |
| 419 | 1A3 | . | X(MAL)(MDL) | 035 | INDIRECT ADDRESS |
| 420 | 1A4 | . | SREAD | 610 | |
| 421 | 1A5 | . | TP2(MDL) | 495 | |
| 422 | 1A6 | . | #+4 | 1A9 | |
| 423 | 1A7 | . | S5(MDU) | 3C6 | |
| 424 | 1A8 | . | R2(MDL) | B15 | * |
| 425 | 1A9 | . | NOP | 800 | * |

**

| 426 | 1AA | . | NOP | 000 | |
|---|---|---|---|---|---|
| 427 | 1AB | . | NOP | 000 | |
| 428 | 1AC | . | NOP | 000 | |
| 429 | 1AD | . | NOP | 000 | |
| 430 | 1AE | . | NOP | 000 | |
| 431 | 1AF | . | NOP | 000 | |
| 432 | 1B0 | . | NOP | 000 | |
| 433 | 1B1 | . | NOP | 000 | |
| 434 | 1B2 | . | NOP | 000 | |
| 435 | 1B3 | . | NOP | 000 | |
| 436 | 1B4 | . | NOP | 000 | |
| 437 | 1B5 | . | NOP | 000 | |
| 438 | 1B6 | . | NOP | 000 | |
| 439 | 1B7 | . | NOP | 000 | |
| 440 | 1B8 | . | NOP | 000 | |
| 441 | 1B9 | . | NOP | 000 | |
| 442 | 1BA | . | NOP | 000 | |
| 443 | 1BB | . | NOP | 000 | |
| 444 | 1BC | . | NOP | 000 | |
| 445 | 1BD | . | NOP | 000 | |

| NO. | UA | LABEL | MNEMONIC | CODE | COMMENTS |
|---|---|---|---|---|---|
| 358 | 166 | . | R2(MPU) | 376 | |
| 359 | 167 | . | X(MAU)(MDU) | 046 | |
| 360 | 168 | . | SHFTR(MAU) | 274 | |
| 361 | 169 | . | SHFTR(MAU) | 274 | |
| 362 | 16A | . | SHFTR(MAU) | 274 | |
| 363 | 16B | . | INCR(MAU) | 224 | |
| 364 | 16C | . | INCR(MAU) | 224 | |
| 365 | 16D | . | INCR(MAU) | 224 | |
| 366 | 16E | . | INCR(MAU) | 224 | |
| 367 | 16F | . | TS8(MAL) | 5F3 | |
| 368 | 170 | . | 0000 | 000 | |
| 369 | 171 | . | WRTL | 605 | |
| 370 | 172 | . | X(MDL)(A) | 051 | |
| 371 | 173 | . | PL(A) | 251 | |
| 372 | 174 | . | S4(A) | 3B1 | |
| 373 | 175 | . | DECR(A) | 2F1 | |
| 374 | 176 | . | AND(MDU) | 1F6 | |
| 375 | 177 | . | READU | 602 | |
| 376 | 178 | . | R3(MDU) | 326 | |
| 377 | 179 | . | R2(MDU) | 316 | |
| 378 | 17A | . | R1(MDU) | 306 | |
| 379 | 17B | . | OR(MDU) | 1E6 | |
| 380 | 17C | . | X(MDU)(A) | 061 | |
| 381 | 17D | . | WRTU | 606 | |
| 382 | 17E | . | X(A)(MDL) | 815 | * |

**

* FOLLOWING ARE SOME SPECIAL MACROS USED BY THE OPERATING SYSTEM
* THE MACRO "SUBRTN" IS USED TO CALL A SUBROUTINE IN A PROGRAM.
* THIS MACRO IS TO BE FOLLOWED BY THE PU &PL VALUES OF THE SUBROUTI
* THE SUBROUTINE MUST BE FOLLOWED BY A "RETURN" MACRO
* SUBROUTINES CAN NOT BE NESTED SINCE STACK 12 &13 ARE USED.
* MDU MUST BE MADE AVAILABLE FOR THIS MACRO.
*

| 383 | 17F | SUBRT | WSTK(0) | 650 | SAVE MDL |
|---|---|---|---|---|---|
| 384 | 180 | . | X(MDL)(S) | 059 | SUBROUTINE PU STORE |
| 385 | 181 | . | WSTK(11) | 65B | |
| 386 | 182 | . | X(MDU)(S) | 069 | SUBROUTINE PL STORE |
| 387 | 183 | . | X(MDL)(PU) | 058 | RETURN PU STORE |
| 388 | 184 | . | WSTK(12) | 65C | |
| 389 | 185 | . | X(MDL)(PL) | 057 | RETURN PL STORE |
| 390 | 186 | . | WSTK(13) | 65D | |
| 391 | 187 | . | RSTK(11) | 64B | GET SUBROUTINE PU |
| 392 | 188 | . | X(PU)(MDL) | 085 | |
| 393 | 189 | . | X(PL)(MDU) | 076 | GET SUBROUTINE PL |
| 394 | 18A | . | RSTK(0) | E40 | * RESTORE MDL |

* SUBROUTINE RETURN MACRO "RETURN"

| 395 | 18B | RETRN | WSTK(0) | 650 | SAVE MDL |
|---|---|---|---|---|---|
| 396 | 18C | . | RSTK(12) | 64C | GET PU |
| 397 | 18D | . | X(PU)(MDL) | 085 | |
| 398 | 18E | . | RSTK(13) | 64D | GET PL |
| 399 | 18F | . | X(PL)(MDL) | 075 | |
| 400 | 190 | . | RSTK(0) | E40 | *RESTORE MDL |

* THE MACRO "BFRSUB" IS USED TO ACCESS TO USER PROGRAM'S PORT BUFFER
* WHEN FOLLOWED BY 000 00D; A CHARACTER IS WRITTEN INTO THE BUFFER
* WHEN FOLLOWED BY 000 00E; A CHARACTER IS WRITTEN INTO THE BUFFER.
* CHARACTER IS READ INTO OR WRITTEN FROM A REGISTER

| NO. | UA | LABEL | MNEMONIC | CODE | COMMENTS |
|-----|-----|-------|----------|------|----------|
| 312 | 138 | . | X(0)(S) | 009 | |
| 313 | 139 | WRTI | R2(MAL) | 313 | |
| 314 | 13A | . | R3(MAL) | 323 | |
| 315 | 13B | . | RL(A) | 251 | |
| 316 | 13C | . | S4(A) | 3B1 | |
| 317 | 13D | . | DECR(A) | 2F1 | |
| 318 | 13E | . | READU | 602 | |
| 319 | 13F | . | AND(MDU) | 1F6 | |
| 320 | 140 | . | OR(MDL) | 1E5 | |
| 321 | 141 | . | X(MDU)(A) | 061 | |
| 322 | 142 | . | WRTU | 606 | |
| 323 | 143 | . | NOP | 800 | * |
| 324 | 144 | SNS1 | S3(MAL) | 3A3 | |
| 325 | 145 | . | S2(MAL) | 393 | |
| 326 | 146 | SNS2 | READL | 601 | |
| 327 | 147 | . | S1(MDL) | 385 | |
| 328 | 148 | . | WRTL | 605 | |
| 329 | 149 | . | X(MDL)(A) | 051 | |
| 330 | 14A | . | JMP | 1D1 | |
| 331 | 14B | . | #WRTI | 139 | |
| 332 | 14C | . | NOP | 000 | |
| 333 | 14D | . | NOP | 000 | |
| 334 | 14E | . | NOP | 000 | |

**

* THE FOLLOWING MACRO LOCATES THE OPERATING SEG-
* MENT THAT CONTAINS THE DISPLAY ENTRY MARKER.
* THE FIRST ENTRY POINT IS FOR MAL AT THE KIJA.
* THE SECOND FOR MAL AT THE DISPLAY EM.
*
* LOPSG1; LOPSG2
*

| 335 | 14F | LPSG1 | DECR(MAL) | 2F3 | |
|-----|-----|-------|-----------|------|---|
| 336 | 150 | . | DECR(MAL) | 2F3 | |
| 337 | 151 | LPSG2 | READU | 602 | |
| 338 | 152 | LPSG3 | R6(MDU) | 356 | |
| 339 | 153 | . | R5(MDU) | 346 | |
| 340 | 154 | . | R4(MDU) | 336 | |
| 341 | 155 | . | R7(MDU) | 366 | |
| 342 | 156 | . | TR7(MAL) | 4E3 | |
| 343 | 157 | . | #+3 | 159 | |
| 344 | 158 | . | S7(MDU) | 3F6 | |
| 345 | 159 | . | X(MAL)(MDU) | 036 | |
| 346 | 15A | . | READC | 600 | |
| 347 | 15B | . | X(MAU)(MDL) | 045 | * |

* THE FOLLOWING MACRO UPDATES THE DISPLAY ENTRY
* MARKER OR JUST RETURNS TO THE KEYBOARD CONTROL
* AREA. UPDEM; CTLA.

| 348 | 15C | CTLA | RL(MAL) | 253 | |
|-----|-----|------|---------|------|---|
| 349 | 15D | . | SR(MAL) | 3B3 | |
| 350 | 15E | . | JMP | 1D1 | |
| 351 | 15F | . | #+3 | 161 | |
| 352 | 160 | UPDEM | RL(MAL) | 253 | |
| 353 | 161 | . | READ | 603 | |
| 354 | 162 | . | TR8(MDU) | 4F6 | |
| 355 | 163 | . | #+3 | 165 | |
| 356 | 164 | . | S7(MAL) | 3E3 | |
| 357 | 165 | . | S4(MAL) | 3B3 | |

| NO. | UA | LABEL | MNEMONIC | CODE | COMMENTS |
|---|---|---|---|---|---|

*(10) JUMP TO LOADER PROGRAM; BOOTSTRAP IS COMPLETED

| 272 | 110 | END | X(MDL)(MAL) | 053 | |
| 273 | 111 | . | WSTRP(0) | 630 | |
| 274 | 112 | . | X(MDL)(MAU) | 054 | |
| 275 | 113 | . | WSTRP(1) | 631 | |
| 276 | 114 | . | RPNLU | 621 | |
| 277 | 115 | . | TPL(MDL) | 435 | |
| 278 | 116 | . | #+3 | 118 | |
| 279 | 117 | . | HALT | B9F | * END OF PROGRAM LOAD |
| 280 | 118 | . | RSTOR(MAU) | 684 | |
| 281 | 119 | . | RSTOR(MAL) | 683 | GET START OF PROGRAM |
| 282 | 11A | . | X(PU)(MAU) | 0R4 | |
| 283 | 11B | . | X(PL)(MAL) | 873 | * GO TO LOADER NOW |

*END OF BOOTSTRAP PROGRAM...DESIGNED BY D. JEN; JAN. 1972
**

* FOLLOWING ARE SPECIAL PURPOSE KEYBOARD MACROS
*
*
* TEST FOR SECONDARY CHARACTERS

| 284 | 11C | . | X(MDL)(A) | 051 | PRESERVE CHAR THROUGH MACRO |
| 285 | 11D | . | R8(A) | 371 | RESET FOR COMPARES |
| 286 | 11E | . | PL(MDU) | 256 | MDU = (01000000) |
| 287 | 11F | . | S7(MDU) | 3E6 | |
| 288 | 120 | . | CMPR(MDU) | 1D6 | JUMP IF A = 64-THS |
| 289 | 121 | . | #FRCT1 | 12E | |
| 290 | 122 | . | TS3(A) | 5A1 | FORMAT A FOR TESTS |
| 291 | 123 | . | #+3 | 125 | |
| 292 | 124 | . | INCR(A) | 221 | |
| 293 | 125 | . | S4(MDU) | 3B6 | TEST FOR (01X111XX) |
| 294 | 126 | . | DECR(MDU) | 2F6 | |
| 295 | 127 | . | ROTR(MDU) | 246 | |
| 296 | 128 | . | OR(MDU) | 1E6 | |
| 297 | 129 | . | TSL(A) | 541 | JUMP IF A = FRACTION |
| 298 | 12A | . | #FRCT1 | 12E | |

* A # FRACTION

| 299 | 12B | . | X(A)(MDL) | 015 | RESTORE CHAR INTO A |
| 300 | 12C | . | RL(MPL) | 255 | |
| 301 | 12D | . | X(O)(UA) | 80A | * DISCARD ADDRESS |

* A=FRACTION

| 302 | 12E | FRCT1 | X(A)(MDL) | 015 | RESTORE CHAR INTO A |
| 303 | 12F | . | X(PL)(UA) | 87A | * JUMP TP ADDRESS |

**

* FOLLOWING IS THE INDICATOR CHARACTERS ROUTINE

| 304 | 130 | RNS1 | S3(MAL) | 3A3 | |
| 305 | 131 | . | S2(MAL) | 393 | |
| 306 | 132 | RNS2 | READL | 601 | |
| 307 | 133 | . | R1(MDL) | 305 | |
| 308 | 134 | . | WRTL | 605 | |
| 309 | 135 | . | TSY(MDL) | 535 | |
| 310 | 136 | . | @17F | 17F | |
| 311 | 137 | . | X(O)(S) | 009 | |

| NO. | UA | LABEL | MNEMONIC | CODE | COMMENTS |
|---|---|---|---|---|---|
| 216 | 0D8 | . | R8(A) | 371 | |
| 217 | 0D9 | . | TS5(G) | 5C2 | |
| 218 | 0DA | . | #CMPR | 0DD | |
| 219 | 0DB | . | RL(A) | 251 | |
| 220 | 0DC | . | S2(A) | 391 | STX CODE |
| 221 | 0DD | CMPR | CMPR(MDL) | 1D5 | |
| 222 | 0DE | . | #+4 | 0E1 | |
| 223 | 0DF | . | JMP | 1D1 | |
| 224 | 0E0 | . | #BOOTS | 090 | |
| 225 | 0E1 | . | SHFTL(G) | 2B2 | |
| 226 | 0E2 | . | JMP | 1D1 | |
| 227 | 0E3 | . | #INPUT | 0A9 | |

*(8) TEXT PROCESSING: CHECK FOR ETX THEN PACK CHARACTER

| NO. | UA | LABEL | MNEMONIC | CODE | COMMENTS |
|---|---|---|---|---|---|
| 228 | 0E4 | TEXT | X(A)(MDL) | 015 | |
| 229 | 0E5 | . | INCR(A) | 221 | |
| 230 | 0E6 | . | R3(A) | 321 | |
| 231 | 0E7 | . | TRL(A) | 431 | TEST IF ETX |
| 232 | 0E8 | . | #END | 110 | |
| 233 | 0E9 | . | TS1(G) | 582 | TEST UPPER OR LOWER |
| 234 | 0EA | . | #LOWER | 0F0 | BYTE |
| 235 | 0EB | UPPER | X(MDU)(MDL) | 065 | |
| 236 | 0EC | . | SAVE(MDU) | 696 | |
| 237 | 0ED | . | S1(G) | 382 | |
| 238 | 0EE | . | JMP | 1D1 | |
| 239 | 0EF | . | #INPUT | 0A9 | |
| 240 | 0F0 | LOWER | R1(G) | 302 | |
| 241 | 0F1 | . | RSTOR(MDU) | 686 | |
| 242 | 0F2 | . | R7(MDL) | 365 | |
| 243 | 0F3 | . | TR1(MDU) | 446 | |
| 244 | 0F4 | . | #+3 | 0F6 | |
| 245 | 0F5 | . | S7(MDL) | 385 | |
| 246 | 0F6 | . | TR2(MDU) | 496 | |
| 247 | 0F7 | . | #+3 | 0F9 | |
| 248 | 0F8 | . | SR(MDL) | 3F5 | |
| 249 | 0F9 | . | SHFTR(MDU) | 276 | |
| 250 | 0FA | . | SHFTR(MDU) | 276 | |

* (9) TEST IF ADDRESS CHARACTERS (G7 OR G8 SET)

| NO. | UA | LABEL | MNEMONIC | CODE | COMMENTS |
|---|---|---|---|---|---|
| 251 | 0FB | . | TR7(G) | 4E2 | |
| 252 | 0FC | . | #A2 | 102 | |
| 253 | 0FD | A1 | R7(G) | 362 | SET UP A1 IN MAU |
| 254 | 0FE | . | X(MAU)(MDL) | 045 | |
| 255 | 0FF | . | SAVE(MAU) | 694 | |
| 256 | 100 | . | JMP | 1D1 | |
| 257 | 101 | . | #INPUT | 0A9 | |
| 258 | 102 | A2 | TR8(G) | 4F2 | |
| 259 | 103 | . | #WRITE | 109 | |
| 260 | 104 | . | R8(G) | 372 | |
| 261 | 105 | . | X(MAL)(MDL) | 035 | SET UP A2 IN MAL |
| 262 | 106 | . | SAVE(MAL) | 693 | |
| 263 | 107 | . | JMP | 1D1 | |
| 264 | 108 | . | #INPUT | 0A9 | |
| 265 | 109 | WRITE | SWRT | 611 | WRITE INTO S |
| 266 | 10A | . | INCR(MAL) | 223 | |
| 267 | 10B | . | TROVF | 4EF | TEST OVERFLOW |
| 268 | 10C | . | #INPUT | 0A9 | |
| 269 | 10D | . | INCR(MAU) | 224 | |
| 270 | 10E | . | JMP | 1D1 | |
| 271 | 10F | . | #INPUT | 0A9 | |

| NO. | UA | LABEL | MNEMONIC | CODE | COMMENTS |
|---|---|---|---|---|---|

*(4) SET UP G FOR CONTROL PURPOSE:
*    G3=ENQ G4=SOH G5=FI G6=STX G7=A1 G8=A2  G1=LOWER DATA BYTE

| 166 | 0A6 | . | SL(G) | 2C2 | |
| 167 | 0A7 | . | R4(G) | 332 | |
| 168 | 0A8 | . | INCR(G) | 222 | |

*(5) TEST FOR INPUT. CHECK IDENT AND INPUT CHARACTER.

| 169 | 0A9 | INPUT | TRINT | 48E | |
| 170 | 0AA | . | #INPUT | 0A9 | |
| 171 | 0AB | . | RPNLL | 620 | |
| 172 | 0AC | . | X(A)(MDL) | 015 | |
| 173 | 0AD | . | IOINPA | 740 | INPUT IDENT |
| 174 | 0AE | . | IOINPD | 700 | INPUT DATA |
| 175 | 0AF | . | IOINPD | 700 | |
| 176 | 0B0 | . | TR8(A) | 4F1 | |
| 177 | 0B1 | . | #+3 | 0B3 | |
| 178 | 0B2 | . | R8(MDL) | 375 | |
| 179 | 0B3 | . | RSTOR(A) | 681 | |
| 180 | 0B4 | . | CMPR(MDU) | 1D6 | |
| 181 | 0B5 | . | #+7 | 0BB | |
| 182 | 0B6 | . | RL(MDL) | 255 | |
| 183 | 0B7 | . | IOOUTC | 703 | |
| 184 | 0B8 | . | IOOUTC | 703 | |
| 185 | 0B9 | . | JMP | 1D1 | |
| 186 | 0BA | . | #INPUT | 0A9 | |

*(6) TEST FOR PARITY ERROR AND DELETE SYNC AND ENQ-AO CHARACTERS

| 187 | 0BB | ERROR | TSR(MDL) | 5F5 | |
| 188 | 0BC | . | #BOOTS | 090 | |
| 189 | 0BD | SYNC | RL(A) | 251 | |
| 190 | 0BE | . | S5(A) | 3C1 | |
| 191 | 0BF | . | S3(A) | 3A1 | |
| 192 | 0C0 | . | S2(A) | 391 | |
| 193 | 0C1 | . | CMPR(MDL) | 1D5 | |
| 194 | 0C2 | . | #INPUT | 0A9 | |
| 195 | 0C3 | ENQAO | TR3(G) | 4C2 | |
| 196 | 0C4 | . | #ENQ | 0C8 | |
| 197 | 0C5 | . | R3(G) | 322 | |
| 198 | 0C6 | . | JMP | 1D1 | |
| 199 | 0C7 | . | #INPUT | 0A9 | |
| 200 | 0C8 | ENQ | R5(A) | 341 | |
| 201 | 0C9 | . | DECR(A) | 2F1 | |
| 202 | 0CA | . | CMPR(MDL) | 1D5 | |
| 203 | 0CB | . | #+6 | 0D0 | |
| 204 | 0CC | . | TR6(G) | 4C2 | |
| 205 | 0CD | . | #TEXT | 0C4 | |
| 206 | 0CE | . | JMP | 1D1 | |
| 207 | 0CF | . | #HEADR | 0D3 | |
| 208 | 0D0 | . | S3(G) | 3A2 | |
| 209 | 0D1 | . | JMP | 1D1 | |
| 210 | 0D2 | . | #INPUT | 0A9 | |

*(7) TEST HEADER OF MESSAGE

| 211 | 0D3 | HEADR | RL(A) | 251 | |
| 212 | 0D4 | . | S1(A) | 381 | SOH CODE |
| 213 | 0D5 | . | TS4(G) | 5B2 | |
| 214 | 0D6 | . | #CMPR | 0DD | |
| 215 | 0D7 | . | CMPL(A) | 201 | FI CODE |

| NO. | PU | PL | LABEL | MNEMONIC | CODE | COMMENTS |
|---|---|---|---|---|---|---|
| 131 | 083 | | DISPL | WPNLL | 30 | DISPLAY LOWER |
| 132 | 084 | . | | X(MDL)(MDU) | 56 | |
| 133 | 085 | . | | WPNLU | 31 | DISPLAY UPPER |
| 134 | 086 | . | | X(MDL)(MAU) | 54 | |
| 135 | 087 | . | | WSTK(0) | 50 | SAVE ADDRESS UPPER |
| 136 | 088 | . | | X(MDL)(MAL) | 53 | |
| 137 | 089 | . | | WSTK(11) | 5B | SAVE ADDRESS LOWER |
| 138 | 08A | . | | JMP | D1 | |
| 139 | 08B | . | | #RSTOR | 58 | |
| 140 | 08C | . | | NOP | 00 | |
| 141 | 08D | . | | NOP | 00 | |
| 142 | 08E | . | | NOP | 00 | |
| 143 | 08F | . | | NOP | 00 | |

```
*END OF CONTROL PANEL PROGRAM................
*DESIGNED BY D. JEN; NOV. 1971................
**

* FOLLOWING IS THE PCU BOOTSTRAP LOADER PROGRAM.
* THE PCU BOOTSTRAP PROGRAM IS STORED IN U MEMORY.
* THIS PROGRAM IS ALSO USED TO LOAD A PROGRAM FROM OTHER DEVICES (1
* WHEN SO USED THE DATA SWITCHES MUST BE SET FOR IO PORT IDENT
* AND THE COMMAND EXPECTED BY THE DEVICE
* BIT 8 OF LOWER DATA SWITCH IS USED TO DETERMINE IF THE 8TH BIT OF
* THE INPUT DEVICE SHOULD BE DISREGARDED (WHEN SET)
* WHEN BOOTING FROM THE COMMUNICATION LINE DATA SWITCHES MUST BE D(
* MESSAGE TO BE RECEIVED HAS FOLLOWING FORMAT:
* (SOH)(FI)(STX)(A1-UPPER 6 BITS)(A1-LOWER 6 BITS)
* (A2-UPPER 6 BITS)(A2-LOWER 6 BITS)(TEXT-UPPER 6 BITS)
* (TEXT-LOWER 6 BITS)............................(ETX)
*NESTED POLLS AND SYNC CODES ARE DELETED BY THIS PROGRAM.
*
*(1) INITIALIZE PORTS NOT USED TO IDLE.
```

| 144 | 090 | | BOOTS | DISIN | 3DF |
|---|---|---|---|---|---|
| 145 | 091 | . | | RL(MDU) | 256 |
| 146 | 092 | . | | PL(MDL) | 255 |
| 147 | 093 | . | | IOOUTC | 703 |
| 148 | 094 | . | | IOOUTC | 703 |
| 149 | 095 | . | | INCR(MDU) | 226 |
| 150 | 096 | . | | TR7(MDU) | 4E6 |
| 151 | 097 | . | | #-3 | 093 |

* (2) TEST IF BOOTSTRAP FROM COMMUNICATION LINE OR OTHER DEVICES

| 152 | 098 | . | | RPNLU | 621 |
|---|---|---|---|---|---|
| 153 | 099 | . | | TRL(MDL) | 435 |
| 154 | 09A | . | | #COMM | 09F |
| 155 | 09B | . | | X(MDU)(MDL) | 065 |
| 156 | 09C | . | | RPNLL | 620 |
| 157 | 09D | . | | JMP | 1D1 |
| 158 | 09E | . | | #COMND-2 | 0A2 |

*(3) TURN ON RECEIVE PORT TO LOOK FOR SYNC. OR INPUT CHARACTER

| 159 | 09F | | COMM | STRAP(11) | 62B |
|---|---|---|---|---|---|
| 160 | 0A0 | . | | X(MDU)(MDL) | 065 |
| 161 | 0A1 | . | | STRAP(12) | 62C |
| 162 | 0A2 | . | | X(A)(MDU) | 016 |
| 163 | 0A3 | . | | SAVE(A) | 691 |
| 164 | 0A4 | | COMND | IOOUTC | 703 |
| 165 | 0A5 | . | | IOOUTC | 703 |

| NO. | UA | LABEL | MNEMONIC | CODE | COMMENTS |
|---|---|---|---|---|---|
| 88 | 058 | PSTOR | RSTOR(A) | 681 | |
| 89 | 059 | . | RSTOR(G) | 682 | |
| 90 | 05A | . | RSTOR(MAL) | 683 | |
| 91 | 05B | . | RSTOR(MAU) | 684 | |
| 92 | 05C | . | RSTOR(MDL) | 685 | |
| 93 | 05D | . | RSTOR(MDU) | 686 | |
| 94 | 05E | . | RSTOR(PU) | 688 | |
| 95 | 05F | . | RSTOR(PL) | 687 | |
| 96 | 060 | . | RSTOR(PR2) | 68F | |
| 97 | 061 | . | RSTOR(UA) | 68A | END OF PANEL PROG. |

* SET UP P FOR IO INTERRUPT PROGRAM

| 98 | 062 | IOU | PL(PU) | 258 | INITIAL P=032 HEX |
|---|---|---|---|---|---|
| 99 | 063 | . | PL(A) | 251 | |
| 100 | 064 | . | S5(A) | 3C1 | |
| 101 | 065 | . | S6(A) | 3D1 | |
| 102 | 066 | . | S2(A) | 391 | |
| 103 | 067 | . | X(PL)(A) | 071 | |
| 104 | 068 | . | NOP | 800 | * GO TO IO SERVICE PROGRAM |

* FOR LOAD OR DISPLAY ADDRESS; GET ADDRESS FROM CONTROL PANEL

| 105 | 069 | ADDR | RPNLU | 621 | ADDRESS UPPER |
|---|---|---|---|---|---|
| 106 | 06A | . | X(MAU)(MDL) | 045 | |
| 107 | 06B | . | RPNLL | 620 | ADDRESS LOWER |
| 108 | 06C | . | JMP | 1D1 | |
| 109 | 06D | . | #ADDRL | 023 | |

*LOAD MEMORY ADDRESS OR DATA

| 110 | 06E | LOAD | TS2(PR1) | 59E | JMP IF LOAD ADDRESS |
|---|---|---|---|---|---|
| 111 | 06F | . | #LDADD | 081 | |

* LOAD MEMORY DATA; GET DATA FROM PANEL SWITCHES

| 112 | 070 | LDDAT | RPNLU | 621 | DATA UPPER FROM PANEL |
|---|---|---|---|---|---|
| 113 | 071 | . | X(MDU)(MDL) | 065 | |
| 114 | 072 | . | RPNLL | 620 | DATA LOWER FROM PANEL |
| 115 | 073 | . | TS2(PR2) | 59F | DETERMINE W OR S |
| 116 | 074 | . | #WRTS | 07A | |
| 117 | 075 | WRTM | WRT | 607 | WRITE M MEMORY |
| 118 | 076 | . | SR(MAL) | 3F3 | |
| 119 | 077 | . | S1(MAL) | 383 | |
| 120 | 078 | . | JMP | 1D1 | |
| 121 | 079 | . | #+3 | 07B | |
| 122 | 07A | WRTS | SWRT | 611 | |

* UPDATE MEMORY ADDRESS AFTER M IS WRITTEN

| 123 | 07B | . | INCR(MAL) | 023 | |
|---|---|---|---|---|---|
| 124 | 07C | . | TSY(MAL) | 033 | |
| 125 | 07D | . | #+3 | 07F | |
| 126 | 07E | . | INCR(MAU) | 024 | |
| 127 | 07F | . | TS8(PR1) | 5FE | JMP IF DISPLAY |
| 128 | 080 | . | #DISPL | 083 | |

* LOAD MEMORY ADDRESS

| 129 | 081 | LDADD | X(MDU)(MAU) | 64 | |
|---|---|---|---|---|---|
| 130 | 082 | . | X(MDL)(MAL) | 53 | |

* CONTROL PANEL DISPLAY FOR FOR DATA AND ADDRESS

| NO. | UA | LABEL | MNEMONIC | CODE | COMMENTS |
|---|---|---|---|---|---|

*THIS IS THE BEGINING OF THE INTERRUPT ROUTINES
* DETERMINE TYPE OF INTERRUPT ( ONE OF FOUR )

| 48 | 030 | . | JMP | 1D1 | LOCATION OF IO INTERRUPT |
| 49 | 031 | . | #SAVE | 038 | |
| 50 | 032 | . | JMP | 1D1 | LOCATION OF BOOTSTRAP INTRPT |
| 51 | 033 | . | #BOOTS | 090 | |
| 52 | 034 | . | RL(PU) | 258 | LOCATION OF POWER-ON INTRPT |
| 53 | 035 | . | RL(PL) | A57 | * |
| 54 | 036 | . | NOP | 000 | |
| 55 | 037 | . | NOP | 000 | |

* SAVE ENTIRE CPU ATMOSPHERE INTO STACK (IO AND PANEL INTERRUPTS)

| 56 | 038 | SAVE | SAVE(A) | 691 | LOCATION OF PANEL INTERRUPT |
| 57 | 039 | . | SAVE(G) | 692 | |
| 58 | 03A | . | SAVE(MAL) | 693 | |
| 59 | 03B | . | SAVE(MAU) | 694 | |
| 60 | 03C | . | SAVE(MDL) | 695 | |
| 61 | 03D | . | SAVE(MDU) | 696 | |
| 62 | 03E | . | SAVE(PL) | 697 | |
| 63 | 03F | . | SAVE(PU) | 698 | |
| 64 | 040 | . | SAVE(PR2) | 69F | |

*TEST INTERRUPT FROM PANEL OR IO DEVICE

| 65 | 041 | . | TS8(PR1) | 5FE | |
| 66 | 042 | . | #PANEL | 045 | |
| 67 | 043 | . | TR7(PR1) | 4EE | |
| 68 | 044 | . | #IOU | 062 | |

*SET UP FOR CONTROL PANEN PROGRAM

| 69 | 045 | PANEL | X(A)(PR1) | 01E | INPUT OPERAND FROM PANEL |
| 70 | 046 | . | R1(A) | 301 | |
| 71 | 047 | . | R6(A) | 351 | |
| 72 | 048 | . | R7(A) | 361 | |
| 73 | 049 | . | R8(A) | 371 | |
| 74 | 04A | . | TPL(A) | 431 | JUMP IF UI IS OPERAND |
| 75 | 04B | . | #RSTOR | 058 | |
| 76 | 04C | . | RPNLL | 620 | READ PANEL LOWER SWITCHES |
| 77 | 04D | . | RL(MDU) | 256 | |

* PREPARE REGISTER LOAD RETURN ADDRESS #RSTOP

| 78 | 04E | . | RL(G) | 252 | |
| 79 | 04F | . | S7(G) | 3E2 | |
| 80 | 050 | . | S5(G) | 3C2 | |
| 81 | 051 | . | S4(G) | 3B2 | |
| 82 | 052 | . | NOP | 000 | |
| 83 | 053 | . | X(UA)(A) | 0A1 | JMP TO VARIOUS LOADS AND DISPL |

* PREPARE UPPER THREE BITS OF UA REGISTER TO BE LOADED

| 84 | 054 | LDRUA | RPNLU | 621 | |
| 85 | 055 | . | X(MDU)(MDL) | 065 | |
| 86 | 056 | . | RPNLL | 620 | |
| 87 | 057 | . | WSTK(UA) | 65A | |

* RESTORE STACK AFTER INTERRUPT IS PROCESSED

| NO. | UA | LABEL | MNEMONIC | CODE | COMMENTS |
|---|---|---|---|---|---|
| 2 | 002 | . | WSTK(A) | 651 | A |
| 3 | 003 | . | X(UA)(G) | 0A2 | |
| 4 | 004 | . | WSTK(G) | 652 | G |
| 5 | 005 | . | X(UA)(G) | 0A2 | |
| 6 | 006 | . | WSTK(MAL) | 653 | MAL |
| 7 | 007 | . | X(UA)(G) | 0A2 | |
| 8 | 008 | . | WSTK(MAU) | 654 | MAU |
| 9 | 009 | . | X(UA)(G) | 0A2 | |
| 10 | 00A | . | WSTK(MDL) | 655 | MDL |
| 11 | 00B | . | X(UA)(G) | 0A2 | |
| 12 | 00C | . | WSTK(MDU) | 656 | MDU |
| 13 | 00D | . | X(UA)(G) | 0A2 | |
| 14 | 00E | . | WSTK(PL) | 657 | PL |
| 15 | 00F | . | X(UA)(G) | 0A2 | |
| 16 | 010 | . | WSTK(PU) | 658 | PU |
| 17 | 011 | . | X(UA)(G) | 0A2 | |
| 18 | 012 | . | NOP | 000 | SLOT RESERVED FOR S |
| 19 | 013 | . | X(UA)(G) | 0A2 | |
| 20 | 014 | . | JMP | 1D1 | GO TO UA LOAD |
| 21 | 015 | . | #LDRUA | 054 | |
| 22 | 016 | . | NOP | 000 | - |
| 23 | 017 | . | X(UA)(G) | 0A2 | |
| 24 | 018 | . | NOP | 000 | - |
| 25 | 019 | . | X(UA)(G) | 0A2 | |

* MEMORY OPERATIONS; LOAD OR DISPLAY DATA OR ADDRESS
* IF LOAD OR DISPLAY ADDRESS; GET ADDRESS FROM CONTROL PANEL

| 26 | 01A | . | JMP | 1D1 | |
| 27 | 01B | . | #ADDR | 069 | LOAD OR DISP. ADDRESS |

* IF LOAD OR DISPLAY DATA; GO TO GET ADDRESS FROM STACK

| 28 | 01C | . | JMP | 1D1 | |
| 29 | 01D | . | #ADDRU | 020 | |
| 30 | 01E | . | WSTK(PR2) | 65F | LOAD PR2 REGISTER |
| 31 | 01F | . | X(UA)(G) | 0A2 | |

* FOLLOWING GETS ADDRESS FROM STACK

| 32 | 020 | ADDRU | RSTK(0) | 640 | |
| 33 | 021 | . | X(MAU)(MDL) | 045 | |
| 34 | 022 | . | RSTK(11) | 64B | ADDRESS LOWER |
| 35 | 023 | ADDRL | X(MAL)(MDL) | 035 | |
| 36 | 024 | . | TSLSW | 5EE | JMP IF LOAD ADDR. OR DATA |
| 37 | 025 | . | #LOAD | 06E | |

*DISPLAY ADDRESS OR DATA ( BIT 2 OF PR2 IS USED TO DETERMINE S OR M

| 38 | 026 | . | SREAD | 610 | |
| 39 | 027 | . | -TS2(PR2) | 59F | |
| 40 | 028 | . | #WRTS+1 | 07B | |
| 41 | 029 | . | READ | 603 | |
| 42 | 02A | . | JMP | 1D1 | |
| 43 | 02B | . | #WRTM+1 | 076 | |
| 44 | 02C | . | NOP | 000 | |
| 45 | 02D | . | NOP | 000 | |
| 46 | 02E | . | NOP | 000 | |
| 47 | 02F | . | NOP | 000 | |

**

| NO. | UA | LABEL | MNEMONIC | CODE | COMMENTS |
|---|---|---|---|---|---|
| 870 | 366 | . | SWPT | 611 | |
| 871 | 367 | . | NOP | 000 | |
| 872 | 368 | . | NOP | 800 | * |

**

* ARITHMETIC OPERATIONS
* ADD M MEMORY WITH A (ADDM  ADDM')

| 873 | 369 | ADDM | X(MAU)(S) | 049 | LOAD ADDRESSES |
|---|---|---|---|---|---|
| 874 | 36A | . | X(MAL)(S) | 039 | |
| 875 | 36B | . | READC | 600 | |
| 876 | 36C | . | ADD(MDL) | 955 | * |

* SUBTRACT M FROM A (SUBM  SUBM')

| 877 | 36D | SUBM | X(MAU)(S) | 049 | LOAD ADRESSES |
|---|---|---|---|---|---|
| 878 | 36E | . | X(MAL)(S) | 039 | |
| 879 | 36F | . | READC | 600 | |
| 880 | 370 | . | SUB(MDL) | 925 | * |

* INCREMENT M MEMORY (INCRM  INCRM')

| 881 | 371 | INCRM | X(MAU)(S) | 049 | LOAD ADDRESSES |
|---|---|---|---|---|---|
| 882 | 372 | . | X(MAL)(S) | 039 | |
| 883 | 373 | . | READC | 600 | |
| 884 | 374 | . | INCR(MDL) | 225 | |
| 885 | 375 | . | X(MDU)(MDL) | 065 | |
| 886 | 376 | . | CWRT | E08 | * |

* DECREMENT M MEMORY (DECRM  DECRM')

| 887 | 377 | DECRM | X(MAU)(S) | 049 | LOAD ADDRESSES |
|---|---|---|---|---|---|
| 888 | 378 | . | X(MAL)(S) | 039 | |
| 889 | 379 | . | READC | 600 | |
| 890 | 37A | . | DECR(MDL) | 2F5 | |
| 891 | 37B | . | X(MDU)(MDL) | 065 | |
| 892 | 37C | . | CWRT | E08 | * |

**

* JUMP INSTRUCTIONS
* JUMP INDIRECTLY IN M (JMPI  JMPI'  JMPI")
*        JMPIC'  JMPIC")

| 893 | 37D | JMPI | X(MAU)(S) | 049 | |
|---|---|---|---|---|---|
| 894 | 37E | . | X(MAL)(S) | 039 | |
| 895 | 37F | . | READ | 603 | |
| 896 | 380 | . | X(PU)(MDU) | 086 | |
| 897 | 381 | . | X(PL)(MDL) | 875 | * |

* JUMP INDIRECTLY WITHIN SEGMENT (JMPIC  JMPIC')

| 898 | 382 | JMPIC | X(MAU)(S) | 049 | |
|---|---|---|---|---|---|
| 899 | 383 | . | X(MAL)(S) | 039 | |
| 900 | 384 | . | READC | 600 | |
| 901 | 385 | . | X(PL)(MDL) | 875 | * |

* JUMP OUT OF SECTOR (JMPO)

| 902 | 386 | JMPO | X(MDU)(S) | 069 | |
|---|---|---|---|---|---|
| 903 | 387 | . | X(PL)(S) | 079 | |

| NO. | UA | LABEL | MNEMONIC | CODE | COMMENTS |
|-----|-----|-------|----------|------|----------|
| 904 | 388 | . | X(PU)(MDU) | 086 | |
| 905 | 389 | . | DECR(PL) | AF7 | * |

**

* IO INSTRUCTIONS
* INPUT IO ADDRESS INTO G

| 906 | 38A | INPAD | IOINPA | 740 | ADD INTO MDU |
| 907 | 38B | . | X(G)(MDU) | 826 | * ADD INTO G |

* INPUT DATA INTO MDL

| 908 | 38C | INPDA | IOINPD | 700 | |
| 909 | 38D | . | IOINPD | F00 | * DATA INTO MDL |

* INPUT DATA INTO A

| 910 | 38E | INPD | X(MDU)(G) | 062 | |
| 911 | 38F | . | IOINPD | 700 | |
| 912 | 390 | . | IOINPD | 700 | |
| 913 | 391 | . | X(A)(MDL) | 815 | * DATA INTO A |

* INPUT CONTROL WD INTO MDL

| 914 | 392 | INPCO | IOINPC | 702 | |
| 915 | 393 | . | IOINPC | F02 | * CONTROL CHAR INTO MDL |

* INPUT CONTROL CHAR INTO A

| 916 | 394 | INPC | X(MDU)(G) | 062 | |
| 917 | 395 | . | IOINPC | 702 | |
| 918 | 396 | . | IOINPC | 702 | |
| 919 | 397 | . | X(A)(MDL) | 815 | * CONTROL INTO A |

* OUTPUT DATA TO IO

| 920 | 398 | OUTD | X(MDU)(G) | 062 | |
| 921 | 399 | . | X(MDL)(A) | 051 | |
| 922 | 39A | OUTDA | IOOUTD | 701 | |
| 923 | 39B | . | IOOUTD | F01 | * DATA OUT TO IO |

* OUTPUT CONTROL TO IO

| 924 | 39C | OUTC | X(MDU)(G) | 062 | |
| 925 | 39D | . | X(MDL)(A) | 051 | |
| 926 | 39E | OUTCO | IOOUTC | 703 | |
| 927 | 39F | . | IOOUTC | F03 | * CONTROL OUT TO IO |

**

* OTHER GENERAL PURPOSE MACROS
* SWAP A & G

| 928 | 3A0 | SWAP | X(MDL)(G) | 052 | |
| 929 | 3A1 | . | X(G)(A) | 021 | |
| 930 | 3A2 | . | X(A)(MDL) | 815 | * |

* ENTER CHARACTER IN M (ENTRM ENTRM')

| 931 | 3A3 | ENTRM | X(MAU)(S) | 049 | LOAD ADDRESSES |
| 932 | 3A4 | . | X(MAL)(S) | 039 | |
| 933 | 3A5 | . | X(MDL)(S) | 059 | LOAD DATA |

| NO. | UA | LABEL | MNEMONIC | CODE | COMMENTS |
|---|---|---|---|---|---|
| 934 | 3A6 | . | X(MDU)(MDL) | 065 | |
| 935 | 3A7 | . | CWRT | E08 | * |

* ENTER 12 BIT WORD INTO S (ENTRS)

| 936 | 3A8 | ENTRS | X(MAU)(S) | 049 | |
| 937 | 3A9 | . | X(MAL)(S) | 039 | |
| 938 | 3AA | . | X(MDU)(S) | 069 | |
| 939 | 3AB | . | X(MDL)(S) | 059 | |
| 940 | 3AC | . | SWRT | 611 | |
| 941 | 3AD | . | NOP | 000 | |
| 942 | 3AE | . | NOP | 800 | * |

* READ CONTENTS OF S INDIRECTLY (READSI  READSI')

| 943 | 3AF | RDSI | X(MAU)(S) | 049 | LOAD ADDRESSES |
| 944 | 3B0 | . | X(MAL)(S) | 039 | |
| 945 | 3B1 | . | SREAD | 610 | |
| 946 | 3B2 | . | X(MAL)(MIL) | 035 | |
| 947 | 3B3 | . | SREAD | 610 | |
| 948 | 3B4 | . | NOP | 000 | |
| 949 | 3B5 | . | NOP | 800 | * |

* READ M MEMORY (READ'  READ")

| 950 | 3B6 | RDM" | X(MAU)(S) | 049 | LOAD ADDRESSES |
| 951 | 3B7 | . | X(MAL)(S) | 039 | |
| 952 | 3B8 | . | READ | E03 | * |

* READ S MEMORY

| 953 | 3B9 | RDS" | X(MAU)(S) | 049 | LOAD ADDRESSES |
| 954 | 3BA | . | X(MAL)(S) | 039 | |
| 955 | 3BB | . | SREAD | 610 | |
| 956 | 3BC | . | NOP | 000 | |
| 957 | 3BD | . | NOP | 800 | * |

* WRITE M MEMORY (WRT"  WRT')

| 958 | 3BE | WRT" | X(MAU)(S) | 049 | LOAD ADDRESS |
| 959 | 3BF | . | X(MAL)(S) | 039 | |
| 960 | 3C0 | . | WRT | E07 | * |

* WRITE S MEMORY (WRTS"  WRTS')

| 961 | 3C1 | WRTS" | X(MAU)(S) | 049 | LOAD ADDRESSES |
| 962 | 3C2 | . | X(MAL)(S) | 039 | |
| 963 | 3C3 | . | SWRT | 611 | |
| 964 | 3C4 | . | NOP | 000 | |
| 965 | 3C5 | . | NOP | 800 | * |

* READ CHARACTER (READC'  READC")

| 966 | 3C6 | RDC" | X(MAU)(S) | 049 | |
| 967 | 3C7 | . | X(MAL)(S) | 039 | |
| 968 | 3C8 | . | READC | E00 | * |

* WRITE CHARACTER (WRTC'  WRTC")

| 969 | 3C9 | WRTC" | X(MAU)(S) | 049 | |
| 970 | 3CA | . | X(MAL)(S) | 039 | |

| NO. | UA | LABEL | MNEMONIC | CODE | COMMENTS |
|---|---|---|---|---|---|
| 971 | 3CB | . | X(MDU)(MDL) | 065 | |
| 972 | 3CC | . | CWRT | E08 | * |

* COMPARE MACRO (COMPR COMPRM)

| 973 | 3CD | CMPRM | X(MDU)(S) | 069 | LOAD MASK |
|---|---|---|---|---|---|
| 974 | 3CE | . | AND(MDU) | 1F6 | MASK OFF BITS IN A |
| 975 | 3CF | . | JMP | 1D1 | JUMP INTO LOOP |
| 976 | 3D0 | . | #CMPR | 0DD | |
| 977 | 3D1 | . | X(0)(S) | 009 | S OUT |
| 978 | 3D2 | CMPR | X(MDU)(S) | 069 | CONSTANT IN MDU |
| 979 | 3D3 | . | CMPR(MDU) | 1D6 | END IF A = CONSTANT |
| 980 | 3D4 | . | #+4 | 3D7 | |
| 981 | 3D5 | . | TPY(MDU) | 446 | CONTINUE UNLESS END CODE |
| 982 | 3D6 | . | #CMPR - 1 | 0DC | |
| 983 | 3D7 | . | X(PL)(UA) | 87A | * LOAD LOCATION INTO PL (JUMP |

* TEST PATTERN

| 984 | 3D8 | TPAT" | X(A)(G) | 012 | |
|---|---|---|---|---|---|
| 985 | 3D9 | TPAT | AND(S) | 1F9 | |
| 986 | 3DA | TPAT' | CMPR(S) | 1D9 | |
| 987 | 3DB | . | #-3 | 3D7 | |
| 988 | 3DC | . | X(0)(UA) | 80A | * |

* LOAD STATUS WORD ADDRESS INTO MA'S

| 989 | 3DD | PORTA | PL(MAU) | 254 | |
|---|---|---|---|---|---|
| 990 | 3DE | . | S2(MAU) | 394 | |
| 991 | 3DF | . | PL(MAL) | 253 | |
| 992 | 3E0 | . | S7(MAL) | 3F3 | |
| 993 | 3E1 | . | S6(MAL) | 3D3 | |
| 994 | 3E2 | . | SREAD | 610 | |
| 995 | 3E3 | . | X(MAL)(MDL) | 035 | |
| 996 | 3E4 | . | SREAD | 610 | |
| 997 | 3E5 | . | TR2(MDL) | 495 | |
| 998 | 3E6 | . | #+4 | 3E9 | |
| 999 | 3E7 | . | S5(MDU) | 3C6 | |
| 1000 | 3E8 | . | R2(MDL) | 315 | |
| 1001 | 3E9 | MA←MD | X(MAU)(MDU) | 046 | |
| 1002 | 3EA | . | X(MAL)(MDL) | 835 | * |

* REGISTER TRANSFERS

| 1003 | 3EB | AG←MD | X(G)(MDU) | 026 | |
|---|---|---|---|---|---|
| 1004 | 3EC | . | X(A)(MDL) | 815 | * |
| 1005 | 3ED | MD←AG | X(MDU)(G) | 062 | |
| 1006 | 3EE | . | X(MDL)(A) | 851 | * |
| 1007 | 3EF | MD←MA | X(MDU)(MAU) | 064 | |
| 1008 | 3F0 | . | X(MDL)(MAL) | 853 | * |
| 1009 | 3F1 | MA←AG | X(MAU)(G) | 042 | |
| 1010 | 3F2 | . | X(MAL)(A) | 831 | * |
| 1011 | 3F3 | AG←MA | X(A)(MAL) | 013 | |
| 1012 | 3F4 | . | X(G)(MAU) | 824 | * |

* REPEAT MACRO

| 1013 | 3F5 | . | RPT | 6EF | |
|---|---|---|---|---|---|
| 1014 | 3F6 | . | RPT | 6EF | |
| 1015 | 3F7 | . | RPT | 6EF | |
| 1016 | 3F8 | . | RPT | 6EF | |

| NO. | UA | LABEL | MNEMONIC | CODE | COMMENTS |
|---|---|---|---|---|---|
| 1017 | 3F9 | . | RPT | 6EF | |
| 1018 | 3FA | . | RPT | EEF | * |

* DOUBLE INCREMENTS & DECREMENTS

| NO. | UA | LABEL | MNEMONIC | CODE | COMMENTS |
|---|---|---|---|---|---|
| 1019 | 3FB | . | DECR(MAL) | 2F3 | |
| 1020 | 3FC | . | DECR(MAL) | AF3 | * |
| 1021 | 3FD | . | INCR(MAL) | 223 | |
| 1022 | 3FE | . | INCR(MAL) | A23 | * |
| 1023 | 3FF | . | NOP | 800 | * |

**

| | | | | | |
|---|---|---|---|---|---|
| ADD | 95R | JMP | 9D1 | OUTD | 39B |
| ADDM | 369 | JMPI | 37D | OUTDAT | 39A |
| ADDM' | 36A | JMPI' | 37E | PCLEAR | 259 |
| AND | 9FR | JMPO | 386 | PORTAD | 3DD |
| ADVNCE | 264 | JMPIC | 382 | PORTI | 3E5 |
| AG-MD | 3EB | JMPIC' | 383 | P-MD | 380 |
| AG-MA | 3F3 | JMPI" | 37F | R1 | B0R |
| BFRSUB | 191 | JMPIC" | 384 | R2 | B1R |
| CMPL | A0R | LDA | 325 | R3 | B2R |
| CMPR | 9DR | LDA' | 326 | R4 | B3R |
| COMPRM | 3CD | LDA" | 327 | R5 | B4R |
| COMPR | 3D2 | LDAI | 32F | R6 | B5R |
| CWRT | 508 | LDAI' | 330 | R7 | B6R |
| CRLF | 257 | LDAS | 336 | R8 | B7R |
| CTMA | 15C | LDAS' | 337 | READC' | 3C7 |
| DDMAL | 3FB | LDG | 355 | READC" | 3C6 |
| DIMAL | 3FD | LDG' | 356 | RNS1 | 130 |
| DECR | AFR | LDGS | 359 | RNS2 | 132 |
| DECRM | 377 | LDGS' | 35A | READ | E03 |
| DECRM' | 378 | LDG" | 357 | READL | E01 |
| DISIN | BDF | LOCEM | 200 | READS | 3BB |
| EVIN | B5F | LOAD | 204 | READU | E02 |
| HALT | B9F | LEOL | 20F | RL | A5R |
| HOME | 24E | LEOLI | 20B | ROTL | AAR |
| ENTRM | 3A3 | LEOF | 21B | ROTR | A4R |
| ENTRM' | 3A4 | LNER | 1F6 | RSTK | E4R |
| ENTRM" | 3A5 | LOCEOL | 20F | RSTRP | E2R |
| ENTRS | 3A8 | LEAIC | 329 | READC | E00 |
| ENTRS' | 3A9 | LDAIC' | 32A | READSI | 3AF |
| GUSER | 19C | LDAIC" | 32B | READ' | 3B7 |
| INCR | A2R | LDCPU | 058 | READ" | 3B6 |
| INCRM | 371 | MA-AG | 3F1 | READS" | 3B9 |
| INCRM' | 372 | LOPSG3 | 152 | READS' | 3BA |
| IOINPA | F40 | MOVE | 26A | RDSI' | 3B0 |
| INPADD | F40 | MD-MA | 3EF | RDSI" | 3B2 |
| IOINPC | F02 | MD-AG | 3ED | ROVF | B6F |
| IOINPD | F00 | MA-MD | 3E9 | RPNLL | E20 |
| IOOUTC | F03 | LOPSG1 | 14F | RPNMU | E21 |
| IOOUTD | F01 | LOPSG2 | 151 | RPT | EEF |
| INPAD | 384 | LOCEOF | 21B | RPT6 | 3F5 |
| INPD | 385 | OOP | 800 | RPT5 | 3F6 |
| INPDAT | 38C | OR | 9ER | RPT4 | 3F7 |
| INPC | 394 | OUTC | 39C | RPT3 | 3F8 |
| INPCON | 392 | OUTCON | 39E | RPT2 | 3F9 |

| | | | | | |
|---|---|---|---|---|---|
| RPTI | 3FA | STGS' | 364 | TS3 | DAR |
| RSTOR | E8R | SUBM | 36D | TS4 | DBR |
| RETURN | 18B | SUBM' | 36E | TS5 | DCR |
| S1 | B8R | STAIC | 348 | TS6 | DDR |
| S2 | B9R | STAIC' | 349 | TS7 | DER |
| S3 | BAR | SWAP | 3A0 | TS8 | DFR |
| S4 | BBR | SUBR | 198 | TSL | D4R |
| S5 | BCR | SUBRTN | 17F | TSY | D3R |
| S6 | BDR | TAB | 2AC | TSDC3 | D5R |
| S7 | BER | TCLEAR | 23D | TSDSW | DFE |
| S8 | BFR | TPAT | 3D9 | TSLSW | DEE |
| SAVE | E9R | TPAT' | 3DA | TSINT | D3E |
| SEM | 25C | TPAT" | 3DB | TSCVF | DEF |
| SEM2 | 2C5 | TR1 | C8R | TTP | DBF |
| SHFTL | A8R | TR2 | C9R | TTP' | CBF |
| SHFTR | A7R | TR171 | C2R | TVF | DAF |
| SNS1 | 144 | TR3 | CAR | TVF' | CAF |
| SNS2 | 146 | TR4 | CBR | UPDFM | 160 |
| SOVF | BEF | TR5 | CCR | WRT | E07 |
| STRAP | E2R | TR6 | CDR | WRTC | 3CB |
| STEPL | 226 | TR7 | CER | WRTL | E05 |
| STEPR | 258 | TR8 | CFR | WRTS | 3C3 |
| SUB | 92R | TRDC3 | C5R | WRTU | E06 |
| SL | ACR | TRDSW | CFE | X | 8BR |
| SREAD | E10 | TELSW | CEE | XOR | 9AR |
| SWRT | E11 | TROVF | CEF | WSTK | E5R |
| STA | 33B | TRINT | C8E | WRTS" | 3C1 |
| STA' | 33C | TFRN | 11C | WRTS' | 3C2 |
| STA" | 33D | TFF | DCF | WSTRP | E3R |
| STAI | 340 | TFF' | CCF | WRT" | 3BE |
| STAI' | 341 | TRY | C4R | WRT' | 3BF |
| STAS | 34F | TRL | C3R | WRTI | 139 |
| STAS' | 350 | TCLR' | 23E | WPNLL | E30 |
| STG | 35E | TCLR" | 242 | WPNLU | E31 |
| STG' | 35F | TS1 | D8R | WRTC" | 3C9 |
| STG" | 360 | TS2 | D9R | WRTC' | 3CA |
| STGS | 363 | TS171 | D2R | WRTCU | 34D |

APPENDIX A Copy of Pages 1-1 through 1-46 and 3-1 through 3-97 of Bunker Ramo Corporation Information Products Division Technical Manual TM-352 Volume 1 entitled Market Decision System 7 Communication and Quotation System, Programmable Control Unit (PCU) dated November 1972 are found in Appendix A as filed in the parent application Ser. No. 538,201 on Jan. 2, 1975, and are also found in the present application as filed, the following excerpts being those particularly related to the present disclosure.

MICROPROGRAMMING

In real-time computation, instructions must be performed in a sequential manner, i.e., each instruction in the program must be completely executed before the next instruction can be performed. Some of the instructions in a program may require only one operation to perform the required function, while other more complicated instructions may require many steps to perform the required function. Instructions requiring a number of steps to execute are time consuming when stored in the main memory, since each time the instruction is to be performed it must be coded into the program step by step. If the instruction is used repeatedly, the amount of core storage space used could become excessive. Usually, the solution to this problem has been to utilize a subroutine so that each time the instruction must be performed the subroutine is entered. In this case the subroutine is only written into storage once, and is accessed each time the program calls for it. Subroutines however, have disadvantages in that they also must reside in core, and can only be executed at the same rate as the single-step instruction. In a microprogrammed scheme, single-step instructions are stored in main memory (core), while the "subroutines" take the form of microprograms consisting of microinstructions, stored in a fast read-only memory. In this manner, core space is preserved for the main program, and repetitive elementary routines which may be used many times in a program are stored in the fast read-only memory.

Single-step instructions are fetched from main memory and executed in the normal manner, however, when a "Macro" is indicated by the program it is fetched from the fast microprogrammed memory step by step until the last step has been performed. After each Macro has been executed, the program fetches the next instruction from main memory.

The System 7 control unit is a microprogrammed unit in which the System Program, contained in S-Memory, is augmented by a microprogram stored in the U-Memory. The System Program may be altered at will by the programmer, however, the microprogram is fixed in a bipolar Read-Only memory (ROM), and is not alterable externally. Instructions in S-Memory are 12 bits in length. Bits 1 through 11 specify the micro-order, bit 12 is used as a cha bit. S-Memory instructions consists of two types:

a... Single Step Instructions which consist of a single micro-order, and which can be executed in one operation.

b... Macro-instructions, which require a number of operations during execution. The macro-instruction is actually the address in U-Memory, of the first micro-order of the microprogram sequence to be executed.

Single-Step instructions are distinguished from Macros in that the Single-Step always has the 12-bit of the micro-order code marked. In addition, a marked 12-bit is used to indicate the last micro-order of a sequence used to execute a Macro; and causes the UA Register to be updated with the next instruction in S-Memory.

MICROPROGRAM SEQUENCING

As the CPU executes the program, instructions are fetched from the System Program Memory (S-Memory), as addressed by the Program Counter (PU and PL). As each instruction is encountered, it is fetched from S-Memory and loaded into the Microprogram Counter, UA. If the instruction is a Single Step (Bit 12=1), it will consist of a single micro-order code; in which case it will be loaded from the UA Register into the micro-order Register UI, and be fed to the inputs of the micro-order decoder. The outputs of the decoder are used to establish the states of the control logic, throughout the CPU during execution of the microorder. When a Macro is to be executed (Bit 12=0), the memory location in S-Memory will contain a U-Memory address instead of a micro-order code. The U-Memory address is the address of the first micro-order in a sequence, and it is fetched from the location in S-Memory, pointed to by PU and PL, and loaded into the UA Register.

The contents of UA are used to address the U-Memory location, and the first micro-order is loaded from U-Memory into the UI Register for execution. At this point, the microprogram counter UA is incremented, in order to address the next sequential memory location; and the next micro-order is fetched from U-Memory and loaded into the UI Register. The fetch and execute sequencing proceeds in this manner as each micro-order is accessed. The last micro-order of the sequence fetched from U-Memory will have the 12-bit marked. As this micro-order is loaded into the UI Register, the next instruction from S-Memory is loaded into the UA Register, the System Program Counter is incremented to address the next S-Memory instruction, and a S-Memory read cycle is started thereby providing another instruction waiting at the input to the UA Register.

MICRO-ORDER CODE STRUCTURE

The 12-bit micro-order code contains all of the information necessary to specify the desired operation, and consists of an Operation Code, at least one Operand, and in some cases a Function Code.

The Operation Code specifies the general type of operation to be performed, i.e., Arithmetic or Logic, Direct Transfer, etc. The Operand portion of the micro-order specifies the register whose contents are to be operated upon. The Function Code specifies a particular function (Add, Subtract) within the group specified by the Op code. Most of the micro-orders are single operand instructions, however some involve the manipulation of two operands. (Double Operand Instructions). Since each operand specifies one of 11 registers, a code is assigned to each register.

The micro-order code structure can be broken into nine groups of operation:

a. Direct transfer operations
b. Double operand arithmetic and logic operations
c. Single operand arithmetic and logic operations
d. Conditioning operations
e. Memory operations
f. Stack operations
g. Test and Jump operations
h. Read/Write strapped characters
i. I/O Command operations Each of the above listed types of micro-orders has a specific code format which identifies it from all others. The mnemonic and code for each micro-order is listed in Table 1–2.

REGISTERS

The CPU has 10 registers, nine of which are connected to the Input (M) Bus and are accessible to the operator from the control panel. Six of the registers (A, G, MAL, MAU, MDL, MDU) are general purpose registers which may be used to contain data or addresses during processing. The remaining four registers (PU, PL, UA, UI) are special purpose registers, and are used to store either addresses or instructions necessary to the execution of the program.

The registers of the CPU are comprised of general purpose MSI boards. The MSI boards are utilized to perform various functions by changing the condition of control terminals. In the following text, each register of the CPU is described. Following each description is a listing of circuit details relevant to that register, such as type of MSI boards, clock utilized, condition of control terminals, control signals and their derivation, input and output data.

ACCUMULATOR (A REGISTER)

The Accumulator or A register is eight bits long. In all operations requiring two sources of data, the A register is always the second data source, as well as the destination for the result. For example, if an instruction specified "Add the contents of the G register to the contents of the A register", the contents of registers G and A are inputted to the Arithmetic and Logic Unit (ALU), where a binary addition is performed. The output of the ALU, representing the Sum (Summand) is then stored in the A register. Details of the A register follow.

2 MSC4 4-bit Sync Counters
Clock-CL51
Count and Carry terminal disabled. (Hardwired to logic 0.)
Reset terminal disabled. (Hardwired to logic 1.)
Parallel load enabled by LDA. (LDA=STBA+DOIA+XTOA)
  (STBA)-Doing a restore (RSTOR), text (TSTIN), single operand arith (Z02), or a conditioning function (Z03), and the operand register is specified as A register (X01).
  (DOIA)-Doing a double operand arith (Z01) operation, in which case the result will always be transferred into A.
  (XTOA)-Doing a direct transfer operation (Z00) and the destination register is specified as the A register (Y01).
Input-L Bus only
Output-M Bus or ALU

GENERAL PURPOSE REGISTER (G REGISTER)

The G register is eight bits long, has no specific assignment, and may be used as a temporary buffer register for data operands or addresses. Details of the G register follow.

2 MSC4 4-bit Sync Counters
Clock-CL51
Count and Carry terminal disabled. (Hardwired to logic 0.)
Reset terminal disabled. (Hardwired to logic 1.)
Parallel load enabled by LDG. (LDG=STBG+XTOG)
  (STBG)-Doing a restore (RSTOR), test (TSTIN), single operand arith (Z02), or a conditioning function (Z03), and the operand register is specified as the G register (X02).
  (XTOG)-Doing a direct transfer operation (Z00) and the destination register is specified as the G register (Y02).
Input-L Bus only
Output-M Bus only

MEMORY DATA REGISTERS (REGISTER MDL AND MDU)

The Memory Data Registers MDL and MDU are each eight bits long, and are used to contain data during read or write operations between the CPU and Main Memory or S-Memory. Main Memory data words consist of two eight-bit bytes. S-Memory instruction words consist of 12-bits. Both word formats are accommodated by the registers, by loading the first eight bits of a word into MDL, and loading the remaining bits into MDU. Details of the MDL register follow.

2 MSC4 4-bit Sync Counters
Clock-CL51A
Count and Carry terminal disabled. (Hardwired to logic 0.)
Reset terminal disabled. (Hardwired to logic 1.)
Parallel load input enabled by LDMDL. (LDMDL=STBMDL+XTOMDL+READC+READWL+READS+IODAI+RSTK+RSTR)
  (STBMDL)-Doing a restore (RSTOR), test (TSTIN), single operand arith (Z02), or a conditioning function (Z03) and the operand register is specified as the MDL register (X05).
  (XTOMDL)-Doing a direct transfer operation (Z00) and the destination register is specified as the MDL register (Y05).
  (IODAI)-Doing an I/O operation and character to be read is an IOU data character.
  (READWL)-Doing a Read Main Memory Word Operation (MMOPR) and one character (byte) is to be read into the MDL register (UI01).
  (READC)-Doing a Read Main Memory Character (byte) and the byte is to be read into the MDL register (X00).
  (READS)-Doing a S-Memory read operation and the lower byte (S1-S8) is to be transferred to the MDL register.
  (RSTK)-Doing a Read Stack operation and one character is to be transferred from the stack location into the MDL register.
  (RSTR)-Doing a Read Strap operation and one character to be transferred from a strap location into the MDL register.
Input-4 MMX4 ¼ Data Selectors (MDLI1-MDLI8)
  MDLI selects:
  MDLS1=SMOPR+MMCHU
  MDLS2=MMOPR

| Operation | Selects | Load From |
|---|---|---|
| M-Memory Upper Byte Read | MDLS1 & MDLS2 | Main Memory Upper MU1-MUB |
| S-Memory Read | MDLS1 | S-Memory Lower Bits S01-S08 |
| M-Memory Lower Byte Read | MDLS2 | Main Memory Lower ML1-ML8 |
| None of the above | MDLS1' & MDLS2' | L Bus Data L1-L8 |

Output - M-Memory, S-Memory, M Bus, or L Bus

DETAILS OF THE MDU REGISTER FOLLOW.

2 MSC4 4-bit Sync Counters
Clock - CL51A
Count and Carry terminal disabled. (Hardwired to logic 0.)
Reset terminal disabled. (Hardwired to logic 1.)
Parallel load input enabled by LDMDU. (LDMDU=STBMDU+ XTOMDU+IOADI+READWU+READS+RSTKUA)
  (STBMDU - Doing a restore (RSTOR), test (TSTIN), single operand arith (Z02), or a conditioning function (Z03) and the operand register is specified as the MDU register (X06).
  (XTOMDU) - Doing a direct transfer operation (Z00) and the destination register is specified as the MDU register (Y06).
  (IOADI) - Doing an I/O operation and character to be read is an IOU address character.
  (READWU) - Doing a Read Main Memory Word operation (MMOPR) and one character (byte) is to be read into the MDU register (U102).
  (READS) - Doing a S-Memory read operation and the upper byte (S9-S12) is to be transferred to the MDU register.
  (RSTKUA) - Doing a Read Stack operation (RSTK) from UA register position in stack (X10) upper four bits of information (9-12) are stored in MDU register via the AUX bus.
Input - 4 MMX4 ¼ Data Selectors (MDUI1-MDUI8)
  MDUI selects:

LDMDUB=READS+RSTKUA+UTOMDL
MDUS2=MMOPR+MDUS2X

| Operation | Selects | Load From |
|---|---|---|
| Read UA Stack (RSTKUA) | LDMDUB & MDUS2 | AUX Bus (4 bits) |
| U-Out Instruction | | Hardwired Logic 0 (4 bits) |
| S-Memory Read | LDMDUB | S-Memory Upper Bits S09-S12 Hardwired Logic 0 (4 bits) |
| M-Memory Read | MDUS2 | M-Memory Upper Byte MU1-MU8 |
| None of the above | LDMDUB' & MDUS2' | L Bus Data L1-L8 |

Output - M-Memory, S-Memory or M Bus

MEMORY ADDRESS REGISTERS (MAL AND MAU)

The Memory Address Registers MAL and MAU are each eight bits long, and contain the memory address during operations with Main Memory or S-Memory. The memory address words are derived as follows.

|  | Board Select | Row Select | Chip Select | |
|---|---|---|---|---|
| Main Memory Address | 14 | 13 | 12 | 11 | 10 9 8 7 6 5 4 3 2 1* |
| MAL-MAU Address Registers | M | M | M | M | M M M M M M M M M M |
| | A | A | A | A | A A A A A A A A A A |
| | U 8 | U 7 | U 6 | U 5 | U U U U U U U U U U 4 3 2 1 7 6 5 4 3 2 |

Note: MAL1 = Byte Control. MAL8 not used.
*Because of the bit shift above (MAL2→M1) the main memory address within the CPU will differ from the same address through the PCU. For example, main memory location 0420 (hex) would appear as 0420 throughout the DSS, but if the address originated in the CPU the address in the MAU-MAL registers would be 0440.

| S-Memory Address | 14 | 13 | 12 | 11 | 10 | 9 | 8 | 7 | 6 | 5 | 4 | 3 | 2 | 1 |
|---|---|---|---|---|---|---|---|---|---|---|---|---|---|---|
| MAL-MAU Address Registers | M | M | M | M | M | M | M | M | M | M | M | M | M | M |
| | A | A | A | A | A | A | A | A | A | A | A | A | A | A |
| | U 6 | U 5 | U 4 | U 3 | U 2 | U 1 | U 8 | U 7 | U 6 | U 5 | U 4 | U 3 | U 2 | U 1 |

DETAILS OF THE MAL REGISTER FOLLOW.

2 MSC4 4-bit Sync Counters
Clock - CL51
Count and Carry terminal disabled. (Hardwired to logic 0.)
Reset terminal disabled. (Hardwired to logic 1.)
Parallel load enabled by LDMAL. (LDMAL=STBMAL+XTOMAL)
 (STBMAL) - Doing a restore (RSTOR), test (TSTIN), single operand arith (Z02), or a conditioning function (Z03) and the operand register is specified as the MAL register (X03).
 (XTOMAL) - Doing a direct transfer operation (Z00) and the destination register is specified as the MAL register (Y03).
Input - L Bus only
Output - M-Memory, S-Memory, or M Bus

DETAILS OF THE MAU REGISTER FOLLOW.

2 MSC4 4-bit Sync Counters
Clock - CL51
Count and Carry terminal disabled. (Hardwired to logic 0.)
Reset terminal disabled. (Hardwired to logic 1.)
Parallel load input enabled by LDMAU. (LDMAU=STBMAU+XTOMAU)
 STBMAU) - Doing a restore (RSTOR), test (TSTIN), single operand arith (Z02), or a conditioning function (Z03) and the operand register is specified as the MAU register (X04).
 (XTOMAU) - Doing a direct transfer operation (Z00) and the destination register is specified as the MAU register (Y04).
Input - L Bus only
output - M-Memory, S-Memory, or M Bus

PROGRAM COUNTER (REGISTERS PL AND PU)

The PL and PU registers are chained together to form the system program counter which provides the address for the system program memory (S-Memory). Both registers are eight bits long. Each register is connected independently to the Input Bus, and can input or receive data from the Output Bus independent of the other registers. In the counting mode, the overflow from PL is fed to the input of PU, so that the two registers together form a 16-bit counter. In this mode, the PU register contains an address of a page in S-Memory, and the PL register contains the location of a specific word of data within that page. Details of the PL register follow.

2 MSC4 4-bit Sync Counters
Clock - CL51
Reset terminal disabled. (Hardwired to logic 1.)
Count and Carry terminal activated by INCP (lower four bits PL1-PL4) or INCPL2 (upper four bits PL5-PL8).
 INCP=PLU12+UA12PI+SKPEXT+SOUT+UAOUT+U12PL+UOUTS
Incrementing P counter to address of next instruction in S-Memory.
 INCPL2=CRYPL1·INCP
Four lower bits are marked and INCP occurs, therefore, count is carried into upper four bits PL5-PL8.
Parallel load input enabled by LDPL. (LDPL=STBPL+XTOPL+JMPEXT)
 (STBPL) - Doing a restore (RSTOR), test (TSTIN), single operand arith (Z02), or a conditioning function (Z03) and the operand register is specified as the PL register (X07).
 (XTOPL) - Doing a direct transfer operation (Z00) and the destination register is specified as the PL register (Y07).

(JMPEXT) - Doing a compare and jump (Y13-Z01) or a test and jump (Z04+Z05) function and the jump is to a S-Memory address.

Input - 4 MMX4 ¼ Data Selectors. Only two inputs used:
If JMPEXT=1 input UA register (UA01-UA08)
If JMPEXT=0 input from L Bus (L1-L8)

DETAILS OF THE PU REGISTER FOLLOW.

2 MSC4 4-bit Sync Counters
Clock - CL51
Reset terminal disabled. (Hardwired to logic 1.)
Count and carry terminal activated by INCPU1 (lower four bits PU1-PU4) or INCPU2 (upper four bits PU5-PU8).
INCPU1=CRYPL2·INCPL2 Carry Count from PL register (PL1-PL8)
INCPU2=CRYPU1·INCPU1 Carry Count from lower four bits (PU1-PU4) into upper four bits (PU5-PU8).
Parallel load input enabled by LDPU. (LDPU=STBPU+XTOPU)
(STBPU)-Doing a restore (RSTOR), test (TSTIN), single operand arith (Z02), or a conditioning function (Z03) and the operand register is specified as the PU register (X08).
(XTOPU) - Doing a direct transfer operation (Z00) and the destination register is specified as the PU register (Y08).
Input - L Bus only (L1-L8)

MICROPROGRAM COUNTER (UA REGISTER)

The UA register is 12 bits long, and contains the address of a Micro-Order in U-Memory. The register functions as a counter which is incremented every 450 nanoseconds (1 CPU clock) to step through the Micro-Orders in the instruction. As the last Micro-Order of an instruction is fetched from U-Memory, it causes the UA register to be loaded with the next starting address or a single-step instruction from S-Memory. Single-step instructions are loaded directly into the UI register, and the output of U-Memory is ignored. Details of the UA register follow.

3 MSC4 4-bit Sync Counters
Clock - CLUA (CL50+SWTUA) SWTUA is utilized when
UA register is under control of Test Panel.
Count and Carry terminal activated by signals INCUA1 (UA01-UA04), INCUA2 (UA05-UA08), and INCUA3 (UA09-UA12).
INCUA1=PLU12'·PINT' step to next U-Memory address.
INCUA2=CRYUA1·INCUA1 carry from lower bits.
INCUA3=CRYUA2·INCUA2 carry from lower bits.
Rest terminal activated by CLRUA. (CLRUA=JMPEXT+PLU12)

(JMPEXT) - An external (S-Memory) jump (or skip).
(PLU12) - UI12 is set and instruction modifies PL register.
Parallel load input enabled by LDUA. (LDUA=STBUA+XTOUA+LDIAD+UAIS1A).
(STBUA) - Doing a restore (RSTOR), test (TSTIN), single operand arith (Z02), or a conditioning function (Z03) and the operand register is specified as the UA register (X10).
(XTOUA) - Doing a direct transfer operation (Z00) and the destination register is specified as the UA register (Y10).
(LDIAD) - Doing an interrupt and the hardware trap address for the U-Memory subroutine is to be put into the UA register.
(UAIS1A) - Doing one of various operations and the next instruction is to be entered either from S-Memory or from UII.

Input - 6 MMX4 ¼ Data Selectors
UAI selects:
UAISI=LDIAD'·(U12PL+UA12PI+UA-OUT+
SKPEXT+MPTINT+SWINS)
UAIS2=LDIAD+JMPINT+SWINS

| Operation | Selects | Loads From |
|---|---|---|
| Test Panel Load to UA - Jump to U-Memory Address | UAIS1 & UAIS2 | UI Data Selectors UII01-UII12 |
| Accept S-Memory Operation | UAIS1 | S-Memory S01-S12 |
| Interrupt | UAIS2 | Input trap address of U-Memory Instr. |
| None of the above | UAIS1' & UAIS2' | L Bus Data L1-L8 Plus 4 bits of AUX. |

Output - M-Bus, UI register, PL register, & U-Memory.

MICRO-ORDER CODE REGISTER (UI REGISTER)

The UI register is 12 bits long, and contains the microorder code of the micro-order being executed. Details of the UI register follow.

3 MSC4 4-bit Synch Counters
Clock - CLUI (CLUI=CL50+LDCL) LDCL is utilized
when UI register is under control of Test Panel.
Count and Carry terminal disabled. (Hardwired to logic 0.)
Reset terminal activated by CLRUI. (CLRUI=RSTUI+ENUIC)
1. Jump (or skit instruction)
2. U-Out instruction
3. Transfer to UA
4. Transfer from UA (UA OUT)
5. Second step of Interrupt Sequence
6. Restore UA
7. Chaining bit or UI12 set and instruction modifies PL
8. Switch to UA function from Test Set.
Parallel load input enabled by LDUI. (LDUI=RPTA'·RPTB') LDUI enables loading except when a repeat instruction is decoded from U-Memory.
Input - 6 MMX4 ¼ Data Selectors.
UII selects:
UIIS1=SWINS+UA12PI
UIIS2=SWINS+PINT

| Operation | Selects | Load From |
|---|---|---|
| Test Panel Operation (SWINS) | UIIS1 & UIIS2 | Test Panel SW01-SW12 |
| Single-Step Instruction (UA12) | UIIS1 | UA Register UA1-UA12 |
| Process Interrupt (PINT) | UIIS2 | Hardwired Save UA Instruction (69A) |
| None of the above | UIIS1' & UIIS2' | U-Memory U01-U12 |

PHANTOM REGISTERS (PR1 AND PR2)

The Phantom Register PR1 and PR2 are not registers in the usual sense, but are decodes which reflect the state of other registers or external inputs to the CPU. Both Phantom registers are eight bits wide.

Phantom registers 1 reflects the status of the control panel switches as shown below:

| Bit | PR1 |
|---|---|
| 1 | Interrupt (IOU) |
| 2 | Switch 1 |
| 3 | Switch 2 |
| 4 | Switch 3 |
| 5 | Switch 4 |
| 6 | Sense Switch (Control Panel) |
| 7 | Load Switches |
| 8 | Display Switches |

Plantom register 2 reflects the contents of MAL, MAU, MDL, MDU, or the G register as shown below. The contents of PR2 are always saved when the CPU is interrupted.

| Bit | PR2 |
|---|---|
| 1 | General Purpose Flip-Flop - PR21 |
| 2 | Halt/DSW32 (Test Set) |
| 3 | Variable Field |
| 4 | Tab Point |
| 5 | Fixed Field |
| 6 | Disable Interrupt |
| 7 | Overflow |
| 8 | General Purpose Flip-Flop - PR28 |

PROCESSING CONTROL AND TRANSFER BUSES

The Processing Control section of the CPU controls the movement and manipulation of all data within the CPU, and consists of a Main Incoming Bus, Auxiliary Bus, Arithmetic and Logic Unit, and an Output Bus.

PROCESSING CONTROL AND TRANSFER BUSES

The Processing Control section of the CPU controls the movement and manipulation of all data within the CPU, and consists of a Main Incoming Bus, Auxiliary Bus, Arithmetic and Logic Unit, and an Output Bus. Only the buses are described here. The Arithmetic and Logic Unit (ALU) will be described in detail in a following section.

MAIN INCOMING BUS (M)

The Main Incoming Bus connects all of the registers in the CPU (except UI), with the ALU. The bus consists of eight separate data selector circuits, each capable of selecting one output from up to 16 inputs. Each bit position of each register is fed as an input to one of the data selectors. Selection signals for each circuit enable strobing of the contents of any register into the ALU. The output of this M bus is to the ALU or L bus only. The various inputs to the M bus are listed in the following.

| UI Bits | | | | | | UI Bits | | | | |
|---|---|---|---|---|---|---|---|---|---|---|
| 4 | 3 | 2 | 1 | Decode | M Bus Input | 4 | 3 | 2 | 1 | Decode | M Bus Input |
| 0 | 0 | 0 | 0 | X00 | All Logic 0's | 1 | 0 | 0 | 0 | X08 | PU REG |
| 0 | 0 | 0 | 1 | X01 | A REG | 1 | 0 | 0 | 1 | X09 | S-MEMORY |
| 0 | 0 | 1 | 0 | X02 | G REG | 1 | 0 | 1 | 0 | X10 | UA REG |
| 0 | 0 | 1 | 1 | X03 | MAL REG | 1 | 0 | 1 | 1 | X11 | U-MEMORY |
| 0 | 1 | 0 | 0 | X04 | MAU REG | 1 | 1 | 0 | 0 | X12 | — |
| 0 | 1 | 0 | 1 | X05 | MDL REG | 1 | 1 | 0 | 1 | X13 | — |
| 0 | 1 | 1 | 0 | X06 | MDU REG | 1 | 1 | 1 | 0 | X14 | PR1 |
| 0 | 1 | 1 | 1 | X07 | PL REG | 1 | 1 | 1 | 1 | X15 | PR2 |

OUTGOING BUS (L)

The L Bus connects the output of the ALU's to the I/O Input register, the M Bus, the Rotate Right logic, the Stack, Strap, or register MDL through a ⅛ (one of eight) data selector circuit. The bus consists of eight separate data selector circuits (1 per bit). Each circuit is capable of selecting one output from up to eight inputs. The eight inputs are connected in parallel to the input of each one of the destination registers. Data from the L Bus is inputted to a specific destination register by inhibiting clocks to all other registers. The data from the L Bus may be inputted to any register (except UI) or to the Stack.

Inputs to the L Bus are on a priority basis and are listed below in order of priority as determined by the priority encoder.

1. MDL Register (Z6U157=U107·Z06·U1051) (Write Stack Oper.) MDL1-MDL8
2. Stack - (Z6U578=Z06·U178·U105') (Read Stack or Restore Reg. Oper.) STK01-STK08
3. Strap - (Z6U15=Z06·U105') (Read Strap Oper.) STR01-STR08
4. IOU Input Instr. - (Z07) Enter ID1-ID8
5. M Bus (Right Rotate) - Z2Y47=Z02·Y47) M2-RM1
6. M Bus (Direct Xfer or Save) - Z006=Z00+Z06) M1-M8
7. Double Operand Arith. - (Z01) Enter F1-F8
8. None of the Above - Enter C1-C8 (Conditioning or Single Operand Arith.)

AUXILIARY BUS (AUX)

The Auxiliary Bus is four bits wide, and connects the four high-order bits, bits 9-12, of the UA register with bits 1-4 of MDU and bits 9-12 of the UA Stack. Details of the Auxiliary Bus follow.

2 MMX4 ¼ Data Selectors
  AUXS1=UOUT+SAVUA
  AUXS2=UOUT+RSTKUA+RSTRUA

| Operation | Selects | Loads From |
|---|---|---|
| Transfer out from U-Memory (UOUT) | AUXS1 . AUXS2 | UII09-UII12 |
| Save UA Instruction (SAVUA) | AUXS1 | UA9-UA12 |
| Restore or Read UA Register RSTKUA + RSTRUA | AUXS2 | UAS9-UAS12 |
| None of the above | AUXS1' . AUXS2' | MDU1-MDU4 |

STRAP DATA

The Strap consists of eight NMX6 data selectors providing up to 16 characters which are addressable via U101-U104. The first four characters are generated from switches on the Test Set front panel. The remaining twelve characters are hardwired strap characters contained on two DXCl strap cards. Strap characters are used to define A0, Il, I2, etc.

STACK

The Stack consists of two MRA4 (16×4 RAM) circuits which provide storage for 16 eight-bit characters. Position 10 (UA) is used to store a 12-bit character in conjunction with the UA Stack, which contains the additional four bits. The Stack is addressable via U101-U104. The main purpose of the Stack to store the contents of registers after an interrupt. It may also be used for general purpose temporary storage by the software.

ARITHMETIC AND LOGIC UNIT (ALU)

The Arithmetic and Logic Unit performs all of the mathematical and logical operations within the CPU. The unit accepts data (operands) from the CPU via the Main (M) Bus, performs the necessary operation as indicated by a function code, and outputs the desired result to the Outgoing (L) Bus. All arithmetic and logic operations except Right Rotate and Right Shift are performed within the MSI chips which comprise the ALU. Right Rotate and Right Shift operations are performed by shifting the M Bus input to the L Bus selector.

The ALU used in the PCU is actually two separate Arithmetic and Logic units, composed of MSI ALU chips. Each ALU consists of two 4-bit ALU chips configured to accept an 8-bit operand. One of the ALU's handles single Operand and Conditioning functions, and the other handles Double Operand functions.

All data operands are 8-bit in length (1-byte), and are inputted to the ALU in parallel. Function Select codes applied to the ALU indicate the arithmetic or logic function to be performed on the operand(s). The output of the ALU is a single byte representing the result of the operation.

The ALU which handles Single Operand functions receives inputs from the Main (M) Bus and the Condition Generator. The Condition Generator is used to set up specific bit configurations within a register, by selectively setting or resetting any or all of the bits in the register. The output of the ALU is fed to the Outgoing (L) Bus.

The ALU which handles Double Operand functions receives inputs from both the Main (M) Bus, and the A Register. In any Double Operand operation, the A Register is always the second source of data. The primary source of data may be any of the registers connected to the Main Bus.

The ALU is capable of generating 32 arithmetic and 16 logic functions. The following operations are performed by the ALU:

Increment A (F=A+1)... The operand represented by A is incremented by 1.

A Plus B (F=A+B) ... The operands represented by A and B are added binarily, and the result is stored in the A register.

A Minus B (F=A-B) ... The operands represented by A and B are transferred to the ALU. The "Ones Complement" of operand B is obtained within the ALU, and added to the operand A. The resultant sum is one less than the correct absolute value. Hardware adds the binary one to correct the result.

| Example: | A-B = (8-2) = 6 | |
|---|---|---|
| | 8 = 1000 | 1000 |
| | −2 = 0010 ones | |
| | complement | 1101 |
| | sum | 10101 |
| | The high order carry is output on COUNT | 0101 |
| | Correct Result: Add 1 | 0001 |
| | | 0110 = 6 |

Decrement A (F=A−1)... Operand A is decremented by 1, using the same method (Ones Complement addition) as A minus B.

Logical Zero (F=0) ... When the Function code 0011 is applied to the ALU input, the output byte is "all zeros". This function may be used to load a register with zeros, effectively clearing the register by changing the operand to all zeros, and storing the output.

Complement B (F=B̄) ... The operand represented by B is "Ones Complemented" by inverting each bit in the operand.

Exclusive OR (F=A⊕B) ... The corresponding bit positions of operands A and B are compared. If a 1 bit appears in corresponding bit positions of either operand, but not both operands, then a 1 bit is inserted in the result. All other bits are set to 0.
  Example: Operand A ... 100010101
  Operand B ... 110100100
  Result ... 010110001

Identity (F=A⊕B) ... Operands A and B are compared. If A=B, then all outputs of the ALU wil be logic 1.

A AND B (F=A·B) ... The corresponding bit positions of operands A and B are compared. If a 1 bit appears in corresponding bit positions of both operands, then a 1 bit is inserted in the result. All other bits are set to 0.
  Example: Operand A ... 100110101
  Operand B ... 110011100
  Result ... 100010100

Logical One (F=1) ... When the Function code 1100 is applied to the ALU input, the output byte is "all ones". This function may be used to load a register with ones.

A OR B (F=A+B)... The corresponding bit positions of operands A and B are compared. If a 1 bit appears in corresponding bit positions of either or both operands, then a 1 bit is inserted in the result. All other bits are set to 0.

Example: Operand A ... 011010001
Operand B ... 100011000
Result ... 111011001

DISPLAY DATA BUFFER

The Memory data to be entered into the Display Data Buffer is addressed via Data Address signals DADU1-DADU8 and DADL1-DADL6. The segment address (DADU1-DADU8) is derived from signals CBA1-CBA8. These segment pointer signals are outputs of the Address Control Buffer. The word address (DADL1-DADL6) is derived from the Normal Address Counter, NA1-NA6.

A count of four is loaded into the Normal Address Counter at the beginning of a segment. The count is started at four because the first four words of a segment are control words. The counter continues to count until the count of 64 is reached, being inhibited only during dead space time. Counting from 4 to 64 provides access to every display word stored in memory for that display segment.

The output from Main Memory (MDRU1-MDRU8 and MDRL1-MDRL8) is loaded into the Display Data Buffer each Bit 7 time via signal LDMDL. The buffer storage address is provided by counter CBAD1'-CBAD5.

DISPLAY CIRCUITS

Four character generators are utilized by the PCU. Each character generator and its associated circuitry services three display devices.

Data (DD1'-DD7') from the Display Data Buffer is applied to buffers in the FCR1, Select gates sequentially apply the character data to the Character Generator via signals DB1A-DB7A. Stroke timing signals (ST1A-ST5A) are applied to the Character Generator to provide video bit outputs VB1A-VB7A. The video bits are applied back to the FCR1 card where they are loaded into shift registers. Parallel to serial conversion occurs in each register to supply display video signals to the associated Display Expansion card, FDE1. Table 3-4 lists the signals and describes the functions of the signals in the FDE1 circuits. Each circuit is identical.

CHARACTER GENERATOR LOAD TIMING

The timing for the transfer of data from the Display Data Buffer to the Character Generator is generally as follows. Counter CBAD2'-CBAD5A provides the address of the data in the Display Data Buffer. Load Character Generator Buffer signals LD01-LD14 provide the clocks to load the three 8 bit buffers associated with each Character Generator. Signals LD13-LD14 are not used. The load signals are developed from two MDE8 decoder circuits which enable an output equivalent to the binary input e.g., if the three inputs CBAD1, CBAD2, and CBAD3 were at logic 1, (binary 7) the eighth output (LD09') would be activated.

Signals SEL1-SEL3 provide the timing to transfer the three characters in the Character Generator Buffers to its associated Character Generator at a 3.75 MHz. rate.

DISPLAY CURSOR

The Alpha word address ALPH1-ALPH6 is compared with the Normal Address counter NA1-NA6. The Alpha segment address ALPHS1-ALPHS3 is compared with the segment address counter SEGA1-SEGA3. Comparison of addresses will produce signal DCUR which is applied to the FDE1 circuit to display a cursor in that character position (overwrite) on the display screen.

INPUT-OUTPUT UNIT

The IOU provides an on-line connection between the CPU and the outside world. The IOU is a bus oriented unit composed of a basic unit and a number of modular, add-on, port adapters providing compatibility with various transmission modes and speeds. The buses act like OR gates which function on a priority basis. There are a possible eight channels vying for acceptance to the Channel Bus with the Real Time Clock having the top priority and keyboard control unit D having the lowest priority. There are eight possible port adapters vying for acceptance to each Port Bus and eight possible Keyboards bidding for service to each Keyboard Bus. The keyboard bus does not have priority within it, but the keyboards are scanned in numeric order.

CPU INTERFACE CONTROL UNIT (CICU)

The CICU contains CPU interface and control logic, channel bus and control logic, parity check and generate logic, and clock generators which provide timing signals used for the Real Time Clock, Keyboard Scan, and asynchronous data clocks. Output and Input signals are all in reference to the CPU, e.g., output bus is from CPU to IOU and input bus is from IOU to CPU.

The Data Output Bus (DOB1-DOB8) reflects the output data of the CPU via register MDL1-MDL8 during a 701 Output Data Command. Bits 1, 2, 4 and 5 are control bits used by the port adapters during a 703 Output Control Command. The Output Address AO-1-AO8 reflects the address contained in the CPU register MDU1-MDU8. Bits AO4, AO5, and AO6 contain the Channel Bus address and are used to produce one of the channel enable signals CE0-CE7. Bits AO1, AO2, and AO3 contain the Port Bus address which identifies a particular port adapter. I/O Function Code bits IFC-1-IFC6 reflects the I/O command contained in the CPU register U101-U106. Signals IFC1-IFC6 are decoded to determine the type of I/O instruction.

All I/O operations are started by micro-orders. Each micro-order must be issued twice (consecutively) due to timing considerations. With each I/O Instruction, except a 740 (Input Address) instruction, and IOC signal is sent to the IOU. When the second IOC signal has been received and the CPU and IOU are synchronized via CPU clock CL5, transfer pulse PXP is generated.

Data is inputted to the CPU via signal XIDI1-XIDI8. Signals XIDI1-XIDI8 contains data (DI1-DI8 only when signal IOC is at logic 1. During a 740 instruction the address (AIBR1-AIBR6) of the device requesting service is inputted. Bit 8 of the input data is forced to a logic one if a data fault or parity error is detected. Parity is determined by the strapping in the port adapters but the logic circuits to generate and check parity are located within the CICU. The parity bit may also be ignored or used as an eighth data bit.

CLOCK GENERATORS

Clocks used within the IOU are derived from DL02 crystal-controlled oscillators located within the CICU. The basic frequencies of the oscillators are applied to counters and gated to produce a wide variety of frequencies needed to accommodate the port adapters, keyboard scan, and the Real Time Clock.

REAL TIME CLOCK

The Real Time Clock provides a clock of one second (TISE) or four milliseconds (T4ME) which is available at the Channel Bus under program control. The Real Time Clock has the highest priority on the Channel Bus (address O). The clocks are used for software counting and timing functions and are not utilized by the IOU hardware.

BUS EXPANDER CONTROL UNIT (BECU)

The Bus Expander Control Unit provides the circuitry to allow expansion of a single Channel Bus position into a Port Bus capable of accommodating up to eight port adapters. Data is outputted by enabling the BECU to the Channel Bus (CEI for Por Bus A) via bits AOBR4-AOBR6. The port is enabled (PE10-PE17) via bits AOBR1-AOBR3. Data is transferred to the appropriate transmit port adapter via signals DOB1-1-DOB18. When a receive port adapter receives a character, the port adapter first requests service on a priority basis (PSRQ10-PSRQ17) to the port bus, which in turn causes a channel service request (CSRQ1 for Port Bus A). The channel service request is handled in the CICU/on a priority basis which issues a channel address enable (CAE1) signal to the BECU. The BECU responds by returning the port adapter address via signals AI11-AI13. The CICU/requests service to the CPU (I/O interrupt) via signal XSRQ. The response from the CPU will be a 740 instruction to read the interrupt address and then, an input data command 700 for receive ports or an output data command 701 for transmit ports.

KEYBOARD CONTROL UNIT (KBCU)

The Keyboard Control Unit provides the control logic and buffering to allow eight keyboards to operate through one channel bus position. Keyboard scan signals SCN1-SCN8 are four millisecond enable signals sent to the keyboards. Scan signal SCN1 is sent to keyboard 1 of each Keyboard Bus followed by SCN2 being sent to each keyboard 2, etc. Signals XDBA1-XDBA8 contain data from the keyboard being scanned. If bit 6, 7, or 8 of the keyboard data is marked, a character present condition is enabled (CHPA), the keyboard data is loaded into the keyboard buffer (KDBRA1-KDBRA8) and a channel service request is set (CSRQ4). The Channel Bus accepts requests on a priority basis and when accepted, the keyboard address is gated along with an I/O interrupt from the CICU to the CPU. The program will respond with a read I/O address instruction (740) which transfers the address of the highest priority interrupting channel (XIDI1-XIDI8) to the MDU register of the CPU. This will be followed by an input data instruction (700) from the CPU utilizing the address contained in the MDU register. The keyboard data is then gated to the CPU and the service request is reset.

PORT ADAPTERS

Port Adapters are functional PC boards which provide the serial to parallel or parallel to serial conversion necessary to transmission or receiption of data. Each port adapter operates in a Simplex mode. Each port therefore operates as a Transmit-Only or Receive-Only port, and provides interfacing and character buffering for a single serial device such as an R-O printer, KSR, Ticker, News Line, or serial communications line requiring simplex facilities. Duplex communications facilities can be accommodated by utilizing two of the simplex port adapters. Each separate port functions independently with respect to transmission rate, mode, and character structure.

Through the use of strapping, port adapters are capable of handling character lengths of 5, 6, 7 or 8 bits per character. Strapping may also allow odd, evn or no parity, and asynchronous port adapters may handle characters with one, one and one-half, or two stop bits. Data transfer fault detection is another strappable function of the port adapters. IOU commands from the CPU are utilized to enable interrupt (service request) functions as well as look for sync functions.

We claim as our invention:

1. In a character display system,
   (a) display means having a visual display for displaying successive lines of characters and operable for representing a sequence of lines of textual material,
   (b) storage means operatively connected with said display means and having a series of sets of storage locations for storing character-representing signals representing a sequence of lines of characters of an existing text, and having control means for controlling said display means to display a sequence of lines of characters of the existing text on the visual display in accordance with character-representing signals at a sequence of said sets of storage locations of said storage means whereby respective storage locations of said sequence of sets of storage locations correspond to respective character positions of the successive lines of characters on said visual display,
   (c) processing means connected with said storage means for effecting the transfer of character-representing signals representing a block of existing text from storage locations corresponding to a first sequence of lines on said visual display to storage locations corresponding to respective second sequential lines on said visual display offset downwardly relative to the respective lines of the first sequence while maintaining each transferred character-representing signal in a storage location corresponding to the same lateral location with respect to said visual display, and
   (d) manually operable means operable in an insert operation for selecting insertion points on the sequence of lines of the existing test displayed by said display means including insertion points intermediate the ends of the lines of characters for insertion of further characters into the existing text,
   (e) said processing means being coupled with said manually operable means and being automatically responsive to the selection of an insertion point intermediate the ends of one of said lines of existing text on said visual display for determining the existence of an interference by the existing text with the insertion of new text at said insertion point and for ascertaining the character locations of said storage means containing character-representing signals corresponding to existing text beyond said insertion point and for shifting the character-representing signals of storage locations containing such interfering existing text to new storage locations such that the block of interfering existing text beyond said insertion point is displayed on a sequence of lines offset downwardly relative to said insertion point with such block of interfering existing text being shifted downwardly without change in the lateral locations of the individual displayed characters of the bodily downwardly shifted text.

2. A system according to claim 1, with storage means operable for storing a sequence of sets of individual character-representing coded signals, said display means being operable for displaying a sequence of lines of individual characters in accordance with the sequence of sets of character-representing coded signals as stored by said storage means, said storage means including means for storing a tab code in association with any selected individual character-representing coded signal for representing a tab point at a corresponding selected location of the visual display, and said processing means including means for shifting the sequence of certain of said sets of individual character-representing coded signals and the associated tab codes in said storage means which correspond to said interfering text such that the interfering text including tab points is bodily shifted downwardly on the visual display without changing the lateral location of the tab points of the interfering text.

3. A system according to claim 2 with said processing means including means for sensing the end of an insert operation, and said processing means including means for left justifying the interfering text relative to further characters inserted during the insert operation by shifting the individual character-representing coded signals in said storage means.

4. In a character display system including a visual display, (a) storage means having a series of sets of storage locations and including means for storing character-representing signals for selective display at respective lines of the visual display with each set of storage locations including a sequence of storage locations corresponding to a sequence of character locations horizontally of the visual display and with corresponding storage locations of the respective sets storing character-representing signals with respect to the same horizontal character location of successive lines, (b) display means for displaying the character-representing signals of selected sets as a sequence of lines of characters of an existing text on the visual display, (c) processing means including means responsive to a manually selected set tab signal for applying a tab-representing signal to selected corresponding storage locations of the respective sets, (d) said display means including means responsive to a tab-representing signal at the selected storage locations of said sets for providing a visual tab point at the corresponding location of said visual display, (e) manually operable means operable in an insert operation for selecting insertion points on the sequence of lines of the existing text displayed by said display means including insertion points intermediate the ends of the lines of characters for insertion of further characters into the existing text, and (f) said processing means further including means coupled with said manually operable means and responsive to a selected insertion point intermediate the ends of one of said lines of existing text for automatically altering the stored locations of the character-representing signals corresponding to the lines of existing text to shift said character-representing signals to storage locations corresponding to lines subsequent to the line containing the insertion point, thereby to provide vacant storage locations for storing character-representing signals corresponding to further characters to be added at the selected insertion point, and said processing means controlling said storage means and said display means such that the storage locations receiving character-representing signals corresponding to existing text beyond the selected insertion point correspond with the respective original storage locations with respect to horizontal character locations on the visual display, whereby the block of existing text beyond the selected insertion point is shifted downwardly on the visual display without changing the lateral location of such interfering text relative to said visual display.

5. A character display system according to claim 4 with said processing means including means automatically responsive to a manually selected set tab signal with respect to a given storage location of a given set to store the tab representing signal not only in the selected storage location of the given set but also to store the tab-representing signal in the corresponding storage location of a series of following sets of said storage locations.

* * * * *